US005715468A

United States Patent [19]

Budzinski

[11] Patent Number: 5,715,468

[45] Date of Patent: Feb. 3, 1998

[54] MEMORY SYSTEM FOR STORING AND RETRIEVING EXPERIENCE AND KNOWLEDGE WITH NATURAL LANGUAGE

[76] Inventor: Robert Lucius Budzinski, 1106 Edgewood Dr., Richardson, Tex. 75081-5811

[21] Appl. No.: 315,691

[22] Filed: Sep. 30, 1994

[51] Int. Cl.[6] .................... G06F 17/28

[52] U.S. Cl. .................... 395/759; 395/761

[58] Field of Search .................... 364/419.08, 200.75; 395/759, 751, 752, 757, 761

[56] References Cited

U.S. PATENT DOCUMENTS

| | | | |
|---|---|---|---|
| 4,914,590 | 4/1990 | Loatman et al. | 395/759 |
| 4,994,966 | 2/1991 | Hutchins | 395/759 |

FOREIGN PATENT DOCUMENTS

| | | | |
|---|---|---|---|
| 1180888 | 5/1986 | European Pat. Off. | 364/419 |

OTHER PUBLICATIONS

Bates, "The theory and Practice of Augmented transition Network Grammars", L. Bolc(ed), Natural Langugage Communication with computers, New York: Sptinger, 1978.

Cook, Case Grammer:Development of the Matrix Model., Washington DC: Georgetown University Press, 1979. Dyer, In–Depth Understanding. Cambridge, MA: MIT, 1983.

Early, "An efficient Context–Free Parsing Algorithm", Communications of the ACM, vol. 13, pp. 94–102, 1970.

Fillmore, "The case for Case", in Bach, E., and Harms, R. (EDS), Universals in Linguistic Theory, New York:Holt, Rinehart, and Wiston, 1968.

Guha et al, "Cyc: A Mid–Term Report", Al Magazine, vol. 11, No. 3, pp. 32–59.

Quirk et al., A Comprehensive Grammar of the English Language, New York: Longman, 1985.

Sager, Natural Language Information Processing: A Computer Grammar of English and its Applications, Reading, MA: Addison–Wesley, 1981.

Schank, Scripts, Plans, Goals, and Understanding: Five Programs Plus Five Miniatures, Hillsdale, NJ: Lawrence Earlbaum, 1981.

Schank, Dynamic Memory: A Theory of Learning in Computers and People, Cambridge, England: Cambridge University Press, 1982.

Slade, S., "Case–Based Reasoning: A Research Paradigm", Al Magazine, (American Association of Artificial Intelligence), vol. 12, No. 1, pp. 42–45, 1991.

Wilks, et al., "Syntax Preference, and Right Attachment:", Proceedings of the Ninth IJCAI, 1985.

Hendrix et al., "Developing a Natural Language Interface to complex Data", ACM Transactions on Database Systems vol. 3, pp. 105–147, 1978.

Hirst, Semantic Interpretation and Resolution of Ambiguity, Cambridge, England: Cambridge University Press, 1987.

(List continued on next page.)

*Primary Examiner*—Gail O. Hayes
*Assistant Examiner*—Frantzy Poinvil

[57] ABSTRACT

A memory system for storing and retrieving experience and knowledge with natural language. The primary components of this memory system include syntactic processes, function word processes, morphology processes, ellipsis processes, concrete and abstract noun word sense number processes, verb word sense number processes, adjective word sense number processes, purpose identification processes, plausibility and expectedness processes, communication processes, context storage processes, and text generation processes. The syntactic processes include word isolation, dictionary look up, and parsing. The function word processes select and evaluate functions associated with function words which are certain: adjectives, nouns, verbs, adverbs, pronouns, prepositions, conjunctions, and interjections. Morphology processes replace morphological words with phrases or clauses composed of function words arid state representation words. Certain nouns, verbs, and adjectives are state representation words. Selecting the word sense number of a state representation word selects the state representation of such a word. Experience and knowledge are stored as clause implying word sense numbers organized into paths in a directed graph.

39 Claims, 178 Drawing Sheets

OTHER PUBLICATIONS

Lebowitz, "The use of Memory in Text Processing", Communications of the ACM, vol. 31, pp. 1483–1502, 1988.

Kolodner, J., Retrieval and Organizational Strategies in Concept Memory, Hillsdale, NJ 1984.

Kolodner, J., "Retrieving Events from a Case Memory: A Parallel Implementation", Proceedings of the DARPA Workshop on Case–Based Reasoning, pp. 233–249, 1988.

Madron, T., "Extracting Words from Natural Language Text", AI Expert, vol. 4, No. 4, pp. 30–35.

Winograd, Language as a Cognitive Process, vol. 1: Syntax, Reading, MA: Addison–Wesley, 1983.

Woods, "Transition Network Grammars for Natural Language Analysis", Communications of the ACM, vol. 13, No. 10, pp. 59–606, 1970.

| TEXT OF WORD | REPRESENTATION NUMBER | SYNTAX WORDSETS | STATE/ FUNCTION ADDRESSES | ANOMALIES | POINTERS TO COMMON TABLES |
|---|---|---|---|---|---|
| Text word | Number used to the represent the text word | Set of wordsets associated with the text word; Each wordset has its part of speech and a pointer to a set of pointers to phrases started with the text word word with or without ellipsis stored in a common table | Associated with each wordset is a set of word sense numbers or an address to the function word process with an associated function code | Partitioned by wordset; each entry has: type of anomaly, criteria for selecting the anomaly, an address of of a replacement process and/or a replacement data structure | Addresses of common tables associated with a wordset |

FIG. 3A

| ENTRY NUMBER | STATE REPRESENTATION ADDRESS | SET OF BASE WORD ENTRIES |
|---|---|---|
| Word sense number | Address of data structure of the word sense number | Dictionary 20 base word entries implying the word sense number |

FIG. 3B

| TEXT OF AFFIX OR INFLECTION | REPRESENTATION NUMBER |
|---|---|
| Text | Affix code or inflection code |

FIG. 3C

| AFFIX CODE | AFFIX DEFINITION | INFLECTION CODE | INFLECTION DEFINITION |
|---|---|---|---|
| Number | Address descriptor, a set of morphological codes, or the part of speech of the wordset | Number | Inflection function code |

FIG. 3D

| SOURCE PART OF SPEECH | SET OF DESTINATION PARTS OF SPEECH | AFFIXES |
|---|---|---|
| Part of speech | One or more destination parts of speech reached with associated affixes added to the source part of speech | Set of affix definition pointers associated with a destination part of speech |

FIG. 3E

| PRONOUN | REFERENT PROPERTIES | CONFIDENCE LEVEL | SPECIAL GRAMMAR FUNCTIONS |
|---|---|---|---|
| "DO" | Verb; | 2 | |
| | : | | |
| "I" | Noun, Ist person, singular; | 4 | FN25 |
| | Subjective, UNIQUE; | 4 | |
| | : | | |
| "IT" | Noun, thing, singular; | 4 | |
| | Noun, SPECIAL MEANING; | 1 | FN29, FN31... |
| | Noun, clause, CATAPHORIC; | 1 | |
| | Noun, sentence, CATAPHORIC | 1 | |
| | : | | |
| "SOME" | Noun, person; | 1 | FN892 |
| | Noun, thing; | 1 | FN892 |
| | Noun, place; | 1 | FN892 |
| | Noun, time; | 1 | FN892 |
| | : | | |
| "THAT | Noun, thing, singular or noncount; | 1 | FN77 |
| | Noun, person, singular | 1 | FN225 |
| | Noun, SPECIAL MEANING; | 1 | FN37 |
| | Noun, clause; | 1 | |
| | Noun, sentence; | 1 | |
| | : | | |
| "TODAY" | Noun, UNIQUE; | 4 | FN110 |
| | : | | |
| NUMBERS | Noun, number; | 4 | |
| | Noun, countable; | 2 | |
| | Noun, SPECIAL MEANING; | 4 | FN 110, FN111 |
| | Adjective; | 4 | FN112 |
| | : | | |

FIG. 6A

| TEXT (single adjective) | MULTI-WORD FUNCTION LIST | DEFAULT REFERENCE TYPE | FUNCTION TYPE | FUNCTION ADDRESS and ASSOCIATED PARAMETERS | CONFIDENCE LEVEL | NEXT FUNCTION ADDRESS |
|---|---|---|---|---|---|---|
| Text of adjective | Set of multi-word symbols and associated starting addresses of its defintion | Value of: SPECIFIC, SPECIFIC UNKNOWN, GENERAL | Value of: SELECTION, QUANTIZATION, etc. | A set of function addresses and parameters pairs which correspond to the adjective function | Number between 1 and 4 with 4 being the highest confidence level | NULL or the starting address of the next alternative function definition |

FIG. 7A

| MULTI-WORD SYMBOL | DEFAULT REFERENCE TYPE | LIST OF FUNCTION ADDRESSES and ASSOCIATED PARAMETERS OR POSITIONS | CONFIDENCE LEVEL | NEXT FUNCTION ADDRESS |
|---|---|---|---|---|
| Symbol used to look up functions associated with a function word position | Value of: SPECIFIC, SPECIFIC UNKNOWN, GENERAL | Ordered list of elements; Each element is either an address of a function, its type, and other parameters, or a position location for accessing the function word in the SDS | Number between 1 and 4 with 4 being the highest confidence level | NULL or the starting address of the next alternative function definition |

FIG. 7B

| PREPOSITION TEXT REPRESENTATION | RELATION TYPES | CONFIDENCE LEVEL |
|---|---|---|
| Preposition text, representation number | List of A-Relation designations, S-Relation designations, and/or T-Relation designations | Confidence level for each designation |

A-Relation descriptor associated with a designation:
- Type: Partitive, Possessive, Function, or Group;
- Relation Characteristic;
- Preceeding/Succeeding Pointers;
- Memory 100 Pointers;
- Specific Information;
- Designation;

S-Relation descriptor associated with a designation:
- Source Requirement Descriptor;
- Destination Requirement;
- Destination: MODIFIEE or COMPLEMENT;
- Relation Setting Function;
- Designation;

T-Relation descriptor associated with a designation:
- Destination: MODIFIEE or COMPLEMENT;
- Relation Setting Function;

FIG. 8A

| PREPOSITION TEXT REPRESENTATION | RELATION TYPES | CONFIDENCE LEVEL |
|---|---|---|
| Preposition text, representation number | List of AMF-Relation designations, F-Relation designations, T-Relation designations, and/or P-Relation designations | Confidence level for each designation |

AMF and F -Relation descriptor associated with a designation:
Type: AMF: Partitive, Possessive, Function, or Group; F: Function;
Relation Characteristic;
Preceeding/Succeeding Pointers;
Memory 100 Pointers;
Specific Information;
Designation;

T-Relation descriptor associated with a designation:
Destination: SUBJECT or COMPLEMENT;
Relation Setting Function;
Default state(s) and/or properties;
Designation;

P-Relation descriptor associated with a designation:
Purpose Relation Type;
Designation;

FIG. 8C

| MODIFYING ADVERBIAL SUBCLASS DATA STRUCTURE |
| --- |
| SOURCE DESCRIPTOR:<br>Semantic role;<br>Required value or value range, and units;<br>Required state(s) and/or property(s);<br>Function to obtain required state(s) and/or property(s);<br>Required parameters; |
| DESTINATION DESCRIPTOR:<br>Requirements of Modifiee;<br>or NULL set; |
| Function of Adverbial Subclasses Include:<br>Set adverbial subclass values;<br>Select modifiee word sense or word sense component;<br>Initiate processes; |

FIG. 9A

| TENSE | VERB TYPE | TIME PERIODS WHEN TRUE | | | TIME SHIFTS TO: | USAGE SITUATION |
|---|---|---|---|---|---|---|
| PRESENT | STATIVE<br>EVENTIVE<br>HABITUAL | Before ><br>not Before<br>Before > | Now<br>Now<br>Now | < After<br>not After<br>< After | PAST FUTURE<br>PAST FUTURE<br>PAST FUTURE | us1<br>us2,us3,us4,us5,us6<br>us8 |
| PAST | STATIVE<br>EVENTIVE<br>HABITUAL | Before Past<br>not Before Past<br>Before Past | Past Time Point<br>Past Time Point<br>Past Time Point | After Past<br>not After Past<br>After Past | PRESENT to -<br>PAST and -<br>FUTURE to PAST | us9<br>us9<br>us9 |
| FUTURE | STATIVE<br>EVENTIVE<br>HABITUAL | not Now<br>not Now<br>not Now | Future<br>Future<br>Future | beyond Future<br>not beyond Fut.<br>beyond Future | none<br>none<br>none | us10,us11<br>us10,us11<br>us10,us11 |
| PERFECTIVE TENSES | | | | | | |
| PRESENT | STATIVE<br>EVENTIVE<br>HABITUAL | Past<br>recent Past<br>Past | Present<br>Present<br>Present | possibly Future<br>possibly Future<br>possibly Future | none<br>none<br>none | us12<br>us12<br>us12 |
| PAST | STATIVE<br>EVENTIVE<br>HABITUAL | Past Period<br>Past Period<br>Past Period | not Now<br>not Now<br>not Now | not Future<br>not Future<br>not Future | none<br>none<br>none | us13<br>us13<br>us13 |
| FUTURE | STATIVE<br>EVENTIVE<br>HABITUAL | possibly Past<br>possibly Past<br>possibly Past | Now<br>Now<br>Now | Expected to -<br>be true in -<br>the Future | none<br>none<br>none | us14<br>us14<br>us14 |
| PROGRESSIVE TENSES | | | | | | |
| PRESENT, PAST, and FUTURE | STATIVE<br>EVENTIVE<br>HABITUAL | not Before<br>just Before<br>not Before | near Time Point<br>Time Point<br>near Time Point | not After<br>just After<br>not After | none<br>none<br>none | us15,spec. meaning<br>us16<br>us15 |
| PERFECTIVE PROGRESSIVE TENSES | | | | | | |
| PRESENT | EVENTIVE<br>HABITUAL | Before Now<br>Before Now | Now<br>near Now | possibly Future<br>possibly Future | none<br>none | us 17<br>us 17 |
| PAST | EVENTIVE<br>HABITUAL | Past<br>Past | not Now<br>not Now | not Future<br>not Future | none<br>none | us18<br>us18 |
| FUTURE | EVENTIVE<br>HABITUAL | possibly Past<br>possibly Past | Now<br>Now | Expected to -<br>continue into -<br>the Future | none<br>none | us19<br>us19 |

FIG. 10B

Conjunctions Joining Clause Constituents

| NAME | TYPE | FUNCTION |
|---|---|---|
| and | NOUN | CF1, CF3 |
| and | VERB | CF2, CF4, . . . |
| . | . | . |
| . | . | . |
| . | . | . |

Conjunctions Joining Clauses

| NAME | TYPE | FUNCTION |
|---|---|---|
| or | COORDINATING | R1, R2 |
| . | . | . |
| . | . | . |
| . | . | . |
| that | SUBORDINATING | R72, R77, . . . |
| . | . | . |
| . | . | . |
| . | . | . |

FIG. 11A

| AFFIX TEXT | SOURCE | DESTINATION | TYPE NUMBER | FUNCTIONS | POINTER TO MODIFICATION ADVERBIAL SUBCLASSES FOR ADVERBIAL DESTINATIONS |
|---|---|---|---|---|---|
| "ly" | ADJECTIVE | ADVERB | 1<br>2<br>3<br>.<br>.<br>. | F1<br>F2, F3<br>F7<br>.<br>.<br>. | P1<br>P2<br>P3<br>.<br>.<br>. |
| "ingly"<br>.<br>.<br>. | VERB<br>.<br>.<br>. | ADVERB<br>.<br>.<br>. | 10<br>.<br>.<br>. | F18, F21, F99<br>.<br>.<br>. | P88<br>.<br>.<br>. |

FIG. 12A

| CONDITION | SUBJECT SOURCE |
|---|---|
| 1. nonfinite verb or morphological word@ premodifies a concrete noun | premodified noun's state representation data structure is searched for the nonfinite verb or the morphological word@ in a clause relation |
| 2. nonfinite verb or morphological word@ premodifies a noun | premodified noun |
| 3. nonfinite verb or morphological word@ premodifies a state abstract noun | owner of the state abstract noun |
| 4. nonfinite verb, verbless clause, or morphological word@ postmodifies a noun | postmodified noun |
| 5. nonfinite verb, verbless clause, or morphological word@ postmodifies a state abstract noun | owner of the state abstract noun |
| 6. a prepositional phrase modifies the verbal in the nonfinite verb clause or modifies the morphological word@ | the complement of the modifying prepositional phrase |
| 7. none | the main clause |
| 8. nonfinite verb, verbless clause, or morphological word@ is not the subject of the clause | subject of the main clause |
| 9. subject of the main clause is not first person pronoun | 1st person (speaker) |
| 10. subject of the main clause is not a second person pronoun, or not a direct address sentence | 2nd person (person spoken to) |
| 11. none | another untried noun in the main clause |
| 12. none | the context |
| 13. none | general reference (an indefinite pronoun) |

FIG. 15A

| CONDITION | OBJECT SOURCE |
|---|---|
| 1. nonfinite verb or morphological word@ premodifies a noun | premodified noun |
| 2. nonfinite verb or morphological word@ postmodifies a noun | postmodified noun |
| 3. a prepositional phrase modifies the verbal in the nonfinite verb clause or modifies the morphological word@ | the complement of the modifying prepositional phrase |
| 4. 2nd person is not currently the subject source | 2nd person (person spoken to) |
| 5. 1st person is not currently the subject source | 1st person (speaker) |
| 6. none | another untried noun in the main clause |
| 7. none | the context |
| 8. none | default (most common object) |
| 9. none | general refererence (an indefinite pronoun) |

FIG. 15B

| CONCRETE NOUN WORD SENSE NUMBER FORMAT: |
|---|
| Word Sense Identification Number:<br><br>Number identifying the related word sense numbers with a:<br>Class Number;<br>Class Member Number; |
| Type Number:<br><br>Number identifying a categorization of the word sense number; |
| Specificity Number:<br><br>Zero - General instance:<br>Even (≠ 0) - Specific known instance's number;<br>Odd - Specific unknown instance's number, or general reference version's number; |
| Experience Number:<br><br>Zero - Selects typical state and property values for the representation of the word sense number;<br>≠ Zero - Selects specific experience for the representation of the word sense number; |

FIG. 17A

| MEMORY 90 CONCRETE NOUN ENTRY FORMAT: |
|---|
| Word Sense Number of Entry; |
| Set of States and Properties with their:<br>Word sense numbers and their addresses in Memory 80;<br>Values or value ranges;<br>Pointers to associated C-descriptors, S-descriptors, and T-descriptors; |
| Partitioned Sets of Pointers to A-descriptors and T-descriptors; |
| Supertype Number; |
| Subtype Numbers; |

FIG. 17B

| EXTERNAL RELATION STRUCTURE GENERAL FORMATS: |
|---|
| MODIFIER INDEXED RELATIONS ENTRY FORMAT: |
| Word sense number(s) of a modifier;<br>A-, C-, S-, or T- descriptor;<br>Modifiee word sense entry or type number; |
| RELATION INDEXED FUNCTION A-RELATION ENTRY FORMAT: |
| Word sense number of verb in the function A-relation;<br>A-descriptor;<br>Modifiee word sense entry or type number; |
| RELATION INDEXED NON-FUNCTION RELATION ENTRY FORMAT: |
| A-. C-, S-, or T- descriptor;<br>Modifiee word sense entry or type number; |

FIG. 17C

| DIRECT CATEGORY FORMAT: |
|---|
| List of:<br>Concrete noun word sense numbers,<br>State abstract noun word sense numbers,<br>Clausal abstract noun word sense numbers,<br>Clausal abstract noun direct category pointer, and/or<br>Clausal abstract noun indirect category pointer; |

FIG. 18A

| INDIRECT CATEGORY FORMAT: |
| --- |
| List of descriptors:<br><br>a) Each descriptor contains one or more adjective or state abstract noun word sense numbers with owners;<br>b) Each adjective word sense identifying number contains a state number and a value;<br>c) Each value is a typical value, a specific value, or a value range;<br>d) A descriptor may have a concrete noun or abstract noun word sense identifying number; |

FIG. 18B

| VERB WORD SENSE NUMBER FORMAT: |
|---|
| <u>Word Sense Identification Number:</u><br>Number identifying the related word sense numbers with a:<br>Verb Class Number;<br>Verb Class Member Number;<br>Sentence Role Identification Numbers:<br>Sentence Role Class Number;<br>Sentence Role Class Member Number (optional); |
| <u>Type Number:</u><br>Number identifying a categorization of the word sense number; |
| <u>Specificity Number:</u><br>Zero - General process;<br>Even (≠ 0) - Specific known process path;<br>Odd - Specific unknown process path nearest to the preceding specificity number; |
| <u>Experience Number:</u><br>Zero - Typical process for the associated type and specificity number;<br>≠ Zero - Specific process for the associated type and specificity number; |

FIG. 19A

| AFFECTED ELEMENTS | EFFECT | RESULT TYPE | PURPOSE POINTER | COMMON ADVERBIAL POINTER | TYPICAL PROCESS | PROCESS SELECTING ADVERBIALS |
|---|---|---|---|---|---|---|
| Subject, indirect object, direct object, instrument, etc., or context element | One or more states and associated value set for the corresponding affected sentence role | A value of: STATIVE, EVENTIVE, and/or HABITIVE | Pointer to purposes associated with word senses in Memory 130 | Pointer to table of adverbial subclasses shared with other verbs in Memory 100 | Most common process implied by the verb word word sense number | List of adverbials stored in 100 for the verb word sense which have a subclass value that selects process(es) of the verb word sense; each adverbial has an associated type number(s) |

FIG. 19B

| AMOMALY COMPONENT:<br><br>APPLICATION PATTERN FOR EACH VERB WORD SENSE NUMBER: |
| --- |
| Contains allowed sentence patterns for the word sense number;<br>Sentence patterns include:<br>Transitive, ditransitive, intransitive, passive<br>instrumental, A-relation sentence roles,<br>idiomatic word sense number type,<br>special usage sentence role and type,<br>clausal abstract noun modifiable sentence<br>roles, etc; |

FIG. 19C

| SENTENCE ROLE | REQUIREMENT DESCRIPTOR | A-RELATION SET |
|---|---|---|
| Subject, indirect object, direct object, etc. | A word sense descriptor composed of 1 or more word sense ID numbers, each with a range of allowed type numbers, and/or 1 or more terms of states and/or properties, each state and property has an associated value or value range; the descriptor may be enumerated or represented with an address of an enumeration in a table; | Set of A-Relations which the sentence role can belong to |

FIG. 19D

| ENTRY NUMBER | SEMANTIC ROLE | SOURCE REQUIREMENT | VALUE DESCRIPTORS |
|---|---|---|---|
| Local entry number | Specific role of the adverbial | 1 or more states, properties, parameters, of functions which the adverbial must satisfy | Each descriptor contains: a required value range; a process application vector for each corresponding value range; an optional value range translation function; an optional pointer to purposes related to a value range; |

FIG. 19E

| ENTRY NUMBER | JOINT/SEPARATE POINTER | MAIN SENTENCE ROLE PAIRS | ADVERBIAL SUBCLASS TRIPLETS | PROCESS POINTER |
|---|---|---|---|---|
| Type #, zero Specificity # and Experience #'s | Pointer to joint/separate criteria | Main sentence role and associated entity requirement pairs | Adverbial subclass pointer, subclass value or value range, and requirement number triplets | Pointer to process entry in Memory 130 |
| Type #, Specificity #, zero Experience # | | Main sentence role and associated typical entity for Specificity # pairs | Adverbial subclass pointer, typical subclass value for the Specificity #, and requirement number triplets | Pointer to process entry in Memory 130 |
| Type #, Specificity #, Experience # | | Main sentence role and associated experienced entity pair | Adverbial subclass pointer, experienced subclass value, and requirement number triplets | Pointer to process entry in Memory 130 |

FIG. 19F

| |
|---|
| - Sentence Role (e.g., subject, indirect object, direct object) |
| - Constant Type (@JOINT, @SEPARATE, @INDETERMINATE |
| - Adverbial and/or sentence role criteria for selecting a joint or separate clause |

FIG. 19G

| |
|---|
| STATE ABSTRACT NOUN OR<br>ADJECTIVE WORD SENSE NUMBER FORMAT: |
| <u>Word Sense Identification Number Components:</u><br><br>State number composed of:<br>Class number, Member number;<br>Owner word sense identification number;<br>Value or value range; |
| <u>Owner Word Sense Number:</u><br><br>General to specific noun word sense number; |

FIG. 20A

| TYPE | WORD SENSE NUMBER | VERB SETTING STATE | ADVERBIAL SUBCLASSES | PURPOSE POINTER |
|---|---|---|---|---|
| A | Identification number, most general owner word sense number | Set of verb word sense numbers setting the entry's state value | List and/or pointer to set of adjective adverbial subclasses | Pointer to related purposes |
| B | Same identification number, more specific owner word sense number of TYPE A entry | | | Pointer to related purposes |

FIG. 20B

WORD SENSE IDENTIFICATION NUMBER,

MOST GENERAL OWNER STORED WITH IDENTIFICATION NUMBER

FIG. 20C

| PURPOSE ADDRESS FORMAT: |
| --- |
| <u>Purpose Identification Number:</u><br>Location of related purpose node table;<br>Function number; |
| <u>Path Type Number;</u> |
| <u>Path Specificity Number;</u> |
| <u>Path Experience Number Set;</u> |

FIG. 21A

| PURPOSE NODE ENTRY FORMAT: | | |
|---|---|---|
| OWNER'S WORD SENSE NUMBER | PURPOSE ADDRESS FUNCTION INDEX AND INTRA-FUNCTION RELATIVE FREQUENCIES | VERB WORD SENSE NUMBER OWNER'S CLAUSE CONSTITUENT INITIAL STATES |
| State adjective, abstract noun or verb word sense number related to the purposes of the entry; | Purpose address with pointer to the purpose realization entry in 110 or 130 and with a next memory link entry number;<br>partitioned by function types;<br>for each function type, each pointer has a relative frequency for its occurrence within a function; | The initial state value or value range for a non-typical state value of a clause constituent; |

FIG. 21B

PURPOSE REALIZATION ENTRY FORMAT:

| PURPOSE NODE ENTRY ADDRESS(ES) | PROCESS APPLICATION VECTOR or NUMBER | CONSEQUENCE PURPOSE ADDRESS | MOTIVATION PURPOSE ADDRESS | OTHER ADDRESSES | ENTRY'S MEMORY LOCATION |
|---|---|---|---|---|---|
| Entry(s) of the owning purpose node address(es) plus optional path specificity vector(s); | Process application vector for purpose addresses with multiple possible processes or a process number otherwise; | Purpose or purpose tree of consequences related to the owner clause and this purpose realization | Motivation purpose or purpose of owner clause related to this purpose realization; | Addresses to purposes or purpose trees of the owner clause related to this realization such as: advantages, disadvantages, comments, alternatives, qualities, etc.; and addresses to related state representations; | Location in Memory 150 for entry's purpose realization with the owner clause |

FIG. 21C

| MEMORY 150 ENTRY FORMAT: | | | | | | | |
|---|---|---|---|---|---|---|---|
| PURPOSE REALIZATION ENTRY ADDRESS | LINK TYPES | LEVEL NUMBER AND ORDER TYPE | PRECEDING LINK ENTRY ADDRESS(ES) | CONCURRENT LINK ENTRY ADDRESS(ES) | SUCCEEDING LINK ENTRY ADDRESS(ES) | RELATIVE FREQUENCY OF SEQUENTIALLY RELATED LINK ENTRIES | CONCURRENT ENTRIES SYNCHRONIZATION TYPE |
| Owning purpose's 110 or 130 purpose realization entry address; | # of preceding link entry addresses, # of concurrent link entry addresses, # of succeeding link entry addresses; | Number of entries between the word sense number and the start of the purpose; order type: SET, VARIABLE; | Location(s) of preceding entries in 150 of this entry including its specific address; | Location(s) of concurrent entries in 150 of this entry and access conditions; | Location(s) of succeeding entries in 150 of this entry and access conditions; | Relative frequency of a succeeding link entry relative to all its alternative succeeding link entries; | NULL - No synchronization; Number - Time units to start of concurrent clause; Range - Synchronized within lower limit to upper limit; negative limit implies number of preceding units; positive limit implies number of succeeding units; |

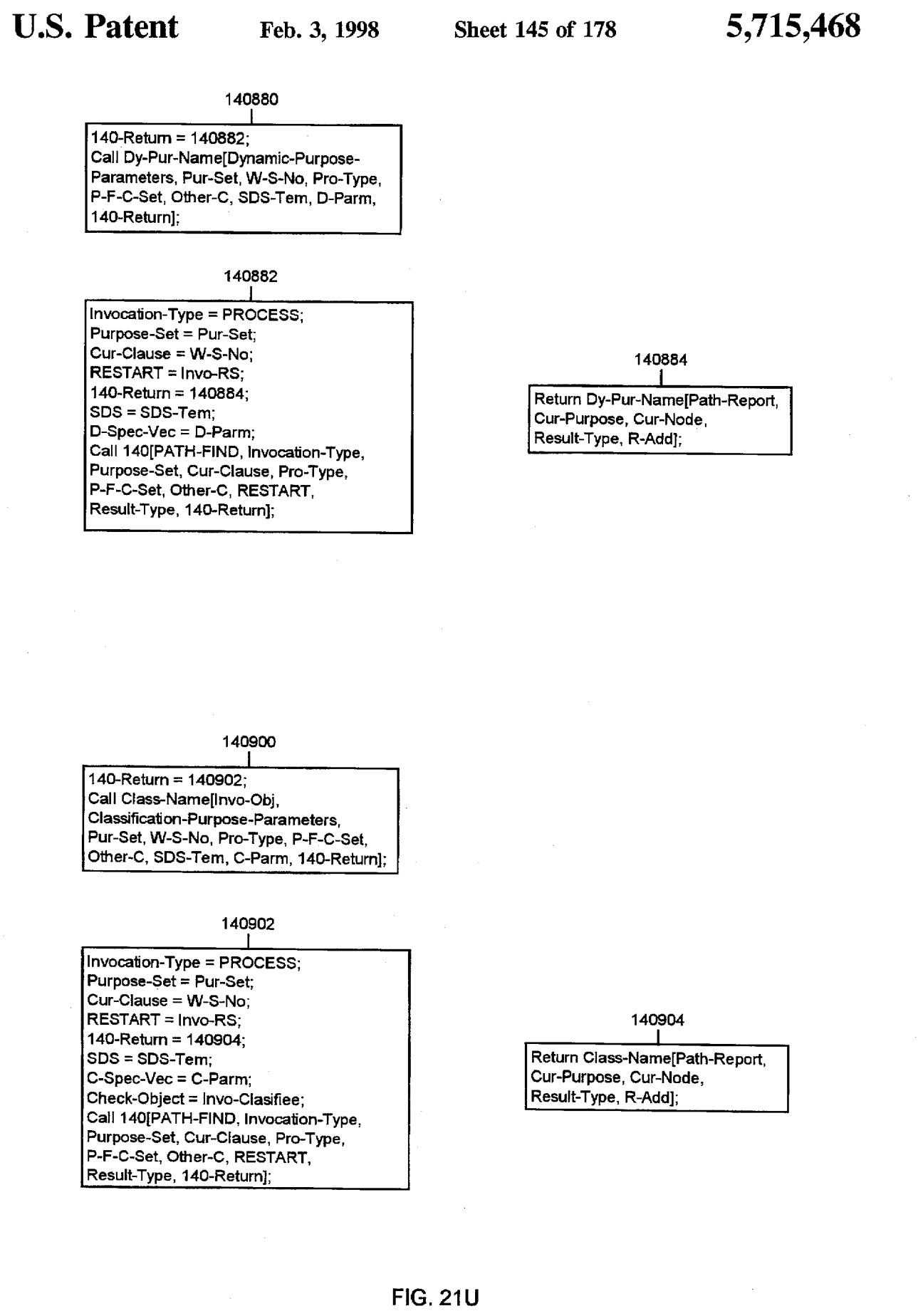

140-Return = 140882;
Call Dy-Pur-Name[Dynamic-Purpose-Parameters, Pur-Set, W-S-No, Pro-Type, P-F-C-Set, Other-C, SDS-Tem, D-Parm, 140-Return];

140882

Invocation-Type = PROCESS;
Purpose-Set = Pur-Set;
Cur-Clause = W-S-No;
RESTART = Invo-RS;
140-Return = 140884;
SDS = SDS-Tem;
D-Spec-Vec = D-Parm;
Call 140[PATH-FIND, Invocation-Type, Purpose-Set, Cur-Clause, Pro-Type, P-F-C-Set, Other-C, RESTART, Result-Type, 140-Return];

140884

Return Dy-Pur-Name[Path-Report, Cur-Purpose, Cur-Node, Result-Type, R-Add];

140900

140-Return = 140902;
Call Class-Name[Invo-Obj, Classification-Purpose-Parameters, Pur-Set, W-S-No, Pro-Type, P-F-C-Set, Other-C, SDS-Tem, C-Parm, 140-Return];

140902

Invocation-Type = PROCESS;
Purpose-Set = Pur-Set;
Cur-Clause = W-S-No;
RESTART = Invo-RS;
140-Return = 140904;
SDS = SDS-Tem;
C-Spec-Vec = C-Parm;
Check-Object = Invo-Clasifiee;
Call 140[PATH-FIND, Invocation-Type, Purpose-Set, Cur-Clause, Pro-Type, P-F-C-Set, Other-C, RESTART, Result-Type, 140-Return];

140904

Return Class-Name[Path-Report, Cur-Purpose, Cur-Node, Result-Type, R-Add];

FIG. 21U

MEMORY SYSTEM FOR STORING AND RETRIEVING EXPERIENCE AND KNOWLEDGE WITH NATURAL LANGUAGE

BACKGROUND OF THE INVENTION

The present invention is a system for natural language understanding which includes: a grammar processing method and a semantic processing method which converts natural language into previously stored experience and knowledge, natural language understanding based upon the previously stored experience and knowledge, a storage structure for storing experience and knowledge in a form which is convertible to and from natural language, and a method to add experience and knowledge from natural language input including problem solving.

The following references to prior art are made:

1. Bates, M. 1978. "The Theory and Practice of Augmented Transition Network Grammars", L. Bolc (ed), NATURAL LANGUAGE COMMUNICATION WITH COMPUTERS. New York: Springer
2. Cook, W. 1979. CASE GRAMMAR: DEVELOPMENT OF THE MATRIX MODEL. Washington D.C.: Georgetown University Press
3. Dyer, M. 1983. IN-DEPTH UNDERSTANDING. Cambridge, Mass.: MIT Press
4. Earley, J. 1970. "An Efficient Context-Free Parsing Algorithm". COMMUNICATIONS OF THE ACM, Vol. 13, pp. 94–102.
5. Fillmore, C. 1968. "The Case for Case", in Bach, E., and Harms, R. (Eds), UNIVERSALS IN LINGUISTIC THEORY. New York: Holt, Rinehart, and Winston.
6. Guha, R. V., and Lenat, D. B. 1990. "Cyc: A Mid-Term Report". AI Magazine, Vol. 11, No. 3, pp. 32–59.
7. Hendrix, G. G., Sacerdoti, E. D., Sagalowicz, D., and Slocum, J. 1978. "Developing a Natural Language Interface to Complex Data". ACM TRANSACTIONS ON DATABASE SYSTEMS Vol. 3, pp. 105–147.
8. Hirst, G. 1987. SEMANTIC INTERPRETATION AND RESOLUTION 0F AMBIGUITY. Cambridge, England: Cambridge University Press.
9. Hutchins, S. 1991. "System and Method for Natural Language Parsing by Initiating Processing Prior to Entry of Complete Sentences", U.S. Pat. No. 4,994,966.
10. Lebowitz, M. 1988. "The Use of Memory in Text Processing". COMMUNICATIONS OF THE ACM, Vol. 31, pp. 1483–1502.
11. Kolodner, J. 1984. RETRIEVAL AND ORGANIZATIONAL STRATEGIES IN CONCEPT MEMORY. Hillsdale, N.J.: Lawrence Earlbaum
12. Kolodner, J. 1988. "Retrieving Events from a Case Memory: A Parallel Implementation". Proceedings of the DARPA Workshop on Case-Based Reasoning, pp. 233–249. San Mateo, Calif.: Morgan Kaufmann.
13. Loatman, R., Post, D., Yang, C., and Hermansen, J. 1990. "Natural Language Understanding System", U.S. Pat. No. 4,914,590.
14. Madron, T., "Extracting Words form Natural Language Text", AI EXPERT, Vol. 4, No. 4, pp. 30–35.
15. Quirk, R., Greenbaum, S., Leech, G., and Svartvik, J. 1985. A COMPREHENSIVE GRAMMAR OF THE ENGLISH LANGUAGE. New York:Longman.
16. Sager, N. 1981. NATURAL LANGUAGE INFORMATION PROCESSING: A COMPUTER GRAMMAR OF ENGLISH AND ITS APPLICATIONS. Reading, Mass.: Addison-Wesley.

17. Schank, R., and Abelson, R. 1977. SCRIPTS, PLANS, GOALS, AND UNDERSTANDING. Hillsdale, N.J.: Lawrence Earlbaum
18. Schank, R., and Riesbeck, C. (ed), 1981. INSIDE COMPUTER UNDERSTANDING: FIVE PROGRAMS PLUS FIVE MINIATURES. Hillsdale, N.J.: Lawrence Earlbaum
19. Schank, R. 1982. DYNAMIC MEMORY: A THEORY OF LEARNING IN COMPUTERS AND PEOPLE. Cambridge, England: Cambridge University Press.
20. Slade, S., 1991. "Case-Based Reasoning: A Research Paradigm", AI MAGAZINE, (American Association of Artificial Intelligence) Vol. 12, No. 1, pp. 42–55.
21. Wilks, V., Huang, X., Fass. D., 1985. "Syntax, Preference, and Right Attachment", Proceedings of the Ninth IJCAI.
22. Winograd, T. 1983. LANGUAGE AS A COGNITIVE PROCESS. VOL. 1: SYNTAX. Reading, Mass.: Addison-Wesley.
23. Woods, W. 1970. "Transition Network Grammars for Natural Language Analysis". COMMUNICATIONS OF THE ACM, Vol. 13, No. 10, pp. 591–606.

Previous work utilizing natural language processing has been in a few application areas: data base interfaces, translation, and understanding. The data base interfaces and translation work are similar in that the natural language input serves as a selector of an alternate representation. The natural language understanding work has been to classify natural language input sentences into possible defined categories for limited domains of categorization without any processing to determine if the categorization is consistent with natural language input sentences of the conversation. Other natural language processing work has expanded the limited categorization to fill in certain types of unstated information in a conversation for a limited situation and has included the capability of limited question answering about a conversation which has been categorized by this natural language processing. Still other natural language understanding work has stored and retrieved representations of specific natural language sentences, but this work lacks the capability of combining multiple natural language sentences into a representation of experience and knowledge.

The following describes the main references from the prior art. Discussion of various syntax processing methods is thoroughly described in Bates 1978, Sager 1981, Winograd 1983, and Hutchins 1991. Hutchins describes an efficient parser for detecting grammatical errors in natural language text. However, none of these parser descriptions utilize a grammar specification for both parsing incoming natural language and for forming natural language output. Quirk et al 1985 provide a thorough description of English grammar especially including the function of certain words such as pronouns, prepositions, conjunctions, interjections and other function words, prefixes and suffixes. Quirk et al also provides a detailed description of ellipsis, tense with related aspects, and clause formation and placement. However, this grammar description does not include a method for representing natural language nor does it include a method for selecting word senses of natural language words. Case frames are described in Fillmore 1968 and refined in Cook 1979. A method and apparatus for understanding natural language in the sense of selecting case frames which represent natural language text is disclosed in Loatman et al 1990. Case frames are a coarse categorization of natural language. Case frames lack the capability to represent the knowledge and experience implied from natural language in that case frames: have no representation for the implications of a case frame, have no representation for a process to realize the case frame, and have no capability to determine if the selected case frame is consistent with other case frames from the same natural language conversation. A limited representation of natural language is described in Schank 1977 and 1982. An instantiation of this representation is used to understand stories in terms of this limited representation, to match limited types of general experience, and answer limited questions about the understood story in Dyer 1983. A type of memory organization for storing and retrieving specific experience gained from understanding natural language using a type of Schank's limited natural language representation is described in Kolodner 1984. Guha et al describes a memory system which stores knowledge in a two level data structure which are redundant. Each data structure is related to first order predicate calculus. This memory system heavily relies upon axioms which complicates the accessing of experience and knowledge related to a natural language conversation. Another complication is that this memory system utilizes natural language processing for a translation of natural language input to access the data structure related to first order predicate calculus. This memory system is not specifically designed for selecting word senses of natural language words.

This invention builds on the previous natural language understanding work and significantly expands the capabilities of the previous work. One expansion is to upgrade parsers: to efficiently handle ellipsis grammar and coordination grammar for understanding natural language; and to efficiently handle both parsing of incoming natural language and generation of outgoing natural language with the same syntax grammar data structures. Another expansion is to represent function words as functions. Function words include: certain adjectives, certain adverbs, pronouns, prepositions, and conjunctions. Function words have a wide range of processes which represent them. These processes define the function words, and are described in more detail in this section, and in the greatest detail in the preferred embodiment of this invention. Another expansion is to process morphological words, words with prefixes or suffixes, i.e., affixes. A Morphological word is processed into the phrase or clause or word senses and functions which represents the morphological word. Another expansion is to perform ellipsis processing to replace ellipted words, i.e., left out words, and then to perform processing which determines if the replaced words are consistent with the context of the conversation and stored experience and knowledge. Morphological words and ellipsis can be selectively utilized for text generated for outgoing communication from the invention.

Another expansion is to represent all non-function words with a meaning in terms of states and their values. An additional expansion is to assign the meaning of such words a word sense number. A word sense number is analogous to an address to a dictionary definition. However, the definition associated with a word sense number is in a form which allows: selecting a consistent and plausible definition, and hence its associated word sense number, from natural language; storing all that is known for the definition and all that is known to be related to the definition by realizing the definition with a state representation which is in terms of states, their values, and/or their relations; and structuring the definition and its associated word sense number for accessing the range of generality of what is known for the definition and of what is known to be related to the definition.

Another expansion is to combine the state representation of a natural language input, purposes, and the context of the conversation or the context of the situation into a three dimensional address which selects stored experience or knowledge in a memory of knowledge and experience. A purpose includes all related experience or knowledge such as: information content (information about an experience such as advantages), an activity (a set of actions), a plan, an intention, a causal path (a set of experiences related by cause), a result path (a set of actions related by accomplishing a result), or a goal. In general, a purpose has a purpose relation which is any concept which labels one clause or more than one related clause. The knowledge and experience in this memory are composed of data which represent natural language words, phrases, clauses, and groups of clauses. Each dimension can be assigned between a general value (unassigned) to a specific value (completely assigned). This range of dimension values selects experience or knowledge in a range of all that is stored for unspecified dimensions to all that meets a partial specification up to a specific experience or knowledge for a completely assigned specification. This range of specificness allows for natural language input to be understood in terms of previously stored experience and knowledge, and this further allows the natural language input to be then assigned a measure of plausibility and expectedness based upon previously stored experience and knowledge. Hence, an interpretation of a natural language input can be judged and reinterpreted when plausibility or expectedness criteria are not met. A particular application of the invention may make every plausible interpretation of a natural language input, and then the application can select the most plausible for example. Also, the accessing of experience and knowledge provides the capability to determine when new experience or knowledge is presented to the invention. This capability provides the first step in acquiring and understanding new experience and knowledge. Another aspect of the accessing of experience and knowledge is that when the invention encounters ambiguity or contradiction, the invention can generate a clarifying question for output. An application can also utilize the stored experience and knowledge related to its application to select a communication for output to incoming natural language statements to achieve the goals of the application. In general, an application can generate a communication for output.

SUMMARY OF THE INVENTION

An improved method and apparatus for understanding natural language in terms of stored experience is disclosed. This aspect of the invention is implemented with a syntactic method, followed by a phrase and clause state representation method, a purpose identification method, and an experience or knowledge retrieval method, a plausibility and expectedness check method, a context update method, and application specific processes including: further accesses of state representation memory and knowledge and experience memory, evaluation of application specific processes, and/or generation of outgoing natural language. The architecture of the memory system invention is summarized in FIG. 1.

The syntactic method includes steps of word isolation, dictionary look-up, function word processing, morphological processing, pattern recognition parsing, and ellipsis processing. The syntactic method is performed in a Natural Language Interface Processor 10 which is summarized in FIG. 2. Each natural language has its own natural language interface processor. Multiple natural languages can be processed to access a common state representation and a common experience and knowledge memory in one instance of the invention or in separate instances of the invention. An electronic form of text is input to the Text In Port 11 and is first processed by the Word Isolation Step 12 which identifies numerics, words, punctuation, and base words with inflections (e.g., a verb with the "ed" inflection) or affixes. The Dictionary 20 stores words, and idioms which each have associated syntax wordsets and associated state representation addresses or function implementation addresses, and any grammar anomalies. Dictionary Look-Up Step 14 looks up the syntax wordsets which each input word belongs to and passes this information to the Parsing Step 16. Parsing Step 16 utilizes Memory 30 which contains syntax trees. These syntax trees are searched to identify the syntax usage of the Text In 11 words using syntax wordsets. The output of the Parsing Step 16 includes: phrases which include identifications of: function words, state representation words, modifiers, modifiees; the sentence role of phrase heads; and ellipsis identification. The syntax usage of each word is sent to the Dictionary Look-Up Step 18 which looks up addresses for state representation words and function word implementations.

The Function Word Processing Step 22 processes function words, affixes, and inflections including tense and related aspects. Function Word Processing Step 22 can select the function to be applied for single function words such as "a". Other function words cannot be processed until further processing of the input is performed such as "the". Still others can be partially processed. For example, pronouns are tentatively replaced with a type and a pointer to a list of referents of that type starting with the latest referent of that type with the same case as the pronoun in the clause. These addresses point to the data structure associated with each word. The functions of function words have a general range of results including: adjectives defining specificity and group aspects of their noun modifiees; multiple function word adjectives implying combinations of functions for their noun modifiers, adverbs selecting word sense numbers of verbs, modifying state values, and setting and selecting aspects of processes which realize verb result states; pronouns which represent words either already in the context of a conversation, or words which are about to be communicated in the conversation; prepositions which relate aspects of meaning words, and which in some cases imply clause relations among words such as for prepositional phrases modifying adjectives; and conjunctions which combine words in a sentence role, such as the subject, and other conjunctions which imply the possible relations which a clause has to another clause.

Another part of the Dictionary Step 18 is to identify words which require morphological processing. The Morphological Processing Step 24 includes: identification of the group of functions associated with a morphological word's base word, prefixes and suffixes; and the evaluation of one of these functions. Evaluation of the function results in a pointer to the address in the state representation data structure containing the base word plus affixes, or the function generates the state representation of the base word plus affixes as a phrase or clause. The generated phrase or clause contains representations of function words and state representation words. Words formed with a verb base (e.g., "surprisingly") often imply a clause for complete interpretation. The Ellipsis Processing Step 26 expands the ellipses identified in the Parsing Step 16 or the ellipsis related to morphological words. For example, general ellipsis has its source of text in the preceding natural language statements. Response ellipsis has its source of text determined by the response and the preceding sentence. Nonfinite verb (infinitive or participle) clauses can have ellipted elements. Nonfinite verb clauses with ellipsis are processed to replace the ellipted elements from specific sources in the sentence, the context, or state representation memory. Morphological state representations and ellipsis replacements for ellipted words are determined to be correct during subsequent state representation processing or purpose processing. If a clause is found to be inconsistent with respect to state representation or stored experience and knowledge, the morphological representation and/or ellipsis replacements are prime candidates for alternate representations or replacements.

The Adjective and State Abstract Noun Selector Method 50 operates in conjunction with the Concrete Noun State Representation Selector Method 60 to select the word sense number of adjectives modifying nouns. An adjective word sense number is composed of an identification number, a state value or value range, and an owner word sense number. The owner word sense number is typically a noun word sense number. The state representation of a state adjective is contained in Adjective and State Abstract Noun Representation Memory 80. A state representation entry in general contains the entry's associated word sense number, pointers to verbs which set the state value if any, adverbial subclasses, which are used to select adverbial functions and which are described below, and pointers to purposes related to the state adjective in Experience and Knowledge Memory 150. 50 selects adjective word sense numbers which are compatible with its modifiers including adverbials and non-adverbial prepositional phrase modifiers. 50 processes adjectives with adverbials which require delayed evaluation. 50 also stores state values and their relations to entities in the conversation in Context Memory 120.

The Concrete Noun State Representation Selector Method 60 for concrete nouns selects a word sense number for each noun in a clause. A word sense number of a concrete noun selects a state representation in Concrete Noun State Memory 90. The word sense number of a concrete noun contains a word sense identifying number, a type number, a specificity number, and an experience number. The identifying number selects the representation of the general reference of a concrete which is all stored instances of that noun. The type number selects a type of the concrete noun. For example, "food store" has the type of "store" selected by "food". The specificity number selects a partition of a type. For example, "Polish food store" has the specificness of the "food store" selected by "Polish". The experience number of a concrete noun selects a specific instance of the concrete noun. For example, "Polonia's Foods" is a specific instance of a (hypothetical) Polish food store. A zero type number, which implies a zero specificity and experience number, selects all types of the concrete noun. A zero specificity number, which implies a zero experience number, selects all specific types for a given type. A zero experience number selects all instances of a specific type of a concrete noun. A general concrete noun reference has zero type, specificity and experience numbers. A general concrete noun reference in a conversation is in general a composite of more specific references, called versions which comprise the possibly inconsistent descriptions of the general reference concrete noun in the conversation. A specific known reference has nonzero, type, specificity, and experience numbers. A specific unknown reference, i.e., a specific reference which is not specifically stored in Memory 90, has the type, specificity and experience number which best matches the specific unknown reference.

The state representation associated with a concrete noun word sense number is a set of states with a value or value range and a set of relations to other state representation words. Concrete noun state representations are stored in Concrete Noun State Representation Memory 90. A state and a value typically corresponds to a natural language adjective. Noun relations include relations to other nouns such as A-Relations, i.e., Associative relations which include: possessive, partitive, function, which are clausal relations, and group relations. Other noun relations include C-Relations, i.e. Comparison relations, S-Relations, i.e. State relations, and T-Relations, i.e. Transfer relations. A C-Relation is a comparison between a state value at the C-Relation to another state value. An S-Relation transfers a state value from a source, usually a modifier, to a destination, usually a modifiee. A T-Relation transfers multiple state values. An example of a T-Relation is a modifier which sets the type number of a noun modifiee. A-, S-, and T-Relations can be implied by direct modification of a noun by a noun, a morphological word modifying a noun, or a prepositional phrase modifying a noun. C-Relations are implied by function words indicating a comparison to another state representation word. A concrete noun's state representation in Memory 90 contains pointers to states in Memory 80, and pointers to descriptors of A-, C-, S-, and T-descriptors. These descriptors contain information which includes participants in the relation and values of relations. Relations can also have pointers to other relations including clauses.

The state representation of a concrete noun is organized hierarchically in order to help select the word sense number of a specific unknown noun or of a version of a general reference noun. The hierarchical organization is realized by associating state values and modifier relations with word sense numbers hierarchically. The state representation of a concrete noun contains pointers to super-types (i.e. parents) and subtypes (i.e. children). The state values which are common to most instances of a type or specificity number are only listed with the most general word sense number. For example, "basketball player" has "tall" associated with the zero specificity number state representation. However, if a specificity number has a different value for the "height" state, such as "grammar school basketball player", the appropriate state value is stored with the specificity number and zero experience number. Also, a specific instance, which has a non-zero experience number, has the "height" state value which is correct for the individual. Other types of modifiers are handled in the same manner as adjectives. The state representation data structures of this invention not only stores the state representation, but these structures also contain organizations or data which aids in selecting word sense numbers.

Selector 60 selects word sense numbers of concrete nouns. This method first determines if a reference is a re-reference to a concrete noun. A re-reference does not require further processing. A new reference which is a non-modifying sentence role is first processed by Selector 70, a method which selects verb word sense numbers. 70 selects word sense numbers for noun phrase heads which are subjects, and objects which are compatible with a word sense number of the verb. The possible word sense numbers of a noun phrase head are stored in Dictionary 20. These noun word sense numbers selected by 70 are the most general word sense numbers which are compatible with the verb word sense number. 70 also assigns a requirement set of states, conditions, and/or relations which the selected word sense number must not change because changing these requirements would invalidate the selected word sense numbers. The requirement set is another example of a data structure component which is utilized for word sense number selection. After the processing at 70, a noun phrase head is processed for its modifiers. Modifier word sense numbers are selected to maintain the word sense number requirements of the noun phrase head if possible. Modifier word sense number selection is complicated by the multiple possible modifiees of a modifier in noun phrases with more than one premodifier or more than one prepositional phrase. If a modifiee is not compatible with a modifier, an alternate modifiee is selected if possible. Another complication of noun phrase modifiers is that coordinated modifiers can imply multiple noun phrase heads as in "wood and aluminum bats". Another complication of noun phrase modifiers is that relations between nouns in certain cases are modified by adverbials. Also, the modifiers could be elliptical or morphological, in which case, the modifier may require alternate elliptical or morphological processing. 60 also sets the type of referent for a concrete noun. The type of referents are: specific known, specific unknown, specified general (represented by word sense numbers with version numbers), and unspecified general (zero type, specificity, and experience numbers). In addition to selecting the word sense numbers of the constituents of a noun phrase including prepositional phrase modifiers, 60 processes word sense number selection for: coordinated noun modifiers and noun phrase heads, noun and adjective subject complements, prepositional complements for adverbial and adjective modifiers, and non-morphological abstract nouns.

Abstract nouns which are a state of an owner, such as "health", are called state abstract nouns. The word sense number of a state abstract noun is a combination of a state adjective word sense number and a concrete noun word sense number. A state abstract noun word sense number has an identification number which includes a state value or value range and an owner word sense number, which are components of a state adjective word sense number. In addition, a state abstract noun word sense number contains a type number, a specificity number, and an experience number, components of a concrete noun. A state abstract noun has a data structure in Concrete Noun State Representation Memory 90 which is similar, but somewhat specialized, to a state abstract noun state representation. The main specialization for a state abstract noun is a pointer to a state representation data structure in Adjective and State Abstract Noun Representation Memory 80. State abstract nouns are selected by Selector 60 in conjunction with Selector 50. The word sense number of a state abstract noun is selected in a method which is similar to concrete nouns. Modifiers of state abstract nouns including function words and adjectives often times select the state value of the abstract noun's state or indicate ownership of the state. For example "good" modifying "health" sets a state value while "his" modifying "health" indicates ownership of the state.

Another type of abstract noun has a word sense number characterized by a clause such as "clue". This type of abstract noun is called a clausal abstract noun. Typically, the characterizing clause describes the criteria required by an instance of the corresponding abstract noun's state representation. For example, one characterizing clause for "clue" is: "Something that helps to solve a homework problem." A clausal abstract noun has a specialization of the state representation of a concrete noun in Concrete Noun State Representation Memory 90. The word sense number of a state abstract noun contains an identification number, a type number, a specificity number, and an experience number which are essentially the same as the equivalent in a concrete noun word sense number. The clausal abstract noun has a pointer in 90 to its representation in Clausal Abstract Noun and Clausal State Representation Memory 100. Another specialization for a clausal abstract noun is that 90 may contain pointers for certain modifiers of the clausal abstract noun that point to modifiees other than the clausal abstract noun. These other modifiees are usually in the characterizing clause. Clausal abstract noun state representations are selected by Concrete Noun Selector 60. A component of the word sense selection of a clausal abstract noun is to select some or all of the sentence role referents in the characterizing clauses. The state abstract noun referent, called the representational referent, is typically selected. A referent is found by utilizing categories of referents which are contained in group A-descriptors associated with the referent. A direct category contains word sense numbers which are matched with word sense numbers in Context Memory 120 to select a referent. An indirect category contains noun and adjective word sense numbers which are requirements to be met by a word sense number in 120 to select a referent. If no match from the context is found, a general referent is assumed for the unmatched sentence roles. Adjectives modifying such abstract nouns which did not have a stored modification in the state abstract noun's representation in Memory 90 are converted to adverbs by adding suffixes if possible by the Morphological Processing Step 24, and these generated adverbs are checked to determine if they modify the verb in the clause.

At this point in the Selector 50 and Selector 60 method, concrete nouns and their modifiers, and non-morphological abstract nouns have been replaced with pointers to their state representations which include all that is known about the state of the concrete nouns including state values just set by modifiers and state values already set before and stored in the context. Prior to the processing of concrete nouns and non-morphological state abstract nouns, non-state representation words and implied functions have been selected and evaluated except for certain functions which have delayed evaluation. Pronouns have also been tentatively replaced with a pointer to a referent in the context. Other function words have had their function selected and evaluated. Ellipted elements have been replaced. Morphological words have been processed. Nonfinite verb phrases and morphological words implying clauses have also been processed.

The next step is to perform the Clausal Abstract Noun and Clausal State Representation Selector 70 method. During the processing of concrete noun and non-morphological abstract noun phrases which are non-modifying sentence roles, i.e., main sentence roles, Selector 70 selected word sense numbers for such sentence roles, i.e., subjects, indirect objects, and direct objects. 70 also selected a word sense number for the verb which is compatible with the main sentence role nouns. The selection of these word sense numbers comprise the first phase of the verb word sense number selection. The first phase selection process is complicated by coordinated main sentence role constituents. One complication is that multiple verb word sense numbers may have to be selected because the multiple constituents imply multiple verb word sense numbers for a single verb, and thus imply multiple separate clauses. Another complication is that certain constituents actually are special usages such that such a constituent is not semantically intended to perform its sentence role. For example, "Mary and her baby went shopping." really means "Mary went shopping with her baby." In this example, the "baby" did not go "shopping", but instead the "baby" accompanied "Mary".

The verb word sense number selected in the first phase is only partially selected in the first phase. A verb word sense number contains an identification number which defines the verb word sense number, and includes partial to complete word sense identification numbers of main sentence roles. The verb identification number(s) are selected in the first phase. The verb word sense number also contains a type number, specificity number, and experience number. The type number selects a set of processes which are purposes which describe the realization of the verb's result state. A process or other type of purpose is said to realize process or purpose in the sense that the set of clauses associated with a process or purpose are added to the context which is the same as stating the clauses of the process or purpose. Stating clauses makes them real (assuming the clauses are true) with respect to the present invention. In general, a verb process is a set of clauses which accomplish the result states associated with a verb. The result state of a verb is a set of states and values associated with the affected sentence role element or other entity. The state representation of a verb is stored in Clausal Abstract Noun and Clause State Representation Memory 100 for a verb word sense number. FIG. 19*b* contains the process independent format for the data of a state representation and includes: the result states and values for each affected entity, pointers to the word sense number's pointers in Clausal Abstract Noun and Clause Purpose Memory 130, a pointer to shared adverbial data structures, a pointer to the typical process of the verb word sense number in Experience and Knowledge Memory 150, and a list of adverbial data structures which select processes of the verb word sense number. FIG. 19*d* contains the format for the requirements of main sentence roles to perform the typical process of the verb word sense number. FIG. 19*e* depicts the format for adverbial data structure elements which are specific to a verb word sense number. FIG. 19*e* contains the format for the state representation of a verb word sense number which includes the process type, specificity, and experience numbers. This format includes: specific requirements of main sentence roles beyond the typical process requirements to perform the process associated with a verb word sense number; joint/separate criteria for multiple constituent sentence roles; a list of adverbial data structure elements which are specific to the verb word sense number including adverbials which are required for the process to be performable; and a pointer to the process associated with the word sense number in Memory 130.

The phase 1 verb word sense number selection method creates requirements for all possible word sense numbers of a stated verb. In the processing of main sentence roles at Selector 60 for concrete nouns for sentence roles with coordinated constituents, it is possible that different constituents require different verb word sense numbers. The phase 2 verb word sense number selection method first determines which constituents must form separate clauses for different word sense numbers, and forms separate clauses as needed.

The phase 2 process also processes the stated adverbials modifying the verb in a clause under process. The function associated with an adverbial is selected by matching an adverbial subclass which is possible for a verb with a possible adverbial subclass associated with the adverbial. An adverbial modifying a verb can be a function word, a morphological word or a prepositional phrase in English for example. A clause can also grammatically act like an adverbial, but such a clause adverbial is processed as a clause. A verb's or other modifiee's adverbial subclass contains a semantic role, and source requirements for the adverbial modifier which includes a function, a general or verb specific set of parameters. An adverb's subclass contains a semantic role, a source requirement for the adverbial modifier, a destination requirement for the modifiee, and a function which realizes the effect of the adverbial upon the modifiee of the adverbial. A modifiee's adverbial subclass matches a modifying adverbial subclass if the semantic roles match and the source requirements and destination requirements are met. The range of semantic roles are broadly: time, space, process, modality, (point of) reference, purpose. Broadly, the function is to set some aspect of the verb's word sense number such as: setting semantic role parameters, selecting a word sense number of the verb, selecting or modifying an aspect of a process which achieves the verb's word sense number, modifying the resulting states of the verb's word sense number, and/or commenting about the verb's word sense number. Applying the function to the modifiee realizes the modifying effect of the adverbial upon the modifiee of the adverbial. An adverbial can possibly have more than one adverbial subclass which matches the verb's or other modifiee's adverbial subclasses. The most likely adverbial subclass of an adverbial is selected by ordering the adverbial subclasses in the most recently used first in the context order. The most likely adverbial was most recently stated in the conversation. Processing a prepositional phrase adverbial typically requires evaluation of noun prepositional complements at Selector 60. The 70 method also processes coordinated adverbials which may imply separate clauses. Clause adverbials are set up for purpose processing. The processing of adverbials modifying other parts of speech utilizes the adverbial selection method of 70.

The phase 2 verb word sense number selection method also optionally selects the possible processes of the verb word sense number. The possible processes are selected by matching additional requirements and checking for the status of required adverbials in the clause or in Context Memory 120. Such required adverbials may not be explicitly stated in the clause, but instead are contained in the context. Each process can have joint/separate criteria which is utilized to determine if a clause with multiple constituents joined with a conjunction implying joint sentence role membership actually requires separate clauses. For example, "and" can imply joint sentence role membership. Separate clauses could occur for example when a process requires the subjects to be at the same location, but actually the subjects are at different locations. Each possible process of a verb word sense number in a clause with such coordinated main sentence role constituents is set with a joint/separate status indicator.

The Selector 70 method also evaluates mood for verbs. Other processes of the 70 method include: coordinating the conversion of adjectives to adverbials, and determining the adverbial subclass including function evaluation for certain modifiers of clausal abstract nouns and certain modifiers of adjectives modified by non-adverbial prepositions; and determining the aspects of a source clause of a clausal T-Relation that are to be transferred to the destination clause of the clausal T-Relation. This Selector 70 method is for state setting verbs. Relation verbs such as "to be", "to have" (in the sense of "to possess") have the relation selected by Selector 60.

After the verb word sense number of a clause has been completely processed at 70, the next step is to perform the Purpose Identifier 140 method. This method utilizes the clausal state representation. This method attempts to find a purpose relation with the current clause and the clauses and states in the context of the conversation, and in this way performs discourse analysis. Associated with the state representation of a clause are the set of purposes which that clause can be related to. Each purpose has pointers to the preceding and succeeding clauses which are within or related to the purpose. A state and a value can also be related to a purpose. Thus, a clause with a relation setting verb can also be related to a purpose when such verbs indicate a state value relation. Also, stored noun relations can also have associated clauses with purposes. The associated clauses contain information for the relation. Thus, any clause can potentially have a purpose. A noun relation has an associated clause pointer to the clause stored in Concrete Noun State Representation Memory 90. A clause has a pointer to its purposes in Clausal Abstract Noun and Clause Purpose Memory 130. A state and a value or value range has a pointer to its purposes in Adjective and State Abstract Noun Purposes Memory 110. FIG. 21*b* contains the format for a purpose node entry. An entry contains the owner word sense number, i.e., adjective, abstract noun, or verb. The entry also contains the purposes associated with the word sense number. The purposes are organized by the type of purpose, i.e., the purpose's function such as consequence. Each purpose has a purpose address and a pointer to a purpose realization entry in Memories 110 or 130.

A purpose address, illustrated in FIG. 21*a*, contains an identifier and category information. The purpose's identifier contains a location component and a function component. The location component is the address of the purpose node table and entry number in Memories 110 or 130. The function component indicates the information or relation contained in the purpose. The purpose can contain a function descriptor purpose which can be a word, phrase, or one or more clauses. The function descriptor purpose describes the function at the level of detail appropriate for the application. The category information of a purpose includes a path type number, a path specificity number, and an experience number. A path type number is associated with all paths of the purpose realization in Memory 150 which end in a common leaf node. A path specificity number is associated with path that has at least one unique sub-path among the purpose addresses with a common path type number. An experience number is associated with a specific path in Memory 150.

A purpose node entry, as illustrated in FIG. 21*b*, have purpose addresses organized by function with an associated relative frequency for the purpose address in that function. Also, a purpose address in a purpose node entry has a pointer to a purpose realization entry, as depicted in FIG. 21*c*. A purpose realization entry has a data structure which stores the purpose node entries which own the purpose realization entry, i.e. purpose node entries which have pointers to the purpose realization entry. The purpose realization entry contains purpose addresses of purposes related to the purposes owning the purpose realization entry. These purposes are categorized by function including: processes which realize the owning purpose's clause, consequence purposes of the owning purpose, motivation purposes of the owning purpose, and other types of purposes specific to a particular purpose. The other purposes include: advantages, disadvantages, alternatives, qualities, etc. Finally a purpose realization entry has a pointer to the purpose realization entry's Experience and Knowledge Memory 150 entry which is illustrated in FIG. 21*d*. The Memory 150 entry contains: the address of its purpose realization entry address in Memory 110 or 130; Memory 150 addresses of preceding entries of the current entry and access conditions for each preceding entry which must be satisfied for the preceding entry to possibly precede the current entry; Memory 150 addresses of concurrent entries of the current entry and access conditions for each concurrent entry; Memory 150 addresses of succeeding entries of the current entry and access conditions for each succeeding entry; and information related to the preceding, concurrent, and succeeding Memory 150 addresses.

The entries in Memory 150 define a directed graph of nodes. A node has an associated purpose, and a node has an associated natural language clause. A path of a purpose in the directed graph has a set of nodes and associated clauses which describe the purpose associated with the nodes on the path. The clauses of a path is said to realize a purpose. The clauses in a path which realize a purpose have a common purpose relation. A purpose relation is any concept that labels one clause or more than one related clause. For example, a purpose for setting computer operating system parameters contains the clauses that describe the settings and how to set them. A clause in a conversation is related to stored experienced and knowledge by finding a purpose of the clause which is common to the purpose of one or more other stated or implied clauses in the conversation, and by finding a path of Memory 150 nodes which have satisfied access conditions with the values for satisfying conditions stored in Context Memory 120 from the natural language statements of the conversation. If a value or data for a condition is not stored in 120, the application of the invention determines if the condition with the missing value is satisfied according to the goals of the application. A purpose path can have a purpose address for a stored purpose realization, or a purpose path can have a new combination of clauses which realize a new purpose realization. To summarize, a clause has an associated purpose node entry. A purpose node entry has purpose addresses of the clause with associated addresses of a purpose realization entry for each purpose address. A purpose realization has related purpose addresses and a pointer to a Memory 150 entry which corresponds to a node of a directed graph. The nodes on a path in the directed graph and the nodes' associated natural language clauses realize a purpose through description of the purpose. A realized purpose is feasible, or assumed to be feasible, for the context of the conversation. Feasibility is assumed for hypothetical or predicted situations for example. Thus, an instantiation of a purpose can be determined by the states of a context or situation.

Clauses are represented by word sense numbers of verbs, adjectives, or abstract nouns in Experience and Knowledge Memory 150. Verb word sense numbers are directly convertible into natural language clauses. A characterizing clause associated with a clausal abstract noun is also directly convertible into a natural language clause. Clauses of adjectives are realized with the owner of the adjective as a subject with the adjective as a subject complement such as: "John is sick." State abstract nouns are expressed as the owner of the state abstract noun, a form of "to have" with a "to possess" word sense and the state abstract noun such as: "John has good health." Nouns and relations between nouns can have associated clauses which belong to purpose paths in Memory 150. Thus, all types of state representation words can have related experience and knowledge in Memory 150.

The REL-SELECT method of the Purpose Identifier 140 first searches for a match of the current clause's related purposes with a purpose established in the conversation. A purpose is established if it has two or more stated clauses on its purpose path, or if the purpose identifier function is stated. The purpose addresses in the purpose node of the current clause are checked for matching the established purposes in the conversation. After established purposes are checked for, purposes between the current clause and application dependent other clauses in the conversation are checked for. The method also invokes a classifying purpose, a special type of purpose stored in Memory 150 and described below, which determines a possible purpose relation of the current clause. Multiple classifying clauses can be invoked. Sometimes a related purpose is not found. A related purpose would not be found for a new purpose which is being added to the conversation for example. If the REL-SELECT method fails to select any purpose relation, the clause is set to a default description purpose.

A clause with a default description process is temporarily accepted as a correct interpretation. The Communication Manager determines when alternatives related to a default description purpose are to be performed depending upon the application and the status of the application. For example, in subsequent conversation, the clause with a default description purpose will either become related to the conversation or not. If this clause does not become related, this clause is assumed to be an aside, i.e. a clause which is not directly related to the conversation. If it becomes related to the conversation, this clause's purpose will also be determined through its relation to the conversation. Also, if no related and consistent purpose is found for a clause, one or more of several other alternatives can be performed for example depending upon the application and the status of the application: reinterpret the current clause by either looking for an alternate possible clause implying word sense number or by reinterpreting the sentence role with the lowest confidence level, wait for a situation dependent number of sentences for the anomaly of no known purpose to be explained and then failing to get an explanation—issue a clarifying question, accept the clause interpretation if the current clause meets expectedness and plausibility criteria in the context of the conversation and assume the current clause is a new topic or an aside (a clause unrelated to the conversation), assume the clause is related by random occurrence in time for certain situations, or immediately issue a clarifying question. The selection of the alternative depends upon the application and the status of the application.

If REL-SELECT finds a stored purpose relation or a stored purpose relation is designated between the current clause and other clauses of the conversation, a feasible purpose path is optionally searched for in Memory 150 by the PATH-FIND method of Purpose Identifier 140. PATH-FIND attempts to find a purpose path between the current clause and the other clause in the conversation of the stored purpose relation. An application of the invention may utilize more than one of the found purpose relations be processed for finding a path. The correct direction between the current clause's node and the other clause's node is selected. Nodes in that direction which have satisfied access conditions, and possibly satisfy application specific conditions, are kept in the search. The search continues until the other node is reached, or all possible paths have failed. In this case, another possible purpose found by REL-SELECT or another designated purpose relation is processed with the same method. The PATH-FIND retraces the search upon the failure of a node to satisfy its access conditions or other conditions. The PATH-FIND method searches for all feasible paths of a purpose concurrently. The concurrent search of multiple paths has the advantage of eliminating the need to determine which paths have been checked, and nodes which fail to satisfy access conditions can be used to prune other paths which include such a node in their paths.

The PATH-FIND method also searches for processes to realize a verb word sense number, and searches for paths which realize state value changes for states. PATH-FIND is further generalized to allow the stopping of its method upon the failure to satisfy a node's access conditions or other application dependent conditions. In this case the application can decide how to proceed. This stopping is useful for solving problems which are similar to previously solved problems which have been stored in Memory 150. Upon failure at a node under this situation, the application can attempt to determine how to proceed with the new problem so as to use part of the previously solved problems. This stopping is also useful for gathering which conditions have to be overcome for a proposed purpose path. If PATH-FIND fails to find a feasible path, the alternatives are similar to the options for the default purpose relation of REL-FIND.

The PURPOSE-MANAGER is another method of Purpose Identifier 140. The PURPOSE-MANAGER controls the activation of REL-SELECT and PATH-FIND for an application. The PURPOSE-MANAGER also activates Plausibility and Expectedness Checker 170 which is described below. Other tasks of the PURPOSE-MANAGER include: computing time relations of a clause to the conversation, processing the computation of a clause's modal which implies the truth value of the clause, interfacing with the application for determining the application's communication with respect to the current clause or with respect to the application, and generating a data structure which contains the knowledge and experience which is used to generate natural language for output such as the application's communications.

Classification purposes are a special stored type of purpose in Experience and Knowledge Memory 150. A classification purpose has paths in Memory 150 which are used to classify an object associated with a particular classification purpose. The first node of a classification purpose contains access conditions which are satisfied to reach the next node. Paths are traced for a classification purpose with PATH-FIND. PATH-FIND traces paths until all paths have no succeeding nodes or all paths have failed to meet access conditions. PATH-FIND utilizes another type of ending or failing node method for classification purposes which stores the failing or ending node without retrace. Each ending path has an associated classification component of the object. The classification components are combined to form the classification. For example a classification purpose which classifies the association of a purpose to a clause determines if the state representation of a clause and knowledge and experience related to the clause satisfy access conditions which determine if the clause can be associated with the function of the purpose. The utility of classification purposes for associating purposes is that they are a compact method for characterizing purposes compared to storing numerous paths of purposes obtained from experience. For example, the set of questions asked by a student seeking a tutorial can be varied in content and order. A classification purpose can determine what additional communications beyond answering a student's questions will help the student learn the knowledge. A general advantage of classification purposes over other decision methods is that classification purposes can be formed through natural language description through an application of the invention.

Dynamic Purposes are another special stored type of purpose in Experience and Knowledge Memory 150. A dynamic purpose has a set of purpose paths which are traced concurrently by satisfying access conditions as other types of purposes. Dynamic Purposes differ from other types of purposes in that certain ending nodes have associated processes which are executed when the node is accessed. An example of a possible dynamic purpose application is the process which would implement driving a car. There are various purpose activities such as: accelerating, braking, lane changing, turning, etc. A dynamic purpose for driving a car would trace paths as conditions change. When an ending node is reached, its associated process would be performed. Dynamic purposes can be used to control interactions during the execution of an application of the invention. Another use of dynamic purposes for the invention is to utilize dynamic purposes to select and apply sub-purposes which implement problem solving activities. Another use of dynamic purposes for the invention is to partially implement the Communication Manager 160 (CM). The CM initializes the invention for communication, handles errors or exceptions, and manages text output and other forms of outgoing communication. The CM controls communication from optional application processes of the invention including for example applications that: manage storage of experience and knowledge; control access to experience, knowledge and methods; have special purposes for answering/asking questions about meaning of words; store requests needing special authorization; and similar executive functions. The CM is partially implemented with dynamic purposes.

A plausibility and expectedness check method is performed by the Plausibility and Expectedness Checker 170 in conjunction with the storage or retrieval of experience or knowledge. Each time the state representation of a clause is accessed for the first time, the Plausibility and Expectedness Checker 170 is optionally activated by the PURPOSE-MANAGER. The plausibility check determines if the clause and purpose path linking it to the conversation is likely or not. The expectedness check determines if the clause and purpose path is stored in the invention's state representation memories, and experience and knowledge memory. Plausibility is measured by the benefits of the doer(s), i.e., the performer, of the clause and the benefits to the receiver(s), i.e., the owners, of the result states set by the clause. The benefits are estimated with stored knowledge and experience organized into a classification purpose. Other plausibility measures are specific to the application of the invention.

Expectedness is partially based upon the relative frequency stored from previous experience. The relative frequency is the number of times the interpreted clause has occurred divided by the number of times all alternative clauses including the interpreted clause have occurred. The alternative clauses represent the experience or knowledge which has previously been stored for the same context or the most similar context. The alternative clauses can have their relative frequencies calculated based upon experience, or the relative frequencies can be assigned permanently, or the assigned relative frequencies can be updated through experience. The expectedness of the constituents of the clause are also measured. The expectedness measure has a value range between expected and unexpected. A clause which has been previously stored, and which is consistent with the context of the conversation and previously stored experience or knowledge is expected. The unexpectedness measure of an access are the components of the clause and the components of the related purposes of the clause which have not been previously stored. A non-extreme expectedness value is calculated by measuring the number of matches for qualifying criteria which are applicable for the clause and for the purposes in knowledge and experience memory.

A criterion can contribute an equal value of expectedness or each criterion can have a specific value of expectedness. An overall combination of expectedness and plausibility is calculated utilizing equal or varying weights for each component of plausibility and expectedness. This combined value is then compared to a threshold value associated with an application. If the combined value exceeds the threshold, the interpretation is accepted. If the plausibility check falls below a threshold or the expectedness check fails, the checker communicates with the Communication Manager 160. Then depending upon the application, the Communication Manager activates dynamic purposes which select for example one or more of the following alternatives: selecting a sentence role to be reinterpreted and invoking the selector which interprets the sentence role; wait for a situation dependent number of sentences for the anomaly to be explained and then failing to get an explanation—issue a clarifying question; immediately issue a clarifying question. The selection of the alternative depends upon the application the status of the application.

The Context Memory Controller 125 method is performed upon the Context Memory 120 after a clause has been understood in terms of stored experience and knowledge. The Context Memory Controller 125 is invoked by the Communication Manager. The state representation of nouns in the clause are updated including relations to other nouns in the context and they are stored in Context Memory 120. This includes whether the noun is specific and is known or unknown or is general. Also, other lists are maintained by Controller 125 to aid in selecting a pronoun referent. The state representation of the clause including word sense numbers is also stored. The relation of the clause to the other clauses including the purpose path is stored. Associated with each clausal state representation is a descriptor which includes a stated or implied modal, and a source. Modals indicate the status of a clause and include adverbials and auxiliary verbs such as "can". The modal function is associated with the modal. The source values include: stated, implied, assumed, hypothesized, deduced, calculated, application specific, etc. Lists of sentence role participants are stored and associated with clauses. These lists are used in pronoun referent selection and purpose identification methods. Adverbial lists are maintained to aid adverbial subclass selection.

After a clause has been processed for state representation including word sense selection, processed for purpose relation and path selection, and processed for plausibility and expectedness, and had its context stored, the next step is to perform the storage or retrieval of experience or knowledge from the Experience and Knowledge Memory 150. The application, Purpose Identifier 140, or the Communication Manager 160 retrieve experience or knowledge from Memory 150. For example, after identifying a purpose of a just interpreted clause, if the application requires it, the Purpose Identifier 140 generates retrievals from Memory 150 of at least the state representation of the clauses on the path connecting the current clause to the conversation. These retrieval accesses are performed to ensure that inconsistencies, impossible state values, implausible clauses, implausible states, or unavailable entities are not required to relate the new clause to the conversation through the connecting path. The Purpose Identifier 140 can select the process to achieve the state change of state setting verbs or the selection of the process to achieve the relation between sentence roles for relation verbs depending upon the application and the status of the application. For example, an application which requires separating factual input from fallacious input can have this goal achieved by verifying that the understood clauses could at least be accomplished based upon stored experience and the context. Another application might require the process to meet some objective such as the quickest process. Such a requirement would mean all available processes be checked. Additional accesses could also be performed for applications which require that all possible state representations of a clause be considered. Under this requirement, all consistent combinations of main sentence role word sense numbers are selected. If more than one verb word sense number is found, additional accesses are required to find the interpretation which is best related to the conversation. Still further additional accesses may be needed when one or more purposes on an identified purpose path contradicts a statement in the conversation. Under this situation the Purpose Identifier 140 finds a new purpose path to replace the contradicted path. If none can be found, a clarifying question can be issued through the Communication Manager 160 for example.

Other additional accesses may be required depending upon the application and the content of the clause. For example, if the application is tutoring and the clause is an answer to an exercise, the additional retrievals would occur to determine if the student's answer is correct and acceptable with additional retrievals to diagnose an incorrect answer. If the answer is correct, additional retrievals would be made to perform the next operation of the tutoring. This example illustrates a different type of Memory 150 access: accessing 150 to select a communication for incoming natural language statements. An application can utilize any known technical method to select a communication including utilizing Memory 150. One utilization of 150 to select a communication is to store communication related purposes in a clauses purpose realization entry. A communication related purpose could be: a purpose that realizes a communication, a purpose with paths that describe the difference between incoming natural language statements and the goals of the application, a classification purpose which selects a communication, a classification purpose which classifies the type of communication, a dynamic purpose which invokes processes to generate a communication, etc. The application can then utilize the Purpose Identifier 140 method to select a communication or set up application specific methods that select a communication. It is possible that no communication would be selected. Also, a communication could be delayed until the end of a sentence, or the completion of a user input for example.

Once a communication has been selected by an application or by one or methods of the invention, the next step to be performed is to generate an output. This step is typically performed after all the steps of an application of the invention have been performed for an input including all additional accesses and method executions associated with an application beyond the understanding method. The output can be a natural language statement. Alternately, the output can be audible, symbolic or graphical for example, and an output is communicated through the Non-Textual Natural Language Interface 40. The symbolic or graphical output represents the equivalent of a natural language statement. The natural language output is formed by the application selecting clauses from the purpose path(s) for example. These purpose paths have been selected by the additional processing of the application. The application selected clauses are chosen to incorporate the level of detail and explanation which matches the application and status of the application.

The application must select the sentence role referents for the selected clauses of an output communication. Associated with each node of a purpose in Memory 150 is a representation of a state or clause which is associated with that purpose. The state representation of the clause on the selected purpose path is converted into natural language by instantiating the sentence roles with the corresponding entities from the Context Memory 120 and/or the sentence role referents associated with a clause and its associated purpose in Memory 80 or 100. The stored sentence role referents of clauses in Memory 150 would be utilized for example for such circumstances as: adding new generalized sentence roles to the conversation, bringing specific new references into the conversation, and/or recalling previous specific or generalized references related to the conversation or situation. Some sentence role referents are from the context in Memory 120 for sentence roles which are specific to the conversation or situation for example. The source of the referents is selected by the application to convey the desired information as determined by the application.

The Communication Manager 160 sends the clauses selected by the application to Text Generation Step 200. The method of converting a set of clauses into natural language utilizes the parsing data structure which is also utilized for parsing incoming natural language. Text Output Step 200 is a method of Natural Language Processor 10. The tense and related aspects of the verb are set by the application, application status, and/or output content. Function words are derived from or stored with the experience or knowledge to be output from Memories 80, 90, 100, 110, 120, 130 or 150. The first step of 200 is to utilize a classification process to select clauses which are to be combined into a sentence for clauses have certain purpose relations. Next the main sentence roles of a clause in the sentence are processed. A sentence role already in the context is processed for realization with ellipsis or a pronoun by a classification purpose. Some sentence roles are designated or required to be realized as morphological words.

The realization of nouns is particularly complicated because of the theoretically unlimited levels of modifiers modifying modifiers in a noun phrase and the restriction of the allowed realization types of modifiers modifying their modifiee. For example, certain modifier to modifiee relations require that the modifier be realized as a prepositional phrase. In order for a noun phrase to be realized as a single noun phrase, the modifiees between the prepositional phrase and the noun phrase head must also be realized as prepositional phrases. If such a modifiee can not be realized as a prepositional phrase, the noun phrase must be expressed as more than one noun phrase. Adverbials modifying verbs can be realized in general as function words, morphological words, or prepositional phrases. There are often multiple positions for placement of an adverbial modifying a verb phrase. Certain combinations of morphologically realized adverbials are not stylistically acceptable, and require either different realizations or different position placement if possible. Adverbials realized as prepositional phrases uses the noun phrase generation of Text Generation Step 200. Adjective phrases utilize both the adverbial generation method and noun phrase generation method of 200. The modifiers of nouns, verbs, and adjectives may require morphological processing. Coordinated phrases of main sentence role heads and coordinated modifiers are generated as needed. Ellipsis processing including coordination ellipsis and pronoun replacement is also applied to formed main sentence role phrases, formed clauses, and formed sentences. Finally, as phrases are generated, punctuation is added as required.

Text Generation 200 sends an electronic text form to the Text Out Port 28 which is connected to a computer system, a video display terminal, a computer program, other computer system apparatus, or electronic apparatus. If the output is to be audible, symbolic or graphical for example, the elements of the clause are translated into the form needed to generate the audio, symbol or graphic element by the Non-Textual Natural Language Interface 40. This translation is performed by looking up the output representation associated with a state or clause representation. Then the associated output function of the computer system such as a video display terminal or external computer program is activated with the output information associated with the output representation. Also, the output representation from Interface 40 can include any form of non-textual natural language equivalent generated from natural language text.

It is an object of this invention to provide a new and improved natural language syntax processing method for separating incoming natural language into each word's sentence role and for selecting the order of words for generating outgoing natural language text utilizing the same syntax data for both methods.

It is an object of this invention to provide a new and improved method for selecting the function and in some cases, the associated relation, of all natural language function words for a natural language.

It is an object of this invention to provide a new and improved method for processing a morphological word of a natural language into the state representation associated with the morphological word. This state representation includes function words, the word sense number of the base word, and the word sense number of other state representation words from the context or stored information.

It is an object of this invention to provide a new and improved method for replacing the ellipted words in a natural language statement with their intended replacement from the context or stored information.

It is an object of this invention to provide a new and improved memory system for storing the state representations of adjectives, concrete nouns, clausal abstract nouns, state abstract nouns, and verbs.

It is an object of this invention to provide a new and improved method for organizing and accessing the state representation of a word with a word sense number.

It is an object of this invention to provide a new and improved method for selecting the word sense numbers of concrete nouns, of state abstract nouns, of clausal abstract nouns, and of their state representation word modifiers which is consistent with the state representation of these nouns, with the state representation of their modifiers, with the relations between these words and their modifiers, and with the context of the conversation.

It is an object of this invention to provide a new and improved method for selecting the word sense numbers of state representation word adjectives and of their state representation word modifiers which is consistent with the state representation of these adjectives, with the state representation of their modifiers, with the relations between these words and their modifiers, and with the context of the conversation.

It is an object of this invention to provide a new and improved method for selecting the word sense numbers of state representation word verbs and of their state representation word modifiers which is consistent with the state representation of these verbs, with the state representation of their modifiers, with the relations between these words and their modifiers, with the word sense numbers of the other main sentence role word sense numbers, and with the context of the conversation.

In accordance with these and other objects, it is a further aspect of this invention to perform the selection of verb word sense numbers upon the clauses in a sentence with multiple clauses in an order which simplifies processing of a cataphoric pronoun, i.e., a referent stated in the future of the conversation. The clauses are processed in left to right order. A clause containing clauses in sentence roles is processed after the sentence role clauses are processed.

It is an object of this invention to provide a new and improved method for selecting the purpose relations of a clause which are related to the context of the conversation or situation containing the clause.

It is a further aspect of this invention to use conjunctions including adverbial conjunctions to simplify the selection of purpose relations of a clause by utilizing conjunctions. A conjunction relating clauses can select or limit the possible selections of the relationship of two clauses joined by a conjunction. Certain usages of clauses with ellipsis such as nonfinite verb clauses can also have limited purpose relations.

It is an object of this invention to provide a new and improved method for selecting the paths of clauses comprising experience and knowledge which connect a clause with the clauses in the context of the conversation or situation containing the clause.

It is a further object of this invention to generalize the selecting the paths of clauses to include: paths of clauses which are processes to realize the result state values of a clause, paths of clauses which are processes to realize the state value change of a state, a method to utilize classification purposes which classify an object by finding paths of clauses, a method to utilize dynamic processes which select a process or method by finding paths of clauses, and a method to utilize an application method to select a path continuation when one is missing.

It is an object of this invention to provide a new and improved method for organizing and accessing purpose relations with purpose addresses.

It is an object of this invention to store the context of the conversation in a memory system. This memory system contains the following information from the conversation: the word sense numbers of state representation words and certain related function word addresses, the word sense numbers or function address of their modifiers, purpose relations between clauses including timing and modality of the clauses, paths, a categorization of state representation words for selecting pronoun referents, and adverbial subclasses.

In accordance with these and other objects of this invention, it is a further object of this invention to provide a new and improved memory system for storing and retrieving experience and knowledge with the word sense number of the state representation of natural language clauses and with the paths which are related to the context of a conversation or situation. The accessing of this memory system is improved because it contains experience and knowledge which is compactly represented by word sense numbers. The memory system provides for a robust access by using a representation of natural language words which are relevant to an application in terms of states and/or functions represented by word sense numbers and function codes. This representation allows for an understanding of natural language input which is consistent with the context, and previous experience and knowledge. Also, this representation is not limited to a set of primitives. Instead, all experience and knowledge is represented at the level of detail at which it has been experienced. Further experience and knowledge can increase the level of detail of experience and knowledge, or further experience and knowledge can combine previously unrelated experience and knowledge in a generalization. Still further experience and knowledge can indicate conditions under which certain experience and knowledge is selected to be more applicable than other experience and knowledge.

It is another object of this invention to provide a new and improved method and apparatus for storing and retrieving experience and knowledge with an address with multiple dimensions and a flexible assignment of dimensional components. One dimension, the word sense number of the state representation of an natural language clause or a part thereof, can represent a specific, general, or partial instantiation. A specific instantiation represents one experience or knowledge unit. A general instantiation represents all experiences or knowledge units, A partial instantiation represents a subdivision of a general instantiation.

It is a further aspect of this invention to have a second dimension for storing or retrieving experience or knowledge which is related to purpose relations expressed or derived from a natural language conversation or a described situation. This second dimension is a purpose address. A purpose address contains an identifier and category information. The category information organizes purpose relations into: a general partition, i.e., all related purpose relations, a partition by designating certain requirements, i.e., purpose paths which have one or more unique subpaths, and a single purpose path, i.e., a purpose which represent one experience or knowledge unit, and thus have a single path.

It is a further aspect of this invention to have a third dimension for storing or retrieving experience or knowledge. This third dimension is the context of one or more related conversations or one or more situations. The context stores the location of the state representation of the conversation including word sense numbers, explicit, implied and assumed experience and knowledge and other information as described for the context storage object of this invention. The context is utilized for selecting the word sense numbers of the state representation, purpose relations, and purpose paths. When a context is not specified, as at the beginning of a conversation, context is built by the conversation, and the context is general. For a general context, all components utilized to make a selection are selected from related state representations and/or experience and knowledge in the most likely first order or by an application specific method. If the context has not been completely specified for a selection, the unspecified component is selected from related state representations and/or experience and knowledge in the most likely first order or by an application specific method. This selected, unspecified component is utilized for the selection. If the component is specified, the specified context components are utilized in the selection.

In accordance with these and other objects of this invention, a method is provided to store and retrieve all experience and knowledge which is expressible in natural language and which is selected for storage in the memory system of the invention by utilizing the specific/general/partial flexibility of assignment of values to the three dimensions.

It is still a further object of this invention to monitor the interpretation of incoming natural language for plausibility and expectedness. The goal of this monitoring is to ensure that the interpretation of a natural language clause is likely to be correct. The interpretation of incoming natural language is biased by ordering the components to be selected by a process to be the most likely first given the context, and secondarily the most likely first from experience and knowledge. If the plausibility or expectedness of an interpretation of a natural language input falls below a threshold, the interpretation can be checked for alternate interpretations. An alternate interpretation is tried to find the intended meaning of the statement, i.e., the most plausible and expected interpretation. However, a specific application of the invention can make all possible interpretations, reject the implausible interpretations, and select the most plausible interpretation as determined by the application for example.

It is still a further object of this invention to perform additional storage or retrieval of experience or knowledge to accomplish the objectives of an application implemented with the invention. These additional accesses could also be used to perform operations to accomplish the objectives of the invention. Such operations could include but are not limited to: finding experience or knowledge stored internally; finding experience or knowledge stored externally; communicating with external computer programs; solving problems; evaluating a situation; hypothesizing a situation; determining criteria for evaluating a situation; performing mathematical calculations including numerical, logical, symbolic, geometric, and/or probabilistic; performing simulations; performing calculations in association with an external computer program.

It is still a further object of this invention to make the storage or retrieval of knowledge or experience an interactive process initiated by the invention when certain situations occur during storage or retrieval. Such situations include: failure to address experience or knowledge; addressing experience or knowledge which contradicts the context or previously stored knowledge or experience, e.g., one or more states have two or more values at the same time, or purpose relations which are not consistent; addressing experience or knowledge with an unexpectedness or with a plausibility which falls below a threshold; receiving directives which are inappropriate, disadvantageous, and/or lead to inefficient or suboptimal situations. When such a situation occurs, the invention generates a clarifying question or other appropriate statement indicating the problematic situation. Such output of the invention is intended to ensure proper communication.

It is a further object of this invention to generate text such as for a communication selected by an application of the invention. This text can describe any stored experience or knowledge, or experience or knowledge provided by the application.

It is still a further object of this invention to provide in a communication which is a response to a question or assignment, experience or knowledge during output which is at a level which is adjusted for the receiver. The output content is adjusted in two dimensions. One dimension, the specificity dimension, is the level of detail and varies from general to specific. The other dimension of output content, the explanation dimension, is the degree of explanation and varies from no explanation up to all that is known about the output content. The specificity dimension is set to match the level of the question or assignment. The explanation dimension is set to a level which provides explanation from a typical level of experience or knowledge up to and including the answer or assignment experience or knowledge. The explanation level of experience or knowledge is adjusted according to one or more factors including: the level of the requested experience or knowledge; requests for greater or lesser explanation; the previous history of interacting with the requester; anticipation of potential pitfalls or problems.

It is a further aspect of this invention that the above objects may be performed in a different order because a different ordering is advantageous to an application. Also, backtracking to a previous step may be required when an inconsistency, implausibility or other possible interpretation error is detected.

It is still a further object of this invention to provide methods for teaching the invention experience and knowledge. One method is to directly fill in the storage structures of the invention. Another method is to express the experience or knowledge to be stored possibly with interactive communication with the invention. Another method is specific interfaces for being taught which include: finding the most similar situation to the one being taught; presenting an interface to indicate the experience and knowledge stored for the similar situation with aids to describe the new experience and knowledge in terms of the previously stored experience and knowledge.

If is a further object of the invention to provide learning by the invention with an application of the invention. A learning application can be accomplished directly by storing the text presented to the invention. Often times, such input is incomplete and requires filing in the details between input statements. The application of the invention can attempt to fill in the details with Purpose Identification Method 140. The details can also be filled in by first generalizing related examples, and then determining if the generalization provides a consistent explanation of the details between input statements. In this context "explanation" means a set of clauses which fills in the missing details. A learning application can also be accomplished with a generalized method specific to a storage structure of the invention which asks questions to obtain missing information generally stored in the associated storage structure. The questions and the type of questions are specific to the experience or knowledge to be learned.

In accordance with these and other objects, features and advantages, the invention provides methods and apparatus to take as input natural language text or an equivalent nontextual natural language representation and selects word sense numbers which have associated locations which contain the stored state representation and any stored experience and knowledge all of which either matches a specific occurrence or situation corresponding to the input or which matches the input with some degree of generalization of the input. An input clause is then understood in terms of previously stored knowledge and experience by finding paths in knowledge and experience memory to the locations established in the context of the conversation. Such paths include process paths which are performed to realize the state representation of an input. Such paths also include purpose paths which contain any stored information related to the input location and the context of the conversation and other related experience and knowledge. Such paths can include predictions of what can occur in the future of the situation of the conversation. This method thereby achieves an understanding of the input in terms of stored experience or knowledge. After achieving understanding, the next step depends upon the application of the invention and the situation within the application. Applications include: just-in-time training, tutoring, problem solving, collective memory (the combined experience and knowledge of a group on one or more subjects), exact text search possibly combined with inexact methods such as keyword search, a special purpose interface into a computer system, diagnosing malfunctions, etc. The general process for implementing an application of the invention is to understand an input, perform processing related to the input, generate a communication related to the input as needed, and/or generate apparatus controlling output as needed.

BRIEF DESCRIPTION OF THE DRAWINGS

These and other objects and advantages of the present invention will become apparent by referring to the following detailed description and the accompanying drawings.

FIGS. 3*a*–3*e* illustrate the formats for the data stored in Dictionary 20.

FIG. 6*a* illustrates the data format for pronoun referent selection processing.

FIGS. 7*a* and 7*b* illustrates the data format for function word adjective definitions.

FIG. 8*a* illustrates the noun preposition modifier data structure format.

FIG. 8*c* illustrates the adjective preposition modifier data structure format.

FIG. 9*a* illustrates the modifying adverbial subclass data structure format.

FIG. 10*b* illustrates the data format for the time of truth for verb tenses.

FIG. 11*a* illustrates the conjunction data structure format.

FIG. 12*a* illustrates the morphological data structure format for affixes.

FIGS. 15*a* and 15*b* list the conditions for applying and the associate sources of ellipsis replacements for nonfinite verb clause, verbless clause, and morphological word@ ellipsis.

FIGS. 18*a* and 18*b* illustrate the direct and indirect category data structure format respectively which is used for the selection of the referents of a clausal abstract noun.

FIGS. 19*a*–19*g* illustrate the word sense number format and the state representation data structure format for state setting verbs.

FIGS. 19*h*–19*bb* is a flow chart for the method that selects word sense numbers for state setting verbs and other methods related to the state representation of verbs.

FIGS. 20*a*–20*c* illustrate the word sense number format and the state representation data structure format for state adjectives and for state abstract nouns.

DESCRIPTION OF PREFERRED EMBODIMENT OF THE MEMORY SYSTEM INVENTION

The memory system of the invention is accessed with natural language through performing a syntactic processing method, a state and a clause representation (semantic) methods, a purpose identification (discourse) method, storage or retrieval of experience and knowledge related to the application addressed by the natural language input, a context update method, selection of communication for output, and text generation for output.

SYNTACTIC PROCESSING METHOD

Figure 2:
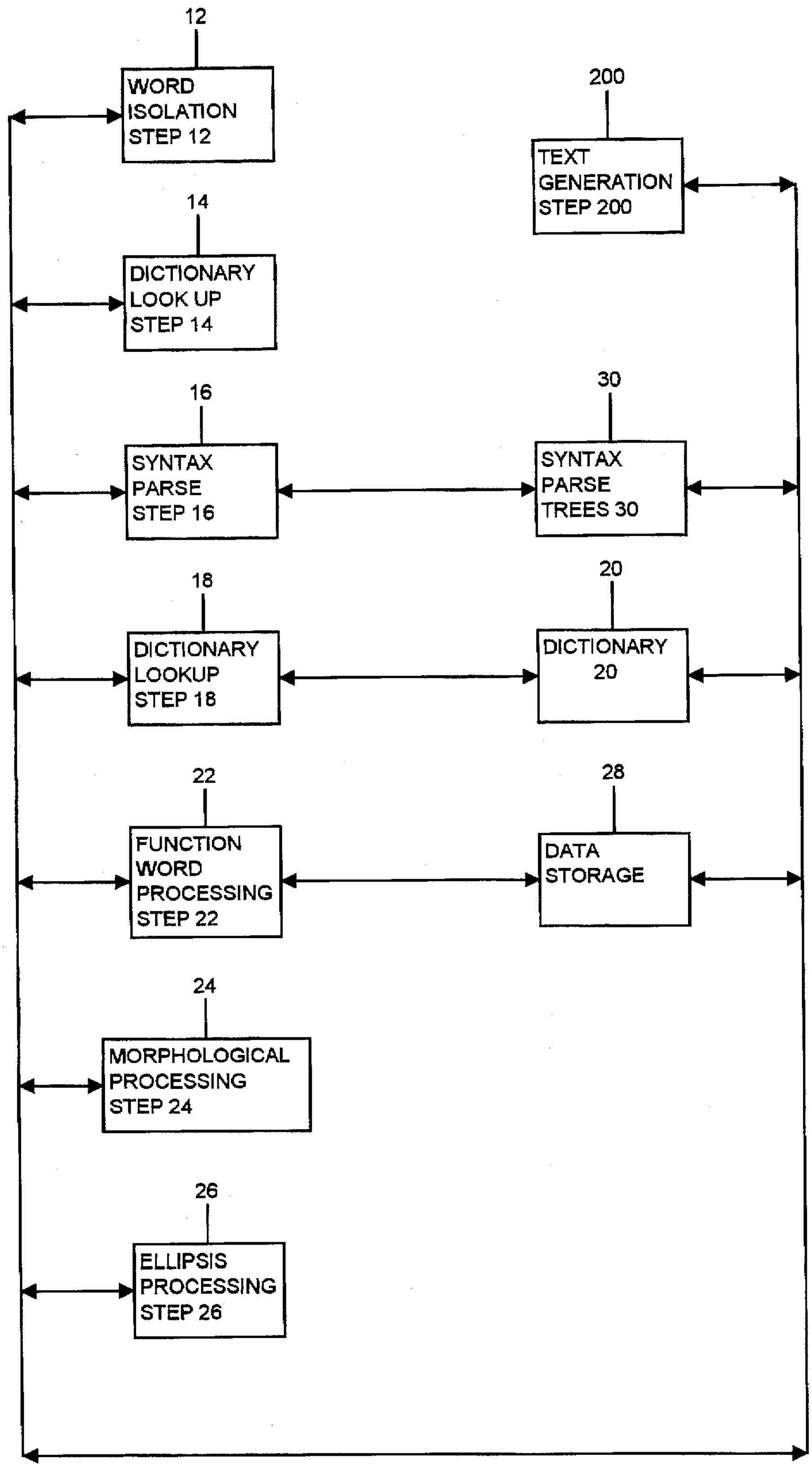
FIG. 2 is a block diagram of a Natural Language Processor 10 which processes incoming and generated text for syntax processing.

The syntactic processing method is implemented in a Natural Language Processor 10 illustrated in FIG. 2. The Text In Port 11 accepts natural language text in an electronic form. For example, the source of the text can be scanned in text converted to an electronic form or text from any source in an electronic form. A Natural Language Processor 10 can also accept text from a Non-textual Natural Language Processor 40 which converts non-textual natural language into equivalent natural language text in an electronic form. For example, the source of non-textual natural language equivalent can be natural language speech or graphical symbols.

WORD ISOLATION STEP 12

The Word Isolation Step 12 scans the incoming text and extracts words by looking for delimiters. Here word is used in a sense to include morphemes. Syntax Parse Step 16 for a natural language with morphemes separates morphemes into the text representation of morphemes. The text representation of morphemes can correspond to words or symbols which combine into words. A character can have one of three possible delimiting statuses: never delimits, always delimits, sometimes delimits. For example, an alphabetic character never delimits; a space always delimits; a period sometimes delimits. The Word Isolation Step 12 searches a text string until an always or sometimes delimiter is found. If the character always delimits the word is sent to the Dictionary Look-Up Step 14. If the character is a sometimes delimiter, the next character is checked. If the next character is never a delimiter, the word has not been delimited. If the next character is a sometimes or an always delimiter, the word has been delimited. An exception to this rule is a hyphen followed by a carriage return/line feed. In this case, the carriage return/line feed is treated as a null never delimiter. As such, the carriage return/line feed is ignored and the next character is checked. Another example is a period followed by a number as in a numerical word such as "3.14". There are also special delimiters such as "(s)" at the end of a word (to indicate singular or plural number for countable nouns) which do not follow the above delimiting rule. Such special delimiters are found by checking for their patterns during the delimiting process. As each word is delimited, it is sent to the Dictionary Look Up Step 14.

DICTIONARY LOOK UP STEP 14

The Dictionary Look up Step 14 verifies that a known word has been delimited. If a word is not found, then either the word is unknown, the word has a spelling error, or the word has not been delimited. First the word is checked for being properly delimited. Such a word may not be properly delimited if it was delimited by a sometimes delimiter, and if the Dictionary 20 has one or more words which have such a word and its sometimes delimiter as a substring of the dictionary word with the substring starting at the beginning of a dictionary word. Under this condition, the Word Isolation Step 12 is signaled to send the next word. The next word is checked for a match. If the word has a match following the substring, the word was initially improperly delimited. The substring and the next word are concatenated to form the properly delimited word. If the next word does not have a match with a dictionary word matching the substring and concatenated sometimes delimiter in Dictionary 20, such a word is misspelled or unknown. In the preferred embodiment of the invention, the Communication Manager 160 would issue a clarifying question about the word. In an alternative embodiment, a correcting spelling checker would guess the correct spelling if possible. In the alternative embodiment, if a word with a corrected spelling and with a match of a word in Dictionary 20 could not be found, the Communication Manager 160 would issue a clarifying question.

The format of Dictionary 20, illustrated in FIG. 3*a*, is used to verify that a known word has been delimited by checking the dictionary for character matches. However, every known word is not listed. Some known words are matched with special procedures. For example, a word which is capitalized and not at the start of a sentence is assumed to be a proper noun when it is not found to have a character match. Another example is the two types of special procedures for looking up numbers. One procedure accepts any string of numerical characters with certain restrictions for ".", ",". This kind of numerical string is treated as a number. The other numerical procedure accepts number strings with more restrictions such as value, length and punctuation. These numerical strings correspond to certain types of numbers such as phone numbers, social security numbers, dates, etc.

The format of Dictionary 20 in FIG. 3*a* is organized such that each stored word contains: a text entry which corresponds to the word; a representation number which is used to represent the text word; a set of syntax wordsets each with an associated part of speech; an address for a wordset's function selection process and an associated function code, or a set of word sense numbers associated with each wordset (each word sense number has an associated address to the word sense number's state or clausal state representation in another dictionary described below); a list of associated grammar anomalies partitioned by wordset; and pointers to common tables for selecting inflection codes, morphological representation, and/or to other common tables related to a wordset such as concrete noun's modifying prepositions. The text entry is used for the character searches for an entry match for Dictionary Look up Step 14. The representation word is used to identify the text word associated with a word sense number in Context Memory 120. A syntax wordset is a set of words which can syntactically be used interchangeably in a natural language construction. A word's syntax wordset is used by the parser to determine the phrase the word belongs to, and the relation of the word to other words in the phrase. Each entry in Dictionary 20 has at least one syntax wordset for each part of speech that the entry can be employed in. There is a set of pointers associated with each wordset which starts a phrase with or without ellipsis. This set of pointers is in a common table of Dictionary 20 with one set of pointers for a wordset. Each pointer in the set points to phrases in the Syntax Phrase Trees 30 where the wordset starts a phrase. This set of pointers have subsets of pointers associated with the wordset plus affixes and/or an inflection which starts a phrase. The syntax tree pointers are used by the parser during input to select wordsets and wordsets with affixes and/or an inflection which start a phrase. The part of speech, and the syntax tree pointers are used to generate natural language output from internally stored experience and knowledge. The address associated with a wordset points to the location of a function word's selection and implementation structures. The function code associated with the entry implies the possible functions of the wordset. If there is not an associated address, the wordset has an associated set of word sense numbers. This set of word sense numbers comprises a state representation interface of the text word. The state representation interface contains an optionally partitioned set of word sense numbers which are implied by the wordset of the text word. The partitions segregate word sense numbers into groups which can be identified during syntactic processing as possibly containing intended word sense numbers. A word sense number can be in more than one partition. The types of partitions can be specific to a part of speech. For example, one partition for verbs is for intransitive verbs. The partitions could also be based upon affixes and/or inflections. The state representation interface connects a Natural Language Processor 10 to the state representations of nouns, adjectives and verbs. The interface to state representation is made bi-directional with a separate Address Interface Table of Dictionary 20 depicted in FIG. 3*b*. In the Address Interface Table, each word sense number has an entry number. Each entry of the Address Interface table has an address to State Representation Memories 80, 90, or 100. This address contains the data structure implementing the entry's word sense number. Each entry also has the representation number of base words in Dictionary 20 which can imply the entry's word sense number. The representation word addresses the base word's entry in the Dictionary 20 Base Word Table in FIG. 3*a*. This allows a word sense number to be associated with a text word for output. The state representation address interface allows the particular set of word sense numbers implied by a text word of a particular natural language to be combined into an interface to the state representation. O state representation can be interfaced in this way to multiple natural languages. In general, text words of two or more natural languages will in some cases share some word sense numbers, but rarely will a text word from each of two different languages have the exact same set of word sense numbers. A wordset's grammar anomalies include anomalies related to: number, tense, aspect, comparison, possession, morphology, gender, etc. For example, a grammar anomaly can be used to find or generate the affix or inflection which is correct for an entry. There are several types of common tables associated with a wordset. One common table contains definitions of affixes and inflections associated with a wordset. Another common table, the common generation table, is used to select affixes which change a base word's part of speech to a desired part of speech. The common table formats will be described below.

Another feature of Dictionary Look Up Step 14 is that normally only base words are stored as text strings for look up in Dictionary 20. Prefixes are stored and are treated as special entries. The format for affixes and inflections is illustrated in FIG. 3*c*. An entry for an affix or an inflection contains a text entry which is used for matching the affix or inflection. An entry also has an associated affix code for an affix entry or an inflection code for an inflection entry. When a prefix plus base word is received from Word Isolation Step 12 as the current word, the prefix is matched and noted as a possible word affix for the current word. The affix code is also stored. The characters after the prefix of the current word are continued to be used for matching dictionary words. Since the word has a prefix, it will eventually fail to find a match with a prefix. When the current word fails a match and a prefix has been noted by storing the prefix's associated affix code, the search for a match with the current word restarts at the first character after the prefix. Then the current word's base word will be matched. It is possible that more than one prefix will be found because some prefixes have another prefix as a leading substring such as "in" and "inter". The prefixes and suffixes are stored before base words with respect to alphabetic order. Within prefixes, the "base" or the shorter common part of a prefix is stored first. As characters are matched, the shorter common prefix (e.g., "in") is matched first. After the shorter prefix is matched, a base word match is attempted. If the base word match fails, the match for a longer prefix containing the initially matched prefix is started at the character after the matched prefix. In such cases, only the last detected prefix is noted by storing its affix code. The above procedure continues until a prefix and base word are matched or a base word is matched. Some words can be stored in Dictionary 20 either as a prefix plus base word or as a base word only such as "international". Such words are selected as a prefix plus base word when the morphology of the word is such that the prefix alters the meaning in a standard way associated with the prefix. Another criterion is storage requirements versus storage limitations. Performance can be increased at the cost of more storage for example.

Suffixes and inflections are detected after base words have been matched. The same basic method used for the prefix and base word matching is used for detecting suffixes and inflections. When a base word has been found it is noted. The match continues until it fails. The characters after the base word are searched for a match with a suffix or inflection. The method used for a single suffix is repeated for a base word with more than one appended suffix. Some base words have either special embedded characters or multiple entries for multiple suffixes. Base words which have spelling anomalies for adding suffixes or inflections have an embedded non-textual character. This embedded character is not used for matching, but the character indicates the class of anomalies possible. For example, the plural of "calf" is "calves". A special character indicating this number anomaly is embedded after "l". When a special embedded character is encountered, it is noted and indicates a possible suffix location. If the match fails after the character, it is treated as a possible start of an associated suffix or inflection with the embedded character indicating the set of suffixes or inflections. An alternative embodiment would list separate entries for anomalies such as "calf" and "calves". Other base words have unique anomalies and require separate entries for each anomalous word formation For example, the past tense of "is" is "was" and requires separate entries for these and other tenses of "to be". Finally, certain suffixes can either be an affix (e.g., "a surprising result") or an inflection ("It is surprising."). Such suffixes have an affix code. When the affix code is combined with a wordset requiring an inflection code, the combination of wordset and affix code select a morphological function in Morphological Processing Step 24 which substitutes the required inflection code for the affix code for the syntax interpretation of the sentence. In the above examples, the wordset selected during parsing for "surprising" in the second example requires an inflection and would select a morphological function which substitutes the required inflection code.

After a base word plus affixes or an inflection have been matched in the Dictionary Look Up Step 14, the next part of Step 14 is to eliminate certain wordsets from the set of possible syntax wordsets by using the affix or inflection. Each affix or combination of affixes has an associated code. These associated codes are called affix codes. There is a separate affix code for each prefix or each combination of prefixes, and there is a separate affix code for each suffix or each combination of suffixes. Thus a base word with one or more prefixes and one or more suffixes will have two affix codes. Inflections have associated inflection codes. A word will typically have multiple wordsets associated with it. A word can have multiple wordsets even for one part of speech which it assumes. Certain wordsets can not be combined with certain affix codes or inflection codes. Thus, wordsets can be eliminated from the possible set or wordsets with checking for combinations of wordsets and affix codes or combinations of words and inflection codes. Once the wordsets have been eliminated, the possible wordsets are combined with zero, one or two affix codes (e.g., a base word or a word with a prefix and/or a suffix), or combined with zero or one affix code, and/or zero or one inflection code (e.g., a word with or without a prefix and/or a word with or without an inflection). The affixes and/or the inflection is combined as an appendage of the wordset. The combined wordset, affix code(s) and/or inflection code is used during parsing to select the syntax interpretation of a sentence. After the syntax interpretation has been selected, the affix code is used to select morphological processing. The inflection code is used for processing the inflection. Also the inflection code is used for certain aspects of Elliptical Processing Step 26. Next, a table which contains the combinations of wordsets, affixes and inflections is described. This table is used to eliminate wordsets prior to parsing, and the table is used to select morphological processing codes and inflection codes after parsing. The wordset elimination will be described after the table description. The morphological processing is described below.

One aspect of the dictionary is to use common tables of definitions of affix codes and inflection codes. The format for common definition tables is illustrated in FIG. 3*d*. The common tables save memory space because there are many wordsets which have the same common table. Each wordset which can be combined with an affix or inflection has a pointer in its Dictionary 20 entry to its common definition table. The common definition table contains lists of affix codes, and inflection codes. This table contains codes which can be combined with the wordsets which are associated with the common table. Each affix code has an associated definition composed of: an address descriptor, a set of morphological codes, or the part of speech of the associated wordset of the baseword. An address descriptor is used to calculate an address into the portion of the base word's state representation structure associated with the base word plus affix. A morphological code has an associated function for Morphological Processing Step 24. Some affix codes have more than one morphological function associated with them. Each morphological function corresponds to one possible representation of the base word plus affix. The definition contains all morphological codes which are possible for an affix. It is also possible that an affix code can have all the functions stored in Morphological Step 24 associated with an affix for all wordsets which can have that affix. In this case, the affix code's definition contains the base word's part of speech. The part of speech of the base word is used by Step 24 to select the representation of the morphological word. An inflection code has an associated definition which contains an inflection function code. The inflection function code implies the inflection's function. Some wordsets will use a common table except for one or more anomalies. In such cases, the anomaly is stored in the list of grammar anomalies associated with the entry. The anomaly contains the affix or inflection to be replaced and the location of the replacement definition. The anomaly list of the base word's entry in Dictionary 20 is accessed to determine if the entry has an affix or inflection anomaly, i.e., the entry and associated affix or inflection has a different definition associated with it instead of the definition of the affix code or inflection code in the common table. If an affix or inflection anomaly is found for the affix code or inflection code, the address of the definition is in the anomaly list and replaces the definition in the common table for the affix code or inflection code. Otherwise, the definition of the common table associated with the affix contains the morphological codes implied by the affix.

Dictionary Look Up Step 14 accesses Dictionary 20 to select base words, affixes and inflections. The entry associated with a base word contains the possible syntax wordsets of the base word. In subsequent syntax parsing, Parsing Step 16 utilizes the wordsets, affixes, and/or inflections associated with a text word to parse an incoming sentence. As 16 parses each word, it invokes Step 14 to look up the next wordset associated with a base word. If the stated text word has an affix or an inflection, Step 14 checks if the wordset's common definition table has the affix code and/or inflection code listed in the table. If all the codes are listed in the table, the wordset and any codes are sent to Step 16 for parsing. Otherwise Step 14 selects the next wordset of the base word and repeats the check for code listing. Step 14 provides the possible wordsets and any codes to Step 16. The intended wordset is selected from the possible wordsets by Parsing Step 16. The intended wordset is used by Dictionary Look Up Step 18 to find the word's state representation address in the word's Address Interface Table entry or function selection processing address in the word's Dictionary 20 entry.

There is another type of common table illustrated in FIG. 3*e*, a common generation table. The common generation table is used to generate combinations of base words and affixes associated with a wordset. The common generation table contains the source part of speech of the associated wordset. The source part of speech is the part of speech of the base word without an affix. Associated with the source part of speech is the set of destination parts of speech. A destination part of speech is the part of speech of a base word plus one or more affixes. Each destination part of speech has a set of pointers to affix definitions. The affix definition has a corresponding affix which when combined with the base word forms a morphological word with the destination part of speech. Morphological Step 24 accesses the common generation table of a wordset of a base word with the source and destination parts of speech to determine the set of affixes which will change the source to the destination part of speech. Morphological Step 24 is invoked to generate morphological words in subsequent state representation processing described below.

SYNTACTIC PARSE STEP 16

Figure 4A:
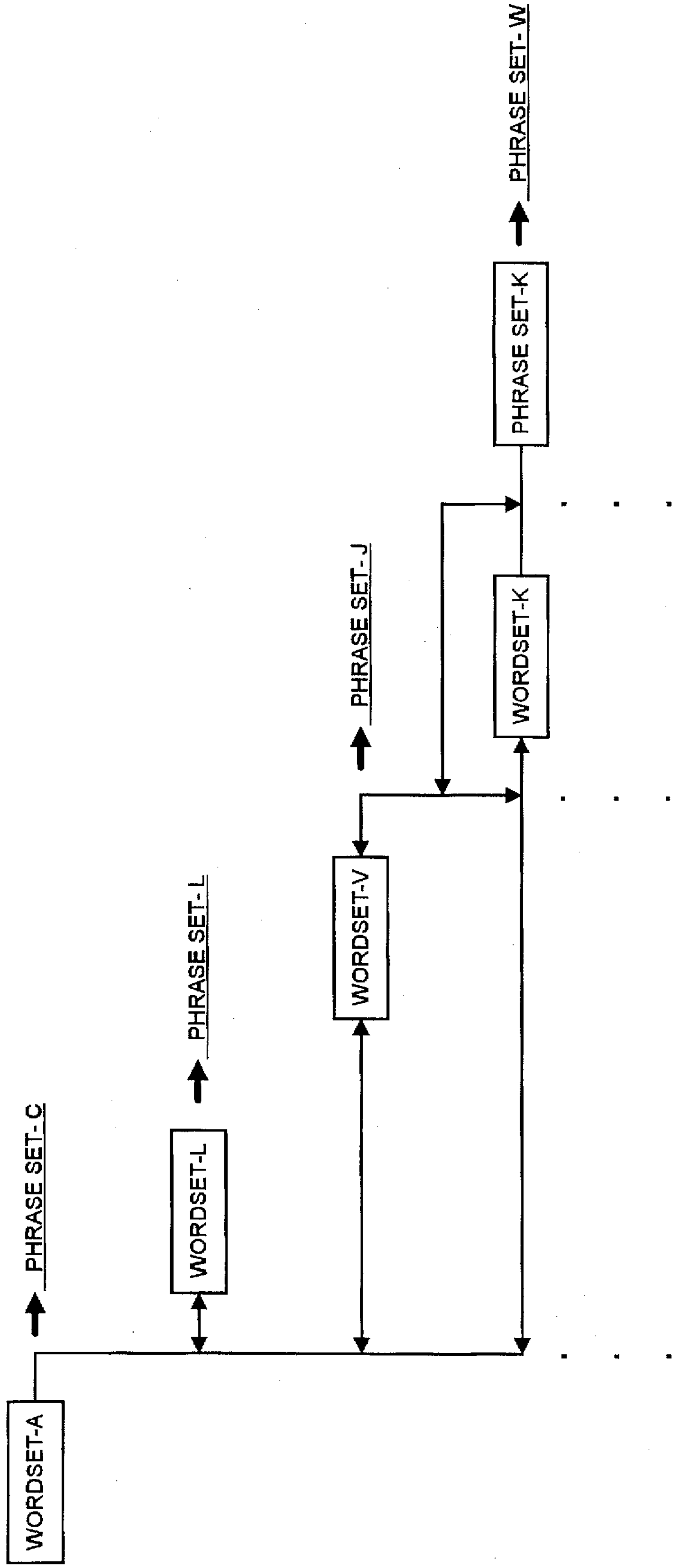
FIGS. 4*a* and 4*b* are illustrative of the Syntax Parse Trees 30 for phrases and clauses respectively.
Figure 4B:
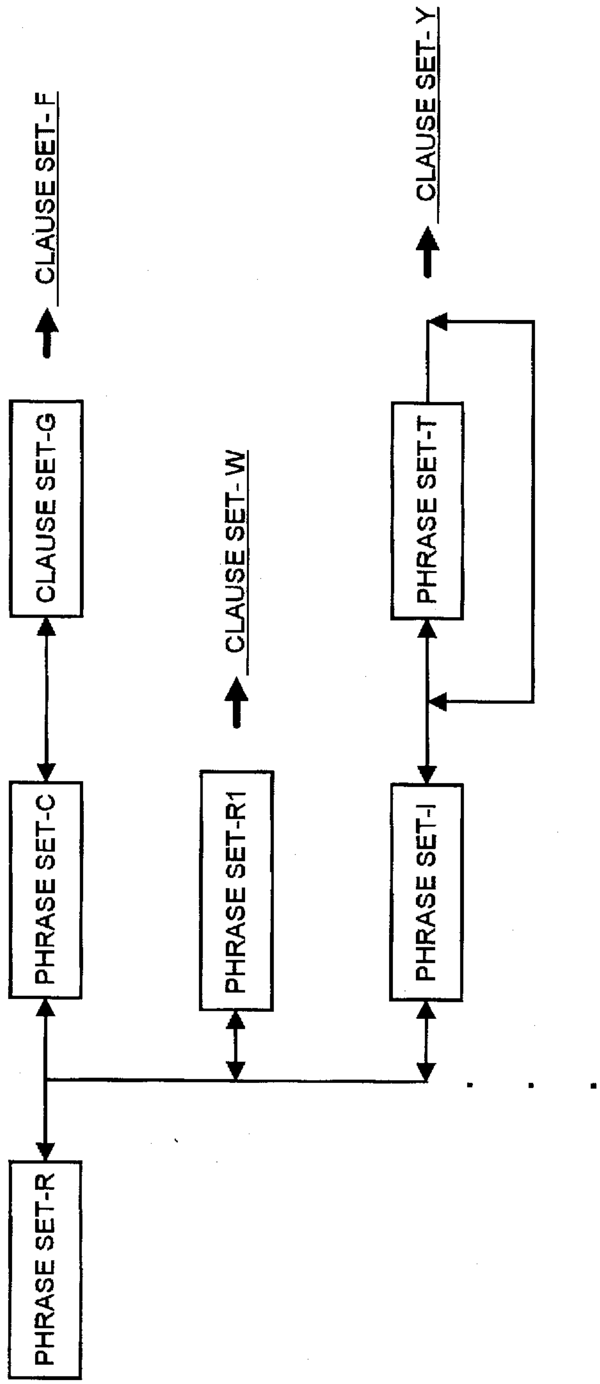
Figure 5A:
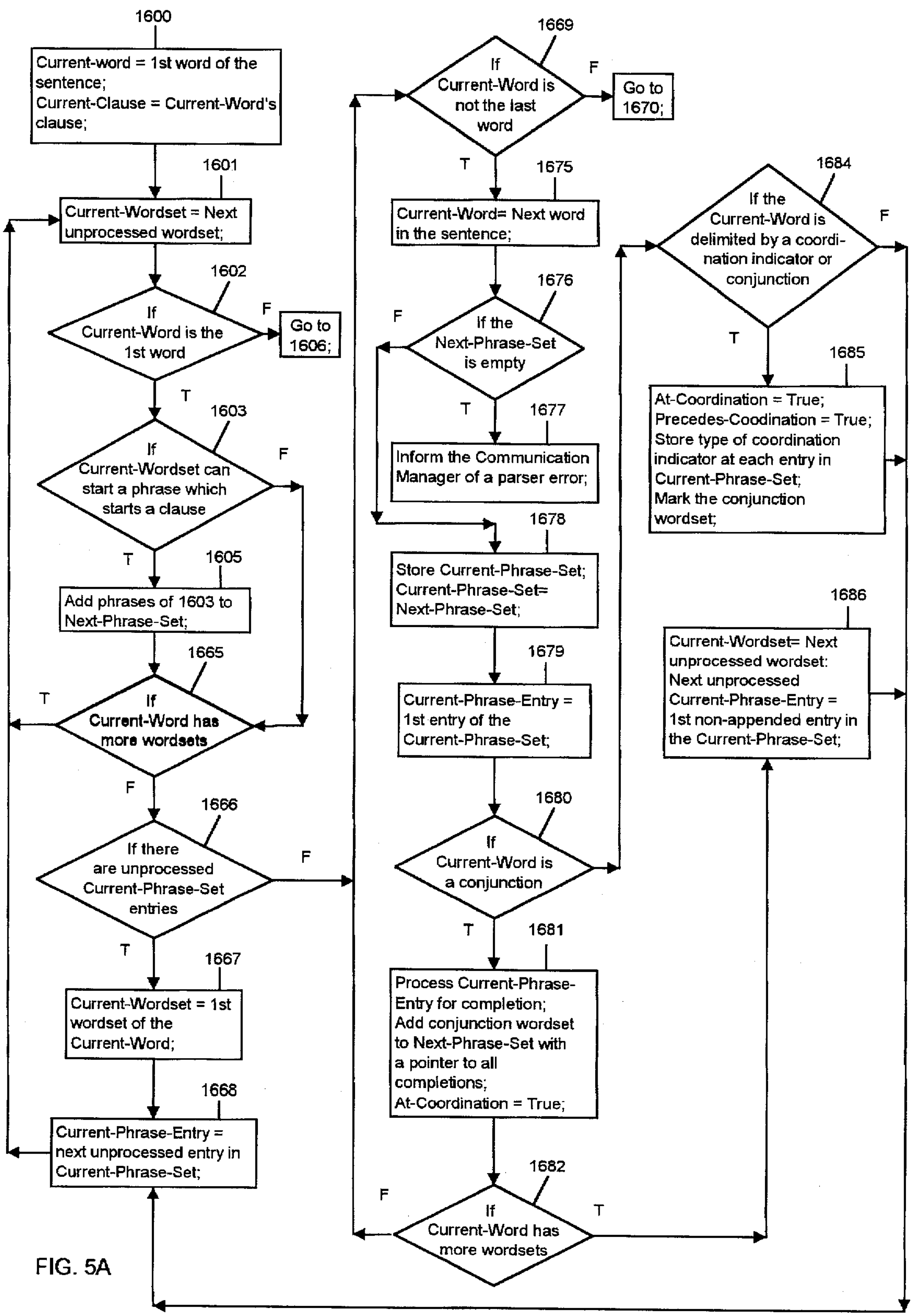
FIGS. 5*a*–5*h* is a flow chart of Parsing Step 16 which parses incoming natural language.
Figure 5B:
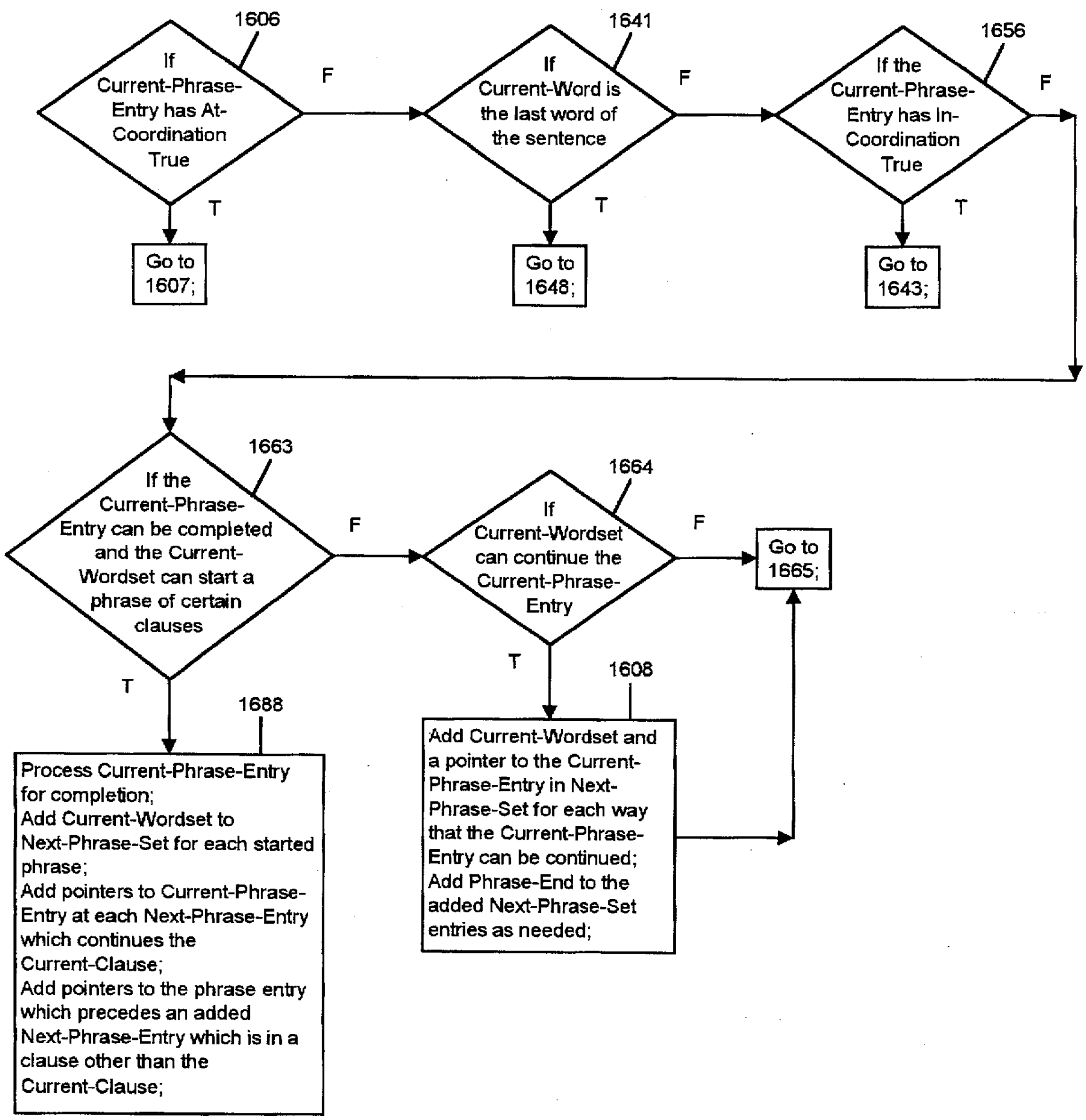
Figure 5C:
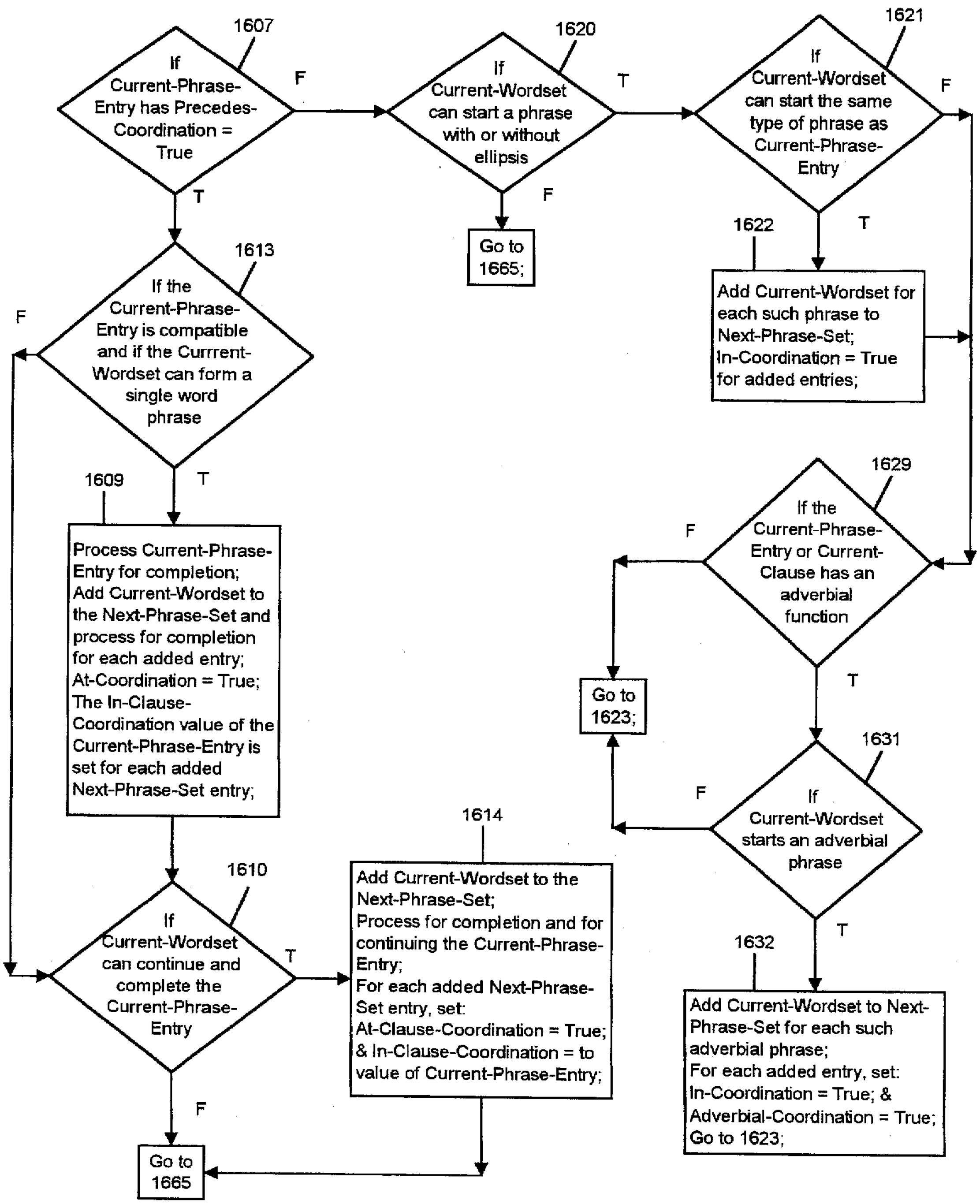
Figure 5D:
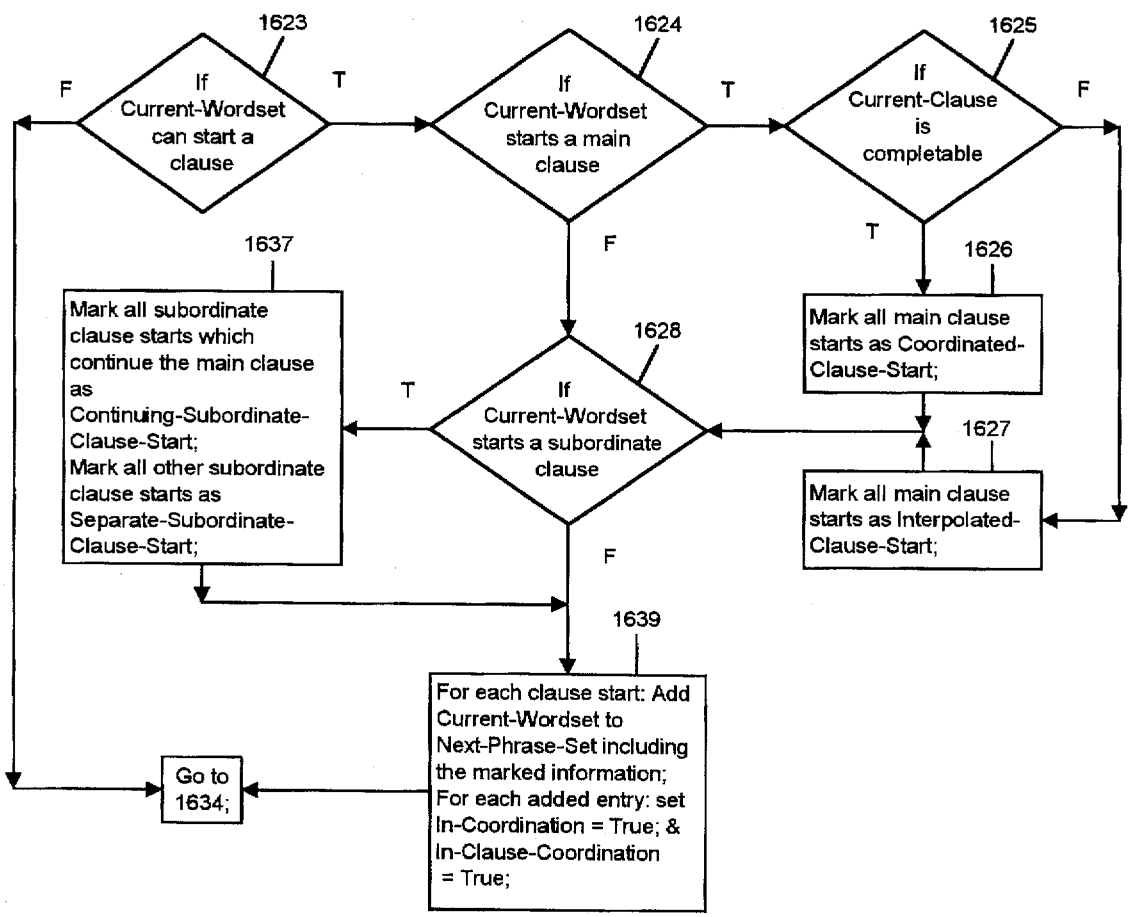
Figure 5E:
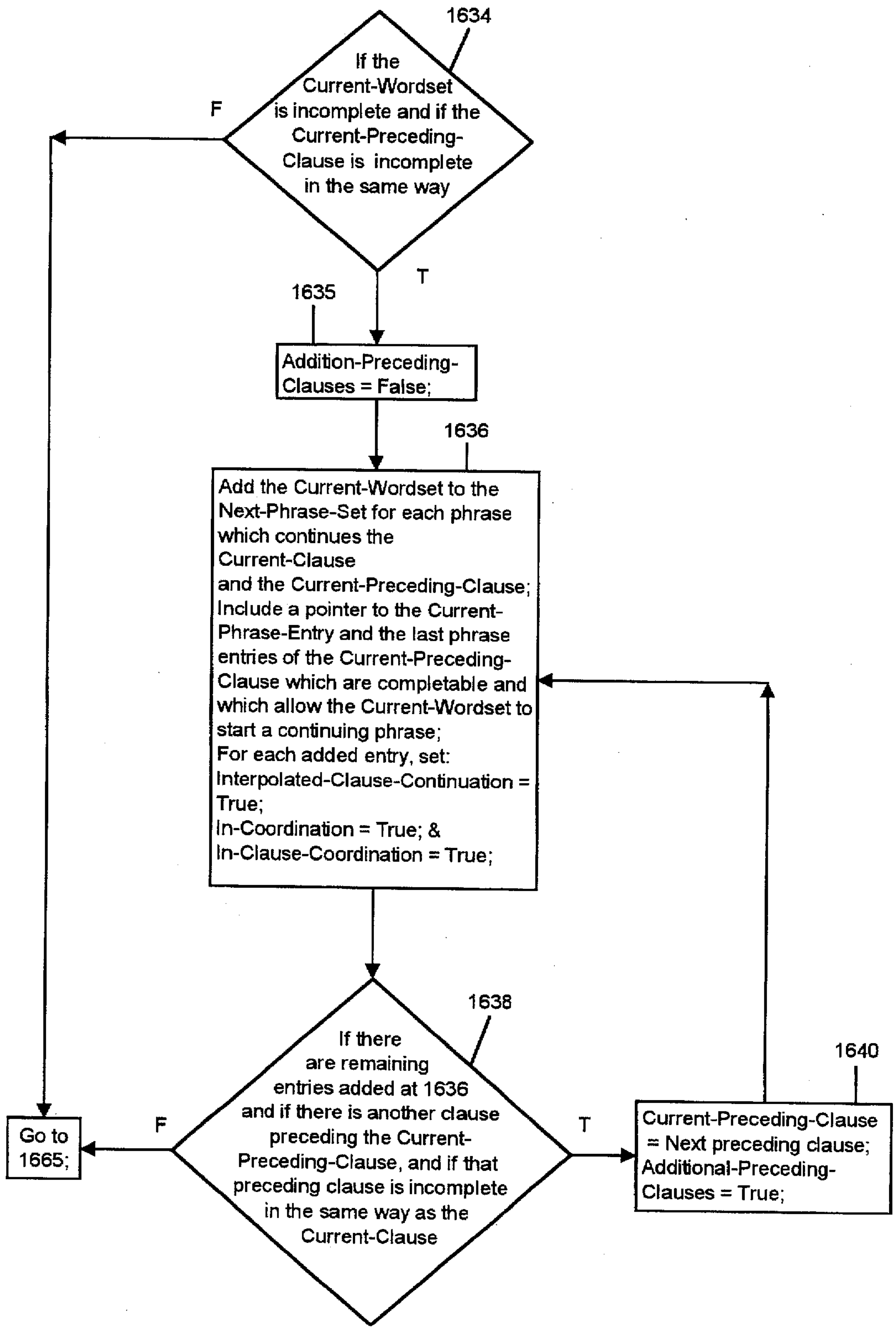
Figure 5F:
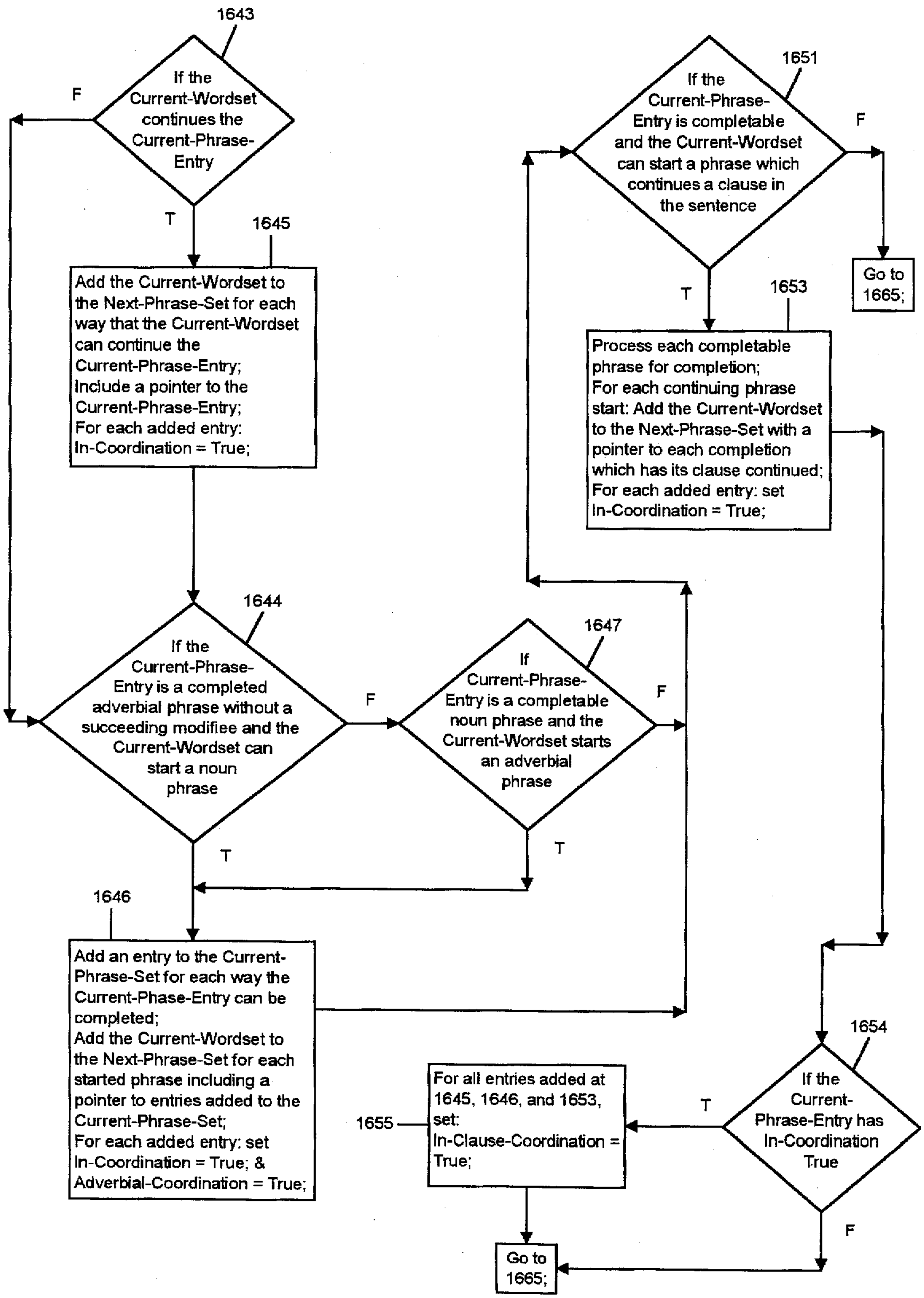
Figure 5G:
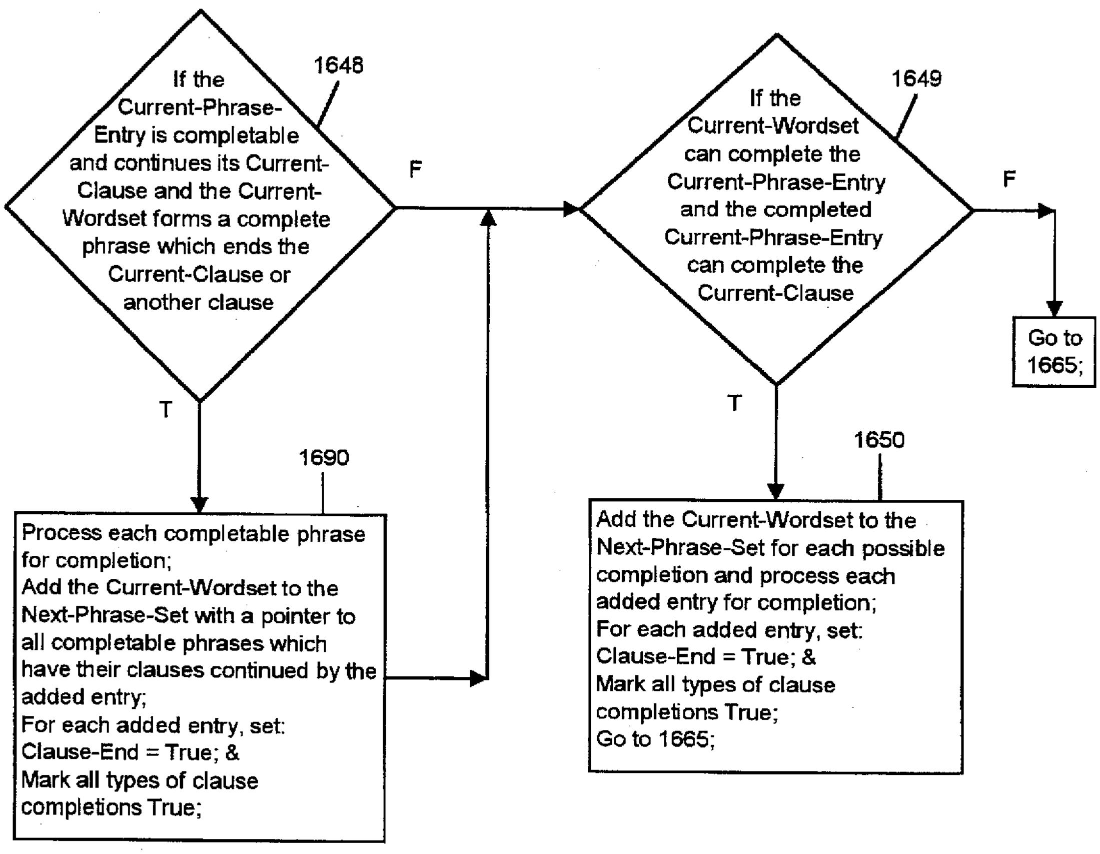
Figure 5H:
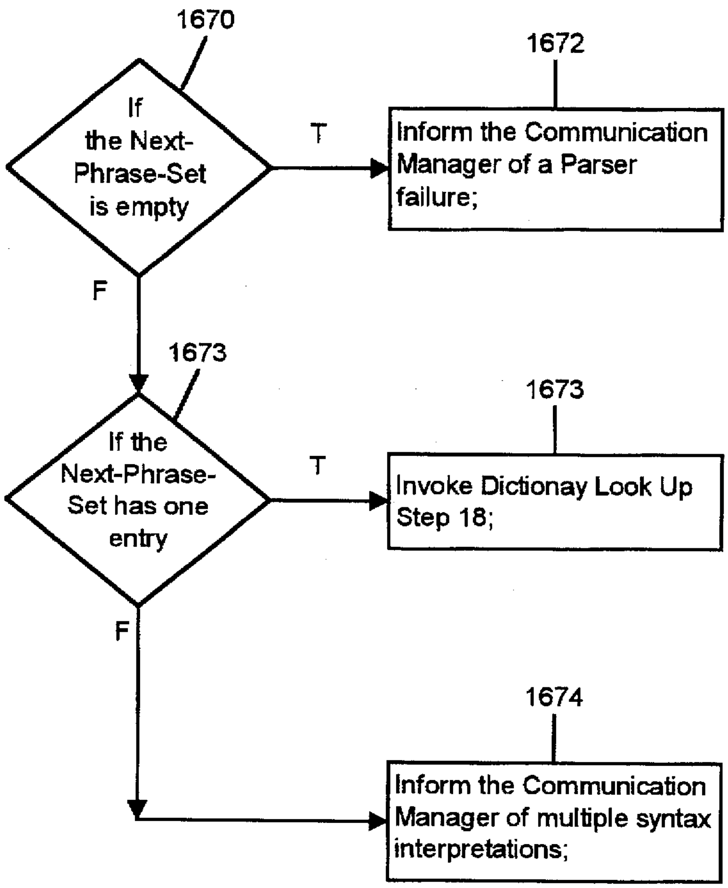

The Syntactic Parse Step 16 utilizes the possible wordsets and codes identified in Step 14 to first find a phrase in the Syntax Phrase Trees 30. For convenience, the term wordset will refer to a wordset without affix and/or inflection codes or to a wordset with affix and/or inflection codes in the following. Also for convenience, the term word includes morpheme for natural languages with morphemes. The Syntax Phrase Trees 30 are illustrated in FIGS. 4*a* and 4*b*. A syntax tree fragment for a general phrase is depicted in FIG. 4*a*. A root of a tree has one wordset. The words associated with a root wordset correspond to the words which can start the phrase. Associated with each non-leaf wordset is a forward pointer to each wordset which can immediately succeed the non-leaf wordset. Each non-root wordset has a backward pointer to the wordset which can precede the non-root wordset. The words associated with the wordset(s) succeeding a wordset correspond to the words which can follow the previous wordset's word(s) in the phrase. The words associated with the wordset(s) at a leaf of a tree correspond to the last word in a phrase. The phrase syntax trees indicate allowed ellipsis starting locations where one or more contiguous wordsets are ellipted (left out) with a forward pointer at the wordset preceding ellipsis to the wordset just after the ellipted wordset(s). The wordset following the ellipsis has a backward pointer to the wordset preceding ellipsis. Ellipsis starting at the root only has a forward pointer at the root and a backward pointer to the root. The ellipsis pointers have a descriptor to indicate the type of ellipsis and other relevant information which is used in Ellipsis Processing Step 26 to replace the ellipted words. Optional wordsets are indicated with the same kind of pointers used to indicate ellipsis, and the pointers have descriptors which includes an optional indicator. Optional wordsets can either be present in the phrase or absent. The phrase with optional wordsets is grammatically correct and complete with or without the optional wordsets. Wordsets that can either be ellipted or are optional have an Optional-Ellipted indicator in their descriptors. This descriptor indicator is interpreted to treat their corresponding wordsets as optional wordsets, but the state representation processing will invoke ellipsis processing if the phrase is ambiguous without an ellipsis replacement. The use of the ellipsis and optional pointers has two major advantages. One advantage is that these pointers allow the number of trees representing phrases to be reduced because one tree can be used for complete phrases, phrases with ellipted elements, and phrases with or without optional elements. Also, this reduction in phrase trees reduces the number and size of clause trees (described below) required to represent clauses comprised of reduced numbers of types of phrases, the phrases being represented by phrase trees. The other major advantage is that the tree which combines ellipsis and optional elements simplifies generation of out going natural language because the available choices for phrase generation are located in a single tree and the choices for phrases is also reduced in clause trees. Note that the term tree is not used in the strict mathematical sense. Rather, tree is used in place of a directed graph. A directed graph is a generalization of a tree in the strict mathematical sense.

Each wordset in the phrase is marked with a modifier flag which indicates if the wordset is a modifier or a head of the phrase. Wordsets of morphemes indicate whether they are a word or a symbol equivalent. A symbol equivalent which ends a word equivalent is further marked with a modifier flag. Wordsets in the tree which can optionally be followed by a subordinate clause have a descriptor of this option. The phrase's type, usually the head's part of speech or function, and pointers to clauses in Syntax Clause Trees 30 which can be started by the phrase including starting a clause with one or more preceding, ellipted phrases are associated with the root node of phrase tree. The information associated with the root is used to make parsing decisions. Associated with the leaf of a tree is a phrase set which the leaf wordset selects. A phrase set contains phrases which can be interchangeably be placed with respect to syntax in a clause of a natural language construction. Grammar information is also associated with a leaf of a tree. The grammar information includes: special usage (e.g., emphasis type), and as appropriate: the case, the tense, number, compatible postmodifiers, and other grammar related information. The basic parsing step is to use wordsets associated with incoming natural language words to traverse Syntax Phrase Trees 30 to select a phrase set. Some phrase trees can also contain phrase sets at some branches as well as wordsets. For example, a noun phrase can contain adjective phrase sets and preposition phrase sets. The phrase trees are constructed so that optional wordsets or optional phrase sets can be utilized zero or more times. For example, a noun phrase can have zero or more adjectives. Also a phrase head can have an optional compatible postmodifier. Thus, there are not separate phrase structures for phrases with postmodifiers and without postmodifiers for example. Each phrase set has an associated address which points to its syntax tree root and leaf node locations.

The phrase sets from Syntax Phrase Trees 30 are used to select a clause in the Syntax Clause Trees 30. A fragment for a general clause is depicted in FIG. 4*b*. The root phrase sets and/or pointers to subordinate clauses, called clause sets, correspond to an initial phrase or a subordinate clause with an initial sentence role of a clause. Subsequent phrase sets or subordinate clauses in a clause set with a sentence role can follow in the clause. The leaf is the final phrase set in the clause or has a pointer to a clause set of subordinate clauses with a sentence role. The phrase sets and sentence role clause sets of subordinate clauses have forward and backward pointers like the wordsets' pointers in the Syntax Phrase Trees 30. Some clauses allow subordinate clauses to replace phrases for certain sentence roles. Such clauses have pointers to the clause set at the same location in the clause tree where one or more phrase sets are also located. Such co-located phrase sets and the pointed-to clause sets perform the same sentence role. Grammar information is associated with a clause including: type (e.g., declarative), main/subordinate, mood, voice, a sentence role and its type for each phrase or subordinate clause in the clause, and other grammar related information. The information is used to select an input interpretation as well as output clauses. The clause syntax tree indicates allowed ellipsis locations where one or more phrases can be ellipted with backward and forward pointers which are similar to the pointers indicating wordset ellipsis in Syntax Phrase Trees 30. The pointers have descriptors which indicate the type of ellipsis and other relevant information, and the descriptors are used in Ellipsis Processing Step 26 to replace the ellipted phrases. Optional phrases are treated like optional wordsets in Syntax Phrase Trees 30. The basic parsing step is to determine whether a phrase set found in Syntax Phrase Trees 30 can continue a clause in Syntax Clause Trees 30.

In the following the term ellipsis, the leaving out of words in a grammatical construction, will be used to include all ellipsis types which are currently applicable. There are 7 types of ellipsis: general, coordination, nonfinite clauses, verbless clauses, clauses implied by morphologically formed words, response forms, and comparative clauses. All but morphologically formed words implying clauses are detected by Parsing Step 16. This type of ellipsis is detected by Morphological Processing Step 24. The general, nonfinite clause, verbless clauses, response ellipsis, and comparative clause types of ellipsis are always enabled. Coordination ellipsis is enabled when coordination is detected in Step 16. Coordination ellipsis includes: coordination of clause constituents, coordination of clauses, and subordination of clauses.

The Syntax Parse Step 16 uses the set of wordsets associated with incoming natural language words to select phrase sets in the Syntax Phrase Trees 30 (FIG. 4*a*), and these phrase sets further select clause(s) in the Syntax Clause Trees (FIG. 4*b*). The Parsing Step 16 Process is illustrated in FIGS. 5*a*–5*h*. The Syntax Trees 30 are designed to handle grammatical constructions without coordination in the sense that the phrases and clauses are not added for each possible combination of coordination. For example, the Syntax Clause Trees 30 does not contain multiple copies of the same clause with copies differing in the number of say coordinated subjects. Instead, Parsing Step 16 handles coordination and subordination by detecting it and linking multiple constructions of the coordinated and/or subordinated constructions. Thus, the same clause tree is used independently of the number of say coordinated objects in the incoming text. Both coordinated phrases and clauses as well as subordinated clauses are detected and processed with controlling the parsing instead of creating separate phrase and clause syntax trees. The At-Coordination variable is true when either the current word precedes a coordination indicator or the next word is a coordinating, subordinating or correlative conjunction. The At-Coordination variable is also true when current word succeeds a coordination indicator or conjunction. A coordination indicator is a comma, colon, semicolon or a dash in English. The In-Coordination variable of a phrase is true if the phrase could have either phrase coordination, clause coordination, or clause subordination. The In-Clause-Coordination variable of a phrase is true if the phrase could be in a clause which is coordinated or subordinated with another clause.

Parsing Step 16 starts with step 1600 where the Current-Word is set to the first word of the sentence. 1600 also sets the Current-Clause to be the clause containing the Current- Word. Then step 1601 selects the next unprocessed wordset of the Current-Word and sets it to be the Current-Wordset. 1602 is next and is true if the Current-Word is the first word of the sentence. If 1602 is true, 1603 is next and is true if the Current-Wordset can begin a phrase possibly with ellipsis as determined in Syntax Phrase Trees 30 and if that phrase can start a clause possibly with ellipsis as determined in Syntax Clause Trees 30. If 1603 is true, next at 1605 an entry is added to the Next-Phrase-Set for each of the phrases started with the Current-Wordset that also starts a clause. More than one phrase and clause can be started because of ellipsis. For the second and other words in a sentence, more then one phrase can be continued by the Current-Wordset because of ellipsis within a phrase. Each wordset which can start a phrase and a clause for the first word of a sentence as determined at 1603, is added to an entry in the Next-Phrase-Set at 1605. The entry contains the following information: the wordset; the type of phrase utilized by the clause containing the phrase; a pointer to the wordset in the phrase in Syntax Phrase Trees 30; a pointer to the sentence role and its corresponding phrase sets and/or pointers to clause sets of subordinate clauses in the Current-Clause which contain the type of phrase or subordinate clause which contains the Current-Wordset in Syntax Clause Trees 30; and pointers to ellipsis in the Syntax Trees 30 as needed. The ellipsis in phrases is stored with a pointer to the phrase in Syntax Phrase Trees 30 where the ellipted words were detected. This ellipsis indicating pointer is stored in the phrase set entry which is in the phrase with ellipsis and either immediately precedes the ellipsis for ellipsis at the end of a phrase or immediately succeeds the ellipsis otherwise. The pointer to the syntax tree will be used to select the ellipted words in the Ellipsis Processing Step 26. Ellipsis of phrases within clauses is stored with a pointer to the ellipted phrases in the Syntax Clause Trees 30 which either precede the Current-Wordset, or only if the ellipted phrases are at the end of a clause, follow the Current-Wordset. This ellipsis indicating pointer is also used to replace the phrases with Step 26. The Next-Phrase-Set contains all the phrases which could possibly be currently complete or be continued with a wordset of the next word. Also, each phrase in the Next-Phrase-Set belongs to a clause, its current clause. The Next-Phrase-Set's are stored in a temporary array for later processing in Dictionary Look Up Step 18.

After 1605 or if 1603 is false, 1665 is next and is true if more wordsets are available for the Current-Word. If 1665 is true, processing continues at 1601. If 1665 is false, 1666 is next and is true if there is another phrase entry in the Current-Phrase-Set. For the first word of a sentence, the Current-Phrase-Set is empty. For later words in the sentence, the Current-Phrase-Set contains phrase entries for all phrases which could be completed or continued with a wordset of the Current-Word. If 1666 is true, 1667 is next, and sets the Current-Wordset to be the first wordset of the Current-Word. After 1667, 1668 is next and sets the next unprocessed phrase entry in the Current-Phrase-Set to be the Current-Phrase-Entry. After 1668, 1601 is next as above. If 1666 is false, then 1669 is next.

1669 is next and is true if the Current-Word is not the last word of the sentence. If 1669 is true, 1675 is next, the Current-Word is assigned the next word in the sentence at 1675. After 1675, 1676 is next and is true if the Next-Phrase-Set is empty. If 1676 is true, 1677 informs the Communication Manager that Parsing Step 16 failed to find a syntax interpretation at the previous word. If 1676 is false, 1678 is next, and the Current-Phrase-Set is stored for future processing. The Current-Phrase-Set is also assigned the Next-Phrase-Set at 1678. The Next-Phrase-Set was created in the previous processing, and a new Next-Phrase-Set will be created in the following processing. After 1678, 1679 is next, and the next phrase to be processed, the Current-Phrase-Entry, is set to be the first phrase of the Current-Phrase-Set at 1679. Then in steps 1680 through 1686, processing is performed for coordination indicators. After 1679, Step 1680 is true if the Current-Word is a conjunction as determined by checking the Current-Word's Dictionary 20 entry. If 1680 is false, then the Current-Word is checked for being delimited with a coordination indicator at 1684. The coordination indicators are: a comma, a colon, a semicolon and a dash in English. However, certain uses of these indicators do not imply coordination. For example, a comma succeeding an introductory phrase, a comma in dates and addresses, a comma or colon in a salutation of a letter, etc. are not indicators of coordination. Step 1684 is true if 1684 detects a coordination indicator at the end of the Current-Word, or Step 1684 determines that the next word is a coordinating, subordinating or correlative conjunction. If 1684 is true, the Current-Word possibly precedes coordination, and the At-Coordination and Precedes-Coordination variables are set to true for each phrase entry in the Current-Phrase-Set at 1685. Also, when there is a coordination indicator, 1685 sets a value for the type of coordination indicator. This value will later be used to make coordination decisions when multiple indicators are mixed in a coordination. The variables will be used to control processes in the parse. For example, if the Current-Word is delimited by a comma and the next word is a conjunction at 1684, the conjunction wordset is set with a Comma-Coordination attribute at 1685. This attribute can be used to indicate a preference over ambiguous syntax interpretations. After 1685 is processed, or if 1684 is false, 1668 is processed next and processing continues as described above.

1680 is true if the Current-Wordset is a coordinating, subordinating or correlative conjunction. If 1680 is true, 1681 is next and the Current-Wordset is added to a next phrase entry in the Next-Phrase-Set. A pointer is added from this next phrase entry to each entry in the Current-Phrase-Set which can be completed with or without ellipsis. A phrase can be completed if its phrase entry can reach a leaf in the Syntax Phrase Trees 30 from the wordset of its entry's word with or without ellipsis, and if such a phrase can continue the clause associated with the phrase entry in Syntax Clause Trees 30 with or without ellipsis. Step 1681 first checks if the conjunction has a function(s) in addition to the conjunction function by looking at the Current-Word's entry in Dictionary 20. Certain conjunctions have other functions. For example, "for" can be a coordinating conjunction of a clause or a preposition. If there is an additional function(s), 1681 first creates a copy of each entry in the Current-Phrase-Set which meets the above completion requirement, and the copies are appended to the beginning of the Current-Phrase-Set. The copies will be used for preceding the conjunction function. Then each copied phrase entry, or if the conjunction has one function, each phrase entry meeting the completion requirement is individually copied so that there is one entry for each way the individual Current-Phrase-Set entry can be completed. An entry meeting the completion requirement in the Current-Phrase-Entry can be completed in more than one way because it can be completed with or without ellipsis in the phrase and/or with or without ellipsis of following phrases. For each Current-Phrase-Set entry which can be completed as in the previous sentence, a pointer to the location in the Syntax Clause Trees 30 where the phrase(s) following the current phrase continues the Current-Clause is added to such an entry. Also, such an entry has any needed ellipsis pointers added as described at 1605. Finally, such an entry is marked with PHRASE-END. The conjunction wordset is added to a Next-Phrase-Set entry. This entry has a pointer to each phrase entry of the Current-Phrase-Set which meets the completion requirement at 1681. This entry in the Next-Phrase-Set has the following contents: the Current-Wordset, pointers to each phrase entry of the Current-Phrase-Set which meets the above completion requirement, a pointer to any ellipted phrases as described at 1605, and a mark indicating At-Coordination with a true value. If the conjunction has another function(s), the pointer to the Current-Phrase-Set added in 1681 is to an entry copied and appended to the beginning of the original Current-Phrase-Set. Otherwise such pointers are to entries of the Current-Phrase-Set which can be completed with or without ellipsis. After 1681, 1682 is next. Step 1682 is true if the Current-Word has another wordset. If 1682 is true, 1686 is processed next. Step 1686 sets the Current-Wordset and the Current-Phrase-Entry so that the other function(s) of the conjunction can be processed. First, 1686 sets the Current-Wordset to be to be the next wordset. Second, 1686 sets the next unprocessed Current-Phrase-Entry to be the last phrase entry before the appended entries created at 1681 in the Current-Phrase-Set. After 1686, the Current-Phrase-Entry is then selected at 1668 as above. This approach follows the policy used for parsing words which is to consider all currently feasible phrase interpretations and eliminating phrase interpretations when they are no longer feasible. If 1682 is false, then the Current-Word has been processed, and the process for the next word begins at 1669 as above.

If the Current-Word is not the first word of the sentence at 602, 1602 is false, and 1606 is next. If the Current-Phrase-Entry has At-Coordination false, 1606 is false, and 1641 is next. If the Current-Word is not the last word of the sentence next, 1641 is false, and 1656 is next. If the Current-Phrase-Entry has In-Coordination false, 1656 is false, and 1663 is next. The current state of the parse is within a clause without coordination. 1663 is true, (CONDITION 1) if the Current-Phrase-Entry can be completed prior to the Current-Word with or without ellipsis, and if the Current-Wordset can start a phrase that can continue the Current-Clause including the start of another clause; or (CONDITION 2) if there is another incomplete clause in the sentence, and if the Current-Phrase-Entry is completable and can complete the Current-Clause, and if Current-Wordset can start a phrase which can continue another incomplete clause in the sentence. First, Syntax Phrase Trees 30 is checked to determine if the Current-Phrase-Entry can be completed either with or without ellipsis. If it can be complete, then each of the Current-Phrase-Entry completions is used to determine if it can continue the Current-Clause in Syntax Clause Trees 30 with or without ellipsis. If one or more of the Current-Phrase-Entry completions can continue the Current-Clause, the Current-Wordset is checked for starting each next phrase which can continue the Current-Clause after one or more of the Current-Phrase-Entry completions. Also, if there are incomplete clauses in the sentence, the Current-Phrase-Entry completions are checked for completing the Current-Clause with and without ellipsis. The Current-Wordset is considered to be able to start a phrase if two conditions are met: the Current-Wordset must start a phrase (with or without ellipsis) that is stored in Syntax Phrase Trees 30; and the phrase meeting the above condition has a type which can either continue the Current-Clause with or without ellipsis following one or more completed Current-Phrase-Entries as determined in Syntax Phrase Trees 30 and Syntax Clause Trees 30, or continue another incomplete clause in the sentence as determined in Syntax Clause Trees 30 if a Current-Phrase-Entry completion can complete the Current-Clause. Each started next phrase is checked for continuing the Current-Clause after each of the Current-Phrase-Entry completions, and those completions which a particular next phrase can continue are associated with that next phrase. Also, each started next phrase is similarly checked for continuing an incomplete clause and those completions which a particular next phrase can continue are associated with that next phrase. The Current-Clause or another clause can be continued with a next phrase in various ways including for example: continuing a main clause without subordinate clauses; continuing a main clause after a completed subordinated clause; continuing a main clause with a starting subordinated clause with a sentence role; continuing a main clause with a starting subordinated clause (with an ellipted conjunction) which modifies an element in the main clause, or continuing a subordinate clause which continues the main clause. The possible ways of continuing the current clause are listed at the phrase sets and/or clause sets which can follow a preceding phrase set or clause set as stored in Syntax Clause Trees 30, and they do not require At-Coordination processing.

1663 is true if the Current-Phrase-Entry can be completed, and if the Current-Wordset can start a phrase which continues the Current-Clause, another clause already started, or starts a new phrase. If 1663 is true for at least one phrase started with the Current-Wordset, Step 1688 is next. Each next phrase meeting the requirements at 1663 is linked with all associated completed Current-Phrase-Entries which it can follow by adding a new entry for each such phrase to the Next-Phrase-Set at 1688. Also, each next phrase which continues an incomplete clause other than the Current-Clause is linked with the associated phrase completions of the incomplete clause which immediately precede the next phrase. First, completed Current-Phrase-Entries are processed for completion: The Current-Phrase-Entry which was found to be completable in one or more ways at 1663 has enough additional entries added, if any, to contain each way in which the Current-Phrase-Entry can be completed. The added entries contain the same information as the Current-Phrase-Entry. Then all such entries are then updated: For all such entries, a pointer to the location in the Syntax Clause Trees 30 where the phrase(s) following a particular Current-Phrase-Entry completion continues the Current-Clause is added to such a corresponding current phrase entry. For each such entry which is completed with ellipsis, a pointer is added to the corresponding current phrase copy as described at 1605. Also, each such entry is marked with PHRASE-END. Those completions which complete a clause are marked with CLAUSE-END. Second, a Next-Phrase-Entry is made for each next phrase which starts a phrase which can follow one or more Current-Phrase-Entry completions by continuing the Current-Clause, or which can follow an entry preceding the Current-Phrase-Entry as would occur for a main clause which is continued after a completed subordinate clause for example. The Current-Wordset is stored in each next entry. Each next entry in the Next-Phrase-Set has a pointer to the phrase in Syntax Phrase Trees 30 where the Current-Wordset matches the start of a phrase. Also, a new entry has a pointer added at 1688 to all completed Current-Phrase-Entries which can precede the phrase started with the Current-Wordset in the Current-Clause, and a new entry can also have an additional pointer to an entry preceding the Current-Phrase-Entry as would occur for a main clause which is continued after a completed subordinate clause for example. Also, each new phrase entry has the type of phrase which meets the condition of continuing the Current-Clause or continuing a different incomplete clause stored in the entry, and the entry has a pointer to the sentence role and its corresponding phrase sets and/or pointers to subordinate clauses in the Current-Clause or the different incomplete clause containing the type of phrase which contains the Current-Wordset in Syntax Clause Trees 30. Those next phrase entries which continue the Current-Clause by starting a subordinate clause are marked Continuing-Subordinate-Clause-Start for subordinate clauses which realize sentence roles, and are marked Separate-Subordinate-Clause-Start for subordinate clauses modifying a Current-Clause constituent. Finally, each new phrase entry has a pointer for ellipsis in a phrase as needed and a pointer for ellipsis of phrases as needed. The ellipsis pointers are added as described at 1605. This completes 1688. After 1688, 1664 is performed next.

The Current-Phrase-Entry can possibly be continued without ending the phrase even if the Current-Phrase-Entry can end with the previous word's wordset. Step 1664 is performed regardless of whether step 1663 finds combinations to be added to the Next-Phrase-Set. After 1688 or if 1663 is false, 1664 is next and is true if the Current-Wordset can continue the Current-Phrase-Entry with and without ellipsis in Syntax Phrase Trees 30. If 1664 is true, next at 1608, an entry is made in the Next-Phrase-Set for each way the Current-Phrase-Entry can be continued with the Current-Wordset as determined in 1664. Each entry in the Next-Phrase-Set continuing the Current-Phrase-Entry contains the same information as described for 1605 above. In addition to the information added at 1605, each entry in the Next-Phrase-Set continuing the phrase of the Current-Phrase-Entry has a pointer to the Current-Phrase-Entry. The pointer from such a Next-Phrase-Set entry to the Current-Phrase-Entry is used to link the phrase entries which belong to a syntax interpretation. Also, PHRASE-END is stored in entries of the Next-Phrase-Set for phrases which are completed with the Current-Wordset, and CLAUSE-END is added if the phrase ends a clause. After 1608, or if 1664 is false, 1665 is next as described above.

If the Current-Phrase-Entry has At-Coordination true at 1606, the Current-Word either precedes or succeeds a coordination indicator or conjunction, and 1606 is true. If 1606 is true, 1607 is next. 1607 is true if the Current-Phrase-Entry has Precedes-Coordination true. If 1607 is true, the Current-Word precedes a coordination indicator or conjunction. Coordination ellipsis is enabled when At-Coordination is true. However, it is possible that At-Coordination is true without the Current-Word being in a phrase which is in a coordinated structure. When this possibility occurs, coordination ellipsis would not occur. Thus, enabling coordination when At-Coordination is true causes correct detection of coordination ellipsis. With 1607 true, the Current-Phrase-Entry could be ended possibly with ellipsis and continue the Current-Clause possibly with ellipsis, and the Current-Wordset can form a single word phrase which continues the Current-Clause possibly with ellipsis, and these conditions are checked in 1613. 1613 is true if these conditions are meet at least one time. Step 1613 is similar to step 1663 except for two differences. One difference is that coordination ellipsis is allowed in 1613 but not in 1663. The second difference is that the phrase started in 1613 must be a complete phrase possibly with ellipsis while the phrase started in 1663 need not be complete. If 1613 is true, then 1609 processes the Current-Phrase-Entry for completion and adds each next phrase and wordset to the Next-Phrase-Set as in 1688, and additionally, 1609 processes the next phrase entries for completion. For each phrase completion added to the Next-Phrase-Set at 1609, a pointer to the location in the Syntax Clause Trees 30 where the phrase(s) following the phrase completion continues the Current-Clause is added to the next phrase entry. Step 1609 marks each added next phrase entry with PHRASE-END. Each next phrase which completes a clause is marked with CLAUSE-END. Any ellipsis in the next phrase is added to the next phrase entry also as in 1605. The In-Clause-Coordination value of the Current-Phrase-Entry is transferred to each next phrase from 1613 that is added in 1609. Also, each next phrase from 1613 is marked with At-Coordination true.

If 1613 is true or false, the Current-Phrase-Entry could possibly be continued with the Current-Wordset with or without ellipsis, and the Current-Wordset must end the continued phrase with or without ellipsis, and these conditions are checked in 1610. 1610 is true if these conditions are met at least one time. Step 1610 is the same as Step 1664 except that coordination ellipsis is allowed only at 1610, and the continued phrase must be completed at 1610. Step 1614 adds each phrase and wordset which meets the conditions at 1610 to the Next-Phrase-Set as in 1608. Additionally, for each phrase completion added to the Next-Phrase-Set at 1614, a pointer to the location in the Syntax Clause Trees 30 where the phrase(s) following the phrase completion continues the Current-Clause is added to the next phrase entry. Step 1614 marks each added next phrase entry with PHRASE-END. Entries which complete clauses are marked with CLAUSE-END. Step 1614 also transfers the In-Clause-Coordination value of the Current-Phrase-Entry to each next phrase entry from 1610. Finally, 1614 marks each phrase from 1610 with At-Coordination true. After 1614 or if 1610 is false, processing continues at 1665 as above.

If Precedes-Coordination is false at 1607, the Current-Word is the first word after the coordination indicator, and thus the Current-Word must start a phrase possibly with ellipsis including coordination ellipsis. If 1607 is false, 1620 is processed next. 1620 is true if the Current-Wordset can start a phrase with and without ellipsis. If 1620 can not start a phrase, processing continues at 1665 as described above. If 1620 is true, 1621 is next. 1621 is true if any of the next phrases started by the Current-Wordset at 1620 is the same type of phrase as the phrase of the Current-Phrase-Entry. At 1621, if the next phrase started by the Current-Wordset is not a modifier, the type of phrase of the Current-Phrase-Entry is the type of the last completed phrase if it has no postmodifiers, or if the last completed phrase is a postmodifier or part of a postmodifier, the type of phrase of the Current-Phrase-Entry is the completed phrase preceding all postmodifiers including phrases and clauses. If the next phrase started by the Current-Word is a modifier, the next phrase is considered to be the same type of phrase as the Current-Phrase-Entry if the modifier type of the next phrase can modify the type of phrase of the Current-Phrase-Entry as defined in the previous sentence. Also at 1621, if the type of phrase containing the Current-Phrase-Entry is a modifier which does not modify an adjacent modifiee, the next phrase is considered to be the same type of phrase as the phrase of the Current-Phrase-Entry if both are the same type of modifier. The Current-Phrase-Entry's phrase type and the next phrase's type are determined by looking at the phrase's type in Syntax Phrase Trees 30. This check at 1621 is true when the phrase of the Current-Phrase-Entry is coordinated with a next phrase. This check is also true when one noun phrase is an appositive of another noun phrase. The appositive possibility is detected after Parsing Step 16 is completed when two noun phrases are found to be marked as In-Coordination without a conjunction. The appositive possibility is determined to be an apposition or coordination of noun phrases with state representation processing to be described later. For each next phrase at 1621 started by the Current-Wordset which is the same type of phrase as the Current-Phrase-Entry, Step 1622 adds such a wordset and pointers as described at 1605 to the Next-Phrase-Set. In addition, a pointer from an entry in the Next-Phrase-Set to the Current-Phrase-Set is added, and each such next phrase entry is marked with In-Coordination as true.

After 1622, 1629 is next, and is true if either the Current-Phrase-Entry or the Current-Clause containing the Current-Phrase-Entry have an adverbial function. This condition is checked because special rules apply to adverbials during coordination. If 1629 is true, then 1631 is next. 1631 is true if any next phrase started with the Current-Wordset which did not satisfy the requirements at 1621 has an adverbial function or is part of an adverbial clause. If 1631 is true for a next phrase, 1632 is next. 1632 adds the Current-Wordset to the Next-Phrase-Set for each such phrase which starts an adverbial with the same method as is utilized at 1622. Also, each added next phrase entry is marked with In-Coordination as true, and is marked with Adverbial-Coordination as true at 1632. After 1632, processing is set to continue at 1623 which is described below. A next phrase entry is added to the Next-Phrase-Set at 1632 if 1631 is true because 1631 implements a special coordination rule for adverbials. The rule is that an adverbial phrase delimited by a coordination indicator or conjunction is coordinated with a neighboring adverbial phrase or adverbial clause even if the construction is not the same type of phrase or is a clause. Thus an adverb can be in coordination with a clause functioning as an adverbial.

If 1629, 1631, or 1633 is false, 1623 is next. Step 1623 is true if at least one next phrase started with the Current-Wordset at 1620 can start a clause with or without ellipsis. Coordination ellipsis is allowed. More than one clause start may be found in the search of Syntax Clause Trees 30 at 1623. If 1623 is true, 1624 is next, and is true if one or more main clause starts are found at 1623. If 1624 is true, 1625 is next, and is true if the Current-Clause is completed at the Current-Phrase-Entry with or without ellipsis. If 1625 is true, 1626 marks all main clause starts with Coordinated-Clause-Start. If 1625 is false, 1627 marks all main clause starts with Interpolated-Clause-Start. After 1626 or 1627, or if 1624 is false, 1628 is next. 1628 is true if subordinate clause starts were found at 1623. If 1628 is true, all subordinate clause starts which continue the Current-Clause are marked with Continuing-Subordinate-Clause-Start at 1637. Also at 1637, all subordinate clauses not continuing the main clause are marked with Separate-Subordinate-Clause-Start. After 1637, or if 1628 is false, 1639 is next. At 1639, each clause start is added to the Next-Phrase-Set as described for 1688 except that the marked information for the clause start is also added to the entry. The Current-Phrase-Entry has already been processed for completion at 1609 or 1614. Also at 1639, each added next phrase entry is marked with In-Coordination and In-Clause-Coordination true. After 1639 or if 1623 is false, there are other clause coordination possibilities which continue interpolated clauses and the next step is 1634.

Step 1634 is next and is true if the Current-Clause is incomplete, and if there is an unprocessed clause preceding the Current-Clause, the Current-Preceding-Clause, and if the Current-Preceding-Clause is incomplete in the same way as the Current-Clause. These conditions are checked by comparing the sentence role of the last completed phrase excluding postmodifiers of the Current-Clause and of the Current-Preceding-Clause in Syntax Clause Trees 30. If the sentence roles are the same, the clauses are incomplete in the same way. Step 1634 is true for an interpolated clause as described in Quirk et al, page 976 for example. If 1634 is true for the Current-Clause and its Current-Preceding-Clause, then 1635 is processed next. At 1635, the Additional-Preceding-Clauses variable is set to false. This variable is used to differentiate between the first preceding clause and subsequent preceding clauses. Then 1636 is processed next. At 1636, if the Additional-Preceding-Clauses variable is false, all phrases found at 1620 (i.e., those that can be started with the Current-Wordset) which can continue the Current-Clause and the Current-Preceding-Clause with and without ellipsis are added to the Next-Phrase-Set as at 1688 with a few exceptions. One exception at 1636 is that all added phrases have a pointer to the Current-Phrase-Entry of the Current-Clause, and all added phrases have separate pointers to the entries of the last wordsets ending the last processed phrase of the Current-Preceding-Clause which are continued by the Current-Wordset. The other exception is the Interpolated-Clause-Continuation, In-Coordination and In-Clause-Coordination variables are set to true for all next phrase entries added at 1636. If the Additional-Preceding-Clauses variable is true, there have been other preceding clauses processed for the Current-Wordset which have resulted in entries added at 1636, and there is at least one more preceding clause which has not been processed at 1636. This preceding clause is the Current-Preceding-Clause. If this variable is true at 1636, each remaining entry that was added to the Next-Phrase-Set during the previous processing of other wordsets of the Current-Word at 1636 is checked for continuing the one or more entries of the Current-Preceding-Clause. All such next phrases which do not continue any entries of the Current-Preceding-Clause have their corresponding entries in the Next-Phrase-Set deleted. Each such Next-Phrase-Set entry which continues the Current-Preceding-Clause has a pointer to each continued entry of the Current-Preceding-Clause added to each such Next-Phrase-Set entry. Also if the Additional-Preceding-Clauses variable is true, entries of the Current-Wordset in the Next-Phrase-Set are checked for continuing the previously processed interpolated clauses. All such Next-Phrase-Set entries of the Current-Wordset which do not continue any entries of one of the previously processed interpolated clauses have their corresponding entries in the Next-Phrase-Set deleted. Each such Next-Phrase-Set entry of the Current-Wordset which continues all of the previously processed interpolated clauses has a pointer to each continued entry of the corresponding previously processed interpolated clause added to each such Next-Phrase-Set entry. After 1636, 1638 is next, and is true if there are one or more remaining next phrase set entries which have been added at 1636, and if there is a clause which precedes the Current-Preceding-Clause, i.e., the next preceding clause, and if the next preceding clause is incomplete in the same way as the Current-Clause, then 1638 is true. If 1638 is true, then the Current-Preceding-Clause is assigned to be the next preceding clause at 1640. Also the Additional-Preceding-Clauses variable is set to true at 1640. Following 1640, the Current-Preceding-Clause is processed at 1636 with the same process described above. If 1634 is false or after all interpolated clauses have been processed, i.e., 1638 is false, 1665 is next as described above.

Another phase of the Parsing Step 16 occurs when a phrase is In-Coordination which means the phrase could be coordinated with another phrase or could be within a coordinated or subordinated clause. If the current phrase has In-Coordination true at 1656, the next step is 1643. Coordination ellipsis is allowed because the Current-Phrase-Entry has In-Coordination true. 1643 is true if the Current-Wordset continues the Current-Phrase-Entry with or without ellipsis. If 1643 is true, 1645 is next and adds the Current-Wordset to a next phrase entry for each different way in which the Current-Phrase-Entry can be continued. Each next phrase entry added to the Next-Phrase-Set contains a pointer the Current-Phrase-Entry, and the added next phrase is marked with In-Coordination true at 1645. The same information stored in an entry at 1608 is stored at 1645. If 1643 is false or after 1645, the adverbial noun combination phrase allowed during coordination may occur, and 1644 is next. 1644 is true if the Current-Phrase-Entry is an adverbial type phrase which is completable with or without ellipsis and which does not have a succeeding modifiee, and if the Current-Wordset can start one or more noun phrases with or without ellipsis. If 1644 is true, the started noun phrases are processed at 1646 next. 1646 adds an entry to the Current-Phrase-Set for each way in which the Current-Phrase-Entry can be completed as at 1688. Each next noun phrase formed with the Current-Wordset at 1644 is added to the Next-Phrase-Set with the same process as described at 1688, and each added next phrase contains pointers to all entries which complete the Current-Phrase-Entry. Also each added phrase entry is marked with Adverbial-Coordination true and In-Coordination true at 1646. If 1644 is false, then 1647 is next, and is true if the Current-Phrase-Entry is a noun phrase which is completable with or without ellipsis and the Current-Wordset starts an adverbial phrase type. If 1647 is true, then step 1646 is performed for completable noun phrases with the Current-Phrase-Entry and for adverbial phrases started with the Current-Wordset. If 1647 is false or step 1646 has been performed, then next at 1651, another possibility is that the Current-Wordset starts a new phrase. The phrase started with the next wordset could continue the Current-Clause or a different incomplete clause as described for 1663. 1651 is true if the Current-Phrase-Entry can end possibly with or without ellipsis and the Current-Wordset can start a phrase possibly with or without ellipsis which continues the Current-Clause or which continues an incomplete clause. If 1651 is true, then 1653 processes all the completions of the Current-Phrase-Entry as at 1688, and all such phrases started with the Current-Wordset are added to the next phrase set at 1653 along with all related information as at 1688 above. The differences between 1653 and 1688 is that coordination ellipsis is allowed at 1651 and is not allowed at 1663. 1653 also sets In-Coordination true for all entries added at 1653. After 1653, 1654 is next and is true if the Current-Phrase-Entry has In-Clause-Coordination true. If 1654 is true, than all next phrases added at 1645, 1646, and 1653 have In-Clause-Coordination marked true at 1655. If 1651 or 1654 is false, or after 1655 is processed, 1665 is next as above.

The last phase of the Parsing Step 16 occurs if the Current-Word is at the last word of the sentence at 1641 which makes 1641 true. If the Current-Phrase-Entry has In-Coordination true, coordination ellipsis is allowed for the steps in this paragraph. Otherwise, coordination ellipsis is not allowed. If 1641 is true, then 1648 is processed next. 1648 is true if the Current-Phrase-Entry is ended with or without ellipsis and can continue its Current-Clause, and if the Current-Wordset forms a complete next phrase with or without ellipsis which can continue and end the Current-Clause with or without ellipsis, or which can continue and end a different incomplete clause if the Current-Phrase-Entry ends the Current-Clause with or without ellipsis. If 1648 is true, the Current-Phrase-Entry and each such next phrase meeting this combination of criteria is processed at 1690. At 1690, the Current-Phrase-Entry is processed for completion as at 1688. Also at 1690, each next phrase is added to the Next-Phrase-Set and is processed for completion as at 1688. In addition each next phrase entry is marked as CLAUSE-END true and each type of clause continuation is marked true. Ellipsis, pointers to the completed phrases from the next phrases processed at 1690, and pointers to the syntax trees are added at 1690 as was described at 1688. If 1648 is true or false, the other possible sentence ending condition is processed at 1649, 1649 is true if the Current-Wordset can complete the Current-Phrase-Entry with or without ellipsis, and if the completed Current-Phrase-Entry can continue and complete the Current-Clause with or without ellipsis. If 1649 is true, then 1650 processes each possible combination of clause ending and phrase ending. Each next phrase with such a combination is added to the Next-Phrase-Set, and is processed for completion. Each phrase ending is marked as CLAUSE-END true, the type of clause continuations are marked true, all ellipsis, pointers to the preceding phrase entry, and pointers to the syntax trees are added at 1650 as described in 1608. After 1650 or if 1649 is false, 1665 is next as above.

1669 is true if the Current-Word is the last word of the sentence and all wordsets of the Current-Word have been processed. If 1669 is true Parsing Step 16 is checked for proper completion at 1670. 1670 is true if the Next-Phrase-Set is empty. 1670 is true if no combination of wordsets of the incoming words formed phrases which formed a clause. If 1670 is true, 1672 informs the Communication Manager of a parser failure. If 1670 is false, 1671 is next and is true if the Next-Phrase-Set contains one entry. If 1671 is true, Parsing Step 16 found one syntax interpretation and the next operation is at 1673 which sets processing to continue at Dictionary Look Up Step 18. If 1671 is false, more than one phrase is left in the Next-Phrase-Set at 1671, and 1674 is next. The Communication Manager is informed of multiple syntax interpretations of the current sentence at 1674. In this case, the next operation depends upon the situation and the application utilizing the processes described above and below. The basic choice is to use one of the syntax interpretations or to use the state representation, experience and the context to select the most likely correct syntax interpretation. The processing in this paragraph completes Parsing Step 16.

DICTIONARY LOOK UP STEP 18

After Parsing Step 16 has finished, after the completion of other function word or state representation processing, or at the invocation of the Communication Manager, the next step is Dictionary Look Up Step 18. Dictionary Step 18 takes: the set of phrases, their constituent wordsets and ellipses if any, and any phrase ellipsis from Parsing Step 16, and performs these following processes as required by the contents of the incoming natural language sentence: generates addresses to state representation words, generates addresses to function word implementation structures, invokes morphological processing, and invokes elliptical processing. Step 18 combines the results of these processes into the Sentence Data Structure. Step 18 completes the syntactic processing of the incoming natural language sentence.

The first activity of Dictionary Step 18 is to access the linked phrase entry structure which represents the syntactic interpretation created in Parse Step 16. The linked phrase entry are traversed from the entry associated with the last word of the sentence to the first word. In this traversal, the phrase ends and starts are used to separate the phrases. The phrases are organized: into coordinated constituents, into possible appositive phrases, into subordinated clauses, into main clauses, into complete clauses from interpolated clauses, and into coordinated clauses. The phrases are separated and organized by utilizing the marked variables associated with entries during Parse Step 16.

The next process of Dictionary Look Up Step 18 is to check each phrase's grammar information in Syntax Phrase Trees 30 and each clause's grammar information in Syntax Clause Trees 30 to determine if the phrase or clause is an interjection or an idiom. Each idiom and interjection has an entry in Dictionary 20. If the phrase or clause is an interjection or idiom, the grammar information contains a pointer to an entry in Dictionary 20 for the interjection or idiom. Idioms are phrases or clauses which have a special meaning not implied by the words in the phrase or clause. Idioms have a Dictionary 20 entry which contains one or more pointers. A pointer addresses a location containing the addresses of the word sense numbers which replace the idiom for state representation processing. If the phrase is an idiom, 18 stores the first pointer from the idiom's Dictionary 20 entry in the Sentence Data Structure. This pointer addresses the set of replacement word sense numbers which represent the idiom. 18 also stores a mark indicating the phrase is an idiom and a pointer to the idiom's Dictionary 20 entry. If the phrase is an interjection, 18 also stores a pointer from the interjection's Dictionary 20 entry to represent the interjection. 18 also stores a mark indicating the phrase is an interjection and a pointer to the interjection's 20 entry. The processing of interjections is described above in the INTERJECTION section. The next process of Dictionary Look Up Step 18 is to use each natural language incoming word's wordset in each phrase which is not an interjection or idiom to access the word's dictionary entry in Dictionary 20. The natural language word's corresponding wordset from Parsing Step 16 is used to select a word sense number or an address and function code from the dictionary entry's data structure. If the entry contains word sense numbers, the text word associated with the entry is a state representation word. If the entry contains an address and function code, the text word is a function word. If the entry contains word sense numbers, the word sense numbers in the applicable partition in the entry are selected. As described in the Dictionary Look Up Step 14 section, the word sense numbers of a base word Dictionary 20 are partitioned by syntactic properties such as: an intransitive verb construction, a word with affixes, nouns modifying nouns, etc. If the text word has one of these syntactic properties with an associated partition in the dictionary entry, its word sense numbers are selected from the partition associated the syntactic property of the text word. Otherwise, the word sense numbers are selected from the partition of all possible word sense numbers. If the text word is for a state representation word without any affixes, no further processing is required prior to semantic processing. Step 18 looks up the word sense numbers associated with the text word's partition address in the Base Word Table, which is depicted in FIG. 3*a*, and incorporates this address in the Sentence Data Structure. The address will be used to access the state representation word structures for semantic processing.

A wordset in a phrase may represent a function. The function wordset of a word has an address and a function code in the word's Dictionary 20 entry. The address indicates where the function's selection and implementation process begins. The code indicates the possible functions. Certain wordsets in Dictionary 20 have a flag which indicates if the wordset can be part of a multi-word function phrase such as: "not the best . . . ". A multi-word function phrase has multiple function words which combine to select a set of functions from the function words. Function words with the flag are checked to determine if they are part of a multi-word function phrase by accessing the grammar information associated with the phrase in Syntax Phrase Trees 30. If the function word is part of a multi-word function phrase, Syntax Phrase Trees 30 contains the address and any code which indicates where the phrase's selection and implementation begins. The code indicates the possible functions and possibly contains an inflection code. The inflection code corresponds to a tense code for verb functions or a plural/singular flag for noun functions. Step 18 incorporates this address and code in the Sentence Data Structure. The address will be used to invoke the function processing. All functions are processed in Function Word Processing Step 22. Step 22 creates several types of general results including: generating state representation addresses, setting parameters for semantic interpretation processes, setting state representation values, and generating state representation relationships and addresses for processing in conjunction with semantic processing.

If the wordset has affixes, the wordset plus affixes may have an associated address descriptor in the base word's Dictionary 20 common table or anomalous partition. A wordset plus affixes has its own address descriptor either because the corresponding state representation word has been preprocessed or the state representation word plus affixes has a unique semantic relation to its base. A word plus affixes has a preprocessed address descriptor to save the overhead of morphological processing. A word plus affixes could also have a preprocessed address descriptor because its unique semantic relation would not access the correct semantic information structure through morphological processing. Step 18 uses the address descriptor to compute a specific address with the base word's designated address or with the first word sense number in the appropriate partition of word sense numbers which is stored in the base word's Dictionary 20 entry. The address descriptor can contain a designated word sense number address for the base word in the morphological word. The designated address could also be to a specific replacement structure composed of word sense number addresses and addresses of function processing, each with an associated function code. If there is not a designated address in the address descriptor, the first word sense number address in a morphological partition is used to compute the specific address. The word sense numbers associated with a base word are partitioned into a set of word sense numbers used in base words of morphological words. This specific address is the address of a state representation structure which is part of a word sense number data structure, or the associated address points to: a word sense number data structure, a phrase structure or a clause structure. The word sense number, phrase, and clause structures are replacement word sense numbers and functions for the morphological word. The specific address can be directly incorporated in the Sentence Data Structure like the address of a state representation word. These pointed to structures contain a mark which indicates if there are alternate semantic interpretations. These structures are ready to be incorporated in the Sentence Data Structure by Step 18 for future semantic processing. These structures can also be created by Morphological Processing Step 24. The contents of these structures is described in the following paragraph.

A word plus affix without an address or address descriptor in its common table or anomalous partition either has a code indicating the type of morphological processing required or the type of morphological processing will be determined from the base word's part of speech, the base word's plus affixes' part of speech, and the affixes at Morphological Processing Step 24. This information is stored in the common table or the anomalous partition associated with a word's Dictionary 20 entry. When Step 18 looks up a word plus affixes without an associated address or address descriptor, Step 18 invokes Step 24 to process the word plus affixes. Step 24 processes the base word plus affixes and produces one of the following results: an address descriptor which is processed to select a portion of the base word's word sense number state representation data structure; a phrase which contains: an address descriptor for state representation word sense numbers, addresses with associated codes of selection and implementation processes for function words, a descriptor indicating phrase heads and phrase modifiers, a mark indicating if there are other morphological processing results possible; a mark indicating a type of required ellipsis processing, or a clause structure of phrases, with each phrase as described in this list. 24 can contain a function which invokes Ellipsis Processing Step 26. In some cases, 26 can be invoked from 24, or 26 must be invoked in later processing. In the latter case, a mark indicating the needed elliptical processing is stored in the result by 24 for later invocation by Step 18. Also, this result from 24 is processed by 18 to select addresses of word sense numbers for state representation words in the phrases or clauses of the result. The addresses, and the phrase or clause structure is incorporated in the Sentence Data Structure by Step 18.

After all addresses have been looked up for state representation word sense numbers and function words, and after all morphological processing has been performed except for ellipsis processing, Dictionary Look Up Step 18 creates the Sentence Data Structure. The Sentence Data Structure contains the following information at the beginning of each phrase: the sentence role of the phrase, the phrase head, pointers to the location of any marked ellipsis in the phrase, pointers to any related ellipsis of phrases, a descriptor of the ellipsis, any morphological processing marks, a pointer to the phrase in Syntax Phrase Trees 30, and a pointer to Syntax Clause Trees 30. The sentence role of a morphologically processed word is transferred to its morphologically generated representation. The morphological processing marks are generated during morphological processing. All other information is contained in the locations addressed by the pointers to Syntax Trees 30 created during Parsing Step 16. Ellipted elements currently contain no information in the Sentence Data Structure except for the pointers to the location of the ellipted elements in the phrase. Ellipted phrases or phrases with ellipsis do contain the following information at the beginning of the phrase in the Sentence Data Structure: the sentence role, any morphological processing marks, a descriptor of the ellipsis, and the pointers to Syntax Clause Trees 30 and Syntax Phrase Trees 30. The phrase elements of the Sentence Data Structure also contains as occurring from the processing of the expressed natural language words in the current sentence: the addresses of state representation word sense numbers, a tense code associated with verbs, a singular/plural flag for nouns, function word codes and their associated addresses of function word selection and evaluation processes for function words, a representation number corresponding to the base word entry of the text word, and a phrase modifier/head flag. The addresses associated with phrase elements were looked up previously in Step 18.

Ellipsis, which has been detected during parsing, is marked within phrases and/or between phrases by Parsing Step 16. Ellipsis can also be marked by processing morphologically formed words. After morphological processing and the Sentence Data Structure has been created, Dictionary Look Up Step 18 invokes Ellipsis Processing Step 26 to replace the marked ellipsis. As Step 18 builds the Sentence Data Structure, each occurrence of ellipsis is stored in the Sentence Data Structure and in a separate list. After the Sentence Data Structure has been created and the above function word processing is completed, and if ellipsis has been found, Step 18 invokes Ellipsis Processing Step and sends a pointer to the list containing each instance of ellipsis in the Sentence Data Structure. Step 26 determines the type of ellipsis and performs the required processing. The result of Step 26 is to replace each instance of an ellipted element or ellipted phrase with addresses, codes, and/or flags either from the current or from a previous Sentence Data Structure, or from known replacements whose addresses are stored in Syntax Phrase Trees 30. The information stored at the beginning of a phrase with ellipsis or an ellipted phrase was stored in the Sentence Data Structure by Step 18 prior to Step 26.

After any ellipsis processing, Step 18 invokes Selectors 50, 60, and/or 70 as required for state representation processing of the sentence being processed. Function word processing is invoked during state representation processing. Typically, Step 18 first sends a pointer containing the Sentence Data Structure's location to Selector 60 if there is a concrete noun, state abstract noun, or clausal abstract noun in the current sentence. Selector 50 looks up word sense numbers for adjectives, 50 processes adverbial modifiers of adjectives, and 50 stores information related to a selected word sense number of an adjective. Selector 60 uses the Sentence Data Structure to select the word sense number of nouns. Selector 60 invokes Selector 70 to select word sense numbers for main sentence roles, i.e., subjects and objects, which are compatible with each other and a verb word sense number of the clause. Selector 70 also selects the word sense number of verbs including there modifiers and assists in the selection of clausal abstract nouns. The word sense number of the state representation words in the current sentence are selected in terms of the context and previously stored knowledge and experience. After the word sense number or all words in a clause have been selected, the clause is related to the context and previously stored knowledge and experience by Purpose Identifier 140. Before describing the state representation processing, Function Processing Step 22, Morphological Processing Step 24 and Ellipsis Processing Step 26 are described.

FUNCTION PROCESSING STEP 22

Function Processing Step 22 performs the function selection and function implementation processes for function words. Function words differ from meaning words in that function words do not have a permanent state representation. Instead, function words imply processing of the state representation to achieve results in terms of the state representation. For example, determiners such as "the" imply whether a noun reference can be to a specific instance of a noun or to a general noun. Every part of speech has function words. However, nouns implying functions are implemented as pronouns. A function word noun is implemented as a pronoun whose referent is obtained with a specific associated function. For example "today" has an associated time setting function. The time setting function sets the referent of "today" to be the value of the "current day".

PRONOUNS

Pronouns are function words which take the place of verbs, adjectives, adverbs or most commonly nouns. Other words are also processed as pronouns. Nouns which imply a specific function and noun classes with specific associated functions can have their functions selected with the same process used for pronouns. An example of a noun implying a specific function, "today" was discussed in the previous paragraph. An example of a noun class with associated functions is numbers. A number can have a specific representation associated with it in the context such as "18" of Step 18 in this description. Numbers can also imply: a noun with the quantity of the number, an element of an mathematical calculation, an adjective with a quantity, etc. In the following, the term pronoun will refer to words processed as pronouns including: pronouns, nouns with specific associated functions, or noun classes with specific associated functions. FIG. 6a illustrates the data structure associated with each pronoun. The Referent Properties of FIG. 6a contains the part of speech which the associated pronoun can represent. Generally, the part of speech which the pronoun has in the sentence is the same part of speech as the pronoun's referent. For example, "do" in FIG. 6a has a verb part of speech for its referent property. Note that "do" applies to all tenses of the non-auxiliary use of "to do". A sub-entry of a pronoun's entry, such as the first line in the "it" entry in FIG. 6a, can contain properties describing the referent after the part of speech. For example, the properties for pronouns with a noun part of speech in the sentence can include one or more of the following as needed: person, case, number, gender, place, thing, time, etc. Also, a pronoun having a noun part of speech in a sentence can have a referent which is not a noun such as a clause or a sentence, e.g., "it" in FIG. 6a. Actually, the properties are listed for clearness of this description. The data structure corresponding to FIG. 6a. has a sub-entry with a category number which corresponds to a set of properties. Each category number has an associated list of elements with the elements having the properties corresponding to the category. The elements of a list are selected by Context Memory Controller 125 from the conversation and stored in Context Memory 120. A pronoun often has more than one referent part of speech and one or more categories, i.e., sets of properties, for each referent part of speech. Within a part of speech, the categories are listed in order of relative frequency.

There are two types of properties with corresponding categories which do not have a corresponding list of elements stored in 120. One of these properties has the value of UNIQUE. The UNIQUE value indicates that the pronoun has only one possible referent. For example, the UNIQUE value is assigned to "I" and to nouns which imply a function such as "today". Also, there can be a special function number in the Special Grammatical Function category associated with sub-entry containing a UNIQUE value. The special function number points to the function which obtains the referent. The special functions perform specific operations and are part of Function Step 22. The special function obtains the referent and the address of the result, the referent, is stored in the Sentence Data Structure. The other type of property, having a SPECIAL MEANING value, is for a pronoun which has a special meaning associated with a specific usage. This can occur in a clause such as "It is windy". This special meaning in clauses is detected in the Syntax Trees 30 for specific wordsets and a specific clause. A special meaning of such a pronoun is associated with a specific usage by storing a special meaning code for the clause containing the special meaning of the pronoun in the clause's associated grammar information. When such a pronoun is processed for pronoun referent selection, it has a SPECIAL MEANING referent property and has an associated special grammatical function number in its Special Grammatical Function category for each of its special meanings. When this referent property is encountered, the grammar information of the clause is checked for having a function number which matches a special function number associated with the referent property. If it does, the function is invoked and the address of the result is stored in the Sentence Data Structure for subsequent state representation processing. The function associated with the example "It" replaces "It" with addresses of the state representation of "The weather".

Some pronouns also have other functions at the same time in addition to substituting for a referent. For example, "some" can have a pronoun function and an indefinite adjective function simultaneously. For example, "Some will pass." In this example, "some" selects a portion of its referent. If "Some" refers to "students", than "Some" is equivalent to "Some students", which is equivalent to "A portion of the students". Multiple function pronouns have their additional functions stored in their Special Grammatical Functions category as shown in FIG. 6a. The additional functions are stored in the Sentence Data Structure during processing of the pronoun. The stored function is then invoked during subsequent state representation processing. Another type of additional meaning can be implied by the category of a pronoun's referent. For example, consider "You married that." In this example the use of "that" referring to a person implies the added meaning of the speaker having disdain for the person referred to by "that" in the sentence. Such types of usage also have a function in the pronoun's Special Grammatical Function category of the sub-entry corresponding to usages with additional meaning. This function associates the additional state representation implied by the referent usage with the clause containing such a pronoun.

Each pronoun also has a confidence level associated with it. A pronoun can have a different confidence level for each of its sub-entries. The confidence level varies from low, 1, to high, 4. The 1 confidence level is for pronouns with multiple categories and multiple possible referents for the categories. The 2 confidence level is for pronouns with a single referent category and multiple possible referents. The 4 confidence level is for pronouns with a single referent. The confidence levels are assigned to pronouns, other elements requiring function processing, and state representation words. The confidence level is used in subsequent state representation processing for selecting elements to be reinterpreted when the current interpretation is not acceptable.

Figure 6B:
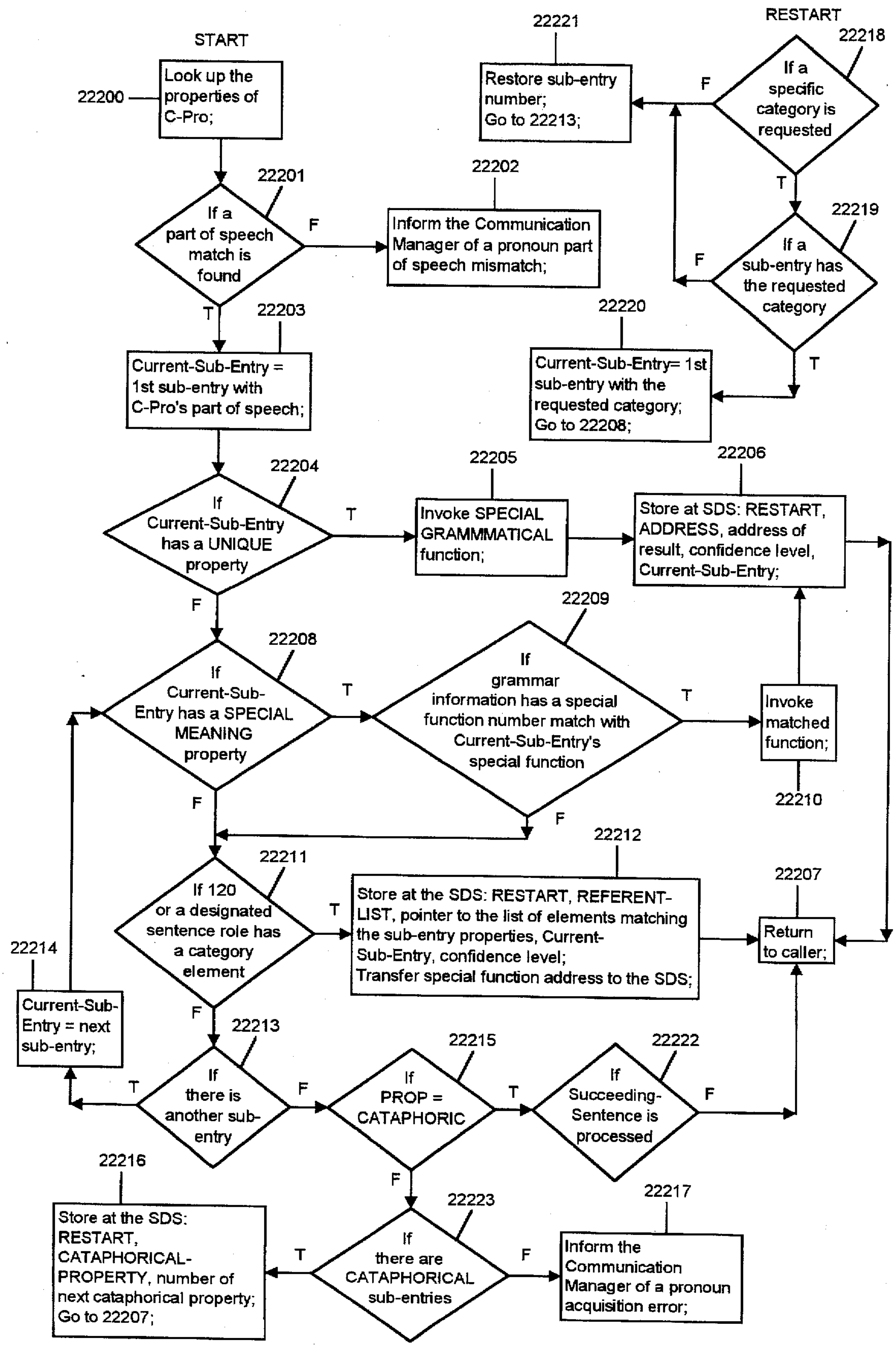
FIG. 6*b* is a flow chart of the pronoun referent selection method.
Figure 7C:
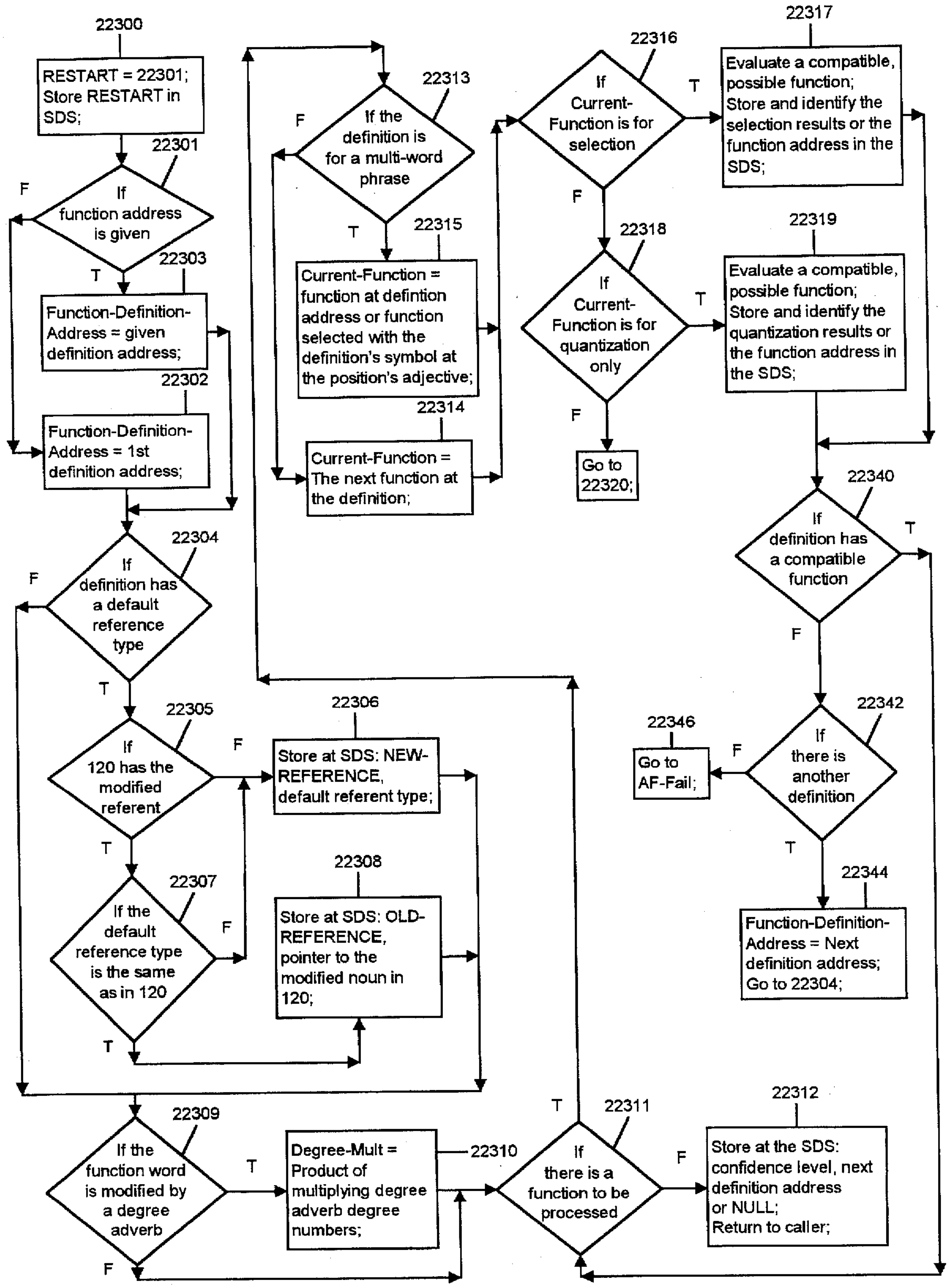
FIGS. 7*c*–7*d* is a flow chart of the adjective function word selection and evaluation method.
Figure 7D:
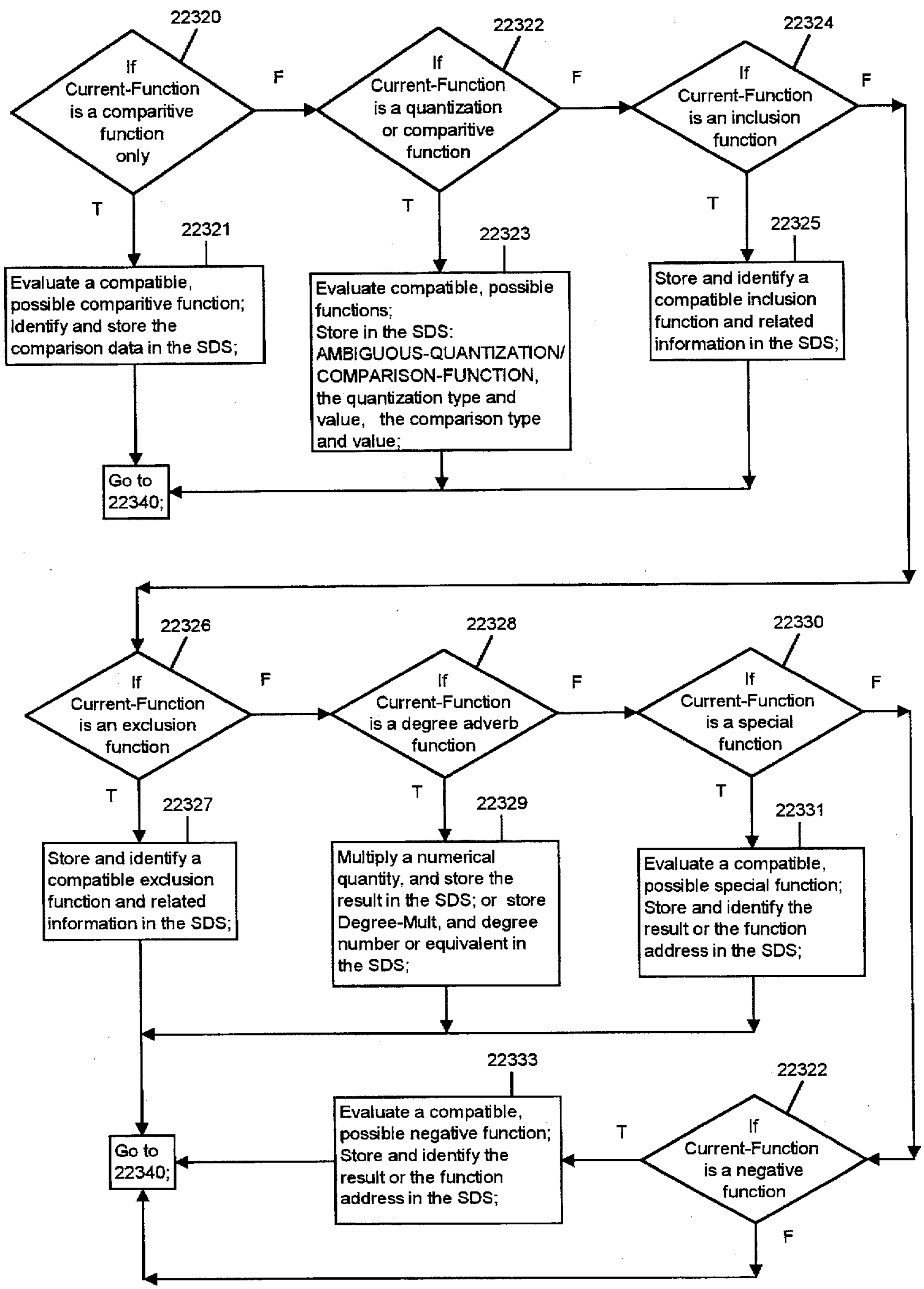

The processing of pronouns is to perform a select/accept/reject cycle. A rejection is followed by a repeat of the select step. The selection process is illustrated in FIG. 6b. The selection process either processes the UNIQUE or SPECIAL MEANING properties, or the selection process look ups the list of elements in the Context Memory 120 having the category, i.e., set of properties, associated with the current sub-entry. One other selection process is to select elements in a sentence which have the properties of the category. If there is no element in the category list in the context, another sub-entry with a different category for the pronoun is tried. The next referent category has the same part of speech, but has a different referent category. This selection process repeats until a non-empty element list has been found, or until all possible referent categories with the same part of speech have failed. If a non-empty list is found, a pointer to the list is stored in the Sentence Data Structure for the pronoun. The pronoun selection process is suspended, and other function and state representation is performed at Step 18. If all referent categories have failed and the referent type does not have a cataphoric property, the Communication Manager is informed of the pronoun processing error. If the referent type has a cataphoric property, i.e., a referent which comes after the pronoun, pronoun processing is suspended either until new referents are processed in the current sentence, or if necessary, the next sentence has been prepared for state representation processing. Then the pronoun selection process is restarted, but the possible referents are limited to new elements in the context from the next sentence. One of the possible referent categories is selected as above.

The state representation processing of clauses of the sentence includes an evaluation of the interpretation of the sentence, including the syntax and function word processing, for being consistent with the context and stored experience. If the evaluation is consistent, the pronoun processing is complete. If the evaluation is inconsistent, often the processing indicates what requires reinterpretation, including a part of the syntax or function processing. Otherwise the Communication Manager selects the element to be reinterpreted based upon the confidence level associated with the element. If the evaluation fails, and the pronoun requires reinterpretation, the referent is rejected and the pronoun selection process is restarted. A specific description of pronoun processing is described next.

Function processing of pronouns, PRO-SEL, begins at Step 22200. 22200 is invoked with the designated pronoun in the C-Pro parameter. Step 22200 looks up the pronoun in the Pronoun Property Table, FIG. 6*a*. After 22200, 22201 is next and is false if the pronoun's entry does not contain a sub-entry with the same part of speech as the pronoun's sentence role. If 22201 is false, Step 22202 informs the Communication Manager of a pronoun part of speech match failure. If 22201 is true, 22203 is next. Step 22203 sets the Current-Sub-Entry to be the first sub-entry which has the same part of speech in its referent type property list as the pronoun's sentence role in the clause containing the pronoun. The sub-entries contain the categories, i.e., sets of properties, which will be used to select a referent list. 22203 also sets RESTART to 22218. RESTART contains the value of the step which restarts the pronoun process. After 22203, 22204 is next, and is true if the Current-Sub-Entry's category list contains a UNIQUE value. If 22204 is true, 22205 invokes the associated special grammar function which obtains the address of the referent of the pronoun. After 22205, 22206 is next. Step 22206 finishes the UNIQUE pronoun processing, and sets up a data structure for restarting pronoun processing. 22206 stores the following in the pronoun's position in the Sentence Data Structure: RESTART, ADDRESS, the address of the result, the confidence level of the sub-entry, and the Current-Sub-Entry. ADDRESS indicates that the pronoun entry contains the address of the pronoun referent. After 22206, step 22207 sets processing to continue processing at the caller of this process. If 22204 is false, 22208 is next, and is true if the Current-Sub-Entry's category contains a SPECIAL MEANING value. If 22208 is true, 22209 is next, and is true if the clause's or sentence role's grammar information in its data structure in Syntax Clause Trees 30 contains a special grammar function number which matches a special function number in the Special Grammatical Function category of the Current-Sub-Entry. The clause which has the grammar information contains the pronoun under processing. If 22209 is true, 22210 invokes the matched function. After 22210, pronoun processing is completed at 22206 as described above.

If 22208 is false, or if 22209 is false, the pronoun referent is obtained from the context of the conversation, and 22211 is next. 22211 is true if the designated part of the sentence or the Context Memory 120 contains one or more elements in the category of the Current-Sub-Entry, i.e., the property list, of the Current-Sub-Entry. The properties in a property list of a pronoun sub-entry correspond to the properties of the elements of the corresponding category list maintained in Context Memory 120. However, the CATAPHORICAL property does not apply as a property for selecting a pronoun referent. The designated source of the pronoun referent is determined by the PROP invocation parameter. If PROP is null, the designated source is Context Memory 120 and the part of the current sentence preceding the pronoun. If PROP is CATAPHORIC and the part of the current sentence succeeding the pronoun has not been processed for state representation, the designated source is the part of the current sentence succeeding the pronoun. If PROP is CATAPHORIC and the part of the current sentence succeeding the pronoun has been processed for state representation, the designated source is the sentence succeeding the current sentence. Note that the lists in Context Memory 120 indicate which elements are from a particular part of a sentence. If 22211 is true, 22212 completes pronoun processing. 22212 creates a list of SDS pointers to elements contained in the designated part of the sentence. 22212 stores the following in the pronoun's position in the Sentence Data Structure: RESTART, REFERENT-LIST, a list of SDS pointers combined with a pointer to the category list in 120 from 22211, the Current-Sub-Entry, and the confidence level of the sub-entry. The REFERENT-LIST symbol indicates that the pronoun processing resulted in a list of possible referents. Step 22212 also transfers the address of a special function contained in the Special Grammatical Function category of the Current-Sub-Entry to the pronoun's position in the Sentence Data Structure. The operation of 22212 is separated into storing and transferring operations because the storing operation always has an element to store, but the transferring operation only stores an element if it is present in the sub-entry. Not every sub-entry contains a special function. The special function address will be accessed to invoke the function in subsequent state representation processing. After 22212, 22207 continues processing at the caller of this process.

22211 is false because the designated part of the sentence or the context does not contain an element in the category corresponding to the properties in the Current-Sub-Entry property list, and 22213 is next. 22213 is true if there is another untried sub-entry of the pronoun's entry with the same part of speech as the pronoun. If PROP has a value of CATAPHORIC, 22213 only checks if there is another untried sub-entry with the CATAPHORICAL property with pronoun's part of speech. If 22213 is true, 22214 sets the Current-Sub-Entry to the selected next sub-entry. After 22214, processing continues at 22208 as described above. If 22213 is false, 22215 is next, and is true if PROP has a value of CATAPHORIC. If 22215 is false, 22223 is next, and is true if one or more of the sub-entries of the pronoun contain a CATAPHORICAL property. If 22223 is true, no sub-entry category of the pronoun or the preceding part of the sentence contained elements, but at least one sub-entry has a cataphoric referent. If 22223 is true, 22216 stores the following information in the pronoun's position in the Sentence Data Structure: RESTART, CATAPHORICAL-PROPERTY and the number of the next sub-entry with a CATAPHORICAL property. When the CATAPHORICAL-PROPERTY symbol is encountered in state representation processing, the clause containing the symbol is suspended. In subsequent state representation processing when the current sentence has been completed, Step 18 checks if there is a suspended clause, the processing of the clause is restarted with referents selected after the pronoun in the current sentence. PRO-SEL is invoked with the PROP parameter set to CATAPHORIC at the selector as is described below. If the pronoun referent is not obtained in the succeeding part of the current sentence, processing of the clause is restarted by Step 18 after the succeeding sentence is processed. After 22216, 22207 is next as described above. If 22223 is false, no suitable referent can be obtained, and 22217 informs the Communication Manager of a pronoun referent acquisition error. If PROP has a value of CATAPHORIC at 22215, 22215 is true, and 22222 is next. 22222 is true if the succeeding sentence is processed for state representation. If 22222 is false, the C-Pro pronoun has been unsuccessfully processed for a cataphoric reference in the sentence containing the pronoun in the part of the sentence succeeding this pronoun, and 22207 is next and returns to the caller, Step 18. In this case, the cataphoric reference will be checked for in the succeeding sentence in subsequent processing of PRO-SEL. If 22222 is true, the C-Pro pronoun has been unsuccessfully processed for a cataphoric reference in the sentence succeeding this pronoun, and 22217 is next. The Communication Manager is informed of a pronoun referent acquisition error at 22217.

In subsequent state representation processing, the current possible referent list may not contain a suitable referent, i.e., a failure occurs. One failure type occurs at Selectors 50, 60 or 70 when the selector may determine that the current referent list is the wrong category for the referent. For example, the referent list could have the wrong category, i.e., the wrong properties, because the clause requires a clause referent for the pronoun instead of the current list's category as a type of noun referent. Another failure possibility is that none of the elements in the current list are compatible with the other sentence role state representations in the clause at the selector. Another failure possibility is that the referents in the list do not form a clause which is consistent with the current context or previously stored experience and knowledge. Another failure possibility is that the clause is not consistent, and the Communication Manager selects the pronoun to be reinterpreted and instructs the selector to obtain another referent with all referents in the list having previously been tried unsuccessfully. Another failure possibility is that the pronoun has a CATAPHORICAL property, and the processing has been suspended until the next sentence is processed as described above. Upon the occurrence of one of these failures, the selector restarts pronoun processing immediately for all but the failures related to a CATAPHORICAL property. The CATAPHORICAL property failures are started when a suitable referent is possibly available as described above.

The selector restarts pronoun processing by accessing the pronoun's position in the Sentence Data Structure to obtain the RESTART value. The RESTART value, 22218, is the step which restarts pronoun processing. The selector can send a request for a specific category list as described above. Upon restarting, 22218 is performed first. 22218 is true if the selector has requested a specific category. The CATG invocation parameter is null if there is not a specific category, or CATG contains the specific category. If 22218 is true, 22219 is next, and is true if the pronoun's entry contains a category which was requested. If 22219 is true, 22220 sets the Current-Sub-Entry to be the sub-entry corresponding to the requested category. After 22220, processing continues at 22208 as described above. If 22218 is false, or if 22219 is false, 22221 is next. 22221 restores the Current-Sub-Entry to be the sub-entry number contained in the pronoun's position in the Sentence Data Structure. This sets up pronoun processing to continue at the next sub-entry. After 22221, processing continues at 22213 as described above.

ADJECTIVE FUNCTION WORDS

These adjectives are function words which affect the state representation of the nouns they modify. The articles such as "a", the", the zero article and other such adjectives indicate whether a modified noun is a specific or general reference to the noun. A specific noun reference exists in the context or in stored experience, and has one state representation instance for each different specifically referenced noun. Specific and general reference nouns have an associated group descriptor which includes a group size. For singular count nouns, the group size is one. For noncount nouns, the group size is "noncount" A plural specific reference noun has a group size associated with the state representation for identical instances of the noun. However, a plural specific noun can have a state representation for each different member or subgroup in the group. Each state representation associated with a specific plural noun also has a group descriptor. A general noun reference is a composite of a subset of all the specific nouns which have been stored in experience, and can reference parts of several state representation instances of the referenced noun. Each composite of specific nouns describing a general reference noun has a group descriptor. There can be more than one composite for a general reference noun. Also, a plural noun can have a mixture of specific or general references. Another way to look at these reference types is that they access the state representation of a noun in different ways. A general noun reference accesses the typical instance of the noun, but all state and property values stated or implied in the conversation replace the corresponding typical value. It is possible for different usages of general reference noun in a conversation to have inconsistent values for one or more states or properties. Inconsistent means that the combination of states and properties never occur together. Inconsistent values cause multiple versions of a general noun to be formed. Each version differs from the other versions by having a different value for one or more states or properties which are inconsistent. The version which is consistent with the sentence and context is selected. The specific reference accesses a single instance of state and property values. A specific reference instance noun can not have more than one value for a state or property. Also a specific reference can not have state or property values which are not consistent.

The article "a" nearly always implies a general reference, and "the" nearly always implies a specific reference. The zero article is the absence of an article. Note that the zero article is detected in Syntax Phrase Trees 30. The zero article nearly always implies a general reference, and is the plural/noncount equivalent of "a". One case when "a" refers to a specific reference is when the source of the conversation assumes that the noun is unknown to the receiver when the noun is introduced in a conversation. There are a few cases when "the" modifies a singular noun with a general reference. One case occurs when the reference is to the typical member of the class. "the" also has an implied general reference when it modifies a plural nationality noun (e.g., "the Americans") and when it modifies adjectives which refer to a group of people (e.g., "the brave"). One case when the zero article implies a specific reference is when the noun phrase represents a unique role or task (e.g., "He is (zero article) president of the company.") The functional processing for the articles and other adjectives implying a reference type is to store the default reference type and an associated identifier in the group descriptor. The group descriptor is stored at the adjective's position or the position of the first function word of a phrase comprised of multiple function words in the Sentence Data Structure (SDS). However, special cases are detected and select the default for the special case. If the referenced noun is stated with a different default reference type, the reference is initially assumed to be a new reference different from the previous reference.

The default reference type may be updated with subsequent state processing of the conversation by Selector 60. The referenced noun is initially assigned the default type. If the noun has a general reference or has a specific reference which is currently not defined such that a single instance in Memory 80, 90, or 100 is accessed, Selector 60 assigns the noun to address the typical instance of the noun. The case of "the" modifying a singular general reference noun is detected in subsequent conversation. For example, a noun preceded by "the" is initially assigned the specific reference type addressing the typical case on its first reference if such a noun was not specified sufficiently to select only one instance. If the noun continues to select a single instance, it is a specific reference. If the noun is described to have inconsistent characteristics, the noun is changed to a general reference type. If a general reference noun deviates from the stored typical reference, the general reference noun's characteristics are stored as the typical case with the deviations stored in Context Memory 120. The exception case of the zero article modifying a specific role or task, which are abstract nouns, is handled by the way abstract noun state representations are accessed in Memory 100. Briefly, abstract nouns accesses generally result in finding an entity in the context or experience which meets the characteristics of the abstract noun representing roles or tasks. Thus, in accessing the role or task abstract noun, if a specific entity is found, the reference is specific. Otherwise if only a general reference entity is found, the reference is general.

If the noun has already been accessed and the type of reference is changed from general to specific, the noun is marked specific assumed unknown by Selector 60 if the previously general noun is consistent with the new specific noun reference. This exception case for "a" results in use of the typical instance of the referenced noun initially. The case can be a mechanism for indicating that the text source is describing a type of specific reference noun which the source assumes is unknown to the receiver, i.e., a specific unknown reference. Thus if a general reference noun is changed to a specific reference, it is marked a specific assumed unknown reference. A specific unknown referenced noun is assumed to have typical state and property values except for state and property values set from the conversation which differ from the typical values. In this regard it is similar to the representation of a general reference noun. However, a specific unknown reference noun must have only a single value for a state or property and must have all state and property values allowed to occur concurrently, i.e., be consistent. Both these conditions differentiate the specific unknown reference from the general reference. In summary, the process provides a method for accessing general and specific noun references. Also, the exceptional article and other function adjective reference implication cases are handled by detection mechanisms which apply the proper reference type.

The function word adjectives often have a reference setting type function and one or more other functions associated with associated with them. For example, the demonstrative adjectives, "this", "that", etc., implies a function of setting the noun they modify as being relatively near or far with respect to time or space when a "this/that" or "these/those" pair is used to modify referents with different time or space values. "This" implies its modified noun is relatively near. "That" implies its modified noun is relatively far. "This" is used to modify nouns related to time when the time is present or future. "That" modifies time nouns for past times. The demonstrative adjectives also imply a default specific reference for the modified noun. The demonstrative adjective's function processing is to identify and store the specific reference type and the near/far state indicator in the demonstrative adjective's position or the position of the first word of a multiple function word phrase in the SDS for later assignment to the modified noun's group descriptor. The reference type and near/far state indicator is accessed during interpretation of the state representation (to be described below). The near/far state is used to differentiate non-time nouns with respect to space at least conceptually. The near/far state is used in the state representation of time to differentiate the past from the present and future. This near/far indicator setting is an example of a special function associated with function word adjectives.

Some of the indefinite adjectives (e.g., "all", "each", "some", "many", etc.) have two basic functions associated with them or as part of combinations of them with other function words. One basic function is to set a selection method for the members of a group modified by an indefinite adjective. A group of members is implied by a plural noun. For example, "each" selects all members of a group one at a time. The other basic function sets various types of quantizations. The indefinite adjectives can also set the reference type. Usually the indefinite adjectives modifying a plural noun indicates a general reference. "both" is an exception. Usually the indefinite adjectives modifying a singular noun indicate a specific unknown reference. The indefinite adjectives can usually combine with "of" to select a portion of a specific group noun (e.g., "many of the girls"). These multi-word function phrases such as "some of" are detected in Syntax Phrase Trees 30, and the information to select the proper function processing is stored there in an associated grammar information structure.

The indefinite adjective function processing includes setting the default reference type for the modified noun. If the indefinite adjective has a selection function, the group descriptor is marked to indicate the members to be selected according to the indefinite adjective function. The group descriptor contains: a referent type, a group size, a group selection criteria, exclusion functions and related information, inclusion functions and related information, comparison functions and related information, and other information implied by modifying function words. For example "each" has a group descriptor containing a group size equivalent to "the whole group". The selection criteria of "each" is equivalent to "one group member at a time". The reference type, group size, and selection criteria are identified and stored in the adjective's position or the position of the first word in a multiple function word phrase in the SDS. This information is used in subsequent state representation processing when the group has been identified. The group descriptor describes the range of membership in the group. Indefinite adjectives with a selection function can be modified by structures with exclusion functions (e.g., "all but Tom"), inclusion functions (e.g., "all students including Tom"), degree adverbs (e.g., "almost every"), negation functions (e.g., "not all students"), and quantization adjectives (e.g., "each 10"). These functions modify the group descriptor contents or add additional information to the group descriptor. These additional functions are stated in multi-word function phrases which are detected in Syntax Phrase Trees 30 and stored there as a phrase function associated with the function word phrase in the containing phrase's grammar information. These multi-word function phrases occur in patterns. For example, the multi-word phrase "not nearly all the students" is an instance of the pattern: (negation function) (degree adverb) (selection adjective) (article) (group or plural noun). Each pattern has a set of functions. The set of words filling a pattern correspond to parameters used by the set of functions associated with the pattern. The parameters and set of functions are processed to realize the functions associated with a particular instance of a multi-word function pattern. The functions or results are identified and stored in the portion of the group descriptor normally associated with the function in the first function word's position in the SDS.

Exclusion functions exclude members from a group. The exclusion portion of the group descriptor is appended with a function address for the exclusion function and pointers to the excluded members. The exclusion function is then executed in subsequent state representation processing when the group and the excluded members have been identified. The exclusion function can also set criteria for excluding members. These excluding criteria are also stored in the exclusion portion of the group descriptor. Also the exclusion function can be a subordinate clause which typically sets criteria for selecting excluded members or sets conditions when the selected members are excluded. Exclusion clauses are detected by position and the subordinating conjunction in Syntax Phrase Trees 30. Such exclusion functions have an associated pointer to the start of the exclusion clause. The start of the exclusion clause is in the SDS. The exclusion function, and any exclusion criteria are identified and stored in the exclusion function portion of the group descriptor of the first function word's position in the SDS. The exclusion function is executed when the state representation processing has identified the group and has evaluated the clause of the exclusion function. Then the excluded elements are removed from the group, or the group descriptor is qualified with the exclusion function by including a pointer in the group descriptor which points to the state representation of the exclusion clause. The group descriptor or a pointer to a group descriptor is stored in Memories 120, 80, 90, or 100. Inclusion functions are processed as the exclusion functions are. The difference between inclusion functions is that they either specificly include members, describe criteria for selecting members, or set conditions for the inclusion.

Negation of a selection adjective causes some possible changes to the group descriptor. Also, a negation function in a multi-word function including a selection adjective can cause different changes for the negation of the same single selection adjective without the other words in the multi-word function. For example, one change caused by a negation function is to zero the group size of the group descriptor (e.g., "not any"). Another example change caused by a negation function is to imply a less than default group size (e.g., "not all" changes the group size from "entire" to "less than entire"). Another example change caused by a negation function is to alter the selection criteria (e.g., "not just any" changes the selection criteria from "none" to "unspecified criteria"). A negation function can also change the function of exclusion functions. For example, "not any except this car", selects a group which only includes "this car". The negation function associated with a selection function or other multi-word function phrase is stored in The Adjective Function Definition Table (to be described below) and is selected by the phrase. After selection of the negation function, the function is performed and the result or the negation function is identified and stored at the adjective or the first word of a multi-word function phrase in the SDS for subsequent execution. The adjective's position or the first word of a multi-word function phrase is called the NORMAL POSITION.

Degree adverbs modifying selection adjectives usually modify the group size of the group descriptor. Degree adverbs which diminish the modified entity have an associated degree number which is typically less than one but greater than zero. The degree number is obtained by Dictionary Look Up Step 18 with a call to adverbial processing as described below. The degree number is stored in the SDS at the degree adverb's position by 18. A degree adverb can also be modified by other degree adverbs (e.g., "very nearly every"). These degree adverbs modifying other degree adverbs which amplify degree such as "very" have an associated degree number greater than one. The degree numbers associated with all modifying degree adverbs are typically multiplied together, and the result is typically multiplied by the group size, and the result replaces the group size. The group size is identified and stored in the group descriptor at the normal position in the SDS. A degree adverb would be the first word in "very nearly every" for example. Normally, the exact group size is not known during the processing of function word adjectives. However, the group size multiple is calculated, identified and stored in the SDS at the normal position. In subsequent state representation processing, the modified noun and its group descriptor are identified. Then the group multiple stored in the SDS is multiplied by the identified group size. If the group size is known, the known value is used. If the group size is not known, the typical group size associated with the noun comprising the group is used. An exception to the degree adverbs modifying selection adjectives occurs for "any". The degree adverb modifying "any" changes the selection criteria of "any" from the equivalent of "none" to "unspecified criteria" (e.g., "nearly any student"). The quantization adjectives either effect the group descriptor or the selection criteria when they are combined with selection adjectives in multi-word function phrases. The quantization adjectives are described below.

The members of the group modified with a selection adjective are obtained through using the group descriptor with the selection criteria by Selectors 60 during state representation processing which succeeds function processing. The selected group members have property and state values set when the state representation of the clause is processed. If the group modified by a selection indefinite adjective is enumerated in the context, the selected group members can be selected and set to the state and property values which the noun representing the group is set to in the clause. Consider the example: "Tom, Dick and Harry are students . . . Each student passed the exam." In this example, "each student" is replaced by "Tom", "Dick", and "Harry" individually for state representation processing. Thus, the state representation context has the equivalent of "Tom passed the exam", "Dick passed the exam", and "Harry passed the exam".

If an enumerated group is modified by an adjective function word or multi-word function phrase which modifies the entire group, the individual members of the group are modified by the function adjective or multi-word function phrase, and each individual member has its state representation modified by the containing clause. If an enumerated group modified by a function adjective or multi-word function phrase has less than the entire group modified by the function adjective or multi-word function phrase without indicating the excluded members (e.g., "any student"), an additional group representation is added in Context Memory 120 for the modified group, and the state representation of the modified group is set to state and property values from the clause interpretation. The additional group partition is linked to the noun's group representation. If the group modified by a function adjective or mult-word function phrase is not enumerated by member and the function adjective or mult-word function phrase modifies the entire group, the state representation of the group is set to the state and property values implied by the clause containing the group. If such a group is modified by a function adjective or mult-word function phrase which modifies less than the entire group, an additional group representation is added to Context Memory 120 with the modified portion indicated and has the original group's state and property values except for the state and property values changed by the clause containing the selected portion of the group. The representation of the portion of such a group is linked as part of such a noun's group representation.

A group without enumeration is represented as a set of nouns which has typical state and property values except for those set in the conversation including those which indicate group state or property values in Context Memory 120, Memory 80, Memory 90, or Memory 100. A group with enumeration is represented as a list of specific nouns. A noun group with or without enumeration has a group descriptor which contains any partition information. This partition information designates partitions of the group which contain state and property values which differ from the entire group. Partitions can occur when less than the entire group is modified. A group descriptor or a pointer to a group descriptor is stored in Memories 120, 80, 90, or 100. A group descriptor and the specific and/or typical reference nouns comprising the group are linked by group relation indicators in Memories 120, or 90. The group descriptor stored in the SDS is the basis for the processing which can result in the modification or creation of a new group descriptor in Memories 120, or 90.

If the indefinite adjective modifying a noun group has an associated quantization type and quantization value. The quantization type has an associated function which utilizes the quantization value as a parameter. The quantization functions set information in the group size or group selection criteria of the modified noun. The quantization type and value are identified and stored in the SDS for subsequent processing. The quantization types include: relative portion quantization (e.g., "some"), relative quantization relation (e.g., "more"), approximate quantization (e.g., "a couple"), numerical quantization, order quantization (e.g., "first"), and multiplier quantization (e.g., "twice"). From the example in a previous paragraph, "Some of the students passed.", the function of "Some of" is to quantize a partition of "the students" by setting the partition's group size with a value associated with "Some". The quantization value associated with an indefinite adjective such as "Some" is a numerical fraction which varies from zero (e.g., "none", "no") to less than one (e.g., "quite a lot") to one (e.g., "all"). The quantization type and value for a relative portion quantization adjective are identified and stored in the group size of the group descriptor at the normal position in the SDS for processing after the modified group has been identified or created. For this type of indefinite adjective modification of an enumerated group, the enumerated group representation has a pointer to a group representation without enumeration with the group size set by the modifying indefinite adjective and with the state and property values of the group representation changed by the containing clause. The same group representation would be created for a nonenumerated group which is modified by an indefinite adjective which quantifies a portion of a group. If the group is enumerated, the size is known. The size may also be known for a nonenumerated group. If the group size is not known, the typical group size associated with the noun comprising the group is used. The quantization function for most of the relative portion adjective multiplies the group size by the adjective's quantization value and stores the result in the group size of the group descriptor of the modified noun after the noun has been identified or created. The quantization value associated with the relative portion quantization adjective "enough" is a descriptor which contains a pointer to a state. The state associated with "enough" is equivalent in meaning to "sufficient quantity", and is owned by the noun group modified by "enough". The quantization value descriptor has a value which is equivalent in meaning to "sufficient" The quantization type and value are identified and stored in the group size of the group descriptor at the normal position in the SDS for processing after the modified noun group has been identified or created. The processing assigns the state and value to the group size of the modified noun group. Another type of quantization is the relative quantization relation. This type of quantization sets a numerical ordering relation between group size values of the modified noun and a related noun. Usually the nouns are different references of the same noun, or the modified noun is a subgroup of the related noun group. The relative quantization relation is realized with phrases such as: "more students". The quantization type and value are identified and stored in the SDS. The quantization value corresponds to the degree of difference which typically varies from 1 (no difference) to 5 (typical difference corresponding to for example "more" or "less") to 10 (maximal difference corresponding to for example "many, many more"). This quantization value also has an associated relation sign with a value of "more" "equal" or "less". The relation sign value of "more" ("less") indicates that the owner has a greater (lessor) group size than other owner's group size. The quantization type and value are identified and stored in the group size of the group descriptor at the normal position in the SDS. This type of quantization function is performed in subsequent state representation processing when the modified and related groups are identified. The function sets an ordering relation between the group sizes of the modified and related noun groups. After the ordering relation has been processed, the greater group size has a pointer to the lessor group size and the quantization value including a "more" relation sign. The lessor group size has a pointer to the greater group size and the quantization value including a "less" relation sign. Equal group sizes have pointers to each other and have an "equal" relation sign. The greater group size contains the quantization value which varies typically from 1 to 10. The equal groups do not contain such a quantization value. There can also be a "less than or equal" or a "greater than or equal" relation. These relations have a relation sign of "less" for the former and "greater" for the later. The quantization value is 1–X where X is the maximum amount of difference and means the quantization value varies from none to X. The pointers and related information is stored in Memories 120, or 90. The above description of relation pointers occurs for relative quantization relations between different groups of nouns. The relative quantization relation can also indicate group size relations to numerical limits as in "more than 10 students". For this type of multi-word function phrase, the relative quantization relation points to the modified noun's group size. The position of "more" in the SDS contains: a group size of "10", a quantization type of relative quantization relation, a value of 5, a relation sign of "more", and a pointer to the group size in this position. The group size relation just described is processed in subsequent state representation processing to place a quantization value implying the degree of difference and a function symbol implying the relation sign (e.g., greater than or equal) with the group size of the modified noun. Quantization information is used to establish pointers between groups in a relative quantization relation in the sense that the other group is selected to have a group size which is consistent with the relative quantization relation.

Numbers function to set a definite group size in the group descriptor of the nouns they modify. The numerical quantization type and numerical value are identified and stored at the normal position in the SDS for assigning the group size when the noun is identified. The approximate quantization adjectives such as "a few" also set a value for the group size in the group descriptor of the modified noun. The value is numerical with an accompanying function symbol. The function symbol implies that the numerical value is approximate. The quantization type, numerical value and function symbol are identified and stored at the normal position in the SDS for setting the group size of the descriptor of the modified noun when the modified noun has been identified in subsequent state representation processing. The ordinals such as "first" set a definite position ordering for a member or subgroup of a group of nouns. The ordinal's quantization value corresponds to the ordering position in the group. The ordinal's quantization type and value are identified and stored in the group descriptor at the normal position in the SDS. When the modified noun has been identified, the quantization type and value are stored in the modified noun's selection criteria in its group descriptor. The multipliers such as "twice" and "one-half" are multiplied with the modified noun's group size and the multiplication result replaces the group size. The multiplier's quantization value is the numerical equivalent of the adjective, i.e., "2" for "twice". The multiplier quantization type and value are identified and stored in the group descriptor at the normal position in the SDS for processing when the modified noun has been identified as described above. Then the multiplier quantization type is implemented with a call to numerical mathematical function which multiplies the group size by the quantization value and replace the group size with the multiplication result in the modified noun's group descriptor. Either the noun's known group size or the typical group size is used in the multiplication.

Indefinite adjectives with an associated quantization function can be placed in multi-word function phrases: with an exclusion function (e.g., "some students, but not Tom"), with an inclusion function (e.g., "many students including Tom"), with a quantization function (e.g., "the first ten"), with a negation function (e.g., "not many students"), and/or with degree adverbs (e.g., "slightly more students"). These functions combine into multi-word function phrases which are detected in Syntax Phrase Trees 30 with associated information as described for selection indefinite adjectives. A phrase function is associated with the multi-word function phrases in the containing phrase's grammar information in 30. The multiple functions set information in the SDS which is used to adjust the group descriptor of the modified noun when the noun is identified. The information stored in the SDS modifies the group descriptor or group selection criteria as described above for selection indefinite adjectives. However, there are additional changes implied by a negation function in a multi-word phrase function. For example, "not many" changes the quantization portion fraction to one minus the normal quantization portion fraction. Another example is "not enough" which changes the state value of "enough" to the equivalent of "insufficient".

Some function word adjectives can have a role, normally described as an adverbial one, indicating comparison among some gradable adjectives and adverbs. These adjectives include: "more", "most", "less", and "least". The comparison function can also be indicated with the suffixes "-er" and "-est" for some gradable adjectives and adverbs. The comparison function of these adjectives and these suffixes are implemented in the adjective function word selection and implementation structure because these adjectives can sometimes have either a quantization function or a comparison function which can only be discriminated by state representation processing. Thus, it is efficient to combine the comparison functions for all possible comparisons including adjectives, adverbs into one selection and implementation process.

Gradable adjectives always have a state representation. When gradable adjectives are compared, their corresponding state values are being compared. Some gradable adjectives such as "tall" have state values which are commonly measured in numerical units. Other gradable adjectives such as "sweet" do not have state values commonly measured in numerical units. The absolute gradable adjective such as "tall" is set to the typical or average state numerical value for the typical owner of the state. For a known owner, the known state value is set for "tall". State values without numerical values have a pseudo numerical value associated with them. The lowest value is one, the typical value is midrange, 5 for example, and the highest value is twice the typical value. The actual range numbers can very depending upon the need for discrimination and the deviation from typical. Thus, gradable adjectives without numerical state values are implemented so that they can be treated like numerical state values. This same description for gradable adjectives also applies to gradable adverbs.

Gradable adjectives with numerical or pseudo numerical state values that are compared with the comparative adjective grade (e.g., "taller") imply a numerical value ordering of the owners' corresponding state values. The function of the comparison adjectives or suffixes indicating the comparative function is to set the relationship of the larger state value as greater than the lessor state value. There are two types of gradable adjectives: positive adjectives, and negative adjectives. The first owner of a positive comparative adjective has a greater state value compared to the second owner of the state value for "more", "most", and the suffixes when they indicate a comparative function. These comparative indicators imply an increasing comparative function. For example, in "Tom is taller than Mary.", "Tom" is the first owner with the larger state value of the comparative adjective and "Mary" is the second owner. The first owner of a positive adjective has a lessor state value when "less" or "least" indicate a comparative function. These indicators imply a decreasing comparative function. The first owner of a negative adjective has a lessor state value compared to the second owner of the state value for "more", "most", and the suffixes when they indicate a comparative function as in "Mary is shorter than Tom." The first owner of a negative adjective has a greater state value when "less" or "least" indicate a comparative function. The superlative adjective comparison function sets the first owner to have the superlative state which has a greater or lessor state value than the corresponding state value of all other owners in the group which is being compared. The equality comparison function sets the first owner's state value to be equal to the second owner's state value as in: "Tom is as tall as Mary."

The comparison of adverbs is similar to the comparison of adjectives. Adverbs have an adverbial subclass value which corresponds to a state value of an adjective. There are positive and negative adverbs. The same increasing and decreasing indicators of adjective comparison such as "more", suffixes, and "least" are used for adverbs. Adverbs can have equality, comparative, or superlative comparisons. The types of comparisons, increasing, equal or decreasing indicators, and positive or negative adverbs combine to set the same value relations between adverbial subclasses of compared adverbs as they combine to form value relations for state values of compared adjectives. The comparison function sets value relations of adverbial subclasses which occur in different clauses. The first owner of an adverbial comparison corresponds to the clause containing the adverbial with the comparison indicator. The second owner corresponds to one or more clauses in the context. Sometimes the two clauses in a comparative comparison are included in the same sentence, though usually one clause is in an ellipted form such as "Tom worked harder than Bill." Otherwise, the adverbial subclass value in the clause containing the adverbial with a comparison indicator is compared to the adverbial subclass value in one or more previous occurrences of clauses in the context. The equality comparison function sets the adverbial subclass value of an equatively compared adverb modifying a word in the current clause as equal to the value of the same adverbial subclass of an adverb in the nearest clause in the context which modifies the same word sense number of the same word that is modified by the equatively compared adverb in the current clause. The comparative comparison function sets the adverbial subclass value of a comparatively compared adverb modifying a word in the current clause as greater or lessor than the value of the same adverbial subclass of an adverb in the nearest clause in the context which modifies the same word sense number of the same word that is modified by the comparatively compared adverb in the current clause. The superlative comparison function sets the subclass value of a superlatively compared adverbial in the current clause in a greatest or least relation to the value of the same adverbial subclass of an adverb in other clauses in the context which modifies the same word sense number of the same word modified by the superlative adverb in the current clause.

The processing of the comparison function is to identify and store the comparison type and value at the comparison function in the SDS at one of the following positions: comparison indicator (e.g., "more") when there are no other function words modifying the compared word, the first word in a multi-word function phrase, or in the compared adjective or adverb when comparison is indicated by suffix without other function word modification. The comparison type and value are identified and stored in the SDS position described in this paragraph for later processing during state representation processing when the owners and state values have been identified for comparison of adjectives. The processing of the comparison function of an adverb is to identify and store the comparison type and value in the SDS as described in this paragraph for processing after the sentence containing the compared adverb has been processed for state representation. The comparison type indicates the grade, which has a value range of: equal, comparative, or superlative, and the value relationship, which has a value range of: decreasing, equivalent, or increasing. An increasing value relationship corresponds to "more", "most", etc. for positive adjectives or adverbs. An equivalent value relationship corresponds to "as (e.g., "tall") as", etc. A decreasing value relationship corresponds to "less", "least", etc. for positive adjectives or adverbs. The comparison value indicates the difference between the compared elements. This value typically has a range of 1 to 10. 1 indicates no difference or equality between compared elements, and 10 indicates the greatest difference. 5 indicates a typical difference between compared elements corresponding to "more" for example. The value contains a descriptor which indicates the value's relation to the comparison. The comparison type and value are processed: to create pointers between compared states or adverbial subclasses, to set the comparison value and value relationship as was described above for relations between group sizes as implied by relative quantization relation adjectives. In the above description, quantization value corresponds to comparison value here, and relation sign corresponds to value relationship here.

A degree adverb modifying a comparison function changes the comparison value with multiplication of the comparison value by the degree adverb's degree number. The degree number is obtained as described above. If the comparison value is computed below 1 for an equal comparison as it would for: Mary is almost as tall as Tom.", the value relationship is changed from equivalent to decreasing. Also, the initial computed comparison value is replaced by two minus the initial computed comparison value (which is less than one). The resulting comparison value is greater than one. The grade remains as equal. A comparison with an equal grade and with a decreasing value relationship is interpreted as the first owner's state (or current clause's compared adverbial subclass) as being less than or equal to the second owner's state (or other clause's compared adverbial subclass) for a positive adjective (or adverb) and greater than or equal value for a negative adjective (or adverb). If the comparison value for an equivalent comparison is computed to be greater than one as it would for "Mary is at least as tall as Tom.", the comparison grade and the comparison value are not changed. The value relationship is changed from equivalent to increasing. A comparison with an equal grade and an increasing value relationship is interpreted as the first owner's state value (or current clause's compared adverbial subclass) as being greater than or equal to the second owner's state value (or other clause's compared adverbial subclass) for a positive adjective (or adverb) and less than or equal for a negative adjective (or adverb). The comparison value is reduced to the maximum value when the multiplication of degree numbers corresponding to modifying degree adverbs with the current comparison value results in a new comparison value which exceeds the maximum value. Similarly, if the comparison value for a comparative or superlative comparison is computed to be less than one, the comparison value is set to 1.01.

If the equivalent comparison is negated as in "Mary did not work as hard as Tom.", the value relationship is changed to decreasing, and the comparison value is set to 5. This changes this example to be equivalent in words to "Mary worked less hard than Tom." Negation of the comparative comparison functions causes the value relationship either to switch from an initial increasing value to a decreasing value or to switch from an initial decreasing value to an increasing value. The comparison value is unchanged for this example. Negation of the superlative comparison function causes the comparison type to be changed to comparative, the value relationship to be changed either from initial increasing to decreasing or from initial decreasing to increasing. The comparison value is unchanged for this case. The comparison type also has an appended function symbol which indicates the second owner's state value (or other clause's compared adverbial subclass value) has a superlative value. Thus, "Mary is not the shortest student." is equivalently transformed to: "Mary is less short than the shortest student." This function symbol is interpreted in subsequent state representation processing as setting the first owner's state value (or the current clause's compared adverbial subclass value) with the current value relationship in a comparative (e.g., "less than") comparison relative to the owner of the superlative state value (or the clause containing the superlatively compared adverbial subclass).

The comparison function can be included in multi-word functions. Besides inclusion of degree adverbs (e.g., "slightly better") and negation functions ("not as quietly as"), comparison functions can be combined with exclusion functions (e.g., "the best student except for Tom"), inclusion functions (e.g., "studies hardest in mathematics and English"), and/or quantization functions (e.g., "the second best student"). The exclusion function and any excluded elements are identified and appended to the comparison type which is stored at the exclusion function portion in the SDS as described above. The exclusion function can set criteria for exclusion (e.g., "the best student except in mathematics"). Also, the exclusion function can be a subordinate clause which typically sets conditions when the comparison is not valid. The exclusion function is executed when the state representation processing has identified the owners or clauses in the comparison. Then the excluded elements are removed from the comparison setting function, and/or the comparison is qualified with a pointer to exclusion criteria which are stored in the selection criteria of the group descriptor of the owner, or the excluded clauses are removed from the adverbial subclass comparison relation, and/or the comparison relation is qualified with the exclusion function by including a pointer from the relation to the state representation of the exclusion clause. This type of relation and comparison relations are stored in Memories 120, 80, 90, or 100. Inclusion functions are the same as the exclusion functions except that the inclusion functions specify members in the comparison function, and/or set inclusion criteria, and/or set qualifications when the comparison is true.

The quantization functions can be combined with comparison function words in multi-word function phrases to set the quantization type and value for the group size formed with the members which meet the comparison function and related functions (e.g., "some of the better plants", "a couple of the softer pillows", "the 10 best workers"). These group size setting indefinite adjectives in the above examples combine with the comparison function in a way that the comparison function is a selection criteria for the members of the group and the adjective sets the size of the selected group. For example, "the better plants" selects a group of "plants" and "some" sets a relative portion quantization of the group of "plants". The quantization type and value are identified and stored at the group size in the group descriptor at the normal position in the SDS for later processing as described above. The quantization functions can also set a selection criteria as in "second best", i.e., select the "second" in the ordered list of the compared group of nouns. The ordinal quantization type and value are identified and stored in the group descriptor in the SDS as described above for later processing as described above. The quantization functions can also set the comparison value as in "twice as good" or "talked much longer than Mary", "much more beautiful". These quantization values adjust the comparison value. The "twice" in the example also changes the comparison grade to comparative and the value relationship to increasing. Thus "twice as good" is equivalent to better with the first owner's comparison value two times the comparison value of the second owner. The changes to the comparison type descriptor and comparison value are computed, identified, and stored at the comparison function portion in the SDS for later processing as described above.

The degree adverb, exclusion, inclusion and quantization functions combined with a comparison function in a multi-word function phrase are often independent of one another. However, the negation function can change some of the functions beyond what was described by the negation of the comparison function. For example, when a negative function, degree adverb and quantization function combine with a comparison function as in "not very much harder", the negation function effects the degree adverb and quantization combined function of setting of the comparison value and does not effect the comparison type as would occur without the degree adverb and quantization functions, i.e., "not harder" which was described above. For this multi-function word phrase pattern, the negation function causes the quantization portion factor of "very much" (e.g., 0.85) to be replaced with one-minus the quantization portion factor (e.g., 1−0.85=0.15). The quantization portion factor of "harder" corresponds to "a little harder". Another example is the combination of negation, comparison and exclusion functions as in "did not work the hardest except when . . . ". This combination generates two comparison functions. One function is the negation of the comparison function as described above with the combining of an inclusion function. This inclusion function is the inverse of exclusion function, i.e., the inclusion function is valid when the exclusion function is invalid. The other comparison function is formed with the cancellation of the negative and exclusion functions to form an inclusion function. The example is equivalent to "did not work the hardest when (inverse of exclusion function) . . . " and "did work the hardest when (the exclusion function is valid) . . . ". The point of this discussion is to indicate the changes caused by the negation function in multi-function phrases containing comparison functions. The effect of the negation function and the effect of other function changes caused by the combination of function words are implemented with the functions selected and the order of their application which is determined by the multi-word function phrase entry in the adjective function word table to be described below.

The implementation of the comparison setting function including those comparisons which are contained in multi-word function phrases is delayed until the owners of the state values are established during subsequent state processing, or until the clauses containing the processing of the clauses containing the adverbs in the comparison function have been processed. Either or both of the owners could be groups, i.e., plural nouns. The comparative and equative comparison of adverbs is between adverbial subclass values in two clauses. The superlative comparison of adverbs is between the superlatively compared adverbial subclass in the current clause and one or more other clauses in the context. The ordering of the state values between groups or individuals is stored in Memories 120, or 90. The ordering of adverbial subclass values between clauses is stored in Memories 120, or 100. The above description of the comparison functions assumed that none of the state or subclass values of the elements in the comparison are known. If one of the state or subclass values is known for a comparative comparison, the other is set in relation to the known value. If both state or subclass values of the comparative comparison are known, the implied relation of the comparison statement is verified for correctness. If the relation is incorrect, the Communication Manager is informed of an incorrect comparison statement. Also, the comparison value is set to the actual difference and is marked as such with a function symbol indicating "known". For a superlative comparison, the superlative is set in relation to all known values which are also verified for correctness as above.

There are other special functions associated with the indefinite adjectives. These special functions are one of kind, but are generally related to reference type, quantization, selection, and/or comparison. For example the demonstrative adjectives have a reference setting function and a special near/far state setting function as described above. Many of these special functions are indicated with idiomatic phrases including: "each and every", "more or less", etc. These idiomatic phrases are detected as idioms in parsing Step 16 and are processed as multi-word function phrases. Other functions are indicated as special cases of previously described combinations including: "most of all" (i.e., most important of all), "all much too easy" (i.e., contrived as easy), etc. These special cases are stored and processed as other multi-word function phrases. However, these special cases have additional associated special functions which add the additional results and/or state representation implied by the special case. Note for some special cases and some of the normal function word and function word combinations, there may be other possible function assignments. For example, "all much too easy" could have referred to the questions on a exam and hence is an ellipsis of: "all of the exam questions are much too easy". Each single function word or mult-function word phrase with multiple function selections is identified and stored at the end or the group descriptor in the SDS with a pointer to the next alternate selection or with a null pointer if there are no other selections. Also all function words or multi-word function phrases have an associated confidence level which is used to select alternate function selections when required during state representation processing.

The format for the specific functions and parameters utilized to implement the functions associated with function word adjectives is listed in FIG. *7a*. The format for the specific functions and parameters utilized to implement the functions associated with multi-word function phrases is listed in FIG. *7b*. Function word adjective definitions have various types of information associated with them including some or all of the following: the text word; a multi-word function list which contains the definition starting address associated with each containing multi-word function pattern; a default reference type; a function type; one or more function addresses, each with zero or more associated parameters; a confidence level; and a next definition address. The multi-word function list is used to look up the function definition of a function word utilized for a multi-word function phrase. Each multi-word function phrase has a multi-word symbol associated with it. For a particular adjective function word, its multi-word function list contains the multi-word symbols of all the multi-word function phrase patterns which can contain the adjective. Each multi-word symbol in the list has an associated starting address of the definition of the function word which is utilized in implementing the functions implied by the multi-word function phrase. The default reference and function type (e.g., selection, quantitative, etc.) were described above. The addressed functions are used to set information in the group descriptor as described above. The parameters are used by the addressed functions to set information. For example "some" has an associated parameter of "0.3" which is used as a portion quantization factor of the group size as described above for relative portion quantization function words. The confidence level indicates whether the definition has alternatives. The highest confidence level, 4, indicates that there are no alternate function definitions. The next definition address either has the address of the next definition which could be an intended alternate function, or has a null symbol if there is not an alternate function. The next definition address is non-null when a function word or multi-word function phrase has another function interpretation. The utilization of an alternate function interpretation is determined in subsequent state representation processing.

FIG. *7b* contains definitions for multi-word function phrases. The definition for a multi-word function phrase contains various types of information and includes: a multi-word symbol for selecting definitions of function word adjectives and other function words comprising the defined multi-word function phrase, a default reference type, an ordered list of elements which are either function addresses and associated parameters or positions of the function word in the multi-word function phrase, a confidence level, and a next definition address. The functions associated with the ordered list of elements are performed in their order in the list to implement the functions implied by the multi-word function phrase. The function address elements are executed with the function at the function address. The parameters associated with a function address include the function type and the types of parameters listed for a single function word. The position elements of function words provide functions associated with function words in the multi-word function phrase definition. When a position element is encountered, the address of the word's multi-word function list is looked up at the word's position in the SDS. The address of the list was placed in the SDS by Dictionary Look Up Step 18. The multi-word symbol in the multi-word function phrase definition is used to look up the function word's definition starting address in its multi-word function list. Each symbol stored in the list has an associated starting address. The looked up definition address contains the function which is used in the implementation of the multi-word function phrase for the function word. By using positions to indicate the utilization of a function word in the multi-word function phrase definition, multiple instances, i.e., actual stated words, of a multi-word function phrase pattern can be processed with one definition instead of listing all possible instances.

FIGS. *7c* and *7d* contains the adjective function word and multi-word function phrase selection and processing block diagram. Processing begins at Step 22300 which is stored in the function word's position in the SDS. Adjective function word processing is typically invoked by Selector 60 after an initial word sense number for the modifiee of the function adjective has been selected as is described below. 22300 sets RESTART to be 22301. RESTART is the location where adjective function word processing is restarted when an alternate interpretation for an adjective function word or a multi-word function phrase is selected by the Communication Manager because of inconsistency detected in subsequent state representation processing to be described below. 22300 also stores an identifier, "RESTART", and the value of RESTART in the group descriptor of the normal position in the SDS. As described above, the normal position is the function word adjective's position or the position of the first word in a multi-word function phrase. After 22300, 22301 is next and is true if the adjective function word processing was called with a specified definition starting address. A specified definition address is provided when processing is restarted by the Communication Manager for example. If 22301 is true, 22303 sets the Function-Definition-Address to the specified address. If 22301 is false, 22302 sets the Function-Definition-Address to the first definition address of the function word or the multi-word function phrase as was stored by Dictionary Look Up Step 18 in the normal position in the SDS. Step 18 accesses the grammar information of the current phrase in Syntax Phrase Trees 30 to determine if the function word is a single function word or a word of a multi-word function phrase. For a single function word, the definition address is stored in the Dictionary 20 entry associated with the function word. For a multi-word function phrase, the definition address is stored in the grammar information in Syntax Phrase Trees 30. After 22302 or 22303, 22304 is next and is true if the definition at the Function-Definition-Address contains a default reference type. If 22304 is true, 22305 is next and is true if Context Memory 120 contains the referent which is modified by the function word adjective or the mult-word function phrase currently being processed. If 22305 is true, 22307 is next and is true if the default reference type is the same reference type as the referent has in 120. If 22307 is true, next at 22308, the reference type portion of the group descriptor at the normal position in the SDS is set with the identifier, OLD-REFERENCE, and is set with a pointer to the modified noun in 120. If 22305 is false, or if 22307 is false, next at 22306, the reference type portion of the group descriptor at the normal position in the SDS is set with the identifier, NEW-REFERENCE, and is set with the default referent type.

If 22304 is false, which occurs when the definition at the Function-Definition-Address does not contain a default reference type, or after 22306 or 22308, 22309 is next. 22309 is true if a function word is modified by one or more degree adverbs or if the multi-word function phrase contains one or more degree adverbs. If 22309 is true, 22310 sets Degree-Mult to be equal to the multiplicative product of the degree numbers of the consecutive degree adverbs modifying the function word. The degree numbers are obtained by a prior call from Dictionary Look Up Step 18 to adverbial processing which is described below. The degree numbers are stored at the address associated with the degree adverbs in the SDS. Degree-Mult is stored at the first degree adverb in the SDS. If the degree adverbs modify more than one word in multi-word function phrase, a separate Degree-Mult is calculated for each modified word. After 22309 or 22310, 22311 is next and is true if the definition at the Function-Definition-Address has another function to be processed. If 22311 is true, 22313 is next and is true if the definition at the Function-Definition-Address is for a multi-word function phrase. If 22313 is false, 22314 sets the Current-Function to be the next function in the function word's definition. If 22313 is true, 22315 is next. 22315 sets the Current-Function to be the function at the next function address stored in the multi-word function phrase definition if the next element in the function list is a function address. Otherwise, 22315 uses the next position stored in the multi-word function definition to select the stated function word's associated function and parameters which are to be used in the multi-word function phrase. The position of the stated word in the SDS contains the address of the stated word's multi-word list. The multi-word function phrase definition's multi-word symbol is used to select the function address in the multi-word list. The Current-Function is set to the function at the function address selected in the multi-word list. By using positions to indicate the utilization of a function word in the multi-word function phrase definition, multiple instances, i.e., actual stated words, of a multi-word function phrase pattern can be processed with one definition instead of listing all possible instances. The listed function addresses in a multi-word function phrase definition are used to implement functions common to a multi-word function phrase pattern, and the positions select the functions which vary according to the actual stated word in the pattern. Note that only certain text words, i.e., words belonging to a specific wordset, can be placed in a position of a pattern.

After the Current-Function has been set at 22314 or 22315, 22316 is next and is true if the Current-Function type is a selection function type. In FIGS. *7a* or *7b*, the function type is either listed in a single function word definition or is included in the parameters associated with a function address in a multi-word function phrase definition. If 22316 is true, 22317 is next. 22317 evaluates the Current-Function if the function is compatible, and if it is possible to evaluate the function now. A function is compatible if it can be applied to the word sense number of the noun being modified by the function word adjective. Functions have compatibility requirements for a word sense number. If the compatibility requirements are met, the function is compatible with the word sense number. For example, "some" has a selection function that is compatible with a singular, countable noun word sense number as in "some girl". A noun word sense number is countable if its quantity state has numerical value units. A non-countable noun has a quantity state with measurement value units. The singularity of a noun is determined by its inflection code which is utilized in Syntax Phrase Trees 30 during parsing. It is not possible for some functions to be currently evaluated because they require values which are not currently available as was described above. If the function is compatible, and is possible to evaluate, 22317 identifies and stores the results of the selection function in the group descriptor in the normal position in the SDS. If the function is compatible, but it is not currently possible to evaluate the function, 22317 identifies and stores the function addresses in the group descriptor in the normal position in the SDS. The selection function results and functions to be executed in subsequent processing were described above. After 22317, 22340 is next, and is true if the Current-Function is compatible with its modifiee word sense number. If 22340 is false, 22342 is next, and is true if there is another untried function definition address. If 22342 is true, 22344 sets Function-Definition address to the next untried function definition address. If 22342 is false, 22346 sets processing to continue at AF-Fail, an invocation parameter. If 22342 is false, typically another word sense number for the modifiee of the function adjective is selected as is described below.

If the Current-Function is compatible, 22340 is true, and 22311 begins the process for another function as described above. If 22316 is false, 22318 is next and is true if the Current-Function is only a quantization function. If 22318 is true, 22319 evaluates the quantization function if it is compatible and possible. Also if the function is compatible, 22319 identifies and stores the quantization type and value for a possible function or the type and function address for a function that is not possible now in the group descriptor at the normal position in the SDS. After 22319, 22340 is next as described above. If 22318 is false, 22320 is next and is true if the Current-Function is only a comparison function.

If 22320 is true, 22321 evaluates a compatible, possible comparison function. If the function is compatible, 22321 identifies and stores the comparison type and value or the type or function address in the comparison portion of the group descriptor at the normal position in the SDS as described above. After 22321, 22340 is next as described above. If 22320 is false, 22322 is next and is true if the Current-Function is a quantization or a comparison function. If 22322 is true, 22323 evaluates a compatible, possible quantization function. If the function is compatible, 22323 identifies and stores the quantization type and value or the type and function address in the group descriptor at the normal position in the SDS as described above. Also, 22323 evaluates a compatible, possible comparison function, and 22323 identifies and stores the comparison type and value or the type and function address in the comparison portion of the group descriptor at the normal position in the SDS as described above. The identification at 22323 includes a AMBIGUOUS-QUANTIZATION/COMPARISON-FUNCTION with the stored information if both functions are compatible. This identifier informs Selector 60 that the syntax allows for either a quantization or comparison function. The selector then determines the intended type of function from the context. After 22323, 22340 is next as described above.

If 22322 is false, 22324 is next and is true if the Current-Function is an inclusion function. If 22324 is true, 22325 identifies and stores a compatible inclusion function and related information in the inclusion portion of the group descriptor at the normal position in the SDS as described above. After 22325, 22340 is next as described above. If 22324 is false, then 22326 is next and is true if Current-Function is an exclusion function. If 22326 is true, 22327 identifies and stores a compatible exclusion function and related information in the exclusion portion of the group descriptor at the normal position in the SDS as described above. After 22327, 22340 is next as described above. If 22326 is false, 22328 is next and is true if the Current-Function is a degree adverb. If 22328 is true, then 22329 either multiplies the appropriate numerical quantity by Degree-Mult and stores the result at the location of the appropriate numerical quantity in the normal position of the SDS, or 22329 identifies and stores Degree-Mult at the location of the appropriate non-numerical quantity in the normal position of the SDS. The appropriate quantity is identified in the degree adverb function. The degree adverb function also identifies the appropriate quantity as numerical or non-numerical. After 22329, 22340 is next as described above. If 22328 is false, 22330 is next and is true if the Current-Function is a special function type. If 22330 is true, then 22331 evaluates a compatible special function if possible. If the function is compatible, 22331 identifies, and stores the result and/or function addresses of functions to be evaluated in subsequent processing at the designated location in the group descriptor at the normal position in the SDS as described above. The designated location is identified in the special function. Functions which are to be evaluated later require values which are not currently available as was described for many of the other function types described above. After 22331, 22340 is next as described above. If 22330 was false, 22332 is next and is true if the Current-Function is a negation function type. If 22332 is true, then 22333 evaluates a compatible negation function if possible. If the function is compatible, 22333 identifies, and stores the results and/or function addresses of functions to be evaluated in subsequent processing at the designated location in the group descriptor at the normal position in the SDS as is described above. The designated location is identified in the negation function. Functions which are to be evaluated later require values which are not currently available as was described above. After 22333, 22340 is next as described above. If the previous function is compatible, 22340 is true, and 22311 is next. 22311 is false if there is not another function. If 22311 is false, then 22312 is next. 22312 places the confidence level at the end of the group descriptor at the normal position in the SDS. Also, 22312 places the next definition address or NULL at the location following the confidence level in SDS. Finally, 22312 returns processing control to the caller.

PREPOSITIONAL PHRASES

Prepositional phrases are composed of a preposition and a complement. The prepositional complement can be a noun, pronoun, or a word plus affixes which change the word to a noun i.e., the complement is a noun or functions as a noun and the word functioning as a noun is a noun equivalent. Concrete nouns can also be modified by another concrete noun. This type of concrete noun modification is equivalent to a prepositional phrase composed of a zero preposition with the modifying concrete noun as a complement of the preposition phrase which modifies a concrete noun. For example, "food store" is equivalent to "store (zero preposition) food". Prepositional phrases can modify nouns or words functioning as nouns, adjectives, and verbs. The description of prepositional phrases modifying verbs, called adverbial prepositional phrases or adverbials, will be discussed in the section of adverb function words since the function of adverbials is very similar to adverbs. The Function Processing Step 22 for prepositional phrases begins after the modified noun or equivalent and the complement have had their state representations selected in Selectors 60. These selectors also invoke preposition processing. Multiple consecutive prepositional phrases are processed in the order of last first.

Prepositional Phrase Modification of Concrete Nouns

Prepositional phrases modifying nouns function to set a relation between the modified noun, called the modifiee, and the prepositional complement. This description in this section will be limited to modifiees which are concrete nouns or abstract nouns and noun equivalents which evaluate to concrete nouns. Other abstract noun modifiees are considered later because they represent adjectives or verbs. Other modifiee noun equivalents such as participle phrases (e.g., "going to school") are also deferred for now because these noun equivalents result in adverbial modification. The relationships between a concrete noun or equivalent modifiee and a concrete noun or equivalent complement include: partitive, possessive, functional, group, type setting, or state or property value setting. These relationships can be stored with the state representation of a concrete noun. These type of relations can also be explained in the conversation. These type of relations can have associated information which includes: descriptions of the relation, and experience related to the elements in the relation. The type and value setting relations are stored in state representation of a concrete noun or are selected based upon the state representation of a concrete noun. A concrete noun or equivalent will have those relation types which are appropriate for its state representation, i.e., semantically possible for its relation. A concrete noun modifiee can have any of the appropriate relations with a concrete noun.

A concrete noun has a functional relation when the concrete noun is in clausal relation with the complement. A clausal relation means that a clause has the elements in sentence roles of the clause. In this case, the modifiee and complement are in a clausal relation when they have sentence roles in a clause. The functional relation implies the clause of the clause relation. The functional relationship indicates some function is performed by one noun relative to the other noun. For example, "scenery for the theater" implies the clause: "The "scenery" creates the image of the setting of the play in "the theater"." Another example, "a bottle of water" is equivalent to "The "bottle" contains "water"." The clause implied by a functional relationship is accessible with a pointer stored at a functional relationship descriptor in Concrete Noun State Representation Memory 90 to the equivalent of one or more clauses in Clausal Abstract Noun and Clause State Representation Memory 100. The partitive relationship indicates a sub-part to part relationship or part to whole relationship such as "door of the car". The possessive relationship indicates the owner such as "offices of the IRS". The group relation indicates a set of concrete nouns including the modifiee and the complement in a group relationship indicated by the preposition. For example, "Tom with the students" indicates that "Tom" and "the students" are in a group. The members in a group relation usually have common state(s), property(s) and/or relation(s) which distinguish the group. The state or property value setting relation sets a relation to a single state or property. For example, "the book in the library" sets the position of the "book" as the "library". In this example, the space position state of the "book" is set to the space position property of the "library". The type relationship indicates that the nouns in the relationship share certain states and properties and associated values or value ranges of the shared states and properties. The type relation can indicate a transfer of multiple state or property values between the modifiee and complement for previously unstored type relations. For example, "skin like a baby" implies the owner's "skin" has similar state and property values as a "baby's" (skin). Other mechanisms for indicating type relationships are "kind of" and "type of". The complement is usually the source of the state or property value(s) and the modifiee is the destination. The preposition indicates the relationship between the source value and the destination.

A concrete noun has a data structure for each preposition which can modify it. Those concrete nouns which can be modified by other concrete nouns have a data structure for zero prepositions. This data structure used for processing a prepositional phrase modifying a concrete noun is shown in FIG. 8*a*. Each concrete noun has a pointer in its Dictionary 20 entry to a common data structure that is shared with other concrete nouns. Also, each concrete noun possibly has one or more individual data structure entries used for the concrete noun's anomalous prepositional relations. The anomalous prepositional relations are stored in its anomalies portion of the noun's Dictionary 20 entry. The prepositional data structure contains an entry for each relation of a preposition and is listed in the order of the most commonly used relation first. This preposition data structure contains: a text representation of the preposition, a representation number, a list of relation type designations which the preposition can imply for the modified concrete noun, and a confidence level. The designations are symbols which have associated relation type data structure entries. The format for the relation type data structure entry of each relation type associated with a designation is illustrated in FIG. 8*a*. These formats will be described in more detail below. There are three kinds of relation types in FIG. 8*a*: A-Relations, S-Relations, and T-Relations. The A-Relations are stored in Context Memory 120 for A-Relations introduced in the conversation, or they are stored in the Concrete Noun State Representation Memory 90 for previously experienced A-Relations. The A-Relation types include: partitive, ownership, functional, and group. An A-Relation data structure entry in the preposition data structure contains the A-Relation type which can be selected by the preposition.

The S-Relation type contains the relations which imply state and property settings between the modifiee and complement. The S-Relations are stored either in Context Memory 120 or the Concrete Noun State Representation Memory 90. An S-Relation type data structure entry contains the source requirement descriptor and the destination requirement descriptor. The descriptors contain the state or property which the source and destination must have for the associated S-Relation to be selected. The destination requirement descriptor contains the destination, i.e., the modifiee or the complement. This data structure also includes a function which is called to set the state or property value relationship between the source (usually the complement) and the destination. The value relationships include the relative positions in time or space between the source and destination for example. The relative position can also be set to a definite value in the prepositional phrase. The value relationship can be equality in which case the destination value is set to be the same as the source value as in the "the book in the library". The other value relationships include those set by prepositions. The function result associated with a S-type relation of a preposition can be modified by a degree adverb modifying a preposition such as: "almost", "just", etc. Such a degree adverb sets the magnitude of an indefinite relation set by the preposition's function result. The state or property value relation set by the preposition's function has a pseudo difference quantity associated with the relation as described for the comparison of degree adverbs modifying a gradable adjective or adverb. The pseudo difference quantity is used in an S-Relation which does not set an exact relationship between the source and destination state or property values. The function of a degree adverb modifying a preposition is to multiply the pseudo difference quantity by the degree number associated with the degree adverb. The degree number is obtained by Dictionary Look Up Step 18 through a call to adverbial processing to be described below. The degree number is stored in the SDS by 18 at the degree adverbs position.

The T-Relation is the type transfer relation. The states and properties in a T-Relation are not actually transferred, but the relation between the source and destination values is stored instead. The T-Relation can be stored either in the Context Memory 120 or the Concrete Noun State Representation Memory 90. The state and property values to be transferred in the T-Relation can be stated in the conversation. If the values are not stated, the set of states or properties which are common to both the modifiee and complement are involved in the transfer of state and property values from the source (usually the complement) to the destination. A T-Relation data structure entry has an associated function which sets the pseudo difference quantity between the source state and property values and the destination values for prepositions which set an indefinite relation between the source and the destination. An entry also lists the destination. The function of degree adverbs modifying a preposition with a T-Relation is to multiply the pseudo difference quantity by the degree number associated with the degree adverb as described above. Each relation type also has a confidence level associated with it in its preposition descriptor table as in FIG. 8*a*.

Figure 8B:
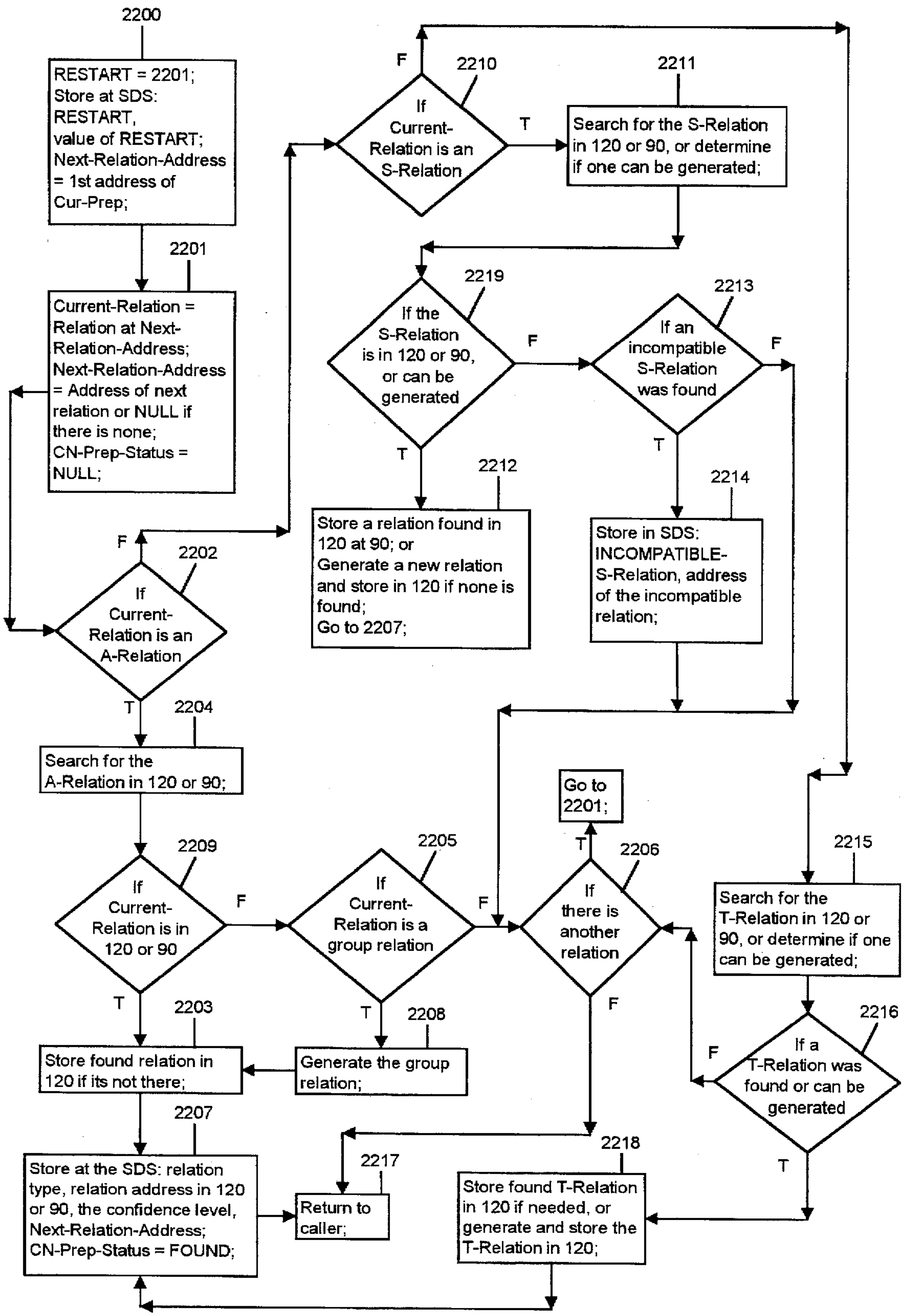
FIG. 8*b* is a flow chart for the selection and evaluation of the function of a preposition modifying a noun.

FIG. 8*b*. contains the flow chart for selecting and evaluating the functions associated with prepositional phrase modifying concrete nouns. A preposition of such a prepositional phrase contains the address of Step 2200, the start of the selection and implementation process, in its position in the SDS as placed there by Step 18. The preposition process is started by Selector 60 after the word sense number of the modifiee and complement has been selected. Step 2200 sets RESTART to 2201; stores "RESTART" and its value, 2201, in the preposition's position in the SDS; and sets the Next-Relation-Address variable to be the address of the first relation of the preposition's data structure in the modified concrete noun's preposition data structure which is stored in the modified concrete noun's Dictionary 20 entry. Next at Step 2201, the Current-Relation is set to the relation at the Next-Relation-Address in the modified noun's preposition data structure for the modifying preposition, Current-Prep. Also, the Next-Relation-Address is set to the address of the relation after the Current-Relation or to null if there is no other relation at 2201. This setting of the address includes a check of the modified noun's Dictionary 20 entry for an anomalous preposition relation for the next or current relation with the purpose of calculating the address to the common or anomalous relation. Finally, 2201 sets CN-Prep-Status to NULL which indicates that a prepositional relation has not been selected. Next at Step 2202, 2202 is true if the Current-Relation is an A-type relation. The A-type relations include: partitive, possessive, functional, and group. These kinds of relations are stored in the state representation structure of the modifiee and complement data structures or have been introduced in the conversation and stored in the context.

If 2202 is true, Step 2209 searches in Context Memory 120 or in State Representation Memory 90 for an A-Relation of the type associated with the current A-Relation between the modifiee and complement. If 2204 does not find the A-Relation in 120, 2204 invokes a call to Selector 60 which searches for the A-Relation type from 2202 in the state representation of the modifiee and the complement in Memory 90 as described below. Concrete nouns have associated A-Relations stored with them in Concrete Noun State Representation Memory 90. The A-Relations of a specific reference of a concrete noun in Memory 90 or 120 have an A-descriptor which contains: the type of A-Relation, the relation characteristics or a pointer to the characteristics, a pointer to a preceding noun in the relation or a null pointer, a pointer to a succeeding noun in the relation or a null pointer, an optional pointer to Clausal Abstract Noun and Clause State Representation Memory 100, optional specific information and a designation. The A-descriptors can be stored in Context Memory 120 directly for generated A-Relations, or 120 can store pointers to the A-descriptors. The relation type is partitive, possessive, function, or group. The relation characteristics are used to determine if a preposition implies an A-Relation between a modifiee and complement. The characteristics vary for each relation type. The relation characteristic for a partitive relation is the noun word sense number which is not part of any other noun in the partitive relation, i.e., the noun at the highest level in the partitive relation. The relation characteristic for a possessive relation is the word sense number of the highest level owner in the possessive relation. The relation characteristic for a functional relation is a word sense number of the verb of the clause relation implied by the functional relation. The relation characteristic for a group relation is the group descriptor of the highest level group in the group relation, i.e., the group which is not a subgroup of any other group in the group relation. The pointers to preceding and succeeding nouns in an A-Relation indicate a hierarchical relation. A noun preceding another noun is in a superior hierarchical relation. A noun with a null preceding pointer is at the highest position in the hierarchy. The converse hierarchical relations apply to succeeding nouns and a noun with a null succeeding pointer. A functional A-Relation has the preceding and succeeding pointers omitted because they are null. The non-functional A-Relations can be in a hierarchy of A-Relations. The pointer to Memory 100 which is associated with an A-Relation addresses all information which is associated with the relation. The pointer's address contains a typed set of clause relations. The types are the different classes of information. The clause relations can be a single clause, a string of clauses, or a tree of clauses. For example, a partitive relation can have associated information with the following types: purpose, function, assembly operation, etc. The partitive and group relations can have a pointer in their descriptors to additional information contained in Memory 100. The pointer associated with a possessive A-Relation can define the relation with a clause having a word sense of "to own". The pointer associated with a function relation can define the clause relation. These clauses of these pointers can have additional information stored with them. Alternately, the possessive or functional A-Relation can have a pointer to additional information associated with the A-Relation. The optional specific information for a group relation includes a group descriptor as described above. The designation in an A-type descriptor corresponds to the designations stored in the relation types of the preposition data structure of FIG. 8*a*. The designation is used to select a preposition which implies the associated A-Relation for generating natural language output.

In 2204, the partitive, the possessive, or the group A-Relations stored with the modifiee and complement in Memory 120 or 90 are searched for a match of their highest level member characteristic, e.g., the highest level part, owner, or group in the relation. The highest level member characteristic matching process provides an efficient method for determining if a modifiee and complement are in the same partitive, possessive or group relation without searching the members linked by hierarchical pointers in the relation for a specific known reference modifiee and complement. The modifiee and complement could be several levels apart or even in different subtrees of the A-Relation. Thus, much searching is avoided with this matching process in the worst case. If a highest level match has been found in 2204 for the partitive, possessive, or group A-Relation between the modifiee and the complement, the search for the partitive, possessive, or group A-Relation has been successfully completed. A clause relation of a possessive relation's pointer to 100 will be evaluated in subsequent state representation processing. The search for A-Relations in 90 is described below in the description of Selector 60.

The functional A-Relation type between a modifiee and complement can be a direct or an indirect relation. The direct functional relation is stored at the relation characteristic of the functional A-descriptors of the modifiee and the complement. The relation contains a pointer to a clause relation which indicates the functional relation between the modifiee and the complement, and contains a verb word sense number which can form a clause relation with the modifiee and complement. The functional relation is direct if the modifiee and the complement are directly contained in the clause relation. The functional relation is indirect if the modifiee and/or complement are indirectly contained through A-Relations which link the modifiee and/or complement to the noun contained in the clause relation. The direct relation is searched for by looking for a common verb word sense number at the relation characteristics of the modifiee and complement at 2204. If a direct relation is not found, then an indirect relation is searched for at 2204 by using the clause relations which contain A-Relations for modifiee and complement clause roles. The function relations which contain A-Relations for a sentence role are in a partition of the function relations of a concrete noun. The clause relation's A-Relations are located at their clause roles in the data structure of the clause relation at Selector 70. The functional relation descriptors of the modifiee are used to find the functional relations with A-Relations. The A-Relations of the clause relations of the modifiee are searched to determine if the A-Relation contains the complement. A functional indirect relation is found when the A-Relation of say the modifiee's functional clause relation contains the complement. If a functional relation match is found, the clause or clauses implied by the functional relation and containing the modifiee and the complement in the data structure in Clausal Abstract Noun and Clause State Representation Memory 100 will be evaluated in subsequent state representation processing with the general or specific modifiee and the general or specific complement.

Step 2209 is true if an A-Relation match for the type of A-Relation associated with the preposition from 2202 is found between the A-descriptors of the modifiee and complement in Memory 120 or 90 at 2204. After the above searching is performed at 2204, and 2209 is true, 2203 is next and stores the A-Relation at the modifiee and the complement in Context Memory 120 if it is not already there. After 2203, 2207 is next. Step 2207 stores the following in the preposition's position in the SDS: the type of relation; and the address of the relation in the modifiee's data structure in 90, or if the relation is only stored in Context Memory 120, the address of the relation in 120; the computed confidence level of the relation; and the value of the Next-Relation-Address. The confidence level is set to 4 if the relation was found in 120. Otherwise, the confidence level is set to the value contained in the preposition descriptor table (of FIG. 8*a*) if the relation was found in 90. Otherwise, the confidence level is set to 1 if the relation is generated. Generated relations will be described below. 2207 also sets CN-Prep-Status to FOUND. After 2207, 2217 sets state representation processing to continue at the caller.

If 2209 is false, then 2205 is next and is true if the A-Relation from 2202 is a group relation. If 2205 is true, a group A-Relation is generated at Step 2208. A group relation is generated by creating a group A-Relation descriptor. The relation type is set to group. The relation characteristic is set to "self-contained" which implies the group is composed of the members in the group relation descriptor. The modifiee and complement have pointers to each other. The specific information contains a group descriptor with a group size. The group size is set to be the sum of the number of nouns associated with the modifiee and complement if the numbers are known. Otherwise the group size is set to "indefinite". The designation is the designation in the preposition's data structure associated with the Current-Relation. The group A-Relation of a preposition is processed last because there are no restrictions on forming a group A-Relation, i.e., any concrete nouns can be grouped together. However, a group relation can have optional exclusion and/or inclusion criteria. A group A-Relation is processed last because its designation is placed last in the preposition data structure of FIG. 8*a*. Thus, Step 2205 is processed last to ensure that the group A-Relation does not mask an intended relation. 2208 sets the group A-Relation as a default. After 2208, processing continues at 2203 as described above. If 2205 is false, Step 2206 is true if there is another relation in the Current-Prep's data structure. If 2206 is true, Step 2201 is next. If there is not another relation at 2206, 2206 is false, and 2217 sets processing to be continued at the caller, which is typically Selector 60. Selector 60 than attempts to find a different word sense number of the modifiee and/or complement, or 60 attempts to find an alternate modifiee of the prepositional phrase.

If the current relation at 2202 is not an A-Relation, Step 2210 is next and is true if the current relation is an S-type relation. If 2210 is true, 2211 is next. 2211 searches for the S-Relation is stored in 120 or 90. 2211 first searches Context Memory 120 for an S-type relation between the modifiee and complement. S-type relations are stored in an S-descriptor at the destination in a specific state or property. The S-descriptor in 120 or 90 contains: the value relation; the word sense number containing the source state, property, or possibly an S-descriptor in the source state or property; and a designation. The value relation is the relation between the source and destination values. The word sense number has an associated address to its data structure which contains the source state or property value in the value relation. If the state or property location of the word sense number contains an S-descriptor, the S-descriptor at the source state or property indicates that the concrete noun's source state or property is modified by another prepositional phrase. For example, "the book in the library at the square" implies S-descriptors at the location states of "book" and "library". The specific state or property in the S-Relation implied by a preposition's designation is stored in the S-Relation destination requirement descriptor of the preposition's designation. The destination is identified as the modifiee or the complement in the destination requirement descriptors. The requirement descriptors are stored in the preposition data structure of FIG. 8*a*. The source requirement descriptors can include state or property value ranges, and function words with associated value ranges of the function words. For example, the descriptor associated with the time setting function of "at" includes a source descriptor that matches a time format, a special procedure for matching characters in Dictionary Look Up Step 14. The time format is an integer between 1 and 12 with or without a ":" concatenated with an integer between 00 and 59 such as in "at 1:30". S-Relations are searched for in 120 or 90 by checking the state or property of the destination specified by the destination descriptor requirement for the designation implying the S-Relation descriptor of the Current-Relation. If an S-descriptor(s) is found at the destination state or property, the word sense number source and the S-descriptor designation of the found descriptor(s) is checked for being the same as the word sense number of the source and the S-descriptor designation in the prepositional phrase as implied by the Current-Relation. If they are the same, this check is satisfied and the S-Relation has been found. The "(s)" is added for the case where multiple S-descriptors are stored at the destination state or property. If an S-Relation is not found in 120, Step 2211 invokes Selector 60 to search Memory 90 for an S-type relation between the modifiee and the complement. If an S-Relation is not found for the modifiee and complement in Memory 120 or 90, the source (usually the complement) and the destination are checked for matching their respective requirement descriptors at Step 2211 in 120 and/or in 90 by Selector 60. The destination and the source are checked for having the state or property contained in the destination requirement descriptor. If the destination and source have the state or property, the source state or property is checked for meeting the source descriptor requirements of the Current-Relation, for meeting the destination descriptor requirements, and for meeting any of the destination's value range requirements for the state or property of the S-Relation in the destination's state or property location in Adjective and State Abstract Noun State Representation Memory 80 data structure. A generated S-Relation match is found if the source requirements, destination requirements, and destination value ranges are satisfied. After 2211, 2219 is next. 2219 is true if a compatible S-Relation was found in Memory 120 or Memory 90 at 2211, or 2219 is true if a generated compatible S-Relation match was found. An S-Relation is compatible: if the modifiee and/or complement are a general reference; or if the modifiee and complement are both specific known references, and if the source value is specified and the source value is consistent with the specified value stored in a property of the destination or the destination is a state with a consistent value considering the relation setting function of the S-Relation including modification by degree adverbs; an unspecified value matches a specified or unspecified value.

If 2219 is true, 2212 is next. 2212 stores a relation found in 90 in 120. However, if a new S-Relation was generated at 2211, an S-descriptor is generated and stored at the destination state or property at the destination's location in 120 by 2212. The value relation of the S-descriptor is set to the relation implied by the preposition's function in Step 2212. The word sense number of the source state or property is also stored in the S-descriptor. The designation is the designation of the preposition which is implies the Current-Relation. If the preposition is modified by one or more degree adverbs, 2212 adjusts the value relation by multiplying the the pseudo difference quantity of the value by the degree number associated with each modifying degree adverb. The degree number is obtained as above. After 2212, 2207 is performed as described above. If 2219 is false, 2213 is next and is true if a found S-Relation is incompatible. If 2213 is true, 2214 is next and appends the following in the preposition's position in the SDS: INCOMPATIBLE-S-Relation, the S-Relation address at the destination. The incompatible S-Relation could be a contradiction of previously stored state information, or it could be a misinterpretation of the preposition function. A misinterpretation is detected if another preposition relation is found, and the incompatible S-Relation would be purged. Otherwise, the Step 18 checks for the inconsistent statement and informs the Communication Manager which processes the inconsistent statement. If 2213 is false, or after 2214, Step 2206 is next and processes another relation as described above.

If the Current-Relation at 2210 is not an S-Relation, the Current-Relation is a T-Relation. Then at 2215, Context Memory 120 is checked at the destination for containing the T-Relation which is implied by the preposition's designation's T-Relation type in the preposition's data structure and which is between the modifiee and complement. A T-descriptor stored in 120 or 90 contains: the T-Relation function's value relation, the states and properties in the T-Relation, the word sense number of the source of the states and properties in the T-Relation and a designation. If none is found, 2215 invokes Selector 60 to search for a T-Relation in Memory 90 at the destination's data structure. The searches for the T-Relation in Memories 120 and 90 is for the T-Relation with the set of states and/or properties which have been specified in the conversation when a specification is included. The specified set of states and/or properties is expressed when there is a modifier of the source which sets state and/or property values or indicates the similarity such as "a house is like a car in the sense that . . . ". The state and/or properties of such a modifier of the source comprise the specified set. A statement such as "in the sense that . . . " following the source or a similar introductory phrase defines the specified set. These modifiers indicating the states and properties in the T-Relation are evaluated before the T-Relation is processed. A T-Relation is found if the following conditions are met: the found T-Relation descriptor's designation is the same as the designation implying the Current-Relation; the source word sense number is the same in the preposition and at the found T-Relation; if the states and properties are specified, the specified states are a subset (including an improper subset) of the states stored in the T-descriptor. If a T-Relation is not found in Memories 120, Selector 60 searches for a specific T-Relation in Memory 90 if both modifiee and complement are specific known references. Otherwise, or if no specific relation is found, a general T-Relation between a general modifiee and a general complement is searched for in Memory 90. If a T-Relation is not found in Memories 120 or 90, then Step 2215 determines if a T-Relation can be generated. If there is a specified set of states and properties from the conversation, the destination is checked for a match with the specified set of states and properties of the source. A match occurs when the destination has all the states and properties in the specified set and the values at the destination are compatible. A value at the destination is compatible if the value is unspecified, or if the value satisfies the Current-Relation's value relation to the corresponding source value. The Current-Relation's value relation is the relation implied by the relation setting function of the Current-Relation's data structure entry. If states and properties of the T-Relation have not been specified, 2215 determines if the T-Relation can be generated by checking the source and destination for having compatible common states and properties. A T-Relation can be generated if the destination matches all the specified states and properties, or if the destination and source have at least one compatible state or property value in common. 2215 is completed after a T-Relation: is found, can be generated, or is unable to be generated.

After 2215, 2216 is next and is true if a T-Relation was found or generated. If 2216 is true, 2218 is next. If a T-Relation is found in Memory 120 or 90, Step 2218 stores the T-descriptor address at the destination in the Context Memory 120 if it is not already stored there. If a T-Relation was not found, but a T-Relation can be generated, 2218 generates the T-Relation descriptor. The value relation is added to the T-descriptor. If the set was specified at 2215, the specified set of states and properties are listed in the T-descriptor at 2218. Otherwise, the common states and properties are listed in the T-descriptor at 2218. The word sense number of the source is added to the T-descriptor. Finally, the designation of the Current-Relation is added to the T-descriptor at 2218. If the preposition which implies a generated T-Relation is modified by one or more degree adverbs, 2218 adjusts the value relation in the T-descriptor between the states and properties by multiplying the pseudo difference quantity of the value relation by the degree number associated with each modifying degree adverb prior to a compatibility determination. The value of degree adverb is obtained as described above. The generated T-Relation's T-descriptor is stored in Context Memory 120. After 2218, the T-Relation is stored in the SDS by 2207 as described above. If 2216 is false, 2206 is next and processes the next relation as described above.

Prepositional Modification of Adjectives

Adjectives can be modified by prepositional phrases in constructions of the form or ellipses of the form: Subject (form of "to be") adjective prepositional phrase. An example of the form is: "John is good at mathematics." The subject and prepositional complement can be a noun or noun equivalent such as a participle phrase. The preposition indicates A-relations or T-relations. The subject is related to the complement with the A or T relations. The adjective plays various roles in these relations. For the A-relations minus the functional relations (AMF), the adjective modifies one of the nouns in the AMF relation. The AMF relations require a concrete noun subject and complement. For example, "The car is full of gas." has "full" modify the "tank of "gas"", and "tank" is in a partitive A-relation to the "car". For T-relations, the adjective indicates the function associated with the T-relation. For example, "John is close to Tom in academic achievement" has "close" indicating the pseudo difference function between "John's academic achievement" and "Tom's academic achievement". The T-relation requires that the subject and complement both be concrete nouns or each be a clause or a clausal equivalent. The T-relation between clauses implies setting the common aspects of the clause to have the pseudo difference quantity function of the adjective. The aspects of the clause which are checked for commonality include: modals, adverbials, methods for setting result states, result states, goals, causes, etc. A T-relation indicated by an adjective can have specified or unspecified common states or common aspects. The functional A-relation has the subject in a functional relation with the complement with the adjective playing various roles. One adjective role is to be the verb in the functional relation for adjectives which have a verb base. For example, "He is knowledgeable about computers" is equivalent to "He knows about computers." Another adjective role is to be an adjective or be converted to an adverb in the functional relation. For example, "He is good at mathematics" could have the functional relation of subject to complement as: "He learns mathematics well." or "He gets good grades in mathematics." Another adjective role is to be a result state of the verb in the functional relation. For example, "He is conscious of the problem." has a functional relation to "He knows the problem." where being "conscious" in this word sense is a result state of "to know". Also, for some adjectives and prepositions, the complement of the preposition is in a functional relation which has a purpose relation to the state value associated with the adjective. For example, "John is afraid of school" can be interpreted in a given context as the preposition complement ("school") being the cause of the subject ("John") having an emotional state of fear. The cause may have a known functional relation which causes the adjective state in a clausal complement or be known from a previous conversation.

An adjective has a data structure for each preposition which can modify it. FIG. 8*c*. illustrates the data structure format associated with an adjective for a single preposition. The location of the prepositional data structure of an adjective is stored in the adjective's entry in Dictionary 20. The prepositional data structures of an adjective can be shared among multiple adjectives. An adjective can also have one or more anomalous data structure entries for a preposition when an adjective has unique prepositional relations. A data structure for a preposition modifying an adjective contains a list with four relation types: AMF, T, F, P. The AMF relation means A-relations Minus Functional relations and includes: partitive, possessive and group relations. The T stands for T-relations. The F stands for F-relations which are functional relations. The P stands for F-relations which are in a purpose relation to the state value associated with the modified adjective. These types of relations have the same information as is associated with corresponding prepositions modifying concrete nouns as depicted in FIG. 8*a*. One difference is that a T-relation of an adjective can include a default state(s) and/or property(s) utilized in the transfer relation. P-relations contain the type of purpose relation.

An adjective can also be modified by an adverbial prepositional phrase. For example, "He was sick at 2 PM." contains the adverbial preposition "at 2 PM". The data structure for adverbial prepositions is stored in Memory 80. Selector 80 determines if the prepositional phrase is an adverbial. In the case where the preposition modifying an adjective is an adverbial, the processing of this section is not performed. The processing of adverbial prepositions modifying adjectives is described in the State Representation Processing Section below.

Figure 8D:
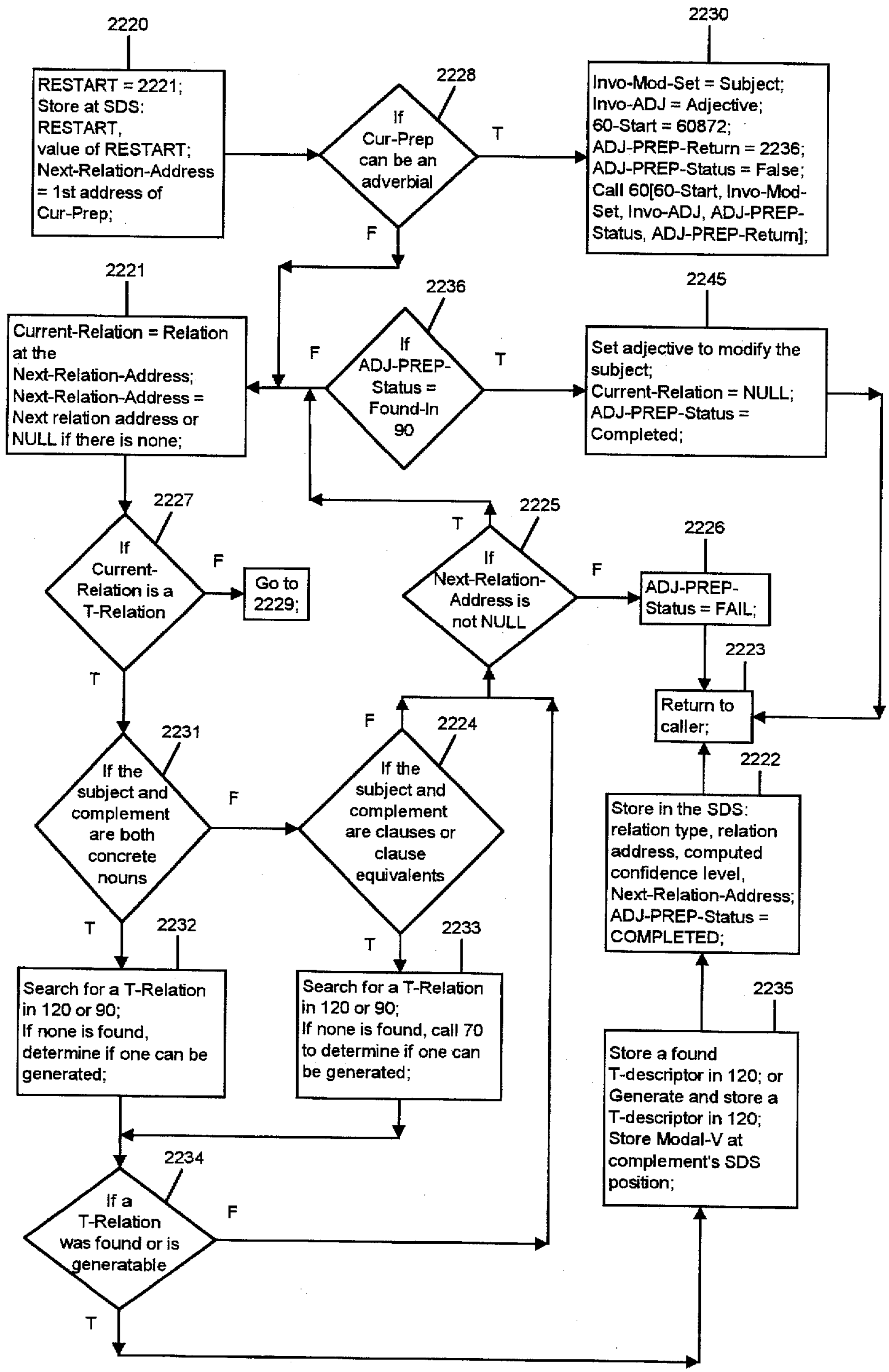
FIGS. 8*d*–8*f* is a flow chart for the selection and evaluation of the function of a preposition modifying an adjective.
Figure 8E:
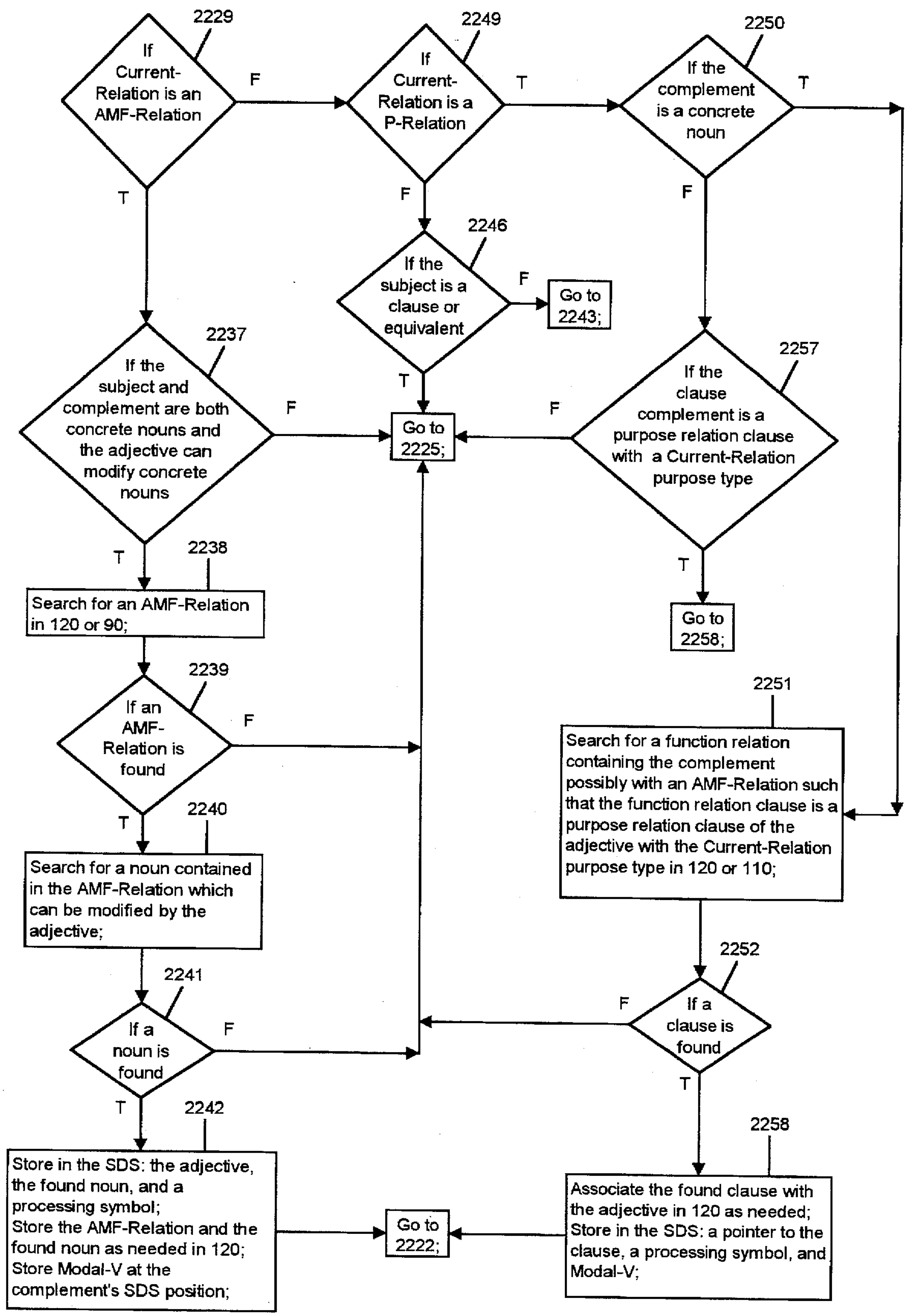
Figure 8F:
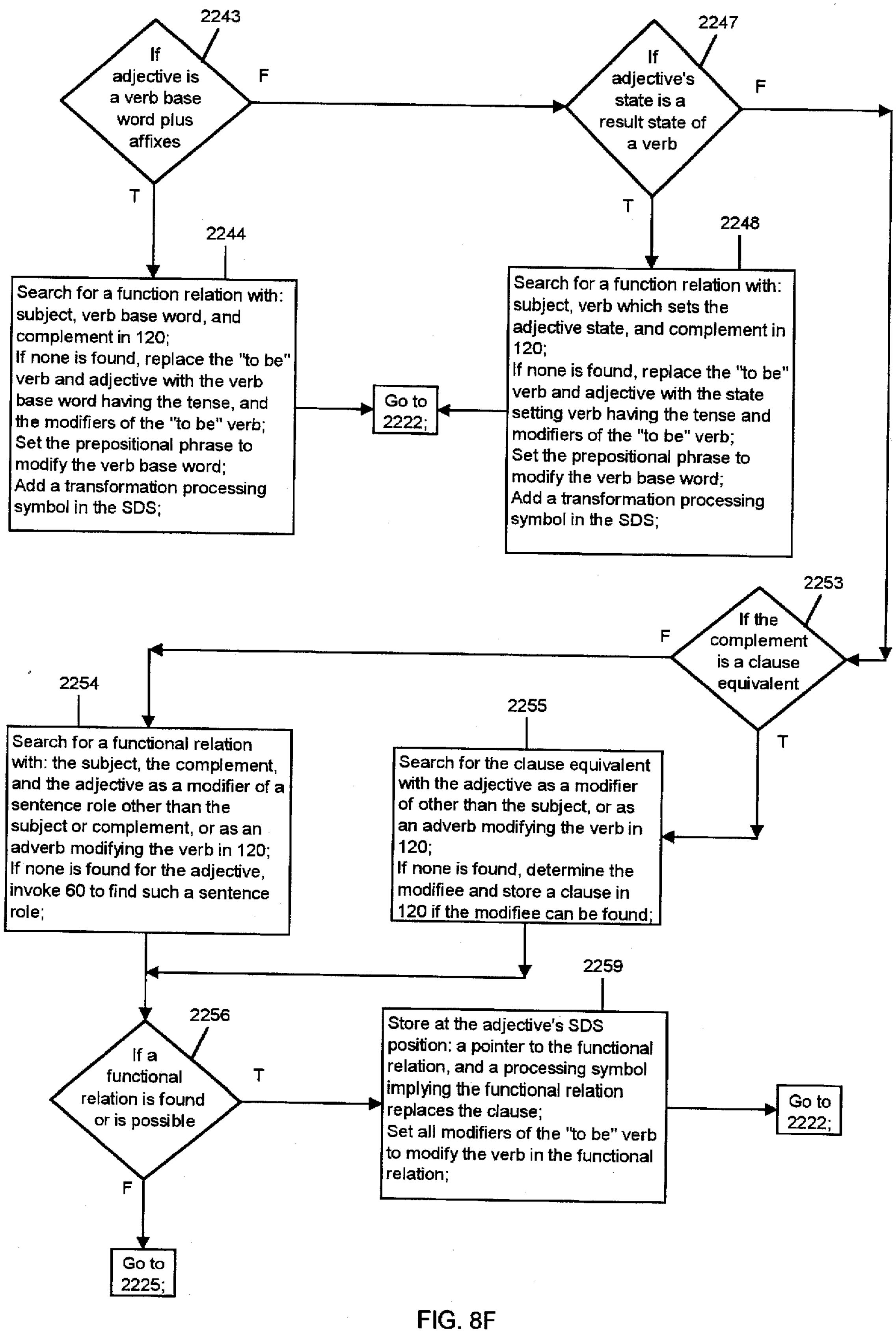

The flow chart for selecting and evaluating the function of a preposition modifying an adjective, ADJ-PREP, is illustrated in FIGS. 8*d*–8*f*. Processing begins at Step 2220 as was stored in the preposition's position in the SDS by Step 18. ADJ-PREP is typically called by Selector 60 as is described in the 60 section. Step 2220 sets RESTART to have a value of 2221, the step which restarts preposition processing if a different interpretation of the preposition is required by state representation processing. 2220 stores "RESTART" and its value in the preposition's position in the SDS. Also, 2220 sets the Next-Relation-Address to be the address of the first relation of Cur-Prep, the preposition under processing. After 2220, 2228 is next, and is true if Cur-Prep can be an adverbial preposition. If 2228 is true, it is possible that the adjective actually modifies the subject as occurs for an adjective subject complement. For the adjective to be an adjective subject complement, the prepositional phrase modifying the adjective must be an adverbial. An example of an adjective subject complement modified by an adverbial is: "Tom is sick at home." If 2228 is true, 2230 sets up parameters for Selector 60 to determine if the subject of the clause can be modified by the adjective. The process for 60 to make this determination is described below in the Selector 60 section. 2230 sets Invo-Mod-Set to the subject of the clause with the adjective modified by Cur-Prep; Invo-ADJ is set to this adjective; 60-Start is set to 60872; ADJ-PREP-Return is set to 2236; ADJ-PREP-Status is set to false; and 2230 calls 60[60-Start, Invo-Mod-Set, Invo-ADJ, ADJ-PREP-Status, ADJ-PREP-Return]. The process at 60 starts at 60872 and determines if a word sense number of the subject is modified by a word sense number of the adjective. If the adjective modifies the subject, ADJ-PREP-Status equals Found-In-90. After processing is completed at 60, ADJ-PREP-Return, 2236 is next. 2236 is true if ADJ-PREP-Status equals Found-In-90. If 2236 is true, the adjective modifies the subject, the adverbials modifying the adjective have compatible adverbial subclasses, and 2245 is next. 2245 sets the subject of the clause to be modified by the adjective modified by Cur-Prep; Current-Relation is set to null; and ADJ-PREP-Status is set to COMPLETED; These last two variables are set to values which directs 60 or the caller to perform the next operation for its current invocation as is described below. After 2245, 2223 is next and sets state representation processing to continue at the caller invoking this process. In this case, the adjective modifies the subject, the prepositional phrase modifying the adjective is an adverbial, and ADJ-PREP is complete.

If 2228, or 2236 is false, 2221 is next. In this case, ADJ-PREP processing is required. Step 2221 sets the Current-Relation to the relation at the Next-Relation-Address. The Current-Relation is the next relation of the preposition to be processed for selection and evaluation. Step 2221 also sets the Next-Relation-Address to be the address of the relation following the Current-Relation or null if there is not another relation as at 2201, described above. 2227 is next and is true if the Current-Relation is a T-relation. If 2227 is true, Step 2231 is next and is true if both the complement and subject are concrete nouns. If 2231 is true, Step 2232 searches for the same T-relation implied by the adjective and its modifying preposition between the subject and complement in Context Memory 120. If none is found, Selector 60 is invoked to search for a specific T-relation in Memory 90 if both subject and complement are specific known references. Otherwise, or if no specific relation is found, a general T-relation between a general subject and a general complement is searched for in Memory 90 by 60. The search at 2232 is the same as the search at 2215 as described above. The search for the T-relation at 2232 uses the specified states as at 2215 if there is a modifier of the complement which sets state or property values or indicates the similarity such as "in the sense that . . . ". One difference at 2232 is that the preposition data structure entry of the preposition modifying the adjective may contain one or more specified states and/or properties which are to be used as a default specification if no states or properties are specified in the text. The modifiers of complements are evaluated before the T-relation is processed. The set of states or properties indicated in a statement from the specified set of states or aspects, or if none are stated, a listed default specification forms the specified set if one is listed A T-relation match is found when the same criteria described at 2215 are met. If a T-relation is not found in 120 or 90, Step 2232 determines if a T-relation can be generated with specified states and properties or by finding the common states and properties shared by the subject and complement as at 2215. Step 2234 is true if a stored T-relation was found, or if a T-relation can be generated. If 2234 is true, 2235 is next. 2235 is essentially the same step as 2218. If a T-relation was found Step 2235 stores the T-descriptor address at the destination in the Context Memory 120 if it is not already stored there. If a T-relation was not found, but a T-relation can be generated, 2235 generates the T-relation. If the set was specified at 2232, the values of the specified set of states and properties are transferred from the source to the corresponding destination states and properties in Context Memory 120 at 2235. Otherwise, the values of the common states and properties of the source are transferred to the corresponding destination states and properties in Context Memory 120 at 2235. The value relation between the transferred states and/or properties is set according to the relation function stored at the adjective modified by the preposition. The T-descriptor is also generated and stored at the destination in 120 at 2235. However, if the destination state or property has a known value, the value from the source state or property is not transferred. If the adjective modified by the preposition which implies a generated T-relation is modified by one or more degree adverbs, 2235 adjusts the value relation in the T-descriptor between the transferred states and properties by multiplying the pseudo difference quantity of the value relation by the degree number associated with each modifying degree adverb. The value of a degree adverb is obtained as described above. The generated T-relation's T-descriptor is stored in Context Memory 120 including the transferred state and property values. Finally, 2235 marks and stores Modal-V at the complement's SDS position. Modal-V is set at 60 and is true when the "to be" verb phrase has a modal verb or a modal adverb(s). If Modal-V is true, the T-Relation is modified by the modal or modal adverb. After Step 2235, Step 2222 stores the following information at the preposition's position in the SDS: the type of relation, the address of the relation, the computed confidence level, and the Next-Relation-Address. The confidence level is computed as at 2207 as described above. 2222 also sets ADJ-PREP-Status to COMPLETED. After 2222, 2223 is next and sets state representation processing to continue at the caller invoking this process.

If in 2231, it was found that the complement and the subject were not both concrete nouns, 2231 is false. If 2231 is false, Step 2224 is next and is true if the subject and complement are clauses or clause equivalents. At 2224, the clause or clause equivalents have been processed as will be described below. If 2224 is true, a search process similar to the one described in Step 2232 is performed in Step 2233. The main difference between 2232 and 2233 is that the T-relation is for clauses. T-relations for clauses are not stored in Memory 100, but they can be stored in the Context Memory 120. Another difference is that common aspects of the clauses as described above are searched for in 2233 instead of the searched for states and properties in 2232. 2233 first searches for a stored T-relation in the subject or complement clause in 120. If none is found, 2233 invokes Selector 70 to search for common aspects of the two clauses in Memory 100. If common aspects of the clauses as described above are found, a T-relation can be generated between the two clauses. The common aspect of a destination which are known for a specific known reference of a clause role are not set in the T-relation. But non-specific clause roles in the destination are set from the corresponding role in the source. Similarly other known specific aspects of the destination are not set to the equivalent in the destination. But unknown or non-specific aspects are set in the destination. Steps 2234, 2235 and 2222 following Step 2233 are the same as described above except common aspects replace common states and properties. If 2234 is false, i.e., a T-relation was not found and was not generatable, then the T-relation is not applicable and Step 2225 is next. Step 2225 is true if there is another relation associated with the preposition modifying the adjective. If 2225 is true, Step 2221 is next and selects the next relation for processing as above. If 2225 is false, ADJ-PREP has failed to find a known relation between the current word sense number of the subject, the possible word sense numbers of the adjective, and the current interpretation of the prepositional phrase. If 2225 is false, 2226 is next. 2226 sets ADJ-PREP-Status to FAIL. ADJ-PREP-Status is an invocation parameter which is returned to the caller next at 2223 as described above. If the caller is 60, the FAIL value causes 60 to consider other possible elliptical, and morphological possibilities for the adjective modified by a preposition. Failing these possibilities, alternate word sense numbers for the prepositional complement and/or subject are considered at 60. These processes are described below in the 60 section.

If the current relation is not a T-relation at 2227, Step 2229 is next, and is true if the Current-Relation is an AMF relation. If 2229 is true, Step 2237 is true if the subject and complement are both concrete nouns, and if the adjective can modify concrete nouns. The subject and complement have been processed for word sense number selection. A clausal abstract noun which represents a concrete noun is treated as a concrete noun at 2237. If 2237 is false, 2225 is next and selects the next relation as described above. If 2237 is true, Step 2238 searches for the AMF relation between the subject and complement in Context Memory 120. If none is found, the AMF relation is searched for in Memory 90 by Selector 60. Step 2239 is true if the AMF relation is found. The search for the AMF relations is the same process as described above for 2204. If 2239 is false, an AMF relation was not found and control passes to 2225 as described above. If 2239 is true, Step 2240 invokes Selector 60 to search for a concrete noun contained in the found AMF relation that the adjective can modify. 2241 is true If the adjective can modify a concrete noun in the found AMF relation from 2240. If 2241 is true, the state or property and its associated value associated with the adjective will be used to select and to set the corresponding state or property in the noun found in 2240 in subsequent state representation processing. If 2241 is true, 2242 stores the following at the preposition's position in the SDS: a pointer to the adjective, a pointer to the found noun, a symbol calling for the evaluation of the adjective modifying the noun. 2242 stores Modal-V at the complement's SDS position. Also, 2242 stores the AMF relation and the found noun in 120 for each one not already stored there. Step 2222 is next and stores information in the SDS as described above. If no modifiable noun was found at 2241, Step 2225 is next as described above.

If the current relation at 2229 is not an AMF relation, i.e., 2229 is false, Step 2249 is next. 2249 is true if the current relation is a P-relation, and if the adjective modified by a prepositional phrase has an associated state value in the Adjective and State Abstract Noun Representation Memory 80. If 2249 is true, Step 2250 is next and is true if the complement is a concrete noun. If 2250 is true, Step 2251 searches for a functional relation containing the complement in Memories 120 and 80. The functional relations containing the complement are searched for in 120 and 80 as described at 2204 and includes AMF relations of the complement to a sentence role of the clause. However, one difference at 2204 is that the functional relations are associated with the adjective. Step 2251 first searches in Memory 120 for such functional relations which are purpose relation clauses of the adjective with the purpose relation type associated with the Current-Relation, a P-relation of the preposition. If none of the purpose relation clauses associated with the adjective in 120 contain the complement and have the purpose relation type associated with the Current-Relation, then 2251 checks if there are any other functional relations containing the complement in 120. The found functional relations are matched with the purpose relation clauses of the adjective with the purpose relation type of the Current-Relation in the adjective's portion of the Purposes Associated with States Memory 110. Selector 50 obtains the purposes associated with the adjective. First, each clause checked for a match has the same type (general or specific) of noun reference for corresponding sentence roles. A match is found if the purpose relation clause has sentence roles with the same state representation as the corresponding sentence roles of the found clause. If no same reference type purpose relation clause matched the found clause, general reference purpose relation clauses matches are used. For a general reference purpose relation clause match, a general or specific noun matches a corresponding sentence role if such a noun meets the requirements of the sentence role. The requirements of the sentence role are associated with a verb word sense number and are described in detail below. If no matches are found in Memory 110, then 2251 searches for the adjective's any other unchecked purpose clauses with the purpose relation type of the Current-Relation which is a functional relation of the complement, i.e., an adjective's purpose relation clause with the purpose relation type which contains the complement in a clause role. The search for the functional relation is first for a same type of complement noun reference. If none is found, the search is for a function relation with a general reference complement match. After 2251 is completed, i.e., either finds a purpose relation clause or fails to, 2252 is next. Step 2252 is true if 2251 found a purpose relation clause of the adjective with the purpose relation type of the Current-Relation which contains the complement possibly through an AMF relation of the complement. If 2252 is true, Step 2258 associates the purpose relation clause with the adjective in Memory 120 if the relation is not already stored there. 2258 stores the following in the SDS position of the adjective: a pointer to the location of the found purpose relation clause, a symbol which indicates that the consistency of the found clause is to be checked, and Modal-V. The found purpose relation clause will be checked for consistency with the context of the conversation in subsequent state representation processing. If the found clause is inconsistent, another purpose relation clause is searched for during state representation processing. If none is found, this process is reinvoked for the next relation of the preposition. After 2258, 2222 adds the relation to the SDS as described above. If 2252 is false, Step 2225 is next and begins the processing of the next relation as described above.

If Step 2250 is false, the complement is not a concrete noun, but rather the complement is a clause or clause equivalent, and Step 2257 follows. Step 2257 is true if the clause complement is stored with the adjective in 120 as a purpose relation clause with the purpose relation type associated with the Current-Relation of the preposition. If the clause is not stored with the purpose relation, step 2257 is true if the complement clause has a same or general reference purpose relation match to a purpose relation clause with the Current-Relation type of the adjective in Memory 110. If the clause complement has a purpose relation stored in Memory 120 or has a match in Memory 110, Step 2257 is true. If step 2257 is true, Step 2258 is next as described above. If 2257 is false, 2225 is next as above.

If the current relation is not a P-relation at 2249, the remaining possibility is that the subject and complement are in a functional relation with the adjective playing various roles in the functional relation. If 2249 is false, 2246 is next, and is true if the adjective is a subject complement to a clausal subject. If 2246 is true, no functional relations are possible, and the next relation is selected at 2225 as described above. If 2246 is false, Step 2243 is next and is true if the adjective is formed from a base verb plus one or more affixes. If 2243 is true, a functional relation with the subject, the adjective's base verb, and the complement is searched for in Memory 120 at 2244. If a functional relation is found, 2244 stores a pointer to the found clause in 120 and a processing symbol at the adjective's position in the SDS. All modals and adverbs modifying the "to be" verb in the stated clause are set to modify the base verb of the adjective. This processing symbol implies that the stated clause has been replaced with the found clause. Step 18 checks for this symbol. When 18 finds this symbol, the previously selected word sense number of the verb and other sentence roles are used in the processing of the current clause. However, the current clause is processed at 70 to handle the case in which the current clause has different or additional adverbials modifying the verb. The current clause is also checked for being identical since this will effect subsequent processing. If a clause is not found in 120, 2244 replaces the "to be" verb and adjective in the stated clause with the base verb of the adjective. The tense and modifiers of the "to be" verb are included in the base verb phrase, and the complement of the prepositional phrase modifying the adjective in the stated clause is set to be the clause object. This new clause will be interpreted as a normal clause. A processing symbol is added to the verb phrase which indicates this transformation. This symbol also indicates that the object may require a transformation back to the complement of the prepositional phrase during processing at 70. If the object, which was stated as a complement of a prepositional phrase modifying an adjective, does not meet the object requirements of the clause at 70, the object is replaced with the stated prepositional phrase which is set to modify the verb in the formed clause at 70, and processing continues at 70 as is described below. After 2244, 2222 adds the relation to the SDS as described above.

If Step 2243 is false, 2247 is next. Another type of functional relation is processed starting at Step 2247. Step 2247 is true if the adjective's state is a result state set by a verb. A result state adjective state is stored in Adjective and State Abstract Noun Representation Memory 80. If 2247 is true, then Step 2248 searches for a functional relationship with the subject, with the verb which sets the adjective's state, and with the complement in Memory 120. If a clause is found in 120, 2248 stores a pointer and a processing symbol at the adjective's position in the SDS. This symbol implies using the found clause in subsequent processing as at 2244 above. If none is found, 2248 replaces the "to be" verb and adjective in the stated clause with state setting verb of the adjective. The tense and modifiers of the "to be" verb are included in the state setting verb phrase, and the complement of the prepositional phrase modifying the adjective in the stated clause is set to be the clause object. This new clause will be interpreted as a normal clause. A processing symbol is added to the verb phrase which indicates this transformation. This symbol also indicates that the object may require a transformation back to the complement of the stated prepositional phrase during processing at 70 as at 2244. After 2248, 2222 adds the relation to the SDS as described above.

If Step 2247 is false, the final type of functional relation is searched for beginning at Step 2253. Step 2253 is true if the complement is a clause or clause equivalent. If 2253 is false, Step 2254 is next and searches for a functional relation with the subject, with the complement, and with the adjective modifying a clause role in the functional relation clause other than the subject or complement, or with the adjective converted to an adverb which modifies the verb of the functional relation. Step 2254 first searches for functional relations containing the subject and complement in Memory 120. The complement will typically either be in a prepositional phrase or be an object. If any are found, 2254 invokes 60 to check if the adjective can modify a clause role other than the complement or subject as is described below. If the adjective has such a modifiee, Step 2254 is completed. If the adjective does not have a modifiee, 70 is invoked with an ADJ-COMP-MOD opcode to indicate that a designated adjective is to be converted to an adverb which is processed to determine if this adverb can modify a verb in the designated found function relations. The adjective is converted to an adverb by Morphological Processing Step 24 as will be described below. The designated found functional relations are checked to determine if the adverb from the conversion can modify the verb in the functional relations in Selector 70 in a process as will be described below. If the adverb can modify a verb, 2254 is completed. If no functional relation is found in Memory 120, or no found functional relation has a modifiee of the adjective or the adverb converted from the adjective, Selector 60 is invoked to find a functional relation in the Concrete Noun State Representation Memory 90 structure of the complement. The complement structure is searched for a functional relation containing the subject and complement. All functional relations are searched for as at 2204 including AMF relations of the subject and/or complement to a sentence role of the functional relation. If any are found, then the functional relations are checked for having a modifiee of the adjective or the adverb converted from the adjective as described above. After 2254, 2256 is true if a functional relation with the subject, complement, and a modifiee of the adjective or adverb converted from the adjective has been found. If 2256 is true, Step 2259 is next and stores the following at the verb's position in the SDS: a pointer to the functional relation with the adjective or adverb modifier, a processing symbol implying the processing of the clause as described at 2244. Also, 2259 includes the tense and modifiers of the "to be" verb in the stated clause in the verb phrase of the functional relation clause. After 2259, 2222 is next as described above. If 2256 is false, Step 2225 is next and process the next relation as described above. If the complement is a clause or clause equivalent at Step 2253, Step 2255 is processed next. For example, a clausal abstract noun or certain morphological words are clause equivalents. Step 2255 is essentially the same process as Step 2254 except that the complement clause with the stated subject as the subject of the complement clause is the functional relation searched for in 120 at 2255. If this clause is not found in 120, 2255 determines if the clause complement has a sentence role modifiee of the adjective other than the subject or has the adverb converted from the adjective modifying the verb of the clause complement as at 2254. After 2255, processing continues at Step 2256 as described above.

ADVERBIALS

Adverbials Modifying Verbs

Adverbials include adverbs and prepositional phrases modifying the verb(s) in a clause. Many adverbials have a sentence role such as subjects, verb, and objects do. A sentence role serves to select a verb word sense number with its capability. For adverbials, the capability is realized as an adverbial subclass. The adverbial subclasses are associated with a verb and are used to select a verb's word sense number. The adverbial subclasses for verbs being modified by adverbs are stored in Selector 70. An adverbial subclass of a verb is a specific semantic role, one or more states or properties, and/or one or more parameters. There can also be a set of values or value ranges with units of measurements for each state, property, and parameter. This set is used to select specific values or value ranges for the semantic role as will be discussed below. Also, this set is used to verify that the state or property has been set within required limits. The range of semantic roles are broadly: time, space, process, modality, (point of) reference, purpose, conjunction, verb word sense number selection, and degree. A specific semantic role indicates the specific aspect of a broad semantic role. For example, some specific semantic roles for time are: frequency, duration, start time, time position, etc. An adverbial has one or more functions associated with it. Broadly, an adverbial's function is to set some aspect of the verb's word sense number including: setting values for semantic role states, properties, and/or parameters of an adverbial subclass which is used in the selection process of a verb's word sense number; selecting a word sense number of the verb; selecting or modifying an aspect of a process which achieves the verb's word sense; selecting or modifying the resulting states of the verb's word sense number; indicating a purpose relation to the clause containing the adverbial; indicating a relation between the current clause and the preceding clause;

and/or setting a truth value for the verb's clause. Some of these functions are directly performed by processing an adverbial. Also, some of these functions are indirectly performed by processing the adverbial in the sense that a function result from processing an adverbial causes another function to be evaluated. For example, an adverbial can directly select a verb's word sense number, and/or an adverbial can set an adverbial subclass which is used to select a verb's word sense number. An adverbial subclass is evaluated for a capability match during verb word sense number selection in Selector 70. Also, during verb word sense number selection some adverbial subclasses needed to select the verb word sense number may not be explicitly stated in the clause. In this case, such adverbial subclasses are obtained from the context or drawn from previous experience.

FIG. *9a* illustrates the data structure for adverbial subclasses. The adverbial subclass data structure has a list of elements. An adverbial and a modifiee of an adverbial such as a verb each have an adverbial subclass data structure. FIG. *9a* illustrates the data structure for adverbials. The adverbial subclass data structure of a modifiee only contains a source descriptor. Each element of the adverbial subclass data structure of an adverbial has a source descriptor, a destination descriptor and function(s). The adverbial subclass data structure is similar in form to the S-type relation of prepositions modifying concrete nouns in that there can be source and destination requirements. However, the descriptors and the function differ in content. The source descriptor contains the semantic role of the adverbial. The source descriptor can also contain a value range(s) with units of measurement and other requirements for the source. The value range(s) applies to the value(s) associated with the adverbial function(s) in the adverbial subclass with the source and destination descriptors. This value(s) is also the adverbial subclass value(s) of an evaluated adverbial and is stored in Context Memory 120 after evaluation from a conversation. In addition, the source descriptor contains: the state(s) and/or property(s) which are utilized in the function associated with the adverbial subclass, a pointer to a function to generate the source state and/or property value(s), or one or more parameters. These state(s) and/or property(s) or the ones obtained from a function can serve as source requirements. The destination descriptor of an adverbial either contains requirements which the modified verb or other modifiee must have for the function(s) of the adverbial to be applied, or the destination descriptor is empty because the adverbial can be applied without restriction. The requirements of the destination descriptor are specific to the semantic role and include: result state properties, time properties, space properties, word sense number selection properties, and process properties. For example, a time property requirement would be for the verb to have greater than instantaneous duration of the event associated with the verb. The empty destination descriptor is usually used for modal, purpose and conjunction adverbials. Modal adverbials express the degree of truth about the clause which they modify. Purpose adverbials indicate a relation between the clause and the adverbial. Conjunction adverbials serve to indicate the relation of the current clause to the previous clause and they include: "next", "then", "for a start", etc. The functions associated with an adverbial vary by semantic role. However, there are two basic function types. One type of function sets the state, property and/or parameter values of an adverbial subclass and sends this to Selector 70. This value can be specifically set or reverts to a typical value depending upon the contents of the conversation. The other type of function processes data in one or more data structures, selects the word sense number, and/or in general can invoke any process. An adverbial can have one or more functions of each type.

The adverbial can be realized in a variety of ways: an adverb, an adverbial prepositional phrase, or an adverb formed from a base word plus affix which is typically represented as a generated prepositional phrase. The adverbial subclasses associated with an adverb or the preposition of an adverbial prepositional phrase are stored in a data area of Function Step 22. An adverbial formed from a baseword plus affixes is converted to a representation which either includes an adverbial subclass or which accesses adverbial subclasses as a stated adverbial such as an adverbial prepositional phrase. The included adverbial subclasses are determined by Morphological Step 24. If the representation does not include an adverbial subclass, Step 24 generates a representation, typically a prepositional phrase, which implies the adverbial subclasses for the adverbial formed from a base plus affixes.

The adverbial prepositional phrase can be realized elliptically. The preposition can be ellipited from a prepositional phrase realizing a zero-preposition. For example, "He went home." has a zero-preposition relating "home" to "went". Compare this to the example: "He went to school." The complement of a preposition can be ellipited. For example "He walked past" has "past" as a preposition with an ellipted complement of "location of the speaker". Compare this example to "He walked past the car." which has "car" as the prepositional complement. Actually, adverbials like "past" could be considered adverbs in the sense that the data structure to implement such an adverbial preposition is identical to the data structure to implement an adverb. Such a data structure has a function in the source descriptor to obtain the source, a destination descriptor for the verb requirements, and a function which sets the adverbial subclass state value. Thus, adverbials like "past" are treated as ellipted prepositional phrases. Ellipted prepositional phrases are detected in Syntax Parse Step 16, and the ellipted words are replaced by Elliptical Processing Step 26.

Another special type of preposition is associated with a particle. A particle can be an adverb or preposition. A particle can select an idiomatic verb word sense number for certain combinations of clause elements. For example, "He called up the mayor." has the particle "up" selecting the word sense of "to phone" for "called". In this sort of example, the particle is treated as a prepositional phrase. However, in the example "He called the mayor up", "up" is an adverb which selects the verb's word sense number. For the prepositional particle, the source descriptor contains the property of being a person or an organization of persons. The complement must have the property for the preposition function to be satisfied. For the adverb particle, the source descriptor is a function which checks if the object of the sentence contains a property of being a person or an organization of persons. The destination descriptor has a requirement of the verb having a word sense number selection capability by the preposition or adverb.

Another type of adverbial preposition is generated from adverbs which are formed from a base word (e.g., an adjective) plus affixes. For example, for an adverb formed from an adjective baseword, usually the affix is the suffix "ly". An adverb with an adjective base is equivalent to a prepositional phrase of the form "[(preposition) "a" (adjective base (optional modifiee)) (adverbial semantic role)]. For example, "quietly" is equivalent to: "with a quiet process". The range of adverbial semantic roles are broadly:

time, space, process, modality, (point of) reference, purpose, conjunction, verb word sense number selection, and degree. These are the same semantic roles described above. The prepositional phrase representing the adjective based adverbial is generated in the Morphological Processing Step 24 by an invocation from Dictionary Look Up Step 18. The generated prepositional phrase is than processed according to the word it modifies. One unusual type of general prepositional phrase for an adverb formed from an adjective is: "for (clause doer's) (adjective base) reason". For this adverb, the state value of the adjective is set for the "reason" purpose semantic role for doing the clause. For example, "He foolishly agreed." has "foolish" modifying the "reason" for doing the clause, "He agreed." This example is equivalent to: "He agreed for his foolish reason."

Adverbs can also be formed from adjectives that are formed form verbs. These adjectives are really verbals. Verbals are a type of clause equivalent. For example, "surprising" is an example of a verbal which can be used as an adjective, and which can be used as a base to form an adverbial. For example, "He surprisingly did well." Adverbs with a verbal base can also be represented as a prepositional phrase of the form: "[(preposition) "a" (adjective base (optional modifiee)) (adverbial semantic role)]", i.e., the same form as for adverb formed directly from an adjective base. Thus, "surprisingly" in the example clause has a prepositional form modifying "did" as: "in a surprising (to the clause speaker) clause result". Thus the example clause is equivalent to: "He did well in a surprising to me clause result." However, the adjective base has a verb base which implies a clause relation. In this case the clause relation is formed: with the clause result as subject, with the verb base of the adjective modifier as the verb, and the adjective modifiee as the object. The resulting clause relation is equivalent to: "The clause result surprised the clause speaker." The equivalent sentence to the example is: "That he did well surprised me." The verbal used as an adjective is converted to the equivalent clause using verbal ellipsis processing in Ellipsis Processing Step 26 which is described below. To summarize, the adverb formed from an adjective is processed in the Morphological Processing Step 24. If the morphological processing selects a function which processes a clause equivalent, the clause equivalent is processed as clause ellipsis by Ellipsis Processing Step 26 to generate a clause. Step 24 is invoked by Dictionary Look Up Step 18 as needed. Step 24 can either directly invoke Ellipsis Processing Step 26, or 24 can have the function stored in the SDS for later invocation of 26. The time of invocation of 26 depends upon the morphological function, and that time is stored with the morphological function. In this example, "surprising" has modal purpose comment semantic role, i.e., "surprising" is a comment in a clause about the truth value of the modified verb. The adverb is processed to a clause, but the adverb function is also used to select its intended role in the sentence. The adverb function selection is now briefly described.

One of the purposes of the source and destination descriptors of an adverbial subclass is to serve as requirements which must be satisfied to select the function(s) of the adverbial associated with the satisfied source and destination descriptors. The source descriptor of the adverbial's subclass is partially satisfied with matching its semantic role to the semantic role in the adverbial subclass of the word being modified by the adverbial in the clause containing the adverbial. The semantic roles of the match must be identical. Sometimes, more than one adverbial subclass is possible for the current state of the word sense number selection process. It is also possible that the current adverbial may have more than one set of source and destination descriptors that can be satisfied with the adverbial subclasses of the verb (or other modified word). When multiple adverbial subclasses are possible, the adverbial class with the semantic role which best matches the most recently used semantic role in the context is used. Two semantic roles match broadly if they at least have the same broad semantic role. The semantic role matches will be described in more detail below. Here is an example of an adverbial with multiple possible adverbial subclasses: "The bell just rang." This example could have "just" with two different adverbial functions depending on the context. The context is set differently by each one of the following questions: "When did the bell ring?" or "Did the bell ring intermittently?". In the first question, the most recent semantic role of the adverbial pronoun "when" is time position. The time position semantic role broadly matches the relative time position semantic role of "just" which is synonymous with "recently", i.e., "The bell recently rang." In the second question, the most recent semantic role of "intermittently" is process continuity. The process continuity semantic role broadly matches the exclusive process semantic role of "just" which is synonymous with "only", i.e., "The bell only rang."

When multiple possible adverbial subclasses occur in the selection of a verb's word sense number as in the previous paragraph's example, the multiple adverbial subclasses which have semantic role matches with the adverbial in the clause being processed are evaluated in the order of the most recently used semantic role as stored in Context Memory 120 until an adverbial subclass of the verb can satisfy the source and destination descriptors of the adverbial in the clause. The semantic roles of the verb's adverbial subclasses are first matched with the semantic roles of the source descriptors of the adverbial in the clause being processed. Then the found semantic role matches are checked for matches with the most recently used adverbial semantic role in the context. In the case of multiple possible adverbial subclasses, the semantic role of the verb's adverbial subclass is considered to match the semantic role from the context if they at least match broadly. The semantic roles match broadly if the most broad descriptor of the semantic roles match. The most broad semantic role descriptors which can be matched in this case are: time, space, process, modality, (point of) reference, purpose, and degree. The semantic roles are composed of descriptors in an order of most broad to most specific. Two semantic roles can match with varying degrees of specificness. The descriptors of two semantic roles are compared until a mismatch occurs. The specificness of the semantic role match increases as the number of semantic role descriptor matches of two semantic roles increases. The most recently used semantic role in Context Memory 120 is matched with the possible semantic roles of Selector 70. If no semantic role match is found, the order of evaluation of the multiple possible adverbial subclasses is the listed order of the adverbial subclasses in Context Memory 120. The verb's adverbial subclass of Selector 70 with the most specific semantic role match to the most recently used semantic role in the context is used to attempt to satisfy the source and destination descriptors of the adverbial in the clause. If no stated adverbial's descriptors are satisfied, the adverbial subclass of the verb with the next most specific semantic role match to the most recently used semantic role in the context is used next to attempt to satisfy the source and destination descriptors of one of the adverbials in the clause. The order of evaluation is for the verb's adverbial subclass with the most specific semantic role match first to the most broad match last of the most recently used semantic role in the context. The multiple possible adverbial subclasses are evaluated for all source and destination descriptor pairs of the current stated adverbial in the clause. If a match is found, the functions of the matched adverbial subclass of the current adverbial are evaluated or stored depending upon the function. Then the selector evaluates the selected adverbial subclass for its results to determine if it meets the semantic role value of the selector. If the semantic role is unacceptable, the selector invokes the adverbial selection process for another stated adverbial if there is one. Otherwise the selector backtracks to select another word sense number. If the stated adverbials are successfully processed, and if there are other adverbials which are required to be evaluated to select the verb word sense number, then the required, but unevaluated, adverbial subclasses of the verb are checked for having a match with an adverbial semantic role in Context Memory 120 in the order of most recently used semantic role first. If the successful processing point is not reached, Selector 70 backtracks and tries to match another word sense number of the verb.

The verb word sense number selection process in Selector 70 allows for multiple possible adverbial subclasses. It is possible that the intended adverbial function was not selected. This method for selecting an adverbial's function is similar to selecting a pronoun referent in that the selection is made for a given criteria, and the selection is evaluated later for correctness. If the subsequent state representation processing of the clause fails, the adverbial subclass with the next most recent semantic role is processed next in the order described above. This process is repeated until a match is found or all choices have failed to match. If no match is found, Selector 70 attempts to find another verb word sense number selection.

The process for satisfying the source and destination descriptors of an adverbial is now described. First, the semantic role of an adverbial subclass of the modifiee is checked for a match with the semantic role of the source descriptors of the elements in the data structure for the adverbial in the clause currently under evaluation. The first element with a semantic role match is then checked for satisfaction of the requirements of its source and destination descriptors. The elements of the adverbials with semantic role matches are evaluated until the requirements of a source descriptor and destination descriptor in the same element are satisfied. A source descriptor requirement of an adverbial preposition is satisfied when the source descriptor's state(s) and/or property(s) are contained in the complement of a prepositional phrase and/or when other requirements of the source descriptor are satisfied. If the source descriptor is a function, the function must return a result to satisfy the source descriptor requirements. If the source descriptor contains only parameters, its requirements for source states and/or property(s) being contained in the complement of a prepositional phrase are satisfied. An adverbial formed from a base word plus affix can have an adverbial subclass requirement which is a parameter, a state, and other requirements. When a prepositional representation is formed with a semantic role complement as above, the semantic role is a parameter of the requirement and the complement's modifier is a state of the requirement. If the destination descriptor is empty or the word modified by the adverb meets the descriptor requirements, the destination descriptor requirements are satisfied. The descriptor requirements are matched with information contained in the selector's data structures for example.

The function(s) of an adverbial are selected if its source and destination descriptors requirements are satisfied. The selected function(s) is then evaluated or stored for later evaluation and the adverbial processing is complete. The function types associated with an adverbial data structure include several varieties. One type of selected function processes and sets the adverbial subclass value. This type of function is called a transfer function. The transfer function sets up the adverbial subclass for selecting in conjunction with other sentence roles: the word sense number, process, result states, and/or result state values for the verb modified by the adverb. If the satisfied source descriptor has parameters, the transfer function can use these parameters for a variety of processes such as matching or generating a scale value for the subclass. Also, the scale value for the subclass can be adjusted by a degree adverbial modifying an adverbial which modifies another word. Degree adverbials are evaluated after its modifiee adverbial has its adverbial selected. If the verb has specific values for the adverbial subclass, the scale value is used to select the specific value. For example, "I ran fast for a mile" has "fast" with a semantic role of process speed and a scale value of 8 on a scale of 1 to 10 with 5 being typical. The verb "ran" for the verb sense of human movement has 12 miles per hour (5 minutes per mile) (say) corresponding to a scale value of 8. If the source descriptor contains states or properties, the transfer function transfers the state or property values of the state(s) or property(s) contained in the source descriptor from the complement or possibly its modifier to the adverbial subclass value. The transferred state or property value can also be used to select a specific value of the verb as the scale value did for parameters. If the transferred value is non-numeric, the non-numeric value is looked up in the verb's data structure in 70 to find the verb's specific value corresponding to the non-numeric value. If the source descriptor contains a function, the function either returns a parameter(s), or a state or a property value(s). The transfer function associated with the source and destination descriptors utilizes the parameter(s), or state or property value(s) returned from the function in the same manner as the ones stored in a source descriptor. This type of function is usually used for the following adverbial semantic roles: time, space, process, (point of) reference, and degree.

Another type of function selects the word sense number, the result states and values, and possibly the process. This type of function is selected by a particle, and the function is called a particle function. A particle can be an adverb or preposition. A particle can select an idiomatic verb word sense for certain combinations of clause elements as described above. The particle function is implemented with a function symbol which is checked for a match in the verb's data structure in Selector 70. If the function symbol is matched, the associated information with the matched function symbol indicates the modified verb's word sense number, result states and values, and/or the process.

Another type of function, the purpose function, implements purpose adverbials. Purpose adverbials are prepositional phrases. The complement of a purpose adverbial is either a clause equivalent, or the complement is contained in a clause relation. The clause relation of the complement is converted to a clause by Ellipsis Processing Step 26. The clause or the clause relation is in a purpose relation to the clause containing the purpose adverbial. A purpose relation includes any experience and knowledge related to a clause in various categories as described above. The function of a purpose adverbial can invoke any process. For example, the purpose adverbial can have a function which initiates the search for a purpose relation of clausal complement or the clause relation of the complement to the clause containing the adverbial within Context Memory 120. If a purpose relation is not found in Memory 120, the purpose relation is identified by the Purpose Identifier 140 in subsequent state representation processing. A set of zero or more types of possible relations are stored in the source descriptor. The possible relations are used for the search in Memory 120 or by the Purpose Identifier 140 in subsequent state representation processing.

Another type of function, the modal function, implements modal adverbials. Modal adverbials express the truth value of the clause. The truth value varies from true to possible to false. The modal function assigns the truth value contained in the source descriptor and sets the truth value descriptor of the clause in the Context Memory 120. Modals can also contain comments about the clause.

Another type of function, the conjunctive function, implements conjunctive adverbials. Conjunctive adverbs indicate the purpose relationship of the clause containing the adverbial to the previous clause. The source descriptor contains parameters which indicate the types of purpose relations between clauses. If there is a single type of relation, the conjunctive function sets the relation to the previous clause descriptor of the current clause in Context Memory 120. If more than one purpose relation is listed in the source descriptor, the Purpose Identifier 140 uses the possible relations to find the purpose relation of the current and previous clause in subsequent state representation processing.

Another type of function invokes any process appropriate to the type of adverbial.

If a stated adverbial was not evaluated in the word sense number selection process, the semantic roles of that adverbial did not participate in the word sense number selection process. However, such adverbials can have clause related uses. For example, time and space adverbials can label the clause with respect to time or space. A degree adverb could modify one or more result state values from typical values to the values implied by the degree adverb. Also, modal, conjunction, or purpose adverbials perform functions related to the clause. After Selector 70 selects a verb's word sense number, it checks that all stated adverbials in the clause have been processed. If any have not been processed, adverbial subclasses of the verb in Selector 70 which are not related to word sense number selection are used to process the remaining adverbials. The remaining adverbials are processed in the same method used for adverbials that select the verb's word sense number. However, for some adverbials, the semantic role and associated function can differ depending upon whether the adverbial is used for the verb's word sense number selection or not.

FIG. **9*b*. contains the flow chart for selecting and evaluating adverbials. Processing of the adverbials in a clause is typically initiated by the selector associated with the word modified by the adverbial. The previous paragraphs have described adverbials modifying verbs. As will be described below, the same process for adverbials modifying verbs is also used for adverbials modifying other types of words. The selection process is the same for all types of modified words, but the functions associated with the adverbial differ depending upon the type of modified word. For example, the semantic roles for matching adverbials in the clause in Step 2271, which is described below, come from the word modified by the adverb. Thus, if adverbial processing is for adverbial modification of a verb, the semantic roles come from adverbial subclasses in Selector 70**. Adverbial processing is initiated by the selector of the modified word. The caller indicates the adverbial to be processed and the location of the modified word's data structure containing the word's adverbial subclasses.

Adverbial processing begins at Step 2270, the step stored by 18 in the first word of the adverbial under processing. Step 2270 is invoked by a caller with a specified position of the adverbial in the SDS. The invoking caller also sends a pointer to the set of adverbial subclasses which could be matched with the adverbial under processing. Step 2270 sets the adverbial indicated by the initiating caller as the Current-Adverbial. If the position at the Current-Adverbial already contains RESTART, the Current-Adverbial has previously been unsuccessfully processed for a sentence role by the initiating caller. In this case, 2270 deletes all information in the Current-Adverbial's position in the SDS which follows RESTART and its value, 2287. If this is not the case, 2270 sets RESTART to 2287, and then stores, RESTART and its value at the position of the first word of the Current-Adverbial in the SDS. Then 2270 sets WILD to false. This variable is used for processing the adverbial subclasses of the modifiee as will be described below. Next, Step 2271 finds all of the semantic roles in the currently possible adverbial subclasses of the modified word that match the semantic roles in the source descriptors of the data structure associated with the Current-Adverbial. The location of the Current-Adverbial's subclasses was stored in the SDS previously by Step 18 for example. The matches are ordered so as to have the same order as the adverbial subclasses of the modified word, and the matches are stored in the Current-Evaluation-Set. There could be multiple matches for a particular semantic role of an adverbial subclass of the modifiee with the semantic role of different adverbial subclasses of the Current-Adverbial. In this case, all multiple matches are stored in the Current-Evaluation-Set at Step 2271. 2271 also sets the Current-Most-Recently-Used-Semantic-Role to the most recently used semantic role which is stored in Context Memory 120.

After 2271 is completed, Step 2272 is true if any semantic role matches were found in 2271. If there were no matches of the semantic roles of the possible adverbial subclasses of the word modified by the Current-Adverbial to the semantic roles of the source descriptors of the data structure of the Current-Adverbial in the clause in Step 2271, then Step 2272 is false and Step 2285 is processed next. 2285 is described below. If 2272 is true, Step 2273 finds the first most specific semantic role match of untried semantic role entries in the Current-Evaluation-Set with the Current-Most-Recently-Used-Semantic-Role and sets its it to be the Current-Match. The most specific semantic role match was described above. The untried semantic role entries refers to semantic role entries in the Current-Evaluation-Set that have not been matched before in Step 2273. Step 2273 marks the Current-Match entry as TRIED. After 2273, 2274 is next, and is true if a semantic role match was found in Step 2273 with the Current-Most-Recently-Used-Semantic-Role value. If Step 2274 is true, Step 2275 determines if the source and destination descriptors of the adverbial subclass entry of the Current-Match are satisfied. Source and destination descriptors become satisfied by checking for meeting requirements as described above. Step 2276 is next and is true if the descriptors are satisfied at 2275. If 2276 is true, a possible adverbial subclass has been selected for the Current-Adverbial.

If 2276 is true, Step 2284 evaluates some of the function (s) associated with the Current-Match, and the results of the evaluated functions are identified and stored for the selector associated with the modified word in the SDS. This is Selector 70 for verbs. The selected function(s) is evaluated as described above in some cases. However, some functions will not be evaluated at 2284. These functions are identified and the addresses of the functions are also stored in the SDS by 2284. The functions contain flags which designate which functions are to be evaluated and which functions are to be stored. For example, the function to generate the clause relation implied by a degree adverb is stored for later evaluation. Another example is a function to store the adverbial and its semantic role in 120. This function is performed after the adverbial interpretation is accepted by the caller and is initiated by the caller. Then 2284 stores the following information in the position of the first word of the Current-Adverbial in the SDS: the results and identification of evaluated functions, an identifier and address for each function to be executed later, the position of the modifiee's adverbial subclass that matched the Current-Match, a pointer to the Current-Evaluation-Set, a pointer to the Current-Match entry in the Current-Evaluation-Set, a pointer to the Current-Most-Recently-Used-Semantic-Role, and a pointer to WILD. After 2284, 2288 is next and sets processing to continue at the initiating caller. The initiating caller checks if the results in the SDS matches the adverbial subclass value requirements if any exist. The adverbial subclass value requirements are met if the subclass's state (s), property(s) or parameter(s) was set within associated limits. Also, the caller and subsequent state representation processing determines if the adverbial interpretation is consistent with the current context and experience. Adverbial processing is restarted at Step 2287 if the adverbial requires reinterpretation.

Step 2276 is false if the source or destination descriptors were not satisfied at 2275. If 2276 is false, 2277 marks the Current-Match as FAILED. After 2277, Step 2278 is next, and is true if there are more UNTRIED semantic role matches in the Current-Evaluation-Set. The entries in the evaluation set are marked as being TRIED when they are matched at 2273. If 2278 is true, Step 2273 is processed again to find the next most specific semantic role match with the Current-Most-Recently-Used-Semantic-Role, and processing continues as described above. If 2278 is false, processing is set to continue at 2279 which is described below.

If no semantic role matches were found in Step 2274, none of the semantic roles in the Current-Evaluation-Set matched the Current-Most-Recently-Used-Semantic-Role in Context Memory 120, and Step 2279 is processed next. Step 2279 is true if there is another untried semantic role of an adverbial subclass stored in Context Memory 120. A semantic role is untried at 2279 if it has not been set to the Current-Most-Recently-Used-Semantic-Role for the Current-Evaluation-Set. If 2279 is true, Step 2282 marks all entries without FAILED in the Current-Evaluation-Set to UNTRIED, and 2282 assigns the Current-Most-Recently-Used-Semantic-Role to have the value of the next most recently used semantic role in Context Memory 120. After 2282, Step 2273 is processed next and processing continues as described above. Step 2282 sets the next most recently used semantic role to be used in the comparisons for matches in Step 2273. If 2279 is false, all semantic roles in the context have been tried for matches in Step 2273, and Step 2281 is processed next. 2281 is true if WILD is false. If 2281 is true, it is possible that a new adverbial semantic role is being added to the conversation and 2283 is next. Step 2283 sets the Current-Most-Recently-Used-Semantic-Role to have a value of MATCHES-ANY-SEMANTIC-ROLE-VALUE, i.e., a wild card. Also, WILD is set to true. 2283 also marks all entries without FAILED in the Current-Evaluation-Set to UNTRIED. The effect of using a wild card for the Current-Most-Recently-Used-Semantic-Role in Step 2273 is to process the remaining unfailed semantic roles of the Current-Evaluation-Set in the order of the adverbial subclasses in the word modified by the adverbial. The wild card is used for a new adverbial semantic role being added to the conversation. After Step 2283, Step 2273 is performed and processing continues as described above.

If WILD is true at 2281, 2281 is false. If 2281 or 2272 is false, all adverbial subclasses of the Current-Adverbial have failed to match the Current-Adverbial modifiee's adverbial subclass set, and Step 2285 is next. 2285 stores a symbol in the position of the first word of the Current-Adverbial in the SDS. This symbol indicates a failure to match the adverbial subclasses of the word modified by the Current-Adverbial. After 2285, adverbial processing is completed, and 2288 is next as described above. When this symbol is processed at Selector 50 or 70, either Selector 50 or 70 attempts alternate interpretations of the Current-Adverbial if possible, or if not possible, Selector 50 or 70 backtracks and attempts to find a different word sense number for the modifiee.

The initiating caller may require another interpretation of the adverbial after performing subsequent state representation processing. When this occurs, Step 2287 is started and given the adverbial to be reprocessed by the initiating caller. Step 2287 restores the state of the adverbial processing as stored in the adverbial's position in the SDS. Step 2287 sets the following variables whose values are available from the SDS: the Current-Match, the Current-Evaluation-Set, WILD, and the Current-Most-Recently-Used-Semantic-Role. The Current-Adverbial is also set to the adverbial given by the initiating caller. The information at the Current-Adverbial in the SDS following the value of RESTART is deleted. Then processing continues at 2277 as described above.

Adverbials Modifying Non-verbs

Adverbials modify adjectives, other adverbs, indefinite pronouns, and nouns as well as verbs. Adverbs can rarely perform a prepositional complement role. Adverbs can also be compared in essentially the same way adjectives are compared as described above. The functions for implementing these adverbial roles are described in terms of the functions and data structures described above.

As an adjective is being processed for selecting its word sense number, the adjective's word sense number is at least partially selected by the word the adjective modifies. The modified word is the owner of the state. The words modifying the adjective either participate in selecting the adjective's word sense number or set the value of the state associated with the adjective. After the owner of the state is established, the modifiers of an adjective are evaluated. Some modifiers of an adjective can describe an aspect of the adjective's state value. Such modifiers are considered to be owned by the adjective's state value. The adjective has a data structure associated with it in Selector 50. In this data structure is a set of adverbial subclasses which are matched to select the adverbial function(s) of an adverb modifying a particular word sense number of the adjective. This adverbial data structure of adverbial subclasses used for selecting modifying adverbs is separate from the data structure of adverbial subclasses associated with adverbs formed from the adjective. The set of adverbial subclasses for selecting modifying adverbs is partitioned by word sense number. The partitions of adverbial subclasses associated with the current possible word sense number of the adjective is the set of adverbial subclasses processed at Step 2271 of FIG. 9b. The adverbial modifying the adjective is the Current-Adverbial in the clause. Processing of the adverb then proceeds as described above for FIG. 9b.

Adverbs modifying adjectives most commonly set the degree of the adjectives state value. A function associated with a degree adverb modifying an adjective sets a scale value which increases or decreases the typical or known state value of the modified adjective. Degree adverbs modifying non-morphological, i.e., adjectives not formed from a base plus affixes, use the adverbial selection process of FIG. 9b. Adjectives can also be formed from nouns or verbs. Adjectives formed from a noun base plus affix imply a prepositional phrase containing the base noun as a complement of the prepositional phrase which is generated by Morphological Step 24. A degree adverb modifying an adjective formed with a noun base is equivalent to the adverb modifying a prepositional phrase, and this was described above and does not use the adverbial selection process of FIG. 9b. Adjectives formed from a verb base imply a clause relation. Morphological Processing Step 24 contains a function which either directly invokes Ellipsis Processing Step 26 to generate the clause implied by the clause relation, or 24 has the invocation stored in the SDS for later invocation. The time of invocation is stored with the morphological function invoking 26. A degree adverb modifying an adjective formed from a verb base is equivalent to an adverb modifying a verb in the generated clause, and this was also described above and is processed with the adverbial selection process of FIG. 9b.

A degree adverb has an associated data structure as in FIG. 9a. The source descriptor of a degree adverb that is not formed with a base plus affixes contains a parameter or a function to generate the parameter. The destination descriptor has a destination requirement of a gradable adjective for a degree adverb modifying an adjective. A gradable adjective has a state value. A gradable adverb has a scalable subclass value. Degree adverbs modifying verbs modify the result state value of the verb. The function generates the degree number using the parameter or a function to generate the parameter contained in the source descriptor. The degree number is used to scale the adjective's state value with multiplication for example. An example of this type of degree adverb with a source descriptor parameter is "very".

Another realization of a degree adverb modifying an adjective is an adverb formed from an adjective base. The realization of such an adverb is equivalent to the form: "preposition "a" (adjective base) degree". The possible adverbial semantic roles of adverbial subclasses associated with the modified adjective in Selector 50 are matched with the semantic roles of the source descriptors of the adverbial subclasses of the prepositional phrase associated with an adjective forming an adverb in Step 2271 of FIG. 9b. Processing of the adverbial proceeds as described above. The adverbial subclasses containing the source descriptors of the prepositional phrase forming an adverb from an adjective are stored in a data area of Function Processing Step 22 associated with the preposition. A degree adverbial always includes a function that sets a degree number which scales the modified adjective's state value. Some adverbs formed with an adjective base can have a function which sets the adjective base state in a relation to the state value of modified adjective. For example, consider "absurdly difficult". The value of the state for "difficult" is scaled to a maximum value with the degree number associated with "absurdly". The state associated with "absurd" is set to be owned by the value of the state associated with "difficult".

Another realization of a degree adverb modifying an adjective is an adverb formed from a verb base. The adverbial subclasses associated with the adverbials which can be formed with a verb base are typically are associated with the preposition of the prepositional phrase formed by Step 24 to represent the adverb. The subclasses can also be directly associated with the representation in 24. These adverbial subclasses are similar to adverbial prepositions and contain source and destination data descriptors and functions, as in FIG. 9a. The functions of a verb base adverb are selected in the adverbial process of FIG. 9b using the source and destination descriptors of the adverbial subclasses associated with the representation of the modifying verb based adverb to match the adverbial subclasses of the modified adjective as described above. The function of a degree adverb formed from a verb sets the degree number as described above. Usually, degree adverbs with a verb base also have a function which creates a clause relation of the verb forming the adverb with the state value of the modified adjective. The clause relation is generated by Ellipsis Processing Step 26. For example, consider "surprisingly easy exam". A possible clause relation is: "The easiness of the exam surprised me." This clause relation means the value of the "easy" state owned by the "exam" "surprised me".

Non-degree adverbs with and without a verb base can modify adjectives. These adverbs modifying an adjective are implemented in the same way as degree adverbs modifying an adjective as described above. The only differences are a non-degree semantic role and different function(s) for these adverbs. Non-degree adverbs with a verb base modifying an adjective are more common than non-degree adverbs with a noun or adjective base.

Adverbs which modify adverbs set the degree of the modified adverb. The modifying adverb can be simple, or have an adjective, or verb base. Here, simple means an adverb which is not formed from a base plus affixes. The modified adverb can be simple, or have an adjective, noun or verb base. Simple gradable adverbs have an adverbial subclass for being modified which includes; an adverb degree modification semantic role for being modified, a typical semantic role value, and a semantic role value range. Such an adverbial subclass is similar to the adverbial subclasses for modification of verbs and adjectives. The typical semantic role value in the adverbial subclass is the typical value that the modified adverb utilizes for modifying other words, and this semantic role value is scaled by a modifying degree adverb. These adverbial subclasses for simple adverbs are stored in a data area of Function Processing Step 22. The adverbial subclasses for adjective or verb based adverbs being modified by degree adverbs have the same form as for adverbial subclasses utilized by simple adverbs for modification as described above. The subclass storage locations is at the morphological data structure entry associated with the base and affix of the morphologically formed adverb which is described in Morphological Processing Step 22. An adverb modifying a noun based adverbs is equivalent to the adverb modifying a prepositional phrase, and noun based adverbs usually do not use adverbial subclasses. The semantic roles of the adverbial subclasses of the modified adverbs with an adjective or verb base are matched with the semantic roles of the source descriptor of the modifying adverb in Step 2271, and processing continues as described above. The 2271 semantic role processing step is performed for all types of adverbs modifying simple, adjective based and verb based adverbs using the degree semantic role of the modifying adverb. For simple degree adverbs modifying simple degree adverbs, the degree adverb function sets a degree number and multiplies the degree number by the modified adverb's adverbial semantic role value. For simple degree adverbs modifying an adverb with an adjective base, the degree number multiples the typical or known state value of the base adjective. For simple degree adverbs modifying an adverb with a noun base, the noun based adverb being modified is converted to a prepositional phrase as described above and the degree adverb modifies a prepositional relation utilizing a process described above for modifying prepositional phrases. The degree number of the adverb is multiplied by the prepositional relation value of the noun base complement to the semantic role modifiee of the prepositional phrase as described above for degree adverbs modifying prepositional phrases with noun complements, e.g., "very factually". For simple degree adverbs modifying an adverb with an verb base, the degree adverb modifies the base verb which is also the verb in a clause relation containing the word modified by the verb base adverb as described above. The clause is generated by Ellipsis Processing Step 26.

Figure 9B:
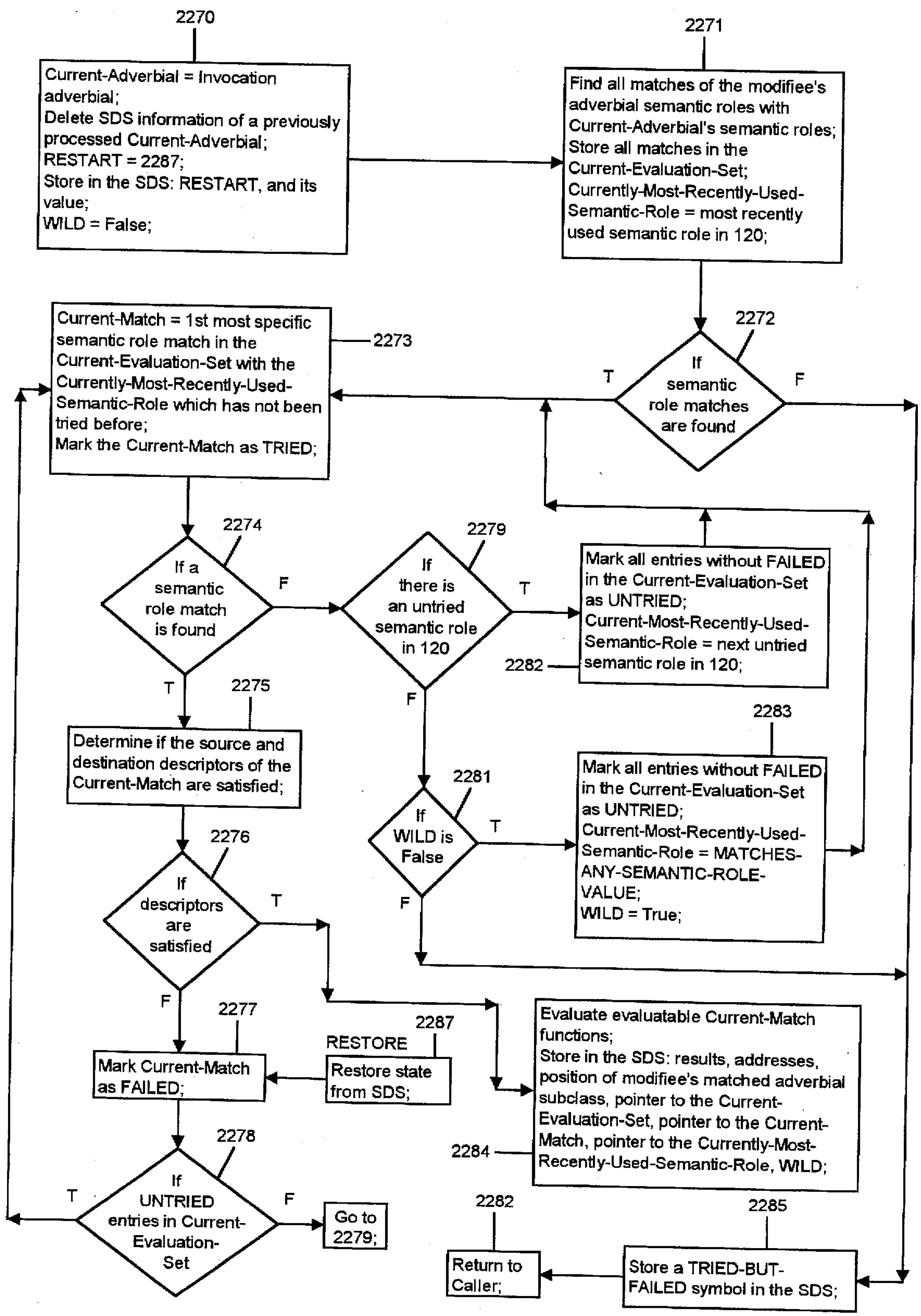
FIG. 9*b* is a flow chart for the selection and evaluation of an adverbial subclass function.

All adjective and verb based adverbs modifying adverbs have adverbial subclasses with source and destination descriptors as in FIG. 9*a*. These subclasses are used in the selection of their adverbial function as described above in FIG. 9*b*. The subclass storage locations is at the morphological data structure entry associated with the base and affix of the morphologically formed adverb which is described in Morphological Processing Step 22. The adjective and verb based modifying degree adverbs also have an associated function which performs the same degree functions as just described for simple degree adverbs modifying the four types of adverbs. Some adjective based degree adverbs also have a function which sets the modified adverb's semantic role value, which is also multiplied by the degree number, to be modified by the base adjective, i.e., the semantic role value of the modified adverb owns the state associated with the base adjective of the modifying adverb. This occurred in an example from above for an adjective based adverb modifying an adjective, i.e., "absurdly difficult". The difference here is that the modifiee is an adjective based adverb, e.g., "extremely quickly". The following description is for certain modifying adjective based adverbs. For modified simple adverbs, the semantic role value of the modified simple adverb owns the state of the base adjective of the modifying adjective based adverb. This semantic role value is also multiplied by the modifying degree adverb's degree number. For modified adjective based adverbs, the state value of the modified adjective base owns the state of the adjective base of the modifying adverb. This state value is also multiplied by the modifying degree adverb's degree number. For example, "extremely quickly" is equivalent in words to: "the value of quickness is extreme." and "quickly" is equivalent in words for its adverb function to: "in a quick process". The semantic role value of "quickly" is also set to the maximum. For verb based adverbs modified by adjective based adverbs, the base verb's semantic role value selected to match the adverbial subclass of the modifying adverb owns the state of the adjective base of the modifying adverb. The implied degree adverb of the adjective base modifies the verb in the clause relation formed by the modified verb based adverb as described above. For noun based adverbs and adverbial prepositional phrases modified by adjective based adverbs, the value of the relation of the prepositional phrase, including the prepositional phrase representing the noun based adverb, owns the state of the adjective base of the modifying adverb. This relation value is also multiplied by the degree number of the modifying degree adverb.

Verb based adverbs modifying the various types of adverbs have a degree function as described above. Some verb based adverbs modifying other adverbs also have a function which invokes Ellipsis Processing Step 26 to generate a clause relation with the verb base of the modifying adverb and the semantic role value scaled by the degree function associated with the modifying verb based adverb. The scaled semantic role values are the same ones which were scaled by the modifying adjective based adverbs as just described for each type of modified adverb. These adjective and verb based adverbs modifying the other types of adverbs occur infrequently.

Degree adverbs can also modify indefinite adjectives, indefinite pronouns, quantity numbers modifying nouns, and comparisons of adjectives and adverbs. Indefinite pronouns are not directly modified by degree adverbs. The indefinite adjective function associated with an indefinite pronoun modified by degree adverb is modified by the degree adverb. The function of degree adverbs modifying such words is to provide a degree number which is multiplied by a quantity associated with the modified word. The quantity has been described for each of these words above. Associated with each class (e.g., indefinite adjectives) of word modifiable by a degree adverb is a set of adverbial subclasses of the type described for adverbs in FIG. 9*a*. The adverbial subclasses of a class is shared among the members of the class. For example, numerals as a class share their associated adverbial subclasses. These types of degree adverbial modification is detected in Parse Step 16, and Dictionary Look Up Step 18 looks up the quantization semantic roles to be processed for adverbial modification. The degree adverbs which can modify these words with an associated quantization value have adverbial subclasses composed of source and destination descriptor pairs which are matched and used to process the quantization value as described for FIG. 9*b*. The semantic roles in the adverbial subclasses associated with a word's quantization value types are matched with the semantic roles of the modifying degree adverb's source descriptors in Step 2271 and processing proceeds as described above. The function selected by this processing for such degree adverbs is always to provide a parameter, the degree number. The degree number is either multiplied with a known quantization value, or the degree number is identified and stored for a subsequent multiplication when the quantization value is known. However, there could be other functions associated with the degree adverb as described for other degree adverbs for example. In the description above of degree adverbs modifying indefinite adjectives, indefinite pronouns, quantity numbers modifying nouns, comparisons of adjectives and adverbs, and prepositions, the possibility of additional functions being associated with degree adverbs was not described. However, this lack of description does not preclude the possibility of allowing additional functions with the degree adverbs.

Rarely, adverbs can also modify noun phrases. However, nearly all of the words termed as adverbs by some grammar books fall into one of three groups. One group of adverbs modifying a noun is a prepositional phrase with an ellipted preposition. The second group of adverbs is a prepositional phrase with an ellipted complement. The third group have both an identical adjective and adverb text form. Adverbs in the third group are treated as adverbs with an adjective base and a zero affix. These three groups of adverbs are detected as modifying nouns in Syntactic Parse Step 16. Dictionary Look Up Step 18 directs the processing of the words to Ellipsis Processing Step 26 for generating the prepositional phrase representation of these adverbs modifying nouns for the ellipted preposition type adverbs. Morphology Processing Step 24 generates the prepositional phrase for the zero affix adverbs. Adverbs with an adjective base are represented as prepositions with the adjective base modifying a semantic role as discussed above. The adverbs of the three groups are converted into prepositional phrases and processed as prepositional phrases modifying the noun which has such an adverb modifier. The state representation memory for nouns is designed for handling prepositional phrases rather than adverbial subclasses. The prepositional phrase representation is then processed depending on the base of the noun modified by the prepositional phrase. The prepositional phrase realization of the adverb is typically processed as modifying: a concrete noun for a noun which is not formed with an affix or which is a clausal abstract noun which evaluates to a concrete noun, an adjective for a noun which is an adjective base or which is a state abstract noun, or the verb of a clause relation for a noun with a verb base or a clausal abstract noun which does not evaluate to a noun.

There is a class of adverbs modifying noun phrases which is treated as an adverb. This is a group of degree adverbs and includes: "quite, rather, such, what". "such" and "what" are not normally considered as adverbs, but they are included here because they perform the same adverb subclass functions as "quite" and "rather" "such" and "what" have additional functions unrelated to adverb functions. "quite", "rather" and "such" are implemented as adverbs with an adverbial subclass composed of a source descriptor, a destination descriptor and a function. These adverbial subclasses are stored in a data area of Step 22. "what" modifying a noun phrase as an adverb is implemented as a synonym of "quite". This group of words is detected by Syntactic Parse Step 16 as adverbs modifying nouns and sent to the Dictionary Look Up Step 18 which assigns an adverbial semantic role to the modified noun having the name: "degree adverb modifying noun phrase". This assigned semantic role is matched with the semantic roles of the source descriptor of the modifying adverb in Step 2271 and processing continues as described above. This group of words has some unique functions for modifying a noun phrase. The following conditions related to the noun modified by these degree adverbs are contained is the destination descriptors of the modifying degree adverb. The destination descriptors perform a discrimination function upon the modified word to select the function associated with the adverb as described above. If the noun phrase has a gradable adjective modifying it, the adjective is modified by the degree function as described above. If the noun in the noun phrase modified by the adverb is in the context and is not modified by a gradable adjective, the noun's characteristics that were stated in the conversation are modified by the degree function. If the noun modified by the adverb is not modified by a gradable adjective and is not in the context, then it is checked for having a default characteristic for adverb degree modification. If there is a default characteristic, the default characteristic is modified by the degree function. If there is no default characteristic, the noun is assigned a function symbol in Context Memory 120 which verbally implies "unspecified characteristic modified by a designated degree function". The purpose of this function symbol is to set up the application of the degree function to characteristics which may be specified in the following conversation. The characteristics of the noun modified by the degree function depend upon the type of noun. For a concrete noun, the characteristics are the states and properties of the noun. For an adjective based noun or a state abstract noun, the characteristic is the state associated with the adjective base or the state associated with the abstract noun. For a verb based noun or a clausal abstract noun, the characteristics are the gradable adverbial subclasses of the verb in the clause relation or the gradable adverbial subclasses of verb of the clause which characterizes the abstract noun.

Rarely, an adverb can be the complement of a prepositional phrase. For example, "since recently" There are only a few adverbs which can be prepositional complements including: "recently" and "lately". The adverb in a prepositional complement role is detected in Syntactic Parse Step 16. These words are marked as being phrases with ellipsis with known replacements. "recently" or "lately" is replaced with "a recent time".

VERB FUNCTIONS

Modal Verbs

Figure 10A:
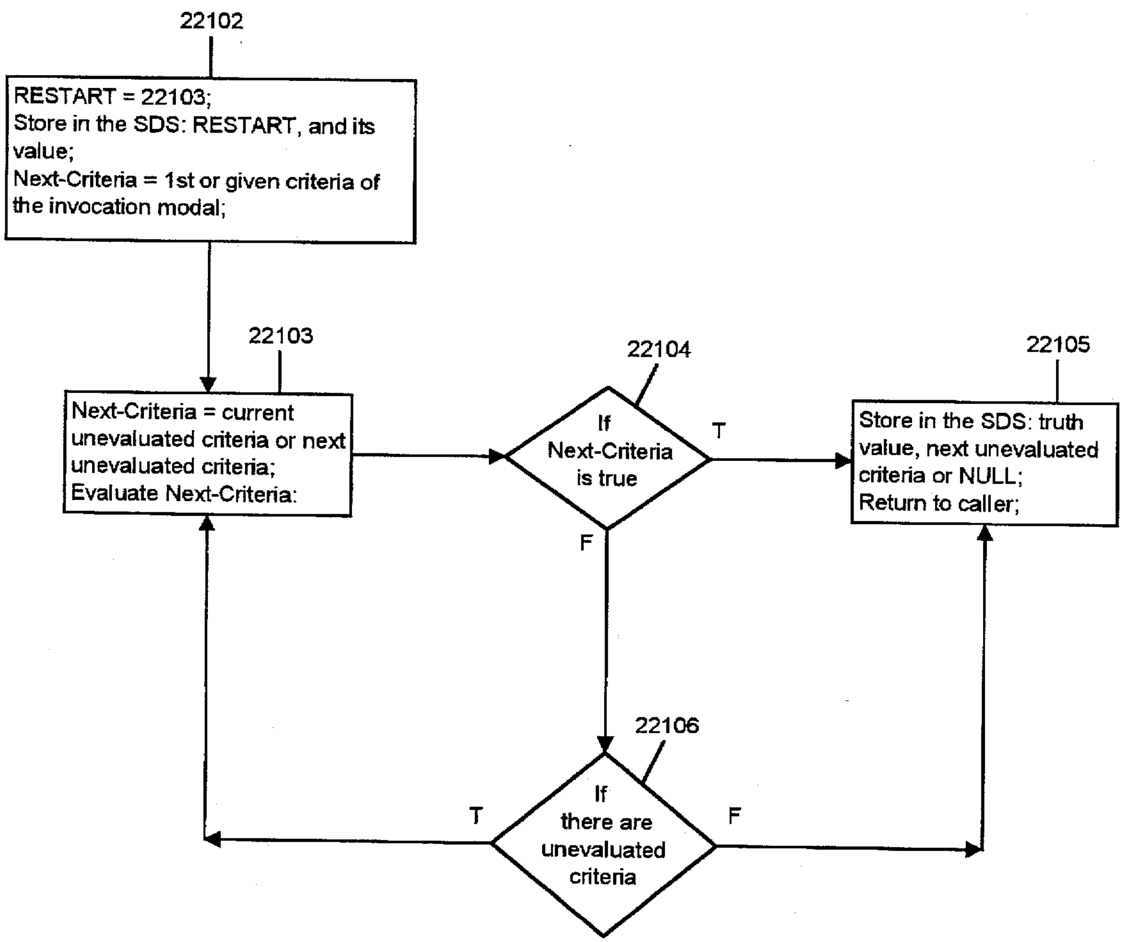
FIG. 10*a* is a flow chart for the selection and evaluation of a modal of an auxiliary verb.

Modal verbs are similar to modal adverbials in that they both set a truth value about the verb which they modify. Modal verbs differ in the way its function is selected. A modal verb, such as "can", has more than one possible function. For "can", one of three functions set an associated truth descriptor value for the clause containing the modal verb. A modal adverbial's function is selected by using the flow chart of FIG. **9*b*. A modal verb's function is selected by checking criteria for applying the functions associated with the modal as shown in FIG. 10*a*.** For example, "can" has three possible truth values associated with it: permission, ability, or possibility. The truth value associated with "can" is determined by first checking if the process associated with the verb in the clause containing "can" has a step of obtaining permission for this sense of the verb with the current context. If permission is in the process, and if the speaker of the sentence has the authority to grant permission, then the truth value of "can" of permission is selected. If "can" does not imply permission, then the capability of the doer sentence role is checked for having other than typical requirements. The doer of a sentence performs the action of the clause and is usually the subject of an active voice clause. The capability of the doer sentence role is the set of state and property values or value ranges required for a doer to perform the action of the sentence. This capability is matched to select the word sense number of the verb in a clause. Typical and non-typical requirements are stored in the capability. If the doer sentence role meets the requirements, then the ability truth value is selected. Otherwise the possibility truth value of "can" is selected. For "can", possibility is the default truth value. The modal verbs have a set of ordered criteria checking functions which match conditions associated with the verb that the modal modifies. Associated with each criteria checking function is a truth value. The truth value types include: permission, ability, possibility, obligation, necessity, choice, and prediction. All of these types can have value ranges.

The Modal Selection Process for selecting the truth value of a modal is illustrated in FIG. **10*a*. This process is initiated by Selector 70 after the word sense number of the verb modified by the modal has been selected. The process for selecting a modal verb begins at 22102. 22102 sets RESTART to 22102. 22102 also stores the following in the position of the first word of the modal in the SDS: RESTART, and the value of RESTART. 22102 also sets the Next-Criteria to be selected at 22103 to be the given location with the starting command, or if no location is contained in the SDS, the first criteria in the list associated with the modal. The address of the list was placed at the modal's location in the SDS by Step 18. The criteria are stored in a data area of Step 22. After 22102, 22103 sets Next-Criteria and evaluates it. 22104 is next and is true if the evaluated Next-Criteria from 22103 is true. If 22104 is true, 22105 is next and stores the following in the position of the first word of the modal in the SDS: Next-Criteria's associated truth value or a default truth value if there is not another unevaluated criteria, and the location of the Next-Criteria associated with the modal, or null if there is not another criteria. The default truth value is typically "hypothetical" which implies the clause is unrealized. However, other default truth values are possible. The default truth value is associated with the modal's list of criteria. Also, 22105 sets processing to continue at the caller. If 22104 is false, 22106 is next and is true if there is another unevaluated criteria. If 22106 is true, 22103 is next and sets Next-Criteria and evaluates it as above. If 22106 is false, 22105 is next and stores the default truth value and null for the next criteria location. 22105** stores the truth value in the truth descriptor and then sets processing to continue at the caller.

Mood

There are three types of mood: indicative, imperative, and subjunctive. The indicative mood is the most common and is used to describe the true situation except when modal adverbials or modal verbs indicate otherwise. The indicative mood is the default. The imperative mood is used to issue requests and orders. The subjunctive mood is like the indicative mood with a built in modal which indicates a hypothetical clause. A clause is in the indicative mood unless there are indicators of other moods. The indicator of an imperative or subjunctive mood includes non standard inflections, i.e., inflections added to the base verb which are different from the inflections added to the base verb for the indicative mood or the form of the verb differs from the indicative form for the tense, person and number. The imperative mood is easily detected with clause structure and verb form, e.g., "Go to bed." The subjunctive mood is only detectable for the third person singular present tense and for the following uses of "to be": present tense, and first/third person singular past tense, e.g., "I hope that he reconsider . . . " "They insist he be elected." and "If I were him . . . " The imperative and subjunctive mood for non standard inflections are detected in Syntactic Parse Step 16. The detection of the imperative mood implies a hypothetical clause which someone desires/directs to be realized. The imperative mood indicator is stored in the related grammar information associated with the main verb in the verb phrase selected in Parse Step 16. Selector 70 checks the grammar information of the verb phrase for the imperative mood indicator after 70 selects the word sense number of a verb. If 70 finds the imperative mood indictor, 70 initiates the Modal Selection Process of FIG. 10*a* to determine if the imperative mood implies desire or direction. 70 sets the criteria address to point to criteria address to select a desire or direction truth value as described above.

The subjunctive mood is detected in various ways. One way is accomplished by Selector 70 checking the grammar information of the verb phrase in Syntax Phrase Trees 30 for a verb form which indicates the subjunctive mood. If 70 finds the subjunctive mood, 70 stores a hypothetical truth value in the position of the verb of the clause in the SDS. Another method is for 70 to determine if the clause is already been stated. If it has been stated, the stated clause's truth descriptor has already been stored. Also, a hypothetical clause can be implied with certain types of subordinate clauses, e.g., condition clauses such as with "if" conjunctions) and certain combinations of verbs and subordinate clause (e.g., "I wish that . . . "; "I want him to . . . " where . . . indicates an hypothetical clause). The conjunctions which indicate hypothetical subordinate clauses contain a function which stores the hypothetical truth descriptor in the position of the verb of the subordinate clause in the SDS. If a hypothetical clause is implied by the word sense number of a verb, 70 stores a hypothetical truth value in the position of the verb of the subordinate clauses in the SDS. Also the purpose selection process in Purpose Identifier 140 determines when a required state was set by a non-indicative clause. In this case Identifier 140 stores the hypothetical truth value in the position of the verb requiring a hypothetical state in the SDS. A hypothetical clause can also be detected by determining that the clause was stored as being hypothetical in Knowledge and Experience Memory 150. The detection in 150 occurs during Purpose Identification Process 140.

Tense, Aspect and Voice

Tense and aspect are two types of functions related to verbs. Tense implies a time of truth for the clause containing the tensed verb with values of present, past, and future. The present tense is usually unmarked. The past tense is often indicated with inflections added to the base verb, e.g., "worked". The future tense is often indicated with the modal "will". These forms of tense have a time of truth which depends upon the states set by the verb in the clause. A stative verb sets or implies a state value which stays at that value for long periods of time. An eventive verb sets some states which last a short time and possibly some states which last longer. A habitive verb implies a repeated eventive verb. The time of truth is the length of time, beginning at a time relative to the time of truth's time point. The time point is the focal point of a clause, i.e., the most important point in time relative to the information content of the clause. The time of truth is the length of time that the set or implied states remain at the set value. The tense, the time of truth, and the time point of the verb are really default values which can be altered by adverbials and/or the context.

There is a perfective aspect and a progressive aspect. The perfective aspect, e.g., "has examined", implies a time of truth within a period of time. The progressive aspect, e.g., "examining", implies an expansion of the time of truth around an eventive verb's time point. One use of aspect is to allow the description of activity which occurs in parallel, i.e., at least some portion of one verb's process occurs at the same time that one or more other verb's processes do. The perfective and progressive aspects each imply a default time of truth which depends upon the tense and type of verb (e.g., eventive). The perfective and progressive aspects can also be combined in one verb phrase, and this combination has another default time of truth depending upon the tense and type of verb. The time of truth implied by aspect can also be altered by adverbials and/or context.

The tense and aspect of a verb can also be combined with a modal verb. Tense and aspect can also be realized with an active or passive voice. Most combinations of tense, aspect, modality, voice, and verb type are allowed. Tense, aspect, and voice can also be combined for verbals, i.e., infinitives and participles. These combinations can include subsets or all of the tense, aspect, voice, but modality is mostly limited to non-verbals. However, some phrases implying modality can be combined with verbals. Also, modal adverbials can also be combined with verbals.

The primary semantic purpose of voice is to allow for the option of placing the receiver of a verb's state setting as subject of the clause. Normally, the doer (or agent) is the subject and the object is the receiver in an active voice verb. A passive voice verb phrase normally has the receiver as subject and the doer indicated in an adverbial. An example of an active voice verb is: "The doctor examined me." A passive voice example is: "I was examined by the doctor." The passive voice verb construction is handled in the Syntactic Parse Step 16. One result of Step 16 is the selection of the current clause's data structure with associated grammar information. The clause's grammar information contains, among other information, the sentence roles of the phrases in the clause. The function assignment of sentence roles for a clause in Parser Syntactic Memory 30 is made according to the voice of the verb associated with the clause. Thus, a text clause with a passive verb is associated by Step 16 with a clause descriptor which has sentence roles assigned to functions for a passive verb, e.g., the subject is set to have receiver function. A text clause with an active verb is associated with a clause descriptor which has sentence roles assigned to functions for an active verb.

The primary semantic purpose of tense and aspect is to participate in the setting of the position and length of the time of truth for a clause. The tense, aspect, adverbials and context set the time of truth for an individual clause. The time of truth for a sequence of clauses as presented in a conversation can be used to order the clauses in time at least relatively if not absolutely. The order of a sequence of clauses can include some clauses' times of truth overlapping other clauses' times of truth. The tense and aspect of a verb select a default time of truth. Time adverbials and features of the context can alter the default position and length of the time of truth. For example, a time adverbial can shift a verb with a present tense into the future: "The party starts tomorrow at 1." The context can set a time position which applies to following clauses. For example, the next sentence following the previous example could be: "The cartoons start at 1:30." Time adverbials can also affect the time relationship between a sequence of clauses. For example, the next sentence in the conversation "The food and beverages arrive at my house before the party." Subordinating, correlative and coordinating conjunctions can also set timing relationships between the main and subordinate clauses. For example, the next sentence in the conversation could be: "While the cartoons are playing, I will set the table with the birthday cake." Conjunctive adverbials can indicate a timing relation to the current sentence's main clause to the previous sentence's main clause. The next sentence in the conversation could be: "Next, I will get the candy ready." Finally, previous experience can indicate timing relations of a clause to the conversation. This timing relation can be from a specific experience or from a generalization of experiences. This timing relation is stored with experience in Experience and Knowledge Memory 150. For example, the next sentence in the conversation could be: "I hope the decorations set a festive mood for the party." Experience would indicate that decorations would be put up before the party and be taken down afterward, i.e., "the decorations" are present during a party.

FIG. **10*b* contains the default values for the time of truth for a verb. The time of truth depends upon the tense, aspect and type of verb. All times of truth have a single time point. The time point is center value time of truth component of the table of FIG. 10*b*. FIG. 10*b* also contains possible time shifts implied by adverbials or special usages for example. FIG. 10*b*** also contains usage situations which are used to select the proper tense for generating text with the proper tense and aspect. Each time of truth has an indication of whether the time of truth extends before and/or after the time point associated with the time of truth. The terms "past", "now", and "future" refer to points in time. The points in time possibly have a specific value. The time points always have the relation of the "past" occurring before "now" which occurs before the "future". The time of truth and its time point are associated with a single verb or state in a conversation. Thus the "now" for one verb in a conversation can follow the "now" for another verb in the same conversation. The perfective aspect refers to a period of time, and both the start and end points can be specified. However, the perfective aspect usually has a single time point.

The timing relation of a clause to the other clauses in a conversation is stored in a data structure in Context Memory 120, the timing point descriptor. This data structure is a bi-directional linked list of time points. The time point is the time location of focus with respect to the conversation. Each time point is associated with the time of truth of a clause in the conversation. The time point descriptor also has a descriptor for its associated time of truth which specifies the length of the time of truth to the extent that it is known. If nothing about the time of truth is specified, then a pointer to the default value is stored in the descriptor. If more information about the time of truth is known, that information is stored in the descriptor. The known information can come from the conversation, process information associated with the verb, or from information related to a state value for example. The known information of the time of truth includes values for: the start point, the time point, and/or the end point. The data structure of the time point includes as needed: one pointer to each related preceding time point, one pointer to each related succeeding time point, and/or one pointer to each related time point which has the same time value, i.e., a time point occurring at the same time. This timing point descriptor structure is accessed to determine if the time of truth of a state or verb includes a time point or time interval. For example, during verb word sense number selection, the value of a state at a particular time in the context can be checked by accessing timing point descriptor of the clause which sets the state. Each of these pointers described here has a descriptor which indicates the relation between the two time points. This section has been about timing which is always present in a relation. However, the clause associated with each time point in a relation can also have a purpose relation as described above which broadly includes: information content, activity, plan, function, cause, intention, condition and goal. The purpose relations are also stored in the timing point descriptors of the timing pointers to the related clause and a description of the type of purpose. The timing point descriptor also contains a truth value descriptor for storing the mood or modal truth values.

The Timing Relation Selection Process flow chart is illustrated in FIG. **10*c*. This timing selection process of Function Word Processing Step 22 is typically invoked by Step 18 after the word sense number of the verb of the current clause has been selected. The first step, Step 2290, of the timing relation selection process is to look up the default time of truth of the clause's verb in a data structure similar to FIG. 10*b*. The FIG. 10*b* data structure is stored in a data area associated with Function Step 22. 2290 looks up the grammar information associated with the verb phrase of the Current-Clause in Syntax Phrase Trees 30. The Current-Clause is an invocation parameter. 2290 creates a tense code descriptor which contains the tense, aspect, mood, and other information such as emphaticness of the verb as contained in the grammar information. The stative, habitive or eventive state setting type associated with the selected word sense number of the main verb or set by time adverbials is determined by Selector 70, and is contained in the verb word sense number's portion of the SDS. The default time of truth is looked up with the grammar information and the type of state setting of the verb. Then the timing relation data structure described in the previous paragraph is initialized for the Current-Clause with two pointers stored in Context Memory 120. One pointer is to the location of the Current-Clause at the current SDS. After the Current-Clause has been processed for purposes, judged to be an acceptable interpretation, and stored in 120, this pointer is updated to its location in 120. The other pointer is to the default time of truth associated with the clause in the data structure associated with FIG. 10***b*. If the clause's truth value has not already been set, the default mood descriptor value from the verb's phrase in Syntax Phrase Trees 30 is also stored in the clause's truth descriptor in this data structure. After Step 2290, Step 2291 is true if the Current-Clause contains an adverbial with a time setting function. If Step 2291 is true, Step 2292 sets the information implied by the timing adverbial in the timing relation data structure element associated with the Current-Clause. The function of a timing adverbial was selected as described in the previous section on adverbials. A timing adverbial can set a time point absolutely (e.g., "at 1") or relatively (e.g., "before the party"). Setting a time point absolutely corresponds to setting a value for the time point. Setting a time point relatively corresponds to setting a pointer to a preceding, concurrent or succeeding time point as implied by the function of the adverbial which sets the relation to the time point of the entity in the adverbial. A pointer is set to a time point value if the time point has not been stated. The pointer is updated when the unstated time point has its pointer added to its truth descriptor. The unstated time point's pointer is to a truth descriptor with a pointer with only an unstated time point. When such a truth descriptor is detected, the pointer to the previously unstated time point is added. The time point of the entity is either associated with the non-clausal complement's time property or is associated with the time point of a clausal complement. The complement is typically the complement of the time adverbial's prepositional phrase. The entity's time property is either stored in Memory 120, 80, 90, or 100.

After Step 2292 or if Step 2291 is false, Step 2297 is true if the Current-Clause can have one or more default pointers set between its time point and other clauses' time points. The default pointers are either between the Current-Clause: and the preceding clause with the same doer, and the preceding clause with the same receiver, or between the Current-Clause and the preceding clause with the same owner. The doer is the subject in an active voice, non-copulative verb, sentence, and the receiver is the object. The owner is the subject in a sentence with a copulative verb (e.g., "to be", "to have", "to feel"). These descriptions of doer, receiver and owner are to identify these terms. Each processed clause in 120 has these terms identified and stored for each occurrence of the term. If the Current-Clause has a non-copulative verb, a default relation for the most recent preceding clause with at least one same doer will be added to the timing point descriptor of the Current-Clause if there is a preceding clause with at least one same doer. Also, a default relation for the most recent preceding clause with at least one same receiver will be added if there is a preceding clause with the same receiver. If the Current-Clause has a copulative verb, a default timing relation will be added between the Current-Clause and the most recent clause with the same owner (as an owner) if there is a preceding clause with the same owner. If the Current-Clause is not the first clause of a conversation, or is not a clause with the first referent to its doers, receivers, and owners, a default pointer will be added to the previous clause. These default pointers are used to organize the conversation by doer, receiver, owner, and clause sequence for use by Purpose Identifier 140. Step 2297 is true if one or more default pointers can be set. If 2297 is true, Step 2298 sets a pointer in the descriptor of the time point of the Current-Clause to a time point descriptor of a preceding clause in the default type of timing relation for each possible default timing relation. The set pointer descriptor in the Current-Clause contains a preceding/succeeding type pointer to the succeeding/preceding clause in the default relation, and the pointer is set with the default relation type. The set pointer descriptor of a preceding/succeeding clause contains a succeeding/preceding type pointer to the Current-Clause, and the pointer is set with the default relation type. The set descriptors of concurrent clauses contain concurrent pointers with the default relation type.

If 2297 is false or after 2298, Step 2299 invokes Purpose Identifier 140. In this invocation, Purpose Identifier 140 searches Experience and Knowledge Memory 150 for a relation of the Current-Clause to the context of the conversation and stored experience and knowledge. The 140 step searches for a relation implied by the context from experience or knowledge stored in Memory 150. The search is aided by a conjunctive adverbial or by a conjunction in the sense that the conjunctive adverbial or conjunction can reduce the types of purpose relations which are searched for. A purpose relation found by 140 has a timing relation and a purpose relation of the Current-Clause to a clause in the context of the conversation. Step 140 also checks if the timing descriptor including the truth value are consistent. If inconsistencies are detected by 140, 140 initiates processes to correct or remove the inconsistencies as will be described below. If the inconsistency can not be corrected, the Communication Manager initiates processes to determine the correct value possibly through issuing a clarifying question. After 140 identifies the timing and/or purpose relations, 22100 is next. Step 22100 sets the time and/or purpose relations of the Current-Clause: to the previous main clause as implied by a conjunctive adverbial, or to a preceding clause as implied by a conjunction related to the Current-Clause, and/or to the context of the conversation. The timing relation is realized by setting bi-directional pointers between the Current-Clause and the other clause. The type of pointer, i.e., preceding, concurrent, succeeding, depends upon the relation. For a concurrent relation, each bi-directional pointer is a concurrent type. The other pointer types have opposite values for the bi-directional pointers. The time relation sets a preceding/concurrent/succeeding type pointer in the Current-Clause's timing point descriptor to the succeeding/concurrent/preceding clause's timing point descriptor. A preceding/concurrent/succeeding type pointer from the succeeding/concurrent/preceding main clause to the Current-Clause is set to achieve the bi-directional linkage. The purpose relation(s) if any are also stored in the timing point descriptor's of the preceding/concurrent/succeeding main and Current-Clause. After 22100, the verb tense, aspect, and timing process is complete. The processing of the Current-Clause is also completed. Step 22101 calls the Communication Manager to continue processing. The Communication Manager does one of the following: issues a clarifying question for any pending inconsistencies which are scheduled for resolution now, initiates the generation of a response, or initiates the processing of the next clause. A response could be generated to a question or could be generated to determine the source of the inconsistency for example.

CONJUNCTIONS

Conjunctions have two separate classes of functions: joining parts of clauses, i.e., clausal constituents, and joining clauses. However, each class has the same method of selecting their associated functions. Conjunctions and their function class are detected in Syntactic Parse Step 16. Coordinating conjunctions occur as singular function words or as multiple adjacent function words, and correlative conjunctions are pairs of conjunctions separated by one of the entities being joined.

Constituent Conjunctions

Many coordinating conjunctions and correlative conjunctions which join clausal constituents have either a combining or a separating function associated with them. However, the most common conjunction, "and", has both types of functions associated with it. FIG. 11*a* illustrates the data structure for conjunctions which join clause constituents and for conjunctions which join clauses. The FIG. 11*a* data structure is divided into conjunctions joining constituents and conjunctions joining clauses. The data structure for constituent conjunctions has a name which is accessible from Dictionary Look Up Step 18. Each conjunction name has a function list of one or more functions. The function list can be partitioned by the type of element being joined by the conjunction, and/or by combining and separating functions.

The Conjunction Selection Process basically involves: selecting the elements being joined by the conjunction, and selecting a conjunction function partition from the ordered list of FIG. 11*a*. The function partition has more than one function possible for the conjunction, and the selection of the specific function in the list will be performed by the initiating selector: Selectors 60, 70, or 80 or Purpose Identifier 140 for clause conjunctions. For example, Selector 70 calls the conjunction selection process for conjunctions: of nouns and/or pronouns in a sentence role, of adverbials in a sentence role, and of multiple modifiers of a clausal abstract noun. The evaluation of a conjunction of nouns and/or pronouns in a sentence role, of a conjunction of adverbials in a sentence role, or of a conjunction of modifiers of a clausal abstract noun has a result type of either a combining function of the elements into a sentence role of one clause containing the joined constituents for a word sense number of the clause's verb, or a separating result which generates multiple clauses each with one or more of the joined constituents. If there are multiple clauses, the conjunction function which implies the multiple clauses can have a stored set of possible relationships which indicate the possible purpose relations among the generated clauses. Purpose Identifier 140 selects the intended purpose from the stored set, or 140 selects the intended purpose from the set of all possible relation between clauses.

Some conjunctions only have one of the separating or combining result types. For example, "Not Tom, but Mary . . . " has the correlative conjunction "not . . . but". This correlative conjunction only has the separating result type. Selector 70 evaluates this separating function which causes the creation of two clauses of the forms for this example: a clause with the constituent after "but" (e.g., "Mary") as subject and a negative clause (i.e., one with a false truth descriptor value) with the constituent following "not" (e.g., "Tom") as subject. The purpose relationship between the two clauses is one of contrast. Other conjunctions have a combining function. For example, a negative preceding "or" only has a combining function. This conjunction is treated as a correlative conjunction. For example, "Tom doesn't have a watch or a tie." This example has the interpretation: "Tom doesn't have a watch, and Tom doesn't have a tie." Another example is the "and" conjunction which allows the separating or combining function for joining clause constituents. One conjunction function of "and" implies the joined constituents participate in combination in a single clause. e.g., "John and Mary were married." The other function implies that there is a separate clause containing each of the clause constituents joined by "and", e.g., "John and Mary were eating." For "and", the first function is the combination of constituents into a single clause. This first conjunction function of "and" is determined to be possible if the verb in the clause containing the joined noun and/or pronoun constituents requires the constituent's sentence role to have a number range which includes the number of constituents in the sentence role of a word sense number of the verb. During the selection of a word sense number of a verb by Selector 70, the number of noun and/or pronoun constituents required for a word sense number of the verb determines if the constituents can possibly be combined or must be separated. If the number of constituents combined by the conjunction is within a range of the number of constituents required by the word sense number, and if the joined elements meet other capability requirements of the combined word sense number, the combining of all joined constituents into a single clause is attempted. Otherwise the separate clause per constituent function is used and implies separate clauses. Separate clauses are also implied if Purpose Identifier 140 fails to find the clause with combined elements in a sentence role consistent with the context and previous experience through sentence role availability or through plausibility and expectedness checking. Separate clauses are generated to set the proper state representation of the joined clause constituents. However, the more compact form of the clause is stored in 120, but is marked to indicate the separate clause interpretation. For example, if separate clauses are required, the clause, "John and Mary were eating." becomes "John was eating." and "Mary was eating." The relationship among the generated clauses for "and" is determined by Purpose Identifier 140 using possible relations associated with "and" for relating the clauses. The possible relations are stored with the functions of the conjunction. Multiple clauses are created to set all the state representation information implied by a clause with a sentence role that has multiple constituents joined with a conjunction. A conjunction of adverbials can also result in implying multiple clauses. If the joined adverbials can be contained simultaneously for one word sense number of the modified verb, a single clause is possible. Otherwise, multiple clauses are implied.

When verbs are joined by a constituent conjunction, a separate clause is always generated for each joined verb. When a sentence contains a conjunction joining verbs or parts of a clause containing a verb, the conjunction of these elements is processed in Selector 70 to generate the implied separate clauses. If there is one or more non-verb sentence roles of multiple constituents joined with a conjunction, and if there is more than one verb joined with a conjunction, the joined verbs are processed into separate clauses. Then, the single versus separated clause decision of a multiple constituent sentence role is made separately for each clause generated with a different verb of the sentence. Multiple sentence roles, each with multiple constituents joined with a conjunction, could result in a clause being created for each unique combination of one constituent from each of the multiple sentence roles. For example, "Tom and Mary gave presents to Bill and Bob." could cause four clauses to be generated: "Tom . . . Bill."; "Tom . . . Bob."; "Mary . . . Bill."; and "Mary . . . Bob." where . . . means "gave a present to". Finally, plural countable nouns or nouns representing a group of nouns usually imply that each noun of the plural noun or member of the group are equivalent to each noun or member being enumerated in a list joined with "and". If the plural noun or group is enumerated and the sentence requires generation of multiple clauses, the multiple clauses usually are generated and evaluated. However, if the plural noun or group has not been enumerated, or if the situation, e.g., too many members in the group, the plural noun or group is evaluated without expansion to a set of multiple clauses, i.e., the clause with the plural noun group is treated as a single clause with a plural clause constituent. When a singular noun of the plural noun or a member of the group requires a state representation from the clause containing the plural noun or group noun, that individual noun is evaluated in that clause to generate the required state representation.

Selector 70 can invoke the conjunction selection process for a conjunction of modifiers of a clausal abstract noun. The modifiers of a clausal abstract noun can either modify the verb in the clause which characterizes the clausal abstract noun, or the modifiers can modify a noun sentence role in the characterizing clause. If the conjunction of modifiers modifies the verb, Selector 70 calls Morphological Processing Step 24 to convert the modifiers into adverbials, and then 70 calls the Conjunction Selection Process. Otherwise, the selector related to the modified noun calls the Conjunction Selection Process. If Selector 70 calls this process, the above discussion relating to conjunctions of adverbials modifying verbs applies. The determination of the modifiee of modifiers of a clausal abstract noun are made in the expansion of the abstract noun into a clause by 70 in a process described below.

Selector 60 calls the Conjunction Selection Process for conjunctions of modifiers of a concrete noun. A conjunction of modifiers of a concrete noun can imply a single noun modified by each joined modifier, or they can imply separate nouns, each modified by one of the modifiers. This determination is made at 60 by first checking if the modifiers can consistently modify a single noun with the selected word sense number. If the modifiers can consistently modify a single noun, the single noun interpretation is tried. If this interpretation proves inconsistent with the context or previous experience, or if a single noun interpretation is not consistent with the modifiers, the multiple noun interpretation is utilized. If the multiple noun interpretation is utilized, the clause containing the multiple nouns could either have a single clause interpretation or multiple clause interpretation as described above for conjunctions of nouns and/or pronouns in a sentence role.

Selector 60 also calls the conjunction selection process for conjunctions of modifiers of a state abstract noun. A conjunction of modifiers of a state abstract noun can imply a single owned state modified by each joined modifier, or they can imply separate owned states, each modified by one of the modifiers. This determination is made at 60 by first checking if the modifiers can consistently modify a single owned state with the selected word sense number. If the modifiers can consistently modify a single owned state, the single owned state interpretation is tried. If this interpretation proves inconsistent with the context or previous experience, or if a single owned state interpretation is not consistent with the modifiers, the multiple owned state interpretation is utilized. If the multiple interpretation is utilized, the clause containing the multiple states could either have a single clause interpretation or multiple clause interpretation as described above for conjunctions of nouns and/or pronouns in a sentence role.

It is possible to have multiple levels of constituent conjunctions such as: "A and B, or C," versus A, and B or C" where the capital letters are constituents. The first example has "A" and "B" joined by "and". The second example has "B" and "C" joined by "or". This type of multiple levels is detectable because the comma placement indicates the constituent to conjunction association. Comma placement can also indicate the association of clauses to clause conjunctions. The Conjunction Selection Process uses the indicated association if the punctuation indicates the association. Otherwise, this process selects an association. If the process selects the association, it is marked as "ambiguous". If the association is marked as "ambiguous", and if the selector (60, 70, or 80) determines that the association is inconsistent, the selector utilizes an alternate association.

Clause Conjunctions

There are two groups of conjunctions joining clauses: coordinating, and subordinating. Coordinating conjunctions have single phrase realizations, and correlative conjunctions have two phrase realizations. Conjunctive adverbials are a type of coordinating clause conjunction which join the containing clause to a clause in a previous sentence as described above. Subordinating conjunctions also occur as single phrase and correlative types. Coordinating conjunctions join clauses of equal rank. Subordinating conjunctions join a subordinate clause to a main clause. Coordinating and subordinating conjunctions and their associated clauses are detected in Syntactic Parse Step 16. The data structure associated with a clause conjunction is shown in FIG. 11*a*. Clause conjunctions have an internal name which is which is accessible from Dictionary Look Up Step 18. Each conjunction has a type flag indicating coordinating or subordinating. Also, each conjunction has one or more associated purpose relations of clauses.

A purpose relation of a clause conjunction indicates how the joined clauses semantically interact among themselves. Clause conjunctions are first processed by the Conjunction Selection Process to be described below. When Purpose Identifier 140 is first invoked, it checks to determine if there are any clause conjunctions which have not been processed by the Conjunction Selection Process. If there is such a clause conjunction, the Conjunction Selection process is invoked by 140. The clause relation is then selected by Purpose Identifier 140. These clause relations are the purpose relations as discussed above, and the purpose relations broadly include: information content, activity, plans, intentions, functions, causes, conditions, and goals. The relations associated with a clause conjunction are used by Purpose Identifier 140 to search for which of the conjunction's relations was intended by the statement's source based upon the context and previously stored experience. Multiple clause conjunctions can be combined in one sentence. Multiple clause conjunctions are identified at Parser Step 16. One example of multiple clause conjunctions is multiple subordinate clauses joined by a coordinating conjunction. Another example with multiple clause conjunctions is: "A, B, and C, or D, E, and F.", where the capital letters represent independent clauses. Multiple clause conjunctions are first processed by the Conjunction Selection Process to select a default association of clauses to conjunctions. If Purpose Identifier 140 determines that an "ambiguous" association of clauses selected by the Conjunction Selection Process is not consistent with the context or previously stored experience, 140 selects an alternate association of clauses to conjunctions.

The Conjunction Selection Process

Figure 11B:
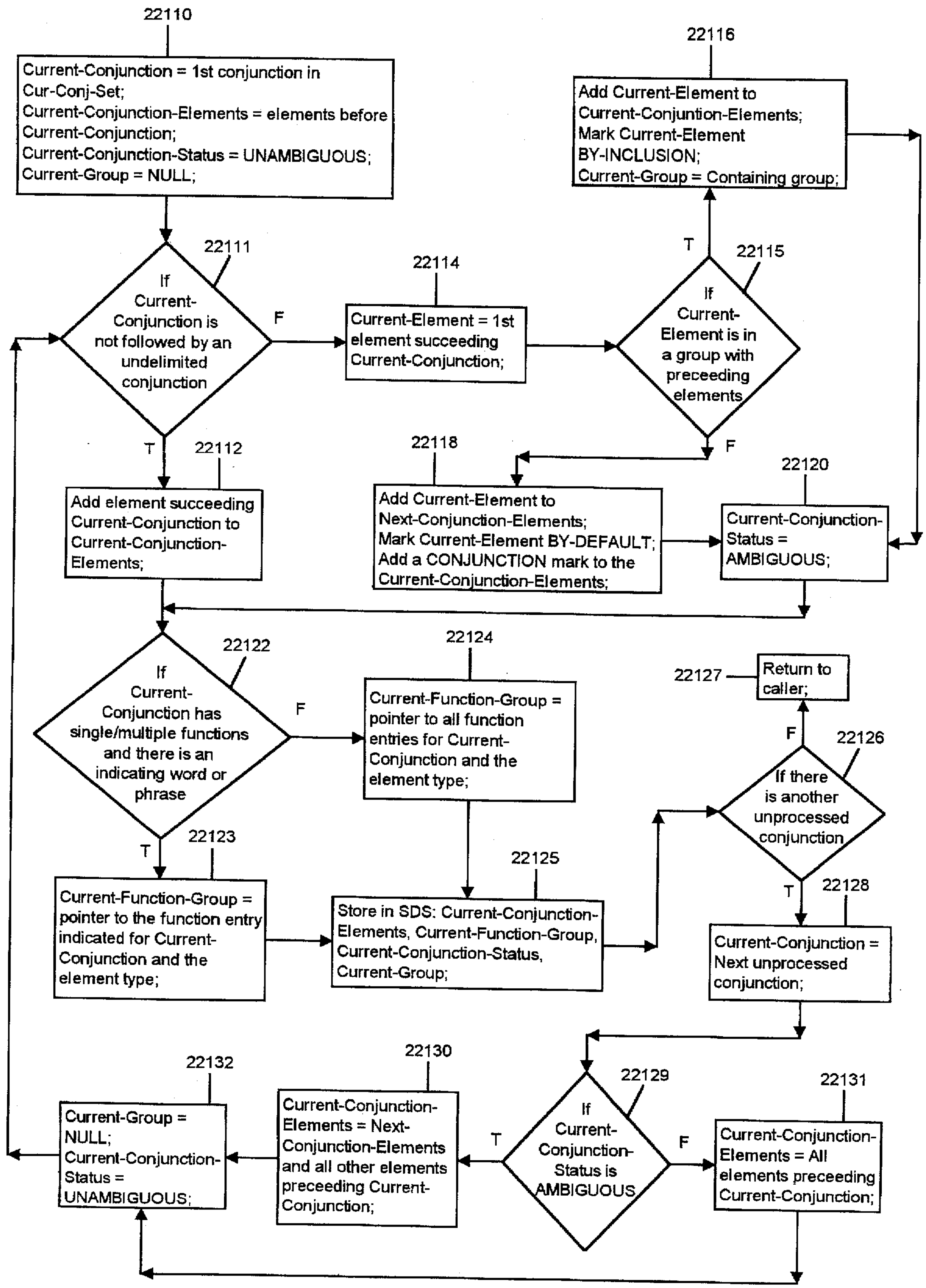
FIG. 11*b* is a flow chart for the conjunction function selection method.

The process for selecting conjunctions of clause constituents and of clauses is illustrated in FIG. 11*b*. As described above, the process for constituent conjunctions is called by Selector 60, 70, 80, or Purpose Identifier 140 for example. Selector 70 calls this process: for conjunctions of verb phrases; for conjunctions of sub-clauses containing verb phrases and objects or subject complements, i.e., predicates; for a conjunction of nouns and/or pronouns in a sentence role; for conjunctions of adverbials; or for conjunctions of modifiers of some clausal abstract nouns. Selector 60 calls the process of constituent conjunction selection for conjunctions of modifiers of concrete nouns. In some instances, coordination of subordinating conjunctions are elliptically processed into a coordination of subordinated clauses. Purpose Identifier 140 invokes the Conjunction Selection Process for conjunctions not previously processed by the Conjunction Selection Process. The Conjunction Selection Process processes all conjunctions in a specified set of conjunctions.

The Conjunction Selection Process begins at Step 22110. Step 22110 initializes the conjunction selection process for a conjunction by setting the first conjunction specified in a set by the initiating caller to be the Current-Conjunction (e.g., Selector 70 for a predicate). Correlative conjunctions are processed as a single conjunction even though a correlative conjunction has two separated conjunction words. 22110 initializes the Current-Conjunction-Elements to contain all elements preceding the Current-Conjunction. The Current-Conjunction-Elements variable contains elements joined with the Current-Conjunction. 22110 also initializes the Current-Group to be null and the Current-Conjunction-Status to be UNAMBIGUOUS. These variables are used to select the elements joined with a conjunction when the joined elements are ambiguous. Step 22111 follows 22110. Step 22111 is true if the Current-Conjunction is not followed by another conjunction in the same sentence role of the clause, or if the previous condition is false, the following conjunction is delimited (by a comma for example) so as to indicate the joined elements associated with the Current-Conjunction. 22111 is true if the Current-Conjunction is unambiguously associated with its joined elements. A single conjunction of sentence role elements or of clauses always has an unambiguous element association which is implied by the first condition of 22111. The second condition implies unambiguity if multiple conjunctions are delimited to indicate the element associations.

If 22111 is true, the elements of the Current-Conjunction are unambiguously associated and 22112 is next. 22112 either adds the delimited elements succeeding the Current-Conjunction to the Current-Conjunction-Elements variable, or adds the element succeeding the Current-Conjunction to the Current-Conjunction-Elements. Note that elements joined with the same conjunction between each element (e.g., "A or B or C") is detected in Parse Step 16 and is replaced with all but the last conjunction removed in the Sentence Data Structure by Dictionary Look Up Step 18. If 22111 is false, the elements are ambiguously associated with the Current-Conjunction and 22114 is next. 22114 sets the Current-Element to be the first element succeeding the Current-Conjunction. After 22114, 22115 is next and is true if the Current-Element is in a group relation with the elements currently in the Current-Conjunction-Elements. 22115 is false if the elements are not nouns. The group relation is used in 22115 because the group relation can indicate the intended association of the elements to the conjunction. When the conjunction selection process is called, the word sense number of constituents has not been selected. However for 22115, the group relation is searched for by using word sense numbers that are associated with the text of Current-Conjunction-Elements and the Current-Element in 120. If any of the elements do not have an associated word sense number in 120, 22115 is false. Otherwise, the group relation is first searched for in 120 and if none is found, then in 90. The search is as described for group relations implied by prepositions with the word sense number restriction. Other criteria for selecting intended associations is not used at 22115 because the other selecting criteria is stored at the selector initiating the constituent conjunction selection process. If 22115 is true, Step 22116 is next and adds the Current-Element to the Current-Conjunction-Elements variable. 22116 also marks the Current-Element entry in the variable with BY-INCLUSION. 22116 also stores a pointer to the group relation containing the Current-Element in the Current-Group variable. If 22115 is false, 22118 is next and adds the Current-Element to the Next-Conjunction-Elements variable and marks the addition with BY-DEFAULT. 22118 also adds a CONJUNCTION mark to the end of the Current-Conjunction-Elements variable. The marks added in 22116 and 22118 indicate the element which is ambiguous and could have a different association to a conjunction. The caller can assign the ambiguous element to a different conjunction if the current interpretation proves inconsistent. 22116 assigns the Current-Element by group association. 22118 assigns the Current-Element to a default conjunction association. After 22116 or 22118, 21120 is next, and assigns the Current-Conjunction-Status as AMBIGUOUS.

After 22112 or 22120, 22122 is next, and is true if the Current-Conjunction has functions which generate a single clause or multiple clause interpretation and the clause contains a function word(s) which indicates a single or a multiple clause interpretation. "respective" and "respectively" are examples of such function words. If 22122 is true, 22123 is next and assigns the Current-Function-Group pointer to have a value of the location of the clause interpretation function indicated by such a function word in the type of element partition of the Current-Conjunction. If 22122 is false, 22124 is next and assigns the Current-Function-Group pointer to have a value of the location of the beginning of the functions in the type of element partition of the Current-Conjunction. The functions are located in a data area of Function 22. The function data structure is illustrated in FIG. 11*a*. After 22123 or 22124, 22125 is next. 22125 stores the following information at the position of the first word of the Current-Conjunction in the SDS: a pointer to the Current-Conjunction-Elements variable, the Current-Function-Group, the Current-Conjunction-Status, and the Current-Group. After 22125, 22126 is next and is true, if there is another unprocessed conjunction in the specified set of conjunctions. If 22126 is false, the constituent conjunction processing is completed for the current invocation of this process and 22127 sets processing to continue at the caller. If 22126 is true, 22128 is next and sets the Current-Conjunction to be the next unprocessed conjunction either in the specified set of conjunctions. After 22128, 22129 is next and is true if the Current-Conjunction-Status variable is AMBIGUOUS. If 22129 is true, 22130 is next. 22130 sets the Current-Conjunction-Elements variable to contain the elements in the Next-Conjunction-Elements variable and to contain all elements which are not in a previously processed conjunction's Current-Conjunction-Elements variable instantiation and which precede the Current-Conjunction. If 22129 is false, 22131 is next and sets the Current-Conjunction-Elements variable to contain all elements which are not in a previously processed conjunction's Current-Conjunction-Elements variable instantiation and which precede the Current-Conjunction. After 22130 or 22131, 22132 is next. 22132 sets the Current-Group variable to be null. Also 22132 sets Current-Conjunction-Status to be UNAMBIGUOUS. After 22132, 22111 is next and processes the Current-Conjunction as described above.

INTERJECTIONS

Interjections are single words or phrases which generally express an emotion. An example of an interjection is: "Oh!". Possible interjections are detected by Parse Step 16. Dictionary Look Up Step 18 checks the grammar information of each possible interjection phrase to determine if the phrase is an interjection. Each interjection has an entry in Dictionary 20. Associated with each interjection is one or more pointers. Each such pointer addresses a clause state representation stored in Clausal Abstract Noun and Clause State Representation Memory 100. The clause state representation addressed by the pointer associated with an interjection is the state representation of that interjection, or the clause state representation is at least part of the interjection's state representation. When 18 determines that a phrase is an interjection, 18 places the first pointer in the interjection's Dictionary 20 entry into the interjection's location in the SDS. 18 also stores a mark indicating that the phrase is an interjection and stores a pointer to the Dictionary 20 entry of the interjection. For example, a textual representation of one clause state representation of "Oh!" is: "The speaker (of "Oh!") is surprised by the current context." If the state representation of an interjection requires multiple clauses to express the interjection's state representation, the additional required clauses are associated with the clause pointed to by the interjection's Dictionary 20 entry. The additional required clauses are accessible from the information content purpose category associated with the clause representation pointed to by the interjection's pointer in Dictionary 20. The information content purpose category associated with the clause representation contains a pointer to the additional required clauses. The additional required clauses are either chained with pointers for clauses which are context independent, or are organized into a tree of clauses with a particular chain of clauses selected by the context. The information content purpose category along with other related purpose categories are stored in Purposes Associated with Clausal State Representation Memory 130.

An interjection may have multiple pointers associated with the interjection's Dictionary 20 entry. The multiple pointers are utilized for an interjection which has multiple clause state representations. There is a pointer for each clause state representation of an interjection. Each clause state representation is a different meaning of an interjection. For example, "Great!" has two basic clause state representations, and the corresponding textual representations are: "The speaker is very happy with the current context."; "The speaker is very unhappy with the current context." The different clause state representations are selected by Purpose Identifier 140. More specifically, the multiple ordered clause state representations are selected in the same order as the pointers are listed in Dictionary 20; The selected clause state representation is checked for consistency with the current context and previously stored experience by Purpose Identifier 140; The selected state representation is accepted as the intended meaning if the clause state representation is found to be consistent at 140, or the state clause representation is rejected and this process is repeated starting at the selection of the next clause state representation. If this selection and evaluation processes fails to select a clause state representation, the Communication Manager is informed of a failure to process an interjection. If a clause state representation is successfully selected and evaluated, control returns to the Communication Manager. Interjections are processed for selection and evaluation when they are encountered in the SDS.

MORPHOLOGICAL PROCESSING STEP 24

A word with an affix or a combination of affixes is directed to morphological processing in Dictionary Look Up Step 18. When a morphological word is composed of a base word, one or more prefixes, and one or more suffixes, the prefix or combination of prefixes and the suffix or the combination of suffixes are each treated as invoking separate morphological processes. The suffix or combination of suffixes is morphologically processed first followed by the morphological processing of the prefix or combination of prefixes in a morphological word with both one or more prefixes and one or more suffixes. In the following description, the term affix or combination of affixes either applies to a prefix or combination of prefixes, or applies to a suffix or combination of suffixes. When a morphological word has both types of affix(es), the statement in the following description applies separately to each type of affix in the order of the suffix(es) first. When a word in Step 18 has an affix or combination of affixes, the word plus affix(es) may have an associated address descriptor, or morphological processing code(s) stored in Dictionary 20. Prefixes or combinations of prefixes have separate descriptors or codes from suffixes or combinations of suffixes for a base word. This morphological information can be in a special table for anomalous morphology, or the morphological information can be in a common table. The address descriptor contains an application vector which designates which word sense numbers of a baseword are allowed for usage. The address descriptor along with the address of a base word's word sense number is used to calculate an address of a portion of a word sense number in the base word's state representation data structure. This portion of a word sense number in the state representation data structure contains such a base word plus affix's state representation. This portion can be the entire data structure associated with a word sense number, or the portion can be a subset of the data. A word plus affix(es) alternately can have one or more morphological processing codes. Each code has one or more designated functions stored in a morphological data structure. Morphological Processing Step 24 selects a code. This code's associated function(s) typically results in the generation of an address descriptor to access a portion of a word sense number's data structure which contains the state representation of the word plus affix(es); or results in a generation of a phrase containing the base word, one or more function word function addresses, and/or one or more state representation words all of which is equivalent to the base word plus affix(es), or results in a clause containing the base word, function word function addresses, state representation words, and sentence roles of the clause containing the morphological word. Some words in the phrase or clause already have a state representation addresses or function word function address. Words with addresses are typically implied by the affixes. The addresses of the words without addresses in the phrase or clause are then looked up in Step 18. A word plus affix(es) has its own address or code(s) either because the word has been preprocessed or the word plus affixes has a unique semantic relation to its base. A word plus affixes has a preprocessed address descriptor or code to save the overhead of morphological processing. A word with a unique semantic relation would not access the correct semantic information structure through morphological processing. As will be described below, the morphological codes correspond to function-types.

A base word plus affix(es) without an associated address descriptor or code in Dictionary 20 has it state representation determined from the affix(es), the base word plus affix(es)'s part of speech, and the base word's part of speech. One reason a Dictionary 20 entry does not contain a preprocessed morphological entry is that all realizations of the morphological entry are possible for the base word. Morphological Processing Step 24 uses the affix(es) and the parts of speech to select functions which either generate an address descriptor to the word plus affixes state representation or which generate a phrase or a clause. In the case that a word has both a prefix(es) and a suffix(es), the prefix(es) is processed after the suffix(es). The processing of the suffix(es) may change the representation of the base word plus affixes, i.e., from a word to a phrase or clause. However, the processing in Step 24 of the prefix(es) uses the original part of speech of the base word plus affixes before processing for a suffix(es) to determine the state representation of the prefix(es) plus a base word which has already been processed for its added suffix(es). The processing of a prefix(es) results in either an addition to the base word's address descriptor or results in a phrase or clause modifying the base word in the phrase of clause resulting from processing of the suffix(es). The generated address descriptor accesses a portion of the base word's state representation memory storage area. The words without addresses in the generated phrase or clause are processed into addresses of function words and state representation words by Dictionary Look Up Step 18. A morphological word can have multiple sets of functions with one set of functions for each different state representation of the morphological word. Each set of functions can correspond to a code in 20.

Morphological Processing Step 24 can also generate a representation of a morphological word which is formed from a base word in order to change the base word's part of speech at the request of an initiating selector. The caller, such as Selector 70, provides the base word, its part of speech and the required part of speech for the morphological word. 24 determines a suitable affix or combination of affixes which can form the required part of speech from the base word. Then the affix or combination of affixes, base word part of speech, and the required part of speech are used to generate the state representation of the morphological word as described above.

FIG. 12*a* contains the Morphological Processing Data Structure. This data structure is utilized for a base word plus affix(es) without an associated address descriptor or code in Dictionary 20. This data structure is organized by affix or combinations of affixes separately for prefixes and suffixes. Within each affix or combination of affixes, a function-type, a set of one or more functions to generate a morphological word's state representation, is selected by the base word's part of a speech, called the source, and the morphological word's part of speech, called the destination. The destination's part of speech is the part of speech resulting from applying the affix or combinations of affixes to a base word. The source and destination select a set of one or more possible function-types. Each function-type has one or more functions. A function-type is selected, and its associated morphological function(s) is then applied to the base word, or the result of a morphologically processed word containing both a prefix(es) and a suffix(es). The result of a function-type is the state representation of the morphological word: the address descriptor, phrase, or clause. The phrase or clause contains state representation addresses and/or function word function addresses for the words implied by the affix(ex). If more than one function-type is possible for an affix or combination of affixes and source and destination, there are multiple possible interpretations. In this case the possible multiple interpretations are stored and the first interpretation, i.e., function-type, is selected and processed for evaluating its function(s) to produce a state representation. An entry with an adverb destination part of speech has a pointer to a set of modification adverbial subclasses. Modification adverbial subclasses are used when the associated adverbial modifies another word such as an adjective, adverb, or verb for the purpose of selecting the adverbial function of the modifying adverb as described above.

The first function-type selected from the multiple function-types or the only function-type is processed for function evaluation. The function-type's functions are evaluated in the order of the listing in the Morphological Processing Data Structure. When a function-type has a single function, the single function will generate an address descriptor. This address descriptor will either designate a subset of the word sense numbers of the base word or designate a set of replacement phrases or clauses. When there are multiple functions associated with a function-type, one function will generate an address descriptor which designates the word sense numbers which are implied by the base word plus the affix or combination of affixes associated with the one function-type. Other functions either modify the address descriptor associated with the base word or generate a phrase or a clause. A function which generates a phrase has a descriptor indicating the composition of the phrase. The composition of phrase is a template listing in order of position: the head, the state representation word modifiers of the head, and any function words. The state representation address of the head is the address descriptor of the base word. The modifiers of the head in a phrase can be stated modifiers of the morphological word. Such modifiers are also processed morphologically to determine there modification relation to the head if necessary. The function words are listed with their function address for implied function words in the template. The template of the phrase is stored in the SDS. After the template is stored, Dictionary Look Up Step 18 will generate the address to the word sense numbers of the base word. State representation words implied by the affix(es) already have their state representation word in the template. 18 also looks up the addresses of words modifying the morphological word when they do not already have an address in the template. Also, 18 invokes processing for function words requiring processing such as stated function words. If the affix implies a clause generation, either the function contains a descriptor template for each sentence role phrase of the clause, or the function contains an invocation of Ellipsis Processing Step 26 to generate the clause or clauses. The descriptor template of a sentence role phrase of a clause has the same form as a descriptor template for a phrase as just described. In addition, the stated state representation word modifiers of the morphological word can be sentence roles of the clause containing the morphological word in the template descriptor. Such stated modifiers may also require morphological processing. Multiple clauses would have a main clause and one or more subordinate clauses. Step 26 can either be directly called from 24, or the invocation can be stored in the SDS for later invocation by Dictionary Look Up Step 18. The time of invocation is stored in the clause generation function. If clause generation does not depend upon other morphological processing, 24 invokes 26. Otherwise, invocation of 26 is delayed. Any remaining untried function-types are stored in the SDS because the current interpretation of the morphological word may not be correct. The remaining function-types are the alternate possible interpretations.

Figure 12B:
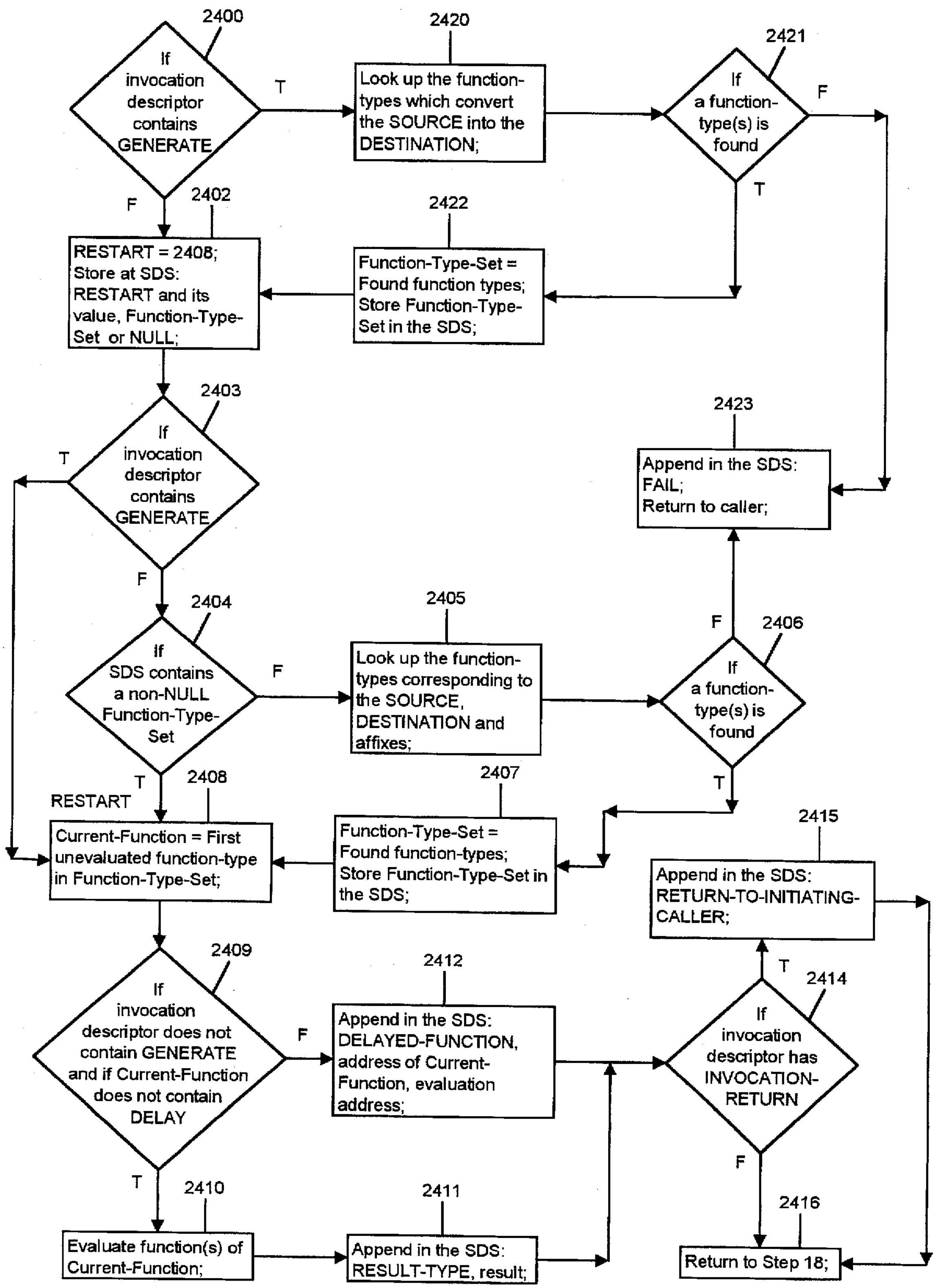
FIG. 12*b* is a flow chart for the selection and evaluation of functions associated with affixes.

FIG. 12*b* contains the Morphological Selection Process. The Morphological Selection Process begins at 2400. 2400 is true if the invocation descriptor contains GENERATE. The invocation descriptor is sent by Dictionary Step 18 or by an initiating selector for example. The invocation descriptor contains parameters for performing the Morphological Selection Process. The GENERATE parameter value indicates that the morphological process is to form a morphological word from a base word in order to change the base word's part of speech at the request of a caller. The GENERATE parameter indicates that this is the first request of a generation for a particular base word. For example, Selector 70 invokes the Morphological Selection Process to generate an adverb from an adjective when the adjective modifies the verb in a clause characterizing a clausal abstract noun as was described above. If 2400 is false, the Morphological Selection Process corresponding to Morphological Processing Step 24 is for an invocation which required a morphological word to be processed into its state representation in terms of the base word sense number, other state representation word sense numbers and function word function addresses. If 2400 is false, i.e., the invocation descriptor does not contain GENERATE, 2402 is next. 2402 sets RESTART to have a value of 2408. 2402 also stores the following at the position of the word under process in the SDS: RESTART, the value of RESTART, and the Function-Type-Set contained in the invocation descriptor or null if the Function-Type-Set is not contained in the invocation descriptor. The Function-Type-Set contains the function-types which are possible for the interpretations of the morphological word. The possible function-types, also called codes, are stored in a base word's common table or anomalous definition in Dictionary or in a Morphological Data Structure as depicted in FIG. 12*a*. A function-type contains one or more functions, corresponding to one or more codes, which also corresponds to one or more affixes. Thus, a function-type corresponds to an affix or combination of affixes which change the base word's part of speech to the part of speech of the base word plus one or more affixes. Evaluating a function-type results in the state representation of the base word plus one or more affixes. If the possible function-types are not known or all function-types are possible, the invocation descriptor does not contain a Function-Type-Set. The function-types are known when they are looked up by the caller for example.

2400 is true if the invocation descriptor contains a GENERATE parameter. If 2400 is true, the process to form a morphological word from a base word in order to change the base word's part of speech, begins at 2420. The GENERATE invocation descriptor contains the base word, the SOURCE, and DESTINATION. The invocation descriptor can also contain one or more affixes which are already attached to the base word. 2420 looks up the function-types corresponding to the affix or combination of affixes which will change the given base word's part of speech, the SOURCE, to the given DESTINATION, the required part of speech of the morphological word to be formed. If the stated word is a morphological word, 2420 first looks up the function-type corresponding to the combination of affixes which contain a stated affix(es) plus additional affixes which change the base word to the desired part of speech, the DESTINATION. The affixes or combination of affixes are stored with a part of speech designator at the base word's Dictionary 20 common table or anomalous definition. After 2420, 2421 is next and is true if 2420 found at least one function-type corresponding to an affix or combination of affixes at 20. There could be more than one function-type which generates the desired part of speech. If 2421 is true, 2422 assigns Function-Type-Set to contain the one or more function-types found at 2420. Then 2422 stores the Function-Type-Set in the base word's SDS position. If 2421 is false, 2423 appends FAIL at the base word's position in the SDS, and returns processing to the caller, e.g., the initiating selector. After 2422, 2402 is next and is processed as described above.

After 2402, 2403 is next and is true if the invocation descriptor contains GENERATE. If 2403 is true, 2424 is next and sets processing to continue at 2408 which is described below. If 2403 is false, 2404 is next and is true if the base word's SDS position contains a Function-Type-Set. If 2404 is false, 2405 is next. 2405 accesses the Morphological Data Structure of FIG. 12*a* with the following parameters from the invocation descriptor or possibly a parameter set from the Morphological Selection Process: the base word, the AFFIX which can have a null value, a single affix value, or a combination of affixes value, the SOURCE which is the part of speech of the base word, and the DESTINATION which is the part of speech of the morphological word formed from the base word. 2405 accesses the Morphological Data Structure with the base word, AFFIX, SOURCE and DESTINATION to obtain the possible function-types for the AFFIX, SOURCE and DESTINATION. After 2405, 2406 is next, and is true if at least one function-type was found at 2405. If 2406 is false, 2423 unsuccessfully terminates Step 24 as described above. If 2406 is true, 2407 is next. 2407 forms a Function-Type-Set composed of all possible function-types as accessed in the Morphological Data Structure at 2405. 2407 stores this Function-Type-Set at the base word's SDS position. After 2407, or if 2404 is true, or if 2403 is true, 2408 is next. 2408 sets the Current-Function to be the first unevaluated function-type stored in the Function-Type-Set. 2408 is the first step in a restarting of morphological processing for a base word. After 2408, 2409 is next and is true if the invocation descriptor does not contain GENERATE, and if the Current-Function does not contain DELAY. The Current-Function contains DELAY if there is a function which calls Ellipsis Processing Step 26, and if the evaluation of this function-type must be delayed. 2409 is true if the functions in the Current-Function can be evaluated without delay. If 2409 is true, 2410 is next and evaluates the functions in the Current-Function. After 2410, 2411 appends the RESULT-TYPE and the value of the result from the function evaluation at 2409 at the end of the contents at the base word's position at the SDS. The RESULT-TYPE has a value of: ADDRESS-DESCRIPTOR, PHRASE, or CLAUSE. The result format corresponding to each result type was described above. If 2409 is false, the evaluation of the functions in the Current-Function variable are to be delayed. If 2409 is false, 2412 is next. 2412 appends DELAYED-FUNCTION, the address of the Current-Function, and the address for evaluating the function(s) at the end of the contents at the base word's position at the SDS. After 2411 or 2412, 2414 is next and is true if the invocation descriptor contains a non-null INVOCATION-RETURN value. If 2414 is true, 2415 is next. 2415 appends a RETURN-TO-INITIATING-SELECTOR symbol at the end of the contents at the base word's position at the SDS. If 2414 is true, the Morphological Selection Process was initiated by a selector (50, 60 or 70). 2415 appends the quoted mark to indicate that control is to be passed to the actual initiating selector at INVOCATION-RETURN after Step 18 looks up the addresses in the morphological result. After 2415, or if 2414 is false, 2416 is next and sets processing to continue at Dictionary Look Up Step 18. Step 18 will evaluate a delayed function-type which includes reinvoking morphological processing to evaluate functions after elliptical processing is complete, and will process any address descriptors and find the addresses of sentence roles in the morphological result. 2416 completes the Morphological Selection Process.

ELLIPSIS PROCESSING STEP 26

Ellipsis is the leaving out of one or more consecutive words in a natural language expression. Ellipsis is detected during Parsing Step 16 for all ellipsis except for morphologically related ellipsis. Morphological ellipsis is detected in Morphological Processing Step 24. Ellipsis is marked within phrases and/or between phrases and is stored in the SDS. Part of the Dictionary Look Up Step 18 processing is to initiate the processing of any ellipsis after Morphological Processing Step 24 has been completed for the current sentence. At Step 18, the clauses and phrases of the clauses of the sentence are separated and stored in the SDS. The phrases of the SDS contain: the addresses of state representation words, a tense code associated with verbs, a singular/plural flag for nouns, function word name codes and their associated addresses of function word selection and evaluation processes, the sentence role of the phrase, the phrase head, phrase modifiers, all marked ellipsis in the phrase including a descriptor of the ellipsis, pointers to all related ellipsis of phrases, a pointer to the phrase in Syntax Phrase Trees 30, and a pointer to Syntax Clause Trees 30. After Dictionary Look Up Step 18 has completed its processing, Step 18 invokes Ellipsis Processing Step 26 if ellipsis had been detected during parsing Step 16 or Step 24 and has not already been processed at 24. Step 18 invokes ellipsis processing by sending Step 26 a pointer to the SDS just described and pointers to phrases with ellipsis. The result of Step 26 is to replace the ellipted words. Step 26 is processed before any state representation processing is performed upon the current sentence.

There are three types of ellipsis replacements processes. One replacement type process is to look up and transfer the ellipted elements from a corresponding structure within the sentence containing ellipsis. In some cases the ellipted elements are transferred from the previous sentence. Another type of replacement process is to replace the ellipted elements with words implied by the ellipsis. The third type of ellipsis is to generate the ellipted elements from a template. The third process may utilize the first two processes to generate the elements to fill in the template.

The ellipsis process is initiated by Dictionary Look Up Step 18 or by Morphological Processing Step 24 sending Ellipsis Processing Step 26 a pointer to the SDS and a list of pointers to phrases with ellipted elements and/or related to ellipted phrases. 18 also sends a flag which indicates if the sentence contains response ellipsis. Step 26 looks up the descriptor associated with ellipted elements of a phrase in the SDS. The descriptor contains the type of ellipsis. There are 6 types of ellipsis: general, coordination, comparative clauses, response forms, nonfinite verb clauses, verbless clauses, and morphologically formed words implying clause relations. For descriptions of these types of ellipsis see Quirk et al. General, coordination, and comparative ellipsis allow for ellipsis within a phrase and ellipsis of sentence role phrases, and the source of the replacement for ellipted elements is in the current sentence or a previous sentence. Nonfinite verb clauses, verbless clauses, morphologically implied clause relations, and response form ellipsis have specific sources that are transferred to replace ellipted elements. The transfers sometimes utilize templates.

Ellipsis within a phrase is the leaving out of one or more consecutive words in a phrase. Ellipsis of a phrase or phrases is the leaving out of one or more complete consecutive phrases. In the following, the plural of element will be used to include the case where only one element is actually ellipted. Also, the plural of phrase will be used to include the case when only one phrase is actually ellipted. General, coordination, and comparative ellipsis can have ellipsis within a phrase and ellipsis of phrases. For these types of ellipsis, first the descriptor associated with the ellipsis is looked up in the SDS to determine the ellipsis processing required for the type of ellipsis. The type of ellipsis selects the process to be performed in Ellipsis Processing Step 26. Nonfinite verb clause, verbless clause and morphological clause relation ellipsis as well as response form ellipsis each have a separate ellipsis process to be described below. Response form ellipsis can occur with one or more other types of ellipsis. If response form ellipsis is contained in the sentence, response form ellipsis is processed first. Otherwise, the type of ellipsis is performed as it occurs in a left to right order in the Sentence Data Structure.

General, Coordination, and Comparative Ellipsis Processing

Figure 16A:
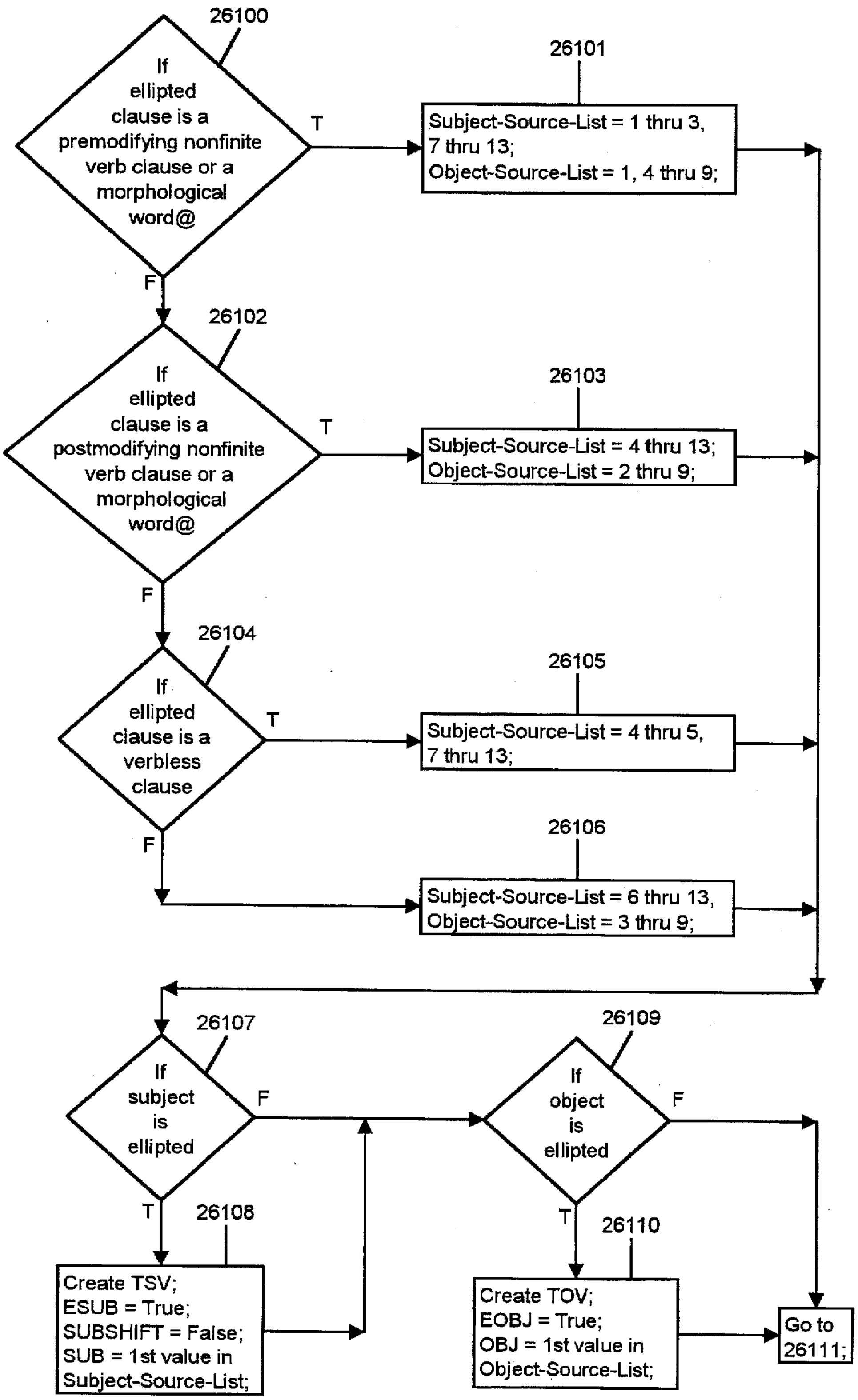
FIGS. 16*a*–16*c* is a flow chart for the nonfinite verb clause, verbless clause, and morphological word@ ellipsis replacement method.

General, coordination, and comparative ellipsis is processed to replace the ellipted elements with the process illustrated in FIGS. **13*a*–13*c*. The process invocation contains a list of the location of ellipted elements and a flag which indicates if response ellipsis is contained in the sentence. The Current-Sentence, the source for ellipted element replacements, is set to the sentence associated with the SDS in the invocation by Step 18 or Step 24, which is the most recent sentence which has not been processed for state representation. The type of ellipsis is stored at the location. First the type of ellipsis selects the ellipsis process to be performed starting at 2600. 2600 is true if response ellipsis is contained in the Current-Sentence. If response ellipsis is present, 2639 is next and sets ellipsis processing to continue at 2640 which is at the Response Ellipsis Process illustrated in FIG. 14*a*. If 2600 is not true, or after response ellipsis processing is completed, 2601 is processed next. 2601 is true if the invocation list contains unprocessed ellipsis in the Current-Sentence. If 2601 is false, 2602 is performed next. In 2602, ellipsis processing is completed. 2602 sets RES-STATUS to SUCCEED and processing returns to the caller. If 2601 is true, 2603 is next and sets the Current-Phrase to be the next unprocessed phrase with ellipsis or the next unprocessed ellipted phrase in the Current-Sentence. Next in 2604, the ellipsis descriptor of the Current-Phrase is looked up in the SDS. 2605 is next, and is true if the type of ellipsis in the descriptor is general, coordination, or comparative ellipsis. If 2605 is false, 2699 sets the parameters ESUB and EOBJ to false, and sets processing to continue at 26100 which begins Nonfinite Verb Clause, Verbless Clause and Morphological Clause Relation Ellipsis Processing as illustrated in FIG. 16*a*. If 2605 is true, 2606 is next, and is true if descriptor from 2604 indicates that the ellipted elements or the ellipted phrase is known. 2606 is true if the ellipted elements or phrase has one or more known replacements. If 2606 is true, 2607 is next, and is true if there is an untried known replacement. If 2607 is true, 2613 is next. 2613 first sets state information for additional processing of alternate known replacements if a replacement is rejected in subsequent state representation processing. RETURN is set to 2607; the Current-Match is set to KNOWN; if not already formed, the Tried-Phrase-Set-Vector (TPSV) is formed with one element for each possible known replacement for the current ellipted words; (Each element of the TPSV is set to all replacements as UNTRIED. Each of these elements can have a value of TRIED or UNTRIED.) 2613 also transfers the next untried known elements or phrase from the location of a pointer contained in Syntax Phrase Trees 30** into the SDS. The corresponding element of the transferred replacement in the TPSV is set to TRIED. Finally 2613, transfers processing to step 2618. 2618 stores information for restarting the ellipsis process and is described in detail below. If 2607 is false, the ellipsis processing has failed for known replacements, and other sources of replacement are tried at 2608 which is next.

If 2606 is false, the ellipted elements or the ellipted phrase is unknown. Then one of several methods to find a structure in the Current-Sentence which will act as a source for the ellipted elements and/or phrases is used. If 2606 or 2607 is false, 2608 is next. In 2608, the Current-Match is set to an EXACT-MATCH. The Current-Match value is used to determine whether the source element or phrase must match exactly with the ellipted element or with the phrase, or whether the match is an INFLECTION-RELAXED-MATCH. The match procedures will be described below. Also in 2608, the Tried-Phrase-Set-Vector (TPSV) is set to all phrases as UNTRIED. The TPSV contains an element for each sentence element in the Current-Sentence which could be an ellipsis source. Note, that modifiers of a noun have the option of a null source. The null source is used for the case when a modifier modifies a coordinated noun phrase, and the modifier does not modify all coordinated constituents. Each of these elements can have a value of TRIED or UNTRIED. This value is set to TRIED if its corresponding element has been considered as a source for ellipted elements or an ellipted phrase. Finally at 2608, the First-Elliptical-Phrase is set to be the location of the Current-Phrase in the SDS. The First-Elliptical-Phrase is used to store the state of ellipsis processing as described below. Next in 2609, if the Current-Phrase has a coordination type of ellipsis, and the Current-Phrase is coordinated with other phrases, 2610 is performed next. 2610 selects the Source-Phrase to be the first UNTRIED phrase coordinated with the Current-Phrase in the nearest preceding first order. The nearest preceding first order selects UNTRIED preceding phrases first until all preceding phrases have been processed for matching. The preceding phrases are selected in a right to left order which selects the nearest preceding phrase first. After all the preceding phrases have been processed without a match, the succeeding phrases are selected in a left to right order which is the nearest succeeding phrase first order. 2610 sets the TPSV element corresponding to the selected phrase to be TRIED. Also, 2610 sets RETURN to 2609. RETURN is used to mark the last source selection process. Next in 2611, 2611 is true if an untried Source-Phrase was found in 2610. If 2611 is true, 2612 is next, and is true if the Source-Phrase selected in 2610 contains stated words with a same phrase element Current-Match for the ellipted elements in the Current-Phrase. A same phrase element Current-Match means that for each ellipted element of the Current-Phrase, there is a wordset in Syntax Phrase Trees 30 of the corresponding element in the Source-Phrase which has a Current-Match with a wordset in Syntax Phrase Trees 30 of the corresponding ellipted element. The Current-Match is either an EXACT-MATCH or an INFLECTION-RELAXED-MATCH which will be described below. If a same phrase element Current-Match was not found in 2612, 2610 selects the Source-Phrase and processing continues as described above.

2612 is true if the Source-Phrase selected in 2610 contains stated words with a same phrase element Current-Match for the ellipted elements in the Current-Phrase. If 2612 is true, 2617 is performed next. 2617 transfers the addresses of all replacements for ellipted elements from the matched Source-Phrases to the SDS to replace ellipted elements in a phrase or to replace ellipted phrases. The transferred addresses have already been processed into addresses by Step 18. 2617 also stores the value of the First-Elliptical-Phrase variable in each elliptical phrase. Also, the tense code or plural/singular flag, if any, associated with the phrase structure in Syntax Phrase Trees 30 which is associated with a phrase with ellipted elements or an ellipted phrase is transferred to the SDS. The tense code is associated with verb phrases. The plural/singular flag is associated with some noun phrases. Next in 2618, the state of the ellipsis processing is stored at the First-Elliptical-Phrase location in the SDS. The state of the ellipsis processing is used to restart the ellipsis processing if the selected replacements are determined to be incorrect in subsequent state representation processing. 2618 first sets RESTART to be 2635. The state of the ellipsis processing stored at the First-Elliptical-Phrase location in the SDS includes: RESTART and its value, RETURN, the Current-Match, the Current-Sentence, and the TPSV. If subsequent state representation processing determines that the ellipsis replacements are unsuitable, Selectors 50, 60, or 70, or the Communication Manager 160 processes, for example, reinvokes Ellipsis Processing Step 26 and sends a pointer to the unsuitable phrase in the SDS. For example, a selector may detect the unsuitable phrase at the non-initial phrase of multiple, consecutive, ellipted phrases. The selector looks up the value of the First-Elliptical-Phrase in the unsuitable phrase prior to reinvocation. The selector reinvokes 26 with a pointer to this value. This selector also sets the processing to continue at RESTART. For general, coordination and comparative ellipsis, the value of RESTART is 2635. 2635 restores: RETURN, Current-Match, Current-Sentence, and TPSV. 2635 then sets processing to continue at RETURN.

After 2618 stores the state, 2619 is performed next. 2619 is true if the ellipsis type descriptor from 2604 has an associated special function. Special cases for ellipsis are handled by storing a special function symbol and value in an ellipsis descriptor which is located in the SDS. If 2619 is true, 2621 evaluates the special function which performs an additional function to handle the special case. For example there is a special case for the treatment of the operator "do" and its tenses. Sometimes "do" or one of its tenses is stated as part of an verb phrase with ellipsis. For example, "Tom went to school later than Bob did." The above elliptical processing would create the following phrases: "did "to school" to replace the ellipsis following "did". Note that "go" would be selected as an inflection replacement allowed by the same phrase element INFLECTION-RELAXED-MATCH process (to be described below) because "go" is the present tense and "went" is the past tense of "to go". However, the tense code associated with the "did go" phrase structure in 30 does have a past tense. The verb phrase replacement for the ellipsis would normally be interpreted as "did" implying an emphatic verb phrase as in a denial or contradiction of a statement. The special function associated with "do" or its tenses is: if the source verb phrase does not have an emphatic function associated with "do" or one of its tenses, the function removes the emphatic code associated with the "do" or its tense in the verb phrase with ellipsis in the SDS. The emphatic code is part of the tense code associated with a verb phrase which has been stored by Step 18. This action of the function essentially removes the "do" or one of its tense from the sentence. In this example, the actual verb implied by the tense code after removal of the emphatic code is equivalent to "went". If the source verb phrase does have an emphatic function associated with "do" or one of its tenses, the function does not perform any action. If 2619 is false or after 2621, elliptical processing is continued at 2601 which checks for additional unprocessed ellipsis in the Current-Sentence being processed as described above.

If 2611 determined that a Source-Phrase was not found in 2610, or if 2609 was false, i.e., the Current-Phrase does not have its ellipted elements in a coordinated phrase, another source phrase selection method is tried at 2622. 2622 selects the Source-Phrase to be the first untried phrase with the same sentence role as the Current Phrase. The source phrase candidates are selected in the nearest preceding first order. 2622 sets the TPSV element corresponding to the selected Source-Phrase to be TRIED. Also, 2622 sets RETURN to 2622. Next, 2623 is true if 2622 found an untried Source-Phrase. If 2623 is true, then 2624 is next. 2624 is true if the Source-Phrase from 2622 has a same phrase element Current-Match for the ellipted elements in the Current-Phrase having ellipsis or a same phrase Current-Match for the Current-Phrase which is an ellipted phrase. A same phrase Current-Match occurs when the Source-Phrase matches a phrase set for the corresponding ellipted phrase in Syntax Clause Trees 30. If 2623 or 2624 is false, 2622 is next and selects the next Source-Phrase as described in this paragraph. If 2624 is true, processing continues at 2614.

If a same phrase element Current-Match was found in 2624, 2614 is performed next. 2614 is true if the next consecutive phrase following the Current-Phrase is ellipted. If 2614 is true, 2615 sets the Current-Phrase to be the next consecutive phrase after the previous Current-Phrase. Also, 2615 sets the Source-Phrase to be the next consecutive phrase after the previous Source-Phrase. Next, 2616 is true if the Source-Phrase has a same phrase Current-Match with the Current-Phrase. If 2616 is true, 2614 continues processing as described above. If 2616 is false, the selected source phrases were not the correct ones, and 2637 is next. 2637 sets the next source selection process to be the value contained in RETURN. 2637 causes the ellipsis processing to continue at 2622 or 2625 (2625 are described below). If the next consecutive phrase after the Current-Phrase is not ellipted at 2614, a suitable source for the ellipsis has been found, and 2614 is false, and 2617 is performed next. Processing continues at 2617 as described above.

If 2622 did not find a Source-Phrase, 2623 is false, and another source phrase selection method is tried at 2625. 2625 selects the Source-Phrase to be the first untried phrase with the same phrase type as the Current-Phrase. The source phrase candidates are selected in the nearest preceding first order. The same phrase type has the head with the same part of speech or the phrase has the same function for adverbials. 2625 sets the TPSV element corresponding to the selected Source-Phrase to be TRIED. Also, 2625 sets RETURN to 2625. Next, 2626 is true if 2625 found an untried Source-Phrase. If 2626 is true, then 2627 is next. 2627 is true if the Source-Phrase from 2625 has a same phrase element Current-Match for the ellipted elements in the Current-Phrase having ellipsis or a same phrase Current-Match for the Current-Phrase which is an ellipted phrase. If 2627 is true, processing continues at 2614 as described above. If 2627 is false, 2625 is next and it selects the next Source-Phrase as described in this paragraph.

If 2625 failed to select a Source-Phrase, 2626 is false and 2628 is performed next. 2628 is true if the Current-Match has a value of an EXACT-MATCH. If 2628 is true, 2629 sets the Current-Match to have a value of an INFLECTION-RELAXED-MATCH. Also, 2629 sets each element of the TPSV to be UNTRIED. After 2629, processing continues at 2609 as above except the Current-Match has an INFLECTION-RELAXED-MATCH value. The same phrase element Current-Match with an INFLECTION-RELAXED-MATCH includes an exception for an inflection mismatch. An inflection is a suffix added to verbs to add tense, or subject-verb concordance. Also, an inflection is a suffix added to a noun to indicate a plural. Nouns or verbs which have a different form for plurals or tenses respectively are considered to have a inflection. Nouns and verbs with inflections are stored in Dictionary 20 with an inflection code plus base. The same phrase element INFLECTION-RELAXED-MATCH succeeds when two wordsets of corresponding phrase elements which each have a base wordset plus an inflection code (as described for Dictionary 20), and the source base wordset in 30 (without its inflection code) matches a corresponding ellipted element's base wordset (without its inflection code) in 30 for an ellipted element, i.e., the wordset match is made disregarding inflection codes. This same phrase element INFLECTION-RELAXED-MATCH is utilized when the source element is not grammatically correct because of an inflection shift required for the ellipted element. For example, "He speaks often, but he won't (speak) tonight.", where "(speak)" is the ellipted element and "speaks" is the source phrase which will meet the same phrase element INFLECTION-RELAXED-MATCH. The same phrase element Current-Match with an INFLECTION-RELAXED-MATCH utilizes the normal EXACT-MATCH criteria unless this criteria fails. The normal EXACT-MATCH criteria is that a wordset in the source phrase exactly matches a wordset of a corresponding ellipted element in 30 as described above. For the same phrase element Current-Match with an INFLECTION-RELAXED-MATCH, when the same phrase element Current-Match with an EXACT-MATCH fails to match corresponding elements, the same phrase element INFLECTION-RELAXED-MATCH is utilized. The same phrase element INFLECTION-RELAXED-MATCH succeeds when the two corresponding wordsets being matched each have a base wordset plus an inflection code (as described for Dictionary 20) and the source base wordset in 30 (without its inflection code) will match a corresponding ellipted element's base wordset (without its inflection code) in 30 for an ellipted element. If the same phrase element EXACT-MATCH succeeds, or then if the same phrase element INFLECTION-RELAXED-MATCH succeeds, the same phrase element Current-Match with a INFLECTION-RELAXED-MATCH succeeds.

The same phrase element Current-Match with a INFLECTION-RELAXED-MATCH selects phrase element replacements which result in a grammatically correct phrase. The phrase with ellipsis contains the grammatically correct inflection because the phrase structure associated with the ellipted phrase or phrase with ellipted elements in Syntax Phrase Trees 30 was selected in Parse Step 16 to have a grammatically correct inflection. The effect of the same phrase element INFLECTION-RELAXED-MATCH is to substitute the correct inflection code associated with the phrase structure with ellipsis for the incorrect inflection associated with the source phrase without ellipsis. The address associated with a state representation word with an inflection or function word with an inflection is independent of the inflection. When the SDS is updated for ellipted elements in a phrase, the correct inflection code of the phrase with ellipsis is utilized with the ellipted elements transferred from the phrase without ellipsis. Thus the correct state representation word address or the correct function word name code and function selection address are transferred to the phrase with an ellipted element with a inflection mismatch in 2617. Part of the transfer process of 2617 is to transfer the tense code or the plural/singular flag associated with the elliptical phrase's structure in Syntax Phrase Trees 30 to the elliptical phrase's location in the SDS. The phrase element in Syntax Phrase Trees 30 has the grammatically correct tense code or plural/singular flag. The grammatically correct code or flag value has an associated correct inflection. Thus the phrase with ellipsis has the correct tense code or plural/singular flag and the correct associated inflection for its elements.

The same phrase Current-Match with an INFLECTION-RELAXED-MATCH utilizes the same phrase element Current-Match with an INFLECTION-RELAXED-MATCH. The same phrase Current-Match with an INFLECTION-RELAXED-MATCH utilizes the same phrase Current-Match with an EXACT-MATCH until a source phrase element cannot match an ellipted phrase's phrase set element wordset in Syntax Phrase Trees 30. When such a match cannot be made, the same phrase element INFLECTION-RELAXED-MATCH is used as described above. The same phrase Current-Match with an INFLECTION-RELAXED-MATCH succeeds when the same phrase Current-Match with an EXACT-MATCH succeeds, or then when utilized, the same phrase element INFLECTION-RELAXED-MATCH succeeds. If the Current-Match has a value of INFLECTION-RELAXED-MATCH at 2628, the INFLECTION-RELAXED-MATCH criteria has not succeeding in selecting a suitable replacement for the ellipsis in the Current Phrase. Next in 2631, 2631 is true if the Current-Sentence is the invocation sentence, the sentence which has not been completely processed for state representation. If 2631 is true, 2632 is performed next. 2632 effectively resets the state of the process so that the previous sentence, which has already been completely processed, becomes the potential source of ellipsis. The Current-Match is set to an EXACT-MATCH at 2632, and the Current-Sentence is set to the previous sentence at 2632. Also, the TPSV is set to all elements UNTRIED for the previous sentence. After 2632, ellipsis processing is continued at 2622 which is described above. If 2631 is false, all possible sources for the ellipsis in the Current Phrase have been tried without success, and 2634 is next. 2634 is true if the ellipsis processing was invoked by Selector 50, 60, or 70. If 2634 is true, 2636 is next. 2636 sets RES-STATUS to FAILURE and returns processing to the caller which interprets RES-STATUS as will be described below. If 2634 is false, 2638 is next and informs the Communication Manager of an ellipsis processing error for the Current-Phrase.

It is possible that one or more elements of a source phrase selected by the methods above will be improperly transferred to an ellipted elements. The improperly transferred elements are of two types. One type is an improper modifier transfer. An improper modifier transfer is detected in subsequent state representation processing because the improper modifier sets a state value or adverbial semantic role value which contradicts the corresponding value in the modifiee. The transferred value contradicts the modifiee's value which has previously been set or is set by a non-ellipited modifier in the elliptical phrase. An ellipted improper modifier is rejected when detected in subsequent state representation processing without further influencing the state representation processing. The other possible improper modifier transfer results in a clause interpretation of the improper modifier. Certain morphologically formed words imply clause relations. Transferred modifiers which imply a clause relation are rejected because they would result in a duplicated clause or a clause with one or more incorrect sentence roles. The effect of the rejection of such a transferred modifier is to eliminate duplication of a clause already processed for state representation.

Response Form Ellipsis Processing

The response form type of ellipsis occurs when elements are ellipted in a clause which is a response or comment to a previous clause in a dialogue. Parsing Step 16 detects response form ellipsis for conversations. Parsing Step 16 allows incoming text which would not normally be accepted except when there is response ellipsis. The Syntax Phrase Trees 30 are utilized because the response text does conform to specific text formats including: a single phrase or a list of coordinated phrases, or a clause with ellipsis. Also, normal text can occur during a dialogue.

Response form ellipsis is processed whenever the Current-Sentence contains response form ellipsis. Response form ellipsis processing is performed before any other type of ellipsis processing in the Current-Sentence. If the previous sentence is a question, the question syntax has been replaced with a declarative syntax. For example, "Where is the car?" is in a question syntax and "The car is where." is in a declarative syntax. The declarative syntax is a proper source for ellipted elements for Step 26. A clause which is in a question syntax has a representation in both the question syntax and the corresponding declarative syntax in Syntax Clause Trees 30. There are pointers between the question syntax and the declarative syntax. The corresponding declarative syntax of a question which is a previous sentence in an input dialogue receives nearly normal processing prior to usage as a source for response form ellipsis. This nearly normal processing of the declarative syntax is also suitable for a question directed as input for processing. The nearly normal processing of such a declarative syntax is the same as the normal processing except that any interrogative pronoun is handled specially. In the case of a question directed as input for processing, any interrogative pronoun in the declarative form of the question is treated as a normal pronoun to be looked up, i.e., the state representation processing for a question sentence is the same as a declarative sentence. However, once the declarative sentence form is processed, processing as described below provides a response. In the case of a question in a dialogue in a text, an interrogative pronoun is treated as a cataphoric pronoun, i.e., a pronoun whose referent will follow the Current-Sentence. A sentence with a cataphoric pronoun is not processed for state representation access until the next sentence is processed for determining the status of the interrogative pronoun referent. In the case of a dialogue, the response would normally contain the interrogative pronoun referent or a response indicating that the referent is not to be provided. If the referent is provided, the declarative form of the question is processed with the interrogative pronoun referent instantiated. If the referent is not provided, the referent is marked as unknown and the previous sentence is processed for a specific unknown type of referent. The declarative form of a question is a suitable source for response form ellipsis because a response to a question is a declarative sentence that repeats the declarative form of the question usually with ellipsis unless the response indicates that the question is not to be answered. Note that the normal processing includes replacing first and second person personal pronouns with their referents. Thus the processed declarative form of a question used as a source for ellipsis replacement will not cause erroneous pronoun referents for first and second person personal pronouns as would otherwise occur in a dialogue containing questions and responses by different respective speakers. The declarative form of a question as a response to the question requires an exchange of first and second persons unless referents are used in place of such pronouns.

Response form ellipsis processing begins by determining the form of the response and the type of preceding sentence. The preceding sentence selects different processing for the response form ellipsis depending upon the type of preceding sentence, i.e., declarative, interrogative, imperative or exclamatory. There are three types of questions labeled by the type of expected response: yes/no questions, interrogative pronoun referent questions (wh-questions), and alternative questions. One variation of a yes/no question is a tag question which has a declarative sentence followed by an ellipted question clause such as: "John is ready, isn't he?". An alternative question has alternatives which are typically listed in a coordinated structure at the end of the alternative question with a form such as: "Do you want A, B, or C?". The type of sentence and question are stored in the grammar information associated with the clause in Syntax Clause Trees 30. Responses such as "yes", "no", or another word or phrase indicating the affirmative or negative are assigned an adverbial sentence role In Syntax Phrase Trees 30 when response ellipsis is detected. Such responses have a modal adverbial function.

Figure 13A:
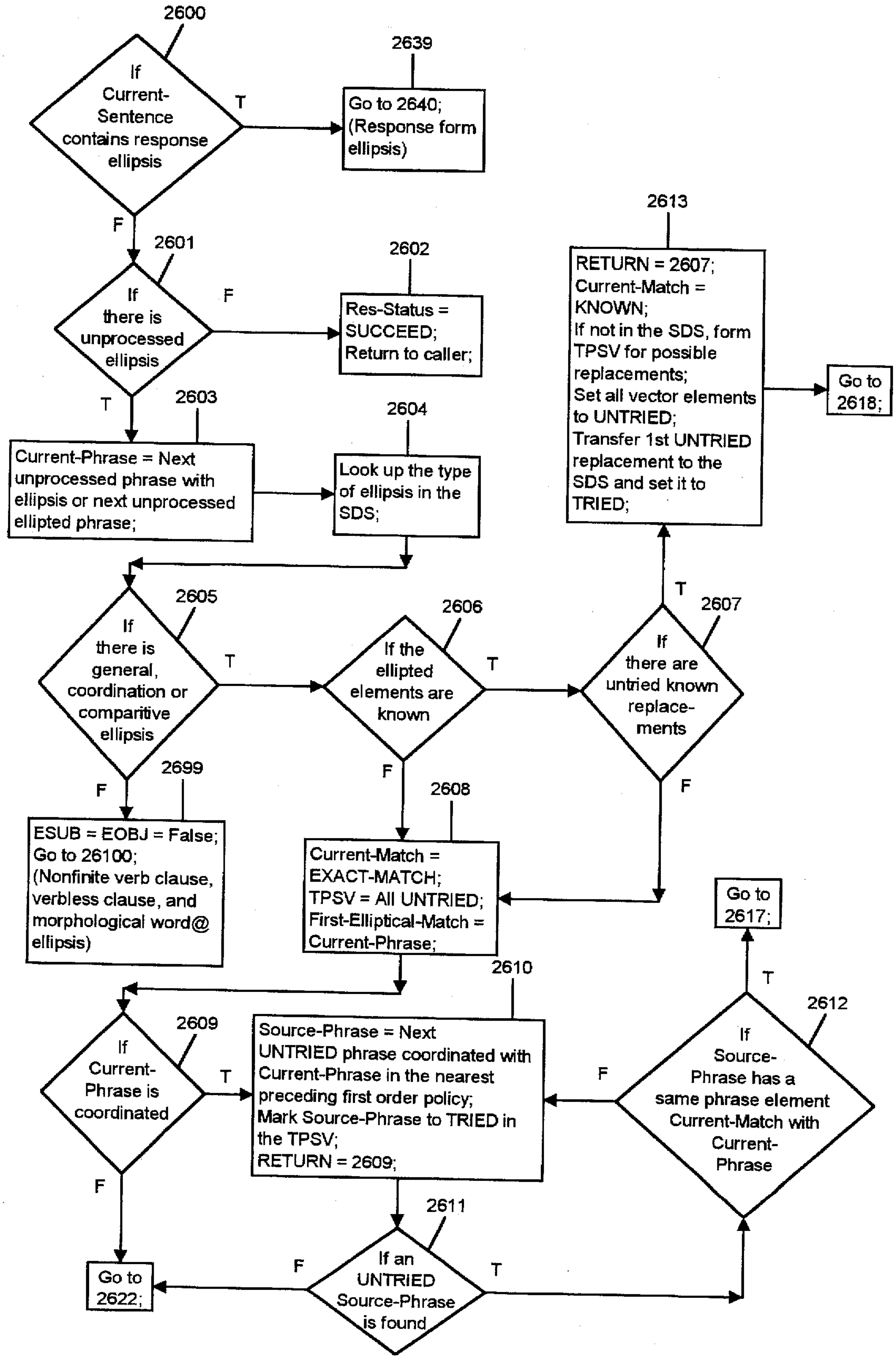
FIGS. 13*a*–13*c* is a flow chart for the general, coordination, and comparison ellipsis replacement method.
Figure 13B:
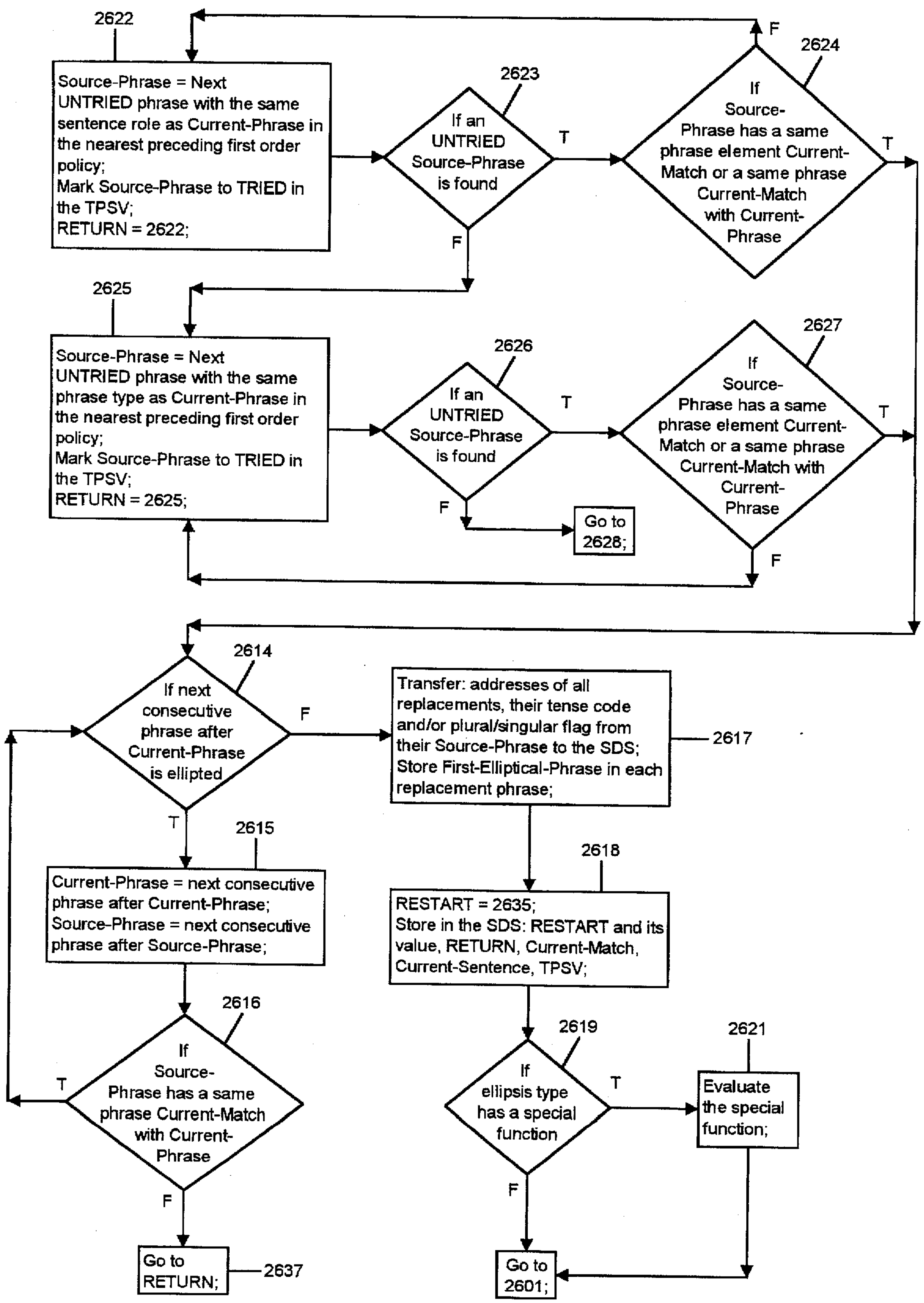
Figure 13C:
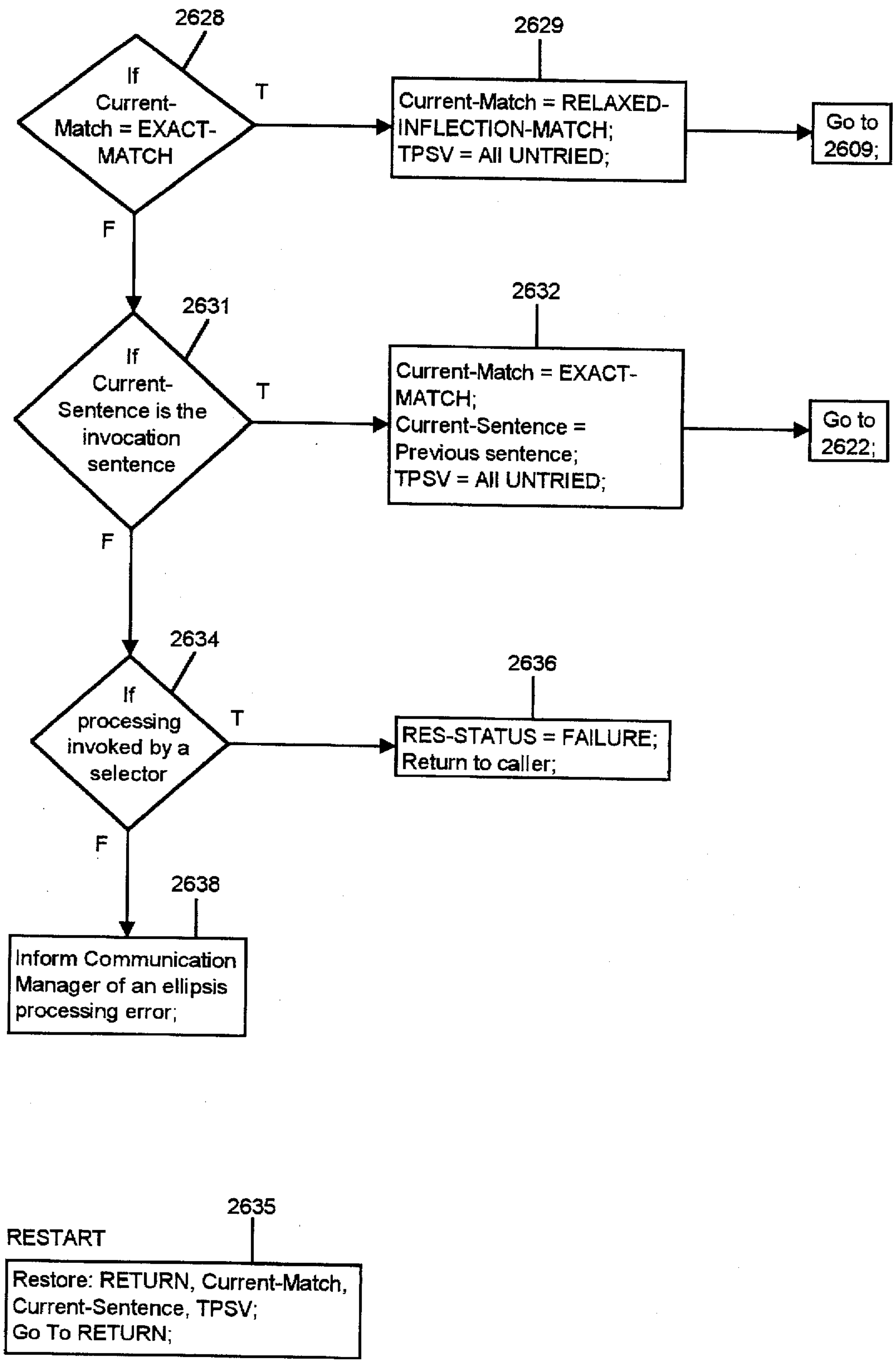
Figure 14A:
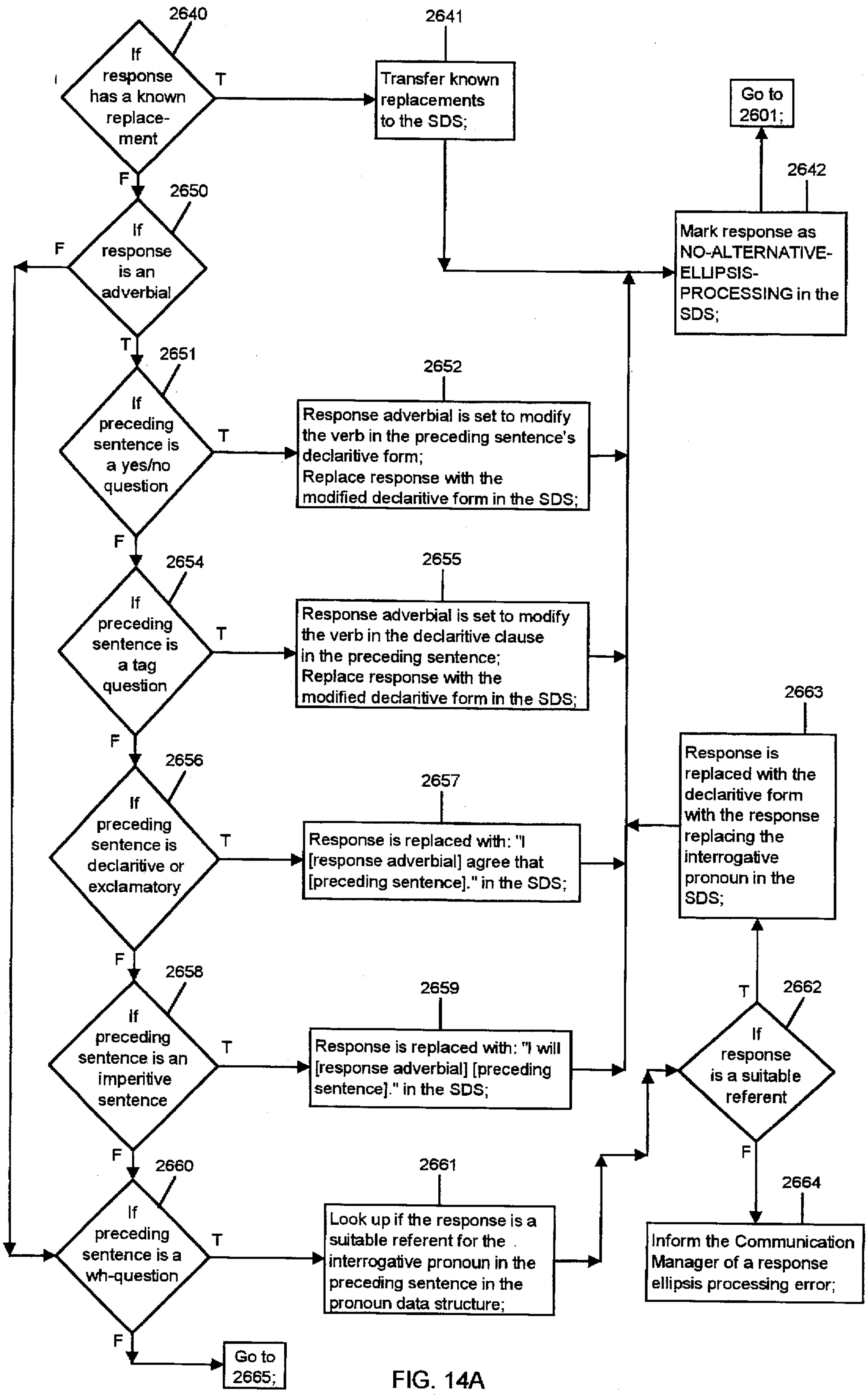
FIGS. 14*a* and 14*b* is a flow chart for the response form ellipsis replacement method.
Figure 14B:
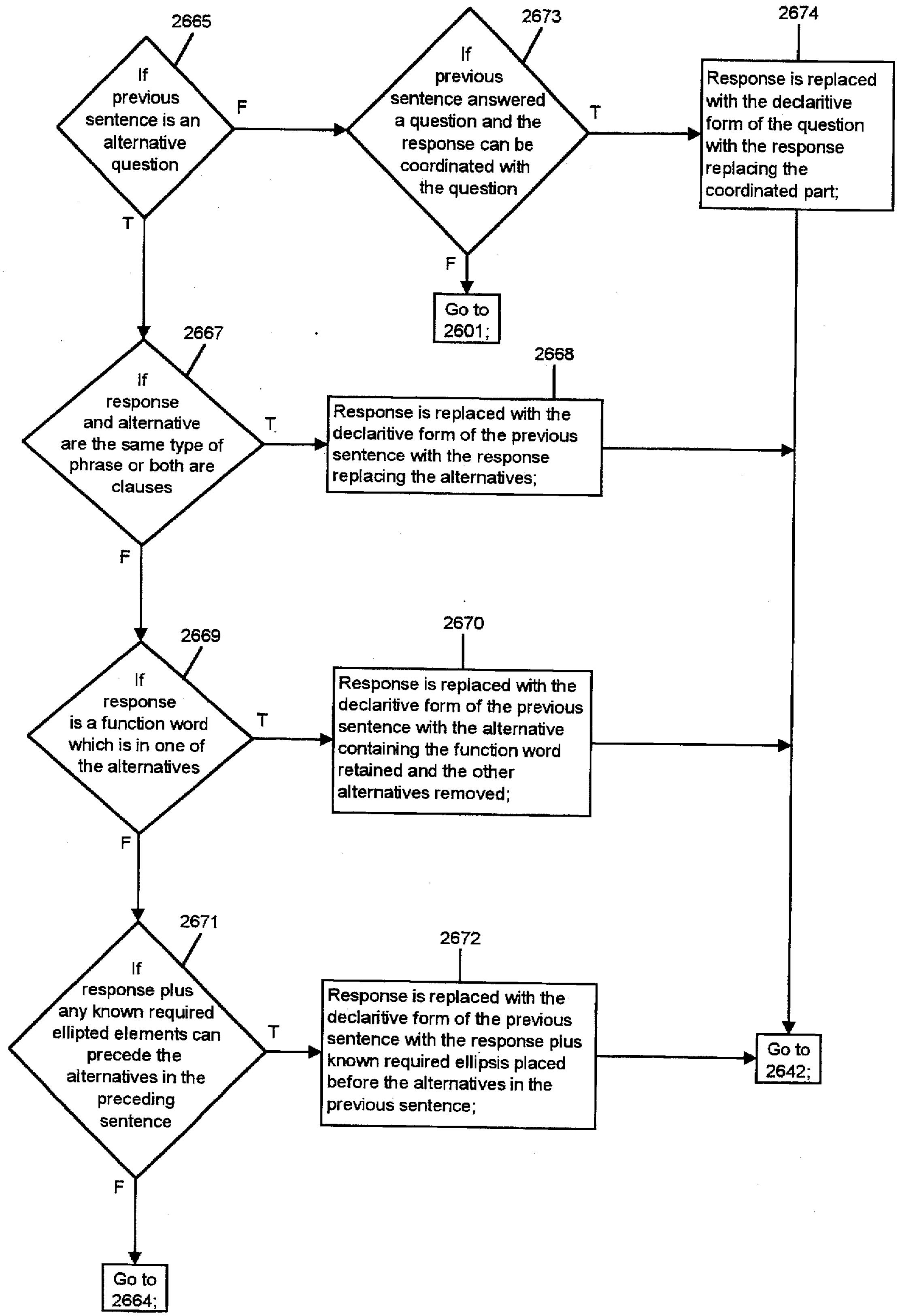

Response form ellipsis processing begins at 2640 and is depicted in FIGS. 14*a* and 14*b*. 2640 is true if the response has known replacements for the response ellipted elements. If 2640 is true, then 2641 transfers the replacements to the Current-Sentence's SDS. The Current-Sentence is the response. After 2641, in 2642, the first phrase of the response's SDS is marked with NO-ALTERNATIVE-ELLIPTICAL-PROCESSING. This mark is used to indicate that the ellipted elements have no other alternative replacement. 2642 completes the response elliptical processing and processing continues for other ellipsis at 2601 of FIG. 13*a*. If 2640 is false, 2650 is next and is true if the response is an adverbial (including modal adverbials). If 2650 is true, 2651 is next. 2651 is true if the preceding sentence is a yes/no question. If 2651 is true, 2652 replaces the response with the declarative form of the preceding sentence, and the response adverbial is set to modify the verb in the declarative form. The response's replacement is transferred into the response's SDS. After 2652, 2642 is next as described above. If 2651 is false, 2654 is next. 2654 is true if the preceding sentence is a tag question. If 2654 is true, 2655 replaces the response with the declarative clause in the tag question, and the response adverbial is set to modify the verb in this declarative clause. The response's replacement is transferred into its SDS. After 2655, 2642 is next as described above. If 2654 is false, 2656 is next and is true if the preceding sentence is a declarative or exclamatory sentence. If 2656 is true, 2657 replaces the response with a sentence formed with following template: "I (response adverbial) agree that (preceding sentence)." The response adverbial is actually set to modify "agree". The "(response adverbial)" in the template may not produce a grammatically correct sentence with respect to the actual instance of the "(response adverbial)", but there is a synonym of the "(response adverbial)" that is grammatically correct. However, the grammatical correctness does not effect the processing of the sentence because the adverbial function of the "(adverbial response)" is the same for a grammatically incorrect "(adverbial response)" as for a grammatically correct synonym. The response's replacement is transferred into its SDS. After 2657, 2642 is next as above. If 2656 is false, 2658 is next and is true if the preceding sentence is an imperative sentence. If 2658 is true, 2659 replaces the response with the sentence formed with the following template: "I will (response adverbial) (preceding imperative sentence)." The description of the grammatical correctness of the "(adverbial response)" also applies to the template of 2659. The response's replacement is transferred into its Sentence Data Structure. After 2659, 2642 is next as above. The preceding two templates are realized by assigning the referent of "I" as the person that gave the response. The replacing of the response with the instantiated template is accomplished by transferring the known addresses of the other elements used to form the sentences into the response's SDS. The known addresses are: already present in the template (e.g., "agree that" from 2657), in the Current-Sentence's SDS and have been looked up by 18 (e.g., the response adverbial), or in the previous sentence's SDS and have also been looked up by 18.

If the response is not an adverbial at 2650 or if the preceding sentence is not an imperative sentence at 2658, 2650 or 2558 is false, and 2660 is next. 2660 is true if the preceding sentence is an interrogative pronoun referent question, i.e., a wh-question. If 2660 is true, then at 2661, the Pronoun Data Structure of FIG. 6*a* is accessed to determine if the response is a type which can be a referent of the interrogative pronoun (wh-question). The response can be a phrase or a clause. After 2661, 2662 is true if the response is a suitable referent for the interrogative pronoun at 2661. If the 2662 is true, then at 2663, the declarative form of the preceding sentence with the response as the referent of the interrogative pronoun replaces the response. The response's replacement is transferred into the response's SDS. After 2663, 2642 is next as above. If 2662 is false, then at 2664, the Communication Manager is informed of a response form ellipsis processing error. If 2660 is false, then 2665 is next and is true if the preceding sentence is an alternative question. If 2665 is true, then 2667 is next and is true if the response and alternatives are the same type of phrase with respect to the part of speech of the phrase head, or if the response and alternatives are both clauses. If 2667 is true, then next at 2668, the response is replaced with the declarative form of the previous sentence and the alternatives in this sentence are replaced with the response. The response's replacement is transferred into the response's SDS. After 2668, 2642 is next as above. If 2667 is false, then 2669 is next and is true if the response is a function word which occurs in one of the alternatives in the preceding sentence. If 2669 is true, then next at 2670, the response is replaced by the declarative form of the previous sentence with the alternative containing the response function word retained and the other alternative(s) removed. The response's replacement is transferred into the response's SDS. After 2670, 2642 is next as above. If 2669 is false, then 2671 is next and is true if the response plus any possible known, ellipted elements can precede the alternatives in the preceding sentence. The response plus any known, ellipted elements are determined to be able to precede the alternatives by checking if the response plus known, ellipted elements are contained as optional elements in the alternative phrases' data structure in Syntax Phrase Trees 30, or they form a phrase in Syntax Phrase Trees 30 which can precede the alternatives in Syntax Clause Trees 30. For example, the following words could be a response meeting the condition of 2671: "None", "All", "Both", or "The first" in the alternative question: "Do you want A, B, or C?" Such a response, e.g., "None", could be placed in the declarative form of this alternative question with "of", a known, ellipted element, added as in "You want none of A, B, or C." If 2671 is true, then next at 2672, the response is replaced with the declarative form of the preceding sentence with the response and any known, ellipted elements placed before the alternatives in the preceding sentence. The response's replacement is transferred into its SDS. If 2671 is false, response form ellipsis processing has failed and 2664 is next as above.

If at 2665 the preceding sentence was not an alternative question, 2673 is next, and is true if the preceding sentence answered a question, and if the response can be coordinated with the question that was answered. The response which is a phrase is determined to be capable of being coordinated with the question by checking if the phrase head is the same part of speech type as the last phrase head of the declarative form of the question. The part of speech type of a phrase head is determined by looking at the grammar information of the phrase's representation in Syntax Phrase Trees 30. Also, a phrase response which is an adverbial can be coordinated with an adverbial subordinate clause. The response which is a clause is determined to be capable of being coordinated with the question if the question contains the same type of clause as the response. The type of clause is stored with the grammar information of the clause's representation in Syntax Clause Trees 30. The type of clause is either independent or subordinate. Also, an adverbial subordinate clause response can be coordinated with a phrase which is an adverbial. The response which is a part of a clause, i.e., a clause with ellipted phrases, is determined to be capable of being coordinated with the question if each phrase of the response can meet a phrase set requirement of the corresponding sentence role of the declarative form of the question in Syntax Clause Trees 30. If 2673 is true, then 2674 replaces the response with the declarative form of the question with the response replacing the coordinated part of the question. After 2674, 2642 is processed next as above. If 2673 is false, then the response does not have known response form ellipsis, and processing of the response is continued for other ellipsis at 2601 in FIG. 13*a*.

The above description of response form ellipsis is appropriate for a general purpose application. A specific application includes other application specific forms of response ellipsis. Additional forms of response ellipsis are processed with a generalization of the above described process. This process generalizes to a condition which is satisfied for a type of response form ellipsis. A satisfied condition is followed by a process which replaces the ellipted elements for the detected type of response form ellipsis. This process is followed by a return to processes which replace any other types of ellipsis in the response starting at 2601.

Nonfinite Verb Clause, Verbless Clause, and Morphologically Formed Word Clause Ellipsis Nonfinite verb clause, verbless clause, and morphologically formed word clause ellipsis is processed by using techniques related to realizing clause relations. A clause relation is a clause which represents the meaning of a nonfinite verb clauses, verbless clauses, verb based noun, a verb based adjective, a verb based adverb, or certain other morphologically formed words. A morphologically formed word clause is the clause relation implied by the morphologically formed word. In the remainder, the phrase, "morphological words@", is an abbreviation for "morphologically formed words implying a clause relation". A nonfinite verb clause is an optionally ellipted subject plus verbal plus an optionally ellipted object. A verbal is a participle or infinitive verb form. A non-ellipted subject of a nonfinite verb clause is often expressed in a nonstandard form including: objective case pronouns, prepositional phrases, and possessive case nouns. The subject is ellipted if the subject is not expressed in the nonstandard or standard forms. The default tense of the verbals is usually determined by the verb in the main clause containing the nonfinite verb clause. A verbless clause has an ellipted "to be" verb which relates a subject complement or an adverbial to a subject. The subject can also be ellipted. The ellipted verb is the present, past or future tense of "to be". The verbless clause is a subordinate clause in the sentence containing it. The default tense of the ellipted "to be" verb is determined by the tense of the verb in the main clause. The ellipted elements in a nonfinite verb clause or verbless clause are replaced by the ellipsis processes of this section. The verb in a clause relation of a morphologically formed word is the verb base of the word, or the verb is implied by the affix(es). The ellipted elements in a clause relation of a morphological word@ can be replaced: by the morphological functions selected in Morphological Processing Step 24; by the state representation associated with a morphological word@; by a structure of the base word of the morphological word@; and/or by the ellipsis processes of this section. The default tense for the verb in a morphological word@'s clause relation is also determined by the tense of the verb in the main clause.

The sentence role functions of nonfinite verb clauses include: adverbial clauses, noun phrases, premodification of nouns, and postmodification of nouns. When there is ambiguity between the sentence role of a participle premodifying a noun and an alternate interpretation for the sentence role of the noun as a noun phrase object of a nonfinite verb clause, Syntax Clause Trees 30 use the former for classification purposes. However, when an infinitive precedes a noun, the latter interpretation is selected. Also, when there is ambiguity between the sentence role of a nonfinite verb clause postmodifying a noun and the sentence role of a nonfinite verb premodifying a noun following the nonfinite verb, Syntax Clause Trees 30 uses the former for classification purposes. The noun following the nonfinite verb is an object or adverbial in the nonfinite verb clause of the former situation. The sentence role functions of verbless clauses include: adverbial clauses and postmodification of nouns. Sentence roles of morphological words@ include: nouns, premodification of nouns, postmodification of nouns, and adverbials. The elliptical processing for nonfinite verb clauses, verbless clauses, and morphological words@ are divided into four groups: nonfinite verbs and morphological words@ premodifying nouns; nonfinite verbs and morphological words@ postmodifying nouns; verbless clauses; nonfinite verb clauses having sentence roles as: noun phrases, and adverbial clauses, and morphological words@ having sentence roles as: nouns and adverbials. The elliptical processing group is selected by the sentence role of the nonfinite verb clause, verbless clause, or morphological word@. The sentence role is recognized in Syntax Clause Trees 30 during Parsing Step 16. The initial process used to select the ellipted elements of the clause relation of a morphological word@ is implied by the contents of the sub-entry associated with the morphological word@ stored in the base word's Dictionary 20 common table or anomalous partition as described above for Morphological Processing Step 24. Morphological words@ can have the ellipted elements of their clause relations selected in one or more of the following Dictionary 20 designated initial processes: evaluating the morphological function(s) selected during their morphological processing in Step 24, accessing the individual state representation data structure associated with the base word plus affix(es), accessing the data structure of the base word, or the ellipsis processes of this section. If one of the first three processes do not select all of the ellipted elements, the remaining ellipted elements are selected with the elliptical processes of this section.

The ellipsis which can occur within a nonfinite verb clause is an ellipted subject and/or an ellipted object. The ellipsis which can occur within a verbless clause requiring elliptical processing is an ellipted subject. The ellipted verb in a verbless clause is assigned as a simple tense of "to be". The ellipsis which can occur within the clause relation implied by a morphological word@ is an ellipted subject and/or an ellipted object. The elliptic processing for nonfinite verb clauses, for a verbless clause, and for a morphological word@ is to select a candidate from a specific source list to replace the ellipted element. A specific source in a list can have a condition which must be true for the specific source to be considered as a replacement. Also, some specific sources in the source list can have multiple candidates for sources in the context. Such specific sources with multiple candidates select candidates in the nearest preceding first order. The specific source elements are listed in the order of: sources in the sentence containing the nonfinite verb clause, verbless clause, or morphological word@ first; sources in the preceding context; default; general reference. This order selects sources which are most related to the most recent part of the conversation first. Sources having the same relation to the conversation are listed in the order of conditioned sources first and most likely source first for the conditioned and non-conditioned sources. This order puts conditioned sources first because if they meet the condition, they are likely to be the intended source. FIGS. 15*a* and 15*b* list the subject and object sources for a general purpose implementation for this type of ellipsis. Additional sources can be a added as needed for a specific application. An instance of the subject and object sources listed in FIGS. 15*a* and 15*b* is obtained by a function associated with the source. Most associated functions look up the source in the Sentence Data Structure. The functions which obtain the source in different methods are described in the next paragraph.

The number 1 subject source function associated with the "premodified noun's state representation data structure is searched for the nonfinite verb or the morphological word@ in a clause relation of the noun" subject source is implemented with Selector 60. Selector 60 determines if a word sense number associated with the premodifying nonfinite verb or morphological word@ implies a clause relation, an i.e., an F-relation, of the modified concrete noun word sense number as in "whipping cream". A word sense number of a concrete noun can have a set of associated A-relations and T-relations. These relations are subdivided into partitions. One partition contains function A-relations, i.e., F-relations, implied by nonfinite verb or morphological word@ modification which have the effect of selecting a clause relation of the modified concrete noun. Nonfinite verb or morphological word@ modifiers are contained in F-relations. The F-relations in the modified concrete noun's selection partition of A-relations is searched for the F-relation containing a word sense number of the base verb of the nonfinite verb or a word sense number of the verb in the morphological word@ clause relation. The F-relation may contain a tense code requirement for the verb. The tense code of the nonfinite verb or the verb of the morphological word@ clause relation must match the code. The tense code requirement is typically used for discriminating between, for example, "whipping cream" or "whipped cream". A concrete noun's F-relation's clause is suitable for determining the subject source if there is an untried F-relation containing a word sense number of the nonfinite verb or of the verb in the clause relation of the morphological word@ and any tense code requirement is matched. The number 1 source function places a symbol at the ellipted clause's subject position. When the ellipted clause is processed, Dictionary Look Up Step 18 interprets this symbol by calling Selector 60 to determine if the nonfinite verb clause or morphological word@ is an F-relation selecting modifier of the premodified concrete noun. Selector 60 performs normal processing to search for a word sense number of the concrete noun which has an F-relation with the a word sense number of the nonfinite verb or verb of the morphological word@. This process of 60 will be described below. The search is across the word sense numbers of the concrete noun and word sense numbers of the verb until an F-relation is found. If an F-relation is found, 60 looks up a pointer to the clause and stores it in the SDS. An F-relation of a modified concrete noun has an associated clause relation pointer to a defining clause for the purpose of interpreting the sentence. The clause relation pointer is in Memory 90. This clause relation for nonfinite verbs or morphological words@ premodifying nouns implies state representation information needed in the conversation. For example, the general defining clause representation for "whipping boy" has this textual representation: "whipping boy receives blame instead of the deserving person". The clause of the found F-relation is checked for consistency during normal state representation processing. If the found F-relation is not consistent, 60 searches for another F-relation. If a consistent F-relation is found, the ellipsis processing is completed. If an F-relation can not be found, 60 invokes Ellipsis Processing Step 24 if the concrete noun is in an nonfinite verb or morphological word@ ellipted clause. If 24 is reinvoked, the next subject source is selected and ellipsis processing continues.

The number 3 and 5 subject source functions for "owner of the modified state abstract noun" for premodified and postmodified state abstract nouns respectively is first looked up in the context associated with the state abstract noun. However, it is possible that the state abstract noun is not currently in the context. In this case, the associated function of this source places a function symbol in the subject position of the clause in the Sentence Data Structure of the nonfinite verb clause, verbless clause, or morphological word@ modifying the state abstract noun. The function symbol is evaluated by Step 18 when word sense number selection of the nouns of the nonfinite verb clause, verbless clause, or morphological word@ is initiated by Step 18. At this point, the owner of the state abstract noun has been established, and the function symbol has an associated function which looks up the owner of the state abstract noun.

The number 11 subject source and the number 6 object source of "another noun in the main clause" has an associated function which selects nouns and pronouns from the main clause in the nearest preceding first order. Here, TRIED means that the noun has been used as a source for the same ellipted element of the same nonfinite verb clause, verbless clause, or morphological word@. A vector of TRIED nouns and pronouns is maintained so that the next UNTRIED noun or pronoun can be selected. If this source is used more than once for a the same ellipted element in the same nonfinite verb clause, verbless clause, or morphological word@ with ellipsis, the next UNTRIED noun or pronoun in the nearest preceding first order is selected for the source. A noun selected as a source by this function can have either the common case or the possessive case. A pronoun selected as a source by this function can have: a subjective case, objective case, or possessive case. For the possessive case, the noun or pronoun referent corresponding to the possessor is used for the source. The pronoun's referent is used as the source regardless of the pronoun's case.

For nonfinite verb clauses and morphological words@, the number 12 subject source and the number 7 object source function associated with "the context" searches for the next most recent UNTRIED preceding clause which has the same non-ellipted sentence roles for a nonfinite verb clause or for a morphological word@ clause relation. The verb non-ellipted elements of the allowed preceding clause has the same tense as the verb in the main clause containing the nonfinite verb clause with ellipsis or containing the morphological word@. The match for non-ellipted nouns requires the same noun in the found clause as in the non-ellipted element of the nonfinite clause or morphological word@. But the number of the matched nouns does not have to be the same. The sentence role of the element in the found clause must be the same sentence role of the non-ellipted element in the nonfinite verb clause or morphological word@. If a match is found, the subject or the object of the found clause is the source for the ellipted subject or object respectively. If the "context" source is used again for the same ellipted element of the same nonfinite verb clause or morphological word@, the next most recent UNTRIED preceding clause with a non-ellipted sentence role match as described in this paragraph is the source. The searches for matches are performed in Context Memory 120.

For verbless clauses, the number 12 subject source function associated with "the context" searches for the most recently referenced word which is related to the subject complement or prepositional phrase that modifies the ellipted subject in the verbless clause. The searched for word to replace the ellipted subject must have been modified previously in the context by the adjective subject complement in the verbless clause or by the prepositional phrase in the verbless clause, or the searched for word was previously the subject in a previously stated clause with the noun subject complement in the verbless clause as the subject complement in the previously stated clause. The searches are also performed in Memory 120. If the search is successful, the found word is the source for the ellipted subject. If the "context" source is used again for the same verbless clause, the next most recently referenced word which is related as above to the subject complement or prepositional phrase modifying the ellipted subject in the verbless clause is used as the subject source.

The number 8 object source of "default" for nonfinite verb clauses and morphological words@ has an associated function which selects the most common object given the subject. The most common object is stored in a verb's Clause State Representation Memory 100 data structure. The number 13 subject source and the number 9 object source associated with "general reference" for nonfinite verb clauses and morphological words@ substitutes an indefinite pronoun for the ellipted subject or object. If only the subject or the object is ellipted in a nonfinite clause, the referent type of the indefinite pronoun is the same type as the most common subject or object associated with the clause selected with the non-ellipted subject or object in the Memory 100 data structure of the base verb of the nonfinite verb or of the verb in the clause relation of the morphological word@. If both the subject and object are ellipted, the referent types of the respective indefinite pronouns are the same types as the subject and object in the most common clause in the Memory 100 data structure of the base verb of the nonfinite verb or of the verb in the clause relation of the morphological word@. The number 13 subject source associated with "general reference" for verbless clauses selects the type of indefinite pronoun associated with the modifier of the ellipted subject: the subject complement or the complement of the prepositional phrase. The subject complement can either be a noun or an adjective. The type of indefinite pronoun for a noun subject complement is the most common type which is characterized by the subject complement. This type information is stored with a noun in Memory 90. The type of indefinite pronoun for an adjective subject complement is the most common owner of the adjective which is stored in Memory 80. The type of indefinite pronoun for the complement of a prepositional phrase is the most common modifiee type of the prepositional phrase which is also stored in the Memory 90 location of the complement.

The process for selecting a replacement for a clause with only an ellipted subject or only an ellipted object is to select the subset of the source list for the conditions met by the subject or the object. The subset of the subject or object list is selected depending upon the sentence role of the clause with ellipsis. Then the first suitable source from the chosen list is selected as a replacement for the ellipted element. A source is suitable if its source element meets its associated condition(s) or the source element has no associated conditions. The position in the source list for the replacement is marked including the candidate for multiple candidate source elements. The verbless clause with a selected subject has a "to be" verb added as the verb for the verbless clause. The nonfinite verb clause or morphological word@ with the selection(s) or the verbless clause with a selected subject and verb is then evaluated for consistency with the current conversation and previously stored experience in subsequent state representation processing. If the clause is consistent, the ellipsis processing is completed. If the clause is not consistent, the next suitable source is selected and the process repeats until a consistent clause is generated or all suitable sources have failed to form a consistent clause. If a consistent clause was not formed, the Communication Manager is informed of a nonfinite verb clause, verbless clause, or morphological word@ ellipsis processing error.

The process for selecting replacements for a nonfinite verb clause or morphological word@ with both an ellipted subject and an ellipted object is to select combinations of subject replacements and object replacements from the selected respective source lists until a consistent clause is formed with respect to the context and previously stored knowledge and experience in subsequent state representation processing. There are many ways to generate the combinations of subject replacement and object replacement. The method detailed here is to try combinations of a single subject replacement with possible object replacements until a consistent clause is found. If a consistent clause is not found for the combination of the current subject source replacement with all object replacements, the next subject source is used to generate a next subject replacement. The next subject replacement is then used with object replacements and this process repeats until a consistent clause is selected or all combinations have been unsuccessful.

The process for selecting an ellipted subject and/or an ellipted object begins at 26100 and is depicted in FIGS. **16*a*–16*c*. Prior to calling Step 26, Step 18 creates a clause structure in the SDS to replace the stated elements implying the ellipted clause. However, this ellipted clause in the SDS is not used when the number 1 subject source is valid for the premodified noun. For these subject sources, the clause implied by the modification of a concrete noun by the nonfinite verb or morphological word@ already has a state representation and does not use the SDS. This implied clause is set to modify the premodified noun for Purpose Identifier 140 processing. 26100 is started at 2699 which sets ESUB and EOBJ to false. These variables are true if the subject or object is respectively ellipted. 26100 is true if the ellipted clause is a premodifying nonfinite verb clause or morphological words@. If 26100 is true, 26101 sets the Subject-Source-List to subject sources: 1 thru 3, 7 thru 13. In the following all subject and object source numbers refer to the subject and object source numbers respectively listed in FIGS. 15***a* and 15*b*. 26101 sets the Object-Source-List to object sources: 1, 4 thru 9. If 26100 is false, then 26102 is next and is true if the ellipted clause is a postmodifying nonfinite verb clause or morphological word@. If 26102 is true, then 26103 sets the Subject-Source-List to subject sources: 4 thru 13. 26103 also sets the Object-Source-List to object sources: 2 thru 9. If 26102 is false, then 26103 is next and is true if the ellipted clause is a verbless clause. If 26104 is true, then 26105 sets the Subject Source List to subject sources: 4 thru 5, 7 thru 13. If 26104 is false then 26106 sets the Subject-Source-List to subject sources: 7 thru 13. 26106 also sets the Object-Source-List to object sources: 3 thru 9. After 26101, 26103, 26105, or 26106, 26107 is next.

26107 is true if the subject is ellipted. For nonfinite verb phrases and verbless clauses, the subject is determined to be ellipted by the clause selected in Syntax Clause Trees 30 during Parsing Step 16. For morphological words@, the subject is determined to be ellipted by one of the following processes: evaluating the morphological function(s) selected during their morphological processing in Step 24, accessing the individual state representation data structure associated with the base word plus affix(es), or accessing the data structure of the base word. These processes are designated by the morphological word@'s Dictionary 20 common table or anomalous partition. These processes indicate the ellipted elements for the morphological word@. If the subject is ellipted at 26107, 26108 is next and creates the Tried Subject Vector (TSV) which contains a flag for each noun or pronoun in the sentence. Each flag is set to UNTRIED. When a noun or pronoun in the TSV is considered as a subject source, its flag is set to TRIED. Nouns in the TSV are either in the common case or possessive case. The possessor of the possessive case is used as the source. The pronouns can be in the common, subjective, objective, or possessive case. The referent of the pronoun is the source. 26108 sets the variable, ESUB, to be true which indicates there is an ellipted subject. 26108 sets the variable, SUBSHIFT, to false which indicates no special processing has been performed. 26108 also sets the SUB variable to have the value of the first subject source number in the Subject-Source-List. After 26108 or if 26107 is false, 26109 is next and is true if the object is ellipted for a nonfinite verb clause or morphological word@. The object is determined to be ellipted with the same methods used for the subject in 26107. If 26109 is true, 26110 creates the Tried Object Vector (TOV) which almost has the same form as the TSV. The only difference in form between the TOV and the TSV is that the TOV flag for each noun or pronoun in the sentence has an additional possible value. The TSV flag has a value of TRIED or UNTRIED. The TOV flag a value of TRIED, UNTRIED, or R. TRIED and UNTRIED have essentially the same meaning in the TSV and the TOV. The R value means that the corresponding noun or pronoun has been removed from consideration as an object source. The R value is used in 26137 to be described below. 26110 sets EOBJ to be true which indicates there is an ellipted object. 26110 also sets the OBJ variable to have the value of the first object source number in the Object-Source-List.

If 26109 is false or after 26110, 26111 is next. 26111 is true if ESUB is true and SUB equals "2", i.e., the second subject source. This implies that the ellipted subject is in a nonfinite clause or a morphological word@ premodifying a noun. If 26111 is true, then next at 26112, the data structure of the base verb of a nonfinite clause or the verb in the clause relation of the morphological word@ is accessed by Selector 70 to determine if the premodified word meets the subject requirements so it can be a subject replacement of the nonfinite verb clause or morphological word@. This verb data structure is in Memory 100. 26112 is true if the premodified noun can be a subject. If 26112 is true, 26114: sets ESUB to false; sets EOBJ to true; sets SUBSHIFT to true; sets the premodified noun to be the subject in the SDS of the clause with ellipsis; clears the object in the SDS of the clause with ellipsis; and sets OBJ to 4. 26114 resets the state of the ellipsis processing to have the premodified noun to be the subject of the clause with ellipsis. This clause is reset to only have an ellipted object with ESUB set to false and EOBJ set to true. SUBSHIFT is set to true to indicate the resetting process has occurred.

If 26111 is false, or if 26112 is false, or after 26114, 26115 is next. 26115 is true if ESUB is true. If 26115 is true, 26116 is true if the condition from the SUB subject source number of the Subject-Source-List is true. If 26116 is true, next at 26117, the subject replacement is selected by the function associated with the SUB number in the Subject-Source-List. The selected element is set to TRIED in the TSV for noun or pronoun elements selected from the Current-Sentence at 26117. The selected element is placed in the ellipted clause's subject position in the Sentence Data Structure at 26117. If SUB equals 1 at 26117, 26117 sets EOBJ to false because subject source 1 implies a known clause(s) which implies that the ellipsis processing is completed. Setting EOBJ to false sets the ellipsis processing to be completed in subsequent steps described below. Finally, OBJ is set to Object-Source-List of the Object-Source-List at 26117. If 26116 was false, 26125 is next and is true if there is another UNTRIED subject source in the Subject-Source-List. If 26125 is true, then 26126 sets SUB to the next subject source number in the Subject-Source-List. After 26126, 26111 is next and proceeds as described above. If 26125 is false, then all subject sources have been tried unsuccessfully and 26127 is next. If the ellipsis process was invoked by Selector 50, 60, or 70, 26127 sets RES-STATUS to FAILURE and returns processing to the caller. Otherwise, 26127 informs the Communication Manager of the type of ellipted clause processing error and processing continues there. The Communication Manager can select an alternate sentence role interpretation for some combinations of nonfinite ellipted clauses and morphological words@ modifying nouns. For example, there can be ambiguity between the sentence role interpretation of a nonfinite verb clause postmodifying a noun and the alternate sentence role interpretation of a nonfinite verb premodifying a noun following the nonfinite verb. The alternate interpretations have been determined during Parsing Step 16. If an alternate sentence role interpretation is selected by the Communication Manager, this ellipsis process is invoked for the alternate interpretation.

If ESUB is false at 26115 or after 26117, 26118 is next. 26118 is true if EOBJ is true. If 26118 is true, then 26119 is next and is true if the condition from the OBJ object source number is true. If the OBJ object source condition was false at 26119, 26120 is next and is true if there is another untried object source in the Object-Source-List. If 26120 is true, then 26121 removes OBJ from the Object-Source-List so that the OBJ object source is not considered again. 26121 also sets OBJ to the next object source number in the Object-Source-List. Then 26119 is next and proceeds as described above. If 26120 is false, then all object sources have been tried unsuccessfully and 26122 is next. 26122 is true if ESUB is true. If 26122 is true, all object sources with the current subject source have been tried unsuccessfully with the current subject source. However, a different subject source may be successful. If 26122 is true, 26123 is next and is false if the Object-Source-List is not empty, and thus there are possible suitable object sources. If 26123 is false, then next at 26124, OBJ is set to the first position in the Object-Source-List. After 26123, 26125 is next and begins the selection of the next subject source as described above. If ESUB is false at 26122, only the object is ellipted and all object sources have failed. If the Object-Source-List is empty at 26123, 26123 is true, and all object sources failed to select an acceptable object. Thus, if 26122 is false or 26123 is true, this ellipsis process has failed and processing proceeds at 26127 as described above.

If 26119 is true, next at 26128, the next object replacement is selected by the function associated with the OBJ numbered function in the Object-Source-List. The selected element is set to TRIED in the TOV for noun or pronoun elements in the Current-Sentence at 26128. Finally, the selected element is placed in the ellipted clause's object position in the SDS at 26128. If 26118 was false or after 26128, 26129 is next. 26129 is reached after an ellipted subject and/or ellipted object have been selected. However, the selected elements may prove to be unacceptable in subsequent state representation processing. 26129 prepares for an unacceptable element(s) by storing the restarting point and the status of this nonfinite verb clause, verbless clause, or morphological word@ ellipsis process at the ellipted clause's subject position in the SDS. The restarting point and the status are sufficient to restart this ellipsis process. 26129 sets RESTART to 26130. 26129 sets the default verb tense and time point of the verb in the clause with ellipsis as will be described in the next paragraph. However, the default tense for clause relations selected by nonfinite verbs modifying a noun is stored in the premodified noun's state representation data structure for specific premodified nouns. 26129 stores the following in the SDS: RESTART and its value, ESUB, EOBJ, SUB, OBJ, TSV, TOV, SUBSHIFT, the Subject-Source-List, and the Object-Source-List. Finally at 26129, processing continues at 2601 in FIG. 13*a* to process any other ellipsis in the Current-Sentence. 26129 completes the nonfinite verb clause, verbless clause and morphological word@ ellipsis process for the ellipted clause unless subsequent state representation processing determines that the ellipted clause does not have suitable replacements. When this happens, this process is restarted with the information stored in the SDS. The restarting of this process is described below.

26129 also sets the default tense and the default time point of the verb in a nonfinite verb clause with a participle form of the nonfinite verb. The default tense for present and past participles in nonfinite verb clauses is the progressive tense. The default time point of this progressive tense is the same as the default time point of the tense of the verb in the main clause, i.e., a time point in the present, past or future. Certain participles are not technically associated with the progressive tense and instead indicate a state, property, or stance such as "living". The verbs forming such participles have no progressive tense in the usual sense or activity in progress. However, in terms of state representation and state representation processing, such a technical distinction does not matter because the state representation processing of a verb without a progressive tense sets the associated state, property or stance. In contrast, a verb with a progressive tense has an associated process which is "progressing" for the progressive tense, and the resulting states of the ongoing or completed process are set by the state representation processing of such a verb. A verb in a nonfinite clauses which has no progressive tense has the time points of its state, property or stance assigned to the same past, present, or future default time point that is set for the time point of the verb in the main clause. Participles in a nonfinite clause can be modified by an auxiliary verb ("having, being") which indicates a perfective tense. Such participles have a perfective-progressive tense with the past, present or future default time point of the verb in the main clause.

26129 also sets the default tense and the default time point of the verb in a nonfinite verb clause with an infinitive form of the nonfinite verb, a verbless clause or a morphological word@ clause. The default tense for an infinitive without a perfective or perfective-progressive tense in a nonfinite clause is the simple past, present, or future tense component of the tense of the verb in the main clause. In grammar books, infinitives do not have a tense associated with them except for infinitives with perfective or progressive-perfective tense. However, the state representation of the infinitive does have a time representation based upon when the process associated with an infinitive sets the result state associated with the infinitive. This time representation is in terms of a simple tense and a time point. The default tense of an infinitive without a progressive or progressive-perfective tense is set to be the simple component of the tense of the verb in the main clause because typically this is the correct tense for the time representation of the infinitive. The default tense of an infinitive with a progressive or progressive-perfective tense is the progressive or progressive-perfective tense. The default time point for infinitives in nonfinite verb clauses is the same time point as the verb in the main clause, e.g., past, present or future. Some verbs in the main clause with an infinitive nonfinite verb clause imply a hypothetical infinitive clause in the sense that the infinitive clause will occur in the future, e.g., "I hope to pass." Such infinitives are reassigned a future tense during state representation processing of the main clause. The default tense for the verb in the clause of a morphological word@ is the simple past, present, or future tense component of the tense of the verb in the main clause. The time point for such a verb's tense is the same time point as the verb in the main clause. The default tense for the ellipted "to be" verb in a verbless clause is a simple past, present, or future tense component of the tense of the verb in the main clause. The time point of the ellipted "to be" verb is the same time point as the main clause verb, e.g., present, past, or future.

In subsequent state representation processing, the nonfinite verb clause, verbless clause, or morphological word@ clause processed for ellipsis can be found to have unsuitable ellipsis replacements for one of two reasons. One reason is that the ellipted element(s) formed an acceptable clause, but did not have a purpose relation with the remainder of the conversation which was consistent with the conversation or with previously stored experience as determined by Purpose Identifier 140. Since the combination of elements caused the unacceptability, either the single ellipted element was unacceptable, or one or both of two ellipted elements was unacceptable. The other reason is that the subject replacement and/or object replacement were found to form an unacceptable clause at Selector 70. A replacement is unacceptable because the replacement failed to meet the requirements for its sentence role for any known word sense numbers of the verb in the clause. For example, an object replacement is unacceptable because it failed to meet the requirements of an object for each known word sense number of the verb.

It is possible that an assumed ellipted object is not ellipted because the verb does not require an object. Certain verbs do not require an object. Also, most past progressive verbs do not require an object. A nonfinite verb with a past participle is treated as a past progressive verb requiring an object in Syntax Clause Trees 30. The validity of the required object assumption is then determined in subsequent state representation processing at Selector 70. Also, under certain circumstances, the assumed object is actually an adverbial preposition with an ellipted preposition. An example of this circumstance is "hanging tree". An object is not required if a verb does not require an object, or if the object is actually the complement of a prepositional phrase with an ellipted preposition. Selector 70 checks if the object is actually an adverbial if the object does not meet the requirements for an object of any word sense number of the verb or if no object is needed. Such an occurrence of an ellipted object is processed as a special usage as described below for Selector 70. Selector 70 rejects an object which is not required, and Selector 70 does not require further ellipsis processing. If the object is not required, and if the clause with ellipsis is consistent during further state representation processing, the object is rejected without requiring further ellipsis processing.

If the nonfinite verb clause, verbless clause, or morphological word@ clause is determined to have unsuitable ellipsis replacements in subsequent state representation processing, Selector 70 for example reinvokes Ellipsis Processing Step 26 and sends an indication of the unsuitable phrase in the SDS. 70 first determines that the clause is an elliptical nonfinite clause, verbless clause or morphological word@ clause by checking the subject of the clause for containing a RESTART value of 26130. Selector 70 than indicates in the reinvocation descriptor which of the ellipted phrase replacements are unsuitable. 70 indicates that an ellipted subject and/or an ellipted object is unacceptable. 70 then sets the processing to continue at RESTART, 26130. The reinvocation descriptor contains an acceptable/unacceptable value for the subject and/or for the object. At 26130, the variables, ESUB, EOBJ, SUB, OBJ, TSV, TOV, the Subject-Source-List, and the Object-Source-List, are restored to the values previously stored in the SDS by 26129. After 26130, 26131 is next and is false if EOBJ is false. If 26131 is false, only the subject is ellipted, and sets processing continues at 26125 which begins the process of selecting the next subject source as described above. If 26131 is true, 26132 is next and is false if ESUB is false. If 26132 is false, only the object is ellipted, and 26138 is next. 26138 is false if SUBSHIFT is false. If 26138 is false, processing continues at 26120 which begins the process of selecting the next object source as described above. 26138 is true if SUBSHIFT is true. SUBSHIFT is true if special processing had been invoked for a premodified noun at 26114 as described above. If 26138 is true, the premodified noun was not the subject and is the object instead. If 26138 is true, then 26139 is next and resets the processing performed at 26114. 26139 performs the following operations: sets ESUB to be true; sets EOBJ to be false; sets SUB to be "3"; sets SUBSHIFT to be false; moves the premodified noun to the object position and clears the subject position, both positions being in the ellipted clause's SDS; and sets processing to continue at 26116 which starts the process to determine if the SUB subject source can be a replacement as described above.

If 26132 is true, both the subject and the object are ellipted, and new replacements are selected based upon which current replacements are unacceptable as reported from Selector 70 for example. If 26132 is true, 26136 is next and is true if the current object replacement is reported as acceptable. If 26136 is false, 26137 is next. If 26136 is false, the current object replacement is unacceptable because it failed to meet the requirements of the possible verb word sense numbers at 70 for example. Since the subject and object are ellipted, the unsuitable object replacement is always unacceptable for each subject that might be combined with the unacceptable object replacement. Thus, processing is saved by removing the object replacement from consideration as a replacement. 26137 removes the object replacement from such consideration. If the object source at OBJ has only a single source, OBJ is removed from the Object-Source-List. If the object source at OBJ has multiple possible sources, the only possible OBJ value is 6. All other object sources are single sources except for 7, which is the "context" source. However, since only combinations of subjects and objects found in the context are obtained by 7, clearly all found objects are acceptable as found by object source 7. Object source 6 selects untried nouns or pronouns in the main clause and has an associated TOV vector position for each possible noun or pronoun. The unacceptable object replacement for OBJ with a value of 6 is removed from consideration by setting the replacement's position in the TOV to have a value of R. An noun or pronoun with an R flag value in the TOV is not selected for object source 6. If 26136 is true, or after 26137, 26140 is next. 26140 is true if the subject source is acceptable. If 26140 is true, processing continues at 26120 which begins the process of selecting the next object source as described above. If 26140 is false, processing continues at 26123 which begins the process of setting OBJ to the first position of the Object-Source-List and of selecting the next subject source as described above. This completes this restart process.

Nonfinite verb clauses, verbless clauses, and morphological word@ clauses can have limited purpose relations to the other clauses in the context of a conversation. These limited purpose relations are contained in lists stored in a data area related to clause conjunctions of Function Step 22. A pointer to such a list is stored in the grammar information of nonfinite verb clauses and verbless clauses in Syntax Clause Trees 30. A pointer to these limited purpose relations is stored in the grammar information of phrases containing morphological word@ in Syntax Phrase Trees 30. These pointers address lists which are specific to the nonfinite verb clause, verbless clause, or morphological word@ clause. The limitation of purpose relations improves the efficiency of Purpose Identifier 140 by limiting the number of purpose relations of the subordinate clause to main clause which are searched to find the most likely intended purpose relation. These limited purpose relations can also be ordered to have the most common purpose relation first order. Some typical purpose limitations are now described. Verbless clauses, nonfinite verb clauses having a sentence role of a postmodifying adjective modifying an abstract noun, and nonfinite verb clauses having a sentence role of premodifying a noun often do not have a direct purpose relation to the main clause. Verbless clauses assign a subject complement or adverbial to modify the subject of the verbless clause. This verbless assignment either defines state representation values for the subject for a new assignment or identifies the subject for a previously stated assignment. A nonfinite verb clause postmodifying an abstract noun often either defines an aspect of the postmodified abstract noun that has not been previously expressed in the conversation, or such a nonfinite clause identifies the abstract noun when such a nonfinite verb clause has been previously expressed. A nonfinite verb clause premodifying a noun often either defines a previously unstated clause relation of the premodified noun with a tense of the verb of the nonfinite verb, or such a clause identifies the premodified noun with the previously stated clause relation containing a tense of the verb of the nonfinite verb. The definition or identification result of the verbless clause, nonfinite verb clause postmodifying an abstract noun, and nonfinite verb clause premodifying a noun is determined by Purpose Identifier 140 checking the Context Memory 120. If identification was not found, Purpose Identifier 140 would then check for the definition purpose for such clauses. Morphological word@ clauses also often either refer to a previously stated clause relation implied by the morphological word@ or defines a new clause relation. A new clause relation usually has a purpose relation to the containing main clause, and a previously defined morphological word@ clause or one of its purpose related clauses could have a relation to the main clause containing the morphological word@. Whether a morphological word@ clause is defined or new is determined by checking Memory 120. Purpose Identifier 140 then uses the context status of the morphological word@ clause to select the possible purpose relations.

STATE REPRESENTATION PROCESSING

State representation processing begins after syntactic processing has been completed by a Natural Language Processor 10. Syntactic processing is complete when Dictionary Look Up Step 18 has completed all address look ups, after all function word adjectives have been processed by Function Processing Step 22, all morphological words have been processed by Morphological Processing Step 24, and all ellipsis has been processed by Ellipsis Processing Step 26. The goal of state representation processing is to select word sense numbers for all state representation words and to select functions for all function words whose functions are related to state representation processing. Thus, the functions of function words such as prepositions, most adverbs, conjunctions and interjections have not been selected prior to state representation processing. The word sense numbers and functions are selected for semantic consistency with their containing clause, with the context, and with previously stored experience and knowledge. Selecting a word sense number is equivalent to selecting data which is analogous to selecting a definition when the definition is realized with a state representation. The state representation realization of such a definition: allows for consistent selection of state representations and their associated word sense numbers; allows for all that is known and for all that is related to a non-function, natural language word to be stored; and allows the data realizing such a definition to be structured to be accessible in a range of generality reflecting the generality of the usage of the non-function, natural language word.

State representation processing of a clause begins by processing state representation words at Selector 60. The order of state representation processing of state representation words in a clause is nouns in left to right order for a normal sentence role order: the subject, verb, objects or complements order. Otherwise, the nouns are processed in left to right order within a sentence role and with this normal sentence role order starting with the subject. In the processing of the nouns in a clause, the word sense number of the clause's verb is partially selected as is described below in detail. After all the nouns are processed, the word sense number selection of the verb is completed, and this completes word sense number selection and function selection for the clause unless one or more selections are inconsistent with the context or stored experience and knowledge. The concrete nouns in a sentence role and the modifiers of such concrete nouns are processed at Selector 60. State abstract nouns in a sentence role and the modifiers of such abstract nouns are also processed at 60. Clausal abstract nouns in a sentence role and the modifiers of such clausal abstract nouns are processed at Selectors 60 and 70. Verbs and their modifiers are processed at Selector 70. Sentence roles include: subjects, direct objects, indirect objects, object complements, and subject complements. Note that clausal abstract nouns can result in the state representation processing of a clause and thus could cause state representation processing of concrete nouns and other state representation words. The sequencing of state representation processing is controlled by Selector 60. Step 18 forms a list of sentence role nouns which are processed at 60 or directed to the appropriate selector. Within in a clause, words are processed in the order just described. Clauses are processed in left to right order. A clause containing clauses in sentence roles are processed after all sentence role clauses are processed.

State Representation Processing of Concrete Nouns and their Modifiers

The primary task of the state representation processing of a concrete noun is to select a word sense number which is compatible with all the following criteria: the context, with the word sense numbers and functions of its modifiers or modifiee, with the word sense number of the verb in the clause and with the relationship of the clause to the context and previously stored experience and knowledge. If the word sense number of a concrete noun is not compatible for any of these criteria, another word sense number of the concrete noun is selected. If a compatible word sense number can not be selected, the Communication Manager has a variety of options including asking a clarifying question or waiting for explanation from the conversation. The state representation processing of concrete nouns is accomplished by Selector 60 performing one or more of the following processes: accessing Context Memory 120 to determine if the noun is in the context; accessing 120 or Concrete Noun State Representation Memory 90 to determine if the concrete noun is related through an A-relation, S-relation, T-relation, and/or C-relation to a noun in the context or previously stored experience and knowledge; accessing 90 to select the possible word sense numbers of the noun; working in conjunction with Selector 50 to select the word sense numbers of a modifying adjective; working in conjunction with Selector 70 to select the compatible word sense numbers of the subject(s), direct object(s), indirect object(s) and verb(s) in a clause; and/or working in conjunction with Function Processing Step 22 to select the function of a modifying preposition and a compatible word sense number of a concrete noun prepositional complement. Note that a clause modifying a concrete noun implies selecting the word sense number of the noun in the modifying clause as in a clause with a relative pronoun for example. Modifying clauses are processed before a main clause. A concrete noun in a sentence role of a main clause which is also modified by a clause can use both clauses to select the word sense number of the concrete noun. The word sense number selected for the subordinate clause is checked for being consistent with the main clause. If it is not consistent, another word sense number is selected and checked for consistency. Word sense numbers are selected until a word sense number is compatible with both clauses, or until all word sense numbers have failed. The data structure for concrete nouns, which is stored in Memory 90, is described first. Then the process of Selector 60 for selecting a concrete noun's word sense number is described next.

Figure 17D:
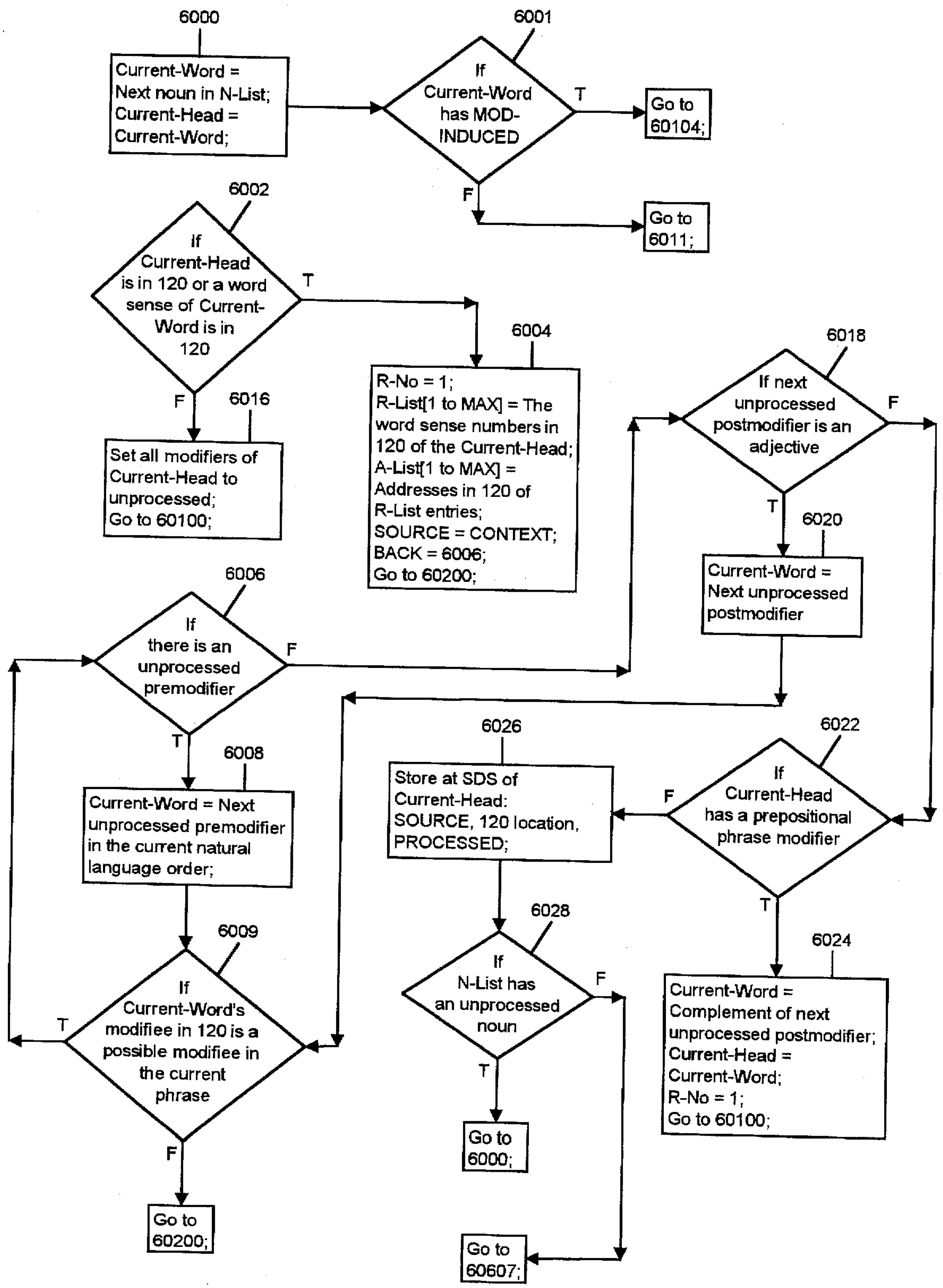
FIGS. 17*d*–17*jj* is a flow chart for the method that selects the word sense numbers of concrete nouns, state abstract nouns, and clausal abstract nouns, their non-function word modifiers, and other related methods.
Figure 17E:
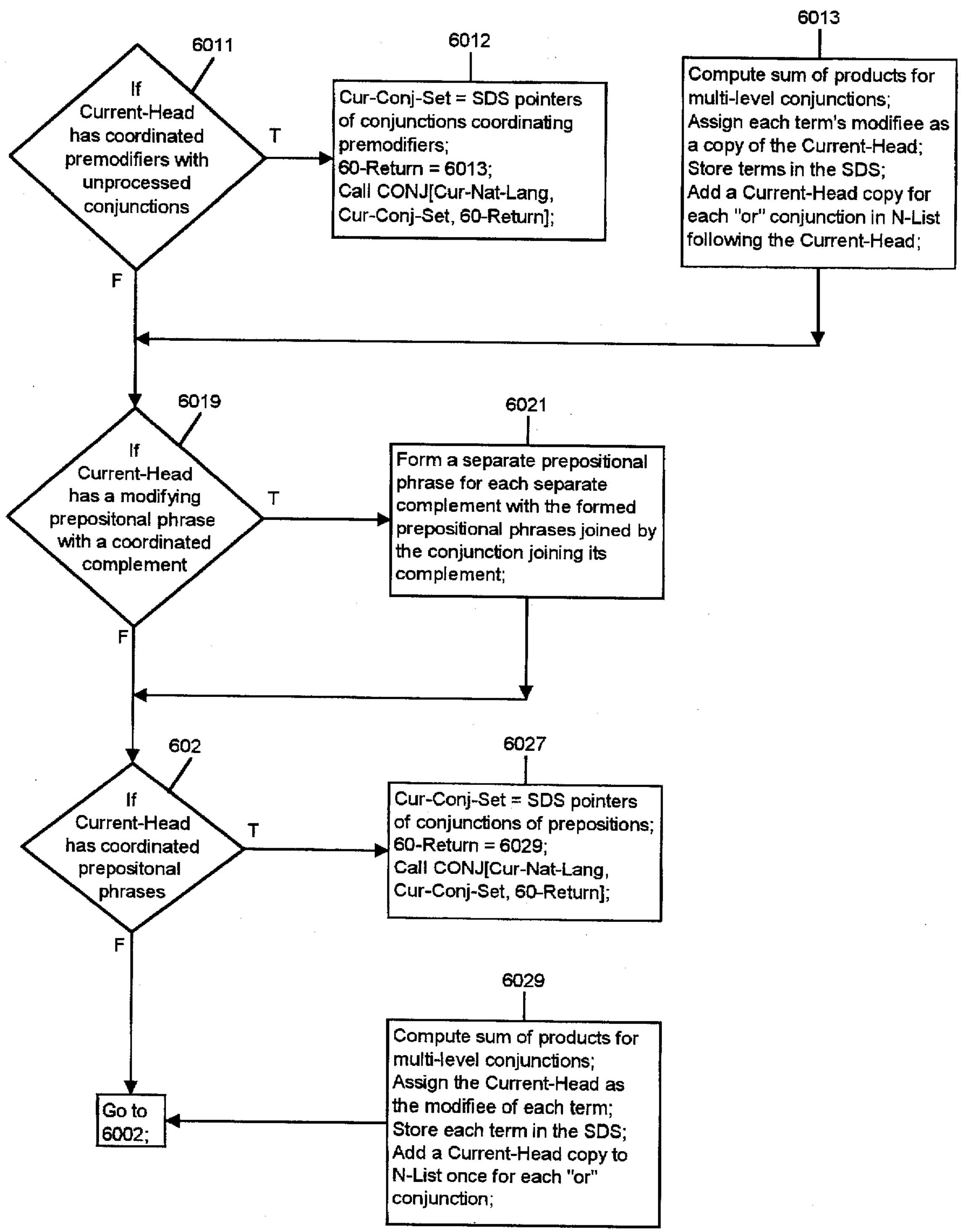
Figure 17F:
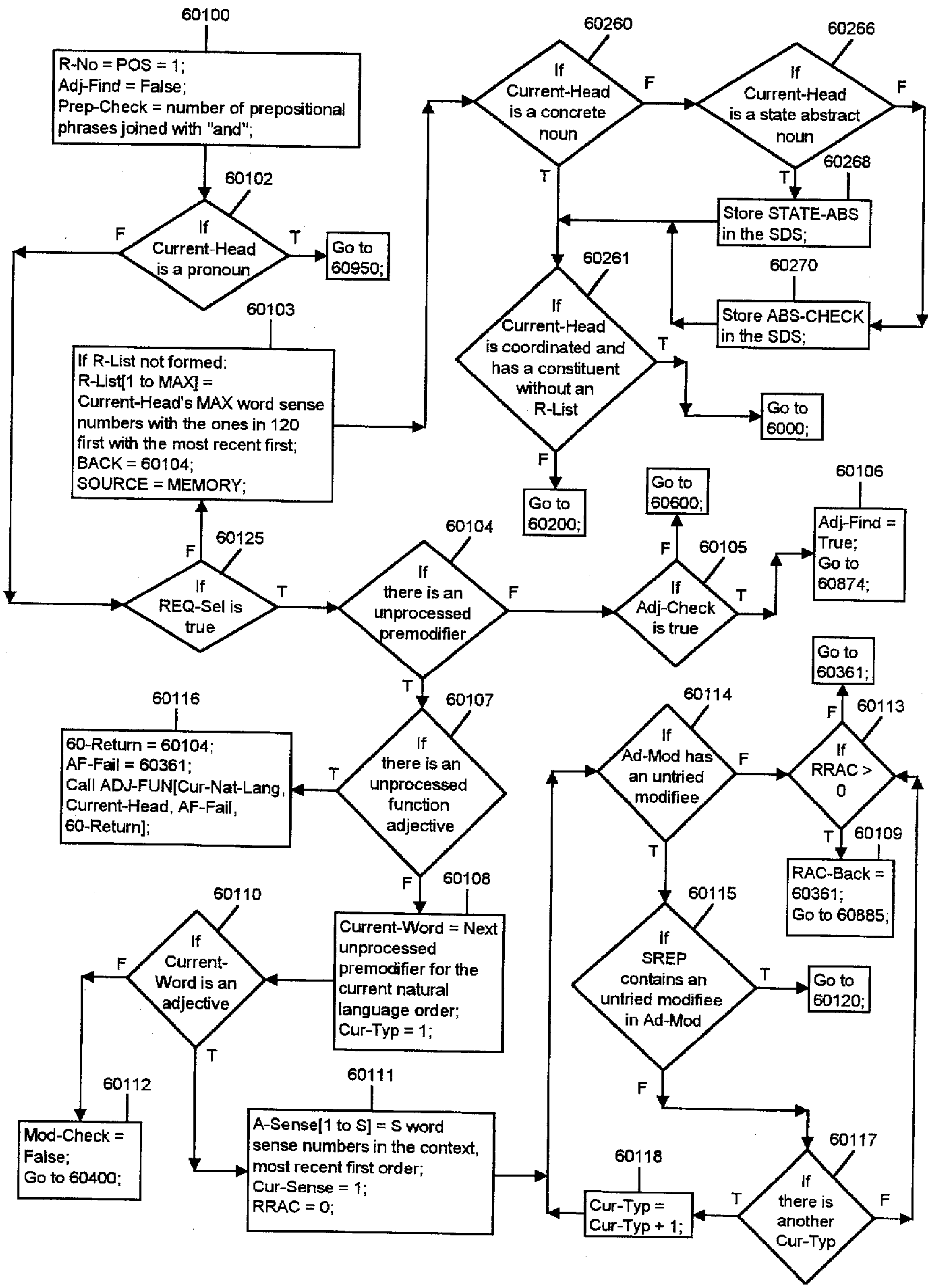
Figure 17G:
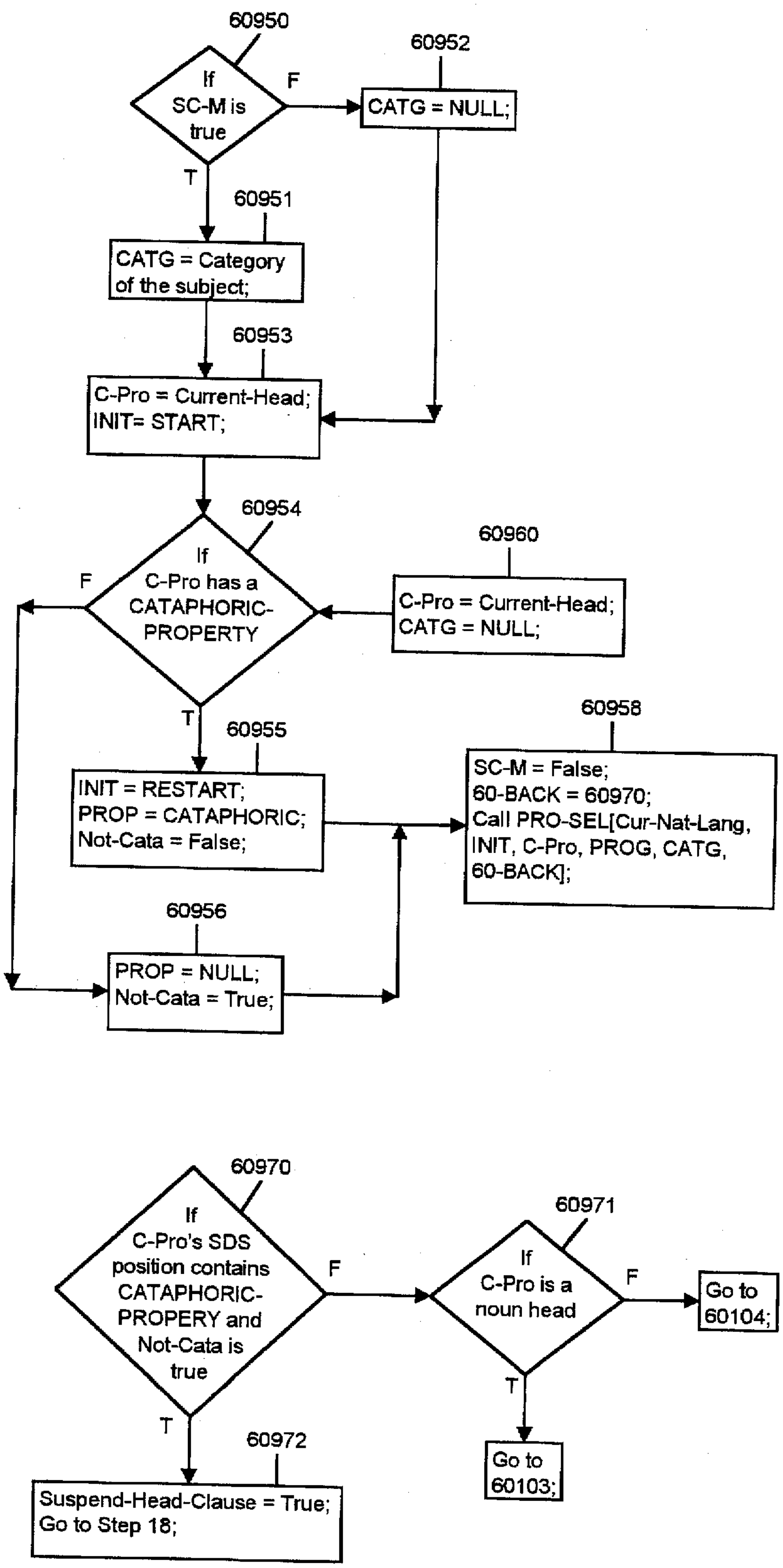
Figure 17H:
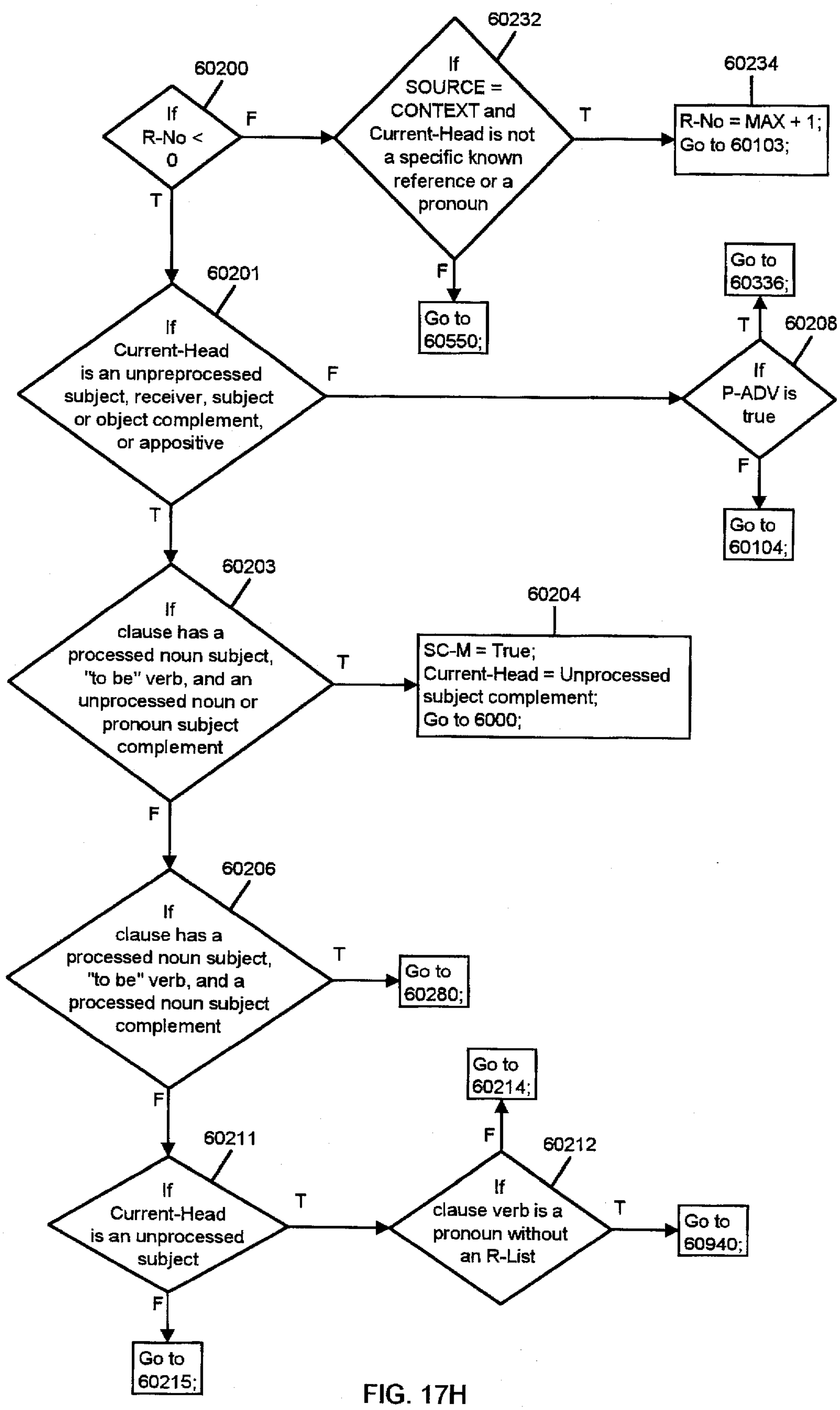
Figure 17:
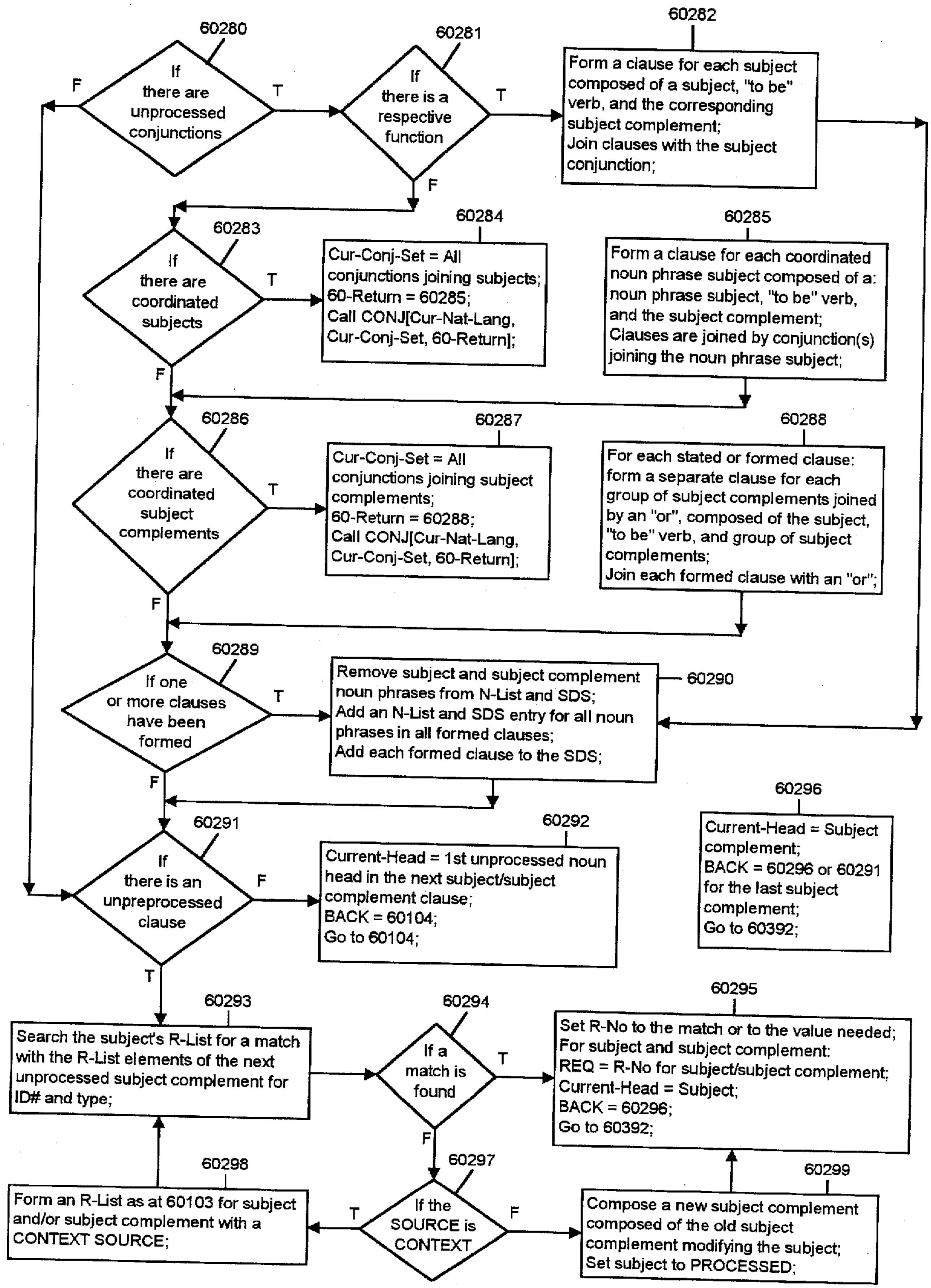
FIGS. 17*a*–17*c* illustrate the word sense number format and the state representation data structure format for concrete nouns, state abstract nouns, and clausal abstract nouns.
Figure 17J:
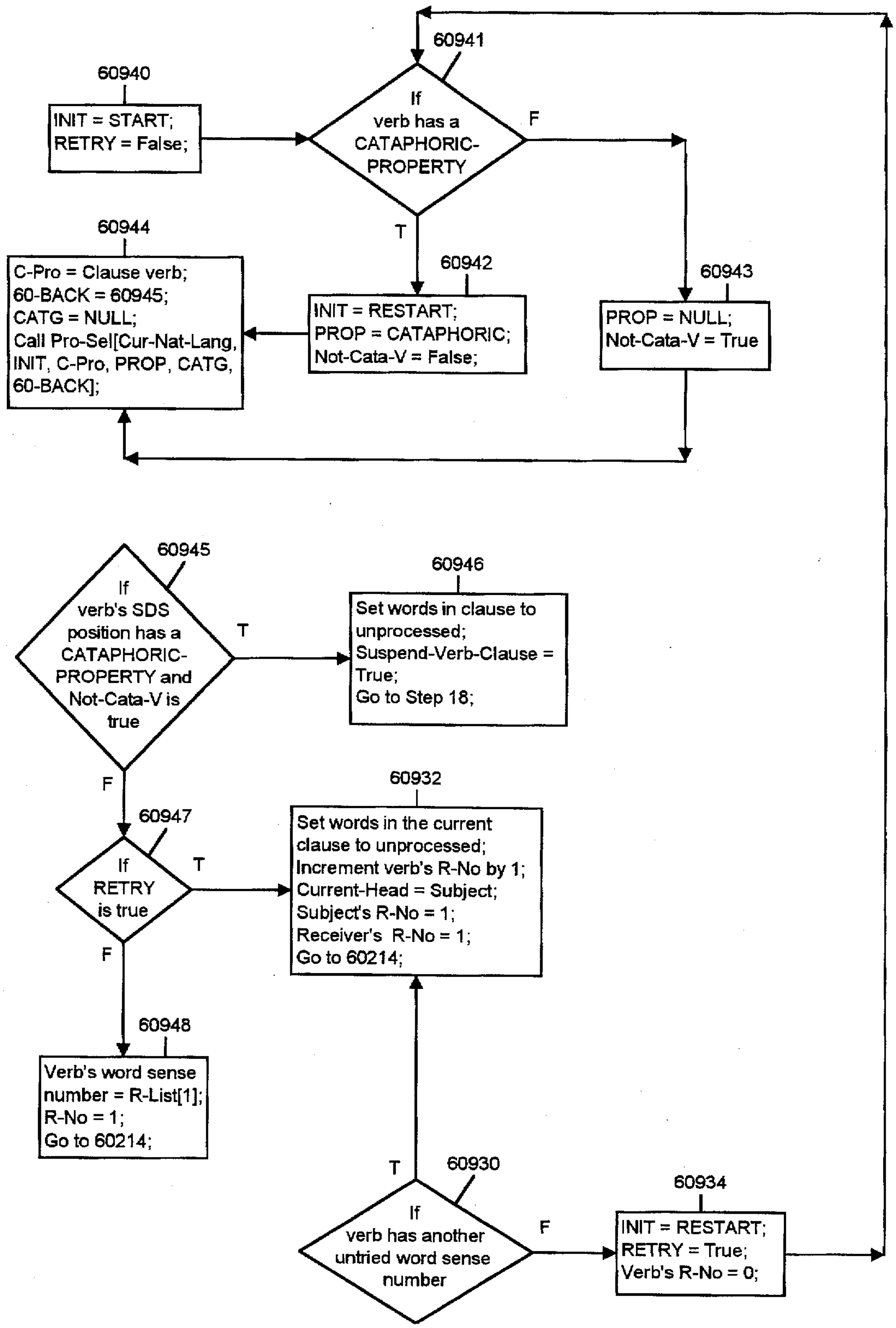
Figure 17K:
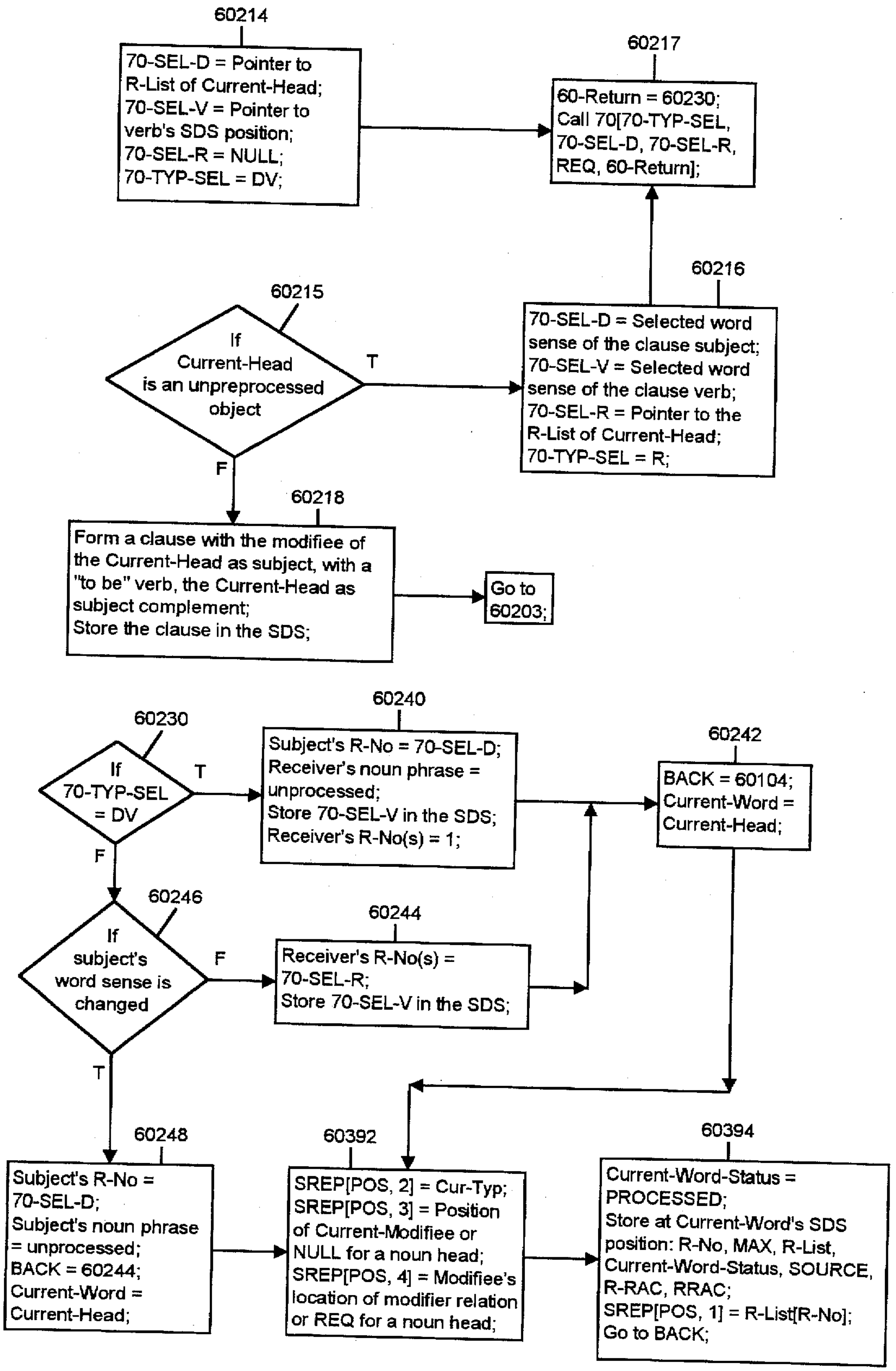
Figure 17L:
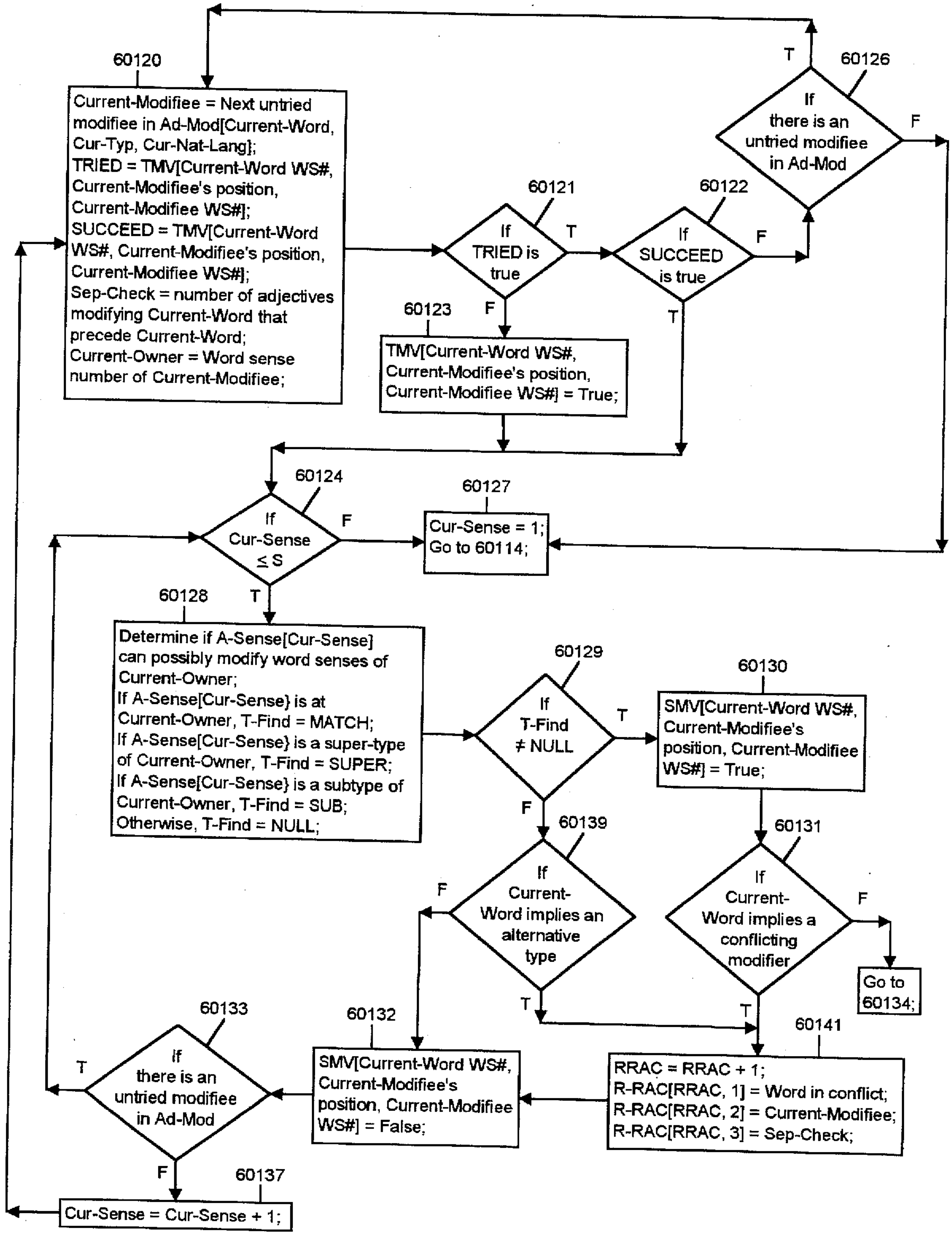
Figure 17M:
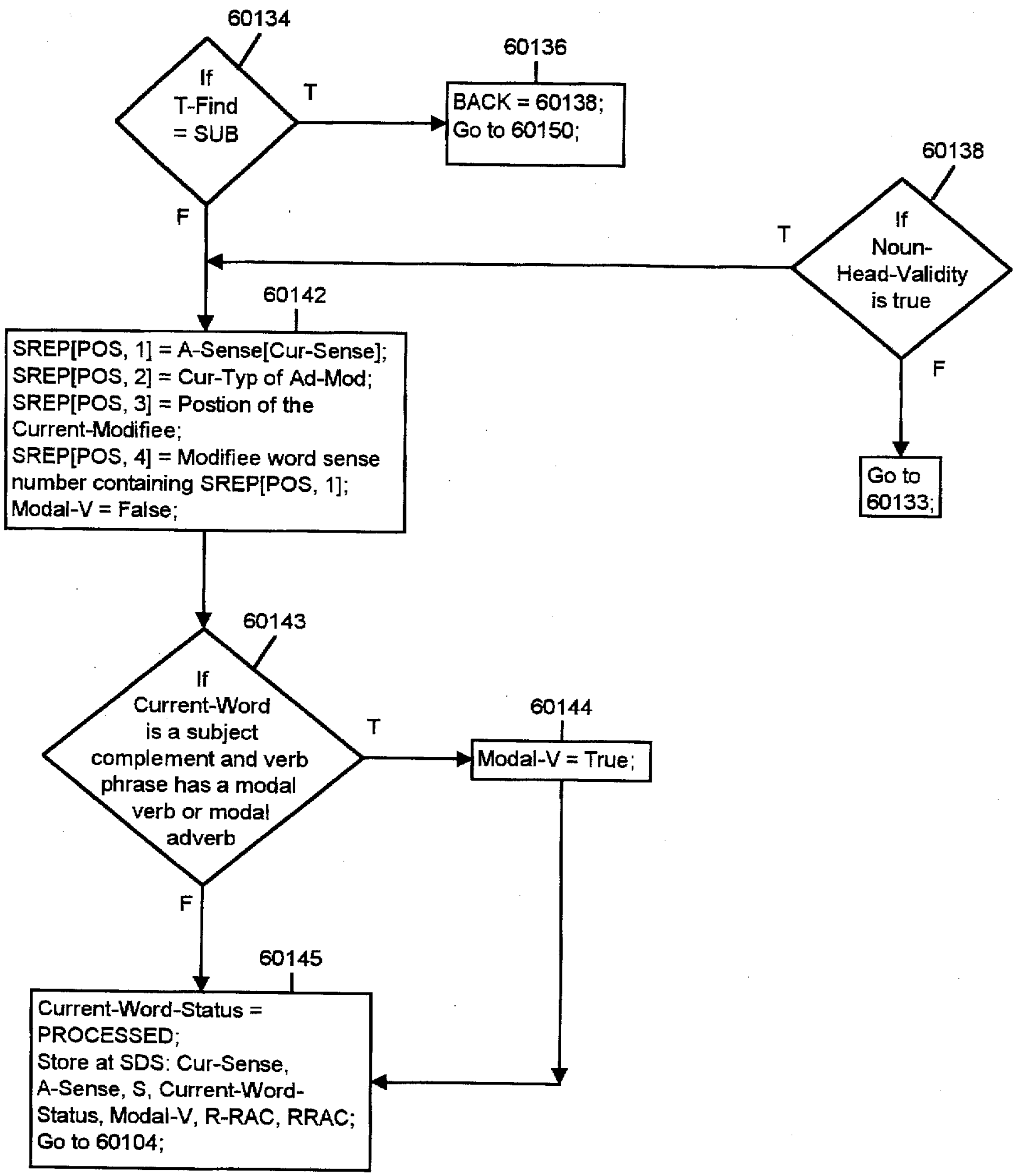
Figure 17N:
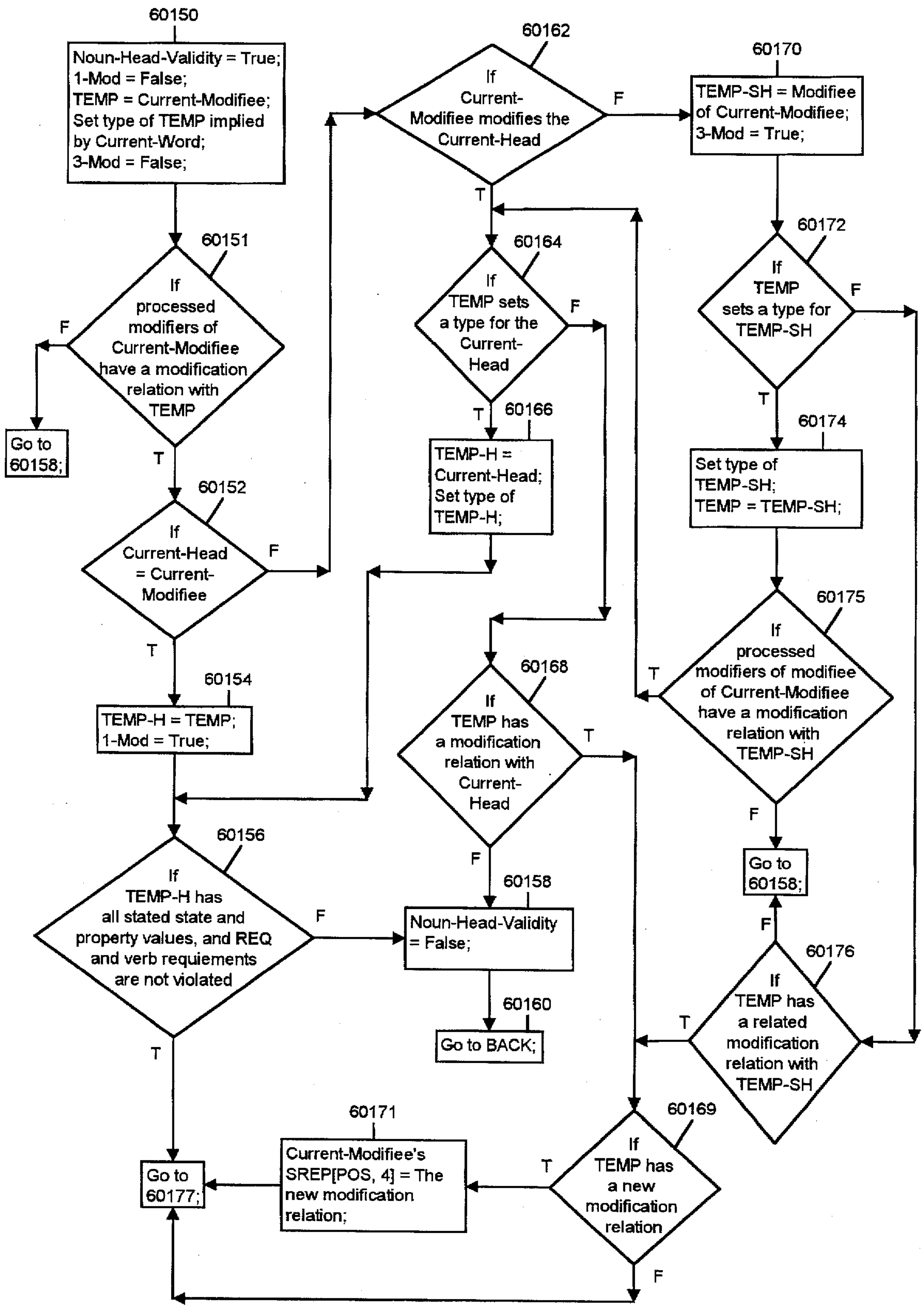
Figure 17O:
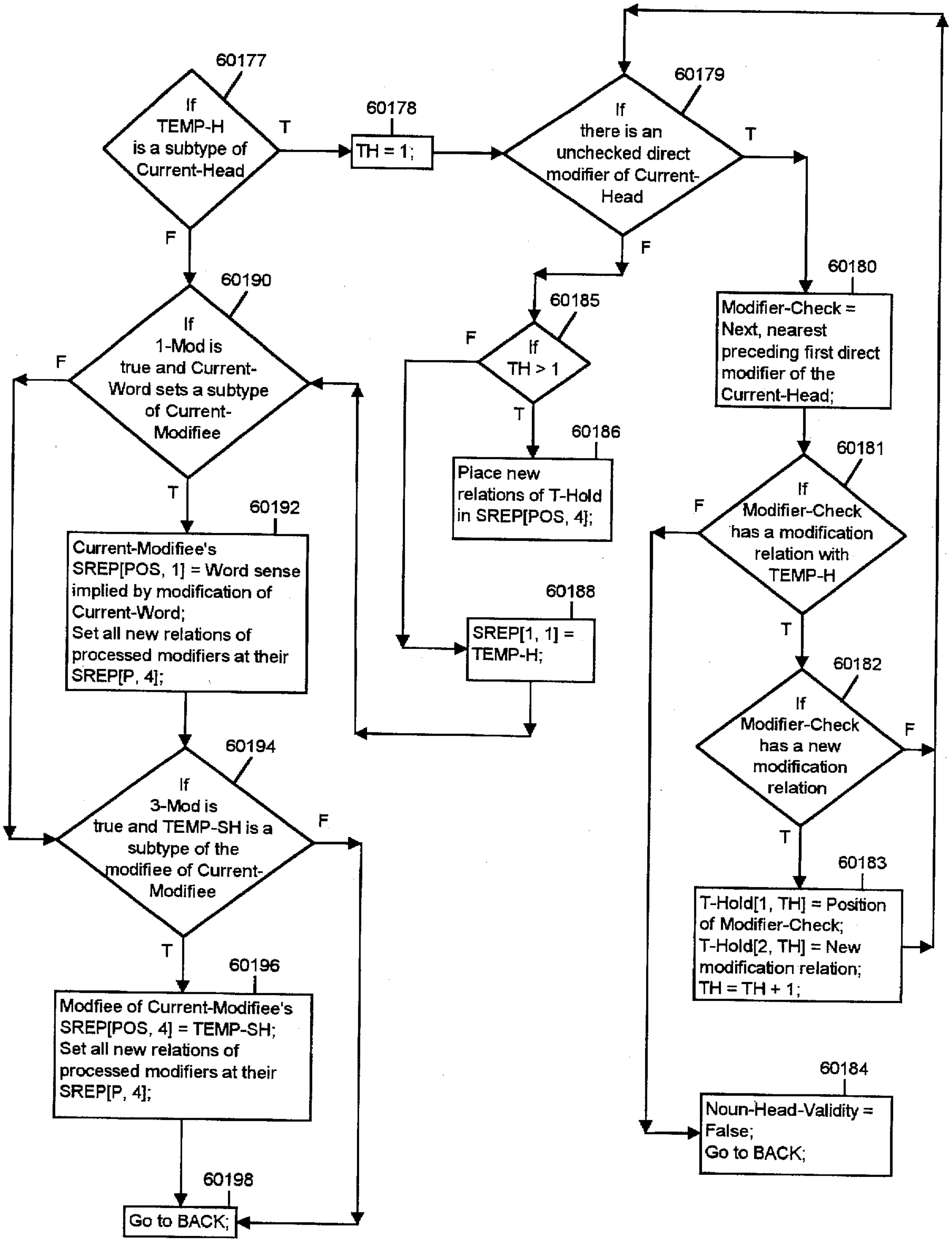
Figure 17P:
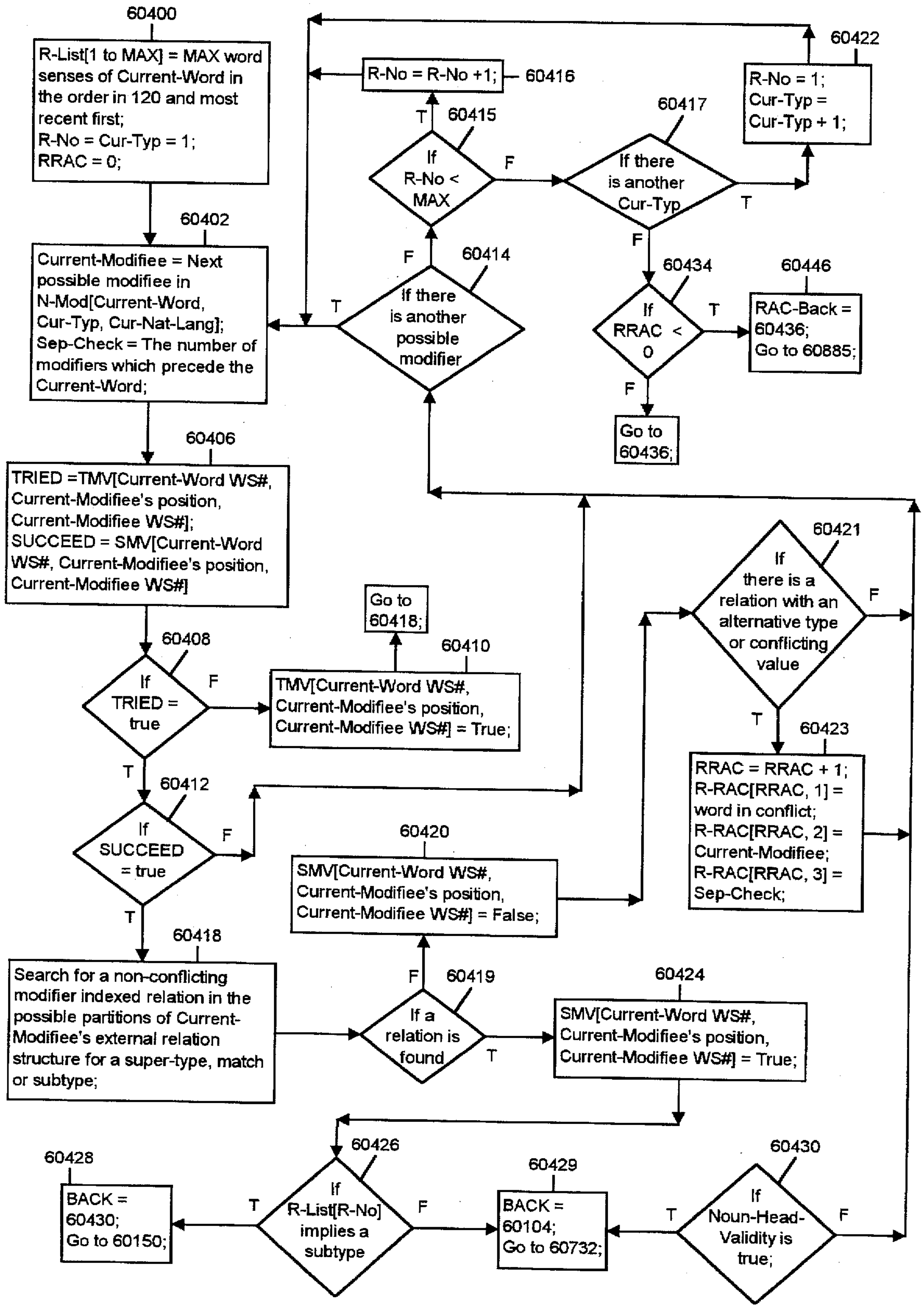
Figure 17Q:
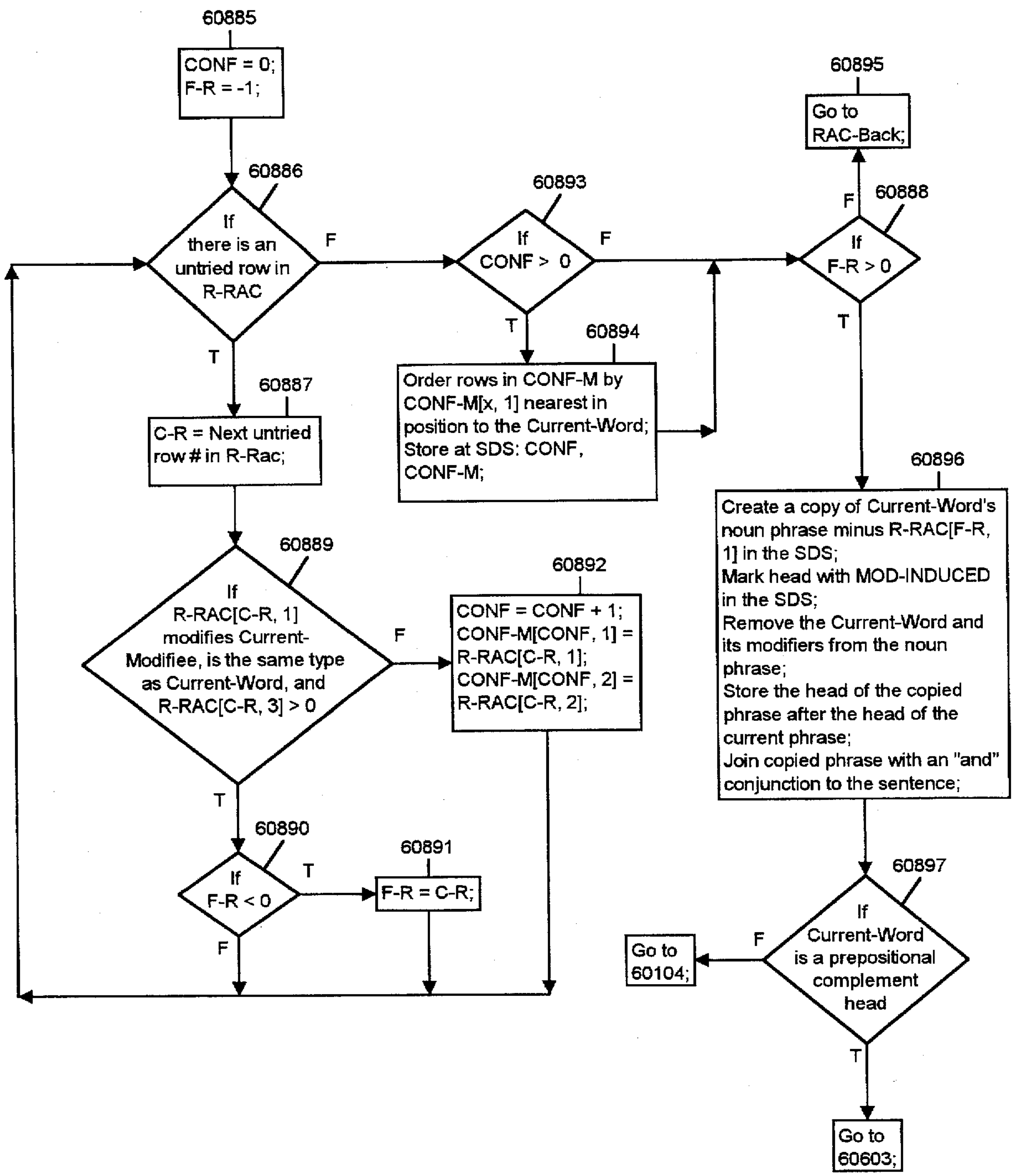
Figure 17R:
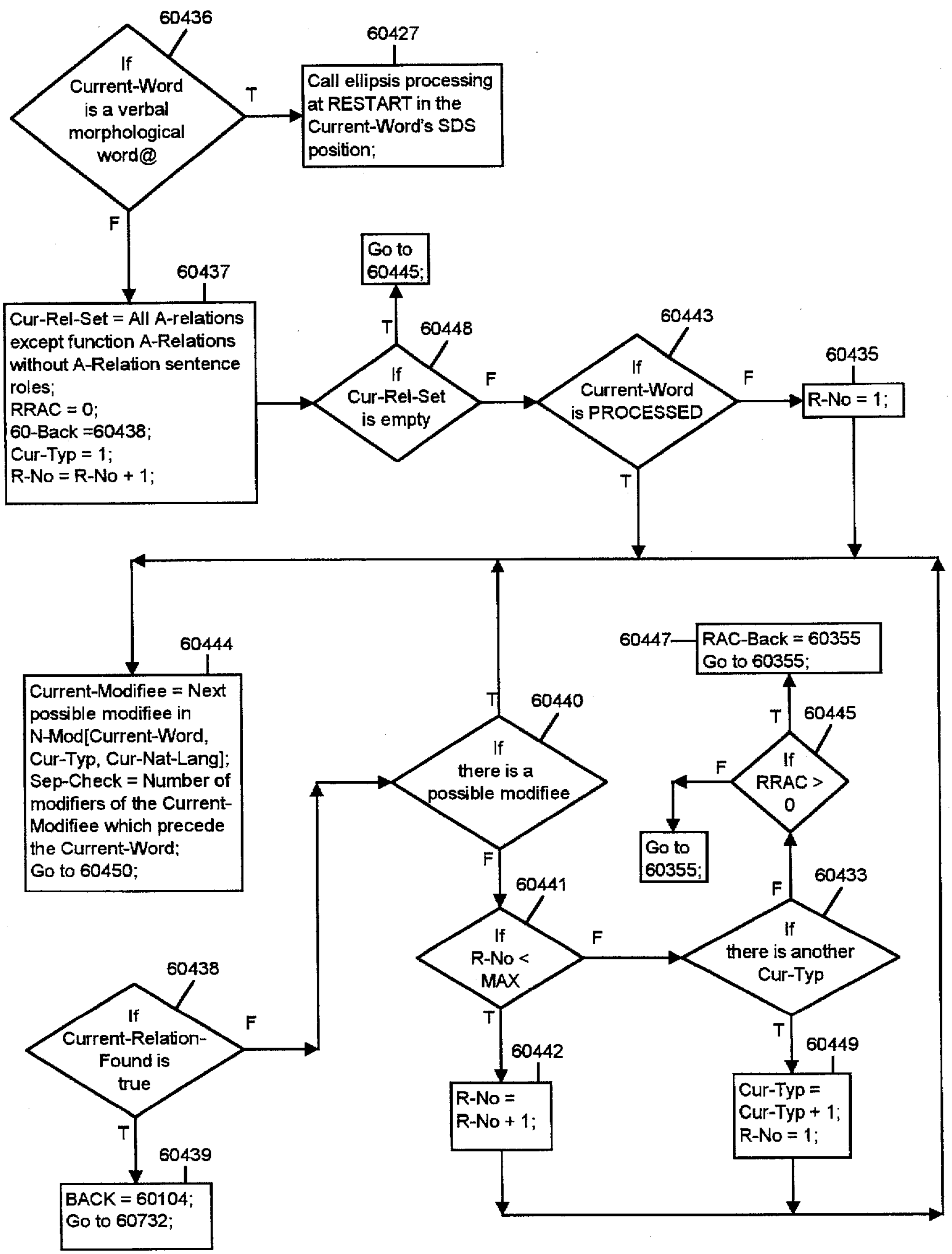
Figure 17S:
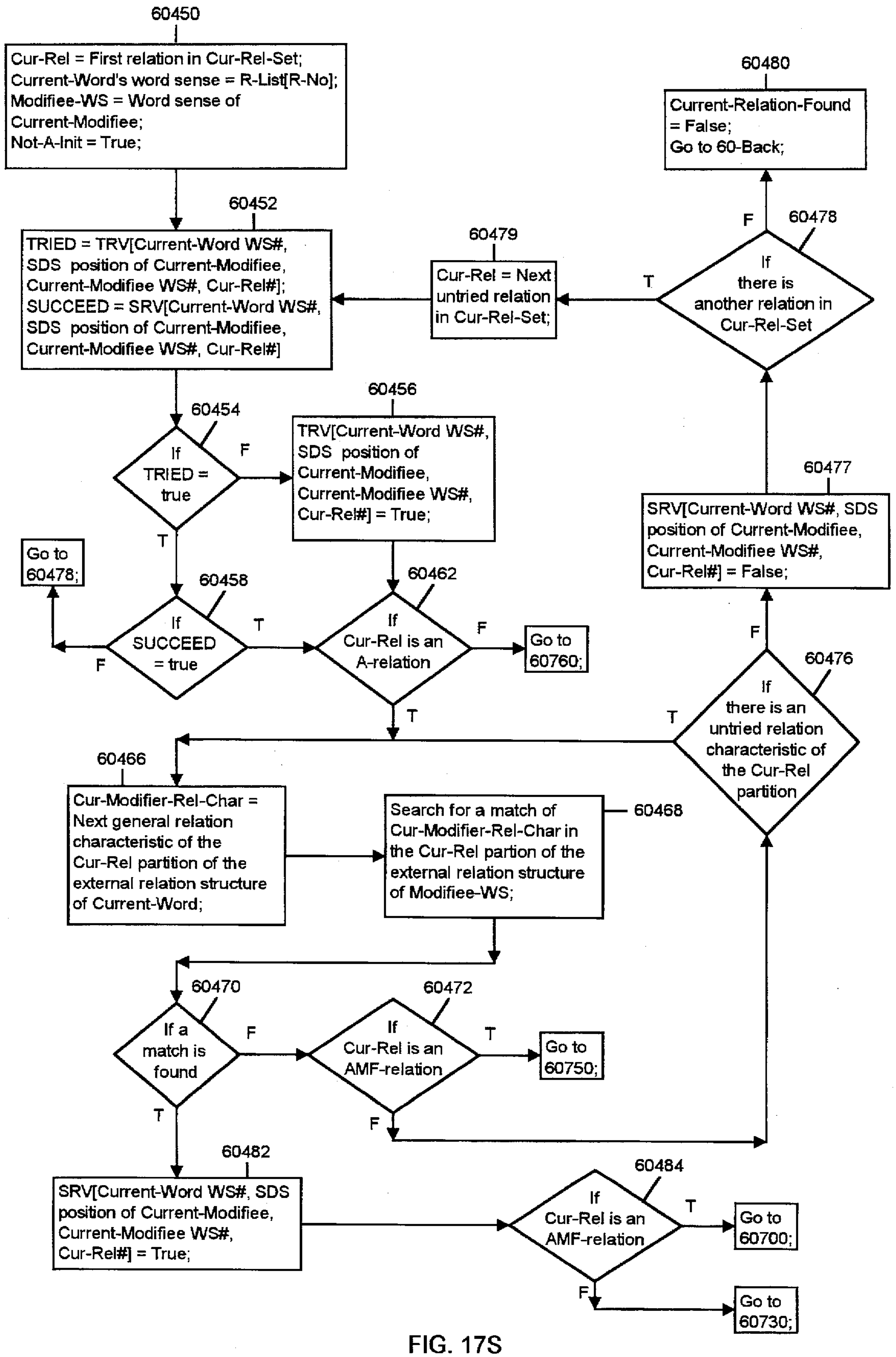
Figure 17T:
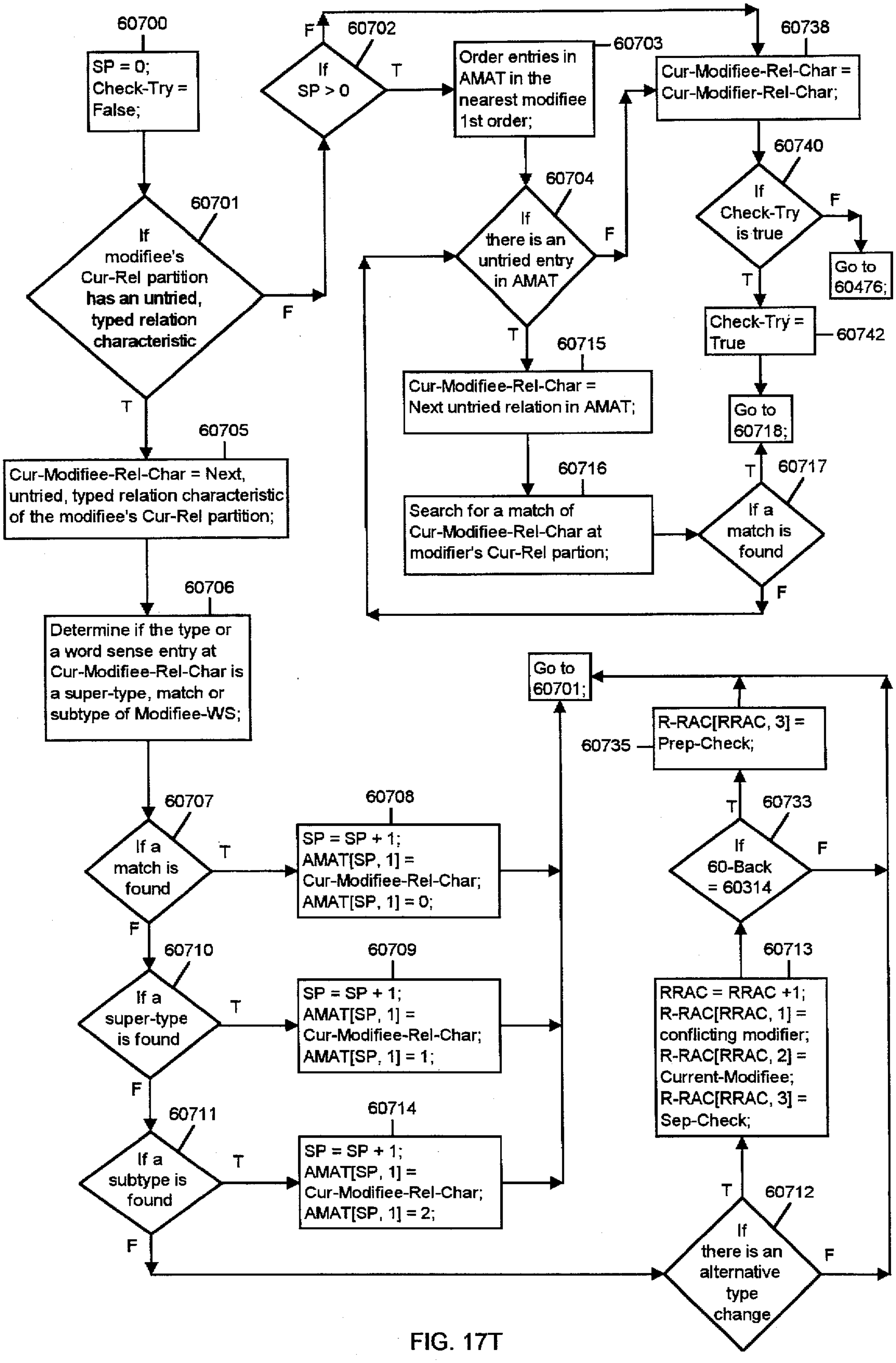
Figure 17U:
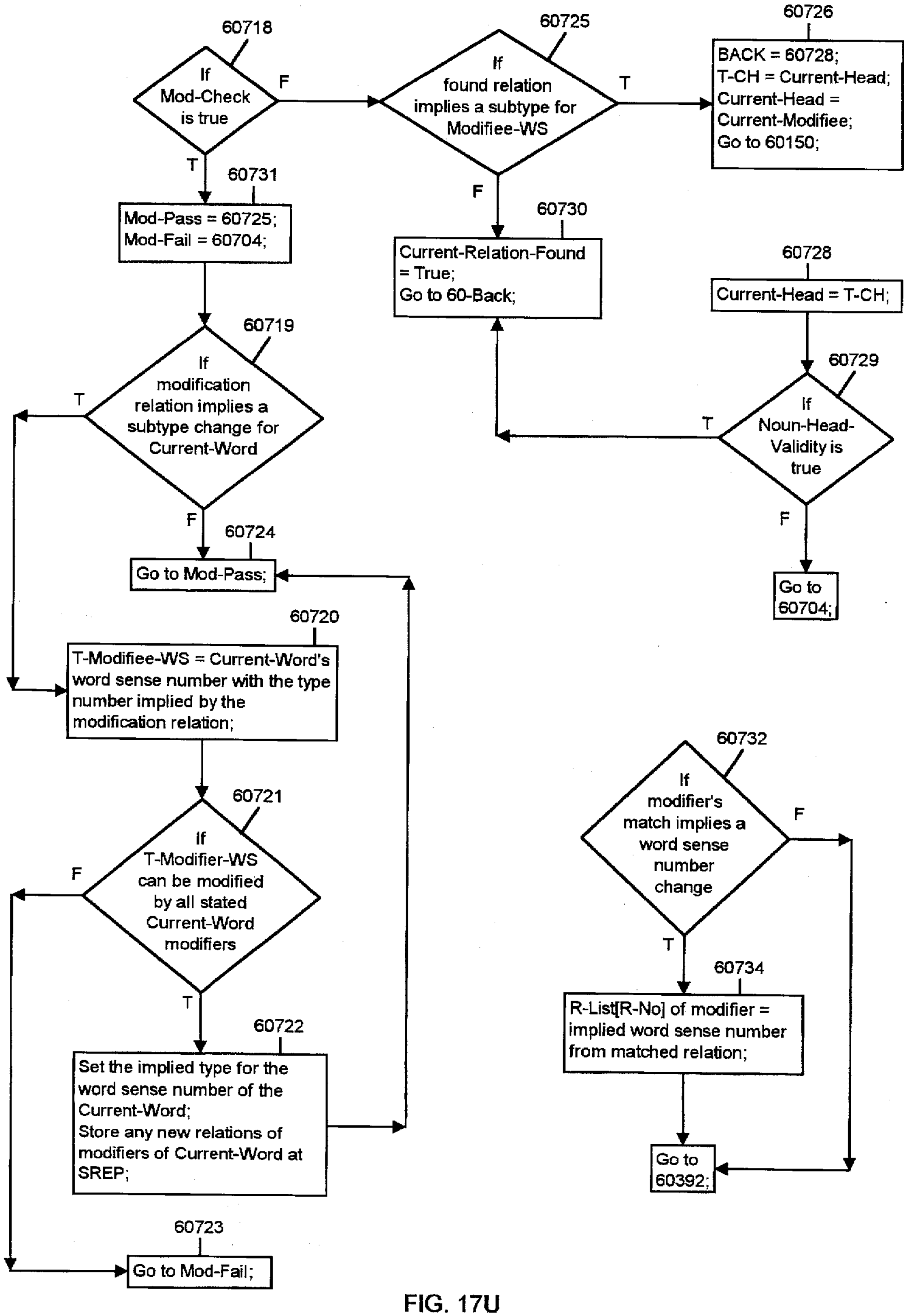
Figure 17V:
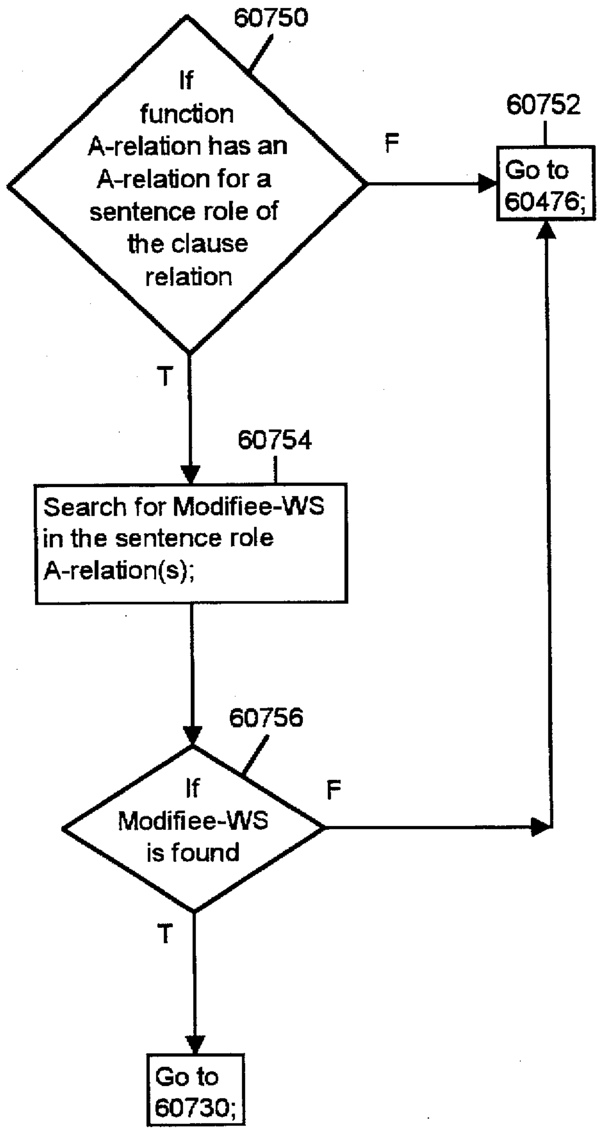
Figure 17W:
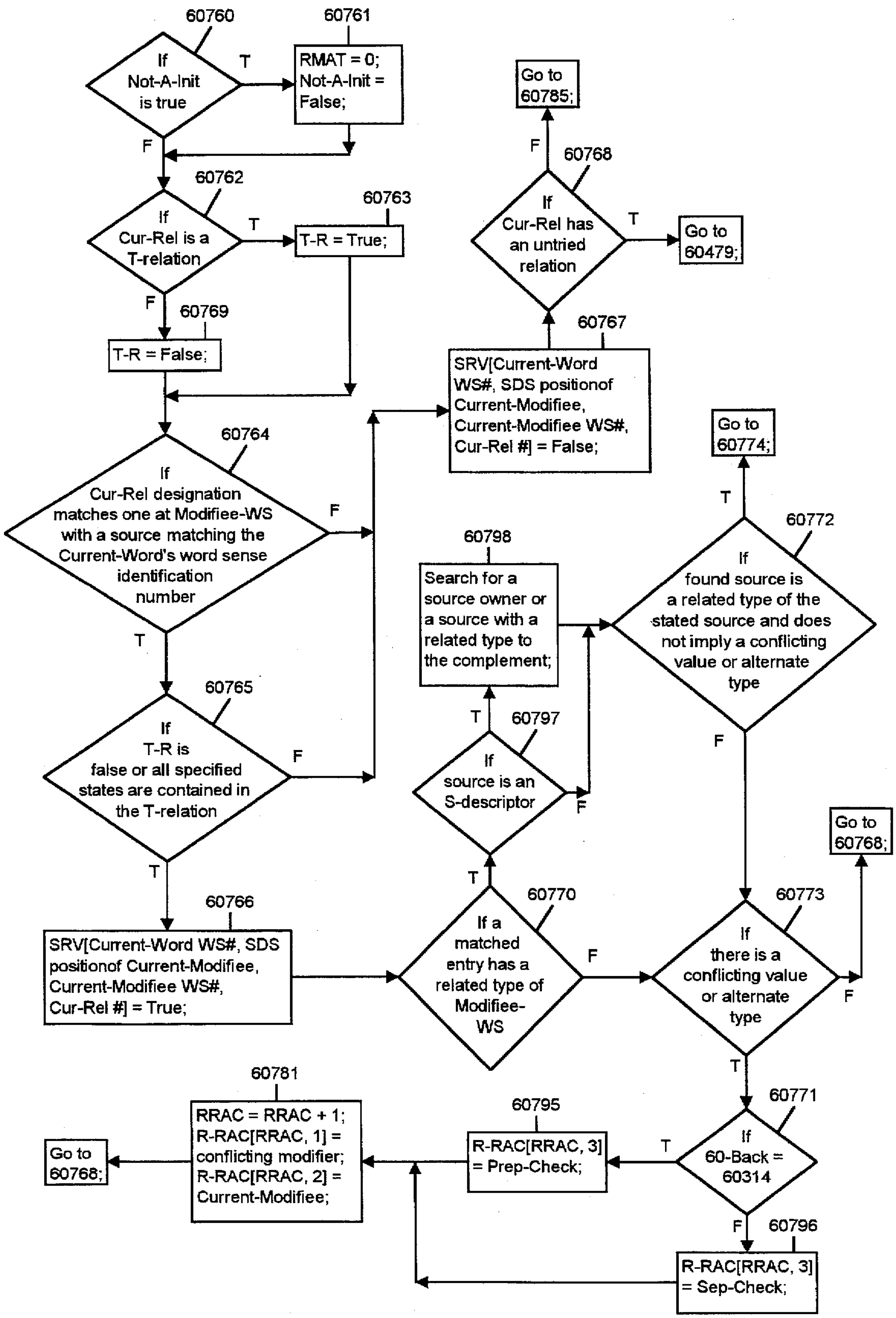
Figure 17X:
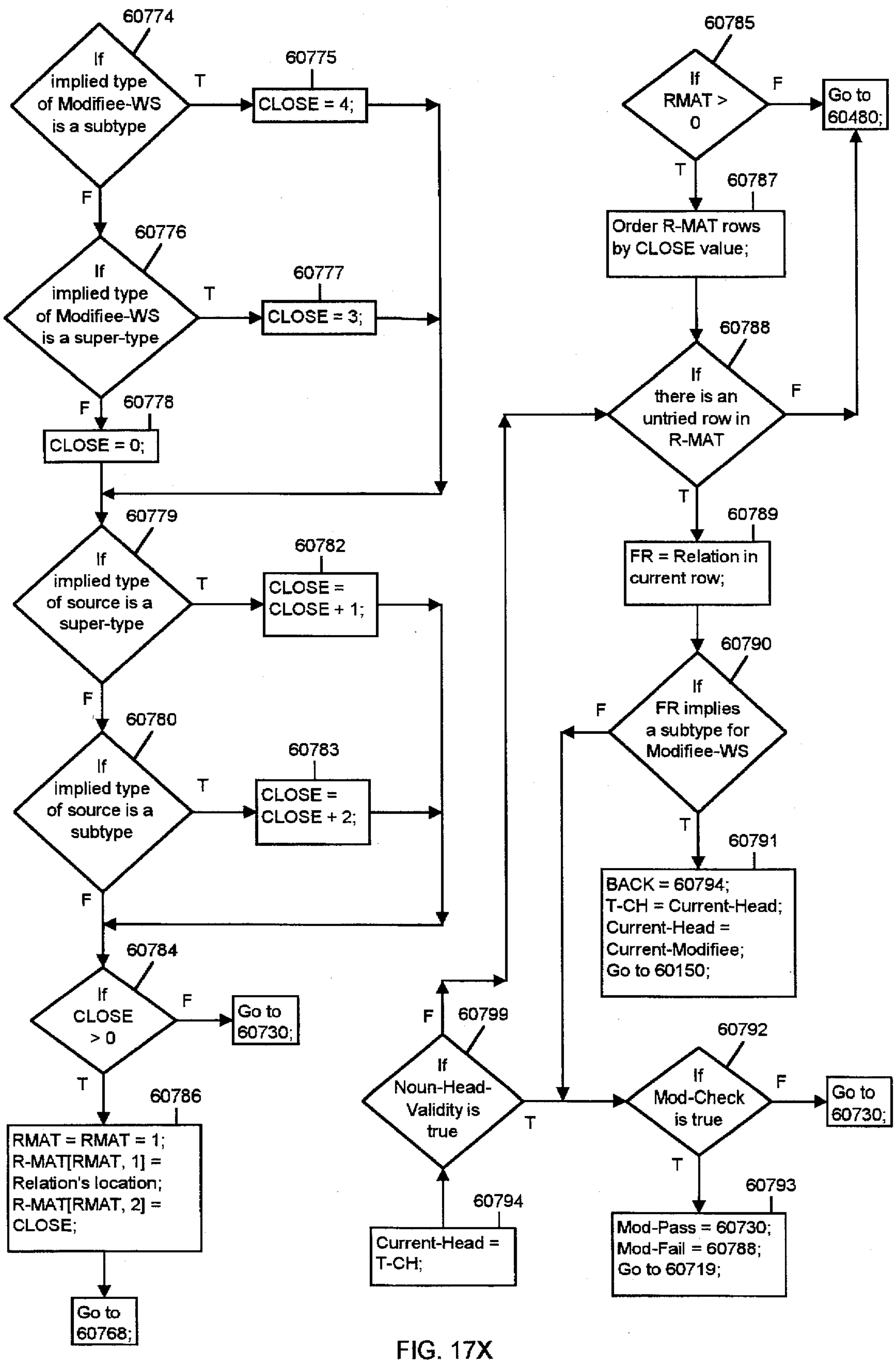
Figure 17Y:
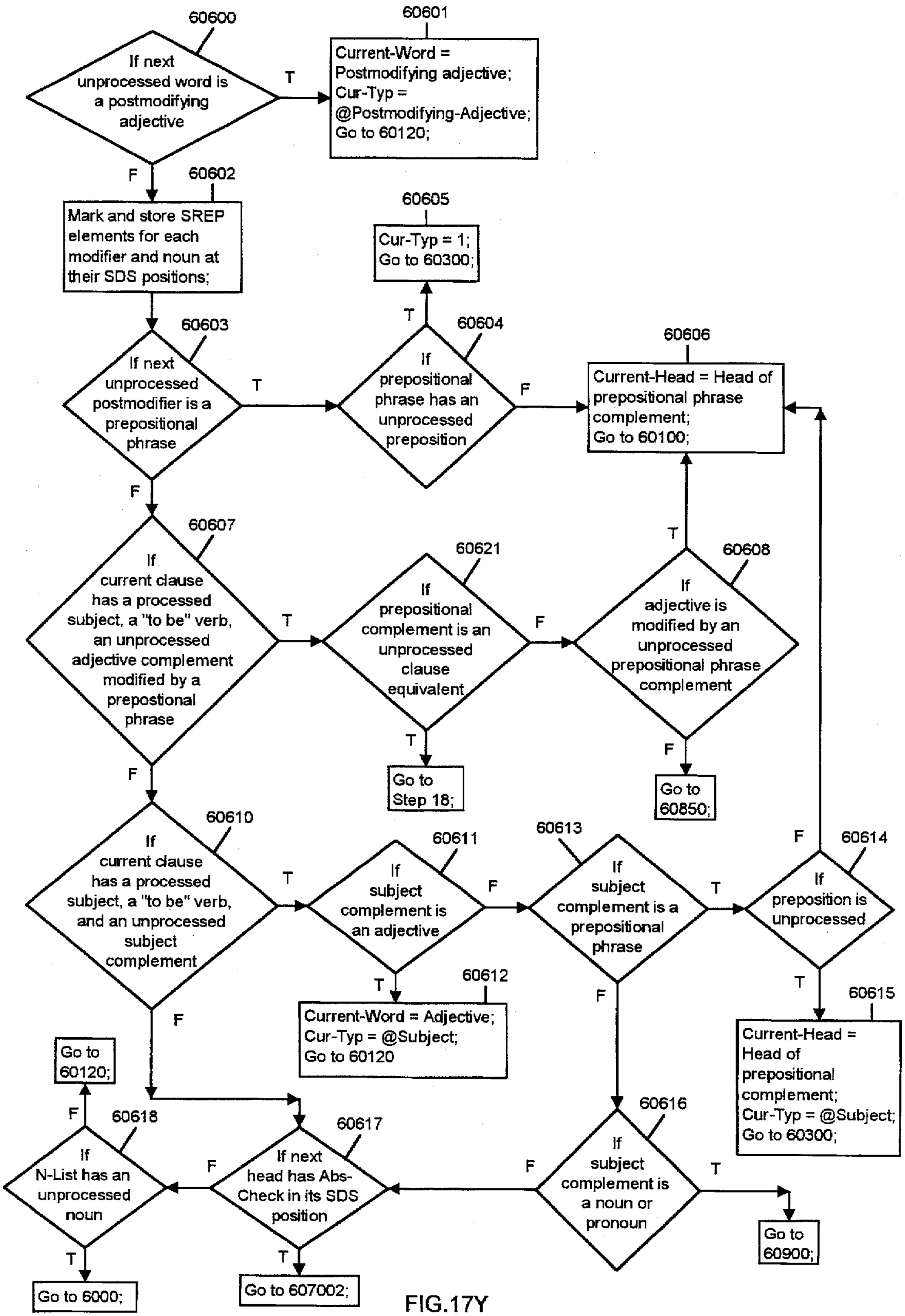
Figure 17Z:
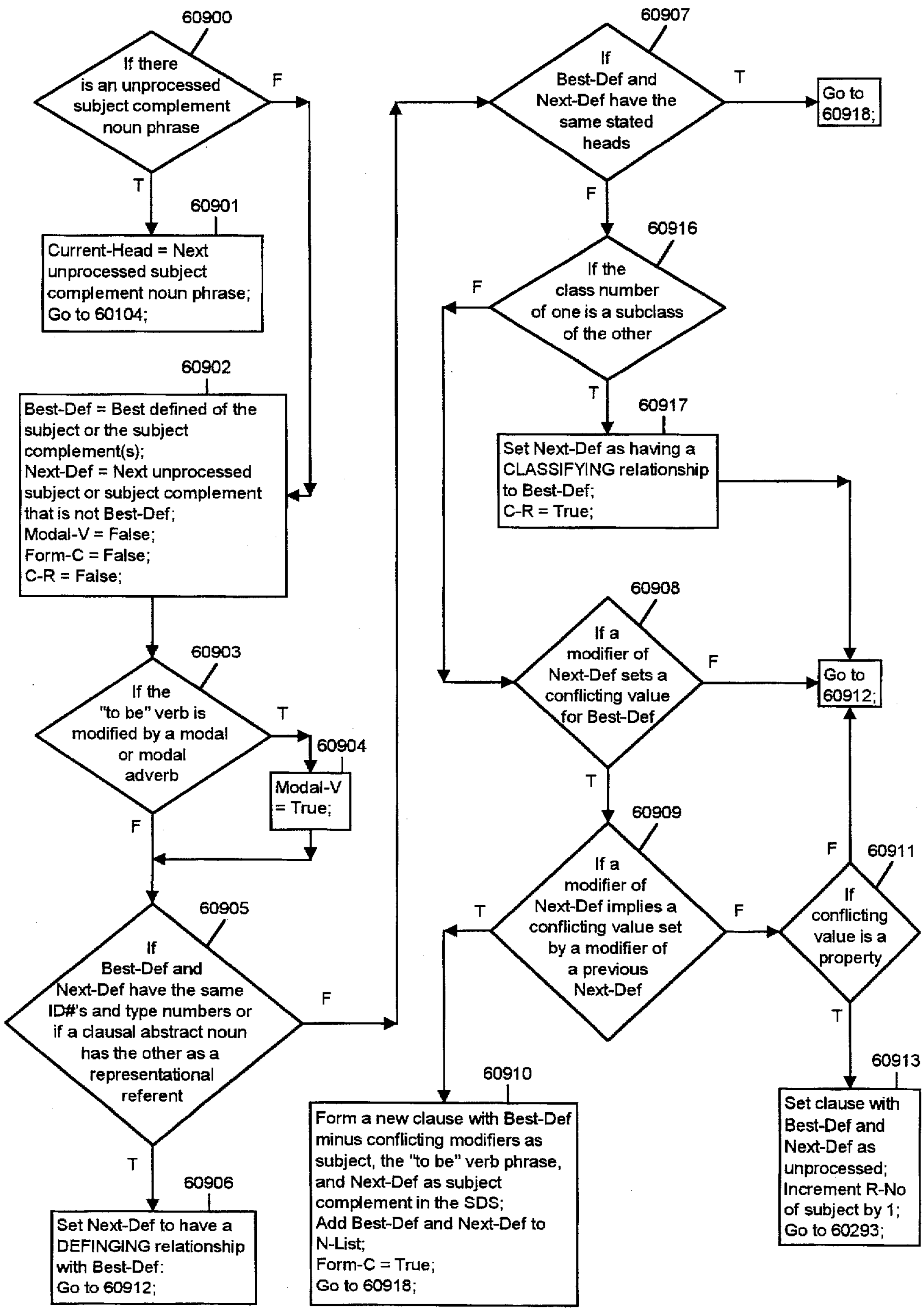
Figure 17A:
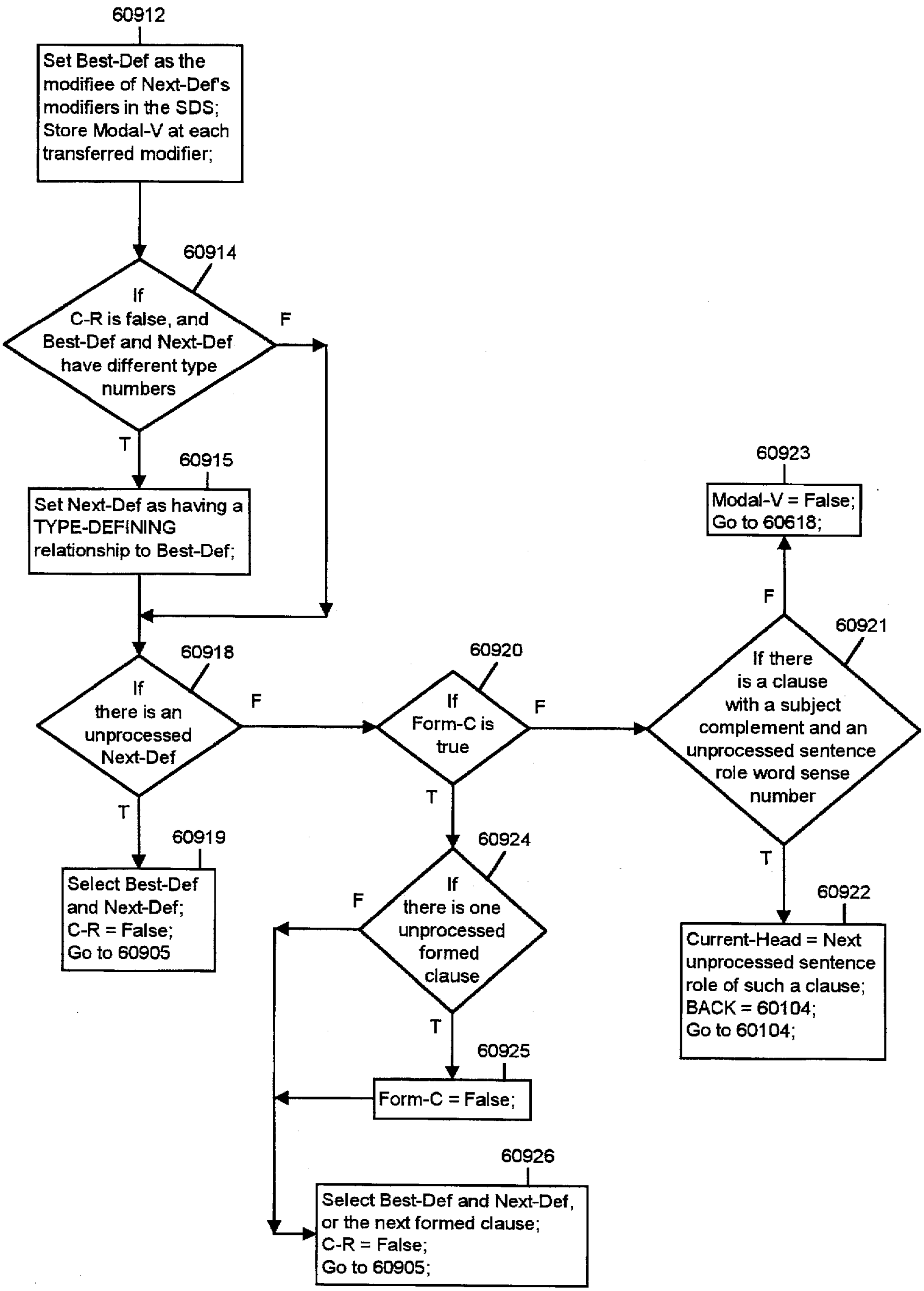

The word sense number format of a concrete noun is depicted in FIG. 17*a*. A concrete noun word sense number has an associated address in Dictionary 20 to a location in Memory 90. A concrete noun's word sense number has four components. One component is an identification number which is common to certain related word sense numbers of a concrete noun. The identification number contains a class number subfield and a class member number subfield. The class number refers to a class of nouns such as animate, place, thing and less general classes of nouns including subclasses of such general classes. The class member number refers to a specific partition of the class.

The next component of a concrete noun's word sense number is the type number. A concrete noun's word sense number can have two or more types. For example, "store" has multiple types such as: "food store", "department store", etc. The word sense number of a concrete noun accommodates this multiple type relation of a concrete noun by representing the word sense number with an identification number combined with a type number. The identification number combined with a type number accesses all general and all specific concrete noun entries in Memory 90 with the word sense number identification number and type. The concrete noun without related types or a referenced concrete noun without a type designation has a type number of zero. The advantage of forming concrete noun word sense numbers with a common part and a type part is that the identification of concrete noun in the context is simplified. Often in a conversation, a concrete noun with a non-zero type number will be referenced both with the typing modifier (e.g., "food store") and without the typing modifier (e.g., "store"). A referenced noun without a typing modifier is considered as possibly referencing the related noun with a typing number if the related noun with a typing modifier has previously been placed in the context of the conversation. The search to determine if a concrete noun is already in the context in this case is accomplished by checking for a common identification number match. After a common identification number match is found, a type number match is checked for. A zero type number matches a zero type number, or a zero type number matches the most recently referenced concrete noun with a common identification number match and a non-zero type number. This latter match is verified in subsequent state representation processing. If the latter match is not acceptable, another word sense number for the concrete noun would be selected.

The next component of a concrete noun's word sense number is the specificity number. A concrete noun in a conversation can have one of three levels of specificity: general, specific known, or specific unknown as described above. The specificity number indicates the type of reference. A general reference concrete noun in Memory 90 has typical state values. A general reference concrete noun in a conversation can be represented by multiple versions with inconsistent state and property values as described in the function word adjective section. However, a specific general reference in a clause refers to a version with consistent values. The inconsistent versions of a general reference are stored in Context Memory 120, and the versions reflect the general references to the concrete noun in the conversation. Context Memory 120 contains an entry for the general reference. A version in an entry for a general reference noun contains the stated state and property values or value ranges and a type number, a specificity number which is one more than the best match specificity number, and a zero experience number (described below). The location in 90 with the general reference's type number, a zero specificity number, and a zero experience number contains or implies the location of all unstated states and properties for a version of a general reference. A specific known reference entry in Memory 90 contains all known state and property values. Unknown state and property values are assumed to be the most typical value and are stored or their location is implied in the general reference concrete noun with the same word sense identification number, the same type number, same specificity number, and zero experience number in Memory 90. A specific known reference in a conversation is stored in 120 with a word sense number which has an associated address to its entry in Memory 90. A specific unknown reference does not have an entry in Memory 90 since it is unknown. As described above, a specific unknown reference must have consistent state and property values or value ranges. The stated property and state values or value ranges for a specific unknown reference are stored in Memory 120. A specific unknown reference has a type number, specificity number as defined for a version of a general reference noun, and a zero experience number. These numbers comprise a word sense number for a specific unknown reference. The word sense number addresses a location in 90 which serves as a source for unstated property and state values or value ranges. The specificity number indicates a specific instance of a specific reference. A specific known reference has an even specificity number which corresponds to a specific instance of a type number. A version of a general reference noun and a specific unknown reference has an odd specificity number which is one more than the specific noun entry which is most similar to the version of a general reference or to the specific unknown reference.

The remaining component of a concrete noun's word sense number is the experience number. The experience number is used to select a version of a concrete noun given its word sense identification number, type number and specificity number. A zero experience number contains the typical values for a given type and specificity number. A non-zero experience number entry of a concrete noun contains the state values related to one or more experiences, and/or one or more complicated experiences requiring multiple state values. Specific reference concrete nouns can have one or more stored versions of its word sense number which are related to experiences. A specific reference concrete noun's multiple versions are accessed by the version's experience number. Each version is related to one or more specific experiences. The version contains the state values or equivalent which occurred during that experience. Associated with each non-zero experience number is an A-relation, typically a function A-relation, which selects the experience related to the experience number in Experience and Knowledge Memory 150. A specific concrete noun's experience number version only contains values which differ from the word sense number entry with the same word sense identification number, type number, specificity number and with a zero experience number. A version of a specific reference concrete noun associated with an experience number can have multiple state values or the equivalent in one or more states. Such a version represents an experience in which the states with multiple values or equivalent switch between the states. For example, the operation of a mechanical device can involve switching between states. A state of a version which has multiple values or the equivalent indicates that this state is involved in state changes related to the experience. The verb for changing the state is found in the state's location in Memory 80 which is at the address of the pointers associated with a state value of an entry in Memory 90. A verb's data structure in Memory 100 can be looked up for the experience. The looked up verb indicates all information related to the state change in Memory 100 and in Experience and Knowledge Memory 150.

Figure 17B:
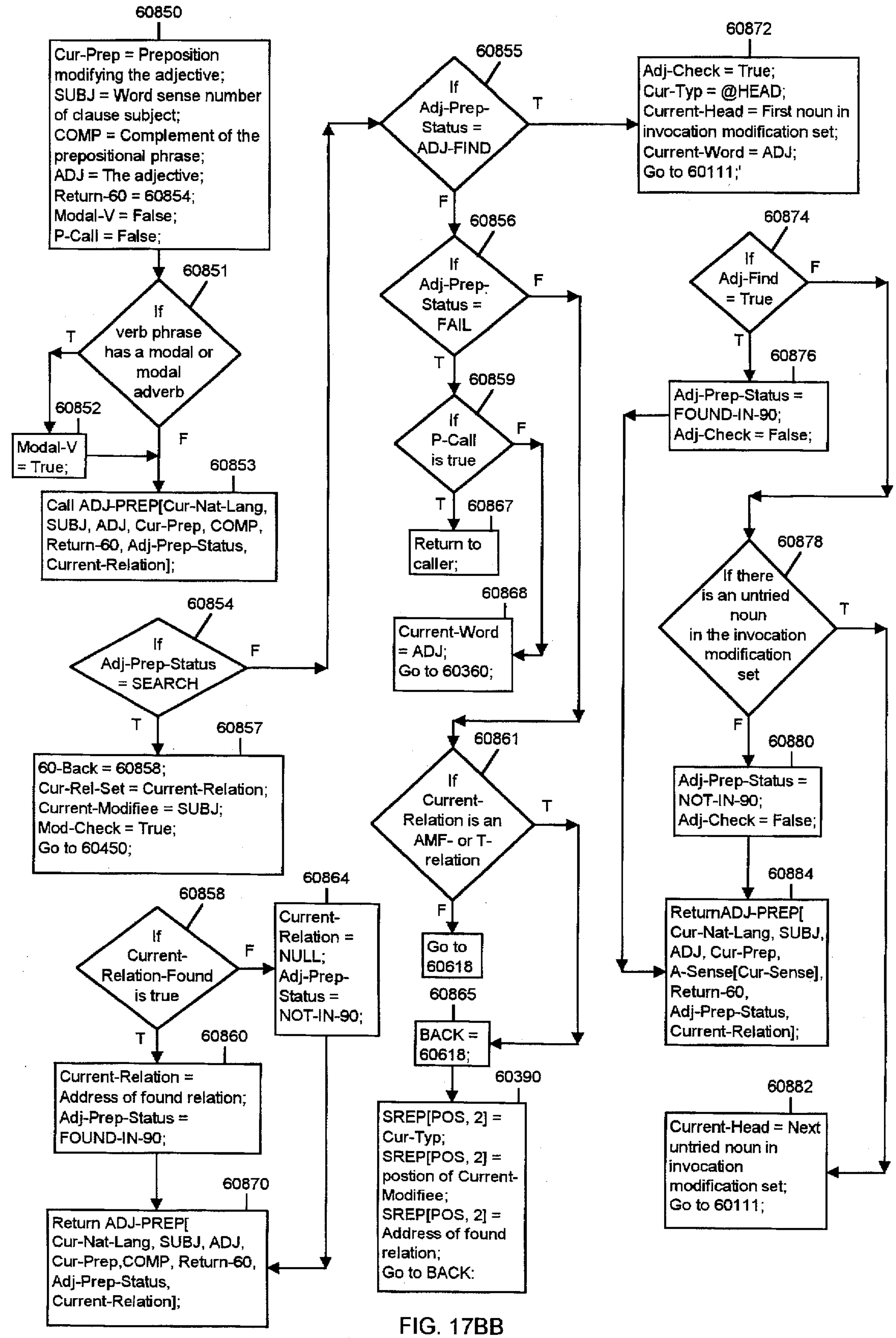

The format for a concrete noun word sense number entry in Memory 90 is depicted in FIG. 17*b*. There is an entry for each general and specific known word sense number of a concrete noun. The entry contains a word sense number; a set of state and/or property word sense numbers and address pointers with each pointer having an associated set of values, value ranges, pointers to C-descriptors, pointers to local T-descriptors, and/or pointers to S-descriptors; and a set of pointers to A-descriptors and pointers to T-descriptors. The noun word sense number in the entry corresponds to the word sense number which addresses the entry. The set of state and property pointers address the states and properties of the concrete noun in Adjective and State Abstract Noun State Representation Memory 80. Certain states may actually be result states of verbs. The state and property locations in 80 contain information about the state or property such as: implications of a state value, processes to reach a state value, experience and knowledge related to a state or property value, preceding states, succeeding states, etc. These state and properties define the concrete noun. Each state or property word sense number pointer has an associated set of one or more elements. The elements in the set are values, value ranges, pointers to C-descriptors, pointers to local T-descriptors, and/or pointers to S-descriptors. The C-descriptors and S-descriptors evaluate to a value, value range, or a relation to a value or value range. The T-descriptors evaluate to values, value ranges or a relation to the values or value ranges for the state or property and for other states and properties in the entry. The C-descriptors, T-descriptors, and S-descriptors are stored in an external relation data structure which is described below for FIG. 17*c*.

One exceptional aspect of S-descriptors is that they are also used to include what is considered adverbial relations by most grammar books. These adverbial relations are space and time position adverbials directly modifying a noun. For example, the sentence: "John was at home yesterday." has the space position adverbial, "at home", and the time position adverbial, "yesterday". These adverbials actually set the space and time positions of "John", and thus modify "John". Adverbials directly modifying a noun are treated as direct modifiers of the noun like adjective and noun modifiers. Nouns have states for time and space positions in 90. The adverbials directly modifying a noun are processed as prepositional phrases modifying the noun, and form S-Relations. Adverbs directly modifying a noun, such as "yesterday" in the above example, are actually prepositional phrases with ellipted prepositions. However, the relation function setting functions of such prepositions, i.e. prepositions of adverbials directly modifying a noun, contain a function which stores the adverbials in Context Memory 120. The reason for having time and space position states for a noun is to handle such sentences as the example sentence. The other choice is to create a dummy verb such as "to exist" which then would be the modifiee of the adverbials. With this approach, the example sentence would become: "John existed at home yesterday." The disadvantage of this approach is that extra storage would be required for this approach. In a sentence without a "to be" or "to have", i.e. in the sense of "to possess", verb, adverbials modify the verb directly. In such clauses, the time and space position adverbials modifying the verb are associated with sentence role nouns through the nouns' experience numbers in 90 or are directly obtainable in 120 if the clause is in the context of the conversation. The nouns in the sentence have experience numbers in 90 which have functional relation pointers. These relation pointers determine the verb and its adverbials, and thus imply the time and space positions for the nouns in the clause.

A state or property and a value correspond to a state representation word adjective which modifies the concrete noun. Such a state or property value may imply a degree adverb modifying the adjective so that the proper state or property value is represented. A value range corresponds to a state or property value which is approximately known as in "about six feet long". The value and value ranges are typically numerical. The numerical value selects a data structure element associated with an adjective in Memory 80. Certain states allow for multiple simultaneous components of a state value such as human emotions, e.g., "mixed feelings"; "She was sad yet somewhat happy too." The case of simultaneous occurrence of multiple state value elements is differentiated from state element changes of a complicated experience with a symbol indicating the relationship of the multiple state elements. A C-descriptor represents a state or property value set in comparison to another state or property value. A C-descriptor is generated to represent an adjective which is compared to another adjective in a conversation. Comparison of adjectives was described in the Function Word Adjective section. A C-descriptor contains the source word sense number of the concrete noun which contains the state which is under comparison. A C-descriptor also contains: the state under comparison, a value descriptor, a difference value, and a pointer to a non-empty group descriptor in a group A-relation associated with the word sense number entry. The value descriptor and value difference comprise a designation for a C-descriptor. The value descriptor contains the type of comparison, (i.e., comparative, equative, superlative), and the value relation (less, equal, more). The difference value is a pseudo difference quantity. The group descriptor contains: pointers to inclusion/exclusion criteria, and/or a pointer to the group in a superlative comparison. An entry can also contain pointers to T-relations. A T-descriptor of a word sense number entry contains a source, a value relationship, a designation, and a set of one or more state and property value elements for corresponding states and properties of the word sense number entry as described above. The source of a T-descriptor's states and properties is another concrete noun word sense number entry which has an address to its 90 location in Dictionary 20. T-descriptors are utilized for a common source of multiple state and properties. An advantage of T-descriptors is that they save storage space. A T-descriptor is implied by prepositions as described above. S-descriptors represent a concrete noun which is modified by a prepositional phrase with a concrete noun complement as described above. An S-descriptor contains a value relation, a source, and a designation. The source component of an S-descriptor contains the source concrete noun word sense number entry which contains the value, value range, or contains an S-descriptor. The location of the source word sense number entry is in Dictionary 20. The source word concrete noun contains the value or value range in its corresponding state or property as described above. If the source state contains an S-descriptor, the actual value or value range is contained in the S-descriptor chain. An S-descriptor chain corresponds in natural language to multiple consecutive prepositional phrases.

A word sense number entry of a concrete noun can also have an associated set of pointers to A-descriptors. The A-descriptors as well as the S-descriptors, C-descriptors and T-descriptors in an entry are stored in an external relation data structure which is described below. The A-descriptors of a word sense number entry contain information as described above which relates the word sense number to other concrete noun word sense numbers. The pointers to A-descriptors of an entry are separated into partitions. The A-descriptors are partitioned by the type of A-relation. The A-descriptors within a type of A-relation partition can be further partitioned. For example, the function A-relations of an entry can be partitioned into partitions of: A-relations implying a type number selection of the word sense number, modifiee in a prepositional relation, complement in a prepositional relation, modifiee in a prepositional relation with the function A-relation containing sentence roles with A-relations, complement in a prepositional relation with the function A-relation containing sentence roles with A-relations, nonfinite verb modification, morphological word@ modification, etc. These partitions of pointers to A-descriptors correspond to partitions of A-descriptors in the external relation data structure.

A word sense number entry can also contain a super-type number, i.e., the type number of the word sense number entry which has the entry as an immediate subtype. Immediate subtype means that there are no intervening subtypes. A super-type number can have an associated pointer to the type indicator. The type indicator is a modifier which indicates the subtype of the super-type, e.g., "food" is a type indicator for "store". Not all subtypes have a type indicator. One way of expressing the subtype without a type indicator is with terms such as: "a kind of" and "a sort of". The type indicators are stored in a common structure associated with entries of a word sense number with the same word sense number. This structure is the external relation data structure. A word sense number entry can also contain a set of one or more subtype numbers of entries which are subtypes of the entry. The super-type numbers and the subtype numbers form a tree structure of the related types of a word sense number. This tree is used to search for word sense number entries for selecting input word sense numbers or generating output word sense numbers for example.

The format of a concrete noun word sense number of FIG. 17_b_. described above is for a general entry. The entries of a concrete noun word sense number with a common word sense identification number are configured for achieving the following goals: selecting versions of a general reference noun, selecting an entry similar to a specific unknown reference, efficiently storing typical state and property values, and storing information for general and specific known references. The concrete noun word sense number entry with a zero type number, zero specificity number and zero experience number, the ZERO ENTRY, is used in the selection of general reference versions and the selection of an entry similar to a specific unknown reference. A specific known reference is looked up at its entry. The zero entry contains every state and property contained in a word sense number with the same word sense identification number. Every state and property in the zero entry contains a pointer to the state or property in Memory 80. The zero entry also has a pointer to the external relation data structure associated with all word sense number variations of the common noun word sense identification number. Entries other than the zero entry contain a pointer to a state or property only if that entry's word sense number has a different pointer than the zero entry. An entry has a different pointer to a state or property because it has more specifically defined state or property than the state or property addressed at the zero entry for example. As will be described below, states and properties in Memory 80 have general and specific information associated with them. Some states and properties in the zero entry are common to every word sense number with the same word sense identification number. Other states and properties are only contained in word sense number entries with certain type numbers. The zero entry serves as a selector of type numbers and certain entries of the word sense number entries with a common identification number by distinguishing the states and properties which are only in word sense number entries with certain type numbers or are only in certain entries. The distinguished states and properties contain the type numbers or entry numbers which contain these states or properties. Also, certain values for a property or state can only occur in word sense number entries with certain type numbers or in certain entries. The zero entry serves as a selector of certain entries and type numbers of word sense number entries with a common identification number by distinguishing the state or property values which are only in certain word sense number entries or in word sense number entries with certain type numbers. These distinguished state and property values have the type numbers of entries or the entry numbers which contain these values. These distinguished states and properties, and these certain state and property values are used to select type numbers and certain entries for general and specific unknown references. The type numbers and certain entries are selected by checking the states, properties, and their values of a concrete noun in the zero entry for an associated set of type numbers or certain entry numbers. The states, properties, and their values are implied by modifiers of the concrete noun and clauses containing the concrete noun which set or imply state and property values for the concrete noun.

In addition to the distinguished states, properties, and values, the states and property components of the zero entry for the word sense number entries with the same identification number contain typical values as described above. The zero entry is the generalization of all the word sense numbers with the same identification number since it contains all the states, properties and their typical values. A general reference concrete noun only has typical values for states and properties, and thus only has a zero experience number. A general reference entry has a zero or non-zero type number, zero or non-zero specificity number and zero experience number. A general reference in 90 only has a zero specificity number, but a general reference in a conversation may be best represented by a non-zero specificity number. In the remainder of this paragraph, general reference means a general reference in 90, i.e., a zero specificity number. A general reference entry only contains the typical state and property values which differ from its immediate super-type of the general reference entry. The immediate super-type is a general reference entry. The immediate super-type of a general reference entry has the general reference entry as a next level subtype. The zero entry is at the highest level of types, and hence has no super-type. If a general reference noun entry does not contain a typical value, the value is stored at the immediate or higher level super-type of the general reference noun. Thus if a missing typical value is not contained at the immediate super-type, the missing typical value can be found in a higher level super-type. Each word sense number entry which is a subtype has the type number of its immediate super-type available in its Super Type Number component of its entry as depicted in FIG. 17_b_. The zero entry has an indefinite pronoun number in its Super Type Number component. The indefinite pronoun number selects the indefinite pronoun which corresponds to the noun word sense identification number in 20 for the current natural language. A word sense number entry with a non-zero type number, non-zero specificity number and zero experience number is a generalization of a specific known concrete noun. Such an entry contains typical values for states and properties which are different from the typical values of the related general reference entry which has the same type number but zero specificity and experience numbers. This related general reference entry has the same word sense number except that its word sense number has typical values for the combination of all the specific related references. A missing state value in a specific concrete noun entry with a non-zero experience number implies that its zero experience number entry or a related general reference entry's typical value is used. The related general reference entry's typical value can be stored in its entry, or the entry of a super-type entry.

This policy of storing typical values in a hierarchy of types designated by type number has the advantage of reducing the amount of needed storage. Another advantage of this policy is that an entry only contains states and property values or their equivalent (i.e., values obtained through S-descriptor pointers, C-descriptor pointers, or T-descriptor pointers) which are different from typical values stored in the general reference type hierarchy. The stored values or equivalent are the ones which distinguish the word sense number entry. Thus, these stored values or equivalent are used for modifiers of the word sense number when the word sense number and such modifiers are converted into words for expression because such modifiers distinguish the word sense number. This policy is also flexible because when the hierarchy of types does not allow certain values to be obtained through the hierarchy, such values can be obtained with T-relations with a source having the same word sense identification number as the word sense number entry with the T-descriptor, i.e., a local T-descriptor. A word sense number entry with such a T-descriptor is related in type by the type hierarchy and is related in type to the source of the T-descriptor. This use of the T-descriptor also reduces the amount of storage.

Figure 17C:
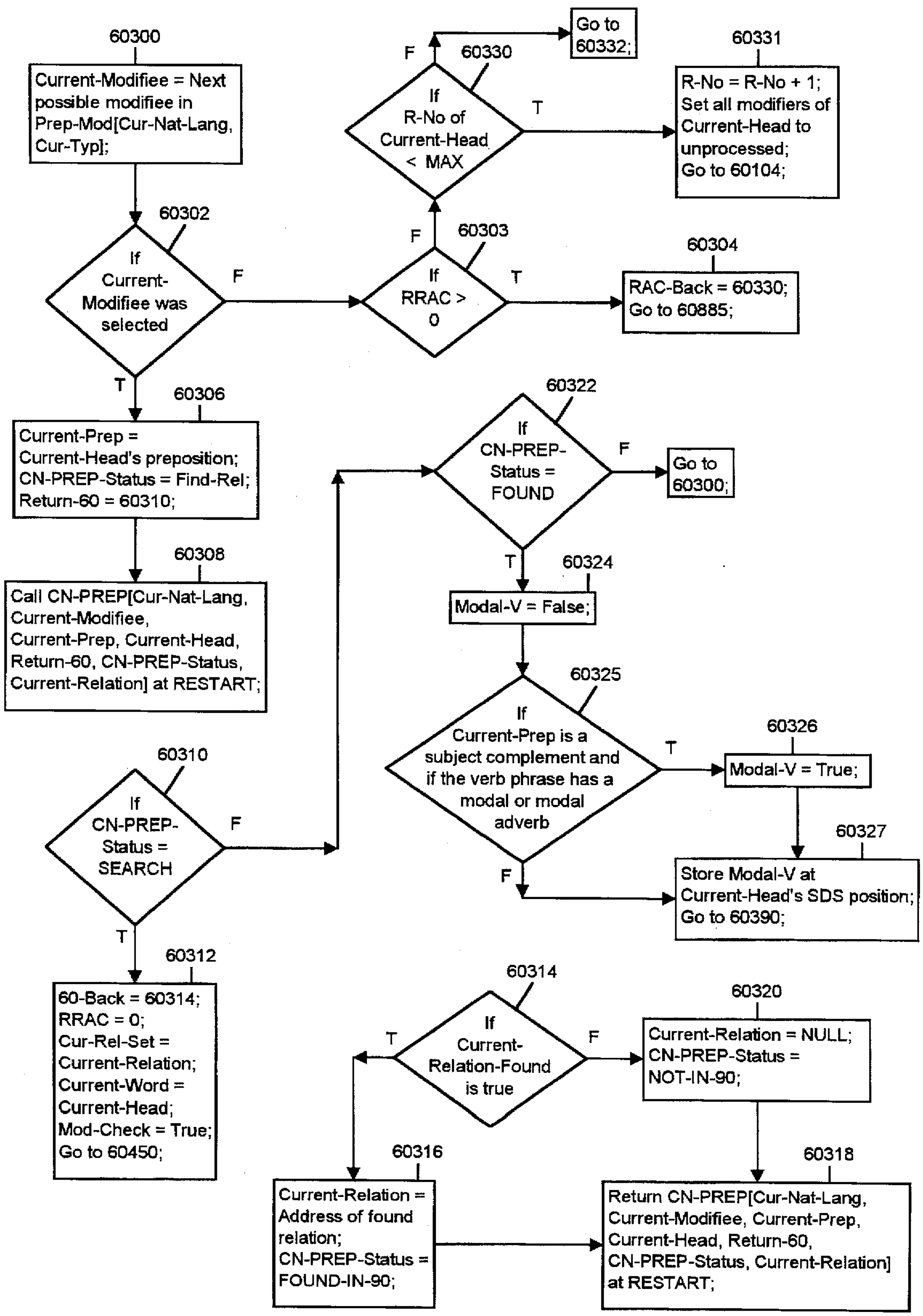
Figure 17D:
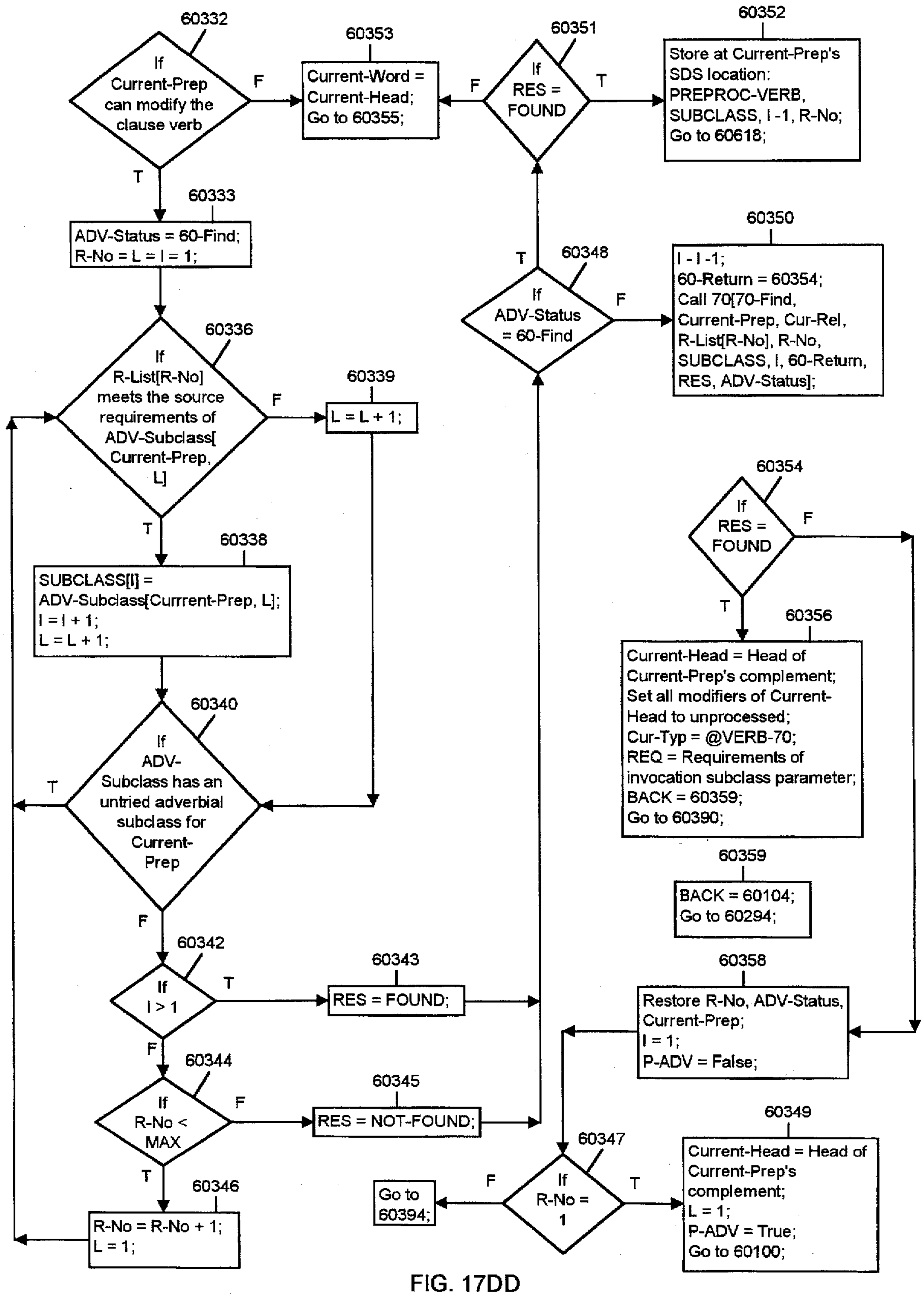
Figure 17E:
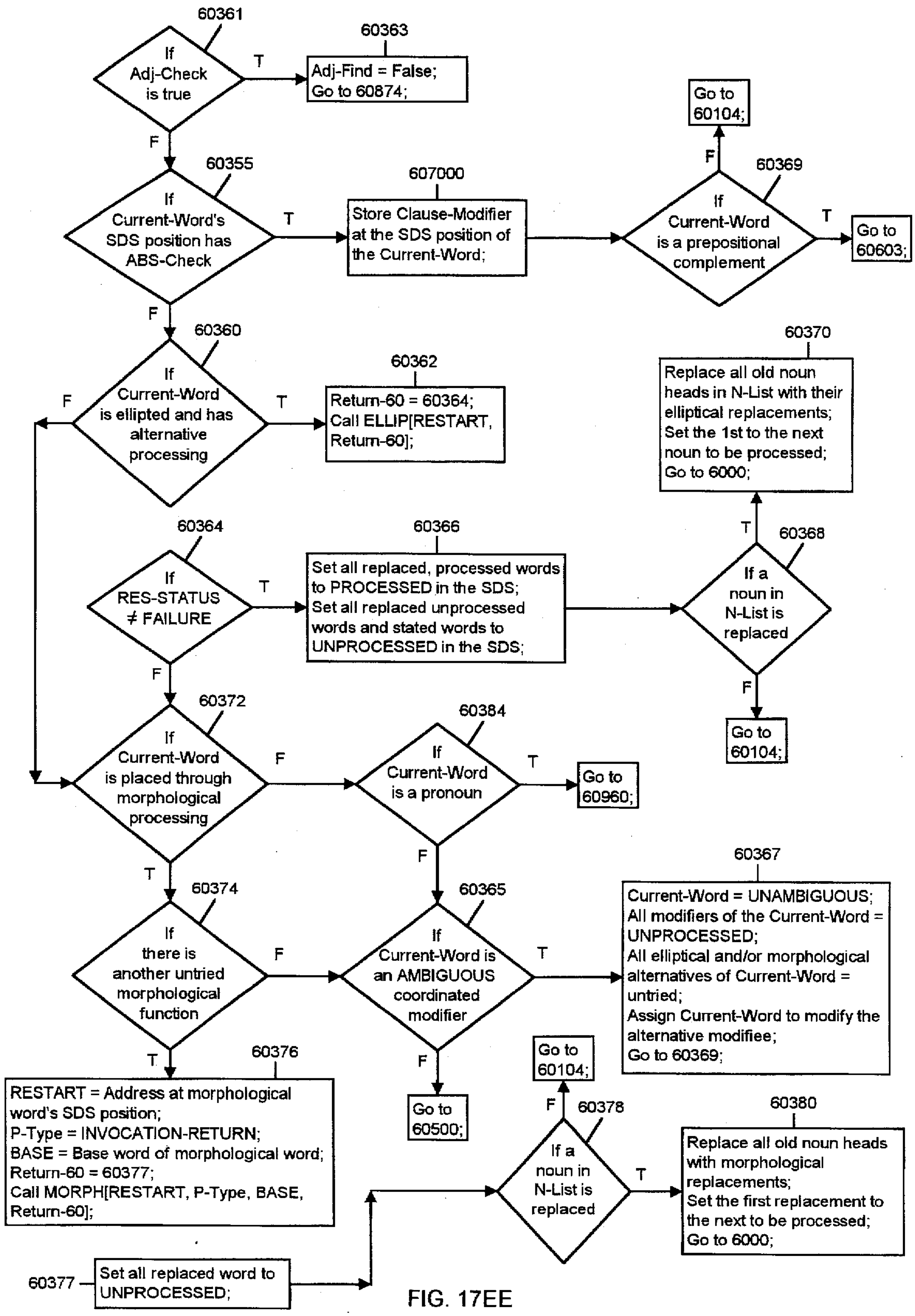
Figure 17F:
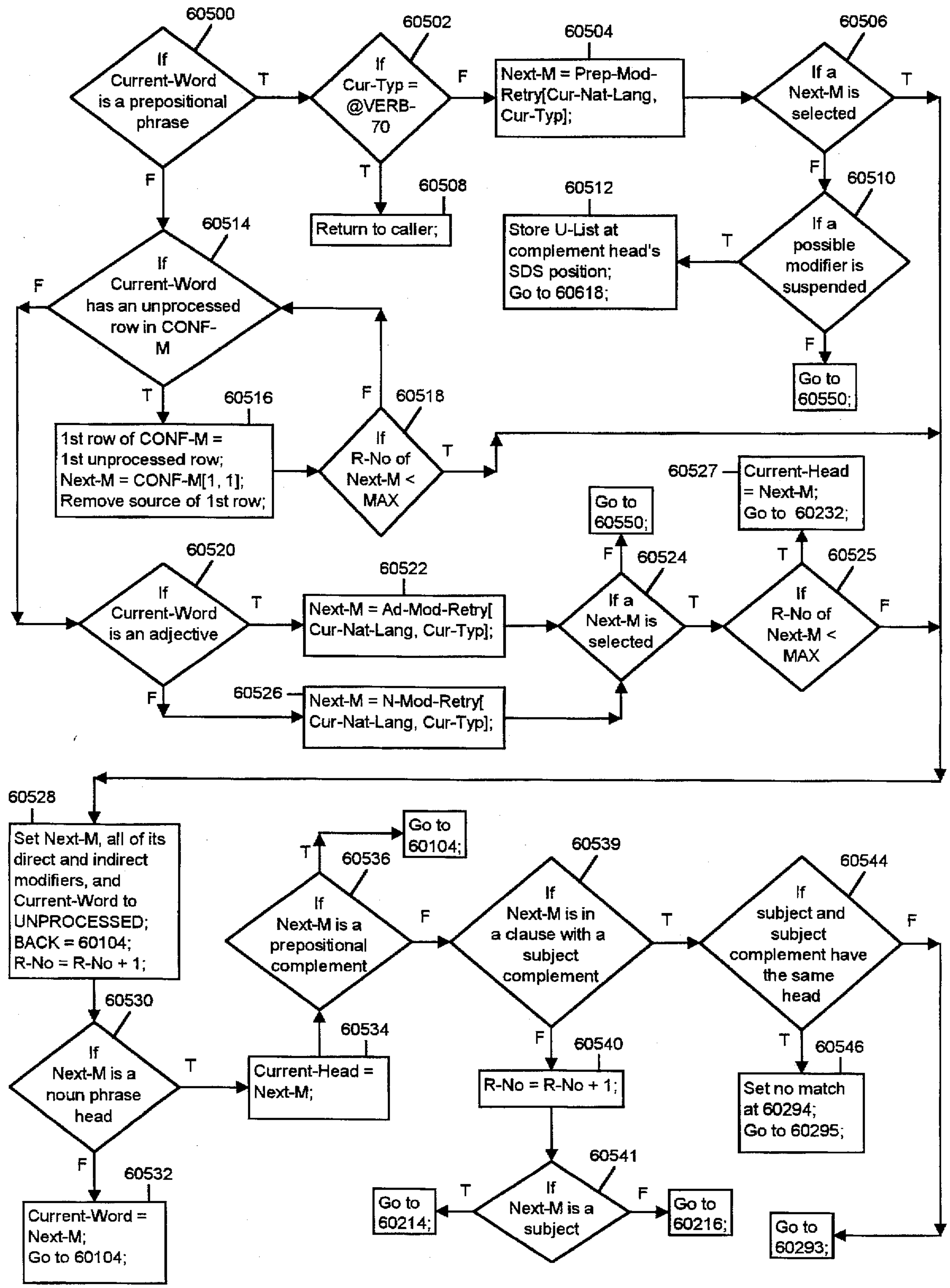
Figure 17G:
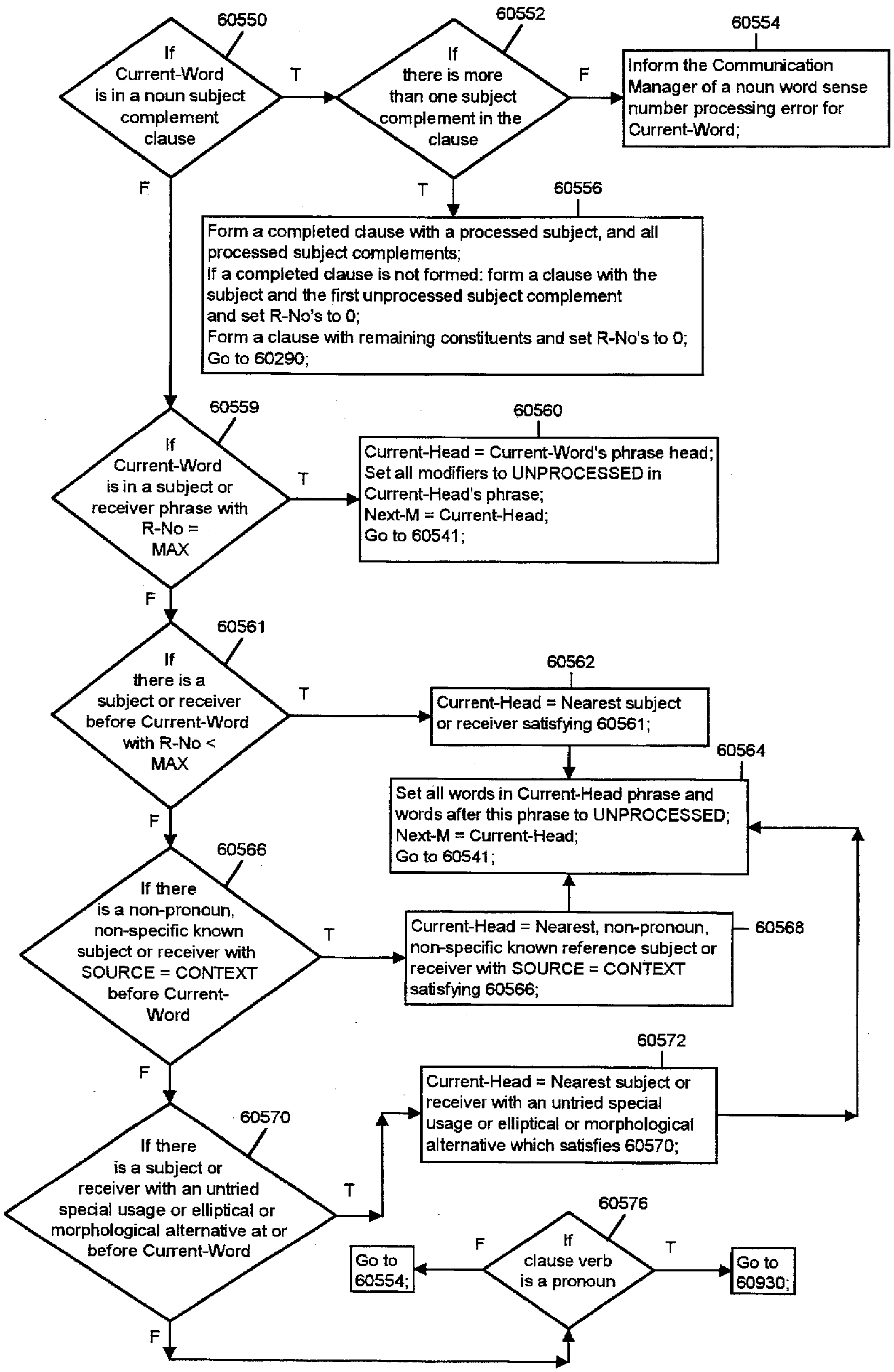
Figure 17H:
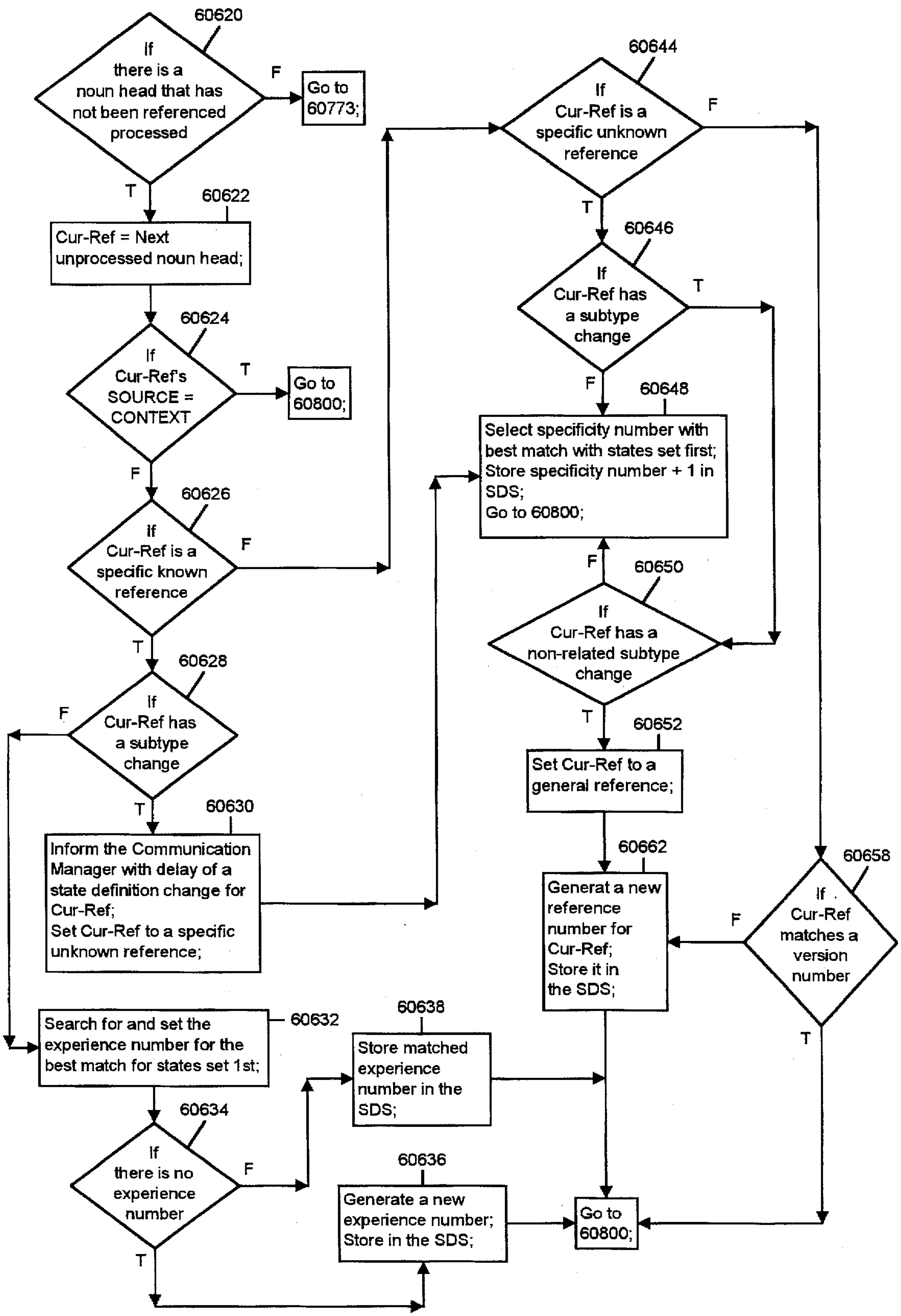
Figure 17I:
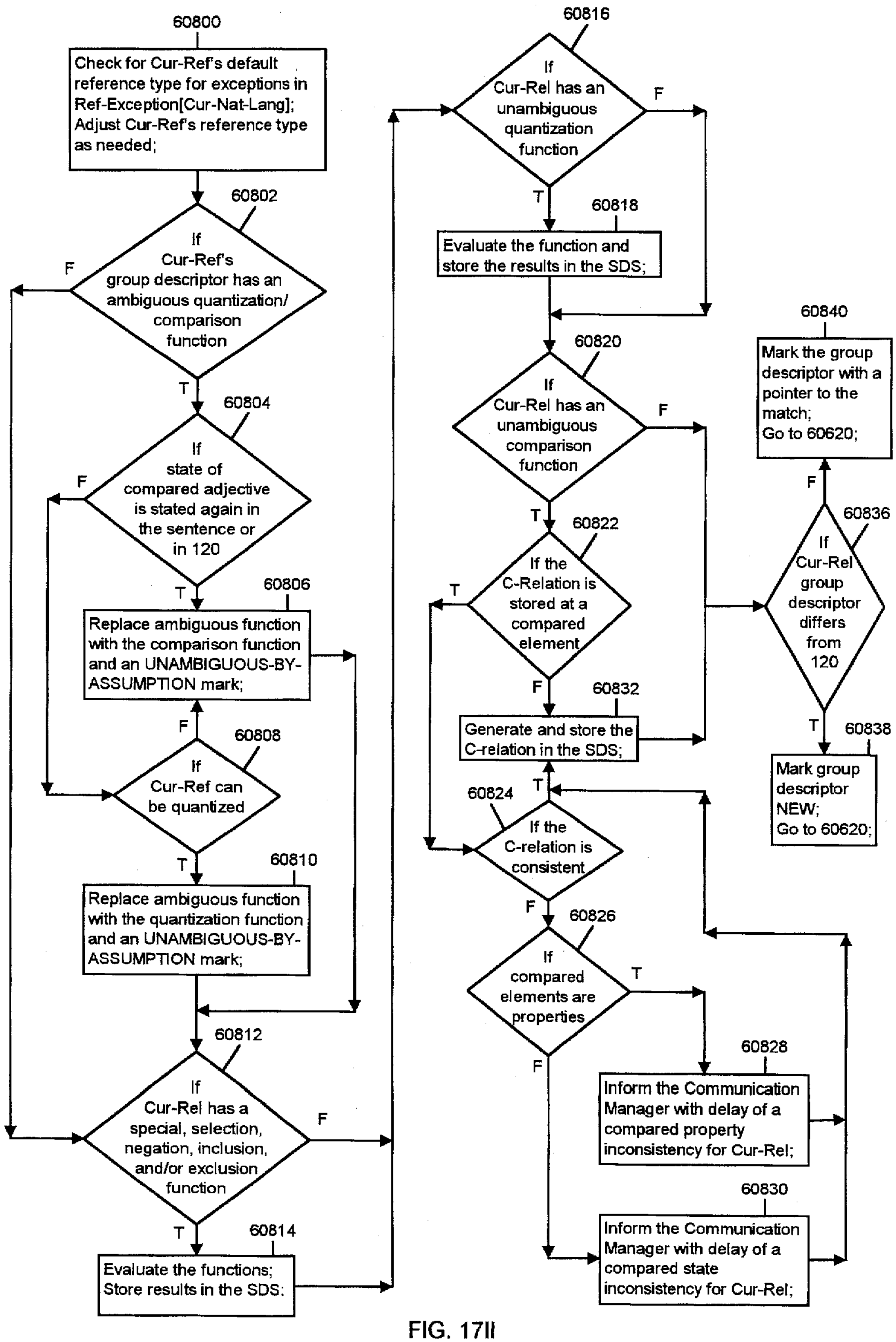
Figure 17J:
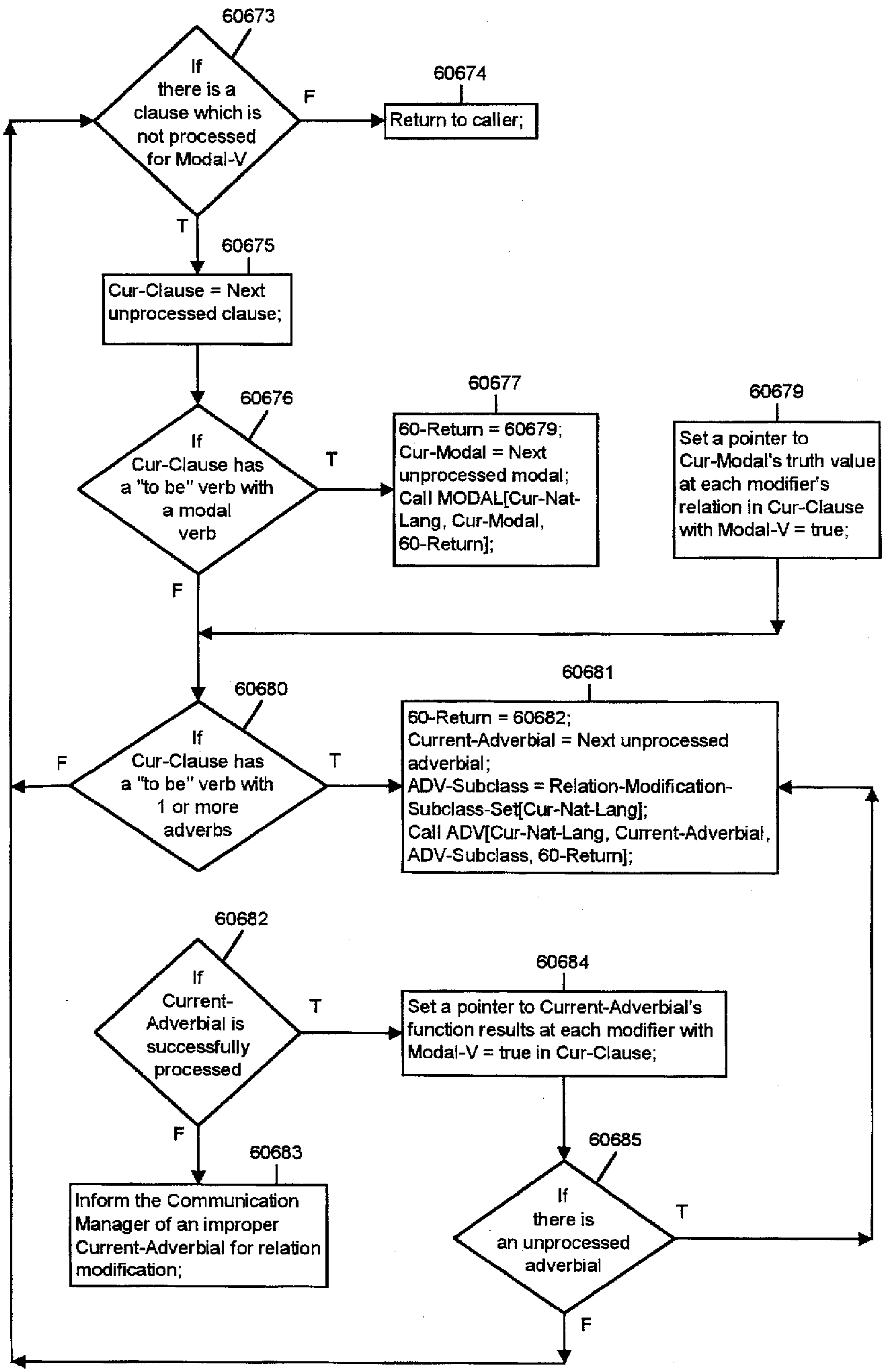

The concrete noun word sense number entries which have the same word sense identification number (but different type, specificity and/or experience numbers) own an external relation structure for selecting the word sense number entries which are compatible with a non-clausal, non-adjectival, modifier of these word sense numbers of their associated modified concrete nouns. Here, non-clausal does not include nonfinite verb and morphological word@ modifiers. The external relation structure is also used for selecting the word sense number entries of their associated concrete nouns when these concrete nouns modify other words, i.e., the external relation structure is used by the word sense numbers owning the structure for modifying other nouns and being modified by other nouns, morphological words and nonfinite verbs. A concrete noun can be premodified by nouns, nonfinite verbs, morphological words including morphological words@, and adjectives. A concrete noun can be postmodified by prepositional phrases. A concrete noun can also be modified by subject complements and appositives. An appositive modifying a concrete noun is equivalent to a subject complement modifying the concrete noun, e.g., "John, captain of the team, . . . " is equivalent to "John is captain of the team." A subject complement modifying a concrete noun is equivalent to a noun or adjective modifying the concrete noun. A concrete noun can also be modified by clauses. FIG. 17*c* depicts the External Relation Structure General Format. A single External Relation Structure is associated with all the word sense number variations of a single noun word sense identification number. Each word sense identification number has its own External Relation Structure. The External Relation Structure contains non-clausal, non-adjective, and modifier implied relations. The External Relation Structure also contains relations implied by concrete noun word sense numbers owning this structure for the modification of other modifiees.

Adjective modifiers are processed with the state and property pointers and their values are stored in the concrete noun word sense number entries as depicted in FIG. 17*b*. Clauses modifying a concrete noun are processed with the modified noun as a sentence role in the clause. Some modifiers of a concrete noun can set a type number for the modified concrete noun's word sense number. Other modifiers can apply to multiple word sense numbers with a common identifying number which own the structure. Each entry in an external relations table either has one or more type numbers and/or has one or more locations of the word sense number entries which can be in the relation of the entry's external modifier. The type number of an external data relation entry implies that the word sense number of the concrete noun owning the structure has this type number. The External Relation Structure contains a partition of modifier indexed relations. This partition contains modifiers which directly modify a concrete noun. Each entry in this partition has the relation descriptor of the relation between the modifier and the concrete noun owning the structure. The word sense number of the modifier is used to select an entry in the partition. Note that a modifying concrete noun can have a typing component. Thus there could be an entry in the External Relation Structure of "store" for "food" and "Chinese food" as in "food store" and "Chinese food store" for example. "Chinese food" has the same word sense identification number as "food", but it has a different type number. Each entry in this partition has the A-, T-, S-, or C-descriptor associated with the relation to the concrete noun implied by the modifier. S-descriptors and C-descriptors in the External Relation Structure contain the state or property in the relation. Each entry in the modifier indexed partition has type numbers or a list of word sense numbers stored in its External Relation Structure entry. The modifier indexed partition is searched when a modifier directly modifies the concrete noun. The modifier indexed entries can also be subpartitioned by the type of modifiers including: concrete nouns, types of morphological words and nonfinite verbs. Within each type of modifier subpartition, word sense numbers with a common identification number are grouped together.

In English, some relations are realized through direct modification of the concrete noun. The modifier indexed partition is searched for direct modifiers. However, it is possible that a direct modifier can be expressed as a prepositional phrase with the direct modifier as complement of the prepositional phrase modifying a concrete noun. A preposition implies the possible types of relations between the modifiee and the complement of the modifying prepositional phrase. There is another type of partition, the relation indexed partition, of an external relation structure. The relation indexed partition is designed for finding a prepositionally expressed modifier. Note that a modifier which can be expressed both as direct and prepositional modifiers are stored in the External Relation Structure in the modifier indexed partition and the relation indexed partition respectively. The motivation for storing both types of modifiers is the flexibility of expressing A-, T-, and S-relations as direct modifiers or as prepositional modifiers of concrete nouns. Also, a different natural languages may allow one or both types of modifier expression.

The External Relation Structure also contains a relation indexed partition with subpartitions. The relation indexed partition also contains direct and prepositionally expressible modifiers. One relation partition is for function A-relations. The function A-relations associated with external relations differ from stored A-relations in Context Memory 120 in that these A-relations have a verb word sense number in their External Relation Structure entry. The word sense number of the verb in these entries is used to select function A-relations associated with modifying nonfinite verbs, with modifying morphological word@, and with other function A-relations as described above for example. The function A-relations associated with nonfinite verb modifiers is selected with the word sense number of the nonfinite verb. The function A-relations associated with morphological word@ modifiers is selected with the verb word sense number associated with the base verb of the morphological word@ or a verb implied by the affixes. The other function relations are selected with a verb word sense number associated with the modifying noun or morphological word in the relation or the verb word sense number is given for a relation. The entries in the function A-relation partitions contain the A-relation descriptor associated with the external relation. The entries in the A-relation partitions also contain the types or the locations of the word sense number entries of the concrete noun owning the external relation structure which are in the function A-relation. These relation indexed function A-relations can also have subpartitions selected by: the type of modifier, modifying relations of word sense numbers owning the structure, A-relations containing sentence roles with A-relations, etc. The entries of the other relation indexed partitions of the External Relation Structure contain the A-, T- S- or C-descriptor associated with the word sense numbers owning the structure. These entries also contain the type or the word sense number entry locations of the word sense numbers owning the External Relation Structure which are in the descriptor relation. These other relation indexed modifiers can also have subpartitions selected by: the type of A-relation, a T-relation, a C-relation, an S-relation, modifying relations, modifier relations, T-relations with a source having the same word sense identification number as the destination entry of the T-descriptor (i.e., a local T-relation), etc.

FIGS. 17*d*–17*jj* contains the Concrete Noun Word Sense Number Selection Process of Selector 60. Step 18 invokes this Selector 60 process and sends a list of the nouns which are heads of noun phrases with sentence roles. Each noun in the list is processed to determine if it is already in Context Memory 120. If it is, its word sense number is known. If the noun is not in 120, the noun and its modifiers including prepositional phrases are processed. The noun head's word sense number is selected at 60 in conjunction with 70 for all noun head types: concrete noun heads, state abstract noun heads, or clausal abstract noun heads. Noun head word sense numbers have a requirement which there word sense number must satisfy. For example, if the noun head is in a sentence role, the word sense number of such a noun head is selected to be compatible with the clause verb. This word sense number has an associated requirement of state and property values which are needed for the noun to perform its sentence role with a selected word sense number of the clause verb. The modifiers of the noun are processed in the order associated with the current natural language under processing. For example, the order in English is nearest preceding first order except for function word adjectives. Function word adjectives which when processed at Step 22 had results which are functions are processed after all of a noun head's modifiers have been selected. However, exclusion and inclusion functions are processed as non-function word modifiers since they are usually prepositional phrases. Some selection function word modifiers are processed after the clause containing them is processed because they effectively select which nouns are set by the clause verb.

The modifiers of the noun head sentence role word sense number are selected to maintain the verb requirement. The verb requirement includes state and property values which the noun head must have to accomplish its sentence role. Changes of requirement states and properties are checked to see if the refined word sense number is compatible with its sentence role. A complication with the modifiers of a noun head is that often a particular modifier could modify more than one word in the noun phrase. Also, a prepositional phrase does not always modify the noun head immediately preceding it. Thus, when a modifier does not have a compatible word sense number for a modifiee, an alternate modifiee is selected. Sometimes a modifier implies a type change for its modifiee. When this occurs, the change in the modifiee must be checked for maintaining a compatible modification for its modifiee and its modifiers. Also, if the noun has a type change, it must be checked for maintaining its verb requirements. Modifiers are processed until a word sense number has been selected for each modifier. When a modifier can not modify any of its possible modifiers, a previously processed word in the phrase is selected as a modifiee according to a priority list associated with the current natural language. The selected word is processed to select another of its word sense numbers. This backtracking then selects a new word sense number of the selected word or backtracks further until a new word sense number can be selected or until all possible word sense numbers of the noun head have failed in the selection process. When a sentence role head has failed all possible word sense number selections, the Communication Manager is informed of a noun word sense number selection error. The Communication Manager has options which include trying an alternate syntax interpretation, issuing a clarifying question, or requesting new word sense numbers. A noun head which is a complement in a prepositional phrase, and which has failed the word sense number selection process, is processed for modifying another noun head in the sentence which precedes its usual modifiee, i.e., the immediately preceding noun head. If none of the preceding noun heads can be modified, and if the preposition can also modify a verb, verb modification by the prepositional phrase is checked. If all possible modifiees have failed, the usual modifiee is reprocessed for word sense number selection. Possible modifiees are checked for being modified by the prepositional phrase until a compatible modifiee is found or until all possible, word sense number processed modifiees have failed. When a all possible processed modifiees have failed, the prepositional phrase processing is suspended if there are possible, unprocessed modifiees. Otherwise, the Communication Manager is informed of the prepositional phrase complement word sense number selection failure.

CONCRETE NOUN WORD SENSE NUMBER SELECTION PROCESSING AT SELECTOR 60

The word sense number selection process of a noun begins at Step 6000. 6000 sets the Current-Word to be the next unprocessed noun in N-List. N-List is the list of nouns sent by Step 18 with the invocation of this process. N-List contains nouns which have a sentence role in a clause. 6000 also sets the Current-Head to be the Current-Word. 6001 is next and is true if the Current-Head has a MOD-INDUCED property. The Current-Head has a MOD-INDUCED property when the Current-Head is a separate reference implied by a modifier. For example, "bats" has a separate reference implied in: "wood and aluminum bats" because "bats" are not both "wood and aluminum". If 6001 is true, the Current-Head has already been processed for its word sense number, but has unprocessed modifiers. If 6001 is true, 60104 is next and begins processing of modifiers as is described below.

Coordinated Modifier Processing

If 6001 is false, processing continues at 6011. 6011 is true if the Current-Head has coordinated premodifiers with unprocessed conjunctions. If 6011 is true, 6012 sets Cur-Conj-Set to the SDS pointers of conjunctions coordinating premodifiers of the Current-Head; 60-Return is set to 6013; the conjunction process, CONJ [Cur-Nat-Lang, Cur-Conj-Set, 60-Return] is called. For, example, CONJ processes constituents for English as described for FIG. 11*b*. After processing at CONJ, 6013 is next. 6013 computes a sum of products terms for multi-level conjunctions. Each term is assigned a copy of the Current-Head as its modifiee. For example, "long and short aluminum or (long and short) wood bats" becomes "long, short aluminum bats or (long, short) wood bats" after the sum of products computation and the assignment of the Current-Head, "bats", to each term. The words in parenthesis are placed through ellipsis processing. 6013 stores the terms and the copies of the Current-Head in the SDS. Also, a copy of the Current-Head with a pointer to its product term in the SDS is added to N-List for each "or" conjunction. After 6013, or if 6011 is false, 6019 is next, and is true if the Current-Head has a modifying prepositional phrase with a coordinated complement. If 6019 is true, 6021 is next. 6021 forms a separate prepositional phrase for each separate noun phrase in a complement. The formed phrases are joined by the conjunction joining their associated complements. After 6021, or if 6019 is false, 6023 is next, and is true if the Current-Head is modified by coordinated prepositional phrases. If 6023 is true, 6027 is next. 6027 sets Cur-Conj-Set to the SDS pointer of the conjunctions joining prepositional phrases modifying the Current-Head; 60-Return is set to 6029; CONJ[Cur-Nat-Lang, Cur-Conj-Set, 60-Return] is called. After processing at CONJ, 6029 is next. 6029 computes the sum of products for multi-level conjunctions and associates a copy of the Current-Head with each term. The terms are stored in the SDS, and a copy of the Current-Head with a pointer to its product term in the SDS is added to N-List for each "or" conjunction.

Processing of Concrete Noun Phrases Already in Context

After 6029, or if 6023 is false, 6002 is next and is true if the Current-Head is in Context Memory 120 or a word sense number of the Current-Head in 120. If 6002 is false, 6016 is next. 6016 sets all of the modifiers of the Current-Head to be unprocessed. Then processing is set to continue at Step 60100. As will be described below, 60100 begins the state representation word sense number selection process as compared to the looking up of a word sense number in context. If 6002 is true, 6004 is next. 6004 generates R-List. R-List contains the MAX, an upper limit number for R-No, word sense numbers of the Current-Head which have been stored in 120. 6004 also generates A-List which contains the address in 120 of the corresponding word sense number in R-List. A-List is used to locate a selected word sense number. R-No is set to 1. R-No is the pointer in R-List of the word sense number being processed. 6004 also sets SOURCE to CONTEXT. SOURCE indicates the location where the word sense numbers in R-List came from. 6004 also sets BACK to 6006 and sets processing to continue at 60200. BACK is the location where processing continues after the process starting at 60200 has been completed. As will be described below, the process at 60200 selects a word sense number of the clause verb which is compatible for a word sense number in R-List for the sentence role of the Current-Head. If a word sense number is not selected at the process of 60200, word sense numbers of the Current-Head which are not in the context are processed at the process of 60100 as will be described below. If a word sense number is selected at the process of 60200, processing continues at 6006.

When Step 6006 is next, 6006 is true if there is an unprocessed state representation word premodifier of the Current-Head. If 6006 is true, 6008 is next. 6008 sets the Current-Word to be the next unprocessed state representation word premodifier selected with the current natural language order. For example, the premodifier selection order for English is the nearest first order. 6009 is next and is true if the modifiee of the Current-Word in a phrase in 120 which has the Current-Head as head and which also contains the Current-Word as a premodifier of a modifiee which is in the noun phrase under process. Also, the phrase in 120 which makes 6009 true must have the Current-Head with the word sense number as selected at the 60200 process, and the phrase in 120 must contain the same possible modifiees of premodifiers that have been processed before the Current-Word in the phrase under process, and the current phrase under process must be a subset of this phrase in 120 with respect to premodifiers including adjective postmodifiers. 120 stores the stated modifiers and their modifiees for noun phrases. A possible modifiee is determined for the current natural language. In English, a possible modifiee succeeds its modifier except for postmodifying adjectives which succeed their modifier. If 6009 is true, 6006 is next and processes the next premodifier. If 6009 is false, 6010 is next. 6010 sets processing to continue at 60200. 60200 selects the next word sense number as above. The 6006 to 6009 steps is a pattern matching process to select a reference to a noun previously stated in the conversation. If 6006 is false, the current reference has been matched to a previous reference for stated premodifiers. If 6006 is false, 6018 is next, and is true if the next unprocessed postmodifier is an adjective. If 6018 is true, 6020 is next and sets the Current-Word to the next unprocessed premodifier. 6020 sets a postmodifying adjective to be checked as a stated premodifier next at 6009 as above. If 6018 is false, 6022 is next and is true if the Current-Head has a prepositional phrase modifier. If 6022 is true, 6024 is next. 6024 sets up the prepositional phrase to be processed for state representation processing. The Current-Word is set to be the complement of the next unprocessed prepositional phrase postmodifier at 6024. The Current-Head is set to the Current-Word. Finally, 6024 sets processing to continue at 60100 which begins state representation processing of the prepositional phrase. If 6022 is false, 6026 is next. 6026 stores the following at the Current-Head's SDS position: SOURCE, a pointer to the Current-Heads location in 120, and PROCESSED. After 6026, 6028 is next and is true if N-List has an additional unprocessed noun. At 6026, the Current-Head has been processed for word sense number selection and the next noun head is to be processed. If 6026 is true, processing continues at 6000 for the next noun head as described above. If 6026 is false, all noun heads have been processed, and processing continues at 60607 which determines the next process to be performed and is described below.

Processing of Concrete Noun Phrases Not Already in Context

State representation processing of noun heads begins at 60100 unless the noun head has been set up for state representation processing as at 6024. This state representation processing utilizes the structures of FIGS. 17*a*, 17*b*, and 17*c* to select concrete noun head word sense numbers. 60100 sets up the noun head for state representation processing. The R-No is set to 1, and POS is set to 1 at 60100. POS is an index variable for SREP (described below) which stores information for the current interpretation of the state representation of the Current-Head's noun phrase. Adj-Find is set to false. Adj-Find is a process state variable which is used to store the state of a requirement for finding out if a given adjective can modify a given concrete noun. For example, the prepositional modification process of an adjective of the current natural language can require the determination of an adjective's capability to modify a concrete noun as described for English in the process of FIG. 8*d*. 60100 also sets Prep-Check to the number of prepositional phrases joined with "and" which are modifying the Current-Head. Prep-Check is used to select when to consider the possibility that a prepositional phrase modifying the Current-Head implies a separate reference to the Current-Head as in: "schools of Chicago and of New York". That example is an ellipsis of "schools of Chicago and schools of New York". The separation is considered when a prepositional phrase can not modify a Current-Head and Prep-Check is greater than 0.

Pronoun Processing

After 60100, 60102 is next and is true if the Current-Head is stated as a pronoun. If 60102 is true, processing continues at 60950. 60950 is one entry to the interface to PRO-SEL, the pronoun selection process, e.g., as described for English in FIG. 6*b*. 60950 is true if SC-M is true. SC-M is true if there is to be a category match of the subject and subject complement in a clause with a "to be" verb. SC-M is initially set to false upon start up of Selector 60. SC-M is set to true when necessary in processing described below. If 60950 is true, 60951 sets CATG to the category of the subject which has already been processed when SC-M is true. CATG is an invocation parameter of the PRO-SEL process. CATG is used to specify a specific category of a pronoun referent. If 60950 is false, 60952 sets CATG to null. In this case, no specific category is needed. After 60951, or after 60952, 60953 is next, and sets other invocation parameters for calling PRO-SEL, the pronoun selection process. C-Pro, the pronoun to be processed, is set to the Current-Head. INIT, the PRO-SEL starting location, is set to START which implies beginning the process the first time for C-Pro at 60950. Another entry to this interface of PRO-SEL is accessed when a pronoun has failed the word sense number selection process at 60384, which is described below. This other entry is 60960. 60960 sets C-Pro to the Current-Word, sets INIT to RESTART and sets CATG to null. After 60960 or 60953, 60954 is next, and is true if C-Pro has a CATAPHORIC-PROPERTY stored in its SDS position. 60954 is true if C-Pro is being processed for a cataphoric referent. If 60954 is true, 60955 sets INIT to RESTART; PROP is set to CATAPHORIC, Not-Cata is set to false. INIT is set to RESTART because C-Pro has been processed before. PROP is set to CATAPHORIC to signal PRO-SEL to select a cataphoric referent as described above. Not-Cata is set to false because C-Pro did not have an anaphoric referent. Not-Cata is used to distinguish the case where PRO-SEL first determines that C-Pro requires a cataphoric referent. This case requires suspension of the processing of the clause containing C-Pro because the referent has not been processed. In other cases, 60 has been restarted after the possible referent has been processed either in the part of the sentence after C-Pro, or in the succeeding sentence as described above. If 60954 is false, 60956 sets PROP to null, and sets Not-Cata to true. After 60955 or 60956, 60958 sets SC-M to false, and sets 60-Back, the return address from PRO-SEL, to 60970. 60958 then calls PRO-SEL[Cur-Nat-Lang, INIT, C-Pro, PROP, CATG, 60-Back]. After PRO-SEL completes its processing as described above, 60970 is next, and is true if C-Pro's SDS position contains CATAPHORIC-PROPERTY and Not-Cata is true. If 60970 is true, C-Pro requires a cataphoric referent which has not been processed, and 60972 is next. 60972 sets Suspend-Head-Clause to true, and sets processing to continue at Step 18. This suspends processing of the current clause and returns processing to 18. If 60970 is false, 60971 is next, and is true if C-Pro is a noun phrase head. If 60971 is true, processing continues at 60103 which is described below. If 60971 is false, processing continues at 60104 which processes noun phrase modifiers as is described below.

Possible Word Sense Number List Generation

After 60974, or if 60102 is false, 60125 is next, and is true if REQ-Sel is true. If 60125 is true, 60 has been called by Selector 70 to determine if a specific word sense identification number of a specified Current-Head will have a word sense number which meets the specified requirements of the Current-Head's verb(s) after selecting the Current-Head's complete word sense number for the Current-Head's modifiers. This process is described in more detail in the Unassigned Sentence Role Processing section of Selector 70's word sense number selection process. If 70125 is true, processing of the Current-Head's modifiers begins at 60104 as is described below for any Current-Head. If 60125 is false, 60103 is next. At 60103, if the Current-Head is not a pronoun, and if the Current-Head does not have an R-List, an R-List is formed with the MAX, a program variable, word sense numbers of the Current-Head. The order of word sense numbers in R-List is in the order of word sense numbers in 120 in the most recent reference first order followed by the word sense numbers of the Current-Head stored in Dictionary 20. If the Current-Head is a pronoun, R-List is formed with the MAX referents in the reference list stored in the Current-Head's SDS position. The Current-Head could already have an R-List from 6004, or, as will be described below, the Current-Head could already have an R-List from processing at Selector 70. The reference list was stored by the pronoun selection process as described above from references in the sentence or Context Memory 120. If the Current-Head has an R-List from 6004 and is not a pronoun or a specific known reference, 60103 expands the R-List to include word sense numbers which are not in 120. The word sense numbers of a specific known reference and the word sense numbers from 120 contain identification numbers, type numbers, specificity numbers, and experience numbers to the extent they are known. The Dictionary 20 word sense numbers in R-List contain identification numbers. 60103 sets BACK, a return processing location, to 60104. The SOURCE is set to MEMORY for a noun and to CONTEXT for a pronoun. After 60103, processing continues at Step 60260.

Preliminary, Clause Compatible Noun Head Word Sense Number Selection

Step 60260 begins the general process for selecting a word sense number in R-List which is compatible with the clause verb. 60260 is true if the Current-Head is a concrete noun. If 60260 is true, 60261 is next and is true if the Current-Head is coordinated with other noun constituents, and there is a constituent without an R-List. If 60261 is true, processing continues at 6000 which selects the next constituent in N-List as described above. If 60261 is false, processing continues at 60200. If 60260 is false, the Current-Head is an abstract noun. As is described in more detail below, abstract nouns are closely related to concrete nouns. The entries in a R-List for an abstract noun are obtained in the same way that is utilized for concrete nouns. State abstract nouns are variations of a concrete noun in the sense that a state abstract noun has a state representation structure which is a special case of a concrete noun. State abstract nouns differ from concrete nouns in that the represent states. Thus, state abstract nouns have pointers to state data structures in Memory 80. However, since the state abstract nouns have a data structure which is a special case of a concrete noun, state abstract nouns also have a data structure in Memory 90. This data structure in 90 is used to select the word sense number of a state abstract noun with the same process utilized to select concrete nouns in Selector 60. Clausal abstract nouns are equivalent to a noun modified by a subordinate clause. The noun modified by this clause is a concrete noun or possibly a state abstract noun. The modifying clause defines the modified noun in the sense that the clause is typically used to select a concrete noun or state abstract noun in the context which the clausal abstract noun represents as is described below. Clausal abstract nouns also have a state representation structure which is a special case of a concrete noun in 90. A word sense number of a clausal abstract noun also has a pointer to its modifying clause in Memory 100. Clausal abstract noun heads and their modifiers are also initially processed for word sense number selection with the same process in 60 used for concrete nouns. One difference is that a modifier of a clausal abstract noun may actually modify a constituent in the modifying clause or may modify the noun in context which the clausal abstract noun represents. Thus, a modifier does not have to directly modify the clausal abstract noun. This word sense number selection process of the clausal abstract noun then places certain requirements upon the noun to be selected from the context. These requirements and the defining clause are used to select a noun in the context if possible. If it is not possible to select a noun from the context, the clausal abstract noun is not replaced, and such a clausal noun is typically represented by a general reference pronoun, e.g., "something", or by a general reference noun. If 60260 is false, 60266 is next and is true if the Current-Head is a state abstract noun. If 60266 is true, 60268 stores STATE-ABS at the SDS position of the Current-Head, and sets processing to continue at 60261 as is described above. If 60266 is false, 60270 stores ABS-Check in the Current-Head's SDS location, and processing is set to continue at 60261 as is described above. ABS-Check is used for identifying clausal abstract nouns. A clausal abstract noun modifier may modify the noun or an element in the clause. ABS-Check is used to identify the need to mark a modifier for processing at 70 and to proceed to the next modifier. If 60260 is true, or after processing at Selector 70, 60200 is next.

The process at 60200 selects a word sense identification number for a sentence role noun head so that the identification number is consistent with its sentence role. For example a subject's word sense identification number is selected so that there is a verb word sense number which is consistent with the subject. 60200 is true if R-No is less than MAX which implies there is an untried word sense number in R-List. If 60200 is false, it is possible that the R-List can be expanded to include word sense numbers not in 120. If 60200 is false, 60232 is next and is true if SOURCE =CONTEXT and the Current-Head is not a specific known reference and not a pronoun. If 60232 is true, the word sense numbers in 120 failed to select a compatible word sense number and 60234 is next. 60234 sets R-No to be MAX+1, and also sets processing to continue at 60103 which sets all the possible word sense numbers of the Current-Head to be considered in a new R-List. Setting R-No causes only word sense numbers not in 120 to be considered. If 60232 is false, processing continues at 60550 which determines if there is a possible alternative or if processing has failed. The process at 60550 is described below. If 60200 is true, 60201 is next and is true if the Current-Head is an unpreprocessed subject in a clause without a "to be" verb and without an adjective or prepositional phrase subject complement, an unprocessed receiver, an unprocessed subject complement, an unprocessed object complement, or an unprocessed appositive. Here unpreprocessed refers to the processing performed at Selector 70 prior to noun word sense number selection. The processing at 70 is described below. If 60201 is false, the Current-Head is an unprocessed subject with an adjective or prepositional phrase subject complement, or is a prepositional complement and 60208 is next. 60208 is true if P-ADV is true. P-ADV is true for a complement of a prepositional phrase modifying a verb when processing is requested by Selector 70. If 60208 is true, processing continues at 60336 which processes the complement for adverbial modification as is described below. If 60208 is false, processing continues at 60104. 60104 begins the process of processing the modifiers of the subject or prepositional complement as described below. This subject or prepositional complement modifying a noun does not have any verbal criteria for selecting its word sense identification number. If 60201 is true, 60203 is next, and is true if the clause has a noun or pronoun subject, a "to be" verb, and an unprocessed noun or pronoun subject complement. Here, the subject complement is unprocessed if it does not have an R-List. The subject can be a concrete noun, state abstract noun, or clausal abstract nouns. If 60203 is true, 60204 is next. 60204 sets the Current-Head to be the subject complement, sets SC-M to true, and sets processing to continue at 6000 which processes the subject complement as described above. SC-M is set to true to cause a subject complement which is a pronoun to have the same category as the subject. If 60203 is false, 60206 is next, and is true if the clause contains a processed noun subject, a "to be" verb, and a processed noun subject complement. 60206 uses the same types of nouns as for 60203. If 60206 is true, processing continues at 60280.

Subject/Subject Complement Preliminary Word Sense Number Selection

60280 begins a process to select matching word sense numbers, i.e., R-No's, for a subject and subject complement. This process includes creating clauses for coordinated subjects and/or subject complements. 60280 is true if there are unprocessed conjunctions joining the subjects and subject complements. If 60280 is true, 60281 is next, and is true if there is a word implying a respective function for coordinated subjects and subject complements, e.g., "Bill and John are respectively president and vice-president." "respectively" is a word implying a respective function. If 60281 is true, 60282 forms a clause for each subject composed of the subject, a "to be" verb and the subject's corresponding subject complement(s). When a clause is formed with a "to be" verb in this section, the number is appropriate for the subject, and the tense is the same as the tense in the stated clause. The formed clauses are joined by the subject conjunction(s). After 60282. 60290 is next, but is described below. If 60281 is false, 60283 is next, and is true if the current clause contains coordinated subjects. If 60283 is true, 60284 sets Cur-Conj-Set to all the conjunctions joining subjects in the current clause; 60-Return is set to 60285; and 60284 calls the conjunction selection process: CONJ[Cur-Nat-Lang, Cur-Conj-Set, 60-Return]. After CONJ, as described above for English for FIG. 11*b*, completes processing, 60285 is next. 60285 forms a clause for each coordinated noun phrase subject composed of a: a coordinated noun phrase subject, the "to be" verb phrase of the stated clause, and the subject complement(s). The formed clauses are joined to each other with the conjunction(s) joining its subject. After 60285, or if 60283 is false, 60286 is next, and is true if the current clause contains coordinated subject complements. If 60286 is true, 60287 sets Cur-Conj-Set to all the conjunctions joining subject complements in the current clause; 60-Return is set to 60288; and 60287 calls the conjunction selection process: CONJ[Cur-Nat-Lang, Cur-Conj-Set, 60-Return]. After CONJ, for each clause stated or formed at 60285, 60288 forms a separate clause for each primitive group of subject complements joined by an "or" conjunction composed of: the subject, the "to be" verb phrase of the stated clause, and the primitive group of subject complements. Each formed clause is joined by an or" conjunction. A primitive group is a single noun phrase or a group of noun phrases only joined by an "and" conjunction. After 60288, 60289 is next, and is true if one or more clauses has been formed in 60285 or 60288. If 60289 is true, or after 60282, 60290 removes the noun phrases in the current clause's subject and subject complements from N-List; the current clause is also removed from the SDS; each subject and subject complement noun phrase in a formed clause is added to N-List; and each formed clause is added to the SDS.

After 60290, or if 60289 is false, or if 60280 is false, 60291 is next and is true if the current clause or a formed clause has not been preprocessed for matching, e.g., the R-No, of the subject and subject complement(s). If 60291 is true, 60293 searches a subject's R-List for containing a word sense number that matches with a word sense number in each subject complement's R-List for certain subjects and subject complements. This search is only performed for a subject and a subject complement(s) which are the same type of noun, i.e., both concrete nouns, both state abstract nouns, or both clausal abstract nouns. There is an additional match process between certain noun types described below in this paragraph. State abstract nouns are not matched with concrete nouns at 60293. 60293 forms a separate clause for the case where one sentence role (subject or subject complement) is a state abstract noun, and where the other sentence role (subject complement or subject) is a concrete noun. The subject and subject complement(s) meeting the conditions of the previous sentence are said to have incompatible noun types. Concrete nouns and clausal abstract nouns are compatible noun types with respect to themselves and each other. If the current clause contains subject complements with both compatible and incompatible noun types, 60293 forms a separate clause with the subject, the "to be" verb, and the one or more subject complements that have incompatible noun types. The sentence roles of the formed clauses have there new SDS position updated in N-List. Also, the incompatible noun type subject complements forming the separate clause are removed from the current clause. A clause with an incompatible noun type subject and one or more incompatible noun type subject complements is processed at 60299 which is described below.

The search at 60293 for matching a concrete noun subject and a concrete noun subject complement(s), for matching a state abstract noun subject and a state abstract noun subject complement(s), or for matching a clausal abstract noun subject and a clause abstract noun subject complement(s), begins at the current R-No of each sentence role's R-List. A match occurs when word sense numbers from each R-List have the same or compatible identification number component of their word sense numbers, and have compatible type numbers. Two identification numbers are compatible if the class number component of the identification number is a subclass of the other class number. If the two identification numbers are compatible, the type numbers do not have to be compatible. Two type numbers are compatible if one type number is equal to or is a subtype of the other type number. The search for matching a concrete noun and a clausal abstract noun, for matching a state abstract noun and a clausal abstract noun, or for matching a clausal abstract noun and a clausal abstract noun also begins at the each noun's R-No. This second type of match for a clausal abstract noun to a clausal abstract noun only occurs if there was not a word sense number match between them. A match occurs when the concrete noun, the state abstract noun, or the clausal abstract noun can be a representational referent of the clausal abstract noun. The representational referent is the noun in the context defined by the modifying clause, and it is defined in detail below in the Clausal Abstract Noun section. A noun can be a representational referent when the noun matches a direct or indirect category of the clausal abstract noun. When two clausal abstract nouns are matched for this second type of match, the direct and indirect categories of each clausal abstract noun are checked for matching the other clausal abstract noun until a match is found. These categories are also described below with representational referents.

After 60293, 60294 is next, and is true if a match is found at 60293. If 60294 is true, 60295 sets R-No to the value of the match for the subject and each subject complement, and 60295 stores the category for a subject and each subject complement which are matched to clausal abstract noun category at the clausal abstract noun with the matched category in the SDS. If no match was found, and if R-No or a category is not stored in the SDS, R-No is set to 1, and the category number is set to 1 as needed. If 60299 precedes 60294 as described below for example, no match has been found, and R-No or a category number is not stored. If no match was found, and if R-No or a category number is stored in the SDS, R-No or the category number is not changed. The case in the previous sentence occurs when a clause is reprocessed. Reprocessing of a clause is caused by failure to select the word sense numbers of the modifiers of a subject or subject complement in a clause with a noun subject complement. The R-No or category number is not changed in this case since alternate interpretation of the unmatched, reprocessed clause will begin at the next untried R-No and category number if needed. If a match was found at 60293, 60295 sets REQ for the subject and each subject complement to be the match rule of subject/subject complement R-No's/category numbers. REQ is used to ensure that relations between words is maintained. 60295 sets the Current-Head to the subject being processed, sets BACK to 60296, and sets processing to continue at 60392 for the subject. 60392, which is described below, will store information related to the subject and subject complement including: the matched word sense number, category number if needed, REQ, and the word's sentence role. After processing at 60392, 60296 is next. 60296 sets the Current-Head to be the next subject complement which has not been processed at 60392; BACK is set to 60296 if there is an additional unprocessed subject complement, or BACK is set to 60291 if the Current-Head is the last unprocessed subject complement; processing is set to continue at 60392.

If 60294 is false, 60293 has failed to match the subject and subject complement(s), and 60297 is next. 60297 is true if the SOURCE value for the subject or subject complement(s) is CONTEXT. If 60297 is true, the corresponding R-List only contains word sense numbers which have been stored in 120 for the conversation. If 60297 is true, 60298 forms an R-List as at 60103, which possibly includes other word sense numbers not in 120, for each subject and subject complement with a CONTEXT SOURCE. After 60298, 60293 is next as above. If 60297 is false, 60299 composes a new subject complement(s) composed of the subject being modified by a subject complement. Setting the subject to be modified by the subject complement sets up this new subject complement phrase to be processed for the case where there is a non-equative relation between the subject and subject complement. 60299 is utilized for a case such as: "The pan is iron." which is transformed to: "The pan is (the) iron pan." "(the)" is transferred to ensure that the proper reference type, e.g., specific, is selected for "pan". If there are more than one subject complement, each subject complement phrase is replaced with the subject complement modifying the subject. 60299 also sets the subject to PROCESSED at the subject's SDS position. This causes the subject to effectively be removed from further processing. After 60299, 60295 is next. If 60295 is processed after 60299, R-No or the category number will be set to one for the head of each subject complement phrase. After 60295, 60296 is next as above. Eventually, processing will continue at 60291, and all clauses will have been preprocessed which makes 60291 false. If 60291 is false, 60292 sets the Current-Head to the next UNPROCESSED subject or subject complement, which is unprocessed with respect to its modifiers, in a stated or formed clause with a noun subject and subject complement; BACK is set to 60104; and processing is set to continue at 60104 which begins the process of selecting the word sense numbers of the modifiers of the noun phrase of the Current-Head. The process starting at 60104 is described below.

Initiation of a Pronoun Verb Processing

If 60206 is false, the current clause does not have a concrete noun subject expressed as being equivalent to a concrete noun subject complement. If 60206 is false, 60211 is next and is true if the Current-Head is an unpreprocessed subject with respect to 70 processing. If 60211 is true, 60212 is next and is true if the clause verb is a pronoun. If 60212 is true, processing continues at 60940. 60940 begins a process to select the word sense numbers of the clause verb with the Pro-Sel process. 60940 sets INIT to START, and sets RETRY to false. Next, 60941 is true if the verb's SDS position contains a CATAPHORIC-PROPERTY. As for a noun, a CATAPHORIC-PROPERTY implies the verb has a cataphoric referent. If 60941 is true, 60942 sets PROP to CATAPHORIC, and Not-Cata-V, the verb equivalent of Not-Cata, to false. If 60941 is false, 60943 sets PROP to null, and Not-Cata-V to true. After 60942, or after 60943, 60944 sets C-Pro to the clause verb, sets 60-Back to 60945, and sets CATG to null. 60944 calls Pro-Sel[Cur-Nat-Lang, INIT, C-Pro, PROP, CATG]. After processing at Pro-Sel, 60945 is next. 60945 is true if the verb's SDS position contains a CATAPHORIC-PROPERTY and Not-Cata-V is true. If 60945 is true, the verb has an unprocessed cataphoric reference, and 60946 is next. 60946 sets all words in the current clause to unprocessed, sets Suspend-Verb-Clause to true, and sets processing to continue at Step 18. Step 18 restarts processing of the clause when a possible referent has been processed as described for the equivalent noun case. If 60945 is false, 60947 is next. 60947 is true if RETRY is true. RETRY is true when another category of referent type has been found for the verb. RETRY is set to true in another path which accesses this process at 60930 and is described below. If 60947 is true, 60932 is next, and is described below. If 60947 is false, as it would be when this process is accessed from 60213, 60948 is next. 60948 forms an R-List from the possible referents of the verb, sets the verb's word sense number to be R-List[1], sets its R-No to 1, and sets processing to continue at 60214.

Selecting Preliminary Noun Phrase Word Sense Numbers in a Clause with a non-"to be" Verb After 60948, or if 60212 is false, 60214 is next. 60214 sets invocation parameters for a Selector 70 process that is described below. Selector 70 selects a word sense number of the clause verb starting at the R-No in the verb's R-List which is compatible with an untried word sense number of the subject R-List starting at the R-No of the subject. Also, 70 handles the case of coordinated subjects and/or coordinated verbs as is described below. 60214 sets the clause subject parameter, 70-SEL-D to contain a pointer to the R-List of the Current-Head. The clause verb parameter, 70-SEL-V, is set to a pointer to the clause verb location in the SDS, or its word sense number if the verb is a pronoun. 70 looks to see if there are coordinated subjects and/or verbs. The clause object parameter, 70-SEL-R is set to null. The selection type operation parameter, 70-TYP-SEL is set to DV; DV implies that a word sense number in R-List as the clause subject, a compatible verb word sense number, and a compatible direct and/or indirect object are to be selected. After 60214, 60217 is next. 60217 sets 60-Return to 60230. Then 60217 calls Selector 70[70-TYP-SEL, 70-SEL-D, 70-SEL-V, 70-SEL-R, R-No, REQ, 60-Return]. REQ is a return value from 70 which contains a pointer to the requirements of the selected noun word sense number for the selected verb word sense number. R-No is a return parameter with the value of the verb's R-No.

If 60211 is false, 60215 is next and is true if the Current-Head is a unpreprocessed object with respect to 70 processing. An object is a direct object or an indirect object. 60215 is reached after the subject(s) have been processed for selecting compatible word sense numbers of the subject's modifiers. If 60215 is true, 60216 is next and sets parameters for Selector 70. 60216 sets 70-SEL-D to be the selected word sense number of the clause subject. 70-SEL-V is set to the selected word sense number of the clause verb. 70-SEL-R is set to a pointer to R-List. 70-TYP-SEL is set to R; R implies that a word sense number in R-List as a clause object is to be selected so that this word sense number is compatible with the clause subject and verb word sense numbers. The word sense number selection of the object begins at the word sense number at R-List[R-No] of the receiver. 70 also processes coordinated receivers. After 60216, 60217 is next as above. If 60215 is false, 60218 is next. If 60215 is false, the Current-Head is an appositive or an object complement. A noun appositive or object complement is equivalent to the appositive's or object complement's modifiee as a subject followed by a "to be" verb followed by the appositive or object complement as a subject complement. 60218 forms a clause: with the modifiee of the Current-Head as subject, with a "to be" verb, and with the Current-Head as the subject complement; the "to be" verb and clause linkage is stored in the SDS; and processing continues at 60203 as above.

After processing is completed at Selector 70, 70 has selected the requested word sense numbers, and 60230 is next and is true if 70-TYP-SEL=DV. If 60230 is true, 60240 sets the Current-Head's, the subject's' R-No to be 70-SEL-D, sets the receiver and all its modifiers to unprocessed, sets the receiver's R-No to 1, and stores 70-SEL-V at the clause verb's SDS location. 60240 repeats for coordinated subjects and/or objects. If 60230 is false, 60246 is next, and is true if the subject's word sense number was changed in the process at 70. If 60246 is true, 60248 sets the subject's R-No to 70-SEL-D; sets the subject and all its modifiers to unprocessed; sets BACK to 60244; sets the Current-Word to be the Current-Head; and processing continues at 60392. 60248 is repeated for coordinated subjects. After 60248, information is stored at 60392 as described below, and then 60244 is next. Also, if 60246 is false, 60244 is next, and sets the receiver's R-No to be 70-SEL-R and stores 70-SEL-V at the clause verb's SDS location. Receivers at 60244 include indirect and direct objects. 60244 repeats for coordinated receivers and/or verbs. After 60240 or 60244, 60242 sets BACK to 60104, and sets the Current-Word to be the Current-Head. After 60242, processing continues at 60392. 60392 stores the result of the word sense number selection process for a head or a modifier. 60392 stores various information in SREP, a matrix variable which is stored in the SDS. 60392 sets SREP[POS,2] to the Cur-Typ. Cur-Typ is an index into a data structure which contains the possible modifiees of a premodifier. For a noun head, Cur-Typ is zero. SREP[POS,3] is set to be the position of the Current-Modifiee which is null for a noun head. SREP[POS,4] is set to the Current-Modifiee's location of a modifier relation or REQ for a noun head. After 60392, 60394 is next and sets the Current-Word-Status to be PROCESSED. 60394 also stores the following at the Current-Word's SDS location: R-No, MAX, R-List, Current-Word-Status, SOURCE, R-RAC, RRAC. Also SREP[POS, 1] is set to R-List[R-No]. Finally 60394 sets processing to continue at BACK. After 60394, the results of the selection process has been completed, and processing continues for the next head or modifier. In terms of this description, processing returns to 60104 which processes modifiers of the Current-Head.

Modifier Word Sense Number Selection

60104 is next (for this description) and is true if there is an unprocessed premodifier, or if there is an unprocessed function word adjective. If 60104 is false, 60105 is next and is true if Adj-Check is true. Adj-Check is a process state variable of this concrete noun selection process. Adj-Check is true when the prepositional modification of an adjective process invokes this process to check for the modification of a concrete noun by an adjective modified by a prepositional phrase. This prepositional modification of an adjective process for English is illustrated in FIG. **8*d*. If 60105 is true, the adjective can modify the noun and, 60106 is next. 60106 sets Adj-Find to true. Adj-Find is true if the adjective modifies the concrete noun. 60106 also sets processing to continue at 60874 which returns processing to the prepositional modification of an adjective process and is described below. If 60105 is false, processing continues at 60600 which selects the next type of processing activity and is described below. If 60104 is true, 60107 is next, and is true if there is an unprocessed function word adjective. If 60107 is true, 60116 sets up the processing of the function word adjectives of the Current-Head. Function word adjective processing is described above for English for example. 60116 sets 60-Return, the step where processing continues after successful function word adjective processing, to 60104; AF-Fail, the step where processing continues after unsuccessful function word adjective processing, to 60361; and 60116 calls ADJ-FUN[Cur-Nat-Lang, Current-Head, AF-Fail, 60-Return]. If adjective function word processing is unsuccessful, processing continues at 60361 which selects the word to be reprocessed for word sense number selection or determines a processing failure as described below. If adjective function word processing is successful, processing continues at 60104. In this case, if 60104 is true, 60107 is false because the function word adjectives have been processed, and 60108 is next. 60108** sets Current-Word to be the next unprocessed premodifier selected with the current natural language order method. For example, the order method for English is nearest preceding the head first. Also, Cur-Typ is set to 1 which implies that the first modifier type of Current-Word is considered for modification. However, if Cur-Typ has already been set with an exclusive symbol, Cur-Typ is unchanged. An exclusive symbol indicates that only one possible modifiee type is to be considered. Exclusive symbols are utilized when the grammar or the situation only allows a single type of modifiee.

Adjective Modifier Word Sense Selection

60110 is next and is true if the Current-Word is an adjective. If 60110 is true, 60111 is next. 60111 instantiates A-Sense, a vector with upper limit, S, with the S word sense numbers of the Current-Word in the order of most recently referenced in 120 followed by word sense numbers not in the context, but in Dictionary 20 of the current natural language. 60111 treats state abstract noun modifiees of a state adjective to include the possibility of the state abstract noun as having a purpose relation to the modifying state adjective. For example: "True wealth is being happy." One interpretation of this example in English is: the "happy" state causes "true wealth". To accommodate this possibility, 60111 includes a pseudo word sense of such a modifying adjective in the last position of A-Sense which modifies any state abstract noun with a purpose relation having the symbol: STATE-MODIFICATION-PURPOSE-RELATION. Step 18 detects this symbol, and sets up the purpose relation to be determined by Purpose Identifier 140. The word sense numbers in A-List are the identification numbers of the adjective's word sense numbers and the most general owner stored in 20. For example, the most general owner possible, a noun, has zero type, specificity and experience numbers. As will be described in more detail below, an adjective's word sense number is composed of an identification number and an owner's word sense number. The identification number is composed of a state number and a value range number. The word sense numbers in the A-List only contain the owner's most general word sense number because the Selector 60 word sense number selection process selects the nearest owner word sense number for accessing the modifying adjective's data structure in 80. Here, nearest means the owner's word sense number if the owner has a specific stored adjective word sense number, the owner word sense number which is the nearest super-type of a stored adjective word sense number, or if there is no match or super-type, the nearest subtype of a stored adjective word sense number. 60111 also sets Cur-Sense, the index variable into A-Sense, to be 1. 60111 also sets RRAC to 0. RRAC is a matrix row pointer of a matrix, R-RAC, which stores the modifier implying a possible separate modifiee reference. In this case, the modifier is an adjective. The contents of R-RAC is described below. For example, "short and tall men" implies a reference to "short men" and a separate reference to "tall men" since "men" are not "short" and "tall" at the same time. After 60111, 60114 is next and is true if there is another untried modifiee in Ad-Mod[Cur-Typ, Cur-Nat-Lang].

Ad-Mod contains the possible modifiees of an adjective, indexed by Cur-Typ for adjectives in this case, for the current natural language, Cur-Nat-Lang. For example, the possible modifiees in English for an adjective are: immediate succeeding noun, immediate succeeding noun modifier of the noun phrase head, or the noun phrase head. If 60114 is false, 60113 is next and is true if RRAC>0. RRAC>0 if there are possible conflicting modifiers. If 60113 is true, 60109 sets RAC-Back to 60361, and sets processing to continue at 60885. RAC-Back is the address where processing is continued if there is not a conflicting modifier. Conflicting modifiers are selected starting 60885 which is described below. If 60113 is false, processing continues at 60361 which selects the word to be reprocessed for word sense number selection or determines a processing failure as described below. 60361 is executed if the adjective word sense number selection process has failed. If 60114 is true, 60115 is next and is true if SREP contains an untried modifiee of Ad-Mod[Cur-Typ, Cur-Nat-Lang]. SREP contains the results of processed modifiers and noun heads as described above. If 60115 is false, 60117 is next and is true if there is in an untried Cur-Typ for Ad-Mod. If 60117 is false, processing continues at 60113 as described above. If 60117 is true, 60118 increments Cur-Typ by 1. After 60118, 60114 is next as above.

If 60115 is true, a possible modifiee of the Current-Word has been selected and 60120 is next. 60120 sets the Current-Modifiee to be the next, untried modifiee in Ad-Mod [Current-Word, Cur-Typ, Cur-Nat-Lang]. This setting takes into account that a natural language may have more than one possible modifiee of a particular type for a given phrase. 60120 sets TRIED to TMV[Current-Word WS#, Current-Modifiee's position in the noun phrase, Current-Modifiee WS#]. TMV, the tried modifiee vector, contains a true value if a word sense with the word sense number of the Current-Word has been checked for modifying a word sense with the word sense number of the Current-Modifiee, and a false value otherwise. WS# is the position number of the word's corresponding word sense number in Dictionary 20. 60120 also sets SUCCEED to SMV[Current-Word WS#, Current-Modifiee's position in the noun phrase, Current-Modifiee WS#]. SMV, the successful modifiee vector, contains a true value if a word sense with the word sense number of the Current-Modifiee can be modified by a word sense with the word sense number of the Current-Word, and a false value otherwise. TMV and SMV are used to eliminate reprocessing of modifier, modifiee combinations which cannot occur. Each modifier has an associated TMV and SMV. 60120 sets Sep-Check to the number of adjective modifiers of the Current-Modifiee preceding the Current-Word. Sep-Check is used for determining possible conflicting modifiers. Finally, 60120 sets Current-Owner to be the word sense number of the Current-Modifiee.

After 60120, 60121 is next and is true if TRIED is true. If 60121 is false, 60123 sets TMV[Current-Word WS#, Current-Modifiee's position in the noun phrase, Current-Modifiee WS#] to true. If 60121 is true, 60122 is next and is true if SUCCEED is true. If 60122 is false, 60126 is next and is true if there is another untried modifiee in Ad-Mod [Current-Word, Cur-Typ, Cur-Nat-Lang]. If 60126 is true, 60120 is next as above. If 60126 is false, 60127 is next. 60127 sets Cur-Sense to 1 and sets processing to continue at 60114 as above. If SUCCEED is true at 60122, or after 60123, 60124 is next and is true if Cur-Sense is less than or equal to S which occurs when there is another untried word sense number in A-Sense. If 60124 is false, 60127 is next as above. If 60124 is true, 60128 is next. If the owner identification number of A-Sense[Cur-Sense] has a class number which matches the class number of the Current-Owner, 60128 searches Memory 90 to determine if the Current-Owner can be modified by A-Sense[Cur-Sense]. The class member number of A-Sense[Cur-Sense] matches the class number of the Current-Owner if the Current-Owner's class number equals or is a subclass of the A-Sense[Cur-Sense] class number. If class numbers match, the Current-Owner can possibly be modified by A-Sense[Cur-Sense] if the state number of the Current-Word is a state or property of the Current-Owner, and if the value or value range of the Current-Word is allowed for the Current-Owner. The value or value range of the Current-Word is allowed if the word sense number of the Current-Owner contains a value or value range which is included or overlaps the Current-Word's value range for a common state number. Another condition upon the possible modification by A-Sense[Cur-Sense] occurs if the Current-Word is modified by one or more adverbials. If the Current-Word is modified by one or more adverbials, 60128 invokes Selector 50 to evaluate the adverbials modifying A-Sense[Cur-Sense]. 50 determines the state value of the Current-Word, or 50 indicates that the adjective word sense number can not be modified by the adverbials. This process at 50 is described below in the Adjective State Representation Processing section. If a state value of the Current-Word is returned from 50, that state value is used determine if the value or value range of the Current-Word is allowed for the Current-Owner. If the Current-Word can not be modified by the adverbials, the state value of the Current-Word is not allowed. If the class numbers match and a possible state value of A-Sense[Cur-Sense] is allowed for the type number of the word sense number or at the specificity number or at the experience number of the Current-Owner in Memory 90, T-Find is set to MATCH. Otherwise, if the class numbers match and a possible value of A-Sense[Cur-Sense] is allowed for a super-type of the word sense number of the Current-Owner in Memory 90, T-Find is set to SUPER. Otherwise, if the class numbers match and a possible value of A-Sense[Cur-Sense] is allowed for a subtype of the word sense number of the Current-Owner in Memory 90, T-Find is set to SUB. Otherwise, if the class numbers do not match or a possible value of A-Sense[Cur-Sense] is not allowed at any related word sense number of the Current-Owner in Memory 90, T-Find is set to NULL.

After 60128 searches for the nearest word sense number of the Current-Owner containing A-Sense[Cur-Sense], 60129 is next. 60129 is true if a possible value was found for T-Find. All values except NULL are possible values of T-Find. If 60129 is true, 60130 is next and sets SMV [Current-Word WS#, Current-Modifiee's position, Current-Modifiee WS#] to true. After 60130, 60131 is next, and is true if the Current-Word implies a conflicting value, i.e., two values which can not occur at the same time. A conflicting value is implied if a state or property value of the Current-Owner is set to more than one value by consecutive adjectives of the modifiee in the same phrase except for certain states which are allowed to have multiple simultaneous values as described above, or a conflicting value is implied if a stated property value differs from a stored property value of the modified noun, or a conflicting value is implied if a state or property is set to a value which violates a requirement in REQ. A requirement of REQ is violated if the logical value of REQ is set to zero. REQ is typically a Boolean expression of terms which are ORed. In the processing of a noun head, terms will be set to zero because the interpretation sets values which set a component of the term to a logical zero. REQ is violated when the remaining non-zero term is set to logical zero. A state value change from a stored value in 90 or 120 is detected later and evaluated in terms of experience and stored knowledge at Purpose Identifier 140.

If 60129 is false, another type of conflicting modifier is checked for at 60139. 60139 is true if the Current-Word implies an alternate type. An alternate type of the Current-Owner is a super-type, match or subtype of the Current-Owner's type number before the current type number was set by a modifier in the same phrase. An alternate type is considered because the modifier which set the type may prove to be a separate modifier. If 60139 or 60131 is true, 60141 increments RRAC by 1. R-RAC[1,RRAC] is set to the word causing the conflicting value or alternative type, R-RAC[2,RRAC] is set to Current-Modifiee, and R-PRAC [3,RRAC] is set to Sep-Check. RRAC is a matrix row pointer to the next empty row. R-RAC stores information utilized to determine if a needed separate reference can be modified by the Current-Word. The need for a separate reference is determined if the Current-Word can not modify the Current-Owner for its current interpretation. Conflicting words are also be stored in R-RAC even if there is a single modifier because the conflicting word, the head in the case of a single modifier, may have to be reinterpreted if the current noun phrase interpretation does not allow a modifier to have an interpretation. If 60139 is false, or after 60141, 60132 is next and sets SMV[Current-Word WS#, Current-Modifiee's position, Current-Modifiee WS#] to false. After 60132, 60133 is next and is true if there is another untried modifiee of the Ad-Mod[Current-Word, Cur-Typ, Cur-Nat-Lang] in the noun phrase. If 60133 is true, processing continues at 60120 as above. If 60133 is false, 60137 increments Cur-Sense by 1 and 60124 is processed next as above.

If 60131 is false, 60134 is next and is true if T-Find is equal to SUB. If 60134 is true, the Current-Word implies a type change for the Current-Modifiee and there is a process starting at 60150 which determines if the type change is consistent with the other selected word sense numbers of the noun phrase. However, the false case will be described first. If 60134 is false, 60142 is next and sets the successful results of the adjective word sense number search in SREP. 60142 sets SREP[POS,1] to be A-Sense[Cur-Sense]. POS is the position of the Current-Word in the noun phrase being processed. SREP[POS,2] is set to Cur-Typ. SREP[POS,3] is set to the position of the Current-Modifiee in the noun phrase. 60142 sets SREP[POS,4] to the related word sense number of the Current-Modifiee which contains the adjective state representation pointer. Finally, 60142 sets Modal-V to false. After 60142, 60143 is next, and is true if the Current-Word is a subject complement, and if the verb phrase of the clause containing the Current-Word has a modal verb or an adverb. If 60143 is true, 60144 sets Modal-V to true. In subsequent processing, Modal-V is used to set the modification relations of modifiers with a true Modal-V to have the modal and/or adverb modification determined modal. If After 60144, or if 60143 is false, 60145 is next and sets the Current-Word-Status to be PROCESSED. 60145 stores the following at the Current-Word's location in the SDS: Cur-Sense, A-Sense, S, Current-Word-Status, Modal-V, R-RAC, RRAC. Finally 60145 sets processing to continue at 60104.

Type Number Consistency Checking

If 60134 determines that T-Find equals SUB, the nearest word sense number of the Current-Owner containing the Current-Word is a sub-type of the Current-Modifiee, i.e., the Current-Owner, and 60134 is true. In this case, the adjective implies a type change of the Current-Modifiee, and the validity of the type change upon the other processed modifiers and modifiees must be checked to determine if the selected word sense number of the Current-Word is consistent with the other processed related word sense numbers. The consistency is checked at 60150. If 60134 is true, 60136 is next and sets BACK to 60138. Also, 60136 sets processing to continue at 60150. The type consistency checking process starting at 60150 is written for 3 levels of modifiers in addition to the Current-Word for simplicity of description. 4 levels of modifiers including the Current-Word is rarely exceeded in English. One skilled in the art of programming can write a process for any number of levels of modifiers. 60150 initializes some parameters for the process. 60150 sets Noun-Head-Validity to true. Noun-Head-Validity is true when the type changes implied by a modifier(s) results in a consistent modification of the head and all of its processed modifiers. 60150 also sets 1-Mod and 3-Mod to false. 1-Mod is true when the Current-Word directly modifies the Current-Head. 3-Mod is true when the Current-Word modifies a word which modifies a word which modifies the Current-Head. 60150 sets TEMP to be the word sense number of the Current-Modifiee. Finally, 60150 sets the type of TEMP to the type set by the Current-Word. After 60150, 60151 is next and is true if the processed modifiers of the Current-Modifiee have a modification relation with TEMP. This condition ensures that the processed modifiers will also modify the Current-Modifiee after its type has been changed. This condition is checked by looking up if the processed modifier word sense numbers of the Current-Modifiee still modify the Current-Modifiee with a type change which implies that there is not a further type change for the Current-Modifiee. If 60151 is false, 60158 is next and sets Noun-Head-Validity false. After 60158, 60160 is next and sets processing to continue at BACK. If 60151 is true, 60152 is next, and is true if the Current-Head is the Current-Modifiee. If 60152 is true, 60154 is next. 60154 sets TEMP-H to TEMP, and sets 1-Mod to true. After 60154, 60156 is next. 60156 is true if all of the stated state or property values or property values in 90 of the Current-Head's word sense number without a type change are present in TEMP-H and are not set to a different value in TEMP-H, and if TEMP-H does not violate REQ, and if the verb requirements set by any modifying subordinate clause are not violated in TEMP-H. REQ contains the verb requirements of the sentence role of a noun sentence role head in a clause as described above. If 60156 is true, the type change of the Current-Head caused by a modifier results in a Current-Head word sense number which is consistent with the Current-Head's processed modifiers and sentence role. However, 60156 being true does not ensure that the processed direct modifiers of the Current-Head still modify the Current-Head with a type change. This latter condition is checked below. The processing following the case when 60156 is true is described after the case of two and three levels of modifiers is discussed. If 60156 is false, 60158 is next and sets Noun-Head-Validity to false. After 60158, 60160 sets processing to continue at BACK. In the case of a modifying adjective, BACK is 60138 which is false if Noun-Head-Validity is false. If 60138 is false, 60133 is next as described above. If 60138 is true, 60142 is next as above.

60152 is false if there is more than one level of modification of the Current-Head. If 60152 is false, 60162 is next and is true if the Current-Modifiee modifies the Current-Head. If 60162 is true, 60164 is next and is true if TEMP sets a type of the Current-Head. If 60164 is true, 60166 is next and sets TEMP-H to be the word sense number of the Current-Head. 60166 also sets the type of TEMP-H to the type implied by modification of TEMP. After 60166, 60156 is next as above. If 60164 is false, 60168 is next and is true if TEMP, which has a changed type compared to its corresponding word which has previously been processed to consistently modify the Current-Head, has a modification relation with the Current-Head. If 60168 is true, 60169 is next and is true if TEMP has a new relation with its modifiee. If 60169 is true, 60171 is next and sets the Current-Modifiee's SREP[POS,4] to the location of the new modification relation in Current-Modifiee's modifiee. POS is the position of the Current-Modifiee in the noun phrase being processed. If 60169 is false, or after 60171, 60177 is next and is described below. If 60168 is false, i.e., the Current-Modifiee does not have a related modification relation with the Current-Head, 60158 sets Noun-Head-Validity to false as above.

60162 is false if the Current-Modifiee does not modify the Current-Head. If 60162 is false, 60170 is next. 60170 sets TEMP-SH to the word sense number of the modifiee of the Current-Modifiee, and sets 3-Mod to true. 60172 is next and is true if TEMP sets a type of TEMP-SH. If 60172 is true, 60174 is next. 60174 sets the type of TEMP-SH caused by the modification of TEMP. 60174 also sets TEMP to the word sense number of TEMP-SH. After 60174, 60175 is next and is true if the processed modifiers of the modifiee of the Current-Modifiee have a modification relation with TEMP-SH. If 60175 is false, 60158 is next as above. If 60175 is true, 60164 is next as described above. If 60172 is false, 60176 is next and is true if TEMP has a modification relation with TEMP-SH. If 60176 is true, 60169 is next and is processed as described above. If 60176 is false, 60158 is processed as above.

If 60156 is true, the type of TEMP-H has been changed by a modifier. TEMP-H represents the Current-Head, and the Current-Head and its already processed direct modifiers may require checking for compatibility with a change of type for the Current-Head. This process of compatibility checking begins at 60177. 60177 is true if TEMP-H is a subtype of the Current-Head. The condition of 60177 is checked because if TEMP-H is a super-type or has no type change, no direct modifier has to be checked because the type of the Current-Head is not changed. A modifier which sets a noun phrase head to a super-type also modifies the super-type head's subtypes which includes the word sense number of the Current-Head for example because of the way the noun type hierarchy is designed as described above. If 60177 is true, a subtype change is implied and the direct modifiers are checked for compatibility with the subtype starting at 60178. 60178 sets TH, an index variable to 1. After 60178, 60179 is next and is true if there is a direct modifier of the Current-Head which has not been processed for a compatibility check. If 60178 is true, 60180 is next and sets Modifier-Check to the next, nearest, preceding first, unchecked direct modifier of the Current-Head. 60181 is next and is true if Modifier-Check has a modification relation with TEMP-H which implies no further type change for the TEMP-H word sense number. If 60181 is false, the Current-Modifiee has failed the compatibility check and 60184 is next. 60184 sets Noun-Head-Validity to false and sets processing to continue at BACK. If 60181 is true, 60182 is next and is true if Modifier-Check has a new relation with TEMP-H. If 60182 is false, 60178 is next as described above. If 60182 is true, 60183 is next. 60183 sets T-Hold [1,TH] to the position of Modifier-Check in the noun phrase, and sets T-Hold[2,TH] to the location at TEMP-H of the new modification relation between Modifier-Check and TEMP-H. 60183 stores the information utilized to update new relations between modifiers and the Current-Head when all direct modifiers have been successfully checked. After 60183, 60178 is next as described above. If all direct modifiers of the Current-Head have been checked at 60178, 60178 is false and 60185 is next. 60185 is true if TH is greater than one which implies T-Hold contains at least one new relation. If 60185 is true, 60186 is next. 60186 stores the new relations of direct modifiers which are stored at T-Hold at each such direct modifier's SREP[POS,4]. POS is a position of such a direct modifier in the noun phrase of the Current-Head, and is stored at T-Hold[1,TH]. The new relation is stored at T-Hold[2,TH]. T-Hold contains positions and relations in columns 1 to TH-1. After 60186, 60188 is next and sets the word sense number of the Current-Head at SREP[1,1] to be TEMP-H.

After 60188 or if 60177 is false, 60190 is next and is true if 1-Mod is false and the Current-Word sets a subtype of the Current-Modifiee. If 60190 is true, 60192 sets the word sense number of the Current-Modifiee's SREP[POS,1] implied by the modification of the Current-Word where POS is the position of the Current-Modifiee in the noun phrase. Also, 60192 sets the locations of new modification relations of processed modifiers of the Current-Modifiee at the modifiers' SREP[P,4] where P is the position of a processed modifier of the Current-Modifiee which has a new modification relation because of the type change of the Current-Modifiee. The new modification relations were determined and stored in the process to determine if 60151 is true. The modification relations are processed in the same process as described for direct modifiers of the Current-Head. After 60192, or if 60190 is false, 60194 is next. 60194 is true if 3-Mod is true and if TEMP-SH is a subtype of the modifiee of the Current-Modifiee. If 60194 is true, 60196 sets SREP [POS,1] of the modifiee of the Current-Modifiee to the word sense number, TEMP-SH, where POS is the position of the modifiee of the Current-Modifiee in the noun phrase. Also, 60196 sets the locations of new modification relations of processed modifiers of the modifiee of the Current-Modifiee at the modifiers' SREP[P,4] where P is the position of a processed modifier of the modifiee of the Current-Modifiee which has a new modification relation because of the type change of the modifiee of the Current-Modifiee. The new modification relations were determined and stored in the process to determine if 60175 is true. The modification relations are processed in the same process as described for direct modifiers of the Current-Head. After 60196, or if 60194 is false, 60198 sets processing to continue at BACK.

Noun, Verbal, and Morphological Word@ Modifiers

Modifier Indexed Modifier Processing

After an adjective has been successfully processed, processing continues at 60104 which is true if there is an unprocessed premodifier as described above. Then 60108 sets the Current-Word to be the next unprocessed premodifier as described above. After 60108, 60110 is next and is true if the Current-Word is an adjective. The true case was described above. If 60110 is false, the Current-Word is a noun, verbal or morphological word@, and 60112 is next. 60112 sets Mod-Check to false, and sets processing to continue at 60400. Mod-Check is false when the Current-Word is a premodifier, and Mod-Check is used in subsequent processing described below. A verbal or morphological word@ is processed as a direct modifier to determine if there is a specific stored relation in the modifiee's external relation structure starting at 60400. For example, the number 1 subject source invokes this process at 60400 to make this determination as described above. 60400 sets the vector R-List to contain the MAX word sense numbers of the Current-Word in the order: word sense numbers of the most recent references first order from 120, word sense numbers which are not in 120. R-No, an index variable for R-List, is set to 1. Cur-Typ, an index into the possible modifiees, is also set to 1. However, if Cur-Typ for the Current-Head has already been set with an exclusive symbol, Cur-Typ is unchanged. Finally, RRAC, an row number for R-RAC is row variable of R-RAC, is set to 0. R-RAC is a matrix to store possible noun and verbal modifiers which could imply a separate reference. The word sense number for a verbal is the verb's word sense number plus an inflection. The word sense number for a morphological word@ is the base word's word sense number plus the affix code. After 60400, 60402 is next and sets the Current-Modifiee to be the next, possible, untried modifiee in N-Mod[Current-Word, Cur-Typ, Cur-Nat-Lang]. N-Mod contains the types of modifiees of a noun, verbal, or morphological word@. A particular noun phrase can have more than one instance of a type. The type is indexed by Cur-Typ. The multiple instances are not explicitly described for N-Mod, but they are handled in the same way that was described for Ad-Mod, the modifiees of an adjective described above. Any particular noun phrase may have only certain types of modifiees. 60402 selects the next, untried instance of a possible type of modifiee of the current noun phrase containing the Current-Head. 60402 also sets Sep-Check to the number of noun, verbal, and morphological word@ modifiers of the Current-Modifiee which precede the Current-Word. If Sep-Check is greater than 0, the case of multiple noun, verbal, and morphological word@ references is checked for implying a separate modifiee for noun, verbal, and morphological word@ modifiees which can not modify the same reference of a modifiee. For example, "the Chicago and New York teams" implies a separate modifiee as in: "the Chicago team and the New York team".

After 60402, 60406 is next. 60406 sets TRIED to the value at the Current-Word's TMV[Current-Word WS#, Current-Modifiee position in the noun phrase, Current-Modifiee WS#]. SUCCEED is set to the value at the Current-Word's SMV[Current-Word WS#, Current-Modifiee position in the noun phrase, Current-Modifiee WS#]. Current-Word WS#is the Current-Word's R-List[R-No]. After 60406, 60408 is next and is true if TRIED equals true. If 60408 is false, 60410 sets the Current-Word's TMV[Current-Word WS#, Current-Modifiee position in the noun phrase, Current-Modifiee WS#] to be true. If 60408 is true, 60412 is next and is true if SUCCEED equals true. If 60412 is false, 60414 checks if there is another possible modifiee as described below. If 60412 is true, or after 60410, 60418 is next. 60418 searches for a modifier indexed relation of R-List[R-No] of the Current-Word in all possible partitions of the Current-Modifiee's external relation structure for a super-type, match, or subtype of the Current-Modifiee with a non-conflicting value for modifiers setting values. A conflicting value occurs when the Current-Word sets a property value which differs from the value stored in 90 or 120, or the Current-Word sets a state or property value which differs from a value set by a processed modifier in the current noun phrase, or violates REQ. After 60418, 60419 is next and is true if 60418 found a relation. If 60419 is false. 60420 is next and sets the Current-Word's SMV[Current-Word WS#, Current-Modifiee position in the noun phrase, Current-Modifiee WS#] to false. After 60420, 60421 is next, and is true if there is a relation found at 60418 with an alternate type change and/or with a conflicting value. 60421 is true if there is possibly an implied separate reference as described above or a possible word which needs reinterpretation. If 60421 is true, 60423 increments RRAC by 1; R-RAC[RRAC,1] is set to the conflicting word, i.e., the word implying an alternative type or a conflicting value; R-RAC[RRAC,2] is set to the Current-Modifiee; and R-RAC[RRAC,3] is set to Sep-Check. If 60421 is false, or after 60423, 60414 is next and is true if there is another possible modifiee for the Current-Word. If 60414 is true, 60402 is next as above. If 60414 is false, 60415 is next, and is true if R-No is less than MAX. If 60415 is true, 60416 increments R-No by 1; and 60402 is next and is processed as described above. 60416 sets the next word sense number of the Current-Word to be searched for at 60402. If 60415 is false, 60417 is next, and is true if there is another Cur-Typ for the current natural language. If 60417 is true, 60422 sets R-No to 1, and 60422 increments Cur-Typ by. If 60417 is false, 60434 determines if there are alternate interpretations and is described below.

If 60419 is true, a possible modification relation has been found for the Current-Word. If 60419 is true, 60424 sets the Current-Word's SMV[Current-Word WS#, Current-Modifiee position in the noun phrase, Current-Modifiee WS#] to true. After 60424, 60426 is true if the modification by the R-List[R-No] word sense number implies a subtype of the Current-Modifiee. If 60426 is true, 60428 sets BACK to 60430, and sets processing to continue at 60150 to process the modifiee type change as described above. When the type change processing has been completed, 60430 is next and is true if Noun-Head-Validity is true which implies that the type change is compatible. If 60430 is false, processing continues at 60414 as described above. If 60430 is true, or if 60426 is false, 60429 sets BACK to 60104 and sets processing to continue at 60732. 60732 is true if the modifier's relation match implies a type for the modifier. The modification relation of the modifier is searched for only with a word sense identification number. The modification relation match at the Current-Modifiee's external relation structure may in addition contain modifier word sense numbers with type numbers, specification numbers, and/or experience numbers. The word sense numbers in the external relation structure are grouped by word sense number. Within a word sense number group, the word sense numbers are ordered by the highest super-type first. If 60372 is true, 60734 sets R-List[R-No] to the first word sense number in the Current-Modifiee's external relation structure group with has a matching word sense identification number with R-List[R-No]. After 60734, or if 60732 is false, processing continues at 60392 which stores the information related to the modification and continues processing of the Current-Head as described above.

Separate Modifier Processing

60417 is false if all Cur-Typ's have been tried for all R-No's. In this case all possible modifiees have been unsuccessfully processed using modifier indexed relations. If 60417 is false, 60434 is next and is true if RRAC>0. RRAC>0 when there is a possible need to separate multiple modifiers into separate modifiers with separate modifiees as described above. If 60434 is true, 60446 is next. 60446 sets RAC-Back to 60436, and sets processing to 60885. 60885 is also called from 60109 for adjective modifiers as described above. The process at 60885 creates a separate modifier and modifiee if possible. 60885 begins the separate modifier process by setting CONF to 0, and setting F-R to −1. CONF is an index variable for CONF-M which stores conflicting modifiers for later processing as described above. F-R is used to indicate the first row in R-RAC which implies separate modifiers, or F-R indicates that none of the rows imply separate modifiers. After 60885, 60886 is next and is true if there is an untried row in R-RAC. If 60886 is true, 60887 sets C-R to the next untried row number in R-RAC. After 60887, 60889 is next. 60889 is true if R-RAC[C-R, 1], the word in conflict, modifies the Current-Modifiee and matches the modifier type of the Current-Word, and if R-RAC[C-R, 3], the number of same modifier types modifying the Current-Modifiee, is greater than 0. The word in conflict matches the modifier type of the Current-Word if both are adjectives; if both are noun, verbal or morphological word@ premodifiers; or both are prepositional phrase complements. If 60889 is true, then the conflicting word in R-RAC[C-R, 1] can be or is coordinated with the Current-Word, and the conflicting word can be a separate modifier. If 60889 is false, the conflicting word can not be coordinated with the Current-Word, and the conflicting word can not be separated out. However, a conflicting word which can not be separated out can be a candidate for reinterpretation when the conflicting word's noun phrase can not be interpreted. Such a candidate is handled by processes of the Communication Manager which is described below. If 60889 is true, 60890 is next and is true if F-R<0. If 60890 is true, F-R is set to C-R at 60891. After 60891, or if 60890 is false, 60886 is next as described above. If 60889 is false, 60892 increments CONF by 1; CONF-M[CONF, 1] is set to R-RAC [C-R,1]; and CONF-M[CONF, 2] is set to R-RAC[C-R,2].

After 60892, 60886 is next. If 60886 is false, 60893 is next and is true if CONF>0. If 60893 is true, 60894 orders the rows in CONF-M by the column 1 value of each row. The column 1 value contains the conflicting modifier. The rows in CONF-M are ordered by the nearness of a row's conflicting value in position relative to the Current-Word. 60894 also stores CONF-M in the Current-Word's SDS position. CONF-M is used to select a modifier for reinterpretation if the Current-Word does not have a modifiee with the current interpretation of the noun as is described below. After 60894, or if 60893 is false, 60888 is next, and is true if F-R is greater than 0. If 60888 is false, 60895 sets processing to continue at RAC-Back. 60895 is performed if a separate modifier has not been stored in R-RAC. If 60888 is true, 60896 creates a separate modifier. 60896 creates a copy of the noun phrase containing the Current-Word minus R-RAC[F-R,1], the modifier causing the conflict; the copy is stored in the SDS; the head of the noun phrase is marked MOD-INDUCED in its SDS position; the Current-Word and its modifiers are removed of the current noun phrase; the copy is joined to the sentence with an "and" conjunction following the original; the head of the copied phrase is placed in N-List after the original head. After 60896, 60897 is next and is true if the Current-Word is a prepositional complement head. If 60897 is true, processing continues at 60603 which selects the next noun word sense number selection process as described below. If 60897 is false, processing continues at 60104 as described above.

Relation Indexed Modifier Processing

If 60434 is false, or if there was not a separate modifier at 60895, 60436 is next and is true if the Current-Word is a verbal or morphological word@. If 60436 is true, 60427 sets ellipsis processing to begin at the RESTART address stored in the Current-Word's SDS position. In this case alternate sources for the subject and/or object are selected with ellipsis processing as described above. If 60436 is false, the Current-Word does not have a modification relation stored in the modifier indexed relations of the possible modifiees. However, it is possible that the Current-Word is in an A-relation. All function A-relations without A-relation sentence roles, all S-relations and all T-relations are contained in the modifier indexed relations because such relations are directly indicated by a single word modifier. A-Relations are indicated by a common relation characteristic. If 60436 is false, an A-relation is searched for in the relation indexed partition of the external relation structures of possible modifiees. If 60436 is false, 60437 is next and sets Cur-Rel-Set to contain all the A-relation subpartitions except function A-relations without A-Relation sentence roles of the external relation structure. The Cur-Rel-Set contains the type of relations which are to be searched. Cur-Rel-Set in general contains other types of relations because Cur-Rel-Set is utilized for other types of modifiers such as prepositional phrases. The relations in Cur-Rel-Set are listed in the order: A-, C-, S- and T-relations. This ordering is set so that the most specific stored relation can be assigned to a modification relation. 60-Back is set to 60438; RRAC is set to zero; Cur-Typ is set to 1; and R-No is incremented by 1. However, if Cur-Typ has already been set with an exclusive symbol, Cur-Typ is unchanged. After 60437, 60448 is next, and is true if Cur-Rel-Set is empty. If 60448 is true, relation processing has failed, and 60445 is next. 60445 is described below. If 60448 is false, 60443 is next, and is true if the Current-Word has PROCESSED in its SDS position. If 60443 is true, the Current-Word is being reprocessed for an alternate word sense number because another modifier failed to have a modifiee as is described below. If 60443 is false, 60435 sets R-No to 1 because the Current-Word has not been processed before for relation indexed modifiers. After 60435, or if 60443 is true, 60444 sets the Current-Modifiee to the next possible modifiee in N-Mod[Current-Word, Cur-Typ, Cur-Nat-Lang]; Sep-Check is set to the number of noun, verbal and, morphological word@ modifiers of the Current-Modifiee which precede the Current-Word; and processing is set to continue at 60450 as described below. The process at 60450 searches for a relation in Cur-Rel-Set between the Current-Word and the Current-Modifiee. 60-Back is a return address after the process at 60450 has failed or succeeded. 60-Back was set to 60438 at 60437. The process starting at 60450 is described next.

60450 sets Cur-Rel to the first relation in Cur-Rel-Set; the Current-Word's word sense number is set to R-List[R-No]; Modifiee-WS is set to the word sense number of the Current-Modifiee; and Not-A-Init is set to true. Not-A-Init is a status variable used to distinguish between the first use of a search for an S or T relation, and its use is described below. The process started at 60450 is also utilized in searching for a modification relation given the modifier, the Current-Word, and the type of relation. For example, this process is also used to find an A-Relation between a complement of a prepositional phrase modifying an adjective and the subject of a clause. This process is also used to find a prepositional relation between a modifiee and a complement. This process is designed to find a relation between the modifier and modifiee in the relation indexed partition of the external relation structure of the modifiee. For processing a prepositional phrase, this process is called to find if there is a given relation between the given word sense number of a modifiee and the given word sense number of a prepositional complement modifier. For other types of noun relations, the word sense numbers of the nouns in the searched for relation and the type of relation are given, and a relation is searched for. For prepositional processing, the Current-Word is the head of the noun phrase which is the prepositional complement. After 60450, 60452 is next. 60452 sets TRIED to the prepositional complement's TRV[Current-Word WS#, SDS position of the Current-Modifiee, Current-Modifiee WS#, Cur-Rel#]. TRV is the relation equivalent of TMV. The main difference is that an SDS position of the modifiee is used in place of a position in a noun phrase. Also, Cur-Rel#is the number the relation in the Cur-Rel-Set. SUCCEED is set to the SRV[Current-Word WS#, SDS position of the Current-Modifiee, Current-Modifiee WS#, Cur-Rel#]. SRV is the relation equivalent of SMV. After 60452, 60454 is next and is true if TRIED is true. If 60454 is false, 60456 is next. 60456 sets TRV[Current-Word WS#, SDS position of the Current-Modifiee, Current-Modifiee WS#, Cur-Rel#] to true. If 60454 is true, 60458 is next and is true if SUCCEED is true. If 60458 is false, processing continues at 60478. 60478 is true if there is another untried relation or partition in Cur-Rel-Set. If 60478 is true, 60479 sets Cur-Rel to the next untried relation in Cur-Rel-Set, and processing continues at 60452 as described above. Untried in 60479 means untried in this recent invocation of the process starting at 60450. If 60478 is false, 60480 is next. 60480 sets Current-Relation-Found to false and sets processing to continue at 60-Back. 60480 is processed when there is not a relation in the Cur-Rel-Set between the Current-Modifiee and the Current-Word.

AMF-Relation Processing

If 60458 is true, or after 60456, 60462 is next and is true if Cur-Rel is an A-relation. If 60462 is true, 60466 is next. 60466 sets Cur-Modifier-Rel-Char to the next general relation characteristic of the Cur-Rel relation partition in the external relation structure of the Current-Word. Next, 60468 searches for a match of Cur-Modifier-Rel-Char in the Cur-Rel relation partition in the external relation structure of the Modifiee-WS. If a match is found for a relation characteristic of function A-Relation, Modifiee-WS and the Current-Word are checked for meeting the requirements of their sentence roles by Selector 70. For a function A-relation, 60468 calls 70 to check if the Current-Word and Modifiee-WS can meet their sentence role requirements of the clause of the function A-relation. If the Current-Word and Modifiee-WS meets the requirements, a match is found, and Cur-Modifier-Rel-Char is set to the relation characteristic of the associated function A-Relation. Otherwise, another relation characteristic is considered. The sentence role requirements are checked by Selector 70 in Memory 100 at the clause address which is contained in the function A-relation's relation characteristic. This Selector 70 processing is described below. A-relations which are not function A-Relations, AMF-relations, are matched if their relation characteristics match. 60466 checks for general relation characteristic matches. After 60468 completes the search, 60470 is next and is true if a match was found. If 60470 is true, 60482 sets SRV[Current-Word WS#, SDS position of the Current-Modifiee, Current-Modifiee WS#, Cur-Rel#] to true. 60484 is next and is true if Cur-Rel is an AMF-relation. If 60484 is false processing is completed next at 60730. 60730 sets Current-Relation-Found to true, and sets processing to continue at 60-Back.

If 60484 is true, 60700 is next and searches for a more specific relation match. 60700 sets SP to 0. SP is an index for AMAT array which contains relation matches between the Current-Word and Modifiee-WS. Finally, 60700 sets Check-Try to false. Check-Try is a status variable of this specific relation match process. After 60700, 60701 is next and is true if the Current-Modifiee's Cur-Rel relation partition has another untried typed relation characteristic with the word sense identification number match of the relation characteristic found at 60468. A typed relation characteristic has a non-zero type number component of the relation characteristic, a word sense number as described above. If 60701 is true, 60705 is next, and sets Cur-Modifiee-Rel-Char to the next, untried, typed relation characteristic with the same word sense identification number as the relation characteristic found at 60468. Next, 60706 determines if the type or a word sense number entry associated with the Cur-Modifiee-Rel-Char position in the external relation structure of the Current-Modifiee is a related type of Modifiee-WS. A related type of Modifiee-WS is a super-type, the same type, or a subtype of Modifiee-WS. Next, 60707 is true if the type or word sense number entry of the Cur-Modifiee-Rel-Char position is the same type as Modifiee-WS. If 60707 is true, 60708 increments SP by 1; AMAT[SP,1] is set to the Cur-Modifiee-Rel-Char; and AMAT[SP,2] is set to 0. If 60707 is false, 60710 is next, and is true if the type or word sense number entry of the Cur-Modifiee-Rel-Char position is a super-type of Modifiee-WS. If 60710 is true, 60709 increments SP by 1; AMAT [SP,1] is set to the Cur-Modifiee-Rel-Char; and AMAT[SP,2] is set to 1.

If 60710 is false, 60711 is next, and is true if the type or word sense number entry of the Cur-Modifiee-Rel-Char position is a subtype of Modifiee-WS. If 60711 is true, 60714 increments SP by 1; AMAT[SP,1] is set to the Cur-Modifiee-Rel-Char; and AMAT[SP,2] is set to 2. After 60708, 60709, or 60714, 60701 is next as described above. If 60711 is false, Cur-Modifiee-Rel-Char's type or a word sense number is not a related type. If 60711 is false, 60712 is next, and is true if Cur-Modifiee-Rel-Char's type or a word sense number is an alternative type as defined at 60139. If 60712 is true, the Current-Word may be a separate modifier of a new copy of the Current-Modifiee as described above. If 60712 is true, 60713 increments RRAC by 1; R-RAC[RRAC, 1] is set to the modifier which implies the alternative type; R-RAC[RRAC,2] is set to the Current-Modifiee; and R-RAC[RRAC, 3] is set to Sep-Check. After 60713, 60733 is next, and is true if 60-Back equals 60314, which implies the Current-Word is a prepositional complement. If 60733 is true, 60735 sets R-RAC[RRAC,3] to Prep-Check. After 60735, or if 60733 is false, or if 60712 is false, 60701 is next as above.

If there are no more untried typed relation characteristics at 60701, 60701 is false, and 60702 is next. 60702 is true if SP is greater than zero, i.e., at least one entry was stored in AMAT. If 60702 is true, 60703 is next. 60703 orders the rows in AMAT with respect to the row's column 2 value which implies the nearness of the relation characteristic's associated type or word sense number entry to the type of Modifiee-WS. Column 2 contains a 0 for type match, 1 for a super-type of Modifiee-WS, 2 for a subtype of Modifiee-WS. The rows in AMAT are ordered with the row's with the lowest value of column 2 first. The purpose for ordering the relation characteristics is to select the nearest type first for a possible match of the relation characteristic at the modifier's external relation structure. Failing to select a matching type relation characteristic, a super-type relation characteristic is tried for matching. Failing to find a super-type relation characteristic, a subtype relation characteristic is tried. A matching or super-type relation characteristic implies no type change for the modifiee, but a subtype relation characteristic does imply a type change. The ordering of relation characteristics in A-Relation partitions of the external relation structure is in the order of most general type to most specific type. This ordering policy is equivalent to selecting the AMF relation which is the most specific for a super-type relation characteristic and least specific for a subtype. In terms of the relation of a modifier to a modifiee, this policy is equivalent to finding the most specific relation which does not change the modifiee, or failing a no-change relation match, the policy finds the relation which changes the modifiee the least. Placing priority on a non-changing relation has the result of picking the most specific relation, and hence the nearest in experience, and has the result of not reading too much into the modification relation, i.e., not assuming a type change for the modifiee when a type change may not apply. Subsequent conversation will determine if a type change in the modifier is intended.

After 60703, 60704 is next and is true if there is an untried row in AMAT. If 60704 is true, 60715 sets Cur-Modifiee-Rel-Char to the untried relation characteristic in AMAT. Next 60716 searches for a match of Cur-Modifiee-Rel-Char at the Current-Word's Cur-Rel relation partition in its external relation structure. After 60716, 60717 is next, and is true if a match was found by 60716. If 60717 is false, 60704 is next as above. If 60717 is true, 60718 is next, and is true if Mod-Check is true. Mod-Check is true for prepositional modification. If 60718 is true, 60731 is next. 60731 sets return values for a modifier checking process at 60719. 60731 sets Mod-Pass to 60725; Mod-Fail is set to 60704; and processing continues at 60719. 60719 begins a process to check if the modifier has an implied type change from the Cur-Modifiee-Rel-Char relation. This process is performed for prepositional modification of concrete nouns and adjectives because the head of the modifier noun phrase, a prepositional complement, has already been selected before this process. 60719 is true if the modification relation implies a type change for the Current-Word to a subtype of the Current-Word's current type. If 60719 is true, 60720 is next. 60720 sets T-Modifier-WS to the Current-Word's word sense number with the type number change implied by the modification relation. 60721 is next, and is true if T-Modifier-WS can be modified by all of the Current-Word's stated, processed modifiers. If 60721 is true, 60722 sets the word sense number of the Current-Word to T-Modifier-WS; all new relations of modifiers of the Current-Word caused by the type change are stored at such modifiers' SREP[POS,4]. If 60721 is false, 60723 sets processing to continue at Mod-Fail, which in this case is 60704. After 60722, or if 60719 is false, 60724 sets processing to continue at Mod-Pass, 60725.

After 60724, or if 60718 is false, 60725 is next. When 60725 is reached, a relation characteristic match has been found with a suitable type change for a prepositional complement modifier. A type change for a noun modifier is processed later at 60732 as described above. 60725 is true if the relation of Cur-Modifiee-Rel-Char implies a type change to a subtype of Modifiee-WS. If 60725 is true, BACK is set to 60728; T-CH is set to the Current-Head; the Current-Head is set to the Current-Modifiee; processing is set to 60150. The Current-Head is stored in a temporary variable, and is set to the Current-Modifiee in order to have a suitable variable assignment for proper processing at 60150. 60150 checks for a type change and sets the implications of the type change if the type change is acceptable as described above. When the process at 60150 is completed, 60728 is next, and sets the Current-Head to T-CH. Next, 60729 is true if Noun-Head-Validity is true. If 60729 is false 60704 is next as above because the relation is not allowed. If 60729 is true, or if 60725 is false, the relation of Cur-Modifiee-Rel-Char is valid and 60730 is next. 60730 sets Current-Relation-Found to true; processing is set to continue at 60-Back.

If 60702 is false, no more specific relation match has been found in the external relation structure of Modifiee-WS. If specific relation matches were found, but none of them had a match at the modifier external relation structure or had an incompatible type change implication, 60704 is false. If 60702 is false, or if 60704 is false, 60738 is next and sets Cur-Modifiee-Rel-Char to Cur-Modifier-Rel-Char, the general relation characteristic. 60740 is next, and is true if Check-Try is false. 60740 is true the first time it is processed. If 60740 is processed a second time, the general relation characteristic, Cur-Modifiee-Rel-Char implied an unacceptable type change implication for the modifier. If 60740 is true, Check-Try is set to true, and processing is set to continue at 60718 as above. In this case the process starting 60718 determines if the general relation characteristic match is compatible with respect to type changes as described above. The process after 60718 either successfully completes by eventually reaching the processing of 60730 as described above, or the process after 60718 fails by reaching the processing of 60704 as described above. If 60704 is reached, 60740 is processed a second time and is false. If 60740 is false, processing continues at 60476. 60476 is described below.

The search for a current relation has been described for the finding of an A-relation starting at 60470 when 60470 is true. If a match of Cur-Modifier-Rel-Char was not found in the external relation structure of Modifiee-WS, 60470 is false. If 60470 is false, 60472 is next and is true if the Cur-Rel relation partition contains function A-relations. If 60472 is false, 60476 is next and is true if there is another untried general relation characteristic in the Cur-Rel relation partition of the Current-Word. If 60476 is true, 60466 selects the next relation characteristic as described above. If 60476 is false, 60477 sets SRV[Current-Word WS#, SDS position of the Current-Modifiee, Current-Modifiee WS#, Cur-Rel] to false. 60478 is next, and is true if there is another relation in Cur-Rel-Set. If 60478 is true, 60479 is next, and sets Cur-Rel to the next untried relation in Cur-Rel-Set; 60452 is next as described above. If 60478 is false, 60480 is next, and sets Current-Relation-Found to false, and sets processing to continue at 60-Back; 60480 is processed if the relation search process has failed. After 60480, processing continues at the process calling the 60450 relation search process.

Function A-Relation Processing

If Cur-Rel is a function A-relation at 60472, 60472 is true, and processing continues at 60750. 60750 is true if the function A-Relation associated with Cur-Modifier-Rel-Char has an A-relation for one or more of its sentence roles. If 60750 is false, 60752 sets processing to continue at 60476 as above. If 60750 is true, 60754 is next. 60754 searches sentence role A-relations in the function relation for containing the noun word sense number of the modifiee, Modifiee-WS. If the word sense number of the Current-Word is not contained explicitly in the A-Relations of the clause, an A-Relation containing the Current-Word is designated in the A-Relation descriptor. Modifiee-WS is searched for being in the one or more A-Relations which do not contain the Current-Word by checking Modifiee-WS's external relation structure for containing the relation characteristic of these one or more A-relations. A match with Modifiee-WS occurs if the relation characteristic is found in Modifiee-WS's external relation structure, and Modifiee-WS and the Current-Word meet the sentence role requirements of the clause at the function A-Relation's address in its relation characteristic. After 60754, 60756 is next, and is true if a match was found at 60754. If 60756 is true, processing continues at 60730 which successfully completes the search as described above. If 60756 is false, 60752 sets processing to continue at 60476 as above.

C-, S-, and T-Relation Processing

If the Cur-Rel relation partition is not an A-Relation at 60462, 60462 is false. If 60462 is false, processing continues at 60760. 60760 is true if Not-A-Init is true. Not-A-Init is true for the first invocation of this process for finding C-, S-, and T-relations. If 60760 is true, 60761 sets RMAT to 0 and sets Not-A-Init to false. RMAT is a row index for R-MAT which is a matrix for storing found relations. After 60761, or if 60760 is false, 60762 is next and is true if the Cur-Rel relation is a T-Relation. If 60762 is true, 60763 sets T-R to true to indicate that Cur-Rel is a T-Relation. If 60762 is false, 60769 sets T-R to false. After 60763 or 60769, 60764 is next, and is true if the Cur-Rel relation descriptor's designation matches the designation of an entry in Modifiee-WS's external relation structure, and the matched entry has a source which matches the Current-Word's identification number component of its word sense number. The designation and source of C-, S-, T-relations is described in the introduction to the Concrete Noun Word Sense Number Selection. If 60764 is true, 60765 is next and is true if T-R is false, or if all specified states of the Cur-Rel relation are contained in the matched entry's T-Relation. If 60765 is true, 60766 sets SRV[Current-Word WS#, SDS position of the Current-Modifiee, Current-Modifiee WS#, Cur-Rel#] to true. If 60764 or 60765 is false, 60767 sets SRV[Current-Word WS#, SDS position of the Current-Modifiee, Current-Modifiee WS#, Cur-Rel#] to false. After 60767, 60768 is next, and is true if Cur-Rel contains an untried relation. If 60768 is false, all relations in Cur-Rel-Set have been processed and final processing for the relation search is set to continue at 60785 as described below. If 60768 is true, processing is set to continue at 60479. As described above, 60479 begins processing of the next untried relation entry in the Cur-Rel-Set.

After 60766, the search for the relation continues to determine the best type match between the Current-Word and the Current-Modifiee. Next, 60770 is true if a matched entry from 60764 has a location which is a related type of Modifiee-WS. The location has a related type of Modifiee-WS if the location contains a type number or word sense number location which: is a super-type of Modifiee-WS, is Modifiee-WS, or is a subtype of Modifiee-WS. If more than one entry has a related type, the priority for selecting an entry is: the entry with a match is selected first, with a super-type is the next priority, and with a subtype is the last priority. If 60770 is true, 60797 is next, and is true if a matched entry's source is a pointer to an S-Relation at another word sense number. The word sense number is the owner of the pointed to S-Relation. 60797 is true for a chain of modifying prepositional phrases, e.g., "at the store in the country". If 60797 is true, 60798 checks each owner of an S-relation in the chain, or checks the source at the end of the chain, for being a related type of the Current-Word. 60798 checks along the chain until a match is found or the chain ends. The chain ends at a word sense number source. After 60798, or if 60797 is false, 60772 is next, and is true if an entry from 60770 has a source which is a related type of the associated source word and does not imply a conflicting value or alternative type where conflicting value is defined as for 60131, and where alternative type is defined as for 60139. The Current-Word or Current-Modifiee is the associated source word depending upon which one is the source. If more than one entry has a source with a related type, the entries are considered in the order of the priority of 60770. If there are more one entry in the highest priority class of 60770, an entry among such entries is selected according to the type of the source in the entry compared to the type of the Current-Word in the priority order of: match of the Current-Word type first, super-type of the Current-Word next, and subtype of the Current-Word last. If 60772 is true, a potential relation match, and this case is considered after the following paragraph.

If 60772 is false, or if 60770 is false, 60773 is next and is true if there is a conflicting value or an alternate type. If 60773, the Current-Word or the Current-Modifiee could be a separate modifier implying an additional noun phrase as described above. If 60773 is false, 60768 is next and selects alternate processing as above. If 60773 is true, 60771 is next. 60771 is true if 60-Back is equal to 60364. 60771 is true when the Current-Word is a prepositional complement. If 60771 is true, 60795 sets R-RAC[RRAC+1,3] to Prep-Check. If Prep-Check is greater than 0, the Current-Word could be a separate prepositional modifier. If 60771 is false, 60796 sets R-RAC[RRAC+1,3] to Sep-Check. If 60771 is false, and if Sep-Check is greater than 0, the Current-Word could be a separate noun modifier. After 60795 or 60796, 60781 increments RRAC by 1; R-RAC[RRAC,1] is set to the modifier which the Current-Word conflicts with. The conflicting modifier causes the conflicting value and/or implies the alternate type; and R-RAC[RRAC, 2] is set to the Current-Modifiee by 60781. After 60781, 60768 is next.

If 60772 is true, a possible relation match has been found. Next, the closeness of the match to the stated words is calculated and stored in CLOSE. If CLOSE is 0, the match is exact. The larger the value of CLOSE, the greater the distance from an exact match. If 60772 is true, 60774 is next and is true if the type implied by the Current-Word modifying Modifiee-WS implies a subtype for the current type of Modifiee-WS. If 60774 is true, 60775 sets CLOSE to 6. If 60774 is false, 60776 is next, and is true if the Current-Word implies a super-type for Modifiee-WS. If 60776 is true, 60777 sets CLOSE to 3. If 60777 is false, 60778 sets Close to 0. After 60777, 60778, or 60775, 60779 is next, and is true if the type of the source in the entry selected at 60772 is a super-type of the Current-Word. If 60779 is true, 60782 increments CLOSE by 1. If 60779 is false, 60780 is next, and is true if the type of the source in the entry selected at 60772 is a subtype of the Current-Word. If 60780 is true, 60783 increments CLOSE by 2. If 60780 is false, or after 60782 or 60783, 60784 is next and is true if CLOSE is greater than 0. If 60784 is false, an exact match has been found and processing is set to continue 60730 which completes processing as described above. If 60784 is true, 60786 stores the matched relation for later processing. The later processing selects the best matched relation. 60786 increments RMAT by 1; R-MAT[RMAT, 1] is set to contain the location of the relation selected at 60772; R-MAT[RMAT, 2] is set to contain the value of CLOSE. After 60786, processing continues of 60768.

If Cur-Rel-Set does not contain an untried relation at 60768, all relations have been processed and 60768 is false. If 60768 is false, 60785 is next and is true if RMAT is greater than 0. 60785 is true if at least one relation match has been found. If 60785 is false, processing is set to continue at 60480 which sets Current-Relation-Found to false and returns to the caller as described above. If 60785 is true, 60787 orders the rows in R-Mat by each row's CLOSE value in column 2. The order priority is lowest value of CLOSE first. After 60787, 60788 is next and is true if there is another untried row in the ordered R-MAT matrix. If 60788 is false, a proper relation has not been found and processing is set to continue at 60480. If 60788 is true, 60789 sets FR to the relation in the next untried row in R-MAT. 60790 is next and is true if the FR relation implies a subtype for Modifiee-WS. If 60790 is true, 60791 sets BACK to 60794; T-CH is set to the Current-Head; the Current-Head is set to the Current-Modifiee; and 60790 sets processing to continue at 60150 which determines if the Current-Modifiee can be changed to the subtype implied by the Current-Word as described above. After the process starting at 60150 is completed, 60794, BACK, is next. 60794 sets the Current-Head to T-CH. After 60794, 60799 is next, and is true if the Noun-Head-Validity is true. If 60799 is false, the subtype change is not allowed for the current interpretation and processing continues for the next relation at 60788 as described above. If 60799 is true, or 60790 is false, 60792 is next and is true if Mod-Check is true. Mod-Check is true for prepositional phrase modifiers because the Current-Word, the prepositional complement, could have modifiers whose relation may be changed. If Mod-Check is false, If 60792 is true, 60793 sets up processing for checking if the Current-Word has no type change implied or has an allowable type change at 60719 as described above. 60793 sets Mod-Pass to 60730; Mod-Fail is set to 60788; and processing is set to continue at 60719. If type change is allowable, processing continues at 60730 as above. If the type is not allowable, 60788 is next as above. If 60792 is false, processing is completed for success at 60730 as described above.

The previous paragraph completes the description of the process starting at 60450 for selecting a relation between a modifiee and a modifier. The 60450 process was initiated at 60437 with 60-Back set to 60438. Processing is returned to 60-Back from 60480 or from 60730. 60480 first sets Current-Relation-Found to false, and 60730 first sets Current-Relation-Found to true. After the 60450 process is complete, 60438 is next and is true if Current-Relation-Found is true. If 60438 is true, a relation has been found, 60439 is next. 60439 sets BACK to 60104, and sets processing to 60732. As described above, 60732 starts a process to adjust the word sense type number of the Current-Word and to store the SREP information for the Current-Word. Then processing continues at 60104 which begins the processing of the next premodifier. If 60438 is false, 60440 is next and is true if there is another possible modifiee in N-Mod[Current-Word, Cur-Typ, Cur-Nat-Lang]. If 60440 is true, 60444 selects another modifiee for processing at 60450 as described above. If 60440 is false, 60441 increments R-No by 1. After 60441, 60442 is next, and is true if R-No is less than MAX, i.e., the Current-Word has an untried word sense number. If 60442 is true, 60444 is next as above. If 60440 is false, 60433 is next, and is true if there is another untried Cur-Typ. If 60433 is true, 60449 increments Cur-Typ by 1, and sets R-No to 1. After 60449, 60444 is next. If 60433 is false, a compatible word sense number for the Current-Word has not been selected, and 60445 is next. 60445 is true if RRAC>0. If 60445 is true, 60447 sets RAC-Back to 60355 and sets processing to continue at 60885 to create a separate modifier if possible. If 60445 is false, processing is set to continue at 60355. 60355 is described below. 60355 is an entry point to 60360 which determines if the Current-Word has an alternate replacement. 60360 is described below.

Next Process Selection after Successful Modifier Processing

After processing returns to 60104, BACK, from 60394 after successfully finding a compatible word sense number for a premodifier, 60104 is false if there are no more unprocessed premodifiers. If 60104 is false and Adj-Check is false, processing continues at 60600. 60600 begins a process to select the next process to be performed for concrete noun word sense number selection. 60600 is true if the next unprocessed word following the Current-Head is a postmodifying adjective. If 60600 is true, 60601 sets the Current-Word to be the postmodifying adjective; Cur-Typ is set to a modifiee value combined with an exclusive symbol for a postmodifying adjective; processing is set to continue at 60120. Setting Cur-Typ to a specific value combined with an exclusive symbol causes only that Ad-Mod modifiee type to be considered. 60601 sets the variables for processing the postmodifying adjective as a premodifying adjective. If 60600 is false, the noun phrase which contains the Current-Head has successfully been processed for word sense number selection. If 60600 is false, 60602 is next. 60602 marks SREP for future access and stores the four elements of the SREP matrix variable for each modifier (excluding prepositional phrases and clauses) and the Current-Head at the modifiers' or head's SDS position. After 60602, 60603 is next and is true if the next unprocessed postmodifier of the Current-Head is a prepositional phrase. If 60603 is true, 60604 is next and is true if the prepositional phrase has an unprocessed preposition. If 60604 is true, 60605 sets Cur-Typ to 1 and sets prepositional processing to start at 60300. However, if Cur-Typ for the prepositional modifier has already been set with an exclusive symbol, Cur-Typ is unchanged. Prepositional processing is described in a following section. If 60604 is false, the prepositional complement is set for word sense number selection at 60606. 60606 sets the Current-Head to be the head of the prepositional phrase complement, and sets processing to continue at 60100 as described above.

If 60603 is false, 60607 is next and is true if the current clause has a processed subject with a "to be" verb, an unprocessed adjective complement which is modified by a prepositional phrase. A subject is processed if its word sense number has been selected. The adjective modified by the prepositional phrase is unprocessed if there is at least one processed subject which has not been processed for being modified by this adjective modified by a prepositional phrase. The first combination of processed subject and unprocessed adjective modified by a prepositional phrase is considered in 60621 and 60608 which are described next. These definitions of processed and unprocessed are utilized for coordinated subjects and coordinated adjectives modified by prepositional phrases. If 60607 is true, 60621 is next and is true if the prepositional complement is an unprocessed clause equivalent. If 60621 is true, the clause equivalent needs to be processed. If 60621 is true, 60623 is next and sets processing to continue at Step 18 which starts processing of the clause equivalent. If 60621 is false, 60608 is next and is true if the adjective is modified by an unprocessed prepositional complement. If 60608 is true, the prepositional phrase complement begins processing at 60606 as described above. If 60608 is false, processing is set to continue at 60850. 60850 is the interface to Adj-Prep, the processing of a prepositional phrase modifying an adjective. 60850 is described below in the processing of a prepositional phrase modifying an adjective section.

If 60607 is false, 60610 is next and is true if the clause has a processed subject, a "to be" verb, and an unprocessed subject complement. A subject is processed if its word sense number has been selected. A subject complement is unprocessed if there is at least one processed subject which has not been processed for being modified by the subject complement. The first combination of processed subject and unprocessed subject complement is utilized for 60611 through 60616. If 60610 is true, 60611 is next and is true if the subject complement is an unprocessed adjective. If 60611 is true, 60612 sets the Current-Word to be the adjective, sets Cur-Typ to the subject with an exclusive symbol, and sets adjective processing to start at 60120. If 60611 is false, 60613 is next and is true if the subject complement is an unprocessed prepositional phrase. If 60613 is true, 60614 is next and is true if the preposition is unprocessed. If 60614 is true, 60615 sets the Current-Head to be the prepositional complement, sets Cur-Typ to the subject with an exclusive symbol, and sets preposition processing to begin at 60300 which is described below. If 60614 is false, 60606 sets up processing of the complement as above. If 60613 is false, 60616 is next and is true if the subject complement is a noun that has been processed for its representational referent if the noun is a clausal abstract noun, or is a pronoun with a noun referent. If 60616 is true, final processing of the subject complement is set to continue at 60900. The process at 60900 is described below. If 60616 is false, or if 60610 is false, 60617 is next, and is true if the Current-Head has Abs-Check in its SDS position. 60617 is true if the Current-Head is a clausal abstract noun. If 60617 is true, processing of the clausal abstract noun is set to continue at 607002 which is described in the Clausal Abstract Noun Representation Referent Word Sense Number Selection section below. If 60617 is false, 60618 is next and is true if N-List has an unprocessed noun. Here, unprocessed means that an R-List and/or a word sense number has not been selected for the unprocessed noun. If 60618 is true, processing is set to continue at 6000 which processes the next noun in N-List as described above. If 60619 is false, all concrete nouns have processed and final processing continues at 60620. The processing at 60620 is described below. First, the processing of a noun subject and a noun subject complement is described next.

Final Processing of a Noun Subject and Subject Complement

The final processing of a subject and subject complement which are both nouns is started at 60900 when 60616 is true. 60900 is true if the subject complement noun phrase has been processed for selecting the word sense number of all words in the noun phrase. If 60900 is false, 60901 sets Current-Head to be the next unprocessed subject complement, and sets processing to continue at 60104 for noun phrase modifier processing as described above. If 60900 is true, 60902 is next. 60902 sets Best-Def to the best defined noun phrase among the subject and subject complement(s) which are unprocessed with respect to this final process. The criteria for selecting the best defined noun phrase is the weighted sum of the following criteria: specific reference noun phrase head, weight 5; known reference noun phrase head, weight 5; proper noun phrase head, weight 5; subject sentence role of noun phrase, weight 2; noun phrase head which is a compatible super-type of the other noun phrase head, weight 5; clausal abstract noun phrase head which has the other noun phrase as a representational referent, i.e., the other meets a category requirement. The weighted sum for a noun phrase is the sum of the weights of all criteria which are true for the noun phrase. Best-Def is set to the subject or unprocessed subject complement with the highest weight. 60902 sets Next-Def to the noun phrase with the second highest weight among the subject or unprocessed subject complements. 60902 also sets Modal-V to false; sets Form-C to false; and sets C-R to false. Form-C is true when a separate clause is required by coordinated subject complements. C-R is true when a subject and subject complement have compatible class number components of their identification numbers. After 60902, 60903 is next and is true if the "to be" verb is modified by a modal verb or modal adverbial. If 60903 is true, 60904 sets Modal-V to true. Modal-V is used to mark modification relations which are modified by the modal verb or modal adverb of a clause with a subject complement.

After 60904, or if 60903 is false, 60905 is next and is true if Best-Def and Next-Def have the same word sense identification number and the same type number, or if subject or subject complement is a clausal abstract noun and the other is a representational referent of the clausal abstract noun. If 60905 is true, Next-Def is being identified as Best-Def as in: "The clue is a hammer." for example. If 60905 is true, 60906 sets Next-Def as having a DEFINING relationship with Best-Def. After 60906, 60912 is next and is described below. If 60905 is false, 60907 is next and is true if both Best-Def and Next-Def have the same stated head. If 60907 is true, no further processing for Next-Def is needed because the subject complement has been set to modify the subject at 60299, and this modification relation has been processed for selection with the methods described above. If 60907 is false, 60916 is next, and is true if the class numbers of Best-Def and Next-Def are compatible which implies that one class number is a super-type of the other. An example of this case is: "A tomato is a fruit." If 60916 is true, 60917 sets Next-Def as having CLASSIFYING relationship with Best-Def; sets C-R to true; and sets processing to continue at 60912 which is described below. If 60916 is false, 60908 is next and is true if one or more modifiers of Next-Def sets a conflicting state or property value with Best-Def's same state or property value. If 60908 is true, 60909 is next, and is true if the one or more conflicting values implied by one or more modifiers of the current Next-Def was set by one or more modifiers of a preceding Next-Def in the current clause. If 60909 is true, 60910 forms a new clause with: Best-Def without the one or more conflicting values as subject, the "to be" verb phrase of the current clause, and Next-Def as the subject complement; the new clause is stored in the SDS; a copy of Best-Def is added to N-List before Next-Def; Form-C is set to true, and processing is set to continue at 60918 which is described below. The formed clause is processed below. If 60909 is false, 60911 is next, and is true if a conflicting value is a property value of Best-Def. If 60911 is true, the word sense numbers of the current clause require a new selection. If 60911 is true, 60913 sets the clause with Best-Def and Next-Def to be unprocessed; the R-No of the subject is incremented by 1; and processing is set to continue at 60293 as described above. The R-No of the subject is incremented so that a new word sense number will be selected at 60293. If 60911 is false, the one or more conflicting values are state values which are allowed to be changed without explicitly using a clause.

After 60906, or if 60908 or 60911 is false, 60912 sets Best-Def as the modifiee of the stated direct modifiers of Next-Def by adjusting the modifier's SDS pointers to the noun phrase which contains them; and the value of Modal-V is marked and stored at Next-Def and in each direct modifier's SDS position. Note that direct modifiers of Next-Def includes clause modifiers. 60912 transfers the modifiers from Next-Def as in a defining sentence such as: "Tom is a good employee." After 60912, 60914 is next, and is true if C-R is false, and if the heads of Next-Def and Best-Def have different types. 60914 is true for a sentence such as: "The car is a sedan." for example. If 60914 is true, 60915 sets Next-Def as having a TYPE-DEFINING relation with Best-Def. If 60914 is true, the type numbers of Best-Def and Next-Def must be compatible because a REQ was set to ensure that all modifiers maintained compatible type numbers. If 60914 is false, or if 60907 is true, or after 60910 or 60915, 60918 is next, and is true there is another noun phrase in the current clause which has not been processed at 60905. If 60918 is true, 60919 sets Best-Def and Next-Def as at 60902; C-R is set to false; and processing is set to continue at 60905 as above. If 60918 is false, 60920 is next, and is true if Form-C is true. If 60920 is true, 60924 is next and is true if there is currently only one unprocessed clause which was formed at 60910. If 60924 is true, 60925 sets Form-C to be false. After 60925, or if 60924 is false, 60926 sets Best-Def to the subject or subject complement as at 60902 for the next unprocessed formed clause; Next-Def is set as at 60902 for the next unprocessed formed clause; C-R is set to false; and processing continues at 60905 as above. If 60920 is false, 60921 is next, and is true if there is another clause with a noun subject complement which has not been processed for word sense number selection of a sentence role. If 60921 is true, 60922 sets the Current-Head to be the next unprocessed sentence role of the next unprocessed clause with a noun subject complement; BACK is set to 60104; and processing is set to continue at 60104 as described above. If 60921 is false, 60923 sets Modal-V to false, and sets processing to continue at 60618 as described above. At 60923, all clauses with a subject complement have been processed for noun word sense number selection in the current sentence.

Prepositional Phrase Modification of Adjectives

The interface to the prepositional phrase modification of adjectives process, ADJ-PREP, begins at 60850. 60850 is next if 60608 is false for example. An implementation of ADJ-PREP for English is described for FIG. **8*b*. 60850 sets Cur-Prep to the preposition modifying the adjective in the current clause; ADJ is set to the adjective in the current clause; COMP is set to the complement of the prepositional phrase modifying the adjective; SUBJ is set to the subject of the current clause; Return-60 is set to 60854; Modal-V is set to false; and P-Call is set to false unless P-Call has been set by a calling process. P-Call is true when a calling process invokes this prepositional phrase modification of adjectives process with a P-Call parameter set to true. After 60850, 60851 is next, and is true if the verb phrase of the current clause has a modal verb or a modal adverbial. If 60851 is true, 60852 sets Modal-V to true. After 60852, or if 60851 is false, 60853 calls ADJ-PREP[Cur-Nat-Lang, SUBJ, ADJ, Cur-Prep, COMP, Return-60, Adj-Prep-Status, Current-Relation] to process the prepositional modification of the adjective in the current clause. Adj-Prep-Status is a signaling parameter between 60 and ADJ-PREP. Adj-Prep-Status contains return information relevant to 60 upon return from ADJ-PREP, and Adj-Prep-Status contains return information relevant to ADJ-PREP upon return from 60. Current-Relation contains a relation found at 60 for ADJ-PREP, or Current-Relation contains the relations to be searched for by 60. After processing is completed at ADJ-PREP, processing returns to Return-60, 60854. 60854 is true if Adj-Prep-Status equals SEARCH. 60854 is true in the case where ADJ-PREP requires 60 to find a prepositional relation between the subject and complement as described above. If 60854 is true, 60857 sets up processing for the prepositional relation at 60450. 60854 sets 60-Back to 60858; Cur-Rel-Set is set to the Current-Relation invocation parameter; the Current-Modifiee is set to SUBJ; the Current-Word is set to COMP; Mod-Check is set to true; and processing is set to continue at 60450. After the modification relation started at 60450 is completed, 60858 is next, and is true if Current-Relation-Found is true. If 60858 is true, a relation has been found, and 60860 sets the Current-Relation to the address of the found relation; and Adj-Prep-Status is set to FOUND-IN-90. After 60860, 60870 returns processing to ADJ-PREP[Cur-Nat-Lang, SUBJ, ADJ, Cur-Prep, COMP, Return-60, Adj-Prep-Status, Current-Relation]. If 60858 is false, 60864 sets the Current-Relation to null, and set Adj-Prep-Status to NOT-IN-90. After 60864, 60870 returns to ADJ-PREP[Cur-Nat-Lang, SUBJ, ADJ, Cur-Prep, COMP, Return-60**, Adj-Prep-Status, Current-Relation].

If 60854 is false, ADJ-PREP has found the relation of the prepositional phrase modifying the adjective in the current clause, ADJ-PREP has failed to find a relation, or ADJ-PREP requires the finding of a modifiee of the adjective in the current-clause. If 60854 is false, 60855 is next, and is true if Adj-Prep-Status equals ADJ-FIND. If 60855 is false, 60856 is next, and is true if Adj-Prep-Status equals FAIL. If 60856 is true, 60859 is next, and is true if P-Call is true. P-Call is true if this prepositional phrase modification of adjectives process is called by an external process such as Selector 50. If 60859 is true, 60867 returns processing control to the caller. If 60859 is false, 60867 sets the Current-Word to the adjective modified by Cur-Prep, and sets processing to continue at 60360 which considers alternate interpretations and is described below. If 60856 is false, the adjective preposition process is complete, and 60861 is next. 60861 is true if the Current-Relation is an AMF-Relation or a T-Relation. If 60861 is true, 60865 sets BACK to 60618, and the prepositional relation is stored next at 60390. 60390 sets SREP[POS,2] to the Cur-Typ; SREP [POS,3] is set to the position of the Current-Modifiee; SREP[POS,4] is set to the address of the modification relation at the Current-Modifiee's external relation structure; and processing is set to continue at BACK. If 60861 is false, processing of the current clause continues at 60618 which is described above.

If 60855 is true, 60872 sets up variables for finding the modifiee of the adjective. 60872 sets Adj-Check to true; Cur-Type is set to the head of the noun phrase with an exclusive symbol; Current-Head is set to the head of the first noun phrase in the modification invocation set contained in the calling parameters; the Current-Modifiee is set to the adjective in the current clause; and processing is set to continue at 60111 which determines if the adjective can modify the Current-Head. When Adj-Check is true, processing will return to 60874 after successful completion at 60106 as described above or after unsuccessful completion at 60363 which sets Adj-Find to false, and returns processing to 60874, and which is described below. After the processing to determine if the adjective can modifiee the Current-Head, 60874 is next, and is true if Adj-Find is true. If 60874 is false, 60878 is next, and is true if there is an untried noun phrase in the modification invocation set. If 60878 is true, 60882 sets the Current-Head to the head of the next untried noun phrase in the modification invocation set, and sets processing to continue at 60111. If 60878 is false, 60880 sets Adj-Prep-Status to NOT-IN-90, and sets Adj-Check to false. If 60874 is true, 60876 sets Adj-Prep-Status to FOUND-IN-90, and sets Adj-Check to false. After 60876 or 60880, 60884 returns processing to ADJ-PREP[Cur-Nat-Lang, SUBJ, A-Sense[Cur-Sense], Cur-Prep, COMP, Return-60, Adj-Prep-Status, Current-Relation]. This completes the interface processing to ADJ-PREP.

Prepositional Phrase Modifiers

Prepositional phrase processing is started at 60300. 60300 is preceded by Steps 60605 or 60615 for example. When 60300 is processed, a word sense number for the complement noun phrase head has been selected, and the word sense numbers of noun phrase heads preceding the prepositional phrase have been selected. However, a noun phrase head in a clause which precedes the prepositional phrase may not have been processed because its containing clause has been suspended. 60300 sets the Current-Modifiee to be the next, possible, untried noun in Prep-Mod[Cur-Nat-Lang, Cur-Typ]. Prep-Mod contains the types of modifiees of a preposition. A particular type of noun phrase modifiee can have more than one instance of a type. The type is indexed by Cur-Typ. The multiple instances are not explicitly described for Prep-Mod, but they are handled in the same way that was described for Ad-Mod for the modifiees of an adjective as described above. If a modifiee can not be found for the current value of Cur-Typ, the next value of Cur-Typ is tried if there is one at 60300. After 60300, 60302 is next and is true if Current-Modifiee was set to a possible modifiee at 60300. If 60302 is false, preposition processing has failed and 60303 is next. 60303 is true if RRAC>0. If 60303 is true, 60304 sets RAC-Back to 60330, and sets processing to continue at 60885 which attempts to determine if the prepositional phrase being processed is a separate modifier as described above. If 60303 is false, processing continues at 30330 which selects an alternative for preposition processing as is described below. If 60302 is true, 60306 is next. 60306 sets up parameters for invoking CN-PREP, the concrete noun prepositional process of the current natural language such as illustrated for English in FIG. 8*b*. 60306 sets Current-Prep to the Current-Head's preposition. CN-PREP-Status is set to Find-Rel. CN-PREP-Status is an invocation parameter which indicates the operation to be performed by the concrete noun preposition process of the current natural language. CN-PREP-Status also is used to pass back the type of operation to be performed by Selector 60. Return-60 is set to 60310. Return-60 is used for the return process address from CN-PREP. After 60306, 60308 calls CN-PREP[Cur-Nat-Lang, Current-Modifiee, Current-Prep, Current-Head, Return-60, CN-PREP-Status, Current-Relation]. The starting address of CN-PREP is at the Current-Prep's SDS location.

After CN-PREP has performed its process as described, it returns processing to Selector 60 at 60310. 60310 is true if CN-PREP-Status is equal to SEARCH. If CN-PREP-Status equals SEARCH, CN-PREP has not found a prepositional relation in Context Memory 120, and returns with one or more possible prepositional relations in the Current-Relation invocation parameter(s). 60 initiates a search for a prepositional relation in Memory 90 at 60312. If 60310 is true, 60312 sets 60-Back to 60314. 60-Back is a process address for a local return. 60312 sets RRAC, a row index for R-RAC, to 0. 60312 sets Cur-Rel-Set to Current-Relation; the Current-Word is set to the Current-Head; Mod-Check is set to true. Finally, 60312 sets processing to continue at 60450. 60450 starts a search for a prepositional relation between the Current-Modifiee and the Current-Head, which is set to the Current-Word for compatibility with the process at 60450. 60450 is described above. After the search for the relation at the process starting at 60450 is completed, 60314 is next, and is true if Current-Relation-Found is true. If 60314 is true, 60316 sets Current-Relation to the address of the found relation, and sets CN-PREP-Status to FOUND-IN-90. If 60314 is false, 60320 sets Current-Relation to null, and sets CN-PREP-Status to NOT-IN-90. After 60320 or 60316, 60318 returns to CN-PREP[Cur-Nat-Lang, Current-Modifiee, Current-Prep, Current-Head, Return-60, CN-PREP-Status, Current-Relation]. If 60310 is false, CN-PREP has completed processing of the prepositional relation between the Current-Modifiee and the Current-Head. If 60310 is false, 60322 is next, and is true if CN-PREP-Status is equal to FOUND which means that the relation has been successfully processed to completion. If 60322 is true, 60324 sets Modal-V to false. 60325 is next, and is true if Current-Prep is a subject complement, and if the verb phrase has a modal verb or a modal adverbial. If 60325 is true, 60326 sets Modal-V to true. After 60326, or if 60325 is false, 60327 marks and stores Modal-V at the Current-Head's SDS position, sets BACK to 60618, and sets processing to continue at 60390 as described above. 60327 completes prepositional phrase modification, and sets up any additional processing to be selected at BACK, 60618.

If all possible modifiees have been unsuccessfully processed, 60302 is false. If 60302 is false, and there are no separate prepositional modifiers, 60303 is false, and 60330 is next. 60330 is true if the R-No of the Current-Head is less than MAX. The Current-Head is the prepositional complement of the prepositional phrase under process. 60330 is true if there is another untried word sense number for the Current-Head. If 60330 is reached, the current word sense number of the Current-Head did not have a prepositional relation with any possible non-verb modifiee in the current sentence. If 60330 is true, 60331 increments R-No of the Current-Head by 1; all modifiers of the Current-Head are set to unprocessed, and processing is set to continue at 60104. 60331 sets the Current-Head for being processed for another word sense number starting at the next untried word sense number. If 60330 is false, 0332 is next, and is true if Current-Prep can modify the verb in the current clause. The capability to modify a verb is checked by determining if Current-Prep has adverbial subclasses associated with in Dictionary 20. Also, a "to be" is not allowed to have a prepositional phrase modifier since this role is handled as direct modification of the subject as described above. If 60332 is true, adverbial prepositional phrase processing begins at 60333. The adverbial prepositional process is described in the following section. If 60332 is false, 60353 is next and sets the Current-Word to the Current-Head. After 60353, the Current-Word is processed for having alternate interpretations starting at 60355. The process starting at 60355 is described below.

Adverbial Prepositional Processing

Adverbial prepositional processing can be invoked by 60 when a prepositional phrase does not have a non-verb modifier in the current sentence. Adverbial prepositional processing can also be invoked by 70 when a prepositional phrase modifying a verb under processing at 70 is to be interpreted for its adverbial sentence role. Both invocations of the adverbial prepositional processing share nearly all of this process. First, the 60 entry and the adverbial prepositional processing is described. Then the 70 interface to this process is described.

Selector 60 starts adverbial prepositional processing at 60333. 60333 sets ADV-Status to 60-Find; R-No is set to 1; L is set to 1; and I is set to 1. ADV-Status is set to 60-Find to indicate that the invocation is from 60. L is an index into ADV-Subclass matrix which contains the adverbial subclasses associated with prepositions. I is an index into SUBCLASS which contains the adverbial subclasses which are possible for the Current-Prep with the Current-Head at the R-No. After 60333, 60336 is next, and is true if R-List [R-No] of the Current-Head meets the source requirements of ADV-Subclass[Current-Prep,L]. If 60336 is true, 60338 sets SUBCLASS[I] to ADV-Subclass[Current-Prep,L]; I and L are each incremented by 1. If 60336 is false, 60339 increments L by 1. After 60339 or 60338, 60340 is next, and is true if ADV-Subclass has an untried adverbial subclass for the Current-Prep. If 60340 is true, 60336 is next as above. If 60340 is false, 60342 is true if I>1. 60342 is true if SUBCLASS contains at least one adverbial subclass. If 60342 is false, 60344 is next and is true if R-No of the Current-Head is less than MAX, i.e., there is an untried word sense number of the Current-Head. If 60344 is true, 60346 increments R-No by 1, and sets L to 1. After 60346, 60336 is next as above. If 60344 is false, no suitable adverbial subclass was found, and 60345 sets RES to NOT-FOUND. RES is the result invocation parameter between this process and Selector 70. If 60432 is true, 60343 sets RES to FOUND. After 60343 or 60345, 60348 is next, and is true if ADV-Status equals 60-Find. If 60348 is true, 60351 is next, and is true RES equals FOUND. If 60351 is true, the Current-Head could possibly be an adverbial prepositional phrase complement. The Current-Head will subsequently be determined for being an adverbial prepositional complement that modifies the word sense number of the verb in the clause by 70. If 60351 is true, 60352 stores information at the preposition which will be used by 70 in the process to determine if the adverbial prepositional phrase does modify the verb. 60352 stores the following information: PREPROC-VERB, SUBCLASS, I–1, and R-No of the Current-Head. PREPROC-VERB implies that the prepositional complement of the preposition has its SUBCLASS already selected by 60. If 60351 is false, the Current-Head does not have a relation with the verb in the Current-Clause, and processing is set to continue at 60353 which prepares the Current-Head for alternate interpretations as described above. If 60348 is false, this process was invoked by Selector 70. If 60348 is false, 60350 is next, and prepares a call which indicates the status of the above process. If RES equals FOUND, the call to 70 indicates that the process was successful. In this case 70 processes Current-Prep and SUBCLASS to find a prepositional relation between the verb in the current clause and Current-Prep's prepositional phrase. 70 invokes ADV in the Cur-Nat-Lang, e.g., FIG. **9*b*, to find a prepositional relation. If RES equals NOT-FOUND, 60350 prepares a call to 70 which implies a suitable subclass was found. In this case, 70 pursues alternative interpretations of the prepositional phrase which are tried as described at 70. If 60348 is false, 60350 decrements I by 1; 60-Return is set to 60354; and 60350 calls Selector 70[70-Find, Current-Prep, Cur-Rel, R-List[R-No], R-No, SUBCLASS, I, 60-Return, RES, ADV-Status]. The Cur-Rel parameter stores the prepositional relation that will later be determined by ADV for 70**.

If the call to 70 at 60350 had RES equal to FOUND, 70 invokes ADV. If ADV is successful, 70 sets RES to FOUND, and invokes 60 at 60354. If ADV is unsuccessful, 70 sets RES to NOT-FOUND, and also invokes 60 at 60354. When 70 invokes 60 under these circumstances, 60354 is next, and is true if RES equals FOUND. If 60354 is true, 60356 sets up variables for processing the complement of the Current-Prep prepositional phrase. 60356 sets the Current-Head to the head of the complement of Current-Prep; all modifiers of Current-Head are set to unprocessed; Cur-Typ for the selection of the prepositional phrase modifiee is set to the current clause verb with an exclusive symbol and with an indication that the 70 requested the processing, which is represented with @-VERB-70; REQ for the Current-Head is set to the requirements in the invocation SUBCLASS parameter; BACK is set to 60359; and processing is set to continue at 60390. 60390 stores information related to the prepositional relation at SREP as described above including Cur-Rel which was set by 70 to contain the address of the modification relation. After 60390, processing returns to 60359 which starts the processing of the complement noun phrase. 60359 sets BACK to 60104, and sets processing to continue at 60104. If 60354 is false, 70 is invoking 60 to find the adverbial subclasses possible with the complement of the prepositional phrase modifying a verb being processed at 70. If 60354 is false, 60358 restores R-No, ADV-Status, and Current-Prep from the invocation parameters sent by 70; I is set to 1; P-ADV is set to false; and processing is set to continue at 60347. 60347 is true if R-No equals 1. If R-No equals 1, 70 is invoking the adverbial prepositional processing for the first time for the complement. In this case, the complement's R-List must be created. If 60347 is true, 60349 sets the Current-Head to be the complement of Current-Prep; L is set to 1; P-ADV is set to true; and processing is set to continue at 60100 which processes the Current-Head as above. When P-ADV is true, after the R-List and related processing is completed, 60336 is next as above. If 60347 is false, 60344 is next as above. This completes description of the adverbial prepositional phrase processing.

Alternate Interpretation of Noun Phrases

The alternate interpretation of a noun phrase is attempted after a noun phrase has failed one of the above processes for selecting a word sense number of a noun head or a modifier of a noun head. In some cases, the failure to select a word sense number is equivalent to failing one option in a search. This is the case for the finding of a modifier for an adjective during ADJ-PREP as described above. When an adjective does not have a possible word sense number, processing is set to continue at 60361 which is true if Adj-Check is true. if 60361 is true, 60363 sets Adj-Find to false, and sets processing to continue at 60874 as described above. If 60361 is false, 60355 is next, and is true if ABS-Check is stored at the Current-Head's SDS location. If 60355 is true, the noun phrase being processed represents a clausal abstract noun as is described below. A clausal abstract noun can have a modifier in the noun phrase of the Current-Head which actually modifies another word in the clause which represents a clausal abstract noun. This clause contains the Current-Head. If 60355 is true, 607000 is next. 607000 stores CLAUSE-MODIFIER at the SDS position of the Current-Word. After 607000, 60369 is next. 60369 is true if the Current-Word is a prepositional complement head. If 60369 is true, processing is set to continue at 60603 to select the next process as above. If 60369 is false, processing is set to continue at 60104 for the next modifier of the Current-Head as above.

Figure 16B:
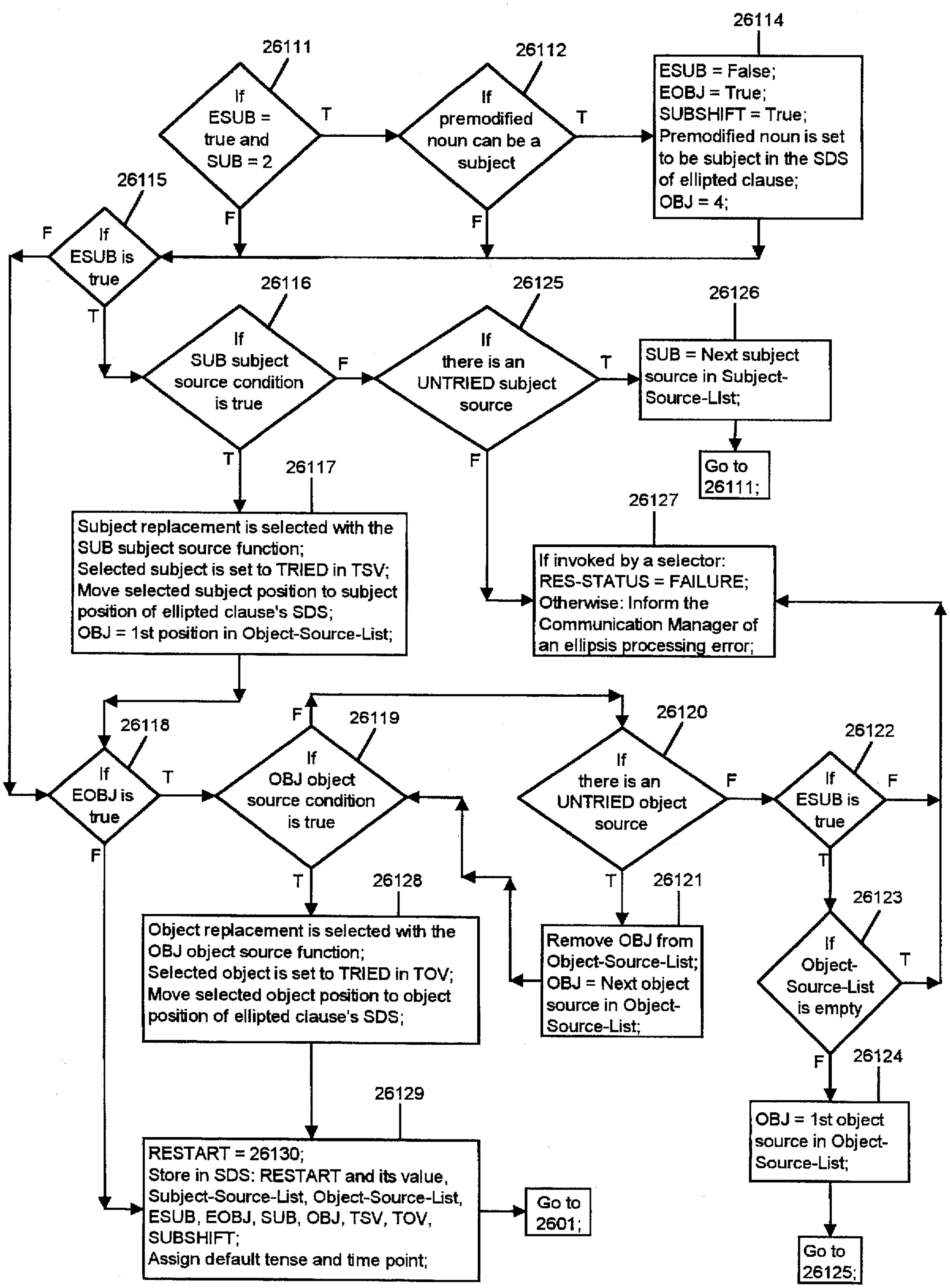
Figure 16C:
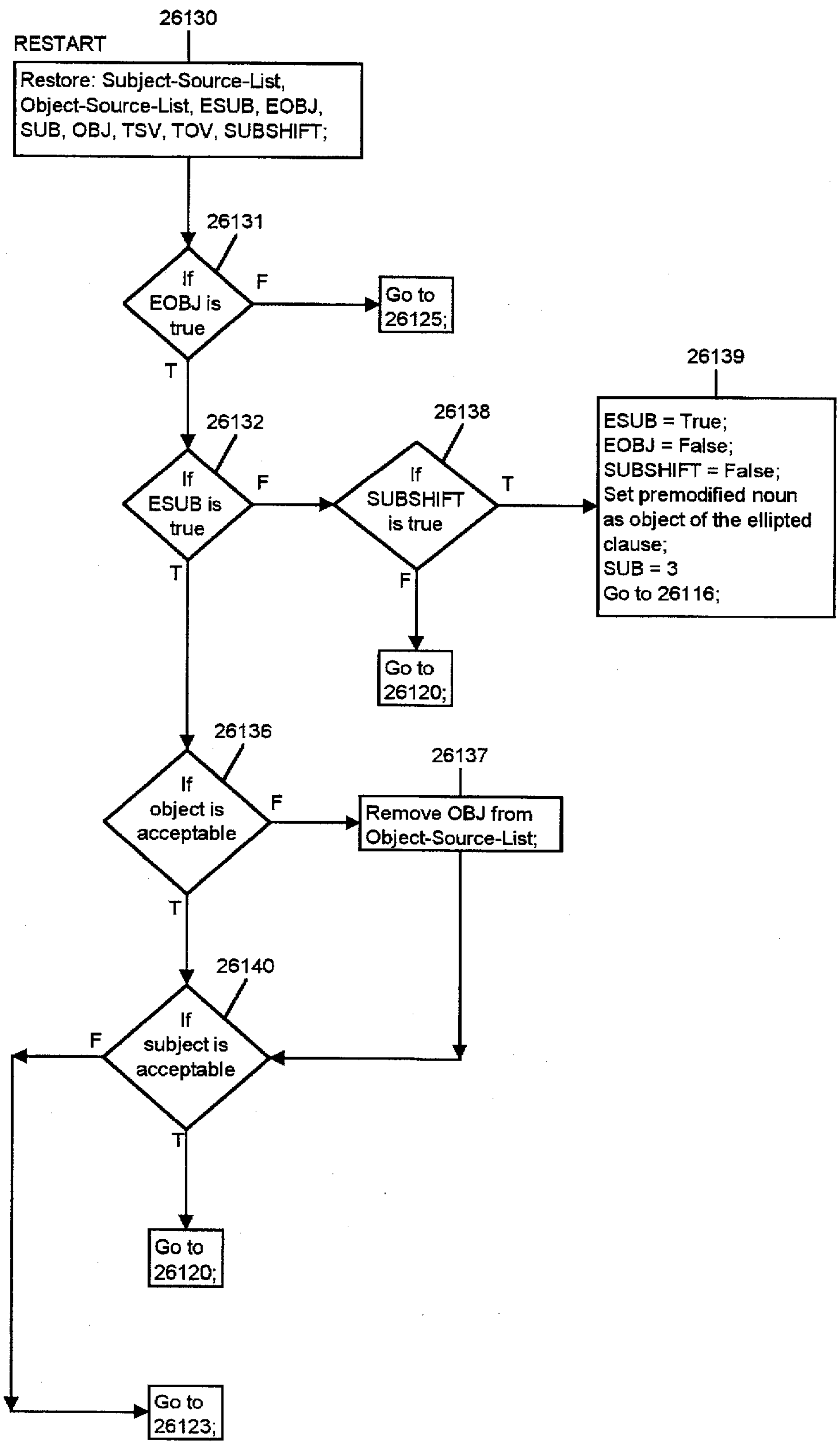

If 60355 is false, 60360 is next. 60360 is the entry point for the other word sense number selection processes described above. 60360 is true if the Current-Word is an ellipted element with alternate processing. Response form ellipsis does not have alternate processing for example. If 60360 is true, 60362 sets Return-60 to 60364, and invokes ellipsis processing by calling ELLIP[RESTART, Return-60]. RESTART, the location where ellipsis processing is restarted, is in the Current-Word's SDS position or at the first word of the elliptical phrase containing the Current-Word. After ellipsis processing is completed as described in English for FIGS. **13*a*–13*c* or FIGS. 16*a*–16*c* for example, processing continues at Return-60, 60364. If 60364 is true if RES-STATUS is not equal to FAILURE. RES-STATUS is a parameter set during ellipsis processing. If 60364 is true, 60366 sets all replacement words which are processed for word sense number selection to PROCESSED at their SDS positions, and sets all replacements which are unprocessed and non-ellipted words in the noun phrase containing the Current-Word to UNPROCESSED at their SDS positions. Here replacement words means words replaced by the latest invocation of ELLIPSIS processing. After 60366, 60368 is next, and is true if a noun in N-List is a replacement word. If 60368 is true, 60370 replaces all replacement nouns in N-List with their ellipsis replacement nouns, sets the first replaced, unprocessed noun to be the next noun processed at 6000; and sets processing to continue at 6000 which begins the process of the next unprocessed noun phrase. If 60368 is false, processing continues at 60104** which processes the next unprocessed modifier of the Current-Head.

If 60360 is false, or if 60364 is false, the Current-Word either is not elliptical, or has no elliptical replacement. If 60360 is false, or if 60364 is false, 60372 is next, and is true if the Current-Word was placed in the SDS through Morphological Processing Step 24. If 60372 is true, 60374 is next, and is true if there is one or more morphological functions stored at the first word placed through morphological processing. Such functions are placed by Step 24 as described for English above. If 60374 is true, 60376 sets RESTART to the morphological restart address in the SDS position of the first word placed through morphological processing; P-Type is set to INVOCATION-RETURN; BASE is set to the base word of the stated morphological word; Return-60 is set to 60377, and 60376 calls MORPH [RESTART, P-Type, BASE, Return-60]. MORPH evaluates the morphological functions of the next unevaluated function type as described above for Morphological Processing Step 24 for English. MORPH will return a RESULT-TYPE, which is an ADDRESS-DESCRIPTOR, PHRASE, and a corresponding RESULT in this case. After processing at 24, 60377 is next, and all words which are replaced through processing at 24 are set to UNPROCESSED. After 60377, 60378 is next, and is true if a noun head in N-List has been replaced. If 60378 is true, 60380 replaces all replacement noun heads in N-List with their morphologically replaced nouns, sets the first replaced noun to be the next noun processed at 6000; and sets processing to continue at 6000 which begins the process of the next unprocessed noun phrase. If 60380 is false, processing continues at 60104 which processes the next unprocessed modifier of the Current-Head. If 60372 is false, the Current-Word is not related to morphological processing. Another alternate interpretation possibility is that the Current-Word is a pronoun. If 60372 is false, 60384 is next, and is true if the Current-Word is a pronoun. If 60384 is true, 60960 is next. 60960 starts a process to select an alternate interpretation of the pronoun as described above. If 60384 is false, or if 60374 is false, processing is set to continue at 60365. If 60384 is false, the Current-Word has no alternative interpretations. If 60374 is false, the Current-Word has no morphological or elliptical alternative interpretations. In this case, there could be an alternate assignment for the Current-Word, and 60365 is next.

60365 is true if the Current-Word is an AMBIGUOUS coordinated modifier. As described above in the Constituent Conjunction Processing section, in certain cases a coordinated constituent modifier can be in one of two groups of modifiers. Here the assumption is that since the Current-Word failed to modify the Current-Head, possibly the Current-Word will modify a different word sense number of the Current-Head. If 60365 is true, 60367 sets the Current-Word to be an UNAMBIGUOUS modifier; all modifiers of the Current-Word are set to UNPROCESSED; all elliptical and/or morphological alternatives of the Current-Word are set to untried; and 60367 assigns the Current-Word to modify the alternate modifiee. After 60367, 60369 is next as is described above. If 60365 is false, 60500 is next. 60500 starts a process to select a word in the noun phrase containing the Current-Word to be processed for selecting another word sense number. The process at 60500 is described next. If a concrete noun is determined to require reinterpretation in subsequent state representation processing or in experience and knowledge processing, such a concrete noun is reinterpreted starting at 60360.

The Word Sense Number Selection Backtracking Process

When the Current-Word has failed some aspect of its word sense number selection, and all possible alternative interpretations have been unsuccessfully attempted, it is possible that the Current-Word or another word in its noun phrase can have a different word sense number which allows interpretation of the noun phrase containing the Current-Word. When this failure occurs, a type of backtracking is performed in which a word, a modifier in the noun phrase or the head of the noun phrase, which has been previously processed for word sense number selection is chosen for selecting a different word sense number. The choosing of such a word causes one or more words to be reprocessed for word sense number selection. A chosen word is processed for a different word sense number. The chosen word's direct and indirect modifiers are also reprocessed for word selection in the process for word sense number selection described above. The word sense number selection process of above proceeds until the noun phrase is successfully processed, or until a backtracking process is required. If the backtracking is successful, another word sense number selection proceeds as before. If the backtracking process is unsuccessful, the Communication Manager is informed of a failure. The word sense number selection and backtracking does not cycle in an infinite loop because a chosen word is processed for word sense number selection beginning at its next untried word sense number in its R-List. This backtracking process begins at 60500.

60500 is true if the Current-Word is a prepositional complement. If 60500 is true, 60502 is next, and is true if Cur-Typ equals @-Verb-70 with an exclusive symbol. If 60502 is true, the prepositional complement is being processed for an invocation of Selector 70 to find the word sense number(s) of a prepositional complement of an adverbial prepositional phrase. If 60502 is true, the word sense number selection process for the complement failed, and 60508 returns processing to the caller, 70 in this case. If 60502 is false, 60504 sets Next-M to a modifiee selected with the policy of Prep-Mod-Retry[Cur-Nat-Lang, Cur-Typ]. For example, the Prep-Mod-Retry[English, Cur-Typ] policy is the nearest, possible, modifiee of the prepositional phrase in Prep-Mod[English, Any-Typ] with a R-No less than MAX except for noun heads with a SOURCE equal to CONTEXT. Any-Typ means any Cur-Typ meeting the requirement for Prep-Mod-Retry or any other selection policy. However, a Cur-Typ with an exclusive symbol only allows the exclusive value. After 60504, 60506 is next, and is true if a Next-M was selected at 60504. If 60506 is true, 60528 begins a process to reprocess Next-M, and is described below. If 60506 is false, 60510 is next, and is true if there are possible modifiers of the prepositional phrase containing the Current-Word which are suspended. A modifiee would be suspended if it depends upon a cataphoric pronoun for example. If 60510 is true, 60512 stores U-List, a list of suspended modifiees, at the SDS position of the head of the prepositional complement, and processing is set to continue at 60618 to select the next word to be processed. When the suspended modifiers have been processed, Step 18 invokes the processing of a prepositional phrase with a U-List by invoking 60 by setting the Current-Head to such a prepositional complement and setting Any-Typ to U-List with an exclusive symbol. If 60510 is false, 60550 is next. 60550 tries other alternative possibilities as described below.

If 60500 is false, i.e., the Current-Word is not a prepositional complement, 60514 is next, and is true if the Current-Word has a CONF-M structure with a least one unprocessed row in its SDS position. If 60514 is true, 60516 sets the first row of CONF-M to be the first unprocessed row in CONF-M; 60516 sets Next-M to CONF-M[1,1]; and 60516 removes the source of the first row of CONF-M from the SDS. CONF-M[1,1] is a word which conflicted with the Current-Word as described above. After 60516, 60518 is next, and is true if the R-No of Next-M is less than MAX. If 60518 is true, 60528 is next, and is described below. If 60518 is false, 60514 is next as above. If 60514 is false, 60520 is next, and is true if the Current-Word is an adjective. If 60520 is true, 60522 sets Next-M to a modifiee selected by AD-Mod-Retry[Cur-Nat-Lang, Cur-Typ]. For example, the Ad-Mod-Retry[English, Cur-Typ] policy is the nearest, possible, modifiee of the adjective in Ad-Mod[English, Any-Typ] with a R-No less than MAX except for noun heads with a SOURCE equal to CONTEXT. After 60522, 60524 is next, and is true if a Next-M was selected. If 60524 is false, 60550 is next, and tries other alternative possibilities as described below. If 60524 is true, 60525 is next, and is true if the R-No of Next-M equals MAX. If 60525 is true, 60527 sets Current-Head to Next-M, and sets processing to continue at 60232. 60232, as described above, determines if the Current-Head has additional word sense numbers for the case here where Next-M is a head with SOURCE equal to Context. If the Current-Head has additional word sense numbers, they are processed as above. If there are not additional word sense numbers, processing continues at 60550. If 60525 is false, 60528 is next, and is described below. If 60520 is false, 60526 sets Next-M to a modifiee selected by Noun-Mod-Retry[Cur-Nat-Lang, Cur-Typ]. For example, the Noun-Mod-Retry[English, Cur-Typ] policy is the nearest, possible, modifiee of the noun in Noun-Mod [English, Any-Typ] with a R-No less than MAX except for noun heads with a SOURCE equal to CONTEXT. After 60526, 60524 is next as above.

60528 is reached if a Next-M has been selected by one of the methods described above. 60528 sets Next-M, all its direct and indirect modifiers, and the Current-Word to UNPROCESSED at each such word's SDS position; BACK is set to 60104; and R-No of Next-M is incremented by 1. After 60528, 60530 is next, and is true if the Next-M is a noun phrase head. If 60530 is false, 60532 sets the Current-Word to be Next-M, and processing of the Current-Word is set to continue at 60104 as above. If 60530 is true, 60534 sets the Current-Head to be Next-M. After 60534, 60536 is next, and is true if Next-M is a prepositional complement. If 60536 is true, processing continues at 60104. If 60536 is false, 60539 is next, and is true if Next-M is in a clause with a subject complement. If 60539 is false, Next-M is a sentence role noun head which requires selecting word sense numbers which are compatible with the clause verb and other sentence role noun phrases, and 60540 is next. 60540 decrements Next-M's R-No by 1. 60540 decrements the R-No because there are possible special uses of Next-M which are considered at Selector 70 as is described below. After 60540, 60541 is next, and is true if Next-M is a subject. If 60541 is true, processing continues at 60214 which causes a new subject word sense number to be selected at 70 as above. If 60541 is false, processing continues at 60216 which causes a new receiver word sense to be selected at 70 as above. If 60539 is true, 60544 is next, and is true if a subject complement has the same noun phrase head as the subject. If 60544 is true, 60546 sets a variable which implies no match at 60294, and processing is set to continue at 60295 which begins the process of processing the subject complement with an incremented R-No as described above. If 60544 is false, processing continues at 60293 which selects a new R-No match of the subject and subject complement starting at the current value of R-No.

If a Next-M was not selected at 60524, there are other possible processes which can continue the processing of the Current-Word, and these possible processes are selected starting at 60550. If 60524 is false, 60550 is next, and is true if the Current-Word is in a clause with a noun subject complement phrase. If 60550 is true, 60552 is next, and is true if there are more than one noun subject complement in the current clause. If 60552 is true, 60556 forms a completed clause with a processed subject and all processed subject complements in the current clause. If a completed clause can not be formed because the subject is not processed, or if no subject complement is processed, 60556 forms a clause with the subject and the first unprocessed subject complement, and the R-No's of the subject and subject complement are set to 1. The subject complement in this formed clause is set so that the subject complement does not directly modify the subject if it had been previously been set to modify the subject at 60299. 60556 also forms a clause with the subject and all subject complements which are not already in a clause formed at 60556, and the R-No's of the subject and all subject complements in this clause are set to 1. All subject complements in this clause are also set so as not to directly modify the subject if they had been previously set to modify the subject at 60299. Then 60556 sets processing to continue at 60290 which processes clauses prior to the selection of matching word sense numbers for the subject and subject complement as described above. Prior to 60556, all subject complements in the current clause are required to have a relation with a single subject word sense number. 60556 sets up clauses so that the subject effectively can have different word senses in different clauses. This need for multiple implied word sense numbers for a single stated word can occur for coordinated constituents. If 60552 is false, 60558 sets processing to continue at 60554 which informs the Communication Manager of a noun word sense number selection process failure at the Current-Word.

If 60550 is false, 60559 is next, and is true if the Current-Word is in a subject phrase or a receiver phrase, and if the head of Current-Word's phrase has a R-No which is equal to MAX. If 60559 is true, there could be possible special usages selectable at Selector 70. A special usage is abnormal usage of a word sense number in a clause, and special usages are described at Selector 70 below. If 60559 is true, 60560 sets the Current-Head to the head of the phrase containing the Current-Word; all modifiers of the Current-Head are set to UNPROCESSED; Next-M is set to the Current-Head; and processing is set to continue at 60541 which sets up Next-M for processing at 70 as described above. If 60559 is false, 60561 is next, and is true if there is a subject, or a receiver if the Current-Word is a prepositional complement noun phrase head, which is before the Current-Word with an R-No<MAX. If 60561 is true, 60562 sets the Current-Head to be the nearest, with respect to the position of the Current-Word, subject or receiver satisfying 60561. A receiver is allowed as a possible Current-Head at 60562 for a Current-Word which is a prepositional complement noun phrase head because new word sense numbers could be selected for the Current-Head at Selector 70 such that the Current-Word's prepositional phrase could modify the new word sense numbers. If the Current-Head is set to a subject at 60562, all words after this subject could have new word sense numbers selected at 70. These new word sense numbers could allow the Current-Word's phrase to be successfully processed for noun word sense number selection. These comments about 60562 also apply to 60568 and 60572. After 60562, 60564 sets all words in the Current-Head phrase and all words after this phrase to UNPROC- ESSED; Next-M is set to be the Current-Head; and 60564 sets processing to continue at 60541 which is described above. 60564 sets up possible new word sense numbers for the Current-Word to be selected at Selector 70. If 60561 is false, 60566 is next, and is true if there is a non-pronoun, non-specific known reference, subject, or receiver if the Current-Word is a prepositional complement noun phrase head, which is before the Current-Word with SOURCE equal to CONTEXT. If 60566 is true, 60568 sets the Current-Head to be the nearest, with respect to the position of the Current-Word, subject or receiver which makes 60566 true. After 60568, 60564 is next as described above. If 60566 is false, 60570 is next, and is true if there is a subject, or receiver if the Current-Word is a prepositional complement noun phrase head, which has an untried special usage, an untried elliptical alternative, or an untried morphological alternative, and which is before or at the Current-Word. If 60570 is true, 60572 sets the Current-Head to the nearest, with respect to the position of the Current-Word, subject or receiver which makes 60570 true. After 60572, 60564 is next as described above. If 60570 is false, 60576 is next, and is true if the verb in the current clause is a pronoun. If 60576 is false, 60554 is next and informs the Communication Manager of a noun word sense number selection process failure at the Current-Word as above.

If the verb in the current clause is a pronoun, 60576 is true, and 60930 is next. 60930 is true if the verb in the current clause has an untried word sense number in its R-List. If 60930 is true, 60932 sets all the words in the current clause to be UNPROCESSED; the R-No of the verb is incremented by 1; the Current-Head is set to be the first subject; all subject and receiver R-Nos' are set to 1; and 60932 sets processing to continue at 60214 which attempts to select a subject word sense number starting at the next untried word sense number of the verb as described above. If 60930 is false, 60934 sets INIT to RESTART, sets RETRY to true, and sets the verb's R-No to 0. After 60934, 60941 begins a process to select another interpretation of the pronoun verb as described above.

Reference Processing

After all nouns on N-List have been processed at 60618, 60618 is false, and 60620 is next. The process beginning at 60620 processes the noun phrase heads which have been processed for word sense number selection as described above for determining the heads specific address, i.e., its word sense number, in Memory 90. The reference processing includes setting specificity word sense numbers and experience word sense numbers. Also, function word adjectives have been previously processed for default reference types. The default reference type is adjusted for exceptions.

60620 is true if there is a noun head in N-List or in a prepositional phrase which has not been reference processed. If 60620 is true, 60622 sets Cur-Ref to be the next unprocessed noun head. 60624 is next, and is true the SOURCE of Cur-Ref is CONTEXT. If 60624 is true, processing continues at 60800 which evaluates adjective word functions and which is described below. 60624 is true for a noun head which is already in Context Memory 120. If 60624 is false, the noun head is a new reference to the conversation, and 60626 is next. 60626 is true if Cur-Ref is a specific known reference type. If 60626 is true, 60628 is next, and is true if Cur-Ref has a type change to a subtype. If 60628 is true, 60630 informs the Communication Manager with delay of a state definition change for a specific known reference for Cur-Ref; and Cur-Ref is set to a specific unknown reference. If 60628 is true, the Communication Manager will decide if the state definition change requires interaction with the conversation source. The "with delay" component of this Communication Manager informing statement causes action by the Communication Manger to be delayed until the Current-Clause is processed. The delay is utilized because the interpretation of the Current-Clause is not immediately affected by this type change of a reference. After 60630, 60648 selects a specificity number and is described below. If 60628 is false, 60632 searches and sets the experience number component of Cur-Ref to the best match based on states set in the current sentence first with experience number entries in 90 which are owned by Cur-Ref. The search is for states which have the same value as Cur-Ref with the the states just set having priority over states set before. The best match occurs for the most agreements in state value with the fewest disagreements. If there are multiple experience numbers with the same number or agreements and disagreements, the experience number with the most agreements and fewest disagreements of states set in the current sentence is selected. If the current states do not select a single experience number, the highest experience number among the experience numbers left after performing the current state selection criteria is selected as the experience number. After 60632, 60634 is next, and is true if there is no experience number match at 60632. 60634 is true when there are no experience number in 90 which has any agreements with the state values of Cur-Ref. If 60634 is true, 60636 generates a new experience number and stores it at Cur-Ref's position in the SDS. The generated experience number contains a component which indicates that it is a new experience number. If 60634 is false, 60638 is next, and stores the matched experience number at Cur-Ref's SDS position. After 60636 or 60638, processing continues at 60800 which is described below.

If Cur-Ref is not a specific known reference, 60626 is false, and 60644 is next. 60644 is true if Cur-Ref is a specific unknown reference. If 60644 is true, 60646 is next, and is true if Cur-Ref has a subtype change with respect to previous references to Cur-Ref in 120. If 60646 is true, 60650 is next, and is true if Cur-Ref has a nonrelated subtype change. If 60650 is false, or if 60646 is false, or after 60630, 60648 selects a specificity number with the best match based on states set in the current sentence first with specificity number entries in 90 which are owned by Cur-Ref with a process as described at 60632. If no match is found, the specificity number is set to 0. After a specificity number has been selected, the specificity number is then incremented by 1 and stored at Cur-Ref's SDS position. After 60648, processing to continues at 60800 which is described above. If 60650 is true, 60652 sets Cur-Ref to a general reference, and processing continues at 60662 which generates a version number and which is described below. If 60644 is false, Cur-Ref is a general reference, and 60658 is next. 60658 is true if Cur-Ref matches a version number stored in the SDS for Cur-Ref. Cur-Ref matches a version if the type number of Cur-Ref matches a type of a version number in 120, or is a super type of a version number in 120 for Cur-Ref. A version number has a type number, a specificity number, and a zero experience number. If 60658 is false, 60662 generates a version number with the type of Cur-Ref; a specificity number for the version number is generated as at 60648; the experience number for the version number is set to zero; and the version number is stored at Cur-Ref's SDS position. After 6After or if 60658 is true, processing continues at 60800.

After Cur-Ref has been processed for its reference type word sense number implications, 60800 is next. 60800 checks if Cur-Ref's default reference type, Cur-Ref's reference, and Cur-Ref's reference history meet exceptions to the default reference type in Ref-Exception[Cur-Nat-Lang]. Ref-Exception[Cur-Nat-Lang] is a look up table. Some entries in Ref-Exception[Cur-Nat-Lang] have functions which are evaluated to obtain a value. The values in Ref-Exception[Cur-Nat-Lang] are checked for a match. If a match is found, the table has an associated reference type for the match which implies a reference exception. If there is a match, 60800 sets the reference type of Cur-Ref at its group descriptor at its SDS position. After 60800, 60802, is next and is true if Cur-Ref's group descriptor contains an ambiguous quantization/comparison function. Functions in the group descriptor are functions from adjective function words which could not be evaluated as described above for adjective function word processing. If 60802 is true, 60804 is next, and is true if the state associated with the ambiguously compared adjective is stated again in the current sentence or is in Context Memory 120. If 60804 is true, 60806 replaces the ambiguous function with the comparison function component from the ambiguous function and adds an UNAMBIGUOUS-BY-ASSUMPTION mark. The ambiguous function contains a comparison function and a quantization function. The mark indicates the function replacement operation. If 60804 is false, 60808 is next, and is true if Cur-Rel can be quantized. If 60808 is false, 60806 is next as above. If 60808 is true, 60810 replaces the ambiguous function with the quantization function from the ambiguous function and adds an UNAMBIGUOUS-BY-ASSUMPTION mark. After 60810 or 60806, or if 60802 is false, 60812 is next. 60812 is true if Cur-Ref's group descriptor contains a special function, a selection function a negation function, an inclusion function, and/or an exclusion function. If 60812 is true, 60814 evaluates the functions and stores the results in the SDS. If 60812 is false, 60816 is next, and is true if Cur-Ref's group descriptor contains an unambiguous quantization function. If 60816 is true, 60818 evaluates the quantization function and stores the result in the group size component of the group descriptor in Cur-Ref's SDS position.

If 60816 is false, 60820 is next, and is true if Cur-Ref's group descriptor contains an unambiguous comparison function. If 60820 is true, 60822 is next, and is true if the C-relation is stored at a compared element as it would be for the adjective in a comparison. If 60822 is true, 60824 is next, and is true if the stored C-Relation is consistent with Cur-Ref's state or property value. If 60824 is true, or if 60822 is false, 60832 generates the C-Relation if necessary and stores the C-Relation at Cur-Ref's SDS position. If 60824 is false, 60826 is next, and is true if the compared elements are properties. If 60826 is false, 60830 informs the Communication Manager with delay of a compared state inconsistency. If 60826 is true, 60828 informs the Communication Manager with delay of a compared property inconsistency. The Communication Manager determines if a clarification of the inconsistency at 60828 or 60830 is needed. The delay is included because the Current-Clause is not immediately affected by this inconsistency. The Communication Manager typically determines the source of the inconsistency. After 60828 or 60830, 60832 generates and stores the C-Relation as above. After 60832, or if 60820 is false, 60836 is next, and is true if Cur-Ref's group descriptor differs in membership or quantization compared to all other group descriptors of Cur-Ref in 120 if any. If 60836 is true, 60838 marks the group descriptor as NEW. If 60836 is false, 60840 marks Cur-Ref with a pointer to its matching group descriptor in 120. After 60840, or after 60838, 60620 is next.

If all noun heads have been processed at 60620, 60620 is false, and processing continues at 60673 which begins to process modification relations with a true Modal-V value. Such relations have been modified by modals or adverbs as described above. 60673 is next, and is true if there is a clause which has not currently been processed for Modal-V. The current N-List may contain nouns which span multiple clauses. If 60673 is false, processing is set to continue at the caller of 60 which is typically Step 18. Another common caller is 70 which calls 60 to process an adverbial prepositional phrase complement's modifiers. If 60673 is true, 60675 sets Cur-Clause to the next unprocessed clause. After 60675, 60676 is next, and is true if the clause has a "to be" verb phrase with a modal verb. If 60676 is true, 60-Return is set to 60679; Cur-Modal is set to the modal in the verb phrase of Cur-Clause; and 60679 calls MODAL[Cur-Nat-Lang, Cur-Modal, 60-Return]. MODAL selects the truth value of the Cur-Modal. An example of MODAL for English is described for FIG. 10*a*. After MODAL has completed processing of Cur-Modal, 60679 is next. 60679 sets a pointer to the truth value of Cur-Modal for each modifier relation in Cur-Clause with a true Modal-V value, and sets processing to continue at 60680. After 60679, or if 60676 is false, 60680 is next, and is true if the clause has a "to be" verb phrase with one or more adverbs. If 60680 is false, 60673 is next as above. If 60680 is true, 60681 sets 60-Return to 60682; Current-Adverbial is set to the next unprocessed adverb in the verb phrase of Cur-Clause; ADV-Subclass is set to the Relation-Modification-Subclass-Set[Cur-Nat-Lang]; and 60681 calls ADV[Cur-Nat-Lang, Current-Adverbial, ADV-Subclass, 60-Return]. Relation-Modification-Subclass-SetCur-Nat-Lang contains adverbial subclasses for modification of relations in the current natural language. For example, "always, usually . . . " can modify "to be" verbs with a subject complement, and hence, modify the modification relation between the subject and subject complement. ADV processes the Current-Adverbial using the ADV-Subclass to select its adverbial function as described above for English for FIG. 9*b*. After ADV has reached completion, 60682 is next, and is true if Current-Adverbial is successfully processed by ADV. If 60682 is false, 60683 informs the Communication Manager of an improper Current-Adverbial for relation modification. If 60682 is true, 60684 sets a pointer to the adverb function results of Current-Adverbial for each modifier relation in Cur-Clause with a true Modal-V value. After 60684, 60685 is next, and is true if there is another unprocessed adverb in Cur-Clause. If 60685 is true, 60681 is next as above. If 60685 is false, 60673 is next as above. This completes the description of concrete noun word sense number selection. State and clausal abstract nouns are described next.

STATE ABSTRACT NOUNS

State abstract nouns are closely related to concrete nouns. State abstract nouns are variations of a concrete noun in the sense that a state abstract noun has a data structure which is a special case of a concrete noun data structure. State abstract nouns have a data structure in Memory 90 which is a special case of a concrete noun data structure as described for FIGS. 17*b*, and 17*c*. This data structure in 90 is used to select the word sense number of a state abstract noun and its modifiers with the same process utilized to select concrete nouns in Selector 60. State abstract nouns differ from concrete nouns in that they represent states. Thus, a word sense number of a state abstract noun has a pointer to a state data structure in Memory 80 which is described below.

A state abstract noun word sense number has the same components as a concrete noun word sense number as illustrated in FIG. 17*a*. A state abstract noun word sense number is composed of an identification number, type number, specificity number and experience number. The word sense number of a state abstract noun is essentially the same as a concrete noun except that the identification number of a state abstract noun differs from the composition of a concrete noun identification number. The state abstract noun identification number is composed a class number, member number, a value range, and an owner word sense identification number. A concrete noun identification number does not have a value range or an owner word sense number. The class number of a state abstract noun belongs to a class containing states. The member number is a state number. The value range corresponds to the range of values allowed for the state of the state abstract noun. The owner word sense number is used as the source for the type number, specificity number, and experience number. The value range and owner word sense number are utilized to access the data structure of an abstract noun in Memory 80.

The entry format for a state abstract noun is the same as the concrete noun format entry illustrated in FIG. 17*b*. The actual entries of a state abstract noun differ little from a concrete noun entry. One difference is that an adjective modifying a state abstract noun sets the state value of the state associated with the state abstract noun. The adjective sets the state value in the sense that it selects a pointer value to Memory 80 associated with a state abstract noun. A concrete noun typically has many states associated with it. However, one state abstract noun can have multiple separate states which are parts of the one state abstract noun. For example, a "person's health" is a single state abstract noun which is in a partitive A-relation to the state abstract nouns corresponding to the entities of the body with a "health" state such as: "heart, lungs, hands," etc. The partitive A-relations in this example contain the dependencies of the subpart to the overall state abstract noun. For example, a "person's health" has a 100% negative dependency with the "health of the person's heart". Thus if the "health of a person's heart is bad", the "person's health is bad". However, if the "health of a person's heart is good", more information is needed to set the state associated with the "person's health".

The external relation structure format of a state abstract noun is the same as the format for a concrete noun as illustrated in FIG. 17*c*. The contents of an external relation structure for a state abstract noun differs from concrete noun external relation structures in that the state abstract noun type is usually selected with a possessive A-relation. State abstract nouns do have some specializations of the data structures of FIGS. 17*a*, 17*b*, and 17*c* as described above, but these specializations utilize the same structures as concrete nouns use. Even though a state abstract noun represents a state, an internal entity of knowledge and experience of the Language Machine, the usage of state abstract nouns in natural language is so similar to concrete nouns that a state abstract noun utilizes the same data structures as a concrete noun, depicted in FIGS. 17*a*, 17*b*, and 17*c*. Also, this similarity allows state abstract nouns to utilize the same word sense number selection process, depicted in FIGS. 17*d*–17*jj*, as is used for concrete nouns.

CLAUSAL ABSTRACT NOUNS

Clausal abstract nouns are also closely related to concrete nouns. Clausal abstract nouns are typically equivalent to a representational referent modified by a subordinate clause. The representational referent modified by this clause is often a concrete noun or possibly an abstract noun in the context of the conversation. The modifying clause defines the modified representational referent in the sense number that the clause is typically used to select a concrete noun or abstract noun in the context as is described below. The subordinated clause modifying a representational referent is associated with a word sense number of the clausal abstract noun. For example, "clue" can have a word sense in English as follows: "thing which could solve a crime". Note, the representation of a clausal abstract noun is a representational referent modified by a relative clause. In this representation, the representational referent has a sentence role in the relative clause. This sentence role is typically a subject of the relative clause. This representation is used because it could grammatically replace the clausal abstract noun in a sentence. For this example, "thing" is the general category of the representational referent for this word sense of "clue". The representational referent could be selected to be some member in a special group, called a direct category, which is associated with a group A-descriptor in the representational referent's sentence role in the modifying subordinate clause of the word sense number of a clausal abstract noun. In this example, "thing" has a direct category for its possible referents such as: weapon, fingerprint, foot print, etc. A direct category has an associated group of elements which can be the representational referent. Also, a non-representational referent sentence role in the subordinate clause modifying the representational referent could also have a direct category for a referent in the context. FIG. 18*a* depicts the format for a direct category. A direct category has a list of one or more of the following elements: a concrete noun word sense number, a state abstract noun word sense number, a clausal abstract noun word sense number, a pointer to a direct category of a clausal abstract noun, a pointer to an indirect category of a clausal abstract noun which is defined next. If a direct category contains a pointer to another direct or indirect category of a clausal abstract noun, that other direct or indirect category is incorporated into the direct category during processing of a direct category. During processing of a direct category, the elements in a direct category are compared with referents in Context Memory 120 for a match between a direct category element and a referent in 120.

A clausal abstract noun can also have an indirect category. The format for an indirect category is depicted in FIG. 18*b*. An indirect category is a set of one or more descriptors of elements which are used to select a referent in 120 for the representational referent or for an element in a subordinate clause modifying the representational referent. A descriptor of an element of an indirect category is a set of one or more adjective or state abstract noun word sense numbers each composed of an identification number and the most general owner word sense number. The most general owner word sense number is listed in an element if it differs from the representational referent such as for a part of the representational referent. The most general word sense number possible has an identification number only containing a class number and has zero type, specificity and experience number. The entry contains the most general owner word sense number which selects a valid referent. An adjective word sense identification number is composed of a state number which accesses the state or property associated with the adjective word sense number. A state number is composed of a class number and a member number. The adjective word sense identification number also contains a typical value, a specific non-typical value, or a value range. The owner word sense number is selected during the processing of the modifiee, which is the representational referent or another element in the modifying subordinate clause for clausal abstract nouns. A referent with the same degree of generality in the descriptor or with a more specific variation of the descriptor matches the descriptor. A descriptor of an element may optionally contain a name which is a concrete noun or abstract noun word sense identification number. An indirect category pointer is contained in a group A-descriptor in the representational referent's sentence role. Other non-representational referent sentence roles in the modifying subordinate clause of the word sense number of a clausal abstract noun could also have an associated indirect category. A descriptor of an element is a set of requirements which a sentence role element must have to perform its sentence role. A indirect category element is compared with referents in Context Memory 120 for a referent in 120 that has the adjective word sense numbers which match a descriptor in the indirect category. A representational referent or an element in the subordinate clause modifying the representational referent is selected with an indirect category with this comparison process. For example, "clue" with the word sense of "thing which could solve a crime", could have an indirect category descriptor for "thing" in English such as: "weight (greater than one pound, less than 10 pounds), EDGES (blunt), length (greater than 6 inches, less than 4 feet), rigid, inanimate, a weapon". The words in parentheses are the state or property's value or value range associated with the preceding adjective's state or property. Words in capital letters indicate the owner of the adjective for owners which differ from the sentence role related to the indirect category element. Adjectives or state abstract nouns without succeeding words in parentheses have the typical value. In this example, the descriptor contains 5 properties and no states, 2 value ranges, and 3 values. The appositive, "a weapon", is the name of the indirect category descriptor. The representational referent or an sentence role representing a referent in the modifying subordinate clause has a group A-descriptor which points to the direct category and/or indirect category of the representational referent or the element.

A clausal abstract noun's modifying subordinate clause can also have an implied purpose relation with a clause in 120, which has been stated in the preceding conversation. For example, another general word sense of "clue" in English is: "thing that is used to solve a problem". If the conversation is about solving a homework problem, the word sense of "clue" could have a representational referent and a sentence role referent which makes the word sense more specifically: "text that is used to solve a homework problem". "text" is a direct category element for the representational referent of "thing". "homework problem" is also a direct category element of the sentence role referent for the modifying subordinate clause element "problem". Note that "homework problem" is actually another clausal abstract noun. The representational referent of "homework problem" is the clause(s) describing the problem. The actual referents for "text" and "homework problem" are obtained from the context in a process described below in this section. The subordinate clause modifying "text", "that is used to solve a homework problem", is an English equivalent of a purpose relation which is used to find the actual stated one or more clauses which is the representational referent of the "text". Thus, in this example, the actual representational referent is one or more clauses "that is used to solve a homework problem". The one or more clauses have either been classified with the purpose relation of this example by Purpose Identifier 140 previously, or the one or more clauses require an additional classification by 140 to this purpose relation. Purpose Identifier 140 is described below. The one or more clauses could possibly follow the related clausal abstract noun, i.e., the representational referent could be cataphoric.

A modifying subordinate clause of a clausal abstract noun is stored in Memory 100. Such a subordinate clause can have an associated purpose relation processing descriptor which is stored in Clausal Abstract Noun and Clause Purpose Memory 130. The purpose relation processing descriptor contains one or more of the following: the clause(s) owning the purpose relation, the purpose relation, the clause(s) owned through the purpose relation, purpose identification evaluations, purpose selection processes, and/or the function which relates the purpose relation or an aspect of the purpose relation to the clausal abstract noun which is associated with the purpose relation processing descriptor. The order of the entities in a purpose descriptor is not necessarily in the order stated above. In the example, "text that is used to solve a homework problem", the purpose relation processing descriptor contains the equivalent in English of: the owning clause(s) is the representational referent of the "homework problem"; the purpose relation is the "representational referent of "text" that is used in the process for solving the owning clause(s)"; evaluate the identification purpose of the owning purpose, i.e., to find the representational referent of the "homework problem"; the owned clause(s) is the subject of the purpose relation; evaluate the identification purpose of the owned purpose, i.e., to select the representational referent of the "text"; and the function is to assign the owned clause(s) as the value of the representational referent of the clausal abstract noun, "text". The purpose descriptor is evaluated at Purpose Identifier 140 with function calls. The purpose relation processing descriptor has a range of functions for obtaining representational referents of clausal abstract nouns through purpose relations. The range of functions includes: identification of the purpose relation, looking up the purpose relation, processing of multiple levels of purpose relations, extracting clauses in the purpose relation, etc. For this example, the final state representation of "clue" is "text", and a pointer to the value of "text". "text" is the modifiee of modifiers of the representational referent. The pointer to the value of "text" in the state representation is to the owned clause(s) in the above purpose relation descriptor, and are typically contained in the context.

Clausal abstract nouns also have a data structure in 90 which is a special case of a concrete noun's data structures. There are two main specializations for the word sense number entry format data structure of a clausal abstract noun. One specialization for clausal abstract nouns is that the entry format of a clausal abstract noun compared to the entry format for a concrete noun can have state representation pointers which do not modify the clausal abstract noun. The state representation pointers could modify the verb or other constituent in the subordinate clause modifying the clausal abstract noun for example. Such state representation pointers have a symbol which designates their modifiee. The external relation structure for a clausal abstract noun can also have a symbol for a modifier which indicates that the modifier modifies the verb or other constituent in the subordinate clause modifying the clausal abstract noun The entry format of a concrete noun is depicted in FIG. **17*b*. The second specialization is that the clausal abstract entry format compared to the concrete noun entry format has an A-descriptor and T-descriptor format component with a designated function A-relation pointer which points to the modifying subordinate clause in Memory 100**.

Clausal abstract noun heads and their modifiers are also initially processed for word sense number selection with the same process used for concrete nouns which is depicted in FIGS. **17*d*–17*jj*. One difference for the processing of an clausal abstract noun is that a modifier of a clausal abstract noun may actually modify a sentence role in the modifying subordinate clause of the clausal abstract noun. Thus, a modifier does not have to directly modify the clausal abstract noun. As described above at 60355 and 607000, when a modifier of a clausal abstract noun does not have a modification relation stored in 90 for the clausal abstract noun, the modifier is marked as a CLAUSE-MODIFIER in its SDS position for later processing. Processing of such a state abstract noun continues to the next modifier as described above. This word sense number selection process of the clausal abstract noun places certain requirements upon the representational referent which the clausal abstract noun represents. Also, a word sense number entry of a clausal abstract noun has a pointer to a modifying clause in 100** which can add requirements for the representational referent of the clausal abstract noun. These requirements from the stated clause and the requirements from the implied modifying clause are used to select a representational referent of the clausal abstract noun in the context, if possible. If a representational referent can not be selected from the context, the general category of the representational referent or other modifying subordinate clause sentence role for the word sense number of clausal abstract noun is not replaced. In this case, the general category of the clausal abstract noun represents the possible representational referents of the clausal abstract noun or other modifying subordinate clause sentence role. In summary, a group of representational referents contains the instances from experience and knowledge which have been represented by the clausal abstract noun, and such a group is enumerated in the direct and/or indirect category associated with the word sense number of the clausal abstract noun. Such a group is categorized by its general category, e.g., "thing" in the clause associated with a clausal abstract noun.

Figure 18C:
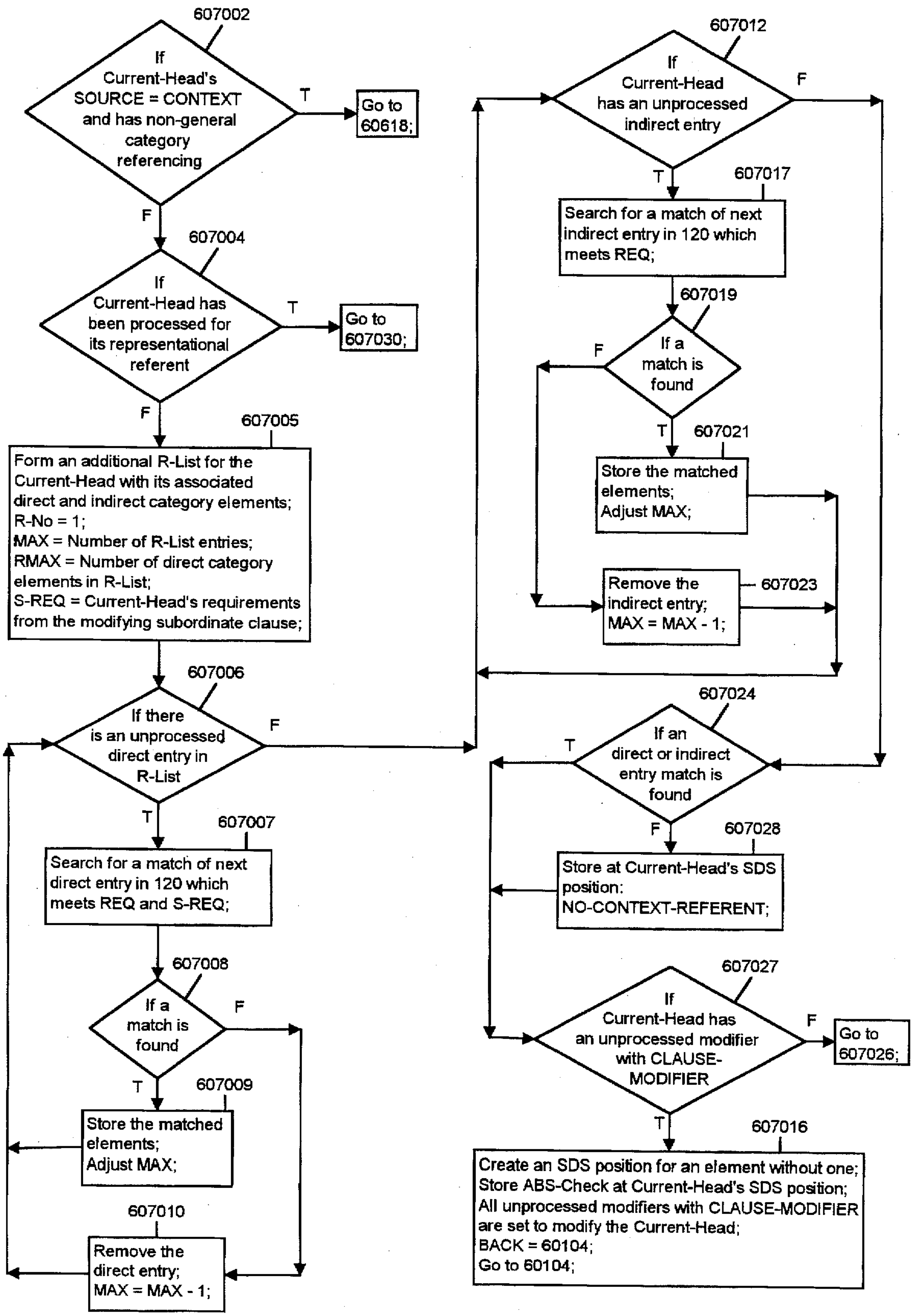
FIGS. 18*c* and 18*d* is a flow chart for the clausal abstract noun word sense number selection method which is used in addition to the selection method for word sense numbers of concrete nouns, state abstract nouns, and clausal abstract nouns and their non-function word modifiers for clausal abstract nouns.
Figure 18D:
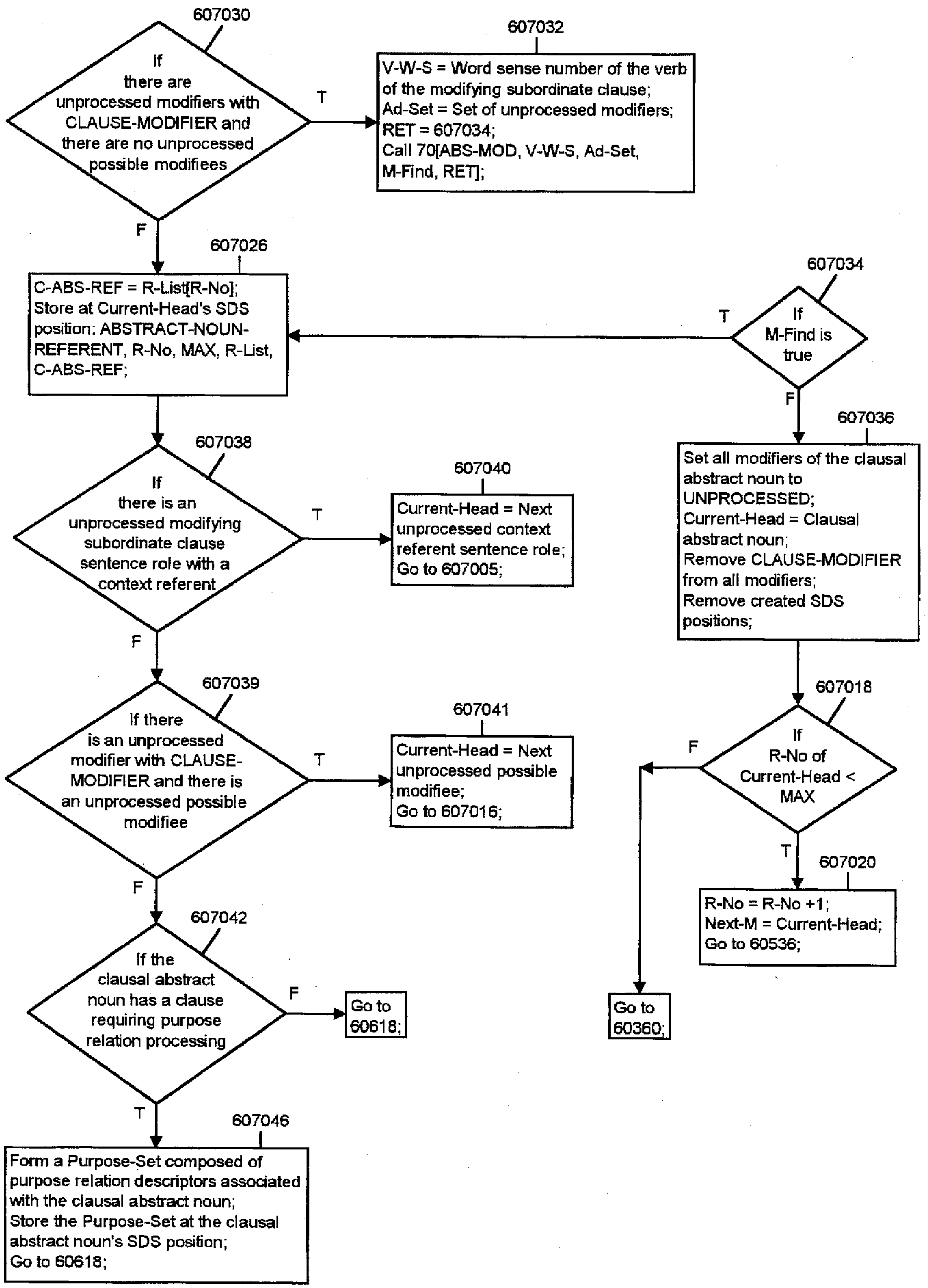

FIGS. 18*c*–18*d* depicts the clausal abstract noun representational referent selection process. This process also selects referents for other sentence roles in the modifying subordinate clause as needed. As described above, after a stated clausal abstract noun has had its word sense number selected by the process depicted in FIGS. 17*d*–17*jj*, 60617 directs the processing of the clausal abstract representational referent noun phrase head to be processed at 607002. This process, starting at 607002, forms a new R-List of possible representational referents of the clausal abstract noun. The possible referents are direct entries contained in the context of the conversation that match REQ and S-Req requirements. REQ requirements are implied from the clausal abstract noun's sentence role in the clause containing the clausal abstract noun. S-Req requirements are implied by the representational referent's sentence role in the subordinate clause modifying the representational referent of the clausal abstract noun. The possible referents could also be selected to match indirect category entry descriptors, REQ requirements, and S-Req requirements. REQ and S-Req requirements are matched as long as the REQ and S-Req requirements are not violated. This R-List is then processed to select a possible referent which can be modified by all unprocessed modifiers. An unprocessed modifier here is a modifier which did not modify the stated clausal abstract noun or a designated sentence role in its modifying subordinated clause during processing at 60, and which has a CLAUSE-MODIFIER symbol placed in its SDS position by 607000 as described above. Unprocessed modifiers are determined to be able to modify a possible referent starting at 60104 of FIGS. 17*d*–17*jj* as described above. If a possible referent can not be modified by all unprocessed modifiers, the unprocessed modifiers which can not modify the possible referent are processed to determine if they can modify the verb in the modifying subordinate clause after being converted to adverbs at a process of Selector 70 which is described below. The clausal abstract noun process terminates when all referents have been determined and all unprocessed modifiers have modifiees. This process, starting at 607002, also performs a similar process for each constituent of the clausal abstract noun's modifying subordinate clause which can represent a referent in the context. In the following, the term "the Restricted-Context or 120" is utilized. The Restricted-Context contains possible cataphoric referents of the Current-Head. "The Restricted-Context or 120" means that if the Restricted-Context contains referents, only the Restricted-Context is used as a source for referents; if the Restricted-Context is NULL, (Context Memory) 120 is used as the source of referents.

60617 sets processing to continue at 607002 for a clausal abstract noun. 607002 is true if the Current-Head, initially the clausal abstract noun being processed, has a SOURCE value of CONTEXT in its SDS position, and has non-general category referents for its representational referent and/or for other referents representing context words. 607002 is true for a repeat reference to a clausal abstract noun in a conversation which has a referent in 120 for its representational referent and/or any modifying subordinate sentence roles defined with context referents. If 607002 is true, processing continues at 60618 as described above. If 607002 is false, 607004 is next, and is true if the Current-Head has position. 607004 is true if the Current-Head has been processed for selecting a representational referent. If 607004 is true, 607030 is next and is described below. If 607004 is false, 607005 forms an additional R-List for the possible referents of the Current-Head in the Restricted-Context or in 120. The Current-Head already has an R-List for the word sense numbers of the clausal abstract noun. 607005 forms the additional R-List with the elements in the direct category and/or indirect category contained in the group associated with the Current-Head of the subordinate clause modifying the clausal abstract noun. As described above, the representational referent or a sentence role representing a referent in the modifying subordinate clause has a group A-descriptor which points to the direct category and/or indirect categories of the representational referent or the sentence role. 607005 also sets the following values for the newly formed R-List: R-No is set to 1; MAX is set to the number of direct and indirect entries in its newly formed R-List; RMAX is set to the number of direct entries; S-Req is set to the requirements placed upon the Current-Head by its sentence role in the modifying subordinate clause of the clausal abstract noun. The requirements for S-Req are looked up at the modifying subordinate clause in Memory 100 by Selector 70.

After 607005, 607006 is next, and is true if there is an unprocessed direct category entry in R-List. If 607006 is true, 607007 searches for a word sense number in the Restricted-Context or Context Memory 120 that matches the next unprocessed direct entry, and the meets the requirements of REQ, if there are any, and meets the requirements of S-Req. 607007 searches for all elements in the Restricted-Context or 120 which match the direct entry, and which meet REQ and S-Req requirements. REQ is contained in SREP [POS, 4] of the abstract clausal noun. If the Current-Head is the representational referent, the Current-Head must meet the requirements of REQ and S-Req. If the Current-Head is a sentence role in the subordinate clause modifying the clausal abstract noun, the Current-Head has no REQ requirements, and such a Current-Head must only meet the requirements of S-Req. After 607007, 607008 is next, and is true if a match is found. If 607008 is true, 607009 removes the direct category under process from R-List, and stores the one or more matched elements from the Restricted-Context or 120 starting at the position of the removed direct category entry, and increases MAX by the number of matched elements stored in R-List minus one. If 607008 is false, 607010 is next, and removes the direct entry from R-List which caused 607008 to be false. 607010 also decrements MAX by 1. After 607010, or after 607009, 607006 is next as above.

607006 is false after all direct entries of R-List have been processed for matching at 607008. If 607006 is false, 607012 is next, and is true if the Current-Head has an unprocessed indirect entry in its R-List. If 607012 is true, 607017 searches for a match of the next unprocessed indirect entry with an element in the Restricted-Context or 120 which meets the requirements of REQ if any, and which matches the descriptor of the indirect category entry. The indirect category descriptor contains the requirements of the referent for the referent's role in the modifying subordinate clause such as the representational referent. These requirements were set to include S-Req for indirect category referents. Hence, the indirect category entries descriptors already contain the requirements for S-Req. If the next indirect category has a match which meets REQ, all other possible matches in the Restricted-Context or 120 are checked for matching, and successful matches are noted. After 607017, 607019 is next, and is true if a match in the Restricted-Context or 120 meeting REQ was found at 607017. If 607019 is true, 607021 removes the indirect category entry that did have a successful match; all the successfully matched elements from the Restricted-Context or 120 are stored in R-List; MAX is increased by the number of entries added minus one. If 607019 is false, 607023 removes the next indirect category entry that failed to have a successful match at 607017, and decrements MAX by one. After 607019 or 607023, 607012 is next as described above.

All indirect entries are processed after 607012 is false, and 607024 is next. 607024 is true if a referent from the Restricted-Context or 120 was found and stored in R-List by 607009 or 607021. If 607024 is true, 607027 is next, and is true if the Current-Head has unprocessed modifiers with a CLAUSE-MODIFIER symbol in their SDS positions. 607027 is true for a Current-Head which is a representational referent or a modifying subordinate clause sentence role of a clausal abstract noun that has stated modifiers which did not have a modification relation with the stated clausal abstract noun or other processed referents of the clausal abstract noun. If 607027 is true, 607016 creates an SDS position for the Current-Head for a modifying subordinate clause sentence role without an SDS position; ABS-Check is stored at the Current-Head's SDS position; all the unprocessed modifiers with a CLAUSE-MODIFIER symbol in their SDS positions are set to modify the Current-Head; BACK is set to 60104; and 607016 sets processing to continue at 60104. 60104 processes the Current-Head for its unprocessed modifiers for the word sense number of the Current-Head starting at the first word sense number stored in R-List. The Current-Head's word sense number has been effectively set to be an element in the Restricted-Context or 120. If 607024 is false, the current word sense number of the Current-Head has failed to have a referent in the Restricted-Context or 120, and 607028 is next. In this case, the representational referent or a sentence role in the modifying subordinate clause is not assigned a referent. Instead, the general referent, which is already assigned to the representational referent or the element, is used. A suitable referent would not be found in the case where a general clausal abstract noun is referenced in the conversation for example. 607028 stores NO-CONTEXT-REFERENT at the SDS position of the Current-Head. After 607028, 607027 is next as above. The symbol NO-CONTEXT-REFERENT is detected by Step 18 in subsequent processing. When this symbol is detected, Step 18 directs the remaining part of the sentence after the Current-Head and the following sentence to be checked for containing a cataphoric referent for the referents with the NO-CONTEXT-REFERENT symbol. This search for the cataphoric referent is accomplished by searching for the Restricted-Context as described above in subsequent processing initiated at Step 18.

Figure 19H:
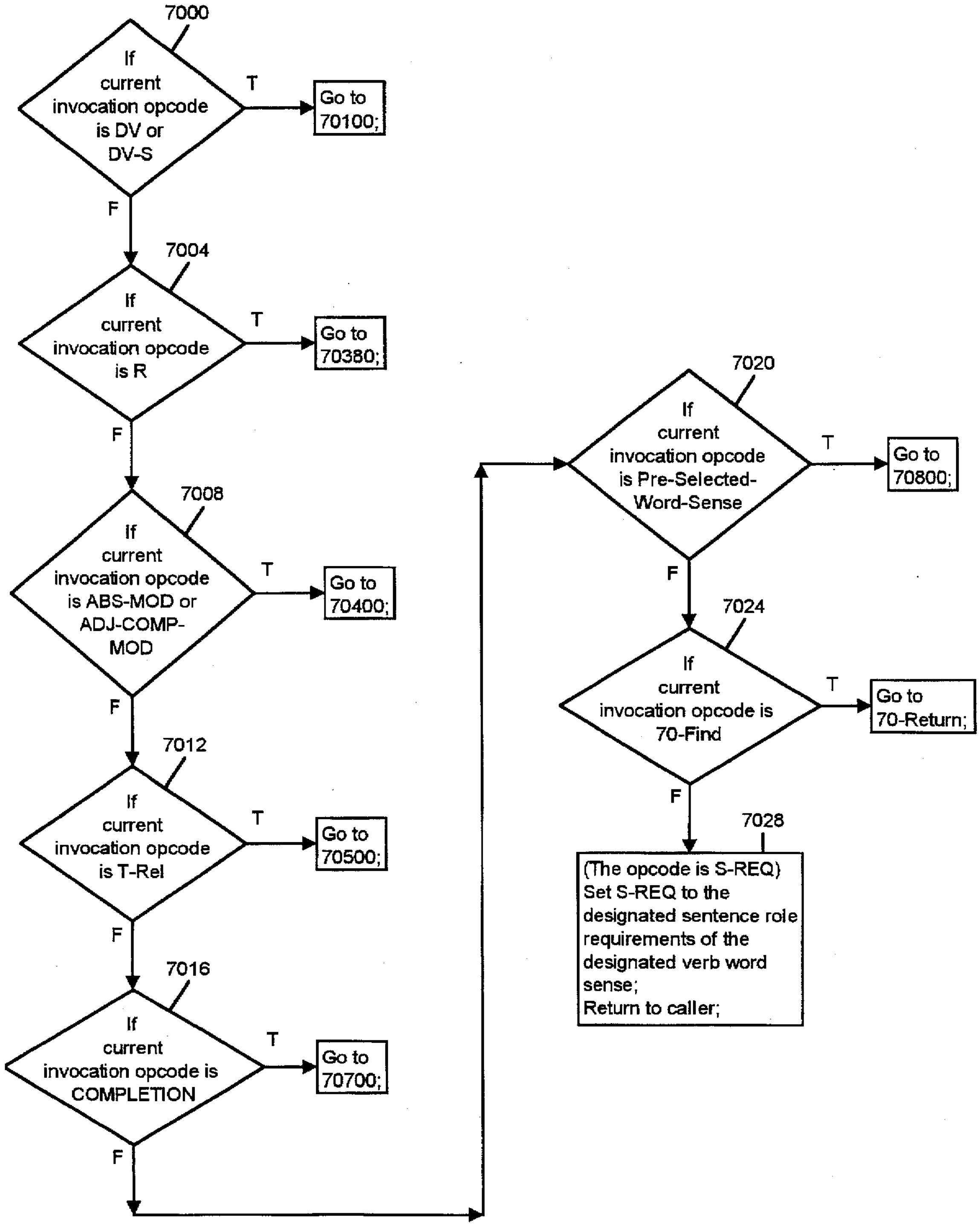
Figure 19I:
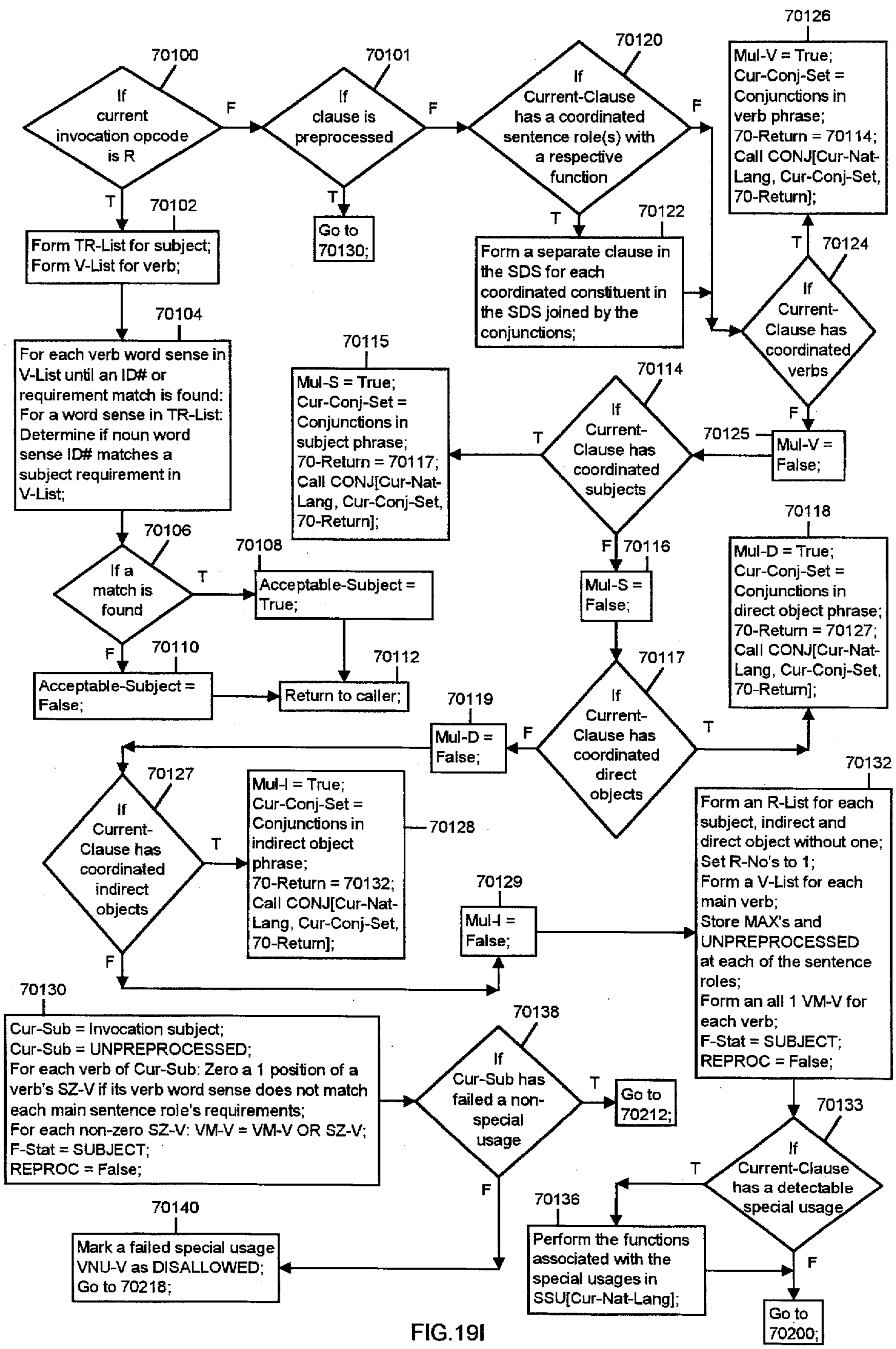
Figure 19J:
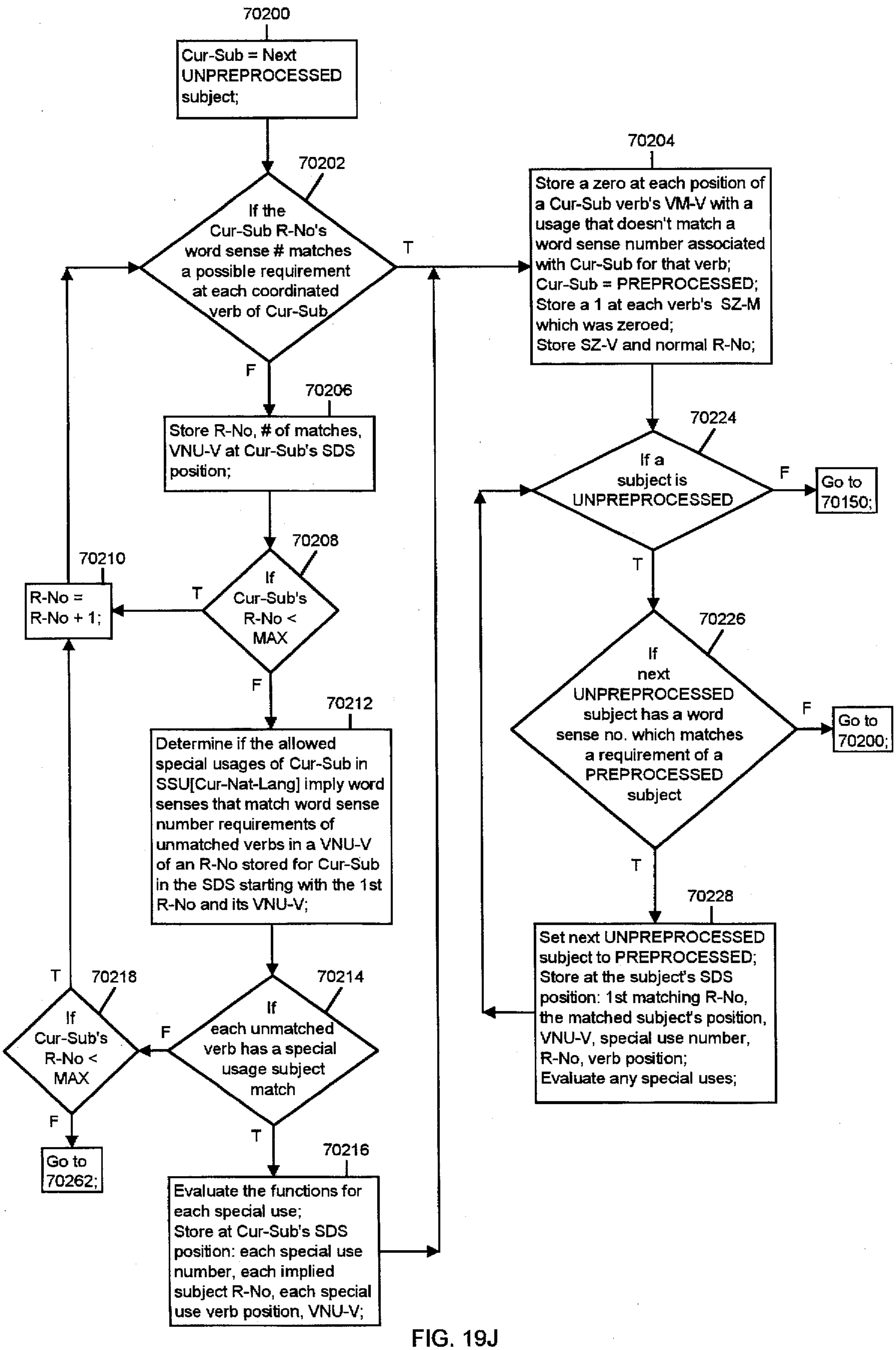
Figure 19K:
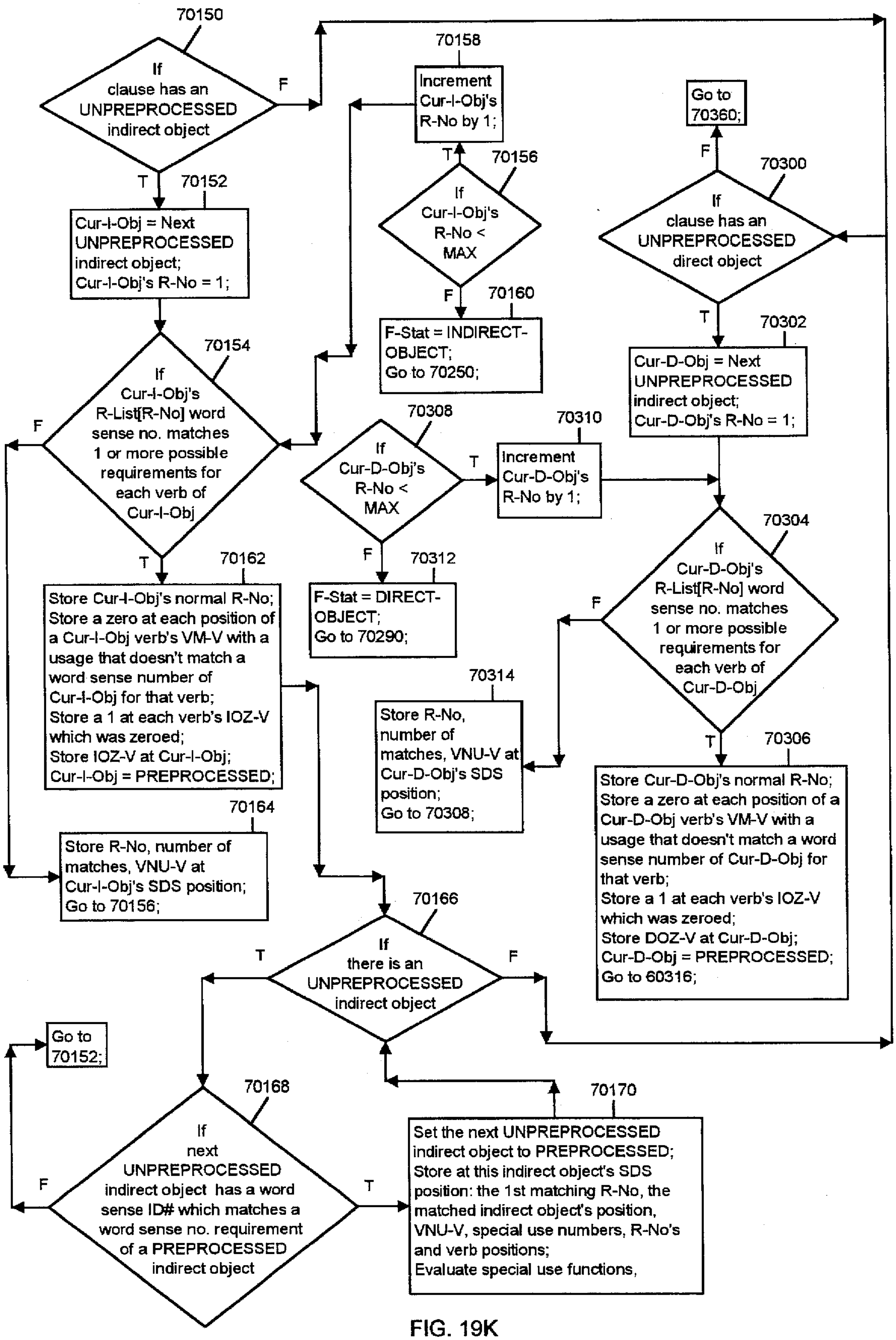
Figure 19L:
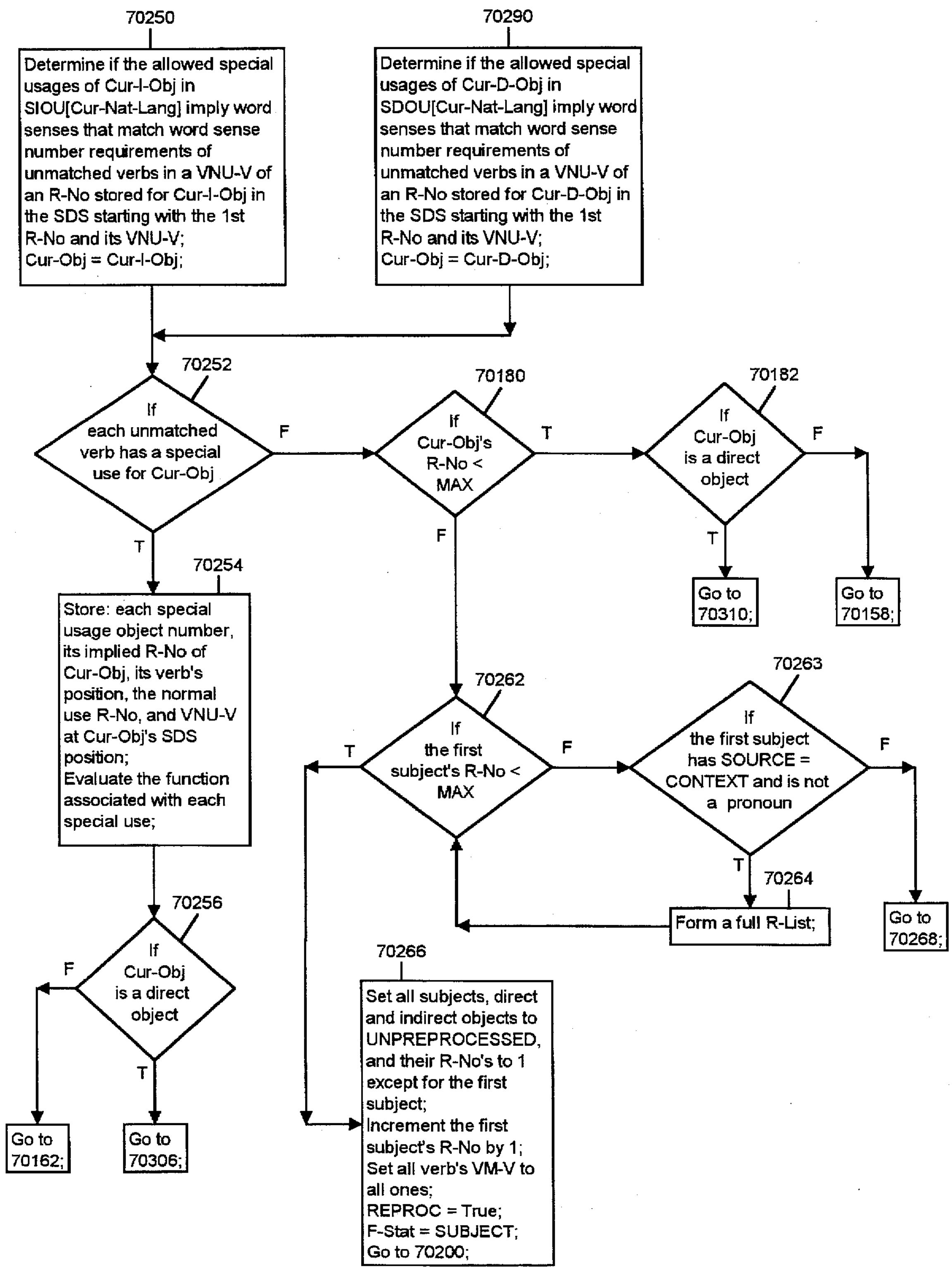
Figure 19M:
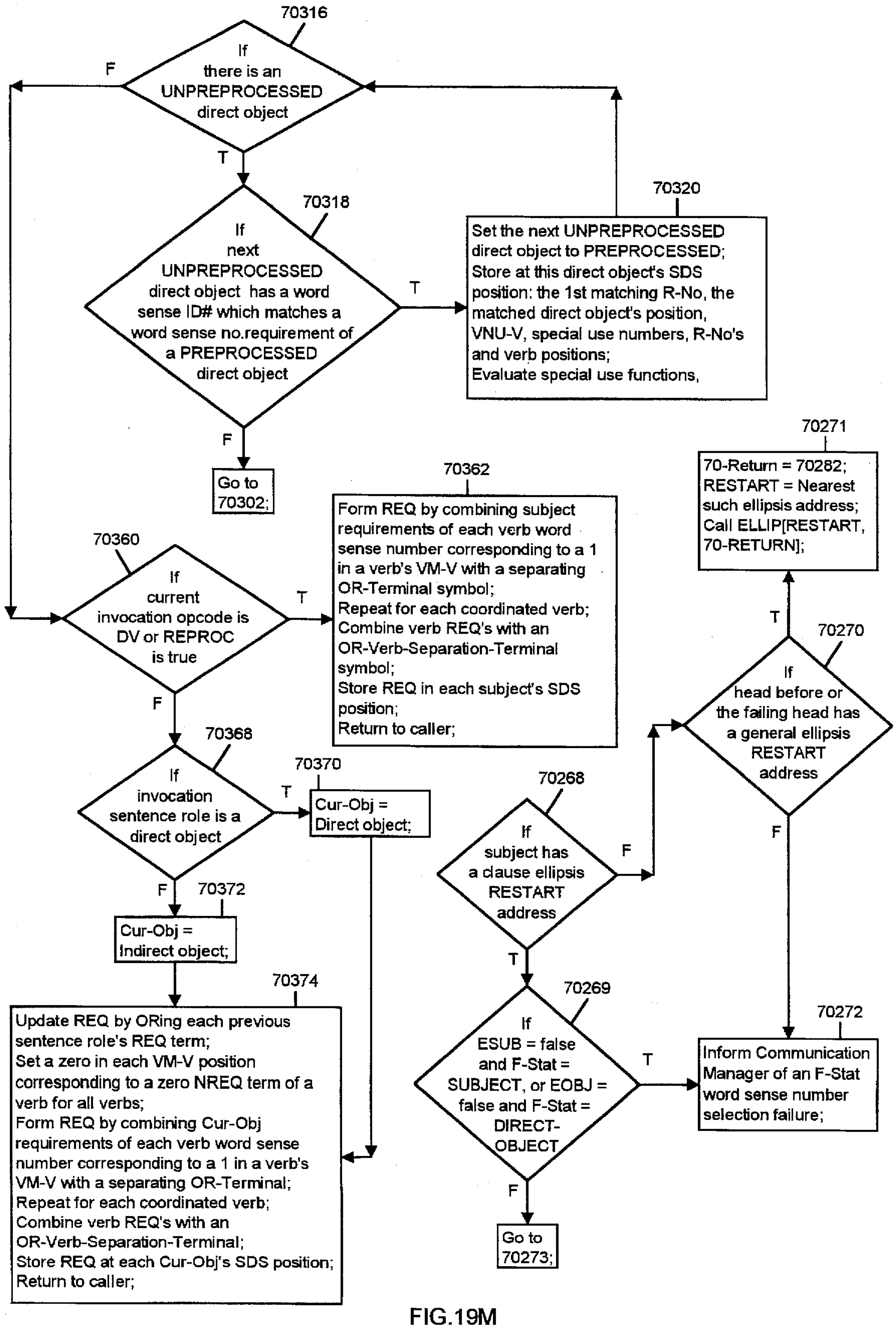
Figure 19N:
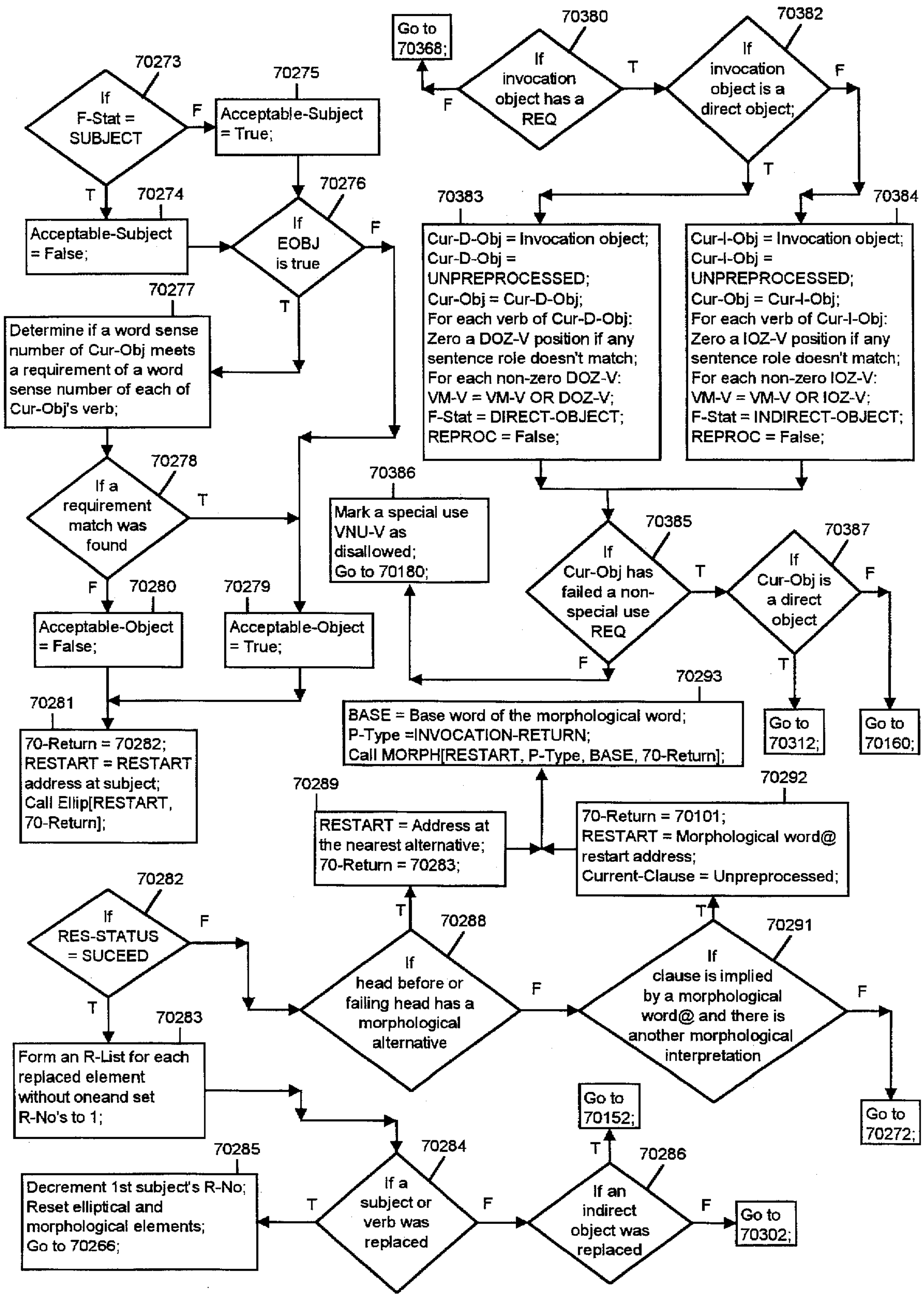
Figure 190:
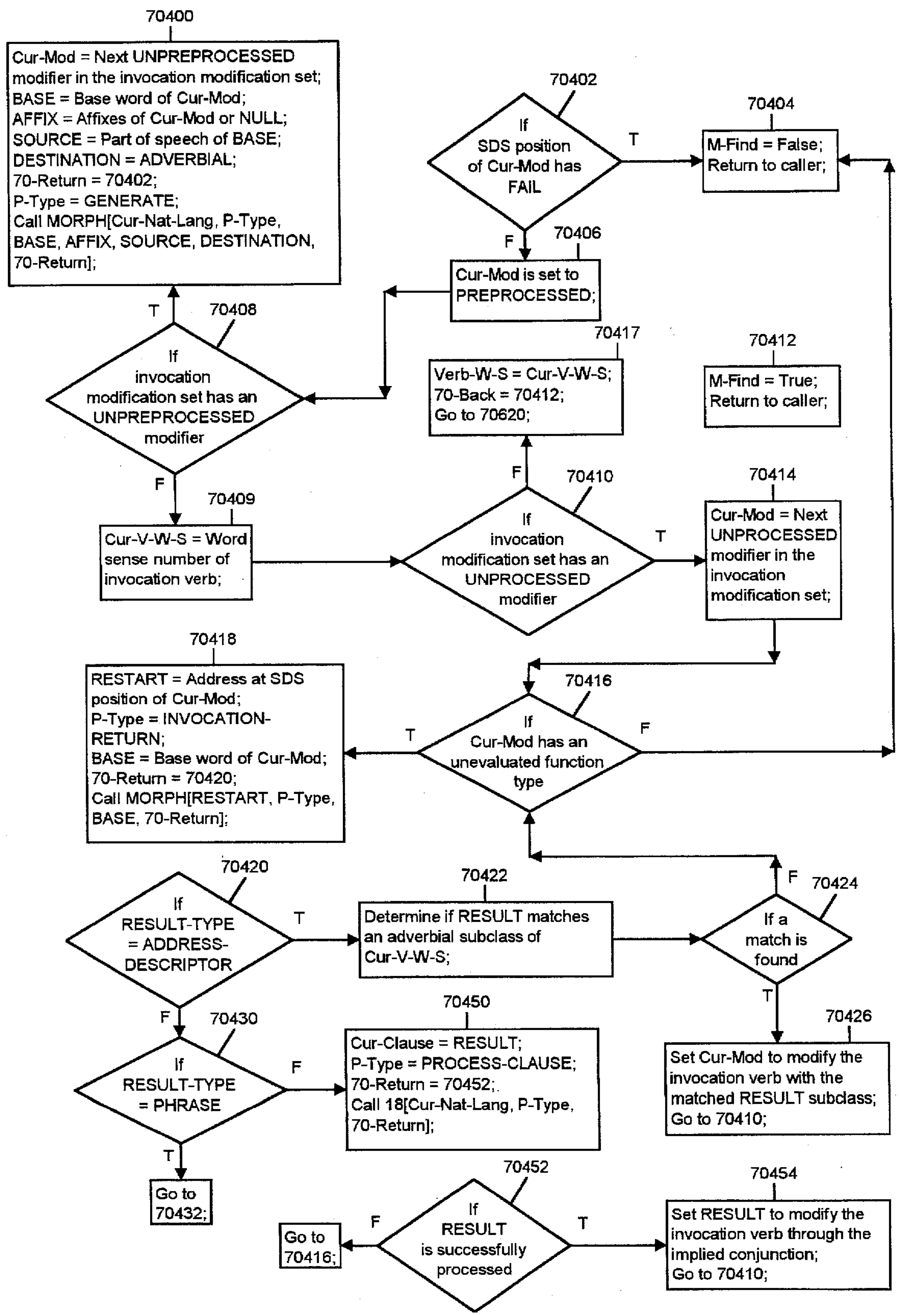
Figure 19P:
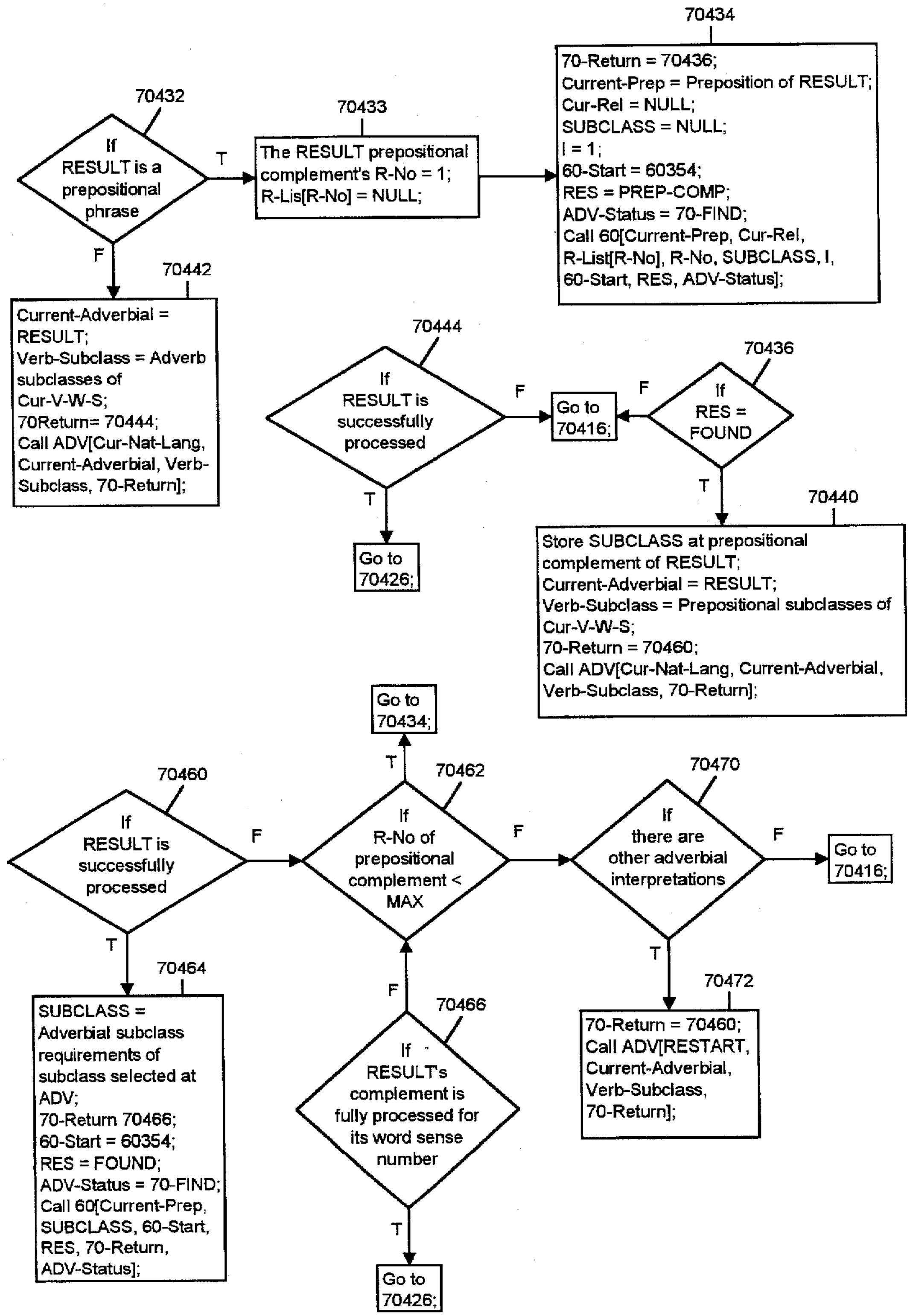
Figure 19Q:
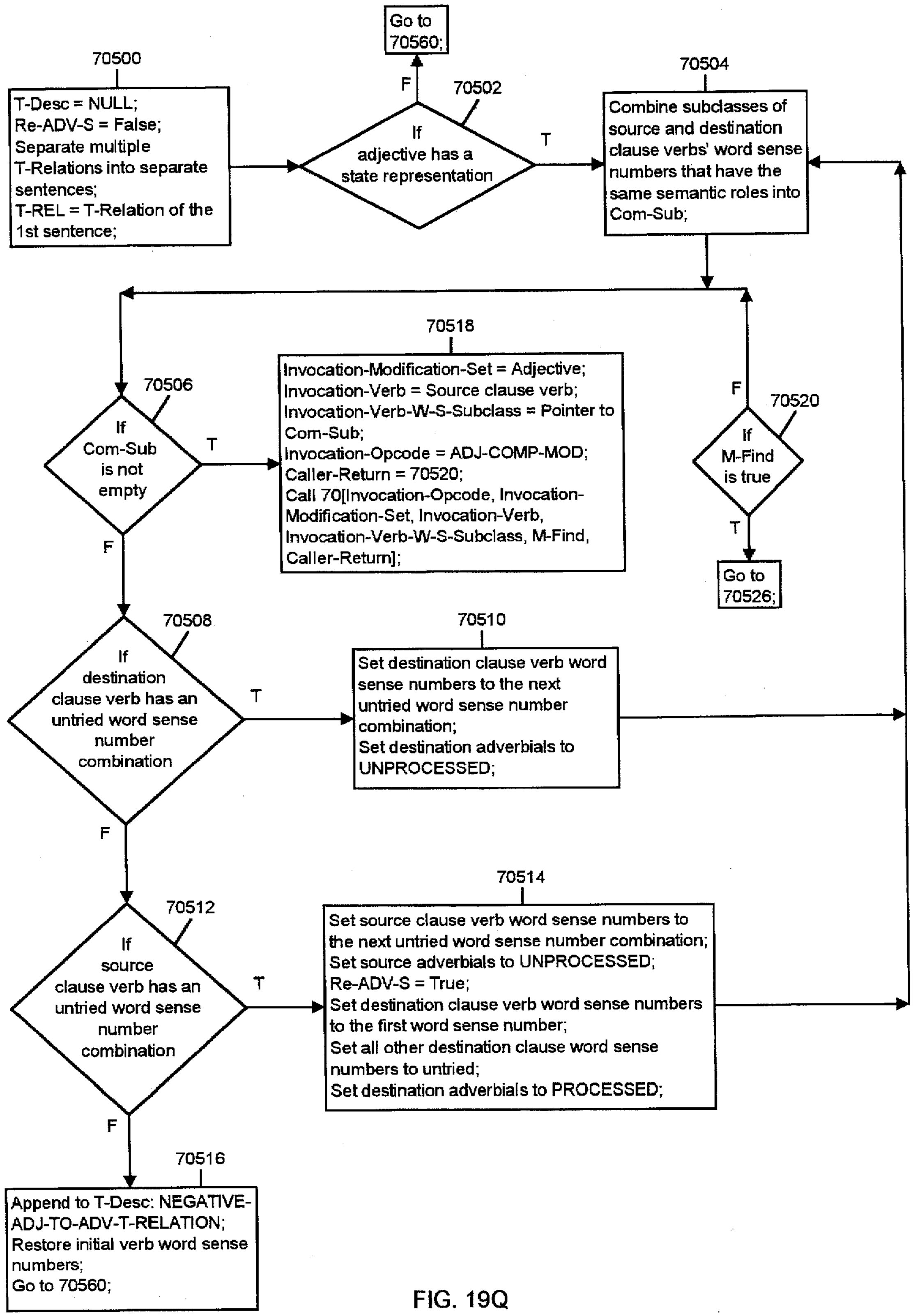
Figure 19R:
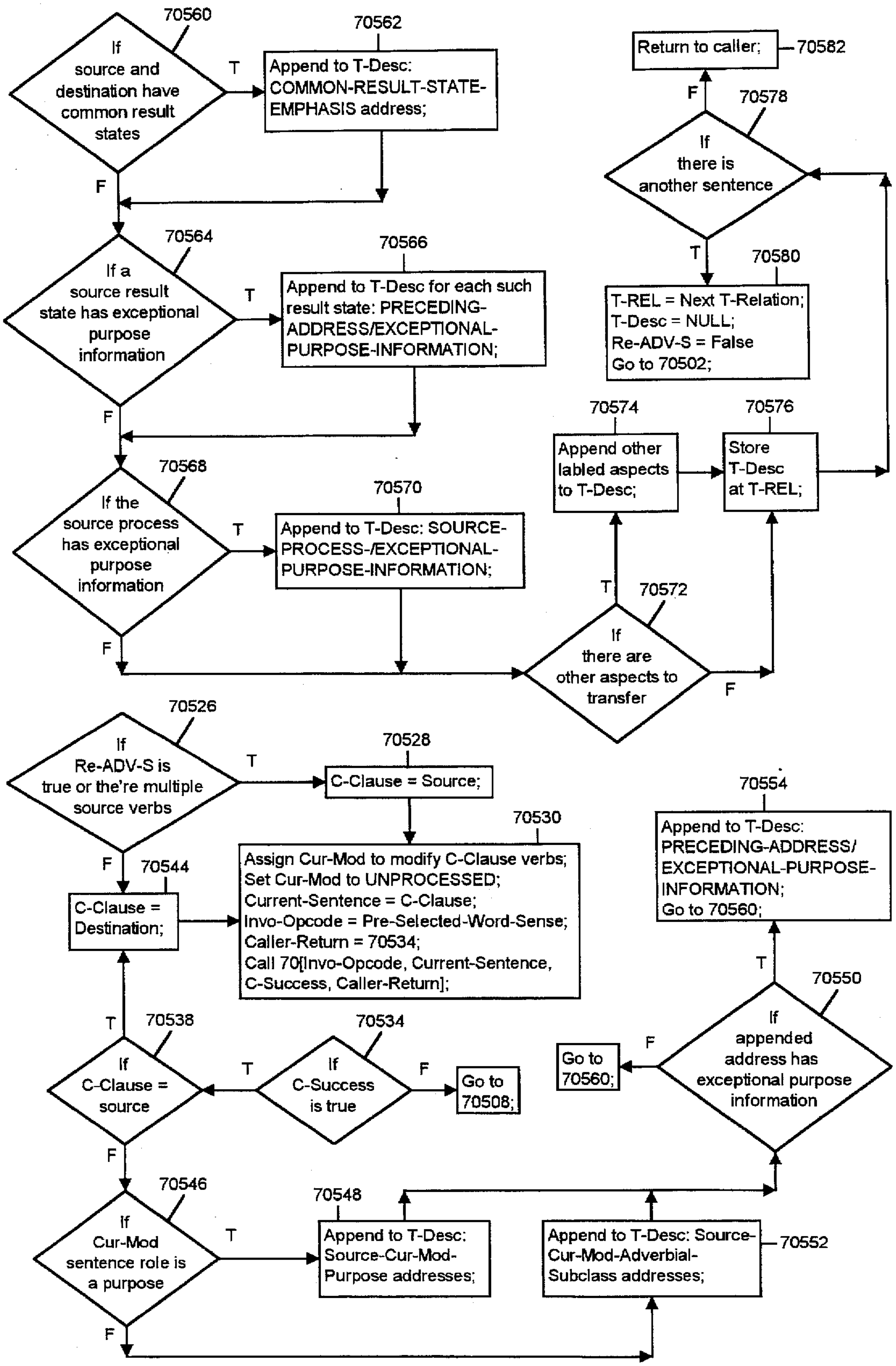
Figure 19S:
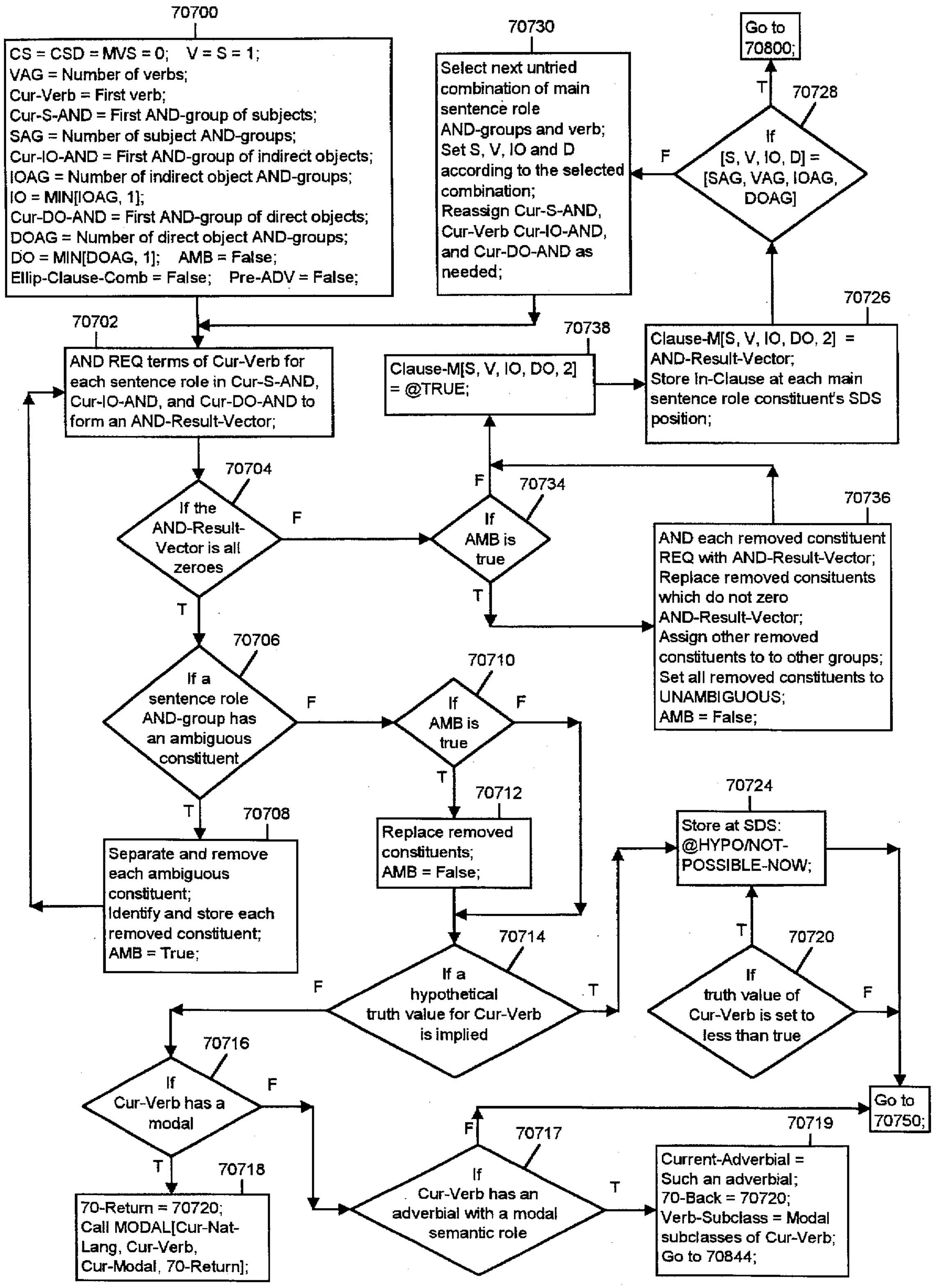
Figure 19T:
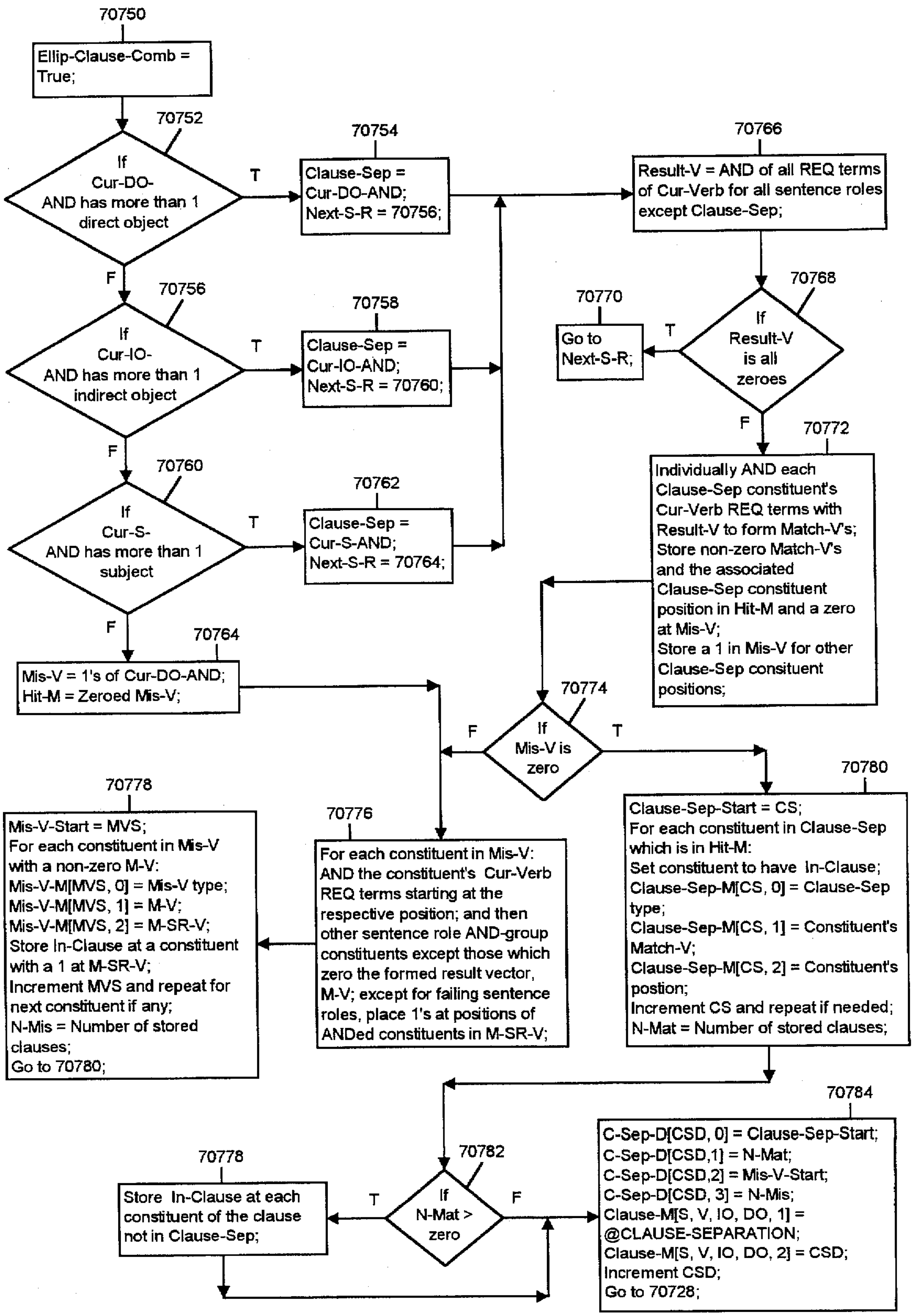
Figure 19U:
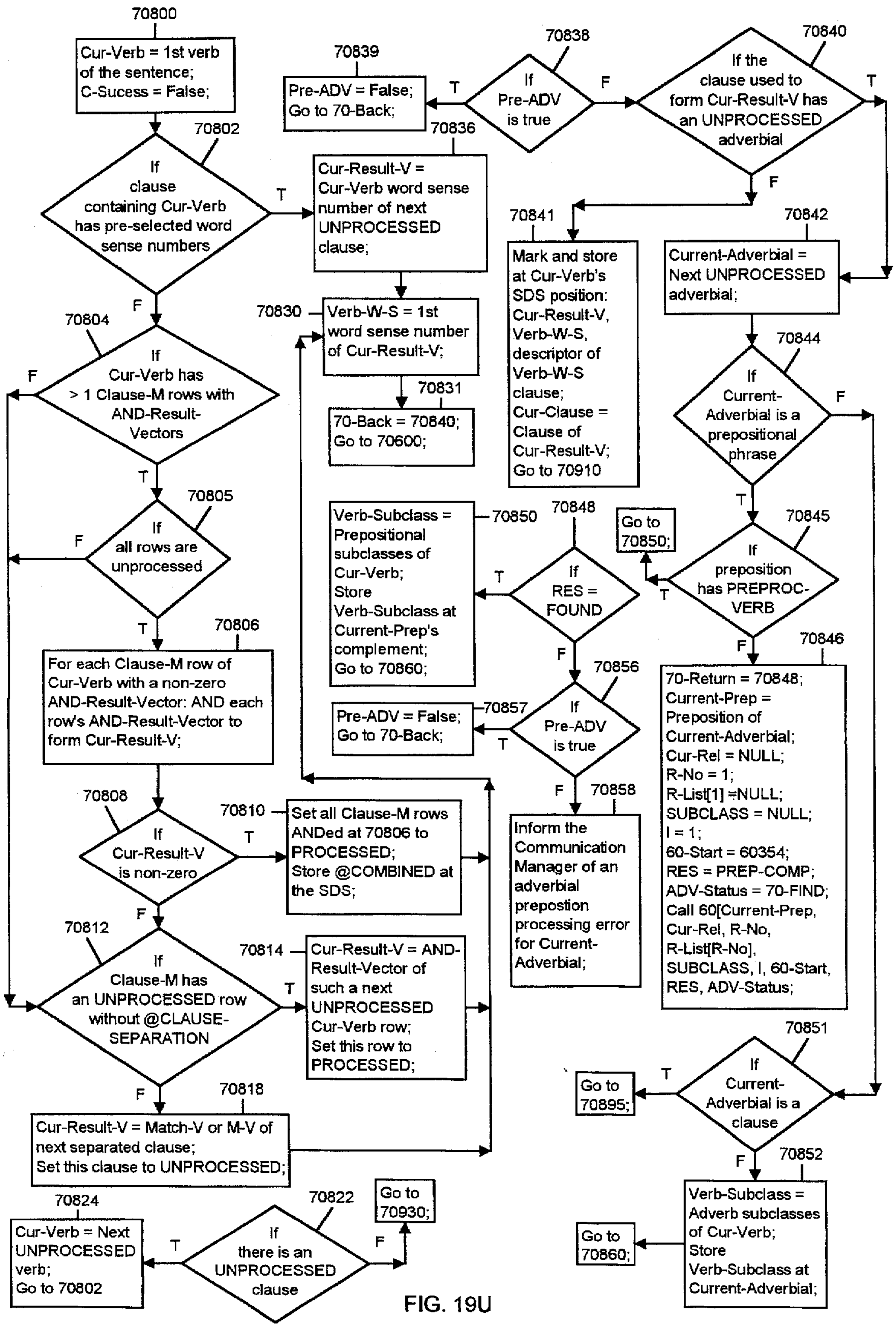
Figure 19V:
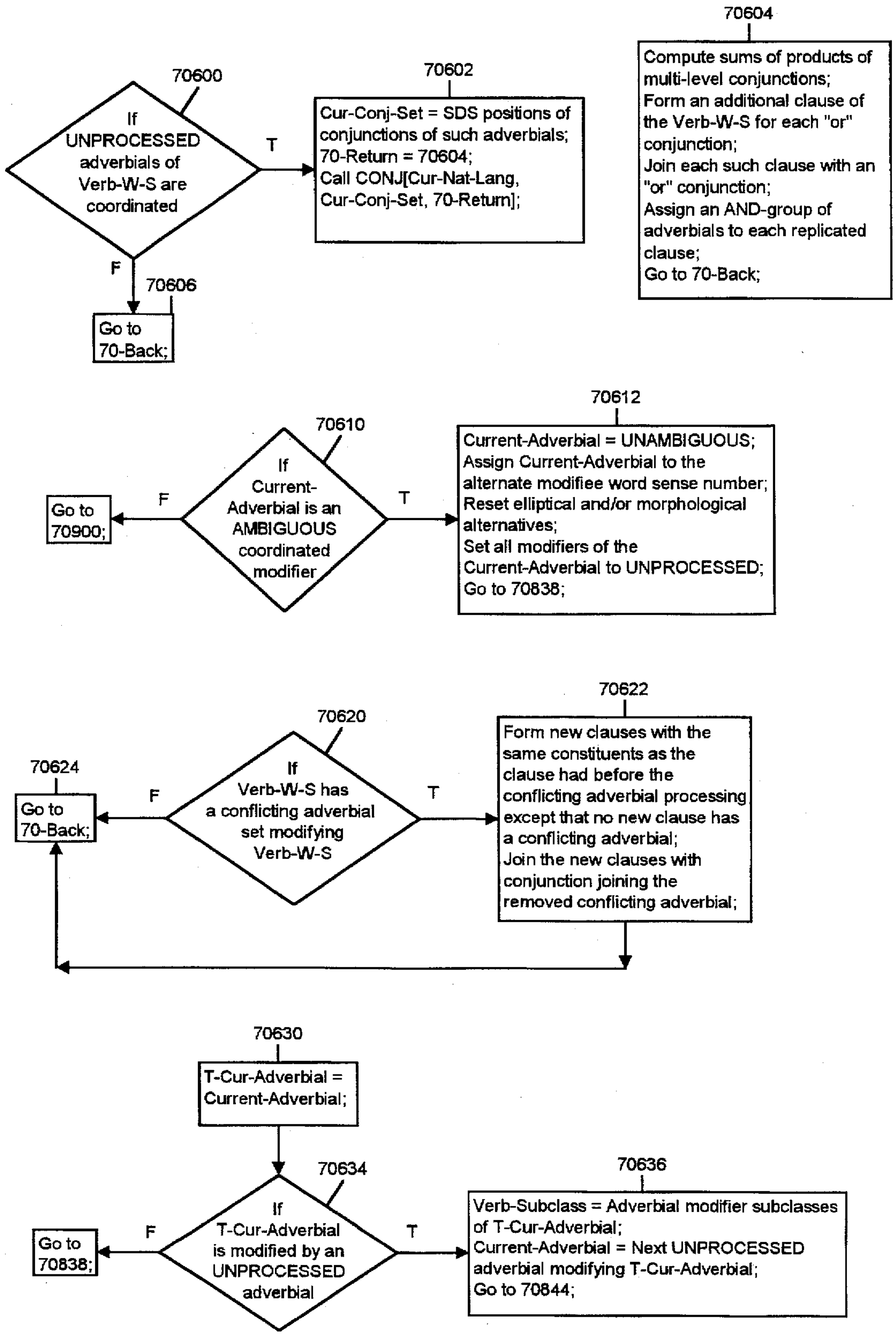
Figure 19W:
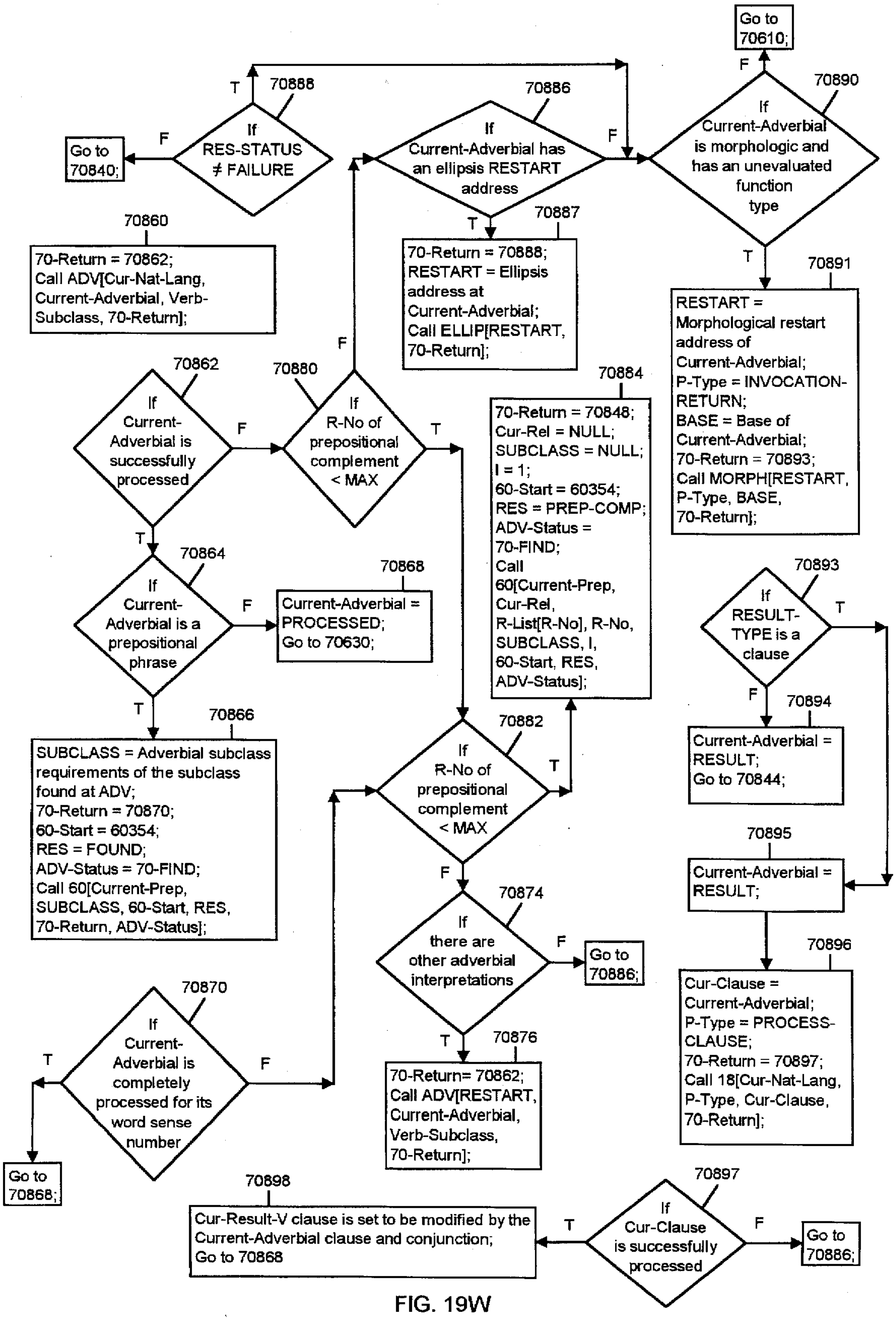
Figure 19X:
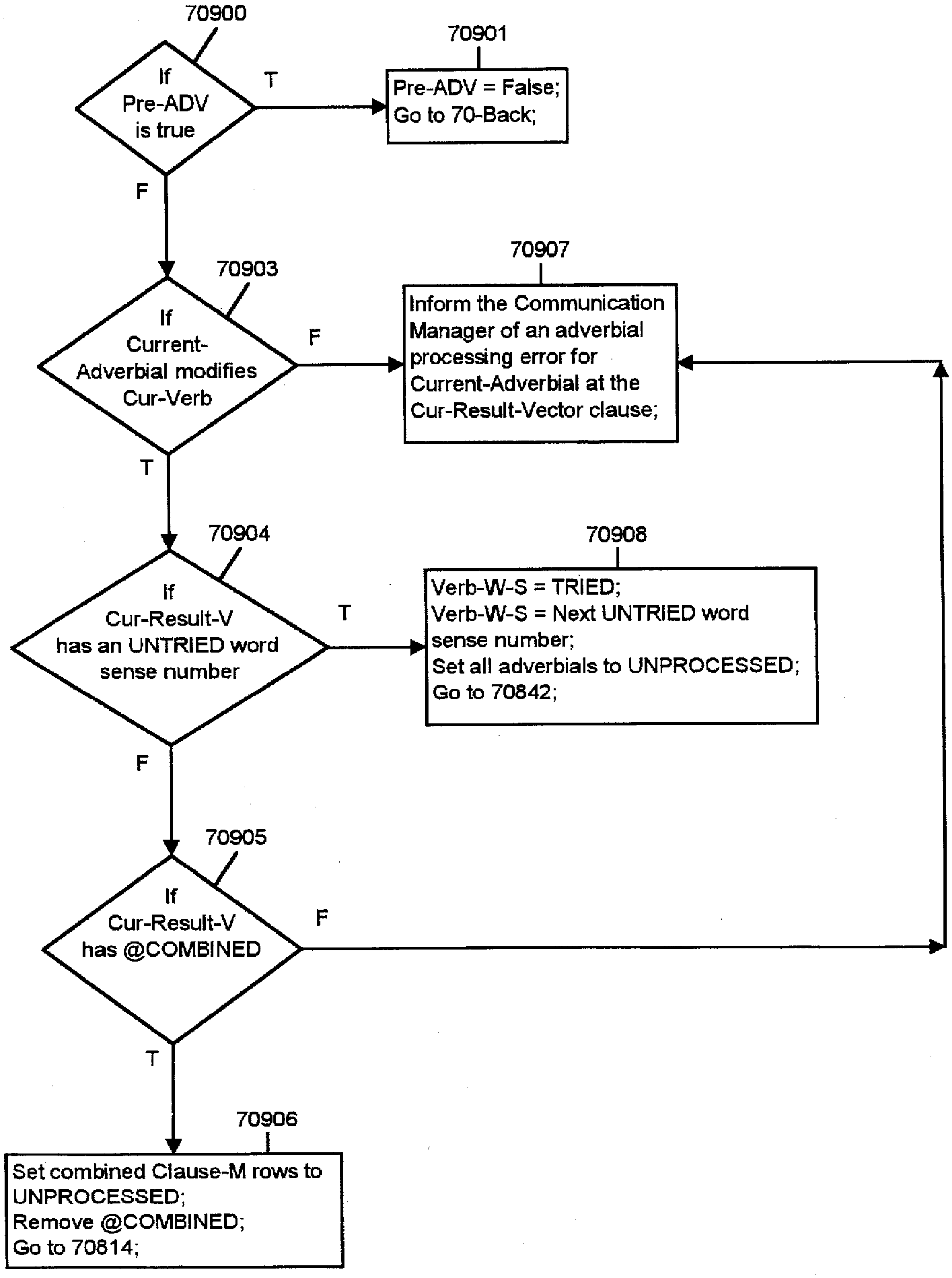
Figure 19Y:
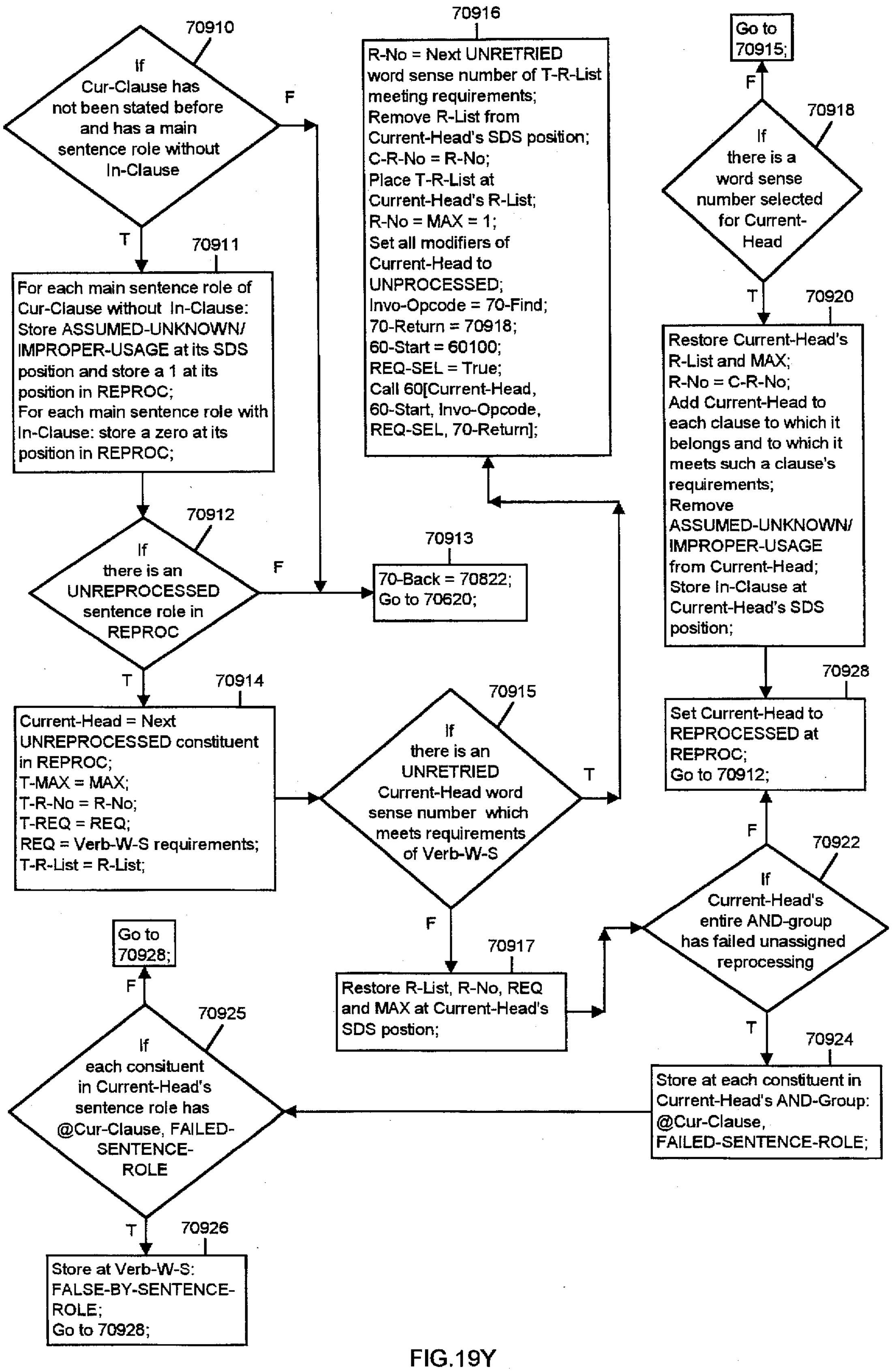
Figure 19Z:
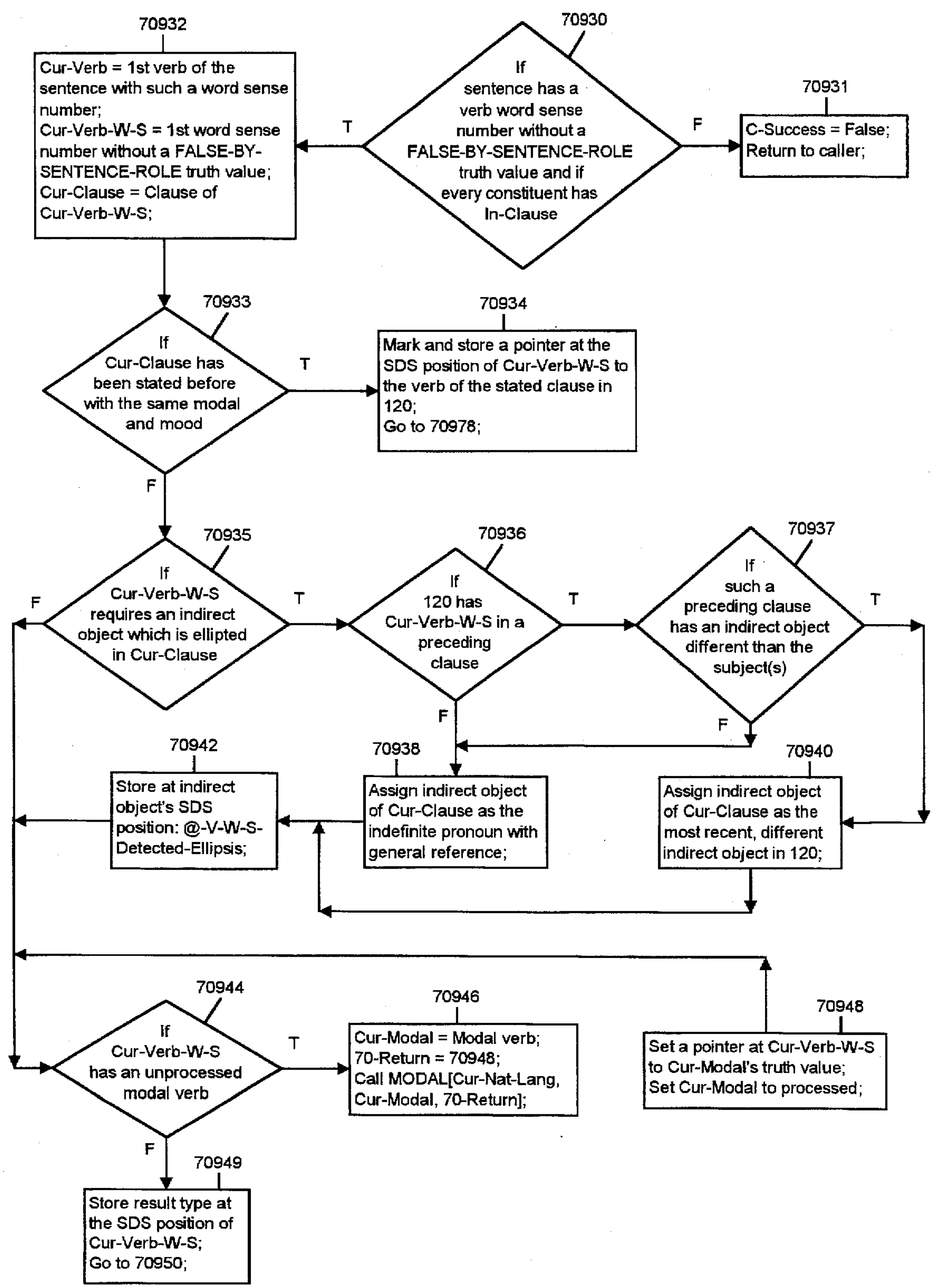

If 607027 is false, the Current-Head has no unprocessed modifiers, and its referent has been determined. If 607027 is false, or if 607030, which is described below, is false, 607026 is next. If 607030 directly precedes 607026, there may be unprocessed modifiers. 607026 sets C-ABS-REF, the referent of the Current-Head, to be R-List[R-No]. 607026 also stores the following at the SDS position of the Current-Head: ABSTRACT-NOUN-REFERENT, R-No, MAX, R-List, C-ABS-REF. After 607026, 607038 is next, and is true if the clausal abstract noun's modifying subordinate clause has an unprocessed sentence role representing a referent in the Restricted-Context, or in 120. If 607038 is true, 607040 sets the Current-Head to be the next unprocessed sentence role representing a referent, and sets processing to continue at 607005 as described above. If 607038 is false, 607039 is next, and is true if there are unprocessed modifiers with CLAUSE-MODIFIER, and if there are modifiers of the clausal abstract noun being processed with CLAUSE-MODIFIER at such a modifier's SDS position, and if there is an unprocessed sentence role in the modifying subordinate clause which can be modified by a modifier of the clausal abstract noun. Such sentence roles are unprocessed if they have not processed to determine if they can be modified by an unprocessed modifier with CLAUSE-MODIFIER. A sentence role of the modifying clause is designated to be modifiable by a clausal abstract noun at the clause verb's application pattern of FIG. 19*c* which is described below for 70. If 607039 is true, 607041 sets the Current-Head to be the next unprocessed sentence role which can be modified by a modifier of the clausal abstract noun, and sets processing to continue at 607016 as described above. If 607039 is false, 607042 is next, and is true if the clausal abstract noun has a clause requiring purpose relation processing. For example, 607042 is true when there is a state adjective with Clause-Modifier without a modifiee within the clause. In this case, the other possible modifiee is the subordinate clause modifying the representational referent. A state adjective modifying a clause has a purpose relation to that clause. If 607042 is true, 607046 forms a Purpose-Set composed of a pointer to a purpose relation processing descriptor for each purpose relation associated with the clausal abstract noun. The pointer to a purpose relation processing descriptor is associated with the modifying subordinate clause in 100. 607042 stores the Purpose-Set at the clausal abstract noun's SDS position, and sets processing to continue at 60618 as described above. If 607042 is false, processing has been completed, and 607044 processing continues at 60618. Clausal Abstract Noun has been successfully completed after 607046 or 607044.

If the Current-Head has unprocessed modifiers, the unprocessed modifiers are processed at 60104 for having a modification relation with the Current-Head's referent, as selected above. After the processing for these modification relations, 60617 sets processing to continue at 607002 as above. In this situation, 607002 is false, and 607004 is next, and is true because the Current-Head has been processed for representational referents. When 607004 is true, 607030 is next, and is true if Current-Head has unprocessed modifiers with a CLAUSE-MODIFIER symbol in their SDS positions and there are no unprocessed, modifying subordinate clause, sentence roles with a context referent or sentence roles with the capability of being modified by a clausal abstract noun modifier. Such sentence roles are unprocessed if they have not been processed to determine if they can be modified by an unprocessed modifier with CLAUSE-MODIFIER. If 607030 is true, the referents selected in the processes above failed to have modification relations with all the unprocessed modifiers with the CLAUSE-MODIFIER symbol. In this case, it is possible that the unprocessed modifiers could modify the verb in the subordinated clause modifying the referential referent. The determination of the possible modification by the unprocessed modifiers is performed at Selector 70. Each such unprocessed modifier is converted to an adverbial if possible through function calls at 70. If all unprocessed modifiee convert be converted into adverbs, the process is unsuccessfully terminated at 70. Otherwise, each adverbial is checked to determine if it modifies the subordinate clause verb at Selector 70. If each such adverbial can modify the verb, the process is successfully completed. If 607030 is true, 607032 is next and sets up the unprocessed modifiers to be processed at 70 to determine if they can modify the subordinate clause verb. 607032 sets V-W-S to the word sense number of the verb of the subordinate clause modifying the referential referent in Memory 100; Ad-Set is set to contain the unprocessed modifiers which did not modify the referential referent or other possible modifiees in the subordinate clause modifying the clausal abstract noun; RET is set to 607034, the step processed after 70 has completed its processing; and finally, 607032 calls Selector 70[ABS-MOD, V-W-S, Ad-Set, RET, M-Find]. ABS-MOD is used by 70 to select the process for the modifiers in Ad-Set. M-Find is the return variable set to true if the modifiers in Ad-Set can modify the verb in the modifying subordinate clause.

After processing is completed at 70, 607034 is next and is true if M-Find is true. If 607034 is false, all the unprocessed modifiers could not modify the subordinate clause verb, and the referents selected in the above processes. If 607034 is false, 607036 is next. 607036 sets all direct and indirect modifiers of the clausal abstract noun to UNPROCESSED; CLAUSE-MODIFIER is removed from all such modifiers containing this symbol; all SDS positions created at 607016 are removed from the SDS; the Current-Head is set to the clausal abstract noun being processed; and 607036 sets processing to continue at 607018. 607018 determines if the stated clausal abstract noun has another untried word sense number. 607018 is true if the R-No of the stated abstract noun, the Current-Head, is less than MAX of the stated abstract noun's R-List. 607018 is true if there is an untried word sense number for the stated abstract noun. If 607018 is true, 607020 increments the R-No of the stated clausal abstract noun by 1; Next-M is set to the stated clausal abstract noun; and 607020 sets processing to continue at 60536 as described above. 607020 sets up the stated clausal abstract noun for being processed for the next untried word sense number. 60536, as described above, starts a process which determines the next step to be performed in the word sense number selection process of a concrete noun. If 607018 is false, all word sense numbers of the stated clausal abstract noun have been unsuccessfully tried. If 607018 is false, 607022 processing continues at 60360. 60360, as described above, begins a process to determine if the clausal abstract noun has another elliptical or morphological interpretation, or if another stated word in the clause containing the Current-Head can be reinterpreted. If processing initiated at 60360 fails, the clausal abstract noun has modifiers which have no known relation to the clausal abstract noun, referential referent or other modifying subordinate clause sentence roles, and the Communication Manager is informed of the noun processing error at 60554 as described above. If 607030 is false, or if 607034 is true because the unprocessed modifiers can modify the subordinate clause verb, the Current-Head has been successfully processed, and 607026 stores the information related to this referent and processing proceeds as described above.

VERB WORD SENSE NUMBER SELECTION AT SELECTOR 70

Figure 19A:
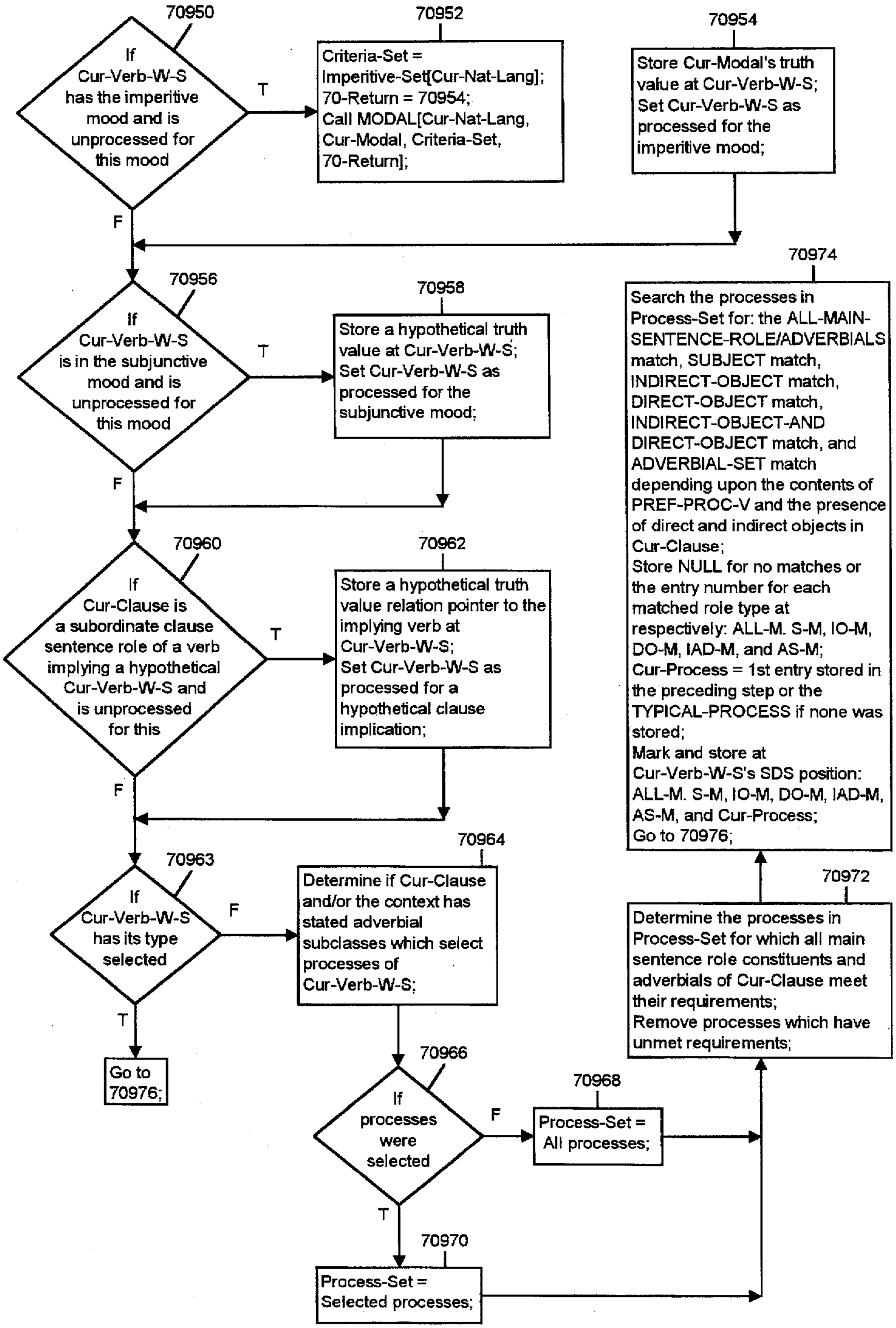

Verb word sense number selection is performed in Selector 70 utilizing data stored in Clausal Abstract Noun and Clause State Representation Memory 100. The first phase of verb word sense number selection is typically started by Selector 60 invoking 70 to select a possible word sense number for a noun in a sentence role. 70 selects a word sense number of the noun from its R-List, and 70 generates requirements, REQ as described above, which must not be violated if the noun's word sense number is to perform its sentence role. As described above, word sense numbers of modifiers of a noun are selected so as not to violate REQ if possible. The first phase of verb word sense number selection is completed after the subject, verb and the stated receivers, i.e., the indirect object and direct object, have their word sense numbers selected. At the end of the first phase of verb word sense number selection, the verb word sense number is partially selected. The format for a verb word sense number is illustrated in FIG. 19*a*. The word sense number of a verb is composed of an identification number, a type number, a specificity number, and an experience number. The identification number component is composed of two parts: the verb identification number composed of a verb class number and a verb member number; and the sentence role identification numbers composed of the doer and receiver(s) word sense identification numbers, i.e., class numbers and optional class member numbers. There can be more than one identification number for a sentence role. The first phase of the verb word sense number selection process selects the verb word sense identification number.

Figure 19B:
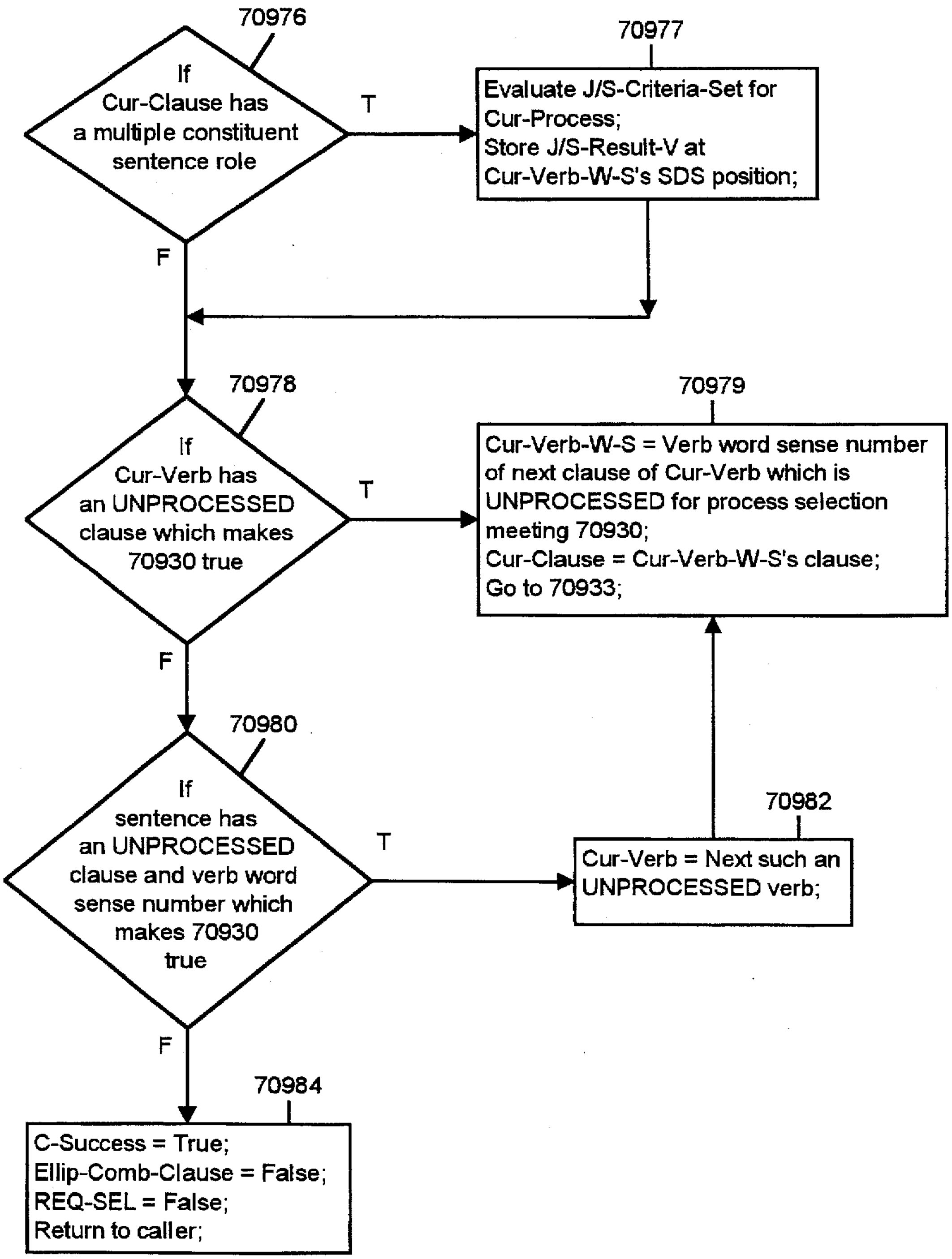

The verb word sense identification number determines the effects implied by the verb word sense number, but does not determine the process for achieving the effects. The format for the data associated with a verb word sense identification number is illustrated in FIG. 19*b*. The data in FIG. 19*b* is process independent, and the data is stored in Clausal Abstract Noun and Clause State Representation Memory 100. One component of this process independent data is the effects of the verb word sense number. The effects contain the affected elements and their associated effect. The affected elements are typically a sentence role, i.e., a subject, indirect object, direct object, an instrument, etc., or a designated context element. The effect is typically one or more states and their state values which are the result of the verb word sense number effect upon the affected element. The effect could also be to set the state representation of verbs. For example as described for mood, certain verbs imply that a clause is hypothetical as in: "I wish that he came home earlier." In this example, the subordinate clause direct object is set to have a hypothetical truth value. Another component of this process independent data structure is the result type of a verb. The result type has a value of STATIVE, EVENTIVE, and/or HABITIVE. The result type is utilized to select the time of truth and time point as described above in the tense, and aspect section of verb function words. The result type of many verbs can be EVENTIVE or HABITIVE depending upon the usage which is set by adverbials in natural language sentences.

Another component of this process independent data structure is a pointer to the set of purposes in Memory 130 which are associated with the verb word sense number. Memory 130 contains Clausal Abstract Noun and Clause Purpose entries, and is described below. Purposes, as described above, are related strings and/or trees of clauses which are related in a purpose. Another component of the process independent data is a pointer to a table in Memory 100 which contains adverbial subclass entries which are shared with more than one verb sense number without specialization to a single word sense number. The adverbial subclass entry format is described in FIG. 19*e* below. Another component of this process independent data is a designated typical process for the verb word sense number. The typical process is the most common process used to achieve the verb word sense number. The typical process is used when a process is not selected. A process would not be selected in certain cases such as determining expected activity in a hypothetical situation or a situation which has not been stored before, i.e., an unknown situation. The remaining component of the process independent data is the list of process selecting adverbials. This list contains adverbials which are stored in a data structure in Memory 100, which is described below. These adverbials are associated with the verb word sense identification number, and these adverbials select one or more processes of the verb word sense identification number. Each adverbial in the list has one or more associated type numbers. A verb type number corresponds to a process. The adverbials in the list are used to select a process which achieves the result states which are the effects of the verb word sense number. Process selection is accomplished partially by evaluating the selecting adverbials to determine if their subclass value in the clause or in the context matches the value stored in 100. If a match is found for one or more of the possible adverbials, the one or more processes common to the one or more matches are selected. When multiple processes are possible, purpose identification methods are utilized to select a process as is described below.

The second phase of verb word sense number selection is started after the first phase is completed, i.e., the word sense numbers of the sentence roles and the word sense numbers of the verbs have been consistently selected. The adverbials stated in the clause containing the verb which is being processed for word sense number selection are evaluated in the second phase of verb word sense number selection. The clause's possible type, specificity and experience numbers are selected in the second phase. The type, specificity and experience number formats are depicted in FIG. 19*a*. Selecting the type is equivalent to selecting a process which achieves the effects of the result states of the verb word sense number. The specificity number has only positive even numbers stored in Memory 100. A zero specificity number corresponds to the typical case for a given type number's process. An even, non-zero specificity number corresponds to a specific set of instances of a process. An odd, non-zero specificity number corresponds to the best match of an unknown instance of a process. The best match is the odd specificity number's preceding, even specificity number process. A verb word sense number with a zero experience number corresponds to the typical process for the type and specificity number. An experience number is always zero for a zero specificity number. A non-zero experience number corresponds to a specific occurrence of a process. The selection of type, specificity and experience numbers often entails determining adverbial subclass values which are in the context in 120. The stated and unstated adverbials can broadly: modify the result state value of the affected sentence roles; select a general process; select a specific process; identify the clause occurrence in time or space; comment about the clause; and/or imply a function unrelated to the verb word sense number such as: clause conjunction, purpose implication, or sentence role modification. Adverbials are selected with a function process as described for English in FIG. 9*b*. The other data structure formats associated with a verb word sense number and the process to select a verb word sense number are described in the remainder of this section.

FIGS. 19*c*, 19*d*, 19*e*, 19*f* and 19*g* are used for the Selector 70 Verb Word Sense Number Selection process depicted in FIGS. 19*h*–19*bb*, and these figures are described below. Selector 70 is called by various processes such as Selector 60 as described above. 70 has various subprocesses which are selected by an invocation parameter, an invocation opcode. A subprocess is selected from an invocation starting at 7000. 7000 is true if the current invocation opcode is DV or DV-S. 7000 is true when 60 invokes 70 to select a subject's word sense number which is consistent with the other main sentence roles of a clause for example. The main sentence roles are subject, verb, indirect object, and direct object. If 7000 is true, processing continues at 70100. If 7000 is false, 7004 is next, and is true if the current invocation opcode is R. 7004 is true when 60 invokes 70 to select a indirect or direct object's word sense number which is consistent with the word sense numbers of the main sentence roles that have been selected and with the verb for example. If 7004 is true, processing continues at 70380. If 7004 is false, 7008 is next, and is true if the current invocation opcode is ABS-MOD or ADJ-COMP-MOD. 7008 is true for the case where certain modifiers of a clausal abstract noun or the adjective modified by a prepositional phrase are to be converted to adverbs which are tested for modifying a given verb word sense number. If 7008 is true, processing continues at 70400. If 7008 is false, 7012 is next, and is true if the current invocation opcode is T-Rel. 7012 is true when ADJ-PREP calls 70 to determine if there is a T-Relation between two given clauses for example. If 7012 is true, processing continues at 70500. If 7012 is false, 7016 is next, and is true if the current invocation opcode is COMPLETION. 7016 is true when Step 18 calls 70 to select a verb word sense number which is consistent with stated adverbials and adverbials in the context for example. The verb word sense number is selected using the given word sense numbers of all main sentence roles, and the selected verb word sense number includes the process realizing the verb word sense number result states associated with the verb's effects. If 7016 is true, processing continues at 70700. If 7016 is false, 7020 is next, and is true if the current invocation opcode is Pre-Selected-Word-Sense. 7020 is true for the case when a clause has its main sentence role word sense numbers already selected, and this clause is only processed for adverbial modifiers of the clause verb. This case occurs when a current clause is found to be a referent of a previously stated clause for example. If 7020 is true, processing continues at 70800. If 7020 is false, 7024 is next, and is true if the current invocation opcode is 70-Find. 7024 is true for the cases when 70 calls other selectors or other processes. If 7024 is true, processing continues at 70-Return, a parameter of the original call from 70 and a parameter of the return invocation of 70. If 7024 is false, the invocation opcode is S-REQ, and 7028 is next. 7024 is false when 70 is invoked to look up the requirements for a sentence role modified by a subordinate clause in a clausal abstract noun for example. If 7024 is false, 7028 sets S-Req to the requirements for a designated sentence role for a designated verb word sense number; and 7028 returns processing to the caller. The requirements of a verb word sense number for a sentence role are stored in a format depicted in FIG. **19*d*** which is described in more detail below.

Selection of Main Sentence Role Word Sense Numbers

This subprocess of 70 is selected when 7000 is true, and processing begins at 70100. 70100 is true if the current invocation opcode is DV-S. If 70100 is true, 70 is being invoked to determine if a given subject candidate can be a subject of a given verb. For example, Nonfinite Verb Clause, Verbless Clause, and Morphological Word@ Ellipsis Processing, depicted in FIGS. **16*a*–16*c* for English, calls this subprocess to determine if a noun premodified by a nonfinite verb can be a subject of that nonfinite verb. If 70100 is true, 70102 forms TR-List for the given subject, and forms V-List for the given verb. TR-List contains the noun word sense numbers of the given subject. The word sense numbers are from the context and/or from Dictionary 20. TR-List is formed as an R-List is formed at 60103 as described above. The word sense numbers in TR-List and V-List are ordered according to the most recently referenced first order policy. The references are stored in 120. V-List contains associated verb word sense identification numbers from 20 and/or the associated verb word sense numbers in 120 which meet the application pattern stored with each word sense number's anomaly table in Dictionary 20. FIG. 19*c* contains a verb's base word table anomaly format for application patterns. This format contains the allowed patterns for the verb's word sense number. The patterns include: transitive, ditransitive (e.g., direct and indirect object), intransitive, passive, instrumental subject, A-Relation sentence roles, and idiomatic word sense number type (e.g., transitive phrasal verb), etc. The first four patterns are detectable after Parsing Step 16. These and other patterns detectable prior to 70 are used to select word sense numbers of a verb. V-List only contains word sense numbers which allow the pattern in the current clause. The instrumental subject is a special use for a verb and is described below. A-Relation sentence roles were discussed for ADJ-PREP for example. Idiomatic verbs (e.g., "I called up the mayor.") were discussed above, and are used for adverbial subclass selection in the sense that an idiomatic subclass is checked for only if the verb word sense number allows it. After 70102, 70104 determines if a word sense number in TR-List meets a verb word sense number requirement until a match is found, or until all V-List entries have been checked for all TR-List entries. A verb word sense number requirement is meet for a noun identification number if the verb requirement has the noun identification number as part of a requirement. A specified noun word sense number meets a verb word sense number requirement if the specified noun word sense components meet corresponding stored components of the verb requirement. A verb word sense requirement contains these components: noun identification numbers, type numbers, and states and associated values or value ranges. A verb word sense requirement component must be met by a noun word sense number if that component for the noun is known. For example, if a noun word sense number does not have a type number, such a noun word sense number meets type number component requirements of a verb. After 70104, 70106 is next, and is true if a subject word sense number match was found in 70104. If 70106 is true, 70108 sets Acceptable-Subject to true. If 70106 is false, 70110 sets Acceptable-Subject to false. After 70108 or 70110, 70112** sets processing to continue at the caller.

If 70100 is false, 70101 is next, and is true if the main sentence roles of the invocation clause containing the invocation subject have been preprocessed for selection of their word sense numbers. The invocation clause is called the Current-Clause. If 70101 is true, a word sense number of a subject was determined at 60 to be inconsistent with its modifiers as described above. If 70101 is true, 70130 is next and will be described below. If 70101 is false, the Current-Clause has not been processed before, and 70120 is next. 70120 is true if the Current-Clause has one or more coordinated main sentence roles with a phrase implying a respective function. If 70120 is true, 70122 forms a separate clause in the SDS for each coordinated main sentence role constituent that has an associated respective function. The Current-Clause becomes the first separated clause. Other separated clauses will be processed through invocation by Step 18. After 70122, or if 70120 is false, 70124 is next, and is true if the Current-Clause contains coordinated verbs. If 70124 is true, 70126 sets Mul-V to true; Cur-Conj-Set is set to contain the conjunctions in the verb phrase; 70-Return is set to 70114; and 70124 calls CONJ[Cur-Nat-Lang, Cur-Conj-Set, 70-Return]. CONJ performs conjunction processing as described for English in FIG. **11*b* for example. If 70124 is false, 70125 sets Mul-V to false. After processing at CONJ, or after 70125, 70114 is next, and is true if the Current-Clause contains coordinated subjects. If 70114 is true, 70115 sets Mul-S to true; Cur-Conj-Set is set to contain the conjunctions in the subject phrase; 70-Return is set to 70117; and 70115 calls CONJ[Cur-Nat-Lang, Cur-Conj-Set, 70-Return]. If 70114 is false, 70116 sets Mul-S to false. After processing at CONJ, or after 70116, 70117 is next, and is true if the Current-Clause contains coordinated direct objects. If 70117 is true, 70118 sets Mul-D to true; Cur-Conj-Set is set to contain the conjunctions in the direct object phrase; 70-Return is set to 70127; and 70118 calls CONJ[Cur-Nat-Lang, Cur-Conj-Set, 70-Return]. If 70117 is false, 70119 sets Mul-D to false. After processing at CONJ, or after 70119, 70127 is next, and is true if the Current-Clause contains coordinated indirect objects. If 70127 is true, 70128 sets Mul-I to true; Cur-Conj-Set is set to contain the conjunctions in the indirect object phrase; 70-Return is set to 70132; and 70128 calls CONJ[Cur-Nat-Lang, Cur-Conj-Set, 70-Return]. If 70127 is false, 70129** sets Mul-I to false. This completes initial processing of the Current-Clause for respective functions and coordinated main sentence roles.

After processing at CONJ, or after 70129, 70132 is next. 70132 instantiates variables for processing to initially select the word sense numbers of the main sentence roles. 70132 forms an R-List as described at 60103 for each main sentence role without an R-List; the number of entries in each main sentence role's R-List and MAX is stored at each main sentence role's SDS position with a newly formed R-List; each formed R-List has its associated R-No set to 1; UNPREPROCESSED is stored at each main sentence role's SDS position; a V-List, as described for 70104, is formed for each main verb; an all one's VM-V is formed for each main verb (VM-V is a vector of length equal to the number of word sense numbers in a verb's V-List. VM-V contains a one for each corresponding word sense number in V-List which is a currently possible word sense number interpretation.); each verb's V-List and VM-V is stored at the verb's SDS position; F-Stat is set to SUBJECT; and 70132 sets REPROC to false; F-Stat indicates the type of main sentence role being processed. REPROC is true when the main sentence roles of the Current-Clause have a noninitial combination of word sense number being considered as a possible interpretation. After 70132, 70133 is next, and is true if the Current-Clause has one or more detectable special usages. An example of a detectable special usage in English is a clause with a passive voice verb. This special usage is detected at Parsing Step 16. If 70133 is true, 70136 performs the functions associated with SU[Cur-Nat-Lang] associated with each detected special usage. For example, the functions associated with the passive voice look up the active voice version of the clause in 30 and assign the sentence roles of the stated clause to their role in the active voice clause. For example, if the passive clause has a prepositional phrase with "by" as the preposition, the complement of the prepositional phrase is set to be the subject. Otherwise, the subject is a special R-List composed of indefinite pronouns for each type of pronoun, i.e., "someone" for person, "something" for a thing, etc. The stated subject of the Current-Clause is the object. After 70136, or if 70133 is false, processing continues at 70200 which is described below.

After 70134, 70200 is next. 70200 sets Cur-Sub to be the next UNPREPROCESSED subject in the Current-Clause. 70202 is next, and is true if for each verb of Cur-Sub, Cur-Sub's word sense number for its R-No matches at least one VM-V position's subject word sense number requirements as at 70104 for a VM-V position with a one value of the verb. 70202 is true if the R-No of Cur-Sub matches each of its verbs for word sense number requirements for at least one possible verb word sense number. If 70202 is true, 70204 stores a zero at each position of a Cur-Sub verb's VM-V position corresponding to a subject word sense number, a usage, that did not match verb requirements. 70204 also forms a SZ-V vector for each verb of Cur-Sub. SZ-V is vector of the same length as a VM-V which stores the verb word sense numbers eliminated by Cur-Sub. SZ-V is used to restore the verb's VM-V in the case that a different R-No of Cur-Sub is needed for verb word sense number selection. This case occurs when Cur-Sub needs reinterpretation because it failed word sense number selection at 60 for example. For each verb of Cur-Sub, 70204 sets SZ-V to be an all zeroes VM-V of a verb; a one is stored at each position of a SZ-V corresponding to a position set to zero by 70204 in the corresponding VM-V. 70204 also stores Cur-Sub's R-No for normal use and all of Cur-Sub's SZ-V's at Cur-Sub's SDS position; and 70204 sets Cur-Sub to PREPROCESSED. If 70202 is false, at least one verb did not have a match with Cur-Sub, and 70206 is next. 70206 forms a VNU-V for Cur-Sub for its R-No. A VNU-V is a vector with a position for each verb of Cur-Sub. For a particular R-No of Cur-Sub, each position that corresponds to a verb with a normal usage match for Cur-Sub is set to one. A normal usage is a subject word sense number matching verb word sense number requirements. All other positions are set to zero. 70206 marks and stores the R-No, the number of normal usages, and VNU-V at Cur-Sub's SDS position. After 70206, 70208 is next, and is true if Cur-Sub's R-No is less than its MAX. If 70208 is true, 70210 increments Cur-Sub's R-No by one. After 70210, 70202 is processed as above. If 70208 is true, the next R-No is processed to determine if its word sense number matches the requirements of possible word sense number of Cur-Sub's verb as above. If 70208 is false, 70212 is next.

70202 or 70212 can also be preceded by 70130. 70130 sets up variables for processing a subject that has failed processing at 60 for example. 70130 is next if 70101 is true as described above. 70130 sets Cur-Sub to the invocation subject from the caller; Cur-Sub is set to UNPREPROCESSED; for each verb of Cur-Sub: zero a position with a one in such a verb's SZ-V of Cur-Sub if the position's corresponding verb word sense requirements does not match a word sense number of each PREPROCESSED main sentence role of the Current-Clause as at 70104 for each verb with a nonzero SZ-V of Cur-Sub: the VM-V is set to the bit-wise OR of a verb's VM-V and the verb's SZ-V of Cur-Sub; F-Star is set to SUBJECT; and 70130 sets REPROC to false. 70130 ORs a verb's VM-V with the verb's updated SZ-V of Cur-Sub because this operation sets the possible verb word sense numbers, that were removed from consideration for a verb because Cur-Sub's word sense numbers failed to match such verb word sense numbers' requirements, to be considered again for a new word sense number of Cur-Sub. After 70130, 70138 is next, and is true if Cur-Sub has failed all its REQ terms for a non special use REQ. If 70138 is true, Cur-Sub could have the correct R-No, but Cur-Sub is actually special usage. 70138 is true when the modifiers of Cur-Sub cause its REQ to fail, but the modifiers could still possibly modify Cur-Sub otherwise. Thus, it is possible the R-No of Cur-Sub could be associated with the correct word sense number for a special usage. If 70138 is true, 70212 is next. If 70138 is false, Cur-Sub failed because a Cur-Sub modifier did not have a known modification relation to Cur-Sub, and 70140 is next. 70140 marks a special use R-No's VNU-V which failed its REQ as DISALLOWED, and sets processing to continue at 70218. 70218, which is described below, determines if Cur-Sub has an unprocessed R-No, and Cur-Sub is either processed for another R-No, or is processed for alternate preprocessing possibilities.

70212 considers possible special uses of Cur-Sub for verbs of Cur-Sub which did not have any of its subject word sense number requirements met with any of Cur-Sub's word sense numbers. Possible special uses are associated with VNU-V's which were stored at 70206 and which are not marked DISALLOWED. Special uses occur in natural language. A special use can be possible when identified in the process above when 70208 is false, or if the main sentence role fails word sense number selection in 60 and eventually is false at 70208 for example. An example of a special use subject is: "Mary and her baby went shopping." "baby" is a special use subject because a "baby" would fail the REQ for "shopping" at 60. This example actually means: "Mary went shopping with her baby." i.e., the "baby" accompanied "Mary". This type of special subject actually results in the stated subject as an adverbial of the clause verb. A common type of special subject usage is termed instrumental subject, i.e., the stated subject is an instrumental adverbial as in: "The rock broke the window." In this example, the literal meaning is typically: "Someone broke the window with a rock." Another example is: "John's pride won the match." In this example, "pride" does not have a requirement match for any subject word sense number of "to win". The special use of "pride" in terms of the example is: "Pride caused John to win the match." This special use is that a state abstract noun subject can have a purpose relation to its owner, and the owner is the subject of the clause. Objects of a sentence can also have a special use. One special use is ellipsis. For example: "Tom broke his finances and his watch at the casino." This is a special use of ellipsis because "broke" requires two word senses, i.e., to lose money, and to damage the watch. Thus, the sentence is equivalent to: "John broke his finances, and John broke his watch at the casino."

Another example special case type is for a preposition modifying an adjective in which the prepositional complement is assumed to be an object, but actually is a prepositional complement. Each main sentence role has a special usage table for a particular natural language in 20. Each entry contains zero or more conditions for the special usage, and a set of one or more functions to be performed to set up the special usage. For example, in the adverbial subject special usage, e.g., "Mary and her baby went shopping.", the conditions are: meets word sense number requirement match, failed REQ at 60, verb word sense number allows adverbial subject. The function is to remove the subject and assign it as an adverbial with a verb word sense number associated set of adverbial subclasses.

If 70208 is false, or after 70138, 70212 is next. 70212 processes the possible VNU-V's stored at Cur-Sub in the order of VNU-V's with the lowest R-No first. Possible VNU-V's were stored at 70206 and are not marked DISALLOWED. For all stored VNU-V and R-No combinations, 70212 determines if a combination has special subject uses for the subject's R-No and each verb of Cur-Sub which does not have a normal use in VNU-V, i.e., such a verb has a zero at its corresponding VNU-V position. The combinations are tried until a combination has a special use for each verb without a normal use for an R-No of the subject, or until all combinations have failed to have special uses for each verb. The special uses for subjects are contained in SSU[Cur-Nat-Lang] in 20. The special uses in SSU[Cur-Nat-Lang] are ordered in the most common special use first. 70212 determines if there is a special use by checking if the conditions of a special usage are met by Cur-Sub and/or other words in the sentence as described in the previous paragraph for each verb of Cur-Sub without a normal use in VNU-V. If there are multiple verbs without a normal use, different verbs may have different special uses. 70212 determines the special uses of each verb without a normal use until a special use is found for each such verb, or until all combinations, selected in the order used to select the first combination, fail to have a special use for each verb without a normal use. After 70212, 70214 is next, and is true if a special use is found for each unmatched verb, i.e., a verb with a zero in its VNU-V position. If 70214 is true, 70216 evaluates the functions associated with each special use selected at 70212. The evaluation of these functions may in some cases alter the stated clause as described above. These alterations include: forming additional clauses, changing subjects to complements of adverbial prepositional phrases, etc. If multiple clauses are formed, the first clause becomes the Current-Clause, and other clauses are processed through later invocations by Step 18. 70216 also stores the following at Cur-Sub's SDS position: each special subject use entry number in SSU, the implied Cur-Sub R-No for each special use, the verb position for each special use, and the VNU-V. After 70216, 70204 is next as above. If 70214 is false, 70218 is next, and is true if Cur-Sub's R-No is less than its MAX. 70218 is true for the case where a preprocessed subject fails processing at 60, and is false at 70214 because the subject failed the criteria at 70212 for example. If 70218 is true, 70210 increments R-No as above. If 70218 is false, the Cur-Sub has failed preprocessing, and processing continues at 70262. 70262 begins processing which considers alternate interpretation and processing possibilities. 70262 is used for subject, indirect object, and direct object preprocessing failures. 70262 is described at the Alternate Preprocessing Upon Failure section.

After 70204, the Cur-Sub has been successfully PREPROCESSED as described above. After 70204, 70224 is next, and is true if there is an UNPREPROCESSED subject in the Current-Clause. If 70224 is true, 70226 is next, and is true if the next UNPREPROCESSED subject has a word sense number which matches a word sense number requirement as at 70104 of a PREPROCESSED subject with a normal or special use. If 70226 is true, 70228 sets the next UNPREPROCESSED subject to PREPROCESSED; the following is stored at this subject's SDS position: the first R-No that matches an R-No of a PREPROCESSED subject, the matched PREPROCESSED subject's position, VNU-V, all special use numbers, special use R-No's and special use verb positions; finally 70228 evaluates any special use functions. After 70228, 70224 is next as above. If 70226 is false, 70200 is next as above. If 70224 is false, the subjects of the Current-Clause have been successfully processed, and processing continues at 70150.

70150 begins the processing of indirect objects of the Current-Clause. 70150 is true if the Current-Clause has an UNPROCESSED indirect object. If 70150 is true, 70152 sets Cur-I-Obj to the next UNPREPROCESSED indirect object. Cur-I-Obj's R-No is set to 1. After 70152, 70154 is next, and is true if for each verb of Cur-I-Obj, Cur-I-Obj's word sense number for its R-No matches at least one VM-V position's indirect object word sense number requirements as at 70104 for a VM-V position with a one value. 70154 is true if the R-No of Cur-I-Obj matches each of its verbs for word sense number requirements for at least one possible verb word sense number. If 70154 is true, 70162 stores a zero at each position of a Cur-I-Obj verb's VM-V corresponding to a indirect object word sense number, a usage, that did not match verb word sense number requirements. 70162 also forms a IOZ-V vector for each verb of Cur-I-Obj. IOZ-V is vector of the same length as VM-V which stores the verb word sense numbers eliminated by Cur-I-Obj. IOZ-V is used to restore the verb's VM-V in the case that a different R-No of Cur-I-Obj is needed for verb word sense number selection. This case occurs when Cur-I-Obj needs reinterpretation because it failed word sense number selection at 60 for example. For each verb of Cur-I-Obj, 70162 sets IOZ-V to be an all zeroes VM-V of a verb; a one is stored at each position of a IOZ-V corresponding to a position set to zero by 70162 in the corresponding VM-V. 70162 also stores Cur-I-Obj's R-No for normal use and all of Cur-I-Obj's IOZ-V's at Cur-I-Obj's SDS position; and 70162 sets Cur-I-Obj to PREPROCESSED. If 70154 is false, at least one verb did not have a match with Cur-I-Obj, and 70164 is next. 70164 forms a VNU-V for Cur-I-Obj for its R-No. A VNU-V is a vector with a position for each verb of Cur-I-Obj. For a particular R-No of Cur-I-Obj, each position that corresponds to a verb with a normal usage match for Cur-I-Obj is set to one. A normal usage is a match of indirect object word sense number and verb word sense indirect object requirements. All other positions are set to zero. 70164 marks and stores the R-No, the number of normal usages, and VNU-V at Cur-I-Obj's SDS position. After 70164, 70156 is next, and is true if Cur-I-Obj's R-No is less than its MAX. If 70156 is true, 70158 increments Cur-I-Obj's R-No by one. After 70158, 70154 is processed as above. If 70156 is true, the next R-No is processed to determine if its word sense number matches the possible word sense number of Cur-I-Obj's verb as above. If 70156 is false, 70160 is next. 70160 sets F-Star to INDIRECT-OBJECT, and sets processing to continue at 70250.

70250 considers possible special uses of Cur-I-Obj for verbs of Cur-I-Obj which did not match any of its indirect object number requirements with any of Cur-I-Obj's word sense numbers. Possible special uses are associated with possible VNU-V's which were stored at 70164 and which are not marked DISALLOWED. 70250 processes the possible VNU-V's stored at Cur-I-Obj in the order of the lowest R-No first. For all stored VNU-V and R-No combinations, 70250 determines if a combination has special indirect object uses for the indirect object's R-No and each verb of Cur-I-Obj which does not have a normal use in VNU-V, i.e., such a verb has a zero at its corresponding position. The combinations are tried until a combination has a special use for each verb without a normal use for an R-No of the indirect object, or until all combinations have failed to have special uses for each verb. The special uses for indirect objects are contained in SIOU[Cur-Nat-Lang] in 20. The special uses in SIOU[Cur-Nat-Lang] are ordered in the most common special use first. 70250 determines if there is a special use by checking if the conditions of a special usage are met by Cur-I-Obj and/or other words in the sentence, as described above for special uses, for each verb of Cur-I-Obj without a normal use in VNU-V. If there are multiple verbs without a normal use, different verbs may have different special uses. 70250 determines the special uses of each verb without a normal use until a special use is found for each such verb, or until all combinations, selected in the order used to select the first combination, fail to have a special use for each verb without a normal use. Also, 70250 sets Cur-Obj to be Cur-I-Obj. After 70250, the processing, starting with 70252, is partially common to both direct and indirect objects. Cur-Obj is either the current indirect or the current direct object. After 70250, 70252 is next, and is true if a special use is found for each of Cur-Obj's unmatched verbs, i.e., a verb with a zero in its VNU-V position. If 70252 is true, 70254 is next. 70254 evaluates the functions associated with each special use selected at 70250 or 70290, described below. The evaluation of these functions may in some cases alter the stated clause as stated above. If multiple clauses are formed, the first clause becomes the Current-Clause, and other clauses are processed through later invocations by Step 18. 70254 also stores the following at Cur-Obj's SDS position: each special direct or indirect object use entry number in SDIO (described below, but similar to SIOU for direct objects) or SIOU, the implied Cur-Obj R-No for each special use, the verb position for each special use, and the VNU-V. After 70254, 70256 is next, and is true if Cur-Obj is a direct object. If 70256 is true, processing continues at 70306, which is described below for direct object preprocessing. If 70256 is false, processing continues at 70162 which is described above. If 70252 is false, 70180 is next, and is true if Cur-Obj's R-No is less than its MAX. 70180 is true for the case where a preprocessed indirect object fails processing at 60, and is false at 70252 because the indirect object failed the criteria at 70250 for example. If 70180 is true, 70182 is next, and is true if Cur-Obj is a direct object. If 70182 is true, processing continues at 70310, which is described below for direct object preprocessing. If 70182 is false, processing continues at 70158 which is described above. 70158 increments R-No as above. If 70180 is false, the Cur-Obj has failed preprocessing, and processing continues at 70262. 70262 begins processing which considers alternate interpretation and processing possibilities. 70262 is used for subject, indirect object, and direct object preprocessing failures. 70562 is described at the Alternate Preprocessing Upon Failure section.

After 70162, the Cur-I-Obj has been successfully PREPROCESSED as described above. After 70162, 70166 is next, and is true if there is an UNPREPROCESSED indirect object in the Current-Clause. If 70166 is true, 70168 is next, and is true if the next UNPREPROCESSED indirect object has a word sense number which matches a word sense number requirement as at 70104 of a PREPROCESSED indirect object with a normal or special use. If 70168 is true, 70170 sets the next UNPREPROCESSED indirect object to PREPROCESSED; the following is stored at this indirect object's SDS position: the first R-No that matches an R-No of a PREPROCESSED indirect object, the matched PREPROCESSED indirect object's position, VNU-V, all special use numbers, special use R-No's and special use verb positions; finally 70170 evaluates any special use functions. After 70170, 70166 is next as above. If 70168 is false, 70152 is next as above. If 70166 is false, the indirect objects of the Current-Clause have been successfully processed, and processing continues at 70300 for direct object processing.

70300 begins the processing of direct objects of the Current-Clause. 70300 is true if the Current-Clause has an unprocessed direct object. If 70300 is true, 70302 sets Cur-D-Obj to the next UNPREPROCESSED direct object. Cur-D-Obj's R-No is set to 1. After 70302, 70304 is next, and is true if for each verb of Cur-D-Obj, Cur-D-Obj's word sense number for its R-No matches at least one VM-V position's direct object word sense number requirement as at 70104 for a VM-V position with a one value. 70304 is true if the R-No of Cur-D-Obj matches each of its verbs for word sense number requirements for at least one possible verb word sense number. If 70304 is true, 70306 stores a zero at each position of a Cur-D-Obj verb's VM-V corresponding to a direct object word sense number, a usage, that did not match the verb word sense number requirements. 70306 also forms a DOZ-V vector for each verb of Cur-D-Obj. DOZ-V is vector of the same length as VM-V which stores the verb word sense numbers eliminated by Cur-D-Obj. DOZ-V is used to restore the verb's VM-V in the case that a different R-No of Cur-D-Obj is needed for verb word sense number selection. This case occurs when Cur-D-Obj needs reinterpretation because it failed word sense number selection at 60 for example. For each verb of Cur-D-Obj, 70306 sets DOZ-V to be an all zeroes VM-V of a verb; a one is stored at each position of a DOZ-V corresponding to a position set to zero by 70306 in the corresponding VM-V. 70306 also stores Cur-D-Obj's R-No for normal use and all of Cur-D-Obj's DOZ-V's at Cur-D-Obj's SDS position; and 70306 sets Cur-D-Obj to PREPROCESSED. If 70304 is false, at least one verb did not have a match with Cur-D-Obj, and 70314 is next. 70314 forms a VNU-V for Cur-D-Obj for its R-No. A VNU-V is a vector with a position for each verb of Cur-D-Obj. For a particular R-No of Cur-D-Obj, each position that corresponds to a verb with a normal usage match for Cur-D-Obj is set to one. A normal usage is a match of direct object word sense number and verb word sense number direct object requirements. All other positions are set to zero. 70314 marks and stores the R-No, the number of normal usages, and VNU-V at Cur-D-Obj's SDS position. After 70314, 70308 is next, and is true if Cur-D-Obj's R-No is less than its MAX. If 70308 is true, 70310 increments Cur-D-Obj's R-No by one. After 70310, 70304 is processed as above. If 70310 is true, the next R-No is processed to determine if its word sense number matches the possible word sense number requirements of Cur-D-Obj's verb as above. If 70308 is false, 70312 is next. 70312 sets F-STAT to direct object, and sets processing to 70290.

70290 considers possible special uses of Cur-D-Obj for verbs of Cur-D-Obj which did not match any of its direct object word sense number requirements with any of Cur-D-Obj's word sense numbers. Possible special uses are associated with possible VNU-V's which were stored at 70314 and are not marked DISALLOWED. 70290 processes the possible VNU-V's stored at Cur-D-Obj in the order of the lowest R-No first. For all stored VNU-V and R-No combinations, 70290 determines if a combination has special direct object uses for the direct object's R-No and each verb of Cur-D-Obj which does not have a normal use in VNU-V, i.e., such a verb has a zero at its corresponding position. The combinations are tried until a combination has a special use for each verb without a normal use for an R-No of the direct object, or until all combinations have failed to have special uses for each verb. The special uses for direct objects are contained in SDOU[Cur-Nat-Lang] at 20. The special uses in SDOU[Cur-Nat-Lang] are ordered in the most common special use first. 70290 determines if there is a special use by checking if the conditions of a special usage are met by Cur-D-Obj and/or other words in the sentence, as described above for special uses, for each verb of Cur-D-Obj without a normal use in VNU-V. If there are multiple verbs without a normal use, different verbs may have different special uses. 70290 determines the special uses of each verb without a normal use until a special use is found for each such verb, or until all combinations, selected in the order used to select the first combination, fail to have a special use for each verb without a normal use. Also, 70290 sets Cur-Obj to be Cur-D-Obj. After 70290, the processing, starting with 70252, is partially common to both direct and indirect objects as described above. If special uses have been found for all unmatched verbs, 70252 is true. If 70252 is true, and Cur-Obj is a direct object, 70306 is reached after processing at 70254, 70256, and 70258 as described above.

After 70306, the Cur-D-Obj has been successfully PREPROCESSED as described above. After 70306, 70316 is next, and is true if there is an UNPREPROCESSED direct object in the Current-Clause. If 70316 is true, 70318 is next, and is true if the next UNPREPROCESSED direct object has a word sense number which matches a word sense number requirement as at 70104 of a PREPROCESSED direct object with a normal or special use. If 70318 is true, 70320 sets the next UNPREPROCESSED direct object to PREPROCESSED; the following is stored at this direct object's SDS position: the first R-No that matches an R-No of a PREPROCESSED direct object, the matched PREPROCESSED direct object's position, VNU-V, all special use numbers, special use R-No's and special use verb positions; finally 70320 evaluates any special use functions. After 70320, 70316 is next as above. If 70318 is false, 70302 is next as above. If 70316 or 70300 is false, the direct objects of the Current-Clause have been successfully processed, and processing continues at 70360 for final main sentence role word sense number selection.

70360 begins the process to select a REQ for a main sentence role. 70360 is true if the current invocation opcode is DV or REPROC is true. 70360 is true when 60 invokes 70 to select a REQ for a subject or when a subject's word sense number is reselected through a failure of its previous selection. If 70360 is true, 70362 forms a REQ for a subject by combining subject requirements of each possible word sense number of a subject's verb. The possible word sense numbers of a subject's verb correspond to positions in the verb's VM-V positions which have a one value. The subject requirements of each possible word sense number are combined with an OR-Terminal symbol which implies a separate verb word sense number requirement. FIG. **19*d* contains the format for the requirements of a verb word sense number. Each main sentence role of a verb word sense number has its own requirement descriptor. A main sentence role's requirement descriptor contains a main sentence role word sense number descriptor. A word sense number descriptor is composed of one or more noun word sense identification numbers for a main sentence role. Each such noun word sense identification number contains an associated range of allowed type numbers, and/or one or more Boolean terms of states and/or properties. Each state and property of a term has an associated value or value range. The descriptor can be enumerated for a verb word sense number, or it can be represented by an address to an enumeration in a table. Also, as depicted in FIG. 19*d*, a main sentence role may also have a set of associated A-Relations. The members of an A-Relation can be placed in the associated main sentence role. For example, an A-Relation associated with a main sentence role can be used to indicate the intended meaning of a function relation as described above. In forming a REQ, 70362 only copies the type numbers and/or state and property information of a word sense identification number which matches the selected R-No for the main sentence role. 70362 performs the REQ forming process, described above for a single verb, for each verb of a subject. The single verb REQs are combined into a REQ by separating single verb REQs with an OR-Verb-Separation-Terminal. After forming a REQ for a subject, the REQ is marked and stored at the subject's SDS position. 70362 performs this overall REQ process for each subject in the Current-Clause. After all REQs have been formed and stored, 70362 returns processing control to the caller of 70**.

The completed REQ for a main sentence role contains requirements of a word sense number that are separated by OR-Terminals. This construction allows the main sentence role to be processed for all currently possible verb word sense numbers in parallel. Each requirement separated by an Or-Terminal is treated like a product in a sum of products in a Boolean expression in the sense that a REQ is considered to be satisfied as long as at least one requirement separated by an OR-Terminal is meet by its corresponding main sentence role just as a Boolean expression has a logical one value as long as at least one product term evaluates to a logical one. During the checking of a REQ, terms which fail are marked with a zero symbol after a main sentence role has satisfied a REQ for the current word sense number of the main sentence role. In the case where a main sentence role has multiple verbs associated with it, the REQ of each verb, as just described, is combined with an OR-Verb-Separation-Terminal. The OR-Verb-Separation-Terminal is treated like the OR-Terminal with respect to satisfying the combined REQ, i.e., the REQ formed with the REQs of each verb. Thus, if at least one verb's REQ is satisfied, the combined REQ is considered to be satisfied. This seems counter-intuitive for the case where the verbs are joined with AND conjunctions, i.e., the AND conjunction of multiple verbs normally implies that each verb is performed with respect to its main sentence roles. However, this approach is taken because it is possible that there are other factors which nullify the normal implication of an AND conjunction of verbs. These factors include: a verb could have a modal, an adverbial modal, or mood which implies a hypothetical truth value which implies the verb is not actually performed; the source of the sentence could have intended a respective function which in this case means that a main sentence role is not intended to be associated with each stated verb; the source could also have used ellipsis and intended that the main sentence roles do not combine with each verb; and if a main sentence role meets the requirements of at least one of its verbs, this interpretation deserves consideration at the purpose relation level because the main sentence role word sense numbers are selected in a way (because of the way which the R-Lists are formed) which chooses the most likely word sense number with respect to the context and past experience first.

If 70360 is false, the invocation opcode is R, and this preprocessing process was invoked for a receiver, an indirect or direct object. If 70360 is false, 70368 is next, and is true if the invocation sentence role is a direct object. If 70368 is true, 70370 sets Cur-Obj to a direct object. If 70368 is false, 70372 sets Cur-Obj to an indirect object. After 70372 or 70370, 70374 is next. 70374 first forms an updated REQ, NREQ, by logically ORing the REQ terms of each preceding main sentence role which is in the Current-Clause which contains the invocation sentence role. The REQ term of a main sentence role has a zero symbol stored at a verb word sense number component of the REQ that can not have the current word sense number of the sentence role as a main sentence role of that verb word sense number term with a zero symbol. NREQ, the result of this ORing operation, has zeroes at positions which correspond to verb word sense number component requirements which failed for each preceding main sentence role. Such zero positions correspond to verb word sense numbers that are not allowed for the current word sense number of the main sentence role. 70374 then zeroes VM-V positions of verbs corresponding to zero positions in NREQ. NREQ is formed with ORing as opposed to ANDing for reasoning which is similar to the use of OR-Verb-Separation-Terminals as described above. After the VM-V's have been updated to remove any currently disallowed word sense numbers, 70374 forms a REQ for each sentence role of the Cur-Obj type as described for 70362. 70374 then stores the REQs at each such main sentence role, and returns processing control to the caller.

The remaining type of preprocessing is initiated through the R invocation opcode. This preprocessing is started when 7004 is true. Next, processing continues at 70380. 70380 is true if the invocation object has a REQ. 70380 is true when an object has failed to meet its requirements of its REQ at Selector 60 for example. If 70380 is false, the object has not been processed at 60, and processing continues at 70368 which begins the process of selecting the invocation object's REQ as described above. If 70380 is true, 70382 is next, and is true if the invocation object is a direct object. If 70382 is true, 70383 is next. 70383 sets Cur-D-Obj to the invocation direct object from the caller; Cur-D-Obj is set to UNPREPROCESSED; Cur-Obj is set to Cur-D-Obj; for each verb of Cur-D-Obj: zero a position with a one in such a verb's DOZ-V of Cur-D-Obj if the position's corresponding verb word sense number requirements as at 70104 are not matched by a word sense number of each PREPROCESSED main sentence role; for each verb with a nonzero DOZ-V of Cur-D-Obj: the VM-V is set to the bit-wise OR of a verb's VM-V and the verb's DOZ-V of Cur-D-Obj; F-Stat is set to DIRECT-OBJECT; and 70383 sets REPROC to false. 70383 ORs a verb's VM-V with the verb's DOZ-V of Cur-D-Obj because this operation sets the possible verb word sense numbers, that were removed from consideration because the verb word sense numbers' requirements were not matched by Cur-D-Obj's word sense numbers, to be considered again for a new word sense number of Cur-D-Obj.

If the invocation object is an indirect object 70382 is false, and 70382 is next. 70384 sets Cur-I-Obj to the invocation indirect object from the caller; Cur-I-Obj is set to UNPREPROCESSED; Cur-Obj is set to Cur-I-Obj; for each verb of Cur-I-Obj: zero a position with a one in such a verb's IOZ-V of Cur-I-Obj if the position's corresponding verb word sense numbers does not match a word sense number requirement as at 70104 of each PREPROCESSED main sentence role; for each verb with a nonzero IOZ-V of Cur-I-Obj: the VM-V is set to the bit-wise OR of a verb's VM-V and the verb's IOZ-V of Cur-I-Obj; F-Star is set to INDIRECT-OBJECT; and 70384 sets REPROC to false. 70384 ORs a verb's VM-V with the verb's IOZ-V of Cur-I-Obj because this operation sets the possible verb word sense numbers, that were removed from consideration for a verb through failing to have a requirement match with Cur-I-Obj's word sense numbers, to be considered again for a new word sense number of Cur-I-Obj.

After 70373 or 70374, 70385 is next, and is true if Cur-Obj has failed all its REQ terms for a non special use REQ. If 70385 is true, Cur-Obj could have the correct R-No, but Cur-Obj is actually a special usage. 70385 is true when the modifiers of Cur-Obj cause its REQ to fail, but the modifiers could still possibly modify Cur-Obj otherwise. Thus, it is possible the R-No of Cur-Obj could be associated with the correct word sense number for a special usage. If 70385 is true, 70387 is next, and is true if Cur-Obj is a direct object. If 70387 is true, special usage preprocessing begins at 70312 which is described above. If 70387 is false, special usage preprocessing begins at 70160 which is also described above. If 70385 is false, Cur-Obj either requires alternative processing if its R-No equals MAX, or Cur-Obj will have its next word sense number preprocessed. Alternative processing is described below. If 70385 is false, 70140 marks a special use R-No's VNU-V which failed its REQ as DISALLOWED, and sets processing to continue at 70180 which determines these possibilities, and was described above.

This completes description of the preprocessing of the main sentence roles except for alternative preprocessing upon failure which begins at 70262 as described above.

Alternative Preprocessing Upon Failure

When the preprocessing of word sense numbers fails to select a main sentence word sense number, there are alternative processes which can recover from this type of failure. The alternatives are basically to restart the preprocessing process for a different combination of main sentence role word sense numbers if possible, or otherwise, to determine if there are alternatives related to ellipsis. The alternative processes begins at 70262 which is true if the first subject's R-No is less than MAX. If 70262 is true a new combination of word sense numbers exists, and 70266 sets all main sentence roles to UNPREPROCESSED, and sets their R-No's to 1 except for the first subject. The R-No of the first subject is incremented by 1. 70266 also sets the VM-V of each verb of the Current-Clause to all ones; REPROC is set to true; F-Stat is set to SUBJECT; and 70266 sets processing to continue at 70200 as described above. If 70262 is false, 70263 is next, and is true if the first subject has its SOURCE set to CONTEXT and is not a pronoun or is not a specific known reference. If 70263 is true, the first subject may have additional untried word sense numbers because its current R-List only contains word sense numbers in Context Memory 120. If 70263 is true, 70264 forms a complete R-List as described above for selector 60 for 60103, and sets SOURCE to MEMORY. After 70264, 70262 is next as above. If 70263 is false, 70268 is next. 70268 is true if the first subject has a nonfinite verb clause, verbless clause and morphological word@ ellipsis restart address. If 70268 is true, 70269 is next, and is true if ESUB is false and F-Star equals SUBJECT, or if EOBJ is false and F-Star equals DIRECT-OBJECT. 70269 is true when the main sentence role that failed the selection of its word sense number is not ellipted in the clause with ellipsis. If 70269 is true, no further alternative processing is possible, and 70272 is next. 70272 informs the Communication Manager of an F-Star word sense number selection failure.

If 70269 is false, processing nonfinite verb clause, verbless clause and morphological word@ ellipsis begins at 70273. The processing determines if the ellipted subject and/or object are suitable. 70273 is true if F-Stat equals SUBJECT. If 70273 is true, 70274 sets Acceptable-Subject to false. If 70273 is false, 70275 sets Acceptable-Subject to true. Acceptable-Subject indicates the suitability of the subject, and it is used in ellipsis processing as described above for STEP 26. After 70274 or 70275, 70276 is next, and is true if EOBJ is true. 70276 is true if the object is ellipted. If 70276 is true, 70277 determines if a word sense number of Cur-Obj meets a word sense number requirement as at 70104 of a verb word sense number of each verb of Cur-Obj. 70277 determines if Cur-Obj could possibly be an object in the Current-Clause. Note that the subject is not processed for a new word sense number as an object because all subject word sense numbers have been determined to not be in the Current-Clause. After 70277, 70278 is next, and is true if a requirement match was found at 70277. If 70278 is true, or if 70276 is false, 70279 sets Acceptable-Object to true. If 70278 is false, 70280 sets Acceptable-Object to false. After 70279 or 70280, 70281 prepares for further nonfinite verb clause, verbless clause and morphological word@ ellipsis. 70281 sets 70-Return to 70282, sets RESTART to the ellipsis restart address at the first subject's SDS position, and calls ELLIP[RESTART, 70-RETURN].

After ellipsis processing, 70282 is next, and is true if RES-STATUS equals SUCCEED. 70282 is true if ellipsis processing has selected another replacement for the ellipted elements. If 70282 is true, 70283 is next. 70286 forms an R-List for each replaced element and sets each replaced element's R-No to 1. After 70283, 70284 is next, and is true if a subject or verb was replaced. If 70284 is true, the entire clause requires preprocessing, and 70285 is next. 70285 decrements the first subject's R-No by 1 to remain consistent with 70266. Also, all ellipsis and non-clausal morphological words following the one or more replaced elements are set to their first alternative so that all possibilities are considered with the one or more replaced elements. 70285 also sets processing to continue at 70266 which is described above. If 70284 is false, 70286 is next, and is true if an indirect object was replaced. If 70286 is true, all main sentence roles which have been preprocessed are still valid because they precede the replaced indirect object and all succeeding main sentence roles have not been preprocessed, and processing is set to continue at 70152 which is described above. 70152 begins the preprocessing of the replaced indirect object. If 70286 is false, only the ellipted object of the clause was replaced, and processing is set to continue at 70302 which is described above. 70302 begins the preprocessing of the replaced direct object.

If 70282 is false, the ellipsis processing was not successful in replacing the ellipted elements, and 70288 is next. 70288 is true if there is a morphological word with an untried interpretation at a subject preceding the failing word sense number or at the failing word sense number. 70288 is not true for morphological word@. If 70288 is true, it may be possible to try a new word sense number for the failing word sense number after a different morphological interpretation has been made. If 70288 is true, 70289 sets RESTART to the restart address stored at the word with an untried alternate morphological interpretation nearest to the failing word sense number, and 70-Return is set to 70283 which is described above. After 70289, 70293 sets BASE to the base word of the morphological word at RESTART; P-Type is set to INVOCATION-RETURN; and 70293 calls MORPH [RESTART, P-Type, BASE, 70-Return]. 70293 sets up the next morphological interpretation to be considered for preliminary verb word sense selection processing. If 70288 is false, 70291 is next, and is true if the Current-Clause is implied by a morphological word@, and if the morphological word@ has another untried interpretation. If 70291 is true, 70292 sets 70-Return to 70101, sets RESTART to the address stored at the morphological word@, and sets the Current-Clause to be unpreprocessed. 70101 is described above. 70101 begins the preprocessing of the entire Current-Clause. After 70292, 70293 is next as described above. If 70291 is false, preprocessing has failed, and 70272 is next as above.

70268 is false if the first subject does not have a nonfinite verb clause, verbless clause and morphological word@ ellipsis restart address. If 70268 is false, there is a possibility of general ellipsis in the clause, and 70270 is next. 70270 is true if the Current-Clause has a general ellipsis restart address at a subject or verb preceding the failing word sense number or at the failing word sense number. If 70270 is true, 70271 sets 70-Return to 70282, and sets RESTART to the general ellipsis restart address nearest to the failing word sense number, and calls ELLIP[RESTART, 70-RETURN]. 70271 sets up the possibility of another possible set of word sense numbers for the failing word sense number. 70282 is next after general ellipsis processing as described above. If 70270 is false, preprocessing has failed, and 70272 is next as above. This completes the description of the preprocessing initiated through the DV or R invocation opcodes.

Implied Adverbial Processing

Implied Adverbial Processing is utilized for the case where certain modifiers of a clausal abstract noun or the adjective modified by a prepositional phrase are to be converted to adverbs which are tested for modifying a given verb word sense number. These cases were described above in the Prepositional Modification of Adjectives processing section and the Clausal Abstract Noun processing section. Implied adverbial processing is invoked when 7008 is true. 7008 is true if the current invocation opcode is ABS-MOD or ADJ-COMP-MOD. If 7008 is true, processing continues at 70400. 70400 sets up parameters for morphological processing. 70400 sets Cur-Mod to the next UNPREPROCESSED modifier in the invocation modification set; BASE is set to the base word of Cur-Mod; AFFIX is set to the affixes of Cur-Mod or NULL if there are none; SOURCE is set to the part of speech of BASE; DESTINATION is set to ADVERBIAL; 70-Return is set to 70402; P-Type is set to GENERATE; and 70400 calls MORPH[Cur-Nat-Lang, P-Type, BASE, AFFIX, SOURCE, DESTINATION, 70-Return]. As was described above for English, MORPH, the morphological processing component of Morphological Processing Step 24, attempts to generate an adverbial utilizing Cur-Mod as the base. After processing at MORPH, 70402 is next, and is true if the SDS position of Cur-Mod contains FAIL. If 70402 is true, 70404 is next. 70404 sets M-Find to false, and returns processing to the Caller. M-Find is an invocation parameter which is false if the Implied Adverbial Processing has failed, and M-Find is true if processing is successful. If 70402 is false, 70406 sets Cur-Mod to be PREPROCESSED. After 70406, 70408 is next, and is true if the invocation modification set contains an UNPREPROCESSED modifier. If 70408 is true, 70400 is next as above. If 70408 is false, all modifiers have been PREPROCESSED.

If 70408 is false, 70409 sets Cur-V-W-S to the word sense number of the invocation verb. Next, 70410 is true if the invocation modification set contains an UNPROCESSED modifier. If 70410 is false, processing has been successfully completed, and 70417 is next. 70417 sets up parameters for processing Conflicting Adverbial Sets. A Conflicting Adverbial Set has more than one adverbial which modifies the same modifiee word sense number, and each adverbial in this set has exactly the same adverbial semantic role, but has a different adverbial subclass value. For example, "The piston moved up and down." has a conflicting adverbial set containing {"up", "down"}. The conflicting set is processed by forming separate clauses. 70417 sets Verb-W-S to Cur-V-W-S for consistency with the conflicting adverbial process. 70-Back, the processing location which succeeds conflicting adverbial processing, is set to 70412. Finally, 70417 sets processing to continue at 70620 which begins conflicting adverbial processing. 70620 is true if Verb-W-S has a conflicting adverbial set modifying Verb-W-S. If 70620 is true 70622 forms new clauses to replace the current clause with conflicting adverbials such that each clause has the same constituents before conflicting adverbial processing except that no new clause has a conflicting adverbial. The new clauses are joined by the same conjunction joining the conflicting adverbials removed to form the new clause. If there is no conjunction joining the adverbials, the corresponding new clauses are joined with an "and" conjunction. After 70622, or if 70620 is false, 70624 sets processing to continue at 70-Back. In this case, 70-Back is 70412 which is next. 70412 sets M-Find to true, and returns processing control to the Caller.

If the invocation modification set contains an UNPROCESSED modifier, 70410 is true. If 70410 is true, 70414 sets Cur-Mod to the next UNPROCESSED modifier in the invocation modification set. An UNPROCESSED modifier has been converted to an adverb through morphological processing, but an UNPROCESSED modifier has not had one of its associated morphological function successfully evaluated. After 70414, 70416 is next, and is true if Cur-Mod has an unevaluated function type from MORPH. If 70416 is false, implied adverbial processing has failed, and 70404 is next as above. If 70416 is true, 70418 sets RESTART to the morphological restart address in Cur-Mod's SDS position; P-Type is set to INVOCATION-RETURN; BASE is set to the base word of Cur-Mod; 70-Return is set to 70420; and 70418 calls MORPH[RESTART, P-Type, BASE, 70-Return]. MORPH evaluates the morphological functions of the next unevaluated function type as described above for Morphological Processing Step 24 for English. MORPH will return a RESULT-TYPE, which is an ADDRESS-DESCRIPTOR, PHRASE, or CLAUSE, and a corresponding RESULT, which is a data structure corresponding to the RESULT-TYPE as was described above for Step 24. After MORPH 70420 is next, and is true if RESULT-TYPE equals ADDRESS-DESCRIPTOR. If 70420 is true, RESULT contains a pointer to a set of adverbial subclasses associated with Cur-Mod's transformation to an adverbial. If 70420 is true, 70422 is next, and determines if RESULT's associated adverbial subclasses match an adverbial subclass of the Cur-V-W-S. After 70422, 70424 is next, and is true if a match was found at 70422. If 70422 is false, 70416 is next as above. If 70424 is true, 70426 sets Cur-Mod to modify the invocation verb with the matched RESULT subclass, and sets processing to continue at 70410 as above.

If RESULT-TYPE does not equal ADDRESS-DESCRIPTOR, 70420 is false, and 70430 is next. 70430 is true if RESULT-TYPE equals PHRASE. If 70430 is true, the RESULT is a phrase of one or more words, and 70432 is next. 70432 is true if RESULT is a prepositional phrase. If 70432 is true, 70433 and 70434 set up a call to Selector 60. This call will cause 60 to try to select a word sense number of the prepositional complement of RESULT which meets at least one adverbial subclass's requirements for the preposition of RESULT as was described above for FIGS. 17*d*–17*jj*. If 70432 is true, 70433 sets the RESULT prepositional complement's R-No to 1, and its R-List[R-No] is set to NULL. After 70433, 70434 sets 70-Return to 70436; Current-Prep is set to the preposition of RESULT; Cur-Rel is set to NULL; SUBCLASS is set to NULL; I is set to 1; 60-Start is set to 60354; RES is set to PREP-COMP; ADV-Status is set to 70-FIND; and 70434 calls 60[Current-Prep, Cur-Rel, R-No, R-List[R-No], SUBCLASS, I, 60-Start, RES, ADV-Status]. After 60 selects a word sense number of the prepositional complement or fails, 70436 is next, and is true if RES equals found. If 70436 is false, the current morphological evaluation failed and, 70416 is next as above. If 70436 is true, the prepositional phrase of RESULT is processed for adverbial modification of Cur-V-W-S next at 70440. 70440 stores SUBCLASS, the set of subclasses which the prepositional complement's word sense number meets requirements for, at the prepositional complement of RESULT; Current-Adverbial is set to RESULT; Verb-Subclass is set to contain a pointer to the prepositional adverbial subclasses of Cur-V-W-S; 70-Return is set to 70460; and 70440 calls ADV[Cur-Nat-Lang, Current-Adverbial, Verb-Subclass, 70-Return].

The entry for the adverbial subclasses of a verb' word sense number which are used to select a subclass of a modifying adverbial is depicted in FIG. 19*e*. Verb-Subclass is set to a set of such entries at 70440 for example. The adverbial subclasses are partitioned for prepositional and adverb modifiers. An adverbial subclass entry contains an entry number, a specific semantic role, a source requirement, and value descriptors. The entry number identifies the entry for access. The semantic role is a label for the value which is set by the functions of the modifying adverbial subclass. As described above, the range of semantic roles are broadly: time, space, process, modality, (point of) reference, purpose, conjunction, verb word sense number selection, and degree. A specific semantic role indicates the specific aspect of a broad semantic role. The source requirement is one or more states, properties, parameters, and/or functions which the modifying adverbial subclass must satisfy. The value descriptors contains: a required value range for the value set by the functions of the modifying adverbial; a process application vector for each segment of the required value range; an optional value range translation function; and an optional pointer to purposes related to a value range. As was described above for FIG. 9*b* for English, the adverbial selection and evaluation process, ADV, selects the first adverbial subclass of a modifying adverbial which: has a matching semantic role with the modifiee, meets source requirements of the modifiee, and evaluates to an adverbial subclass value which meets a required value range of the modifiee. The semantic role, source requirements and value range of the modifiee are in an entry as depicted in FIG. 19*e* for a verb. As described above for adverbials, the optional value range translation function generates a numerical value for certain adverbials which do not have any associated numerical measure. The process application vector is used to select a process or type of the associated verb word sense number. A special symbol is used for a process application vector which selects any possible process. The optional pointer to a set of related purposes is used for an adverbial which implies purpose relations.

After processing has been completed at ADV, 70460 is next, and is true if RESULT is successfully processed at ADV, i.e., RESULT has an adverbial subclass which is compatible with a selecting adverbial subclass of Cur-V-W-S. If 70460 is true, the word sense number of the head of the prepositional complement noun phrase must be selected to match its subclass requirements at 60 as described above, 70464 is next. 70464 sets SUBCLASS to the adverbial subclass requirements of the subclass selected at ADV for the Current-Adverbial; 70-Return is set to 70466; 60-Start is set to 60354; RES is set to FOUND; ADV-Status is set to 70-FIND; and 70464 calls 60[Current-Prep, SUBCLASS, 60-Start, RES, 70-Return, ADV-Status]. 60 selects the word sense number for the complement, and returns processing to 70466 after completion. 70466 is true if the complement of RESULT is fully processed for its word sense number. If 70466 is true, processing continues at 70426 which sets RESULT to modify the invocation verb as above. If 70466 is false, or if 70460 is false, 70462 is next, and is true if the R-No of the prepositional complement of Result is less than its MAX. If 70462 is true, processing continues at 70434 which calls 60 to select a new word sense number for the prepositional complement of RESULT as above. If 70462 is false, 70470 is next, and is true if there are other untried adverbial subclass interpretations of Cur-Mod. If 70470 is true, 70472 is next, and sets up parameters for restarting ADV at the RESTART address stored at Cur-Mod by ADV previously. 70472 sets 70-Return to 70460, and calls ADV [RESTART, Current-Adverbial, Verb-Subclass, 70-Return]. After processing at ADV, 70460 is next as above. If 70470 is false, processing continues at 70416 as above.

If RESULT is not a prepositional adverbial, RESULT is an adverb phrase, and 70432 is false. If 70432 is false, 70442 is next, and sets up parameters for processing RESULT at ADV. 70442 sets the Current-Adverbial to RESULT; Verb-Subclass is set to the pointer to the adverb subclasses of Cur-V-W-S; 70-Return is set to 70444; and 70442 calls ADV[Cur-Nat-Lang, Current-Adverbial, Verb-Subclass, 70-Return]. After processing at ADV, 70444 is next, and is true if RESULT is successfully processed at ADV. If 70444 is true, 70426 is next as above. If 70444 is false, 70416 is next as above.

If the RESULT-TYPE does not equal PHRASE at 70430, RESULT-TYPE equals CLAUSE, and 70450 sets Cur-Clause to RESULT, P-Type is set PROCESS-CLAUSE; 70-Return is set to 70452, and 70450 calls 18[Cur-Nat-Lang, P-Type, Cur-Clause, 70-Return] to process the RESULT clause as has been discussed above for clauses in general. After processing initiated at 18 is successfully completed or fails, 70452 is next, and is true if RESULT has been successfully completed. If 70452 is true, 70454 sets RESULT to modify the invocation verb with the conjunction implied by RESULT, and sets processing to continue at 70410 as above. If 70452 is false, processing continues at 70416 as above. This completes the description of the Implied Adverbial Processing.

Clausal T-Relation Processing

Clausal T-Relation processing is utilized to determine if a T-Relation exists between two given clauses. The given clauses have been processed for word sense number selection prior to the starting of Clausal T-Relation processing. Step 18 invokes the Adjective Preposition Function Selection process for the adjective modified by a prepositional phrase with a clausal complement for example. This process is invoked at the Adjective Preposition Function Selection for English as described above. For English, a T-Relation between clauses can occur in a clause with an adjective modified by a prepositional phrase where: the preposition implies a T-Relation, and the subject and prepositional complement are clauses and/or clause equivalents. An example of a clausal T-Relation occurs in EX1: "For Jack to spend money is painful like for us to break a leg." Also, a clausal T-Relation can occur in a clause with an ellipted adjective as in EX2: "Sailing in the winter is like burning money during a cold shower." In this last example, the preposition "like" is equivalent to "similar to", and this is an adjective, "similar", modified by a preposition, "to". The ellipsis in this example is detected in Parsing Step 16, and the known replacement is made during Ellipsis Processing Step 26 as described above. A clausal T-Relation occurs between a source clause and a destination clause. A clausal T-Relation is similar to a T-Relation between concrete nouns in that there are aspects related to the source clause which are transferred to the destination clause with the relation between the source aspect and its corresponding destination aspect set by the function associated with the preposition modifying the adjective, or associated with the adjective in the case when the adjective does not have a state relation, e.g., "similar". As described above, a T-Relation between concrete nouns implies state and property values of the source concrete noun to be transferred to the destination concrete noun with the relation between the source value and its corresponding destination value typically set by the function associated with the preposition modifying (typically) the destination concrete noun. The aspects of the clausal T-Relation are described during the T-Relation process described next.

If the current invocation opcode is T-Rel at 7012, 7012 is true, and processing continues at 70500 which begins the processing of a clausal T-Relation. 70500 sets T-Desc to NULL; Re-ADV-S to false; when there are multiple T-Relations, 70500 separates each T-Relation into a sentence composed of the T-Relation, the source clause, and the destination clause with the sentences joined by the conjunction joining the words implying the T-Relations; and 70500 sets T-REL to the word implying the T-Relation of the first sentence. T-Desc contains the labeled clausal T-REL aspects and their addresses. These aspects are to be transferred, i.e., the destination aspect is set to have a relation to the source aspect. Re-ADV-S is true when the given word sense number of the verb in the source clause has been changed. When Re-ADV-S is true, the adverbials in the source clause must be selected to be compatible with the new word sense number. In EX1, the source clause is "for us to break a leg", and the destination clause is "For Jack to spend money". After 70500, 70502 is next, and is true if the stated or ellipted adjective modified by a prepositional phrase, or the equivalent word in the phrase implying the T-Relation in other natural languages, has a state representation. Adjectives typically have state representations, but some adjectives only have functions such as: "similar", "same", "different", etc. If 70502 is true, the adjective modified by a prepositional phrase is normally an adverbial which modifies the verbs in the source and destination clause as is in EX1. If 70502 is true, 70504 combines the adverbial subclasses of the source and destination clause verbs' word sense numbers which have the same semantic roles into Com-Sub. Com-Sub contains adverbial subclasses which have the same semantic role for both the source verb word sense number(s) and the destination verb word sense number (s). After 70504, 70506 is next, and is true if Comb-Sub is not empty, i.e., there are common adverbial subclasses. If 70506 is true, 70518 sets up parameters for calling the Implied Adverbial Processing of 70 as described above. 70518 sets the Invocation-Modification-Set to the adjective modified by a prepositional phrase or the equivalent word in the implication of T-REL; Invocation-Verb is set to the first source clause verb; Invocation-Verb-W-S-Subclass is set to contain a pointer to Com-Sub; Invocation-Opcode is set to ADJ-COMP-MOD; Caller-Return is set to 70520, and 70518 calls 70[Invocation-Opcode, Invocation-Modification-Set, Invocation-Verb, Invocation-Verb-W-S-Subclass, M-Find, Caller-Return]. For this invocation of the Implied Adverbial Processing, an adverbial subclass is selected to be compatible with respect to semantic roles of the adverbial subclasses of the verbs of the source and destination clause. Also, the adverbial subclass will meet the adverbial subclass requirements of the first source clause verb. In subsequent, processing described below, the selected adverbial subclass will be tested for meeting the adverbial subclass requirements of any other source clause verbs and of the destination clause verbs. If the selected subclass fails, another subclass will be selected in processing which is described below. In the Implied Adverbial Processing, M-Find is set to true if the adverbial subclass matches the first source clause verb's adverbial subclass requirements. Otherwise, M-Find is false, and another adverbial subclass must be selected.

After Implied Adverbial Processing, 70520 is next, and is true if M-Find is true. If M-Find is false, the selection of another adverbial subclass is required, and processing continues at 70508. 70508 is also next if 70506 is false which occurs when Com-Sub is empty. Another adverbial subclass is selected by considering other source and destination verb word sense numbers if there are any untried ones. As will be described below, when a verb is processed for final word sense number selection, all possible verb word sense numbers compatible with the main sentence roles are stored at the verb's SDS position. 70508 is true if the destination clause verbs have an untried combination of word sense numbers. If 70508 is true, 70510 sets the destination clause verbs to the next untried combination of verb word sense numbers, and the adverbials in the destination clause are set to UNPROCESSED. After 70510, 70504 is next as described above. If 70508 is false, 70512 is next and is true if the source clause verbs have an untried combination of word sense numbers. If 70512 is true, 70514 sets the source clause verbs to the next untried combination of verb word sense numbers; the adverbials in the source clause are set to UNPROCESSED; Re-ADV-S is set to true; the word sense numbers of the destination verbs are set to the initial combination of word sense numbers; all other verb word sense number combinations of destination clause verbs are set to untried; and 70514 sets the adverbials in the destination clause to PROCESSED. After 70514, 70504 is next as described above. If 70512 is false, all source and verb word sense number combinations have failed, and 70516 is next. 70516 appends the following to T-Desc: NEGATIVE-ADJ-TO-ADV-T-RELATION; the initial verb word sense numbers of the source and clause verbs are restored; and 70516 then sets processing to continue at 70560 which is described below. The symbol, NEGATIVE-ADJ-TO-ADV-T-RELATION, in the T-Desc implies that the adjective or equivalent word is intended not to be applicable as an adverbial modifying destination verbs as would occur in a contrary statement such as: "Working with Bill is hard like taking candy from a baby."

Note that a similar construction such as "Working with Bill is hard." has not been discussed before. Such constructions are processed as follows. The sentence role which is a clause or clause equivalent is processed as a separate clause by Step 18 as described for clauses in general above. Step 18 then calls Implied Adverbial Processing to determine if the adjective modifies the verb in the sentence role clause. If Implied Adverbial Processing fails, Step 18 calls Purpose Identifier 140 to determine if the adjective has a purpose relation to the clause sentence role. The purpose relation and the word sense number of the adjective are also selected by Purpose Identifier 140 as is described below. For example, "Working with Tom is painful." has a cause purpose relation between "Working with Tom" and the state abstract noun, "pain".

If M-Find is true at 70520 after Implied Adverbial Processing, processing continues at 70526. 70526 is true if Re-ADV-S is true or if there are multiple source clause verbs. 70526 is true for the case when the initial source clause verbs has been changed, i.e., Re-ADV-S is true, or is true when a source verb has not been checked to determine if the adverbial subclass of Cur-Mod, the adverbial converted from an adjective by Implied Adverbial Processing, meets subclass requirements of the unchecked verbs. This latter condition is true when there are multiple source clause verbs. If 70526 is true, 70528 is next, and sets C-Clause to the source clause. After 70528, 70530 sets up parameters for the unprocessed adverbials of C-Clause to be processed for Pre-Sel, the Pre-Selected Verb Word Sense Number Process of 70, which is described below. Pre-Sel selects adverbial subclasses to match verb adverbial subclasses of previously selected verb word sense numbers. 70530 assigns Cur-Mod to modify the C-Clause verbs; Cur-Mod is set to UNPROCESSED; Current-Sentence is set to C-Clause; Invo-Opcode is set to Pre-Selected-Word-Sense; Caller-Return is set to 70534; and 70530 calls 70[Invo-Opcode, Current-Sentence, C-Success, Caller-Return]. C-Success is the returned parameter which is true when Pre-Sel has succeeded in selecting compatible adverbial subclasses. After processing is completed at Pre-Sel, 70534 is next, and is true if C-Success is true. If 70534 is true, 70538 is next, and is true if C-Clause equals the source clause. If 70538 is true, or if 70526 is false, 70544 sets C-Clause to the destination clause. After 70544, 70530 is next as above. If 70534 is false, i.e., processing was unsuccessful at Pre-Sel, processing continues at 70508 which selects other possible verb word sense numbers as above.

If 70538 is false, both the source and destination clauses have been processed for all adverbials including Cur-Mod, and 70546 is next. 70546 is true if the Cur-Mod semantic role is a purpose. If 70546 is true, 70548 appends the following to T-Desc for each verb of the source clause: SOURCE-CUR-MOD-PURPOSE address. Each address appended at 70548 is to the purpose implied by the modification of Cur-Mod and associated with the word sense number of a verb of the source clause. The information appended to the T-Desc is used to select the information of the aspect to be transferred from the source to the destination. After 70548, 70550 is next, and is true if an appended address has an associated exceptional purpose information category. The exceptional information category contains a purpose which describes an unusual piece of information associated with a state representation such as: a state, an adverbial subclass, a clause, or a purpose. As described above, a purpose is one or more clauses which contain experience or knowledge. Purposes have a descriptor such as exceptional information. For example, in EX1, the source clause, "for us to break a leg", has "painfully" (after "painful" is converted to an adverbial) modifying "to break". In this case, "painfully" is in a purpose relation to "to break". The purpose relation is that the state, "painful", is a result state of "to break a leg". Associated with "painful" is the exceptional information in English: "The owner's state value is nearly extreme." This exceptional information is often intended in such English constructions, and is a plausible interpretation of the exaggerated degree of "pain" "For Jack to spend money". Note that "painful" is a morphological word with the state abstract noun, "pain" as a base word. The state associated with "painful" is the state associated with "pain". If 70550 is true, 70554 appends the following to succeed each address with an exceptional information category: PRECEDING-ADDRESS/EXCEPTIONAL-PURPOSE-INFORMATION. This symbol implies that the preceding address in T-Desc should have its exceptional information considered for transfer to the destination clause verb. If 70546 was false, Cur-Mod has a non-purpose adverbial subclass, and 70552 is next. 70552 appends the following to T-Desc for each verb of the source clause: SOURCE-CUR-MOD-ADVERBIAL-SUBCLASS address. Each address is to the verb's adverbial subclass implied by Cur-Mod. After 70552, 70550 is next as above.

After 70554, or if 70550 is false, processing of an implied adverbial in clausal T-Relation has been processed, and 70560 is next. 70560 also follows 70502 if 70502 is false which happens when an implied adverbial is not possible. 70560 is true if the source and destination clauses have one or more of the same result states associated with there respective verb word sense numbers. 70560 is true when a result state is to be emphasized in the clausal T-Relation. In EX2, "Sailing in the winter is like burning money during a cold shower." Both "sailing" and "burning money during a cold shower" have the result state "to spend money" and the result state of "becoming wet". If 70560 is true, 70562 appends the following to T-Desc for each common result state: COMMON-RESULT-STATE-EMPHASIS address. Each address is to a common result state of the source verb. After 70562, or if 70560 is false, 70564 is next, and is true if a result state has exceptional purpose information. If 70564 is true, 70566 appends the following at T-Desc to succeed each such result state: PRECEDING-ADDRESS/EXCEPTIONAL-PURPOSE-INFORMATION. After 70566, or if 70564 is false, 70568 is next, and is true if the source process has exceptional purpose information. In EX2, "burning money during a cold shower" has this exceptional purpose information for the process in English: "The process (to burn material in wet conditions) is very difficult". If 70568 is true. 70570 appends the following to T-Desc: SOURCE-PROCESS/EXCEPTIONAL-PURPOSE-INFORMATION address. The address is to the source process purpose address. After 70570, or if 70568 is false, 70572 is next, and is true if there are other aspects of Cur-Nat-Lang to consider for transferring. If 70572 is true, 70574 appends the labeled addresses of the other possible aspects to T-Desc. The applicability of the purpose aspects such as a Cur-Mod adverbial purpose or exceptional purpose information will be determined in Purpose Identifier 140. The applicability of a Cur-Mod adverbial is the setting of the destination Cur-Mod adverbial subclass value to a level which corresponds to the source Cur-Mod adverbial subclass value, and the applicability of Cur-Mod has already been checked at the process called at 70530. After 70574, or if 70572 is false, 70576 stores T-Desc at the word implying T-REL, and 70576 sets processing to continue at 70578. 70578 is true if there is another sentence formed at 70500 which has not been processed. If 70578 is true, 70580 sets T-REL to the T-Relation of the next unprocessed sentence; T-Desc is set to NULL; Re-ADV-S is set to false; and 70580 sets processing to continue at 70502 which is processed as above. If 70578 is false, processing is completed, and 70582 returns control to the caller. This completes the description of Clausal T-Relation Processing.

Completion of Verb Word Sense Number Selection
Possible Verb Word Sense Number Selection If the current invocation opcode is COMPLETION at 7016, 7016 is true, and processing continues at 70700. This verb word sense number completion process selects the possible verb word sense numbers of a clause. Also, this process also separates a stated clause with coordinated verbs and/or coordinated main sentence roles into separate clauses when necessary. After verb word sense number selection and any clause separation, Pre-Sel is started to select compatible adverbial subclasses, process mood, and select the possible processes of each verb word sense number, i.e., the possible type numbers are selected for each verb word sense number.

70700 starts the completion process by setting parameters for the process. 70700 sets CS, CSD, and MVS to zero. These preceding three variables are array variables for various arrays which store separated clauses, and they will be described below in greater detail. First, the main sentence role constituents are set up for the first AND-group of each main sentence role to be processed. As described above, an AND-group is the set of constituents joined by an "and" conjunction. 70700 sets VAG to the number of verbs in the invocation clause; AMB, a state variable which is true when a main sentence role phrase has multiple conjunctions, and a constituent in the phrase can be in more than one AND-group, and hence is ambiguous as described above for conjunctions, is set to false; Cur-Verb is set to the first verb of the invocation clause; V, the position of the Cur-Verb, is set to 1; Cur-S-AND is set to the first E-group of the invocation clause's subjects; S, the position of Cur-S-AND, is set to 1; SAG is set to the number of subject AND-groups; Cur-IO-AND is set to the first AND-group of indirect objects; IOAG is set to the number of indirect object AND-groups; IO is set to the MIN[IOAG,1]; Cur-DO-AND is set to the first AND-group of direct objects; DOAG is set to the number of direct object AND-groups; DO is set to the MIN[DOAG,1]; Pre-ADV is set to false; and 70700 sets Ellip-Clause-Comb to false. These last two Boolean variables are described below. The MIN[A, B] function is equal to the lowest numerical valued element from among A and B. After 70700, 70702 bit-wise ANDs the Boolean value for each of Cur-Verb's word sense numbers in the REQ terms of each constituent in Cur-S-AND, Cur-IO-AND, and Cur-DO-AND to form AND-Result-Vector. A constituent's REQ term for a particular verb word sense number has Boolean value of one if the constituent satisfied that REQ term and a Boolean value of zero otherwise. AND-Result-Vector contains a one in each position that a Cur-Verb word sense number's REQ term was satisfied by each main sentence role constituent in Cur-S-AND, Cur-IO-AND, and Cur-DO-AND. After 70702, 70704 is next, and is true if AND-Result-Vector is all zeroes, i.e., it is a zero vector. 70704 is true when no word sense number of Cur-Verb satisfies all the constituent REQ terms. If 70704 is true, 70706 is next, and is true if a main sentence role has an ambiguous constituent, i.e., the constituent can be in a different AND-group because of conjunction placement as described above. If 70706 is true, 70708 separates and removes each ambiguous constituent from its main sentence role AND-group; each removed constituent is identified and stored; and 70708 sets AMB to true. After 70708, 70702 ANDs the main sentence role AND-groups minus the ambiguous terms as described above.

If 70706 is false, i.e., there are no ambiguous main sentence roles, 70710 is next, and is true if AMB is true. If 70710 is true, there were ambiguous main sentence roles that were removed, but the AND-Result-Vector was all zeroes again at 70704. In this case, the ambiguous main sentence roles were not the cause of not finding a verb word sense number, and 70712 replaces the removed ambiguous main sentence roles, and sets AMB to false. After 70712, or if 70710 is false, 70714 is next, and is true if a hypothetical value for Cur-Verb is implied by mood, subordinate conjunction, etc. as described above in the Mood section. If 70714 is true, 70724 stores the symbol, @HYPO/NOT-POSSIBLE-NOW, at the SDS position of Cur-Verb. This symbol implies that the clause formed with the subject AND-group at S, the verb at V, the indirect object AND-group at IO, and direct object AND-group at DO is an acceptable interpretation only because it has a hypothetical value implied by a hypothetical indicator, a modal, or a modal adverbial. If 70714 is false, 70716 is next, and is true if Cur-Verb has a modal in its verb phrase. If 70716 is true, 70718 is next, and sets up parameters for evaluating the modal. 70718 sets 70-Return to 70720; Cur-Modal is set to the modal in the verb phrase; and 70718 and calls MODAL [Cur-Nat-Lang, Cur-Verb, Cur-Modal, 70-Return]. The modal process selects and sets the truth value implied by Cur-Modal as described above. After MODAL is completed, 70720 is next, and is true if truth value of Cur-Verb has been set to less than true. If 70720 is true, 70724 is next as above. If 70720 is false, or after 70724, processing continues at 70750 which begins a process of separating the main sentence role AND-groups into acceptable clauses. The process starting at 70750 is described below. If 70716 is false, i.e., there is not a modal in the verb phrase, 70717 is next, and is true if Cur-Verb is modified by an adverbial with a modal semantic role. If 70717 is true, 70719 sets up parameters for the modal adverbial to be evaluated. 70719 sets Current-Adverbial to the adverbial with a modal semantic role that modifies Cur-Verb; Pre-ADV is set to true; 70-Back is set to 70720; Verb-Subclass is set to the modal adverbial subclasses of the Cur-Verb; and 70719 sets processing to continue at 70844. Pre-ADV is set to true so that only the modal adverbial, Current-Adverbial, is evaluated at the process starting at 70844. The process starting at 70844 evaluates any form of adverbial, i.e., non-prepositional phrase, prepositional phrase and clause, and this process is described below. Also, when Pre-ADV is true, the adverbial evaluation process returns processing to 70-Back, 70720 in this case, upon completion. After adverbial evaluation, 70720 is next as above. If 70717 is false, i.e., there is no modal adverbial, processing continues at 70750 which is described below.

If 70704 is false, AND-Result-Vector has at least verb word sense number position that has all its main sentence roles meeting such a word sense number's REQ. Thus, there is at least one possible interpretation of these main sentence roles and Cur-Verb. If 70704 is false, 70734 is next, and is true if AMB is true. If 70734 is true, an interpretation was made possible by removing the ambiguous main sentence roles at 70708, and 70736 is next. 70736 bit-wise ANDs each removed constituent's REQ with AND-Result-Vector; the removed constituents' REQs that do not form a zero vector when bit-wise ANDed with AND-Result-Vector are replaced into their original respective main sentence role AND-groups because they are compatible with a possible interpretation; the removed constituents that form a zero vector when bit-wise ANDed with AND-Result-Vector are placed into their respective alternate main sentence role AND-groups because they are incompatible with a possible interpretation; conjunctions with ambiguous constituents in Cur-S-AND, Cur-IO-AND and Cur-D-AND are set to UNAMBIGUOUS; and 70736 sets AMB to false. After 70736, or if 70734 is false, 70738 sets Clause-M[S,V,IO,DO,1] to contain the symbol, @TRUE. This symbol implies that the clause formed with the subject AND-group at S, the verb at V, the indirect object AND-group at IO, and direct object AND-group at DO has at least one possible interpretation. The truth value of a clause with @TRUE is processed later as is described below. After 70738, 70726 is next. 70726 sets Clause-M[S,V, IO,DO,2] to contain AND-Result-Vector, and 70726 stores the In-Clause symbol at the SDS position of each main sentence role in S, IO, and DO. This In-Clause symbol indicates that a main sentence role is in at least one clause of the sentence. After 70726, 70728 is next, and is true if the vector, [S, V, IO, DO], equals the vector, [SAG, VAG, IOAG, DOAG]. If 70728 is true, all the clauses that can be formed with the main sentence role AND-groups have been processed, processing continues at 70800, which begins the Pre-Sel process which is described below. If 70728 is false, 70730 selects the next untried combination of main sentence role AND-groups and verb; S, V, IO, DO are set to the value corresponding to the selected combination; and 70730 reassigns Cur-S-AND, Cur-Verb, Cur-IO-AND, and Cur-DO-AND as needed for the selected combination. After 70730, 70702 is next as above.

Clause Separation Processing

Clause Separation Processing begins at 70750. This processing is invoked because a possible verb word sense number was not selected in the above process. In this case, it always possible to separate the constituents in one or more main sentence role groups into a separate clause such that a possible verb word sense number can be selected with the separated main sentence role constituents. Separation is equivalent to assigning a different word sense number to the stated verb for each separated clause. Separation is possible because there must be at least one main sentence role with multiple constituents, and there is at least one verb word sense number that can be selected for the separated clause because of the way the REQ terms were formed at 70362 and 70374. Otherwise, if each main sentence role had only one constituent, or there was not at least one verb word sense number possible for a separated clause, a possible verb word sense number would not have been selected, and this COMPLETION process would never be reached because no compatible word sense number would have been selected at 60 for a main sentence role. However, even though a separated clause can be formed, it is possible that a constituent in a coordinated sentence role can not be contained in a clause. This separation approach is taken because each main sentence role constituent word sense number was selected for the most likely word sense number at 60 because of the method of forming R-Lists. Thus, the separated clause deserves consideration for purpose identification because it is the most likely interpretation. Also, even if a constituent does not belong to a clause, this may still be the intended interpretation.

Separation is a possible interpretation because the source of the sentence could have used ellipsis to form the sentence as in: "John and Mary had a baby." In this example "had" has two word senses, and the equivalent clauses are: "John is the father of a baby, and Mary bore a baby." There is a possible problem with this separation process: it is possible that a main sentence role constituent is not included in any separated clause. This possibility is checked for, and processed by first attempting to select a new word sense number for such a constituent. If a new word sense number is not selected, the constituent is assumed to be an incorrect or an unknown usage, and purpose identification is performed. In this situation, the Communication Manager has these options: rejecting the interpretation after purpose identification, requesting information about such a constituent, or let the assumption about improper or unknown usage be clarified later, etc. There is one other possibility for a main sentence role which does not have its word sense number selected. If an entire AND-group in a main sentence role, which has an OR-group with constituents with selected word sense numbers, does not have its word sense numbers selected, the verbs of the clauses containing such an AND-group are set to have a negative truth value. The negative truth value is set because when main sentence role AND-groups are ORed, only one AND-group is logically required to be true. For example, consider the statement: "John or Mary went to Dallas today.", and assume that the context is "Mary is in Chicago today." The statement is true even though only "John" can make the statement true, and "Mary" could not perform the statement, given her location. Thus, the separated clause with "Mary" is equivalent to: "Mary did not go to Dallas today." In this case, when an entire AND-group fails to have its word sense numbers selected, the constituents are assumed to be an impossible OR-group constituent. The separation process is described in this section. The word sense number reselection process is described in the Pre-Selected Word Sense Number section.

70750 begins the Clause Separation Process. The separation first determines which main sentence role constituents are causing the AND-Result-Vector to be zero. First, the possibility of only a single main sentence AND-group having constituents which zero AND-Result-Vector is checked. Then each constituent of such a single main sentence role AND-group is used to attempt to form a separate clause with all other constituents. If this possibility does not occur, the clause is separated into one clause for each direct object constituent in Cur-DO-AND preferring the respective position assignment of other main sentence roles first. Because of the forming REQ terms for direct objects, there is a clause for each verb of a direct object. Thus, the maximum number of clauses containing the maximum number of other main sentence role constituents is formed by separating clauses by the direct objects in Cur-DO-AND. If the possibility of only a single main sentence AND-group having constituents which zero AND-Result-Vector fails for some of the constituents of that single main sentence role AND-group, such failing constituents are used to form separate clauses as described for Cur-DO-AND constituents.

70750 sets Ellip-Clause-Comb to true which implies that clause separation has been performed. After 70750, a process is begun at 70752 to determine if one sentence role is causing the need for separate clauses. 70752 is true if Cur-DO-AND has more than one direct object. If 70752 is true, Cur-DO-AND constituents could be used to form separate clauses, and 70754 is next. 70754 sets Clause-Sep to Cur-DO-AND, and sets Next-S-R to 70756. After 70754, 70766 is next, and sets Result-V to the bitwise AND of the Boolean value of all REQ terms of Cur-Verb for all main sentence role constituents except for those in Clause-Sep. After 70766, 70768 is next, and is true if Result-V is all zeroes. If 70768 is true, all the main sentence role constituents except for those in Clause-Sep do not combine to form a clause with any constituent of Clause-Sep, and thus, Clause-Sep is not causing the need for separate clauses by itself. If 70768 is true, 70770 sets processing to continue at Next-S-R. At this point of this description, Next-S-R is 70756. Also, if 70752 is false because Cur-DO-AND has only one constituent, and thus must be in any possible separated clause, the next possible AND-group tried is an indirect object AND-group starting at 70756. 70756 is true if Cur-IO-AND has more than one indirect object. If 70756 is true, 70758 sets Clause-Sep to Cur-IO-AND, and sets Next-S-R to 70760. After 70758, 70766 is next as described above. If 70756 is false, or if 70768 is false with Next-S-R equal to 70760, 70760 is next, and is true if Cur-S-AND has more than one subject. If 70760 is true, 70762 sets Clause-Sep to Cur-S-AND, and sets Next-S-R to 70764. After 70762, 70766 is next as described above.

After 70754, 70758, or 70762, 70766 computes Result-V as described above, and 70768 is next. If 70768 is false, all the main sentence role constituents except for those in Clause-Sep may combine to form a clause with one or more constituents of Clause-Sep, and 70772 is next. 70772 forms separate clauses with all main sentence role constituents except that only one constituent in Clause-Sep is used in a separate clause. 70772 first individually bitwise ANDs the Cur-Verb REQ terms of each constituent in Clause-Sep with Result-V to form a Match-V for each constituent. A non-zero Match-V of a Clause-Sep constituent can form a separate clause. 70772 stores non-zero Match-V and the associated Clause-Sep constituent positions at Hit-M. Also, a zero is stored at each such constituent's position in Mis-V. A one is stored at the Mis-V position of a Clause-Sep constituent with a zero Match-V. After 70772, 70774 is next, and is true if Mis-V is all zeroes. If 70774 is true, each Clause-Sep constituent formed a separate clause. If 70774 is false, some constituents in the current clause will not be in all separated clauses. In this case, a separate clause formation policy is performed to form intended clauses. A general purpose separate clause formation policy is described next starting at 70776.

If 70760 is false, or if Next-S-R equals 70764 at 70770, no separate clause with all the constituents in the current clause plus one constituent in Clause-Sep can be formed, and 70764 is next. 70764 sets Mis-V to have a length equal to the number of constituents in Cur-DO-AND with a 1 at each position corresponding to a constituent of Cur-DO-AND, and 70764 sets Hit-M, with the same length as Mis-V, to all zeroes. 70764 sets up variables for forming separate clauses with at least one constituent in the subject, indirect object and direct object AND-groups. After 70764, or if 70774 is false, 70776 is next, and 70776 implements a general purpose separate clause formation policy. 70776 performs the following for each constituent in Clause-Sep with a one in Mis-V: such a current Clause-Sep constituent's Cur-Verb REQ terms are bitwise ANDed with all other main sentence role constituents' Cur-Verb REQ terms to form a result vector, M-V. However, the constituents' REQ terms are selected according to the following policy. For the first component of the policy, only one constituent from each main sentence role is selected for ANDing to form a possible clause, i.e., an ANDing which results in a non-zero M-V, before multiple constituents in a single main sentence role are ANDed, and constituents are first selected according to the respective position of the current constituent in Mis-V. For example, if the current Clause-Sep constituent in Mis-V is in the first position of its main sentence role, the constituents in the first position of the other main sentence roles are selected for ANDing. If a respective position for other main sentence roles does not exist, or has been ANDed and zeroed M-V, the next position of such a main sentence role, if any, is selected for ANDing. For the second component of this policy, a selected constituent is not bitwise ANDed with the current M-V if the resulting M-V value is all zeroes except for the following condition. A resulting M-V is set to all zeroes if all sentence role constituents of a particular type, i.e., subject, indirect object, or direct object, zero a resulting M-V. This policy realizes a general purpose separate clause formation policy. The respective sentence role positions are selected for the formed clauses because the source could have intended respectively formed clauses, but the source ellipted the respective indicating adverbial. Non-respective sentence role positions are included in the formed clauses because the source could have utilized a new word sense number or new special usage for a particular constituent. The respective case is possibly distinguished during plausibility processing at Purpose Identifier 140 processing which is described below. The respective case is distinguished if non-respective constituents are not plausible in their sentence roles. Also, an alternate separate clause formation policy can be selected for an application.

70776 also forms a M-SR-V for each constituent in Mis-V with a non-zero M-V. An M-SR-V is set to contain a one at each position of a main sentence role which was ANDed to form M-V. A M-SR-V is set to contain a zero at each position of a main sentence role which was not ANDed to form M-V. After all constituents with a one in Mis-V are processed at 70776, 70778 is next. 70778 stores the separated clauses formed at 70776. 70778 sets Mis-V-Start to be MVS; for each constituent in Mis-V with a non-zero M-V: Mis-V-M [MVS,0] is set to the sentence role type forming Mis-V; Mis-V-M[MVS,1] is set to the M-V of the current constituent; Mis-V-M[MVS,2] is set to M-SR-V of the current constituent; In-Clause is stored at the SDS position of each constituent with a one at its M-SR-V position; MVS is incremented by one, and the next constituent in Mis-V with a non-zero M-V is processed if any. After all such constituents have been processed, 70778 sets N-Mis to the number of such constituents processed which is equivalent to the number of separated clauses that were formed. After 70776, processing continues at 70780 as described above.

If 70774 is true, each Clause-Sep constituent formed a separate clause. If 70774 is true, or after 70776, 70780 stores all separate clauses represented in Hit-M. 70780 sets Clause-Sep-Start to be CS; for each constituent in Clause-Sep which is in Hit-M: store In-Clause at the Clause-Sep constituent's SDS position; Clause-Sep-M[CS,0] is set to the type of main sentence role in Clause-Sep, Clause-Sep-M[CS,1] is set to the current constituents Match-V; Clause-Sep-M[CS,2] is set to the current constituent's position in Clause-Sep; and CS is incremented by 1, and this process is repeated for the next constituent in Hit-M if any. After all the Clause-Sep constituents in Hit-M have been processed for storage in Clause-Sep-M, 70780 sets N-Mat to the number of constituents stored in Hit-M which is equivalent to the number of separate clauses formed with all main sentence role constituents except that there is only one Clause-Sep constituent. After 70780, 70782 is next, and is true if N-Mat is greater than zero. If 70782 is true, 70786 stores In-Clause at the SDS position of each main sentence role in the S, IO, and DO AND-groups except for the Clause-Sep AND-group. After 70786, or if 70782 is false, 70784 is next. 70784 stores a record of the number of clauses formed at 70780 and at 70778. 70784 sets C-Sep-D[CSD,0] to Clause-Sep-Start; C-Sep-D[CSD,1] is set to N-Mat; C-Sep-D[CSD,2] is set to Mis-V-Start; C-Sep-D[CSD,3] is set to N-Mis; Clause-M[S, V, IO, DO, 1] is set to the symbol @CLAUSE-SEPARATION; Clause-M[S, V, IO, D0, 2] is set to CSD; CSD is incremented by 1; and 70784 sets processing to continue at 70728 which selects the next constituents to be processed as described above. 70782 stores the information needed to access the separated clauses. 70784 is the last step in the Clause Separation Processing. This completes the description of Clause Separation Processing.

Verb Phrase Processing for a Verb Word Sense Number

Initial Verb Word Sense Number Selection

Verb phrase processing for verb word sense number selection assumes that the possible verb word sense numbers have been selected for a clause as was described in the previous section for example, or assumes that the verb word sense number has been pre-selected as would occur for idioms or the repeating of a previously stated clause for example. After the possible verb word sense numbers have been selected by the Possible Verb Word Sense Number Process for an invocation sentence, 70728 is false, and 70732 sets processing to continue at 70800, which begins the verb phrase processing for a verb word sense number. 70800 is also next if the invocation opcode equals PRE-SELECTED-WORD-SENSE at 7020, and then processing continues at 70800. The process starting at 70800 has been called Pre-Sel above. Verb phrase processing selects compatible adverbial subclasses, processes ellipted indirect objects, processes mood, and selects the possible processes of each verb word sense number, i.e., the verb word sense number types. 70800 sets up parameters for this processing: Cur-Verb is set to the first verb of the sentence; and 70800 sets C-SUCCESS, which is true when this process has been completed successfully, is set to false.

After 70800, 70802 is next, and is true if the clause containing Cur-Verb has a pre-selected verb word sense number. If 70802 is false, the first possible word sense number must be selected, and 70804 is next. 70804 is true if Cur-Verb has more than one Clause-M row with AND-Result-Vectors. Cur-Verb has multiple Clause-M rows with AND-Result-Vectors when Cur-Verb has multiple combinations of main sentence roles with non-zero AND-Result-Vectors after 70702 because one or more main sentence roles have more than one AND-group. After 70804, 70805 is next, and is true if all the Clause-M rows of Cur-Verb with AND-Result-Vectors are unprocessed. In this case, the first possibility checked is that each main sentence role combination of Cur-Verb with non-zero AND-Result-Vectors has the same Cur-Verb word sense number. If 70805 is true, 70806 ANDs the non-zero AND-Result-Vector's of Clause-M rows of Cur-Verb to form Cur-Result-V. Each row ANDed at 70806 has the first column of its row with a value of @TRUE i.e., a row with a non-zero AND-Result-Vector in column 2. After 70806, 70808 is next, and is true if Cur-Result-V is non-zero. If 70808 is true, the main sentence role combinations of Cur-Verb have one or more common verb word sense numbers, and 70810 is next. 70810 sets all Clause-M rows just ANDed at 70806 to PROCESSED, and stores @COMBINED at the SDS position of Cur-Verb.

If 70804 or 70805 or 70808 is false, 70812 is next. If 70804 is false, there is an unprocessed clause. If 70805 is false, there are more than one Clause-M rows for Cur-Verb that have an AND-Result-Vector, and Cur-Verb's combinations had a zero Cur-Result-V during a previous invocation of the initial verb sense number selection process. If 70808 is false, Cur-Result-V is a zero vector. The first condition occurs if there is a single unprocessed clause of Cur-Verb with an AND-Result-Vector, and/or there are one or more unprocessed clauses with @SEPARATION. For this first condition, if Cur-Verb has more than one clause, each is being separately processed because all the clauses could not have a single verb word sense number. Otherwise, the single clause is processed separately. If 70812 is next, and in all but the condition that Cur-Verb has a single clause, Cur-Result-V for a combination of main sentence roles of Cur-Verb is zero, and the assumption is made that Cur-Verb is ellipted in the sense that each of Cur-Verb's main sentence role combinations requires a copy of Cur-Verb because the single stated Cur-Verb has more than one word sense number. This assumption is made because the current interpretations of main sentence roles are the most likely ones as described above. This assumption implies that each combination of main sentence roles of Cur-Verb is processed separately, and this process begins at 70812. 70812 is true if Clause-M has an UNPROCESSED row of Cur-Verb with an AND-Result-Vector, i.e., a row without @CLAUSE-SEPARATION at its column 2. If 70812 is true, 70814 sets Cur-Result-V to the AND-Result-Vector of the next UNPROCESSED row of Clause-M, and sets this row to PROCESSED. Other main sentence role combinations of Cur-Verb, if any, are processed after the current sentence role combination is completely processed for verb word sense number selection as is described below. If 70812 is false, 70818 sets Cur-Result-V to the next UNPROCESSED separated clause's Match-V or M-V of the next UNPROCESSED Clause-M row with @CLAUSE-SEPARATION at its column 2, and sets this separated clause to PROCESSED, and if this is the last separated clause of the row, the row is also set to PROCESSED. If the clause containing Cur-Verb has a pre-selected word sense number at 70802, 70802 is true, and 70836 sets Cur-Result-V to the pre-selected word sense number of Cur-Verb in the next UNPROCESSED clause of the invocation sentence. After 70836, 70818, 70814, or 70810, 70830 sets Verb-W-S to the first word sense number of Cur-Result-V. This completes Initial Verb Word Sense Number Selection.

Adverbial Selection for a Verb Word Sense Number

Adverbial Selection for a Verb Word Sense Number begins at 70831. After initial word sense number selection is completed at 70830, 70831 is next. 70831 sets up processing for coordinated adverbials. 70831 sets 70-Back to 70840, and sets processing to continue at 70600. 70600 is true if the UNPROCESSED adverbials modifying the verb of Verb-W-S are coordinated. If 70600 is true, 70602 sets up parameters for conjunction processing. 70602 sets Cur-Conj-Set to the SDS positions of the conjunctions of the Verb-W-S adverbials; 70-Return is set to 70604; and 70602 calls CONJ[Cur-Nat-Lang, Cur-Conj-Set, 70-Return]. After processing at CONJ, 70604 is next. 70604 computes the sum of products of the multi-level conjunctions joining adverbials as described for coordinated modifiees in FIGS. 17*d*–17*jj*. 70604 also forms an additional copy of the Verb-W-S clause for each "OR" conjunction in the sum of products including the generation of a Clause-M row(s); an AND-group of adverbials is assigned to the original and copied clauses' verb word sense numbers; and 70604 sets processing to continue at 70-Back. If 70600 is false, 70606 also sets processing to continue at 70-Back, which is 70840 in this case.

70840 is next, and is true if the clause used to form Cur-Result-V has an UNPROCESSED adverbial. If 70840 is false, 70841 stores the following at Cur-Verb's SDS position: Cur-Result-V, Verb-W-S, and a descriptor of the Verb-W-S clause. The descriptor contains the Clause-M row(s) and/or the Clause-Sep-M row or the Mis-V-M row. 70841 also sets Cur-Clause to be the clause associated with Cur-Result-V of Cur-Verb's Verb-W-S. Finally, 70841 sets processing to continue at 70910 which processes sentence roles which have not been included in the clause associated with Cur-Result-V. The process starting at 70910 is described below in the Unassigned Sentence Role section. If 70840 is true, 70842 sets Current-Adverbial to the next unprocessed adverbial of Cur-Verb for Cur-Result-V. After 70842, 70844 is next, and is true if the Current-Adverbial is a prepositional phrase. If 70844 is true, 70845 is next, and is true if the SDS position of the preposition of Current-Adverbial has PREPROC-VERB. If 70845 is true, the subclasses for Current-Adverbial have already been selected as described above, and 70850 is next as described below. If 70845 is false, 70846 sets up parameters for Selector 60 to select a set of subclasses which are possible for the prepositional phrase and its complement as described at 60. 70846 sets 70-Return to 70848; Current-Prep is set to the preposition of the Current-Adverbial, Cur-Rel is set to NULL; the Current-Adverbial prepositional complement's R-No is set to 1; R-List[R-No] is set to NULL; SUBCLASS is set to NULL; I is set to 1; 60-Start is set to 60354; RES is set to PREP-COMP; ADV-Status is set to 70-FIND; and 70846 calls 60[Current-Prep, Cur-Rel, R-No, R-List[R-No], SUBCLASS, I, 60-Start, RES, ADV-Status].

After 60 selects a word sense number of the prepositional complement or fails, 70848 is next, and is true if RES equals FOUND. If 70848 is false, the current prepositional phrase evaluation failed and, 70856 is next, and is true if Pre-ADV is true. For example, Pre-ADV is true when 70719 requests this adverbial evaluation selection process to determine if an adverbial is a modal modifying a verb as described above. If 70856 is true, the process has failed, and 70857 sets Pre-ADV to false, and sets processing to continue at 70-Back. If 70856 is false, the Current-Adverbial's preposition does not have a known relation for a known word sense number of the prepositional complement, and 70858 informs the Communication Manager of an adverbial preposition processing error for the Current-Adverbial. If 70848 is true, the Current-Adverbial prepositional phrase is processed for selecting adverbial subclasses which are compatible with Current-Adverbial's preposition and prepositional complement, and 70850 is next. 70850 sets Verb-Subclass to the prepositional subclasses of Cur-Verb except when Pre-ADV is true, or when the Current-Adverbial modifies an adverbial. If Pre-ADV is true, or if Current-Adverbial modifies an adverbial, Verb-Subclass has already been set. 70850 also stores Verb-Subclass at the SDS position of the complement of the Current-Adverbial. If 70844 is false, i.e., the Current-Adverbial is not a prepositional phrase, 70851 is next, and is true if the Current-Adverbial is a clause. If 70851 is true, processing continues at 70895 which is described below. If 78051 is false, the Current-Adverbial is an adverb, and 70852 sets Verb-Subclass to the adverb subclasses of Cur-Verb except when Pre-ADV is true, or when the Current-Adverbial modifies an adverbial. If Pre-ADV is true, or if the Current-Adverbial modifies an adverbial, Verb-Subclass has already been set. 70852 also stores Verb-Subclass at the SDS position of the complement of the Current-Adverbial. After 70850 or 70852, 70854 processing continues at 70860.

After the verb subclasses have been selected, and after adverbial subclasses have been selected for a preposition and its complement at 60, the next step of adverbial processing is performed at 70860. 70860 sets up parameters for ADV to select an adverbial subclass which is compatible with a verb subclass in Verb-Subclass as described above for English for example. 70860 sets 70-Return to 70862, and calls ADV[Cur-Nat-Lang, Current-Adverbial, Verb-Subclass, 70-Return]. After processing at ADV, 70862 is next, and is true if the Current-Adverbial is successfully processed at ADV. If 70862 is true, 70864 is next and is true if Current-Adverbial is a prepositional phrase. If 70864 is false, adverbial processing is completed, and 70868 is next.

70868 sets the Current-Adverbial to be PROCESSED, and sets processing to continue at 70630. 70630 begins the processing of adverbials modifying other adverbials. 70630 sets T-Cur-Adverbial to be the Current-Adverbial. After 70630, 70634 is next, and is true if T-Cur-Adverbial is modified by an UNPROCESSED adverbial. If 70634 is true, 70636 sets Verb-Subclass to the adverbial modification subclasses of T-Cur-Adverbial; the Current-Adverbial is set to the next UNPROCESSED adverbial modifying T-Cur-Adverbial; and 70636 sets processing to continue at 70844 which is described above. 70636 sets up parameters for the adverbial modifier of T-Cur-Adverbial to be processed utilizing the adverbial process described above for adverbials modifying verbs. However, as described in the adverbial processing section, adverbial modifiers are processed with the same process regardless of their modifiees. The different type of modifiee does select the possible adverbial modification subclasses, i.e., Verb-Subclass. In English, only degree adverbials can modify an adverb, and this restriction further selects the possible adverbial modification subclasses. If 70634 is false, there is no unprocessed adverbial modifying an adverbial, and processing continues at 70838. 70838 is true if Pre-ADV is true. If 70838 is true, 70839 sets Pre-ADV to false, and sets processing to continue at 70-Back. If 70838 is false, 70840 begins the processing of the next adverbial, if any, as described above.

If 70864 is true, the Current-Adverbial is a prepositional phrase, and 70866 sets up parameters for Selector 60 to select the word sense number of the head of the prepositional complement noun phrase of the Current-Adverbial to match its subclass requirements as described above. 70866 sets SUBCLASS to the adverbial subclass requirements of the subclass selected at ADV for the Current-Adverbial; 70-Return is set to 70870; 60-Start is set to 60354; RES is set to FOUND; ADV-Status is set to 70-FIND; and 70866 calls 60[Current-Adverbial, SUBCLASS, 60-Start, RES, 70-Return, ADV-Status]. 60 selects the word sense number for the complement, and returns processing to 70870 after completion. 70870 is true if the complement of the Current-Adverbial is fully processed for its word sense number. If 70870 is true, processing continues at 70868 as is described above. If 70870 is false, 70882 is next. In another path leading to 70882, if 70862 is false, i.e., because the Current-Adverbial was unsuccessfully processed at ADV, 70880 is next, and is true if the Current-Adverbial is a prepositional phrase. If 70880 is true, or if 70870 is false, 70882 is next, and is true if the R-No of the prepositional complement of the Current-Adverbial is less than MAX. If 70882 is true, 70884 sets up parameters for 60 to find adverbial subclasses starting at the next possible word sense number of the prepositional complement of the Current-Adverbial. 70884 sets 70-Return to 70848; Cur-Rel is set to NULL; SUBCLASS is set to NULL; I is set to 1; 60-Start is set to 60354; RES is set to PREP-COMP; ADV-Status is set to 70-FIND; and 70884 calls 60[Current-Prep, Cur-Rel, R-No, R-List[R-No], SUBCLASS, I, 60-Start, RES, ADV-Status]. After 60 selects a word sense number of the prepositional complement or fails, 70848 is next, as described above. Note that 70884 is similar to 70846, but 70884 leaves Current-Prep, R-No, and R-List[R-No] at their current values so that the next possible word sense number of the complement is processed. If 70882 is false, 70874 is next, and is true if there are other adverbial interpretations of the preposition for the adverbial subclasses of the complement selected at 60. If 70874 is true, 70876 sets 70-Return to 70862, and restarts ADV[RESTART, Current-Adverbial, Verb-Subclass, 70-Return]. 70876 restarts ADV and 70862 is next as above after ADV is completed.

If 70880 is false, the Current-Adverbial is an adverb which does not have a known adverbial relation to Cur-Verb's Verb-W-S. If 70874 is false, the Current-Adverbial is a prepositional phrase which does not have a known adverbial relation to Cur-Verb's Verb-W-S. If 70880 is false, or if 70874 is false, there are possible elliptical, morphological, or alternate Cur-Verb word sense number possibilities for processing the Current-Adverbial starting at 70886. 70886 is true if the Current-Adverbial has an Ellipsis RESTART address at its SDS position. If 70886 is true, 70887 sets 70-Return to 70888, sets RESTART to the ellipsis restart address at the Current-Adverbial's SDS position, and calls ellipsis processing for the current natural language at ELLIP [RESTART, 70-Return]. After processing at ELLIPSIS, 70888 is next, and is false if RES-STATUS does not equal FAILURE. If 70888 is false, processing continues at 70840 which begins processing the next UNPROCESSED adverbial as described above, which is the new ellipsis replacement in this case. If 70888 is false, or if 70886 is false, 70890 is next, and is true if the Current-Adverbial is morphologically formed and has an alternate morphological interpretation. If 70890 is true, 70891 sets up parameters for the evaluation of the next interpretation. 70891 sets RESTART to the morphological restart address in Current-Adverbial's SDS position; P-Type is set to INVOCATION-RETURN; BASE is set to the base word of the Current-Adverbial; 70-Return is set to 70893; and 70891 calls MORPH[RESTART, P-Type, BASE, 70-Return]. MORPH evaluates the morphological functions of the next unevaluated function type as described above for Morphological Processing Step 24 for English. MORPH will return a RESULT-TYPE, which is an ADDRESS-DESCRIPTOR, PHRASE, or CLAUSE. and a corresponding RESULT. After processing at MORPH, 70893 is next, and is true if RESULT-TYPE is a clause. If 70893 is false, 70894 sets the Current-Adverbial to RESULT, and sets processing of the adverb or adverbial prepositional phrase to continue at 70844 as above. If 70893 is true, or if 70851 is true, 70895 sets the Current-Adverbial to be the RESULT. After 70895, 70896 sets up parameters for Step 18 to process the Current-Adverbial clause. 70896 sets Cur-Clause to the Current-Adverbial; P-Type is set PROCESS-CLAUSE; 70-Return is set to 70897, and 70896 calls 18[Cur-Nat-Lang, P-Type, Cur-Clause, 70-Return] to process the Current-Adverbial clause as has been discussed above for clauses in general. After processing at 18 is successfully completed or fails, 70897 is next, and is true if the processing of the Current-Adverbial clause has been successfully completed. If 70897 is true, 70898 sets the Current-Adverbial clause to modify the clause of Cur-Result-V through the conjunction implied by the Current-Adverbial and sets processing to continue at 70868 as above. If 70897 is false, processing continues at 70886 as above.

If the Current-Adverbial is not morphologically formed or does not have an alternate morphological interpretation, 70890 is false, and processing continues at 70610. 70610 determines if there is an alternate modifiee for the Current-Adverbial. 70610 is true if the Current-Adverbial is an AMBIGUOUS coordinated modifier. As described above in the Constituent Conjunction Processing section, in certain cases a coordinated constituent modifier can be in one of two groups of modifiers. Here the assumption is that since the Current-Adverbial failed to modify the current word sense number of the current modifiee, possibly the Current-Adverbial will modify a different word sense number of the current modifiee. If 70610 is true, 70612 sets the Current-Adverbial to be an UNAMBIGUOUS modifier; all modifiers of the Current-Adverbial are set to UNPROCESSED; all elliptical and/or morphological alternatives are set to untried; the Current-Adverbial is assigned to modify the alternate word sense number of the current modifiee; and 70612 sets processing to continue at 70838. If 70610 is false, processing continues at 70900.

When 70900 has been reached, the Current-Adverbial does not have a known modification relation to its modifiee. 70900 is true if Pre-ADV is true. If 70900 is true, 70901 sets Pre-ADV to false, and sets processing to continue at 70-Back; If 70900 is false, 70903 is next, and is true if the Current-Adverbial modifies Cur-Verb. If 70903 is true, the Current-Adverbial may modify a different word sense number of Cur-Verb, and 70904 is next. 70904 is true if Cur-Result-V has an UNTRIED verb word sense number. If 70904 is true, 70908 sets Verb-W-S to TRIED at Cur-Result-V and at AND-Result-Vector; Verb-W-S is set to the next UNTRIED word sense number in Cur-Result-V; all the adverbials modifying Cur-Verb are set to UNPROCESSED; and 70908 sets processing to continue at 70842 which is processed as described above. If 70904 is false, 70905 is next, and is true if the Cur-Verb word sense number of Cur-Result-V has @COMBINED at the SDS position of Cur-Verb. 70905 is true when Cur-Result-V was formed for the combination of all main sentence role combinations of Cur-Verb, i.e., Cur-Result-V was formed with the assumption that each main sentence role combination of Cur-Verb has the same Cur-Verb word sense number. When 70905 is true, this assumption may be false, and 70906 is next. 70906 sets all Clause-M rows of Cur-Verb with an @TRUE or @HYPO/NOT-POSSIBLE-NOW in column 1 of such a row to UNPROCESSED, and sets processing to continue at 70814 as described above. Setting these rows to unprocessed allows each combination of main sentence roles of Cur-Verb to be processed with separate word sense numbers for Cur-Verb. If 70903 or 70905 is false, 70907 informs the Communication Manager of an adverbial processing error for the Current-Adverbial at the Cur-Result-V clause. This completes the adverbial processing component of the verb word sense number selection COMPLETION process.

Unassigned Sentence Role Processing

After adverbial processing has been completed for a clause of Cur-Result-V with Verb-W-S, i.e. Cur-Clause, at 70841, 70841 sets processing to continue at 70910, which begins Unassigned Sentence Role Processing. A sentence role constituent is unassigned if it does not have In-Clause at its SDS position. A sentence role constituent is unassigned because the constituent did not combine with its other sentence role constituents and was assumed to be part of an ellipted clause of a stated verb with multiple word sense numbers at 70750 after preceding processing as described above. Then in subsequent processing at 70778 or 70780, a currently unassigned constituent was not assigned to any clause. The purpose of Unassigned Sentence Role processing is to determine if an assigned sentence role constituent has an alternate word sense number which would allow it to be assigned to a clause and given the In-Clause symbol. After 70841, 70910 is next, and is true if Cur-Clause has not been stated before and has a main sentence role constituent without In-Clause at its SDS position. If 70910 is false, 70913 is next. 70913 sets up parameters for conflicting adverbial processing. 70913 sets 70-Back to 70822. 70913 also sets processing to continue at 70620 which detects and processes conflicting adverbials as described above. After conflicting adverbial processing is completed, processing continues at 70-Back as described above. In this case 70-Back equals 70822 which selects the next process. 70822 is true if there is another UNPROCESSED clause in Clause-M. If 70822 is true, 70824 sets Cur-Verb to the verb of the next UNPROCESSED clause of the sentence, and sets processing to continue at 70802 as is described above. If 70822 is false, processing continues at 70930 which begins ellipted indirect object, mood and process selection processing, and which is described below. If 70910 is true, all unassigned sentence role constituents in Cur-Clause will begin reprocessing for their word sense numbers at 70911. 70911 stores ASSUMED-UNKNOWN/IMPROPER-USAGE at each main sentence role constituent of Cur-Clause without In-Clause at its SDS position. 70911 also stores a one in REPROC at the position of a sentence role constituent in Cur-Clause without In-Clause. REPROC is a Boolean vector with a one at the positions of sentence role constituents of Cur-Clause which are to be reprocessed for assignment. Finally, 70911 stores a zero in REPROC at the position of a sentence role constituent in Cur-Clause with In-Clause.

After 70911, 70912 is next, and is true if there an UNREPROCESSED sentence role constituent in REPROC. If 70912 is false, unassigned constituent processing is completed, and 70913 is next as described above. If 70912 is true, 70914 sets the Current-Head to be the next UNREPROCESSED constituent in REPROC; T-MAX is set to the Current-Head's MAX; T-R-No is set to the Current-Head's R-No; T-REQ is set to the Current-Head's REQ; REQ is set to the requirement term of Verb-W-S; and 70914 sets T-R-List to be the Current-Head's R-List. After 70914, 70915 is next, and is true if there is an UNRETRIED word sense number of the Current-Head which meets the word sense number requirements of Verb-W-S. Here, UNRETRIED means a word sense number of Current-Head which has not been tried for unassigned constituent reprocessing. In this reprocessing, every word sense number of the Current-Head is considered because using only the requirement term of Verb-W-S could alter the selection of the Current-Head's word sense number. If 70915 is true, 70916 sets up parameters for Selector 60 to select a word sense number for the Current-Head. 70916 sets R-No to the next UNRETRIED entry in T-R-List which meets the word sense number requirements of Verb-W-S; R-List is removed the Current-Head's SDS position and is replaced with T-R-List[R-No]; C-R-No is set to R-No; R-No and MAX are set to 1; all modifiers of the Current-Head are set to UNPROCESSED for noun word sense number selection; Invo-Opcode is set to 70-Find; 70-Return is set to 70918; 60-Start is set to 60100; REQ-SEL, a Boolean variable which causes 60 to process the Current-Head without selecting a new REQ term when it is true, is set to true; and 70916 calls 60[Current-Head, 60-Start, Invo-Opcode, REQ-SEL, 70-Return]. Selector 60 processes the modifiers of the Current-Head for the Current-Head's only word sense number in R-List using Verb-W-S's REQ term. The processing at 60 is as is described above. However, 60 processes the Current-Head for a single word sense number and a REQ term for only Verb-W-S. These restrictions on R-List and REQ cause 60 to determine modifiers of the Current-Head which meet these restrictions if possible. Effectively, this causes the modifiers of the Current-Head to have word sense numbers which insure that the Current-Head can meet its sentence role requirements of the Cur-Verb if possible.

After processing at 60, 70918 is next, and is true if a word sense number has been selected for the Current-Head and each of its modifiers. If 70918 is true, unassigned constituent processing has been successful, and 70920 is next. 70920 restores the Current-Head's R-List and MAX components of the Current-Head's SDS position; the Current-Head's R-No is set to C-R-No; the Current-Head is assigned to each clause to which it belongs syntactically, and to which the Current-Head meets the REQ of such a clause's verb; ASSUMED-UNKNOWN/IMPROPER-USAGE is removed from the Current-Head's SDS position; and In-Clause is stored at the Current-Head's SDS position for each clause in which it meets the REQ of such a clause's verb. After 70920, 70928 stores a zero at the Current-Head's position in REPROC, and sets processing to continue at 70912 which is described above. If 70918 is false, processing continues at 70915 which determines if the Current-Head has another possible word sense number as described above for the case when 70915 is true. If 70915 is false, reprocessing has failed, and 70917 restores R-List, R-No, REQ and MAX components of the Current-Head's SDS position; and sets processing to continue at 70922. 70922 is true if the Current-Head's entire AND-group has failed unassigned constituent reprocessing. If 70922 is false, processing continues at 70928 as above. If 70922 is true, 70924 stores a pointer to the descriptor of Cur-Clause and stores FAILED-SENTENCE-ROLE at the SDS position of each constituent in the Current-Head's AND-Group. 70924 marks the Current-Head's AND-group as not being included in Cur-Clause. The Current-Head's AND-group can not perform its sentence role, but other AND-groups (joined by an "or" conjunction for example) in the Current-Head's sentence role may be able to perform the sentence role in Cur-Clause. This latter possibility is tested at 70925. After 70924, 70925 is next, and is true if each sentence role constituent with the same sentence role as Current-Head in Cur-Clause has a pointer to the descriptor of Cur-Clause and FAILED-SENTENCE-ROLE at its SDS position. If 70925 is true, Cur-Clause is false because it is not possible for the constituents of the Current-Head's sentence role to perform Cur-Clause. If 70925 is true, 70926 sets the truth value of Verb-W-S portion of Cur-Verb's SDS position to FALSE-BY-SENTENCE-ROLE. This case can be an acceptable interpretation when there are other clauses in the invocation sentence which have verbs with verb word sense numbers which do not have a FALSE-BY-SENTENCE-ROLE truth value. The case where all verb word sense numbers have a FALSE-BY-SENTENCE-ROLE truth value is not an acceptable interpretation, and is tested for below at 70930. After 70926, or if 70925 is false, processing continues at 70928 as above. This completes the description of Unassigned Sentence Role Processing.

Ellipsis, Modal, Mood, and Process Selection Processing

The final component of the COMPLETION process of verb word sense number selection is Ellipsis, Modal, Mood, and Process Selection Processing. This processing is started when all clauses have been processed for initial verb word sense number selection and adverbial processing. In this case 70822 is next, and is false. If 70822 is false, 70826 sets processing to continue at 70930. 70930 is true if the invocation sentence has a verb in a clause with a verb word sense number without a FALSE-BY-SENTENCE-ROLE truth value, and if every main sentence role constituent in at least one AND-group of every main sentence role of such a clause with a verb word sense number without a FALSE-BY-SENTENCE-ROLE truth value has In-Clause stored in its SDS position. If 70930 is true, there is at least one valid interpretation for the invocation sentence among the one or more possible interpretations. If 70930 is false, COMPLETION processing has failed to find a valid clause, and 70931 is next. 70931 sets C-Success to false, and returns processing control to the caller of the COMPLETION process. Depending upon the circumstances of the processing at the caller, the caller could invoke the Communication Manager to determine how to proceed upon the failure(s) detected at 70930. If 70930 is true, 70932 sets up parameters for this process: Cur-Verb is set to the first verb of the invocation sentence without a FALSE-BY-SENTENCE-ROLE truth value; Cur-Verb-W-S is set to the first word sense number of Cur-Verb's first Cur-Result-V without a FALSE-BY-SENTENCE-ROLE truth value; and 70930 sets Cur-Clause to the clause associated with Cur-Verb-W-S's Cur-Result-V. After 70932, 70933 is next, and is true if Cur-Clause has been stated before with the same modals and mood. If 70933 is true, 70934 marks and stores a pointer to the verb of the stated clause in Context Memory 120 at the Cur-Verb-W-S portion of Cur-Verb's SDS position, and 70934 sets processing to continue at 70978 which is described below.

If 70933 is false, 70935 is next, and is true if Cur-Verb-W-S requires an indirect object which is ellipted in Cur-Clause. If 70935 is true, 70936 is next, and is true if Context Memory 120 has Cur-Verb-W-S in a previously stated clause. If 70936 is true, 70937 is next and is true if such a preceding clause has an indirect object which is different than the subject of Cur-Clause. If 70937 is true, 70940 assigns the indirect object of Cur-Clause to be the most recently stated indirect object different than the subject in such a clause in 120. If 70936 or 70937 is false, 70938 assigns the indirect object of Cur-Clause to be the indefinite pronoun with general reference associated with Cur-Verb-W-S as is stored in the sentence role requirements as generally depicted in FIG. 19*d*. After 70938 or 70940, 70942 stores the symbol, @V-W-S-Detected-Ellipsis at the SDS position of the indirect object of Cur-Clause. The selected indirect object can be verified by checks added to Purpose Identifier 140 by Plausibility and Expectedness Checker 170 for a particular application. Such an application has a process to replace the indirect object if necessary.

If 70935 is false, or after 70942, 70944 is next, and is true if Cur-Verb-W-S has an unprocessed modal verb. If 70944 is true, 70946 sets up parameters for processing the modal verb: Cur-Modal is set to the next unprocessed modal verb of Cur-Verb-W-S; 70-Return is set to 70948; and 70946 calls MODAL[Cur-Nat-Lang, Cur-Modal, 70-Return]. After processing at MODAL as described above for example in English, 70948 sets a pointer to the truth value of Cur-Modal and a pointer to a conjunction of Cur-Modal, if any, at Cur-Verb-W-S's portion of Cur-Verb's SDS position, and sets Cur-Modal to processed. After 70948, 70944 is next as above.

Figure 1:
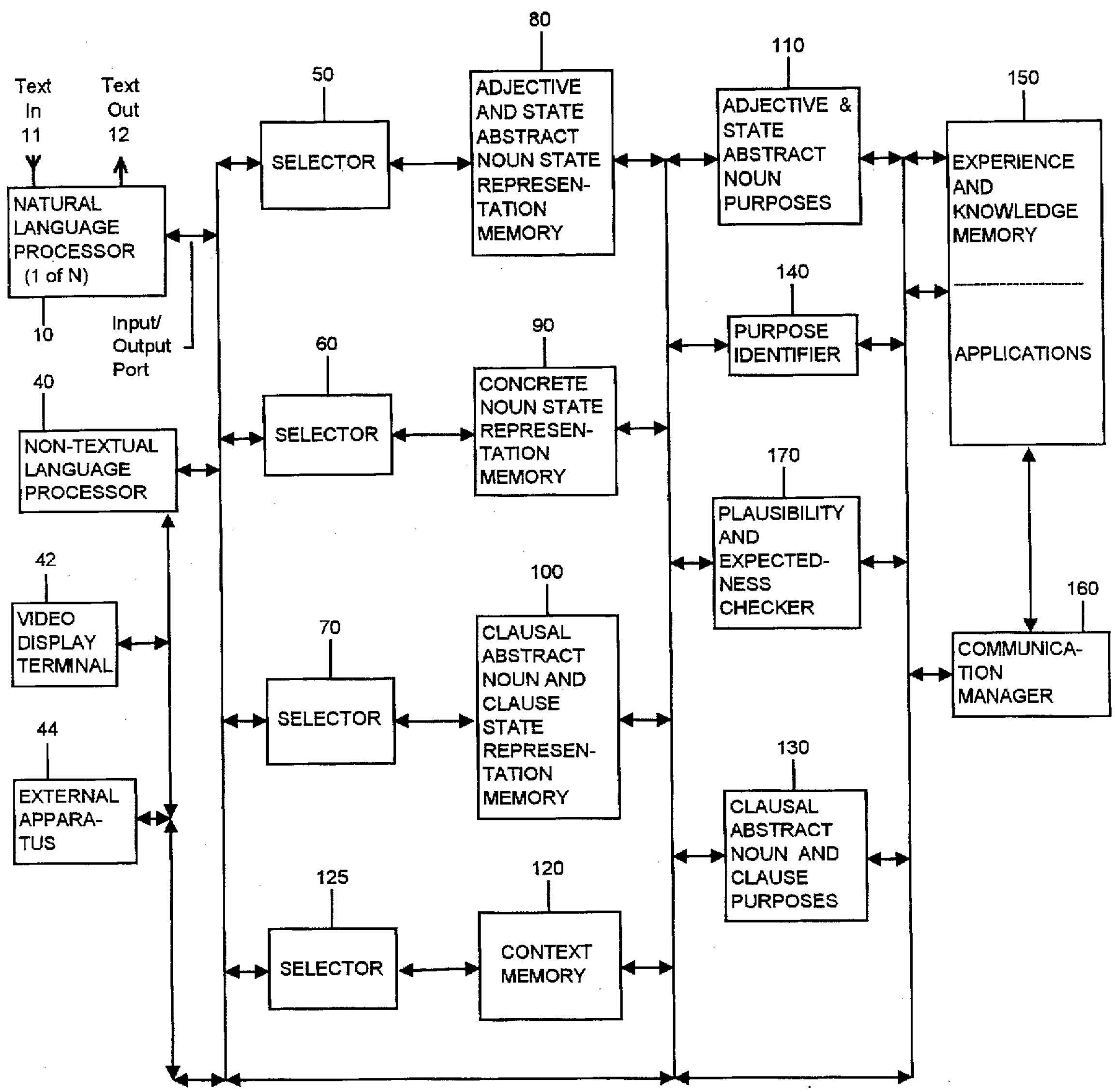
FIG. 1 is a block diagram of the system architecture of the present invention.

If there are no unprocessed modal verbs at 70944, 70944 is false, and 70949 is next. 70949 looks up the result type of Cur-Verb-W-S. The result type has a value of STATIVE, EVENTIVE, OR HABITIVE, and the value is stored in Cur-Verb-W-S's Process Independent Data Structure as depicted in FIG. 1*b*, or an adverbial in Current-Clause has set a result type value at Cur-Verb's SDS position with a function. 70949 marks and stores the result type value in Cur-Verb-W-S's portion of Cur-Verb's SDS position if the result type value has not already been stored there, and 70949 sets processing to continue at 70950. 70950 is true if Cur-Verb-W-S has the imperative mood and is unprocessed for this mood. If 70950 is true, 70952 sets Criteria-Set to the Imperative-Set[Cur-Nat-Lang] which is stored at 20; 70-Return is set to 70954; and 70952 calls MODAL[Cur-Nat-Lang, Cur-Modal, Criteria-Set, 70-Return]. In this case, Cur-Modal is a parameter to store the imperative truth value. After processing at MODAL, 70954 is next. 70954 stores Cur-Modal's truth value at Cur-Verb-W-S's portion of Cur-Verb's SDS position, and sets Cur-Verb-W-S as processed for the imperative mood. After 70954, or if 70950 is false, 70956 is next, and is true if Cur-Verb-W-S has the subjunctive mood and is unprocessed for this mood. If 70958 is true, 70958 stores a hypothetical truth value at Cur-Verb-W-S's portion of Cur-Verb's SDS position, and sets Cur-Verb-W-S as processed for the subjunctive mood. After 70958, or if 70956 is false, 70960 is next and is true if Cur-Clause is a subordinate clause main sentence role of a verb word sense number implying a hypothetical truth value for Cur-Clause, and Cur-Verb-W-S is unprocessed for this implication. If 70960 is true, 70962 stores a hypothetical truth value relation pointer to the verb word sense number implying the hypothetical truth value at Cur-Verb-W-S's portion of Cur-Verb's SDS position, and sets Cur-Verb-W-S as processed for hypothetical clause implication.

After 70962, or if 70960 is false, 70963 is next, and is true if Cur-Verb-W-S has its type, i.e., its process selected. If 70963 is true, processing continues at 70976 which is described below. If 70963 is false, 70964 determines if Cur-Clause and/or the context has stated adverbial subclass values which select processes of Cur-Verb-W-S. 70964 is accomplished by comparing the process selecting adverbial subclass values of Cur-Verb-W-S, which are stored in the process independent data as depicted in general in FIG. 19*b*, with the adverbial subclasses in Cur-Clause and in 120. After 70964, 70966 is next, and is true if process selecting adverbial subclass matches were found at 70964. If 70966 is true, 70970 sets Process-Set to the ones selected at 70964. If 70966 is false, 70968 sets Process-Set to all the processes of Cur-Verb-W-S. The processes of Cur-Verb-W-S are the general process descriptors associated with the type numbers of Cur-V-W-S. Such process descriptors of Cur-V-W-S describe the generalized process which implements the result states implied by Cur-Verb-W-S and are depicted in FIG. 19*f*.

FIG. 19*f* contains the generalized format for a verb word sense number's process descriptors. A process descriptor is a general to specific entry associated with the identification, type, specificity, and experience number components associated with a verb word sense number. There are up to three varieties of process descriptor entries for a particular type number component of a verb word sense number: a general process descriptor entry, a typical process descriptor entry, and a specific process descriptor entry. A general process descriptor contains information for selecting a type number, and a type number has an associated process which realizes the result states of a clause of a verb word sense number. A typical process descriptor entry stores a representation of a natural language clause which has the typical process of a specificity number of a type number. A specific process descriptor entry stores a representation of a natural language clause with a specific process of an experience number of a specificity number of a type number. Every process descriptor has a pointer to a graph of clauses, i.e., verb word sense numbers, which stores the various known possibilities for realizing the process. These realizations are stored in Experience and Knowledge Memory 150. The possibilities are represented in natural language. Each type number has a general process descriptor. However, generalizations of specific descriptor entries of a type number and specific process descriptor entries of a type number are optional in the sense that a type number can have zero or more associated generalizations of specific process descriptor entries and zero or more specific process descriptor entries.

Each type number has a general process descriptor entry whose corresponding verb word sense number has a zero specificity number and a zero experience number. The general process descriptor entry of a type number has a joint/separate pointer which points to criteria which is used to determine whether the processes with this type number are performed separately or jointly for a main sentence role with multiple constituents. These criteria are described below. A general process descriptor entry also has a set of main sentence role pairs which contain each main sentence role of the verb word sense number with a set of requirements for the associated main sentence role. The requirements are in the same format as the requirement descriptors of FIG. 19*d*. The content of the requirements are additional requirements beyond those of a verb's word sense number requirements of FIG. 19*d*. There may be zero or more additional requirements. The additional requirements are needed to perform the entry's process, and the requirements must be satisfied for a clause to select the entry's process tree. There is at least one type number of a verb word sense number which has a general process descriptor entry with no additional requirements. One type number of a verb word sense number has a process descriptor entry without additional requirements that describes the TYPICAL-PROCESS of the verb word sense number. This type number is designated for the typical process as depicted in FIG. 19*b*. A general process descriptor entry also has a set of one or more adverbial triplets. The adverbial triplets contain: an adverbial subclass pointer, a subclass value or value range, and a requirement number. The requirement number has a value of one if the adverbial subclass value or value range is required to be matched by the context for the process to be performed, and hence selected. Other requirement numbers indicate adverbial OR-groups. An adverbial OR-group is indicated by triplets with the same requirement number. In this case, only one adverbial in an adverbial OR-group is required to have the adverbial's subclass value or value range to be matched by the context for the process to be performed, and hence selected. A general process descriptor entry also has a process pointer which is a pointer to a graph of verb word sense numbers which stores the various ways of realizing the process in natural language in Clausal Abstract Noun and Clause Purpose Memory 130. Memory 130 is described below.

An entry which is a generalization of specific process descriptor entries of a type number has a non-zero specificity number component and a zero experience number component for the type number's corresponding verb word sense number. This type of process descriptor entry of a type number corresponds to a generalization of specific instances of similar specific processes associated with the type number. This type of process descriptor of a particular specificity number of a type number contains the generalization of the specific process descriptor entries with the particular specificity number and non-zero experience numbers. This type of process descriptor entry of a type number has the same format as the general process descriptor entry of a type number except: there is no joint/separate pointer; the main sentence role pairs contain a sentence role and a typical entity, i.e. a word sense number of a typical main sentence role constituent for that sentence role; an adverbial subclass triplet subclass value is a typical value or value range for the process; and an adverbial subclass triplet requirement number has a zero value which indicates that the associated adverbial subclass is a typical circumstance of the typical process and not a requirement. The sentence role pairs and adverbial triplets represent a natural language clause which has the typical process of the generalization of specific process descriptor entries related to this generalization entry.

A specific process descriptor entry of a type number has a non-zero specificity number and a non-zero experience number component for the type number's corresponding verb word sense number. A specific process descriptor corresponds to a specific instance of a type number's process. A specific process descriptor entry of a type number has the same format as the general process descriptor entry of a type number except: there is no joint/separate pointer; the main sentence role pairs contain a sentence role and the experienced entity(s); an adverbial subclass triplet subclass value is the experienced value or value range for the specific process instance; and an adverbial subclass triplet requirement number have a zero value which indicates that the associated adverbial subclass is a specific circumstance of the specific process and not a requirement. The sentence role pairs and adverbial triplets of a specific process descriptor represent a natural language clause which has the specific process of the specific process descriptor.

After 70968, or 70970, the Process-Set contains the general process descriptors of Cur-Verb-W-S which correspond to possible type numbers, and 70972 is next. 70972 determines the general process descriptors in Process-Set which contain additional requirements in their main sentence role pairs which are satisfied by the main sentence roles of Cur-Clause, i.e., the subjects, indirect objects, and direct objects of Cur-Clause. Also, 70972 determines if the adverbial subclass values of adverbials in Cur-Clause and the adverbial subclass values of adverbials in 120 match the adverbial subclass value or value range of adverbial subclass triplets with a one valued requirement number or match at least one value or value range of the subclass triplets of each OR-group of Process-Set descriptors which met the additional requirements for main sentence roles. 70972 removes all process descriptors from the Process-Set which have additional requirements of main sentence roles which are not meet by Cur-Clause constituents or which have required adverbial subclass values or value ranges which are not matched by the adverbials of Cur-Clause or the adverbials in 120. After 70972, Process-Set contains possible, general process descriptors which correspond to the possible type numbers for Cur-Verb-W-S.

After 70972, 70974 is next. 70974 determines the processes in Process-Set which are most related to the constituents in Cur-Clause. The main sentence role entities of main sentence role pairs of process descriptors in Process-Set are compared for matches with the corresponding main sentence role constituents of Cur-Clause. The circumstantial adverbial subclasses of the typical and specific process descriptors are also compared for matches with the stated adverbials of Cur-Clause and the context adverbials. The possible main sentence role matches and adverbials compared for include: ALL-MAIN-SENTENCE-ROLES/ADVERBIALS match, SUBJECT match, INDIRECT-OBJECT match, DIRECT-OBJECT match, INDIRECT-OBJECT-AND-DIRECT-OBJECT match, and ADVERBIAL-SET match. Within each type match except for the ADVERBIAL-SET match, the process descriptors with at least one circumstantial adverbial subclass matches are selected unless there are no circumstantial adverbial subclass matches. The ADVERBIAL-SET match type must match the specified adverbial subclasses. In the case of no circumstantial adverbial matches, all process descriptors which match the entities in the match type are selected. The actual matches made depend upon PROC-PREF-V and the main sentence roles present in Cur-Clause. PROC-PREF-V is vector which has a one at each match which is currently desired. PROC-PREF-V is set by the current application which is selected through purpose processing and is described below.

Certain types of matches are utilized because of the discourse of the conversation. The ALL-MAIN-SENTENCE-ROLES match is utilized when the conversation involves a previous experience for example. The single specific sentence role match is utilized when the single specific sentence role is the focus of the conversation for example. The DIRECT-OBJECT-AND-INDIRECT-OBJECT match is utilized when the combination of these sentence roles is the focus of the conversation for example. The ADVERBIAL-SET match is utilized when processes occurring at specific adverbial subclasses is the focus of the conversation for example. Such specific adverbial subclasses could include specific to general semantic roles such as these broad semantic roles; time, space, process, modality, (point of) reference, and purpose. All the types of matches are selected when all related processes of Cur-Clause are considered because the process is the focus of the conversation for example.

PROC-PREF-V also has a position unrelated to the above main sentence role matches, the DYNAMIC match. The DYNAMIC match is enabled when its position has a one in PROC-PREF-V. The DYNAMIC match selects the sentence role matches to be made according to a rule in Cur-Rule. Cur-Rule is set by the current application. For example, the Cur-Rule could be: enable matching for all main sentence roles which are specific known references in Cur-Clause and for the normal combinations of such main sentence roles. The example Cur-Rule value matches are utilized when previously experienced processes related to Cur-Clause are under consideration. After all main sentence role and adverbial matches which are possible and enabled by PROC-PREF-V have been made, 70974 stores the matched entry numbers or NULL, if no matches are found or if the match type is not enabled: at ALL-M for ALL-MAIN-SENTENCE-ROLES/ADVERBIAL matches, S-M for SUBJECT matches, IO-M for INDIRECT-OBJECT matches, DO-M for DIRECT-OBJECT matches, IAD-M for INDIRECT-OBJECT-AND-DIRECT-OBJECT matches, and AS-M for ADVERBIAL-SET matches. 70974 also sets Cur-Process to the first entry stored in ALL-M, S-M, IO-M, DO-M, IAD-M or AS-M. If no entry was stored, Cur-Process is set to Cur-Verb-W-S's TYPICAL-PROCESS. Finally 70974 marks and stores the following at Cur-Verb-W-S's portion of Cur-Verb's SDS position: ALL-M, S-M, IO-M, DO-M, IAD-M, AS-M and Cur-Process.

After 70974, 70976 is next, and is true if Cur-Clause has a multiple constituent sentence role. If 70976 is true, 70977 evaluates the J/S-Criteria-Set of each multiple constituent sentence role for the J/S-Criteria set associated with the general process entry of Cur-Process. FIG. 19*g* depicts the general format for the J/S-Criteria-Set for a particular sentence role with multiple constituents. The J/S-Criteria-Set for a sentence role can be NULL in the sense that multiple constituents for a particular sentence role has a constant process type result value. The process type result values are: @JOINT, @SEPARATE, or @INDETERMINATE. If the process type result value is not constant for a sentence role, that sentence role has a J/S-Criteria-Set. A J/S-Criteria-Set contains criteria composed of adverbial subclass values or value ranges and/or sentence role state and property values or value ranges. The criteria are partitioned according to the process type result value associated with a partition. Within a partition, the criteria are grouped into AND-groups which are combined into an OR-group. The adverbial context and the sentence roles must match at least one of the AND-groups in the OR-group of a criteria set partition to select the process type result value associated with the partition. All partitions are evaluated. If only one process type result value is selected, that result value is assigned to the sentence role. If more than one process type result value is selected, the @INDETERMINATE is assigned to the sentence role. 70977 determines the process type result for each multiple constituent sentence role of Cur-Clause and stores the process result type value for each such sentence role in J/S-Result-V. J/S-Result-V contains a position for each sentence role of Cur-Clause. Sentence roles with multiple constituents have the process type result value which has been determined from the J/S-Criteria evaluation stored at the sentence role's position in J/S-Result-V. Single constituent sentence roles have NULL stored at the sentence role's position in J/S-Result-V. Finally 70977 stores J/S-Result-V at Cur-Verb-W-S's portion of Cur-Verb's SDS position.

After 70977, or if there are no sentence roles with multiple constituents which implies that 70976 is false, 70978 is next, and is true if Cur-Verb is in another clause with an UNPROCESSED verb word sense number without a FALSE-BY-SENTENCE-ROLE truth value, and if every main sentence role constituent in at least one AND-group of every main sentence role of such a clause with a verb word sense number of Cur-Verb without a FALSE-BY-SENTENCE-ROLE truth value has In-Clause stored in its SDS position, i.e. an UNPROCESSED verb word sense number in a clause which makes 70930 true. In this paragraph, UNPROCESSED is with respect to Ellipsis, Modal, Mood, and Process Selection Processing. If 70978 is true, 70979 sets Cur-Verb-W-S to the next UNPROCESSED word sense number of Cur-Verb in a clause which makes 70930 true; Cur-Clause is set to the clause associated with Cur-Verb-W-S's Cur-Result-V; and 70979 sets processing to continue at 70933 which is described above. If 70978 is false, 70980 is next, and is true if the invocation sentence has a verb with an UNPROCESSED word sense number in a clause which makes 70930 true. If 70980 is true, 70982 sets Cur-Verb to the next verb which makes 70980 true. After 70982, 70979 is next. If 70980 is false, COMPLETION processing is successfully completed, and 70984 is next. 70984 sets C-Success to true; Ellip-Clause-Comb is set to false; REQ-SEL is set to false; and 70984 returns control to the caller. This completes the description of Selector 70 processes.

Adjective Word Sense Number Selection Processes in Selector 50

Adjective word sense number selection processes in Selector 50 include: looking up data related to an adjective or state abstract noun, processing adverbials modifying an adjective, processing a subject complement adjective in a sentence with a clausal subject, and processing selected adjective word sense numbers prior to purpose selection. Each state representation adjective word sense number has an associated data structure accessed with an adjective word sense number. The format for an adjective or state abstract noun word sense number is depicted in FIG. **20*a*. A state abstract noun has the same word sense number format and data structure entry format as a state adjective as described above. A state abstract noun is processed in Selector 50, but a state abstract noun is mostly processed as a concrete noun by Selector 60** as described above. An adjective or state abstract noun word sense number is composed of an identification number and the owner word sense number. The components of an adjective and state abstract noun identification number are: a state number with a class number, a member number, an owner word sense identification number, and a value or value range for the state associated with the state number. The owner word sense number is the word sense number of a noun which owns the state associated with the state number. The owner word sense number can be specified in a full range of generality: most general to most specific. The owner word sense number provides the type, specificity and experience numbers of the adjective or state abstract noun. The adjective or state abstract noun word sense number encapsulates the state representation of an adjective or a state abstract noun: an owner's state for a value or value range of the state implied by the word sense number of the adjective modifying the owner or the adjective modifying a state abstract noun. The adjective and state abstract noun word sense number also addresses the data structure associated with an owner's state for a value or value range of the state.

The adjective and state abstract noun word sense number data structure entry format is depicted in FIG. **20*b***. Each entry contains the adjective or state abstract noun word sense number which is used to access the entry. There are two types of entries. One type of entry is associated with the most general owner word sense number in the group which comprises entries which have common adjective or state abstract noun word sense identification numbers, and which have owner word sense numbers which have common identification numbers, and which have the same state value or state value range. The other type of entry is associated with members of such groups without the most general owner word sense number. Such members associated with the second type of entry within a related group have common word sense identification numbers, but such owner word sense numbers of the second type of group members have more specific type, specificity, and/or experience numbers than the most general owner word sense number with a common identification number of such a group. As described above, the most general possible owner (a noun) word sense number has zero type, zero specificity, and zero experience numbers, and the most specific possible owner word sense number contains nonzero type, nonzero specificity, and nonzero experience numbers. Specificness increases as the type, then the specificity number, and then the experience number become nonzero. The most general owner word sense number of a related group, i.e., a group with common adjective or state abstract noun word sense identification numbers, including common owner word sense identification numbers, can be in the full range of specificness: from the most general possible to the most specific possible.

Figure 20D:
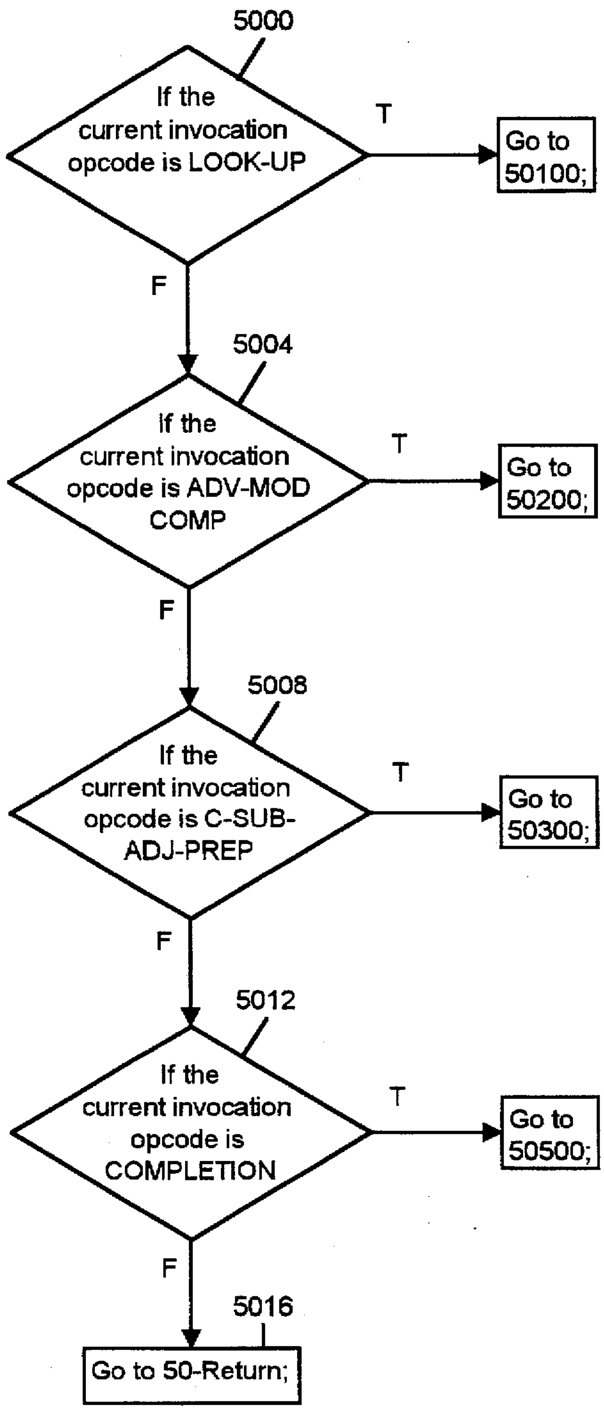
FIGS. 20*d*–20*h* is a flow chart for the method that selects word sense numbers for state adjectives and other methods related to the state representation of state adjectives and state abstract nouns.
Figure 20E:
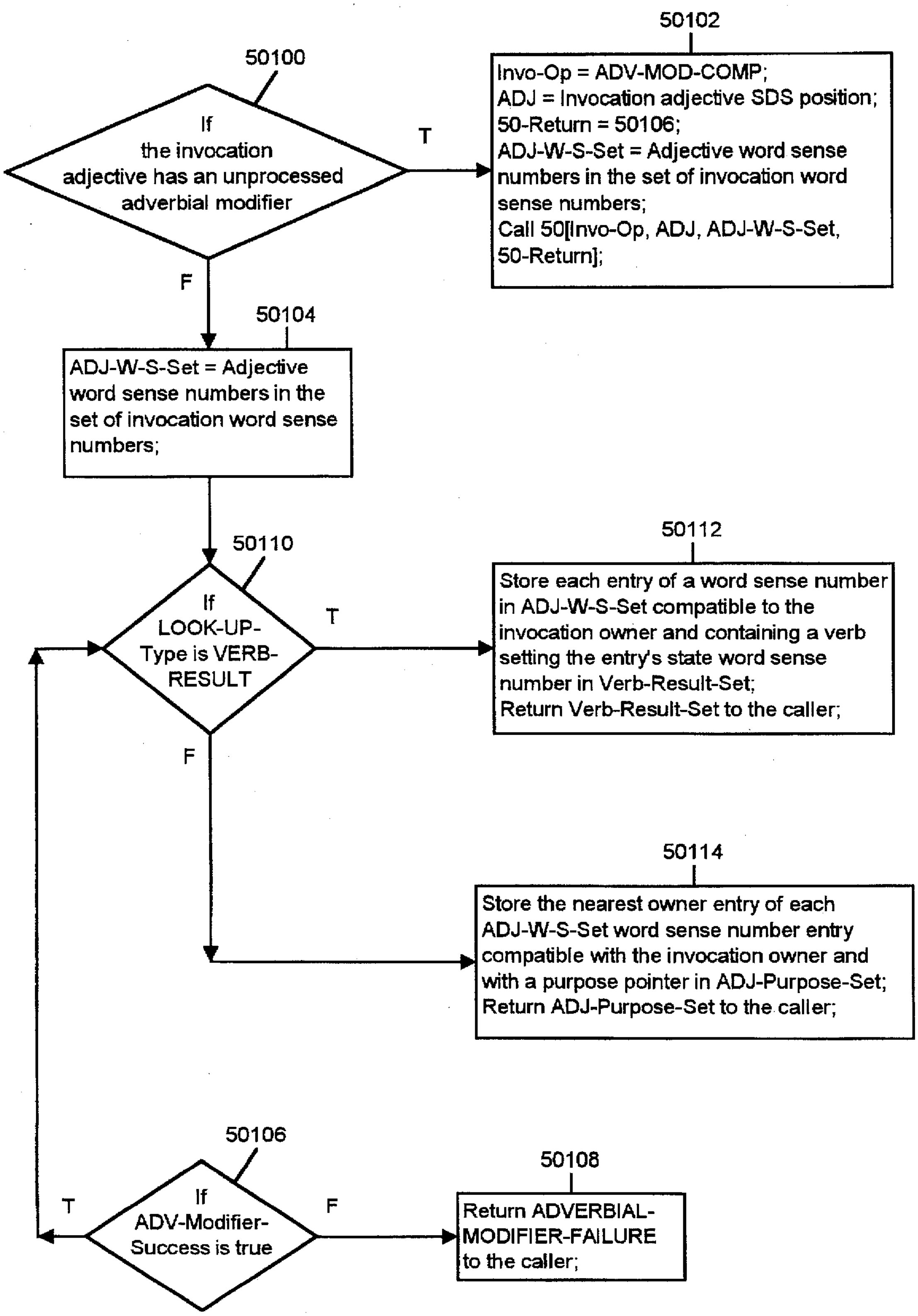
Figure 20F:
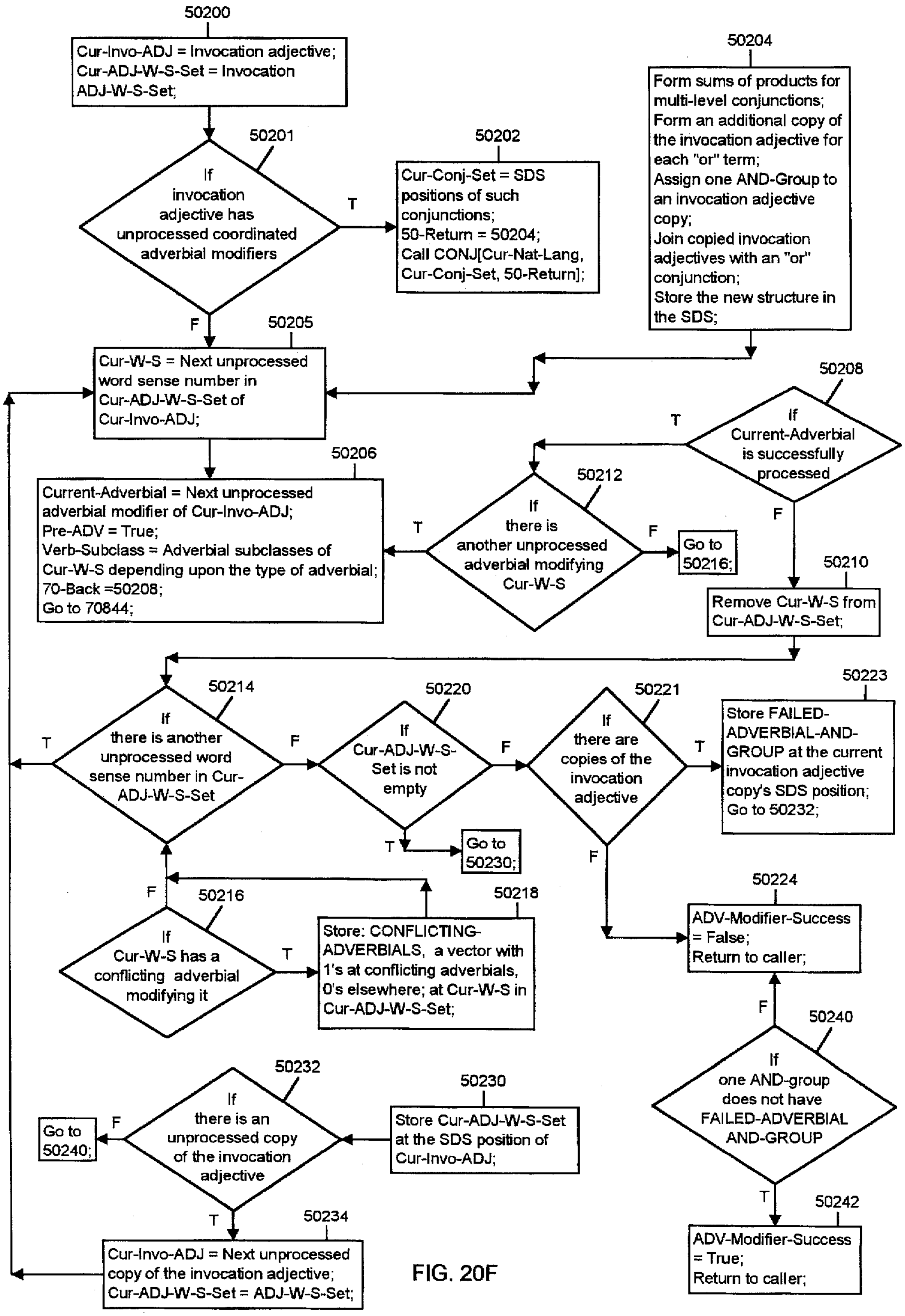
Figure 20G:
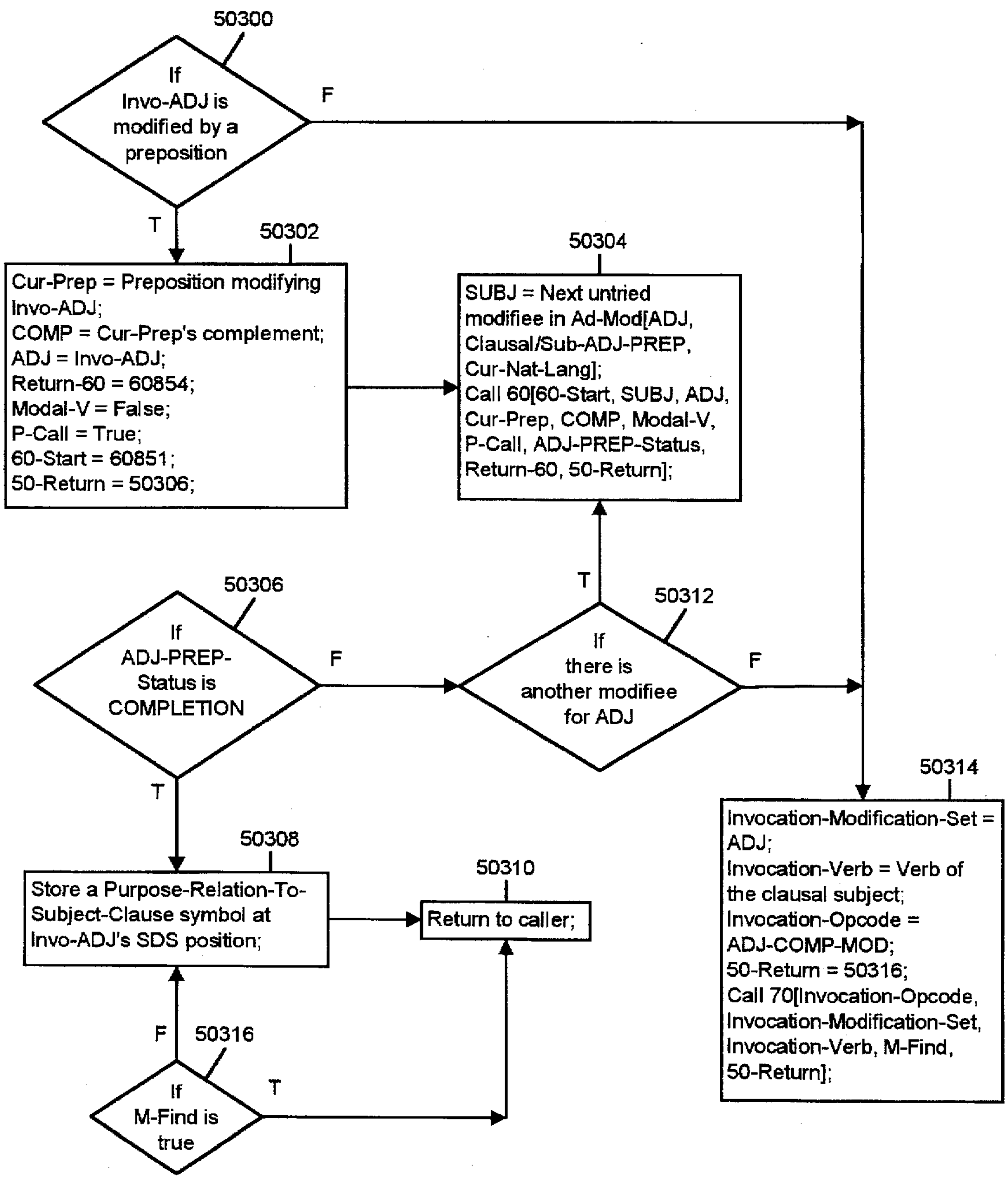
Figure 20H:
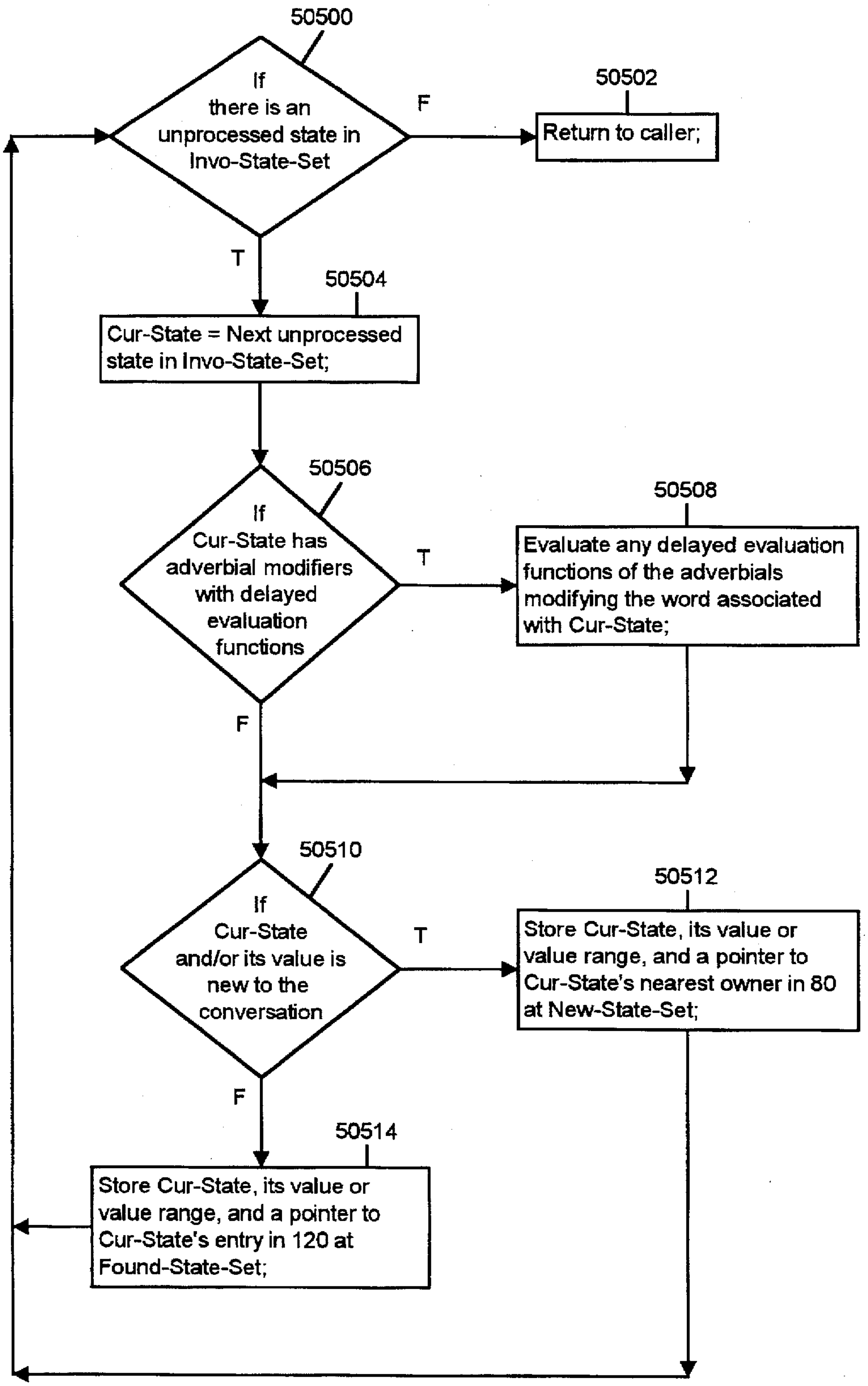

The first type of entry, the one associated with the most general word sense number of such a group of related entries with common adjective or state abstract noun word sense identification numbers, contains a field for the set of verbs which set the state to the value or value range of its associated entry's adjective or state abstract noun word sense identification number. However, this set of verbs can be empty. This entry of the most general owner word sense identification number of a related group also contains a list of adverbial subclasses which are used to select adverbials modifying the entry's associated adjective. The use of adverbial subclasses to select adverbial modifiers is described in the adverbial processing section above. Both types of entries contain a pointer to the entry's related purposes in Adjective and State Abstract Noun Purposes Memory 110. The field for verbs setting the entry's state and value, and a field for adverbial subclasses are not contained in the second type of entry. These fields are only in the first type of entry because they are common to the second type of entries in its related group. Both types of entries contain an adjective or state abstract noun word sense number field and a purpose pointer field. As depicted in FIG. 20*c* for a single adjective word sense number entry, the Dictionary 20 structure of a natural language contains entries with adjective word sense numbers with the most general owner word sense number in the group of entries with common adjective and owner word sense identification numbers, i.e., adjective word sense numbers associated with the first type of adjective word sense number data structure entry in FIG. 20*b*. The list of entries of such adjective word sense numbers in 20 are formed into groups which contain such adjective word sense numbers associated with a word set, and such a group associated with a word set is used for adjective and noun word sense number selection.

FIGS. 20*d*–20*h* contains block diagrams of the word sense number selection processes of Selector 50. Selector 50 processes begin at 5000. 5000 is true in the current invocation opcode is LOOK-UP. If 5000 is true, processing continues at 50100 which looks up the verb setting set or the purposes of given adjective or state abstract noun word sense numbers. If 5000 is false, 5004 is next, and is true if the current invocation opcode equals ADV-MOD-COMP. If 5004 is true, processing continues at 50200 which processes adverbials modifying a given adjective word sense number. If 5004 is false, 5008 is next, and is true if the current invocation opcode equals C-Sub-ADJ-PREP. If 5008 is true, processing continues at 50300 which processes a subject complement adjective in a sentence with a clausal subject. If 5008 is false, 5012 is next, and is true if the current invocation opcode equals COMPLETION. If 5012 is true, processing continues at 50500 which processes states corresponding to selected word sense numbers for completion. If 5012 is false, 5016 sets processing to continue at 50-Return which contains the return address in 50 from a call to a process.

Look Up Processing

If 5000 is true, 50100 begins Look Up Processing. 50100 is true if the invocation word is an adjective, and the invocation adjective has an unprocessed modifying adverbial. The invocation word is a state adjective or state abstract noun. If 50100 is true, 50102 sets Invo-Op to ADV-MOD-COMP; ADJ is set to the invocation adjective's SDS position; 50-Return is set to 50106; ADJ-W-S-Set is set to the list of adjective word sense numbers in the set of invocation adjective word sense numbers; and 50102 calls 50[Invo-Op, ADJ, ADJ-W-S-Set, 50-Return]. After the ADV-MOD-COMP, which is described below in this section, processes ADJ for its modifying adverbials, 50106 is next, and is true if ADV-Modifier-Success, a parameter set by the ADV-MOD-COMP process, is true. If 50106 is false, the adverbials have no known relation to the given word sense numbers of ADJ, and 50108 returns ADVERBIAL-MODIFIER-FAILURE to the caller of this process. If 50100 is false, 50104 sets ADJ-W-S-Set to the list of adjective or state abstract noun word sense numbers in the set of invocation adjective or state abstract noun word sense numbers. After 50104, or if 50106 is true, 50110 is next, and is true if LOOK-UP-Type equals VERB-RESULT. LOOK-UP-Type is an invocation parameter which indicates the type of information to look up. If 50110 is true, 50112 stores a word sense number entry from ADJ-W-S-Set in Verb-Result-Set if the entry is compatible with the invocation word owner word sense number, and if the entry has an associated most general owner entry in 80 which contains a set of verbs which sets the entry's state and value. An entry in ADJ-W-S-Set is compatible if the associated entry's owner word sense number in 80 and the invocation adjective owner's word sense number have common identification numbers. After all entries meeting these conditions have been stored in Verb-Result-Set, 50112 returns Verb-Result-Set to the caller.

If 50110 is false, 50114 stores the nearest owner entry in 80 of an entry from ADJ-W-S-Set in ADJ-Purpose-Set if the entry from ADJ-W-S-Set is compatible with the invocation word owner word sense number, and if the nearest owner entry in 80 contains a purpose pointer. The nearest owner entry in 80 of an entry in ADJ-W-S-Set is the entry in 80 with the same owner word sense identification number as the invocation word owner word sense identification number, and the entry which matches the invocation adjective owner's word sense number or which has the least general owner word sense number that generalizes the invocation word owner's word sense number. A first owner word sense number generalizes a second owner's word sense number by: the first matching the second's word sense identification number, and the first having zero type, specificity, and experience numbers; or by the first matching the second's word sense identification and type numbers, and the first having zero specificity and experience numbers; or by the first matching the second's word sense identification, type, and specificity numbers, and the first having a zero experience number. The cases for a first owner word sense number generalizing a second owner word sense number are listed in the order of the most general possible first owner word sense number to the least general possible first owner word sense number with respect to the first owner word sense number generalizing the second owner's word sense number. The least general owner word sense number in this case matches more word sense number components than a more general word sense number. After the match or the least general owner match for each Adj-W-S-Set word sense number that is matched has been stored in ADJ-Purpose-Set by 50114, 50114 returns ADJ-Purpose-Set to the caller. This completes Look Up Processing.

Adverbial Modification of Adjective Processing

If 5004 is true, Adverbial Modification of Adjective Processing starts at 50200. 50200 sets Cur-Invo-ADJ to the invocation adjective, and sets Cur-ADJ-W-S-Set to ADJ-W-S-Set, the set of adjective word sense numbers which are to be utilized for selecting possible adverbial modifiers of the invocation adjective. 50201 is next, and is true if the invocation adjective has modifying coordinated adverbials which have unprocessed conjunctions. If 50201 is true, 50202 sets Cur-Conj-Set to the SDS positions of the conjunctions joining the adverbials modifying the invocation adjective; 50-Return is set to 50204; and 50202 calls CONJ [Cur-Nat-Lang, Cur-Conj-Set, 50-Return]. After processing at CONJ, 50204 is next. 50204 forms sums of products of modifying adverbials for multi-level conjunctions; a copy of the invocation adjective is added for each "or" conjunction or other natural language equivalent at the SDS; one AND-group of modifying adverbials is assigned to each invocation adjective in the SDS; and 50204 joins the invocation adjectives with "or" conjunctions in the SDS. After 50204, or if 50201 is false, 50205 sets Cur-W-S to the next unprocessed adjective word sense number in Cur-ADJ-W-S-Set of Cur-Invo-ADJ. After 50205, 50206 assigns the Current-Adverbial to be the next unprocessed adverbial modifier for Cur-W-S of Cur-Invo-ADJ; Pre-ADV is set to true; Verb-Subclass is set to the adverbial modification subclasses of Cur-W-S for the type of the Current-Adverbial, e.g. a prepositional adverbial; 70-Back is set to 50208; and 50206 sets processing to continue at 70844 which processes adverbials as described above in the Selector 70 processing section. The process starting at 70844 was described for adverbials modifying verbs. The process for adverbials modifying adjectives is the same as the process for modifying verbs as was described in the adverbial processing section above. The process starting at 70844 was described for verb modifiees for convenience. This process is utilized for adverbial processing by other processes. Here for ease of description, the process is described as a part of Selector 70.

After adverbial processing is completed, 50208 is next, and is true if the Current-Adverbial was successfully processed. If 50208 is false, 50210 removes Cur-W-S from Cur-ADJ-W-S-Set. If 50208 is true, 50212 is next, and is true if there is another unprocessed adverbial modifying Cur-W-S which is unprocessed for Cur-W-S. If 50212 is true, 50206 is next as above. If 50212 is false, processing continues at 50216. 50216 is true if Cur-W-S has a conflicting adverbial set modifying it. A conflicting adverbial set has more than one adverbial which modifies the same modifiee word sense number, and each adverbial in this set has exactly the same adverbial semantic role, but has a different adverbial subclass value. If 50216 is true, 50218 generates a vector with ones at adverbial positions in the conflicting adverbial set and with zeroes at other adverbial positions. 50218 also stores the symbol, CONFLICTING-ADVERBIALS, and the generated vector at Cur-W-S in Cur-ADJ-W-S-Set. This information is stored in Cur-ADJ-W-S-Set for later processing at Step 18 which separates the conflicting adverbials so as to modify separate copies of Cur-Invo-ADJ for Cur-W-S. This processing is delayed until the word sense number of the invocation adjective is selected in subsequent processing.

After 50218 or 50210, or if 50216 is false, 50214 is next. 50214 is true if there is an unprocessed word sense number in Cur-ADJ-W-S-Set. If 50214 is true, 50205 is next as described above. If 50214 is false, 50220 is next, and is true if Cur-ADJ-W-S-Set is not empty. If 50220 is false, 50221 is next, and is true if there are copies of the invocation adjective that were formed at 50204. If 50221 is true, the current AND-group of adverbial modifiers has failed to modify the current invocation adjective copy. However, since only one AND-group of adverbial modifiers has to modify an invocation adjective copy to produce a logically correct statement, other AND-groups of adverbs are evaluated. If 50221 is true, 50223 stores FAILED-ADVERBIAL-AND-GROUP at the current invocation adjective copy's SDS position, and sets processing to continue at 50232 which is described below. If 50221 is false, there is only one adverbial AND-group, and this invocation of the adverbial modification of adjectives processing has failed, and 50224 sets ADV-Modifier-Success to false and returns processing control to the caller. If 50220 is true, processing continues at 50230. 50230 stores Cur-ADJ-W-S-Set at the SDS position of Cur-Invo-ADJ. After 50230 or 50223, 50232 is next, and is true if there is an unprocessed copy of the invocation adjective. If 50232 is true, 50234 sets Cur-Invo-ADJ to the next unprocessed copy of the invocation adjective, and sets Cur-ADJ-W-S-Set to ADJ-W-S-Set. After 50234, 50205 is next as above. If 50232 is false, processing continues at 50240. 50240 is true if one or more adverbial AND-groups does not have FAILED-ADVERBIAL-AND-GROUP. If 50240 is true, adverbial processing is successfully completed, and 50242 is next. 50242 sets ADV-Modifier-Success to true, and returns processing control to the caller. If 50240 is false, adverbial processing has failed, and processing continues at 50224 as described above. This completes the description of Adverbial Modification of Adjective Processing.

Subject Complement Adjective with a Clausal Subject

5008 is true if the current invocation opcode equals C-Sub-ADJ-PREP. If 5008 is true, processing continues at 50300 which processes a subject complement adjective in a sentence with a clausal subject. An example of this construction is: "Talking in public was awkward for him." In this example the prepositional phrase "for him" has a possessive A-relation to the state of "awkward", i.e. "for him" sets "him" to be the owner of the "awkward" state. Also in this example, there is a purpose relation between the clause, "talking in public", and the state, "awkward". One interpretation of the purpose relation in this example is that the clause causes the state value, and this example for this interpretation is: "Talking in public caused him to feel awkward." Another type of this construction has a much different function. For example, "Talking in public was easy for him." In this example, "for him" is not related to any other sentence role in the sentence through ADJ-PREP processing for English, and ADJ-PREP processing indicates a FAIL for ADJ-PREP-Status. However, "him" is the elliptical source of the subject of the clausal subject. In this example, one interpretation has "easy" as implying a conversion to an adverb which modifies the verb in the clausal subject. This interpretation is equivalent to: "He talked easily in public." Another example is "Talking in public is easy." This example also implies that "easy" implies an adverb conversion which also modifies "talked" as in an interpretation: "I talk easily in public." These three examples show the two types of processing implied by this construction. The construction either implies normal adjective prepositional function processing, or failing that, or if there is not a modifying preposition, the construction implies converting the adjective to an adverb modifying the verb of the clausal subject.

50300 begins the processing of a subject complement adjective in a sentence with a clausal subject. This process is typically invoked by Step 18 after the clausal subject has been processed. This process is invoked with a subject complement adjective invocation parameter and a pointer invocation parameter to the SDS structure of the sentence containing this construction. 50300 is true if Invo-ADJ, the invocation adjective, is modified by a prepositional phrase. If 50300 is true, 50302 sets up most of the parameters for a call to Selector 60 to process the prepositional phrase modification of a subject as is described for 60 above. 50302 sets Cur-Prep to the preposition modifying the invocation adjective; COMP is set to the complement of Cur-Prep; ADJ is set to the invocation adjective; Return-60 is set to 60854; Modal-V is set to false; P-Call is set to true; 60-Start is set to 60851; and 50302 sets 50-Return to 50306. Return-60, Modal-V, and P-Call are parameters of the process at 60 as described above. 60-Start is the starting address of the process at 60. After 50302, 50304 is next. 50304 sets SUBJ to the next untried modifiee in Ad-Mod[ADJ, Clausal/Sub-ADJ-PREP, Cur-Nat-Lang], and 50304 calls 60[60-Start, SUBJ, ADJ, Cur-Prep, COMP, Modal-V, P-Call, ADJ-PREP-Status, Return-60, 50-Return]. ADJ-PREP-Status contains the status of the ADJ-PREP process. After processing at 60 is completed, 50306 is next, and is true if ADJ-PREP-Status equals COMPLETION which implies successful processing. If 50306 is true, 50308 stores a Purpose-Relation-To-Subject-Clause symbol at ADJ's SDS position. This symbol implies that a purpose relation is to be checked for at Purpose Identifier 140. Step 18 invokes this check. After 50308, 50310 returns processing control to the caller. If 50306 is false, 50312 is next, and is true if there is another modifiee for ADJ in Ad-Mod. If 50312 is true, 50304 is next as described above.

If 50312 is false, ADJ-PREP processing has failed. If 50312 is false, or if 50300 is false, 50314 begins the processing to determine if ADJ has an interpretation as an adverb modifying the verb in the clausal subject. 50314 sets up parameters for and calls the implied adverbial process of Selector 70. 50314 sets Invocation-Modification-Set to ADJ; Invocation-Verb is set to the verb of the clausal subject; Invocation-Opcode is set to ADJ-COMP-MOD; 50-Return is set to 50316; and 50314 calls 70[Invocation-Opcode, Invocation-Modification-Set, Invocation-Verb, M-Find, 50-Return]. M-Find is the status value of the implied adverbial process, and M-Find is true if the adjectives in Invocation-Modification-Set can be converted to adverbials which modify the Invocation-Verb. After processing at 70 is completed, 50316 is next, and is true if M-Find is true. 50316 is true if ADJ has an interpretation as a conversion adverbial modifying the verb of the clausal subject. 50316 being true implies that ADJ does not have a purpose relation to the clausal subject. Thus, if 50316 is true, the ADJ-COMP-MOD has set ADJ to modify Invocation-Verb, and 50310 is next. 50310 returns processing to the caller without storing the purpose processing symbol of 50308. If 50316 is false, 50308 is next, and stores the purpose processing symbol prior to 50310 returning processing to the caller. The validity of the stored purpose relation is determined in subsequent processing.

Adjective Word Sense Number Completion Processing

If the current invocation opcode is COMPLETION, 5012 is true, processing continues at 50500 which begins Adjective Word Sense Number Completion Processing. Completion Processing is typically called by Step 18 after all word sense number selection processing of the current sentence is completed. Completion processing assigns pointers to the purpose relations associated with each state and value or value range selected during function word and state representation word processing of the words in the current sentence as described above in the preceding description. The new states and their associated values, selected in state representation word processing, and processed for completion processing, are used by Purpose Identifier 140 to relate the current sentence to the context of the conversation and previously stored experience and knowledge. The states of the current sentence processed in this Completion Process include: the result states of verbs, the states associated with stated adjectives, morphological words with adjective bases, adjectives with modifying adverbials with delayed evaluation functions, etc. The states which are processed for an invocation of completion processing are gathered into Invo-State-Set by the caller.

Adjective Word Sense Number Completion Processing begins at 50500. 50500 is true if there is an unprocessed state in Invo-State-Set. If 50500 is false, completion processing is finished, and 50502 returns processing control to the caller. If 50500 is false, 50504 sets Cur-State to the next unprocessed state in Invo-State-Set. After 50504, 50506 is next, and is true if Cur-State's stated adjective has adverbial modifiers with delayed evaluation functions. Certain adverbial modifiers of adjectives have delayed evaluation functions. There are several types of such adverbial modifiers, but typically, such adverbials are time and space position setting adverbials which actually modify the owner of the stated adjective. Such adverbials have delayed evaluation functions because the adverbial subclasses are selected prior to the selection of the owner's word sense number. When such delayed evaluation functions are evaluated, they set the adverbial to modify the owner of the evaluated function and add the adverbial subclass to Context Memory 120. When such adverbials directly modify a noun, they are treated as direct modifiers of the noun like adjective and noun modifiers as described above. Such modifiers perform functions similar to the adjective and noun modifiers, but these modifiers also have a function which sets up the modifier to be added to the adverbial context when the noun they modify is added to the context. For example, the sentence, "John was sick at home yesterday.", has the space position adverbial, "at home", and the time position adverbial, "yesterday" modifying the adjective "sick". These adverbials actually set the space and time positions of "John". Hence, this example sentence can be stated as: "John was at home yesterday, and John was (simultaneously) sick." If 50506 is true, 50508 evaluates any delayed evaluation functions of the adverbials modifying the word associated with Cur-State. Other types of modifying adverbials with delayed functions are only related to timing considerations of the evaluation. After 50508, or if 50506 is false, 50510 is next, and is true if Cur-State and/or its associated value or value range is new to the context of the conversation. If 50510 is true, 50512 stores Cur-State, its value or value range, and a pointer to Cur-State's nearest owner entry in Memory 80 at New-State-Set. If 50510 is false, 50514 stores Cur-State, its value or value range, and a pointer to Cur-State's entry in 120 at Found-State-Set. After 50512 or 50514, 50500 is next as described above.

PURPOSE IDENTIFIER 140 DESCRIPTION

Purpose Storage

A PURPOSE is a stored combination of one or more clauses, and this combination contains experience and knowledge which can be more complicated or more detailed than can be contained in a single clause. A stored purpose can be expressed in natural language. Each clause is represented by a verb word sense number, abstract noun word sense number, or an adjective word sense number. A purpose is related to a clause's verb word sense number state (i.e., a result state and value), or to an adjective or state abstract noun's word sense number state (i.e., an owner's state and value). Examples of the general knowledge and experience contained in general purpose types include: actions to achieve a result, e.g., a purpose comprised of instructions to put a bicycle together; actions to achieve a verb word sense number result state (a process), e.g. a purpose comprised of actions to login on a remote data base; description of an event, e.g., a purpose comprised of occurrences during a vacation; information related to a situation (a set of related states and their values), e.g., the advantages gained from exercising; actions and information combined to achieve a result, e.g., a purpose comprised of steps to solve a problem with the reasons for selecting some or all of the steps; reactions to a situation; predictions for occurrences resulting from a situation; consequences of a situation; motivations for performing actions or reaching a state value; the normal states and actions of computer software or hardware; an online manual; etc.

Purposes are used in the process of interpreting incoming natural language in terms of stored experience and knowledge. Other uses of purposes include: a source of outgoing natural language; storage of methods for solving problems; storage of methods for learning new experience and knowledge; storage of methods for controlling communication, i.e., the Communication Manager; etc. The last two listed uses of purposes differ from the other described purposes in that these two types of purposes contain knowledge and experience of internal structures and processes Purposes such as methods for learning and the Communication Manager are called INTERNAL PURPOSES because such purposes are not directly related to natural language conversations. Purposes directly related to natural language conversations are called EXTERNAL PURPOSES.

External purposes have a relation to an adjective, verb, or abstract noun. Purposes stored in Adjective and State Abstract Noun Purpose Memory 110 are associated with an owner's state and value of an adjective or an owner's state abstract noun and its value. For example, an entry in Memory 80, as depicted in FIG. 20*b*, has a pointer to a structure in Memory 110 which contains purposes related to the entry. Purposes stored in Memory 130 are associated with a verb word sense number. For example, an entry in Memory 100, as depicted in FIG. 19*f*, has a pointer to a structure in Memory 130 which contains purposes related to the entry. The structures of purposes in Memories 110 and 130 have the same format as is described below. However, the information content of purposes of Memory 110 will differ with the information content of purposes of Memory 130. Internal purposes have a relation to the processes of this description.

All purposes have an address which is used to access the purpose associated with its address. A purpose is realized as a combination of clauses. The combination of clauses is a chain or tree of chains of clauses. A chain of clauses is a sequential string of clauses without branches. A tree of chains contains multiple chains of clauses such that except for the root of the tree and a leaf of a tree, one chain is connected to one or more chains at such a chain's beginning or end. Leaf and root chains are connected to other chains only at their beginnings and endings respectively. Multiple chains follow a chain at a branch. A branch can have criteria composed of states and values and other requirements which can be utilized for the selection of the next chain to include in the purpose being considered. A tree with selection criteria at branches is used to select the realization of the purpose. For example, consider the process to realize the word sense of a verb, and hence its associated clause. Such a process is in general determined by searching through its tree until a leaf is reached. The search begins at the root node of the process. This root node contains access conditions which select the next possible steps of the processes which are possible given the context of the conversation. The leaf node of a process corresponds to the result state which the process implements.

Figure 21E:
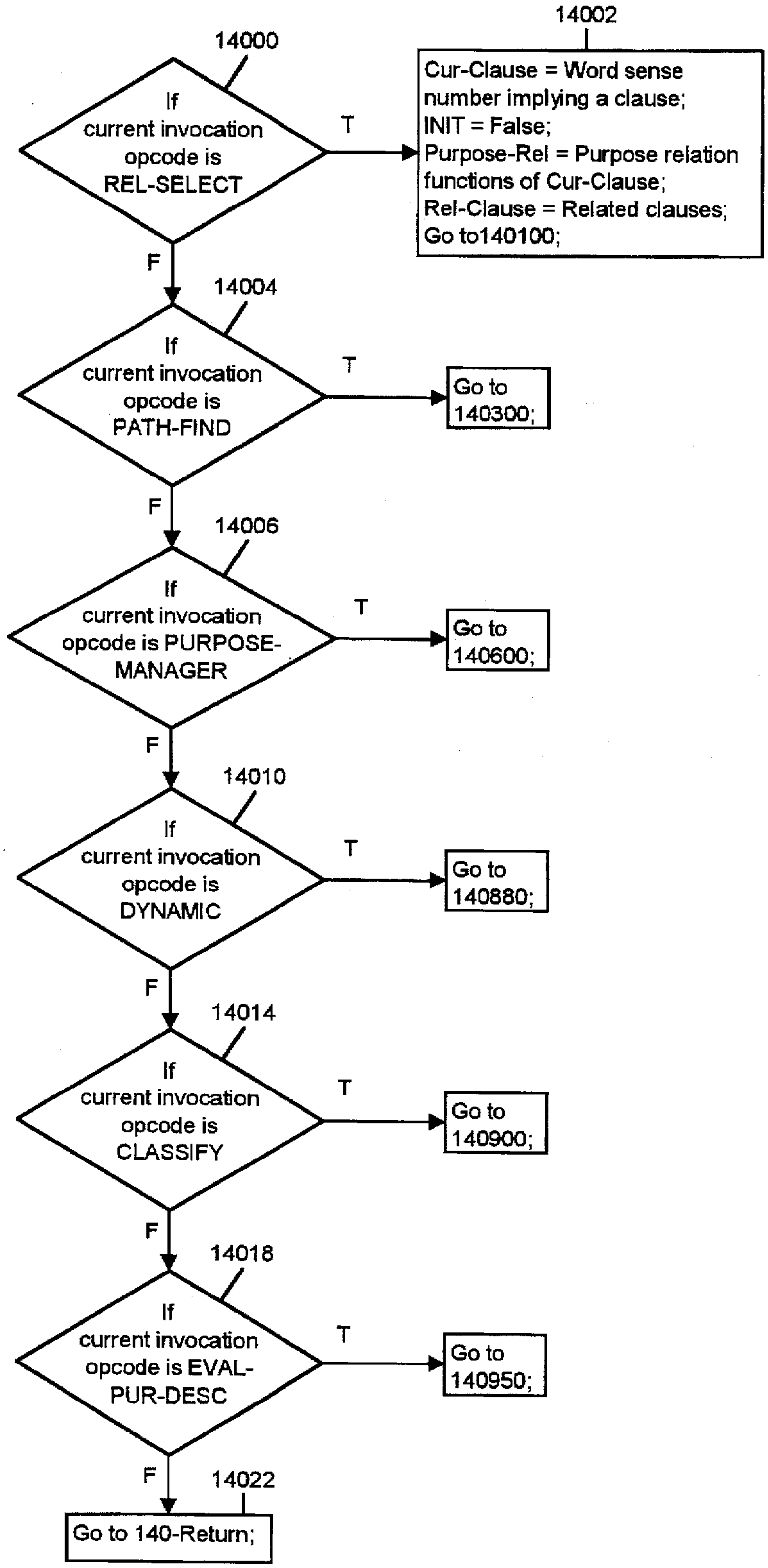
FIGS. 21*e*–21*v* is a flow chart for the purpose identification and other methods related to purpose processing.
Figure 21F:
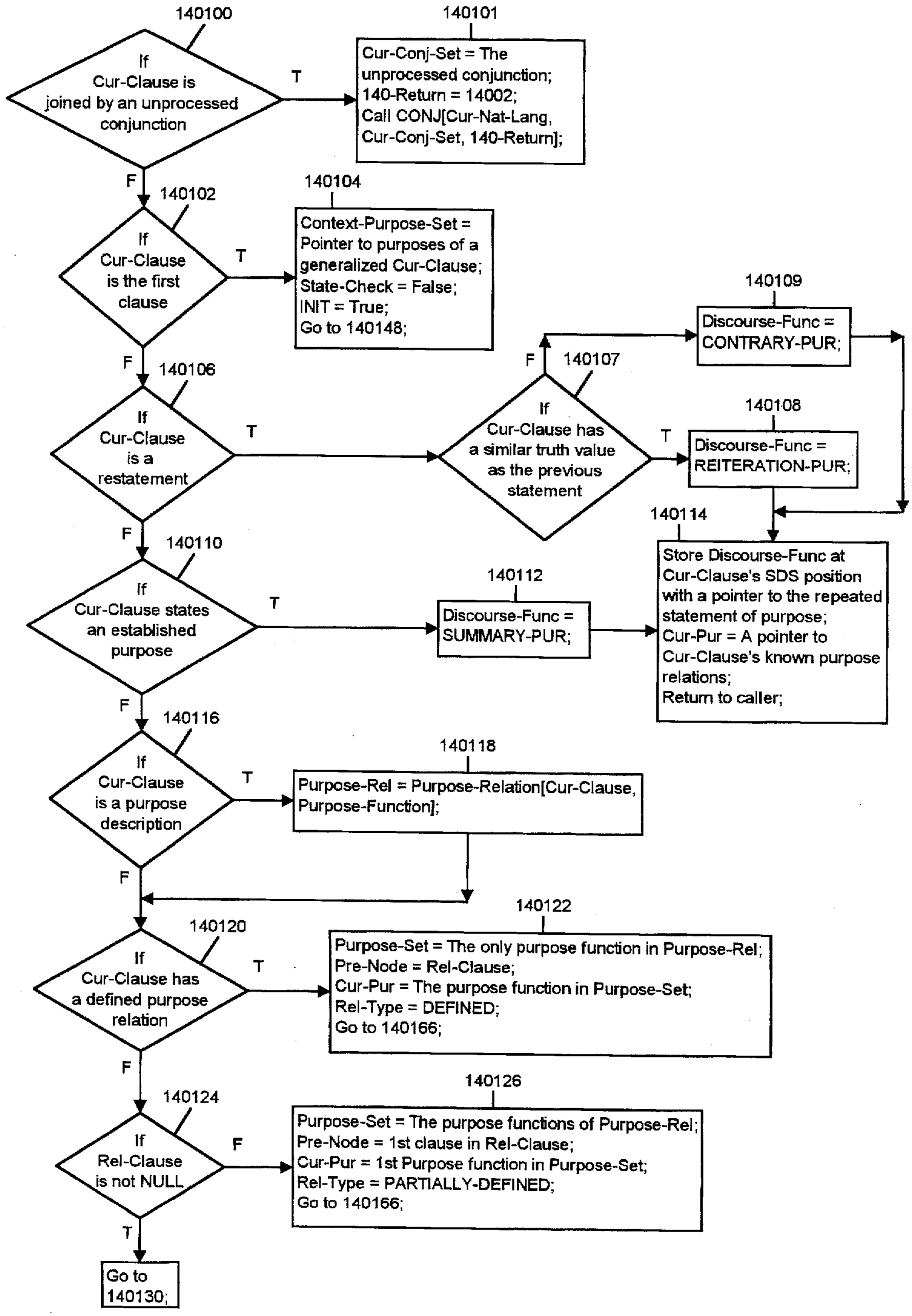
FIGS. 21*a*–21*d* illustrate the format for purpose addresses, the format for purpose node entries of Memories 110 and 130, the format for purpose node realization entries of Memories 110 and 130, and the format for entries of Memory 150 respectively.
Figure 21G:
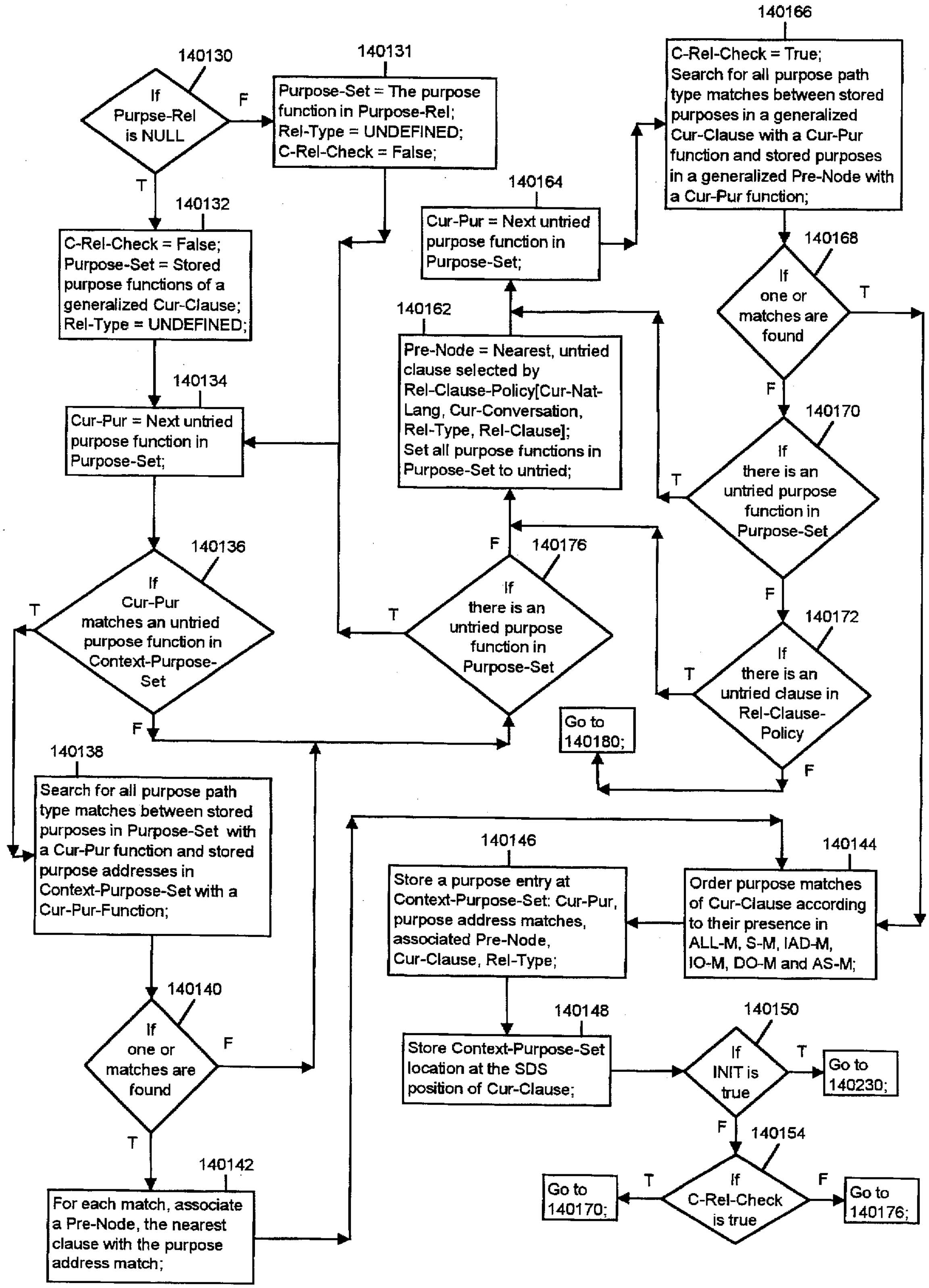

All stored purposes can be accessed through a purpose address. A purpose address is composed of an identification number and a descriptor as depicted in FIG. 21*a*. The identification number is composed of a location and a function number. The location in a purpose address contains the base address of a purpose node table in Memories 110 or 130 plus an entry number in the purpose node table. The contents of the entry at the location of the purpose address is associated with the word sense number which owns the purpose table. The contents of a purpose table entry is depicted in FIG. 21*b* and is described below. The function number of a purpose address is the type of purpose. The general types of purposes are: motivation, consequence, advantages, process realization, purpose selection requirement, comment, preference, emotion, goal, conditions, etc. A purpose type is any concept that labels a clause or more than related clause. The function number can contain a subtype component which selects a more specific category of the general purpose type. The descriptor of a purpose address contains a path type number, a path specificity number, and an experience number set. The path type number is related to the purpose. The path type number selects one set of paths in a purpose tree. The set of set of paths of a path type number have the same leaf node. However, a particular path in this set has at least one sub-path unique to this particular path. Such sub-paths have an associated path specificity number. If the purpose tree has only one path, the associated purpose only has a zero path type number and zero path specificity number. Note, the definition of trees that is being used here is not the strict mathematical definition of "tree". Trees are being used here because they make it conceptually easier to understand this description. The strict mathematical term for the data structure being used here is a directed graph. A strict mathematical definition of "tree" does not allow a branch at one node of a tree to rejoin one or more alternate branches at a subsequent node, but a directed graph does. Thus, a purpose type can have paths with alternate sub-paths which eventually lead to the same leaf node in the definition of tree here. A directed graph and the realizations of a tree used here have an implicit direction.

The experience number set of a purpose address is a set of experience numbers related to the constituents participating in the purpose realization. A set is used to allow for multiple realizations in experience for the same path. Each particular experience number is common to the nouns, verbs and adjectives comprising a specific instance of the clauses of the purpose associated with the purpose address. The experience number of a noun implies that the noun meets the requirements of the verbs in a purpose having the same experience number for the sentence roles which the noun participates in as a sentence role. The experience number of a noun may qualify it for multiple purposes which have the same experience number in such purposes' experience set component of their purpose addresses. A zero path specificity number for a purpose, which requires a zero experience number set, corresponds to the typical path type with typical nouns utilized in the realization of such a purpose. A non-zero experience number is unique to a specific experience. A unique experience can be accessed in Memories 110 and/or 130 through one or more purposes.

Each verb word sense number, state adjective word sense number, and abstract noun word sense number, can own a purpose node of entries in Purpose Memory 110 for adjectives and state abstract nouns or in Purpose Memory 130 for verbs and clausal abstract nouns. Concrete nouns can own a purpose node through a function A-Relation. FIG. 21*b* depicts a general purpose node entry of an owner word sense number in Memories 110 or 130. This entry contains the owner word sense number, a purpose address function index, and a verb word sense number owner's clause constituent initial states. The owner word sense number identifies the clause or state related to the purposes in the node. The node can contain purposes which are owned by the owner word sense number such as the process which realizes the owner word sense number. The node can also contain purposes which own the owner for the realization of the owning purpose. In either type of purpose (owned or owning), the owner word sense number implies an expressible natural language clause which can be utilized for incoming or out-going natural language. For example, a verb word sense number implies a clause which is the verb word sense number's associated clause. The state and value of an adjective's word sense number can be expressed in English as a clause with the form: (adjective's owner) ("to be" verb form) adjective phrase). The state and value of a state abstract noun can be expressed in English as a clause with the form: (state abstract noun's owner) ("to have" (in the sense of "to possess") verb form) (state abstract noun and optional value setting modifier). A clausal abstract noun implies an expressible clause, its characterizing clause.

The purpose address function index is used to look up the stored purpose realization entries in 110 or 130 which are related to the owner word sense number for a given purpose address function type. Realization entries are depicted in FIG. 21c which is described below. The purpose address function index is composed of quadruplets partitioned by purpose function type. Each quadruplet contains a purpose address, a pointer to the realization entry in Purpose Memory 110 or 130, the succeeding link entry address of the purpose, and the relative frequency of the quadruplet's usage relative to the other quadruplets with the same function of the same function partition. Succeeding link entry addresses are described for FIG. 21d which is described below. The link entry component of the quadruplet is used for expression of a specific purpose, or the typical realization of a general purpose. A verb word sense number owner's clause constituent initial states component of a purpose node entry contains the assumed initial states of constituents in the clause of the owner's verb word sense number. These assumed initial states are the starting states of the process which realizes the verb word sense number. For example, some assumed initial states for the owner's clause: "John edited his thesis on the computer." is that the "to edit" process is started with "the computer" "booted", i.e. "initialized", and the "text editor program" "started". Note that a clause constituent can be implied as the "text editor program" in the example. Expressing a purpose, including processes for outgoing natural language for example, is accomplished by expressing the clause at the root node first, and then expressing the clauses in the succeeding purpose chains sequentially until the leaf clause is reached at the leaf node. A purpose is described in general by its purpose function in relation to its owner. A purpose function is the type of purpose such as motivation, consequence, advantages, etc. For example, a process is described in general as: "A set of clauses which describe the realization of the result states of the process's verb word sense number." A more specific example is the process description for "to turn a radio on": "Activate the power switch to the on position." where "activate" is realized as "push power button in", "turn power switch to the on position", "flip the power switch to the on position", etc. Note that the doer of the word sense number performs the process in this example.

The format for an entry of a purpose realization table is depicted in FIG. 21c. A purpose realization entry in general contains the purpose node address(es) of the purpose address (es) which utilizes the entry and its associated owner clause in the realization of the purpose of the purpose address. Purpose node entries are depicted in FIG. 21b. This component of the realization contains one or more purpose node entry addresses. Each purpose node entry address can have an optional path specificity number vector. One purpose node entry address selects a single purpose. A purpose node entry address plus a specificity number vector selects purposes with common identification number, common path type number and with the corresponding specificity numbers in the specificity number vector. The specificity number vector contains a set of positions. Each position corresponds to a specificity number of a purpose node entry with the common identification number, and the common path type number associated with the vector. A "one" in a position implies a purpose address comprised of the common identification number, the common path type number, the corresponding specificity number, and the experience number set associated with the specificity number in the purpose node entry. This corresponding purpose address's purpose has the purpose realization entry and contains this entry's corresponding owner clause in its realization. A "zero" in the specificity number vector implies that the corresponding purpose address does not contain the purpose realization entry in its realization. The specificity number vector add the advantage that multiple purpose addresses with common identification and path type numbers with any subset of path specificity numbers can be compactly represented. Such multiple purpose addresses represented in this way correspond to the purpose realizations of such multiple purpose addresses which have the associated purpose realization entry and owner clause in common. As will be described below, it is possible to eliminate an owner clause and its purpose realization entry from consideration as a possible realization of a purpose. When an owner clause and its purpose realization entry are eliminated, the corresponding purpose addresses are also eliminated. Thus, the compact purpose address structure also allows for efficient elimination of purpose addresses which can not be realized in the current context. The purpose node address component can contain one or more owning purpose node entry addresses plus an optional specificity number for each purpose node entry address.

A purpose realization entry also contains zero or more purposes which are related to the entry's owner clause in the context of the purpose utilizing the clause in the purpose's realization. The types of purposes in a purpose node entry optionally include: a process application vector or process entry number, consequence purpose addresses, motivation purpose addresses, and other addresses. The other addresses include purpose addresses with purpose function types such as: advantage/disadvantage, benefits, comments, alternatives, qualities, conditions, requirements, unusual circumstances, problems, etc. The other addresses also include addresses to state representations related to the owner clause such as a group of nouns utilized in classification purposes. For example, a classification purpose for "homework problems" has a pointer to a group of textual cues including: numbered paragraphs, specific labels, etc. A purpose entry in general also contains an address to an entry in Experience and Knowledge Memory 150. The format for the entry in 150 is depicted in FIG. 21d and is described below. The entry in 150 is linked to related entries in 150 with addresses to purpose realization entries in 110 or 130.

There are two basic classes of purpose realization entries in 110 or 130. The first class of purpose realization entry contains the owner clause in the purpose realizations associated with the entry. This class of purpose entry contains the purpose node address component, the process application vector or number component, zero or more related purpose address components, and a Memory 150 entry address component. The second entry class contains the purposes which are owned by the owner clause. Purpose realization table entries of purpose realizations owned by the owner clause have the same components of a purpose entry as depicted in FIG. 21c except for a specialization for the process application vector or number. The purpose node table entry containing the purposes owned by the owner clause contains the process entry number corresponding to the typical process for achieving the owner clause. One other exception is that the purpose realization table entry containing the purposes owned by the owner clause does not have a Memory 150 entry address component. The purposes owned by the owner clause are of two basic types. One type of owned purposes of an owner clause are processes to achieve the verb word sense number result state or state value of the owner clause. The other type of owned purposes of an owner clause are motivations, consequences, and various types of purposes. These other types of owned purposes are purposes of the owner clause which are generally applicable to all purposes of the first entry class in the owner clause's purpose table, i.e., those purposes utilizing the owner clause in the realization of those purposes. In other words, the other types of purposes of the purposes owned by the owner clause are generic to the owner clause. For a purpose realization entry of the first class, these other types of purposes are specific to the purposes owning the purpose realization entry.

The first class of purpose realization entry contains the owner clause in the purpose realizations associated with the entry. Each purpose node entry address of this first class of purpose realization entry can have an associated process application vector or number for each purpose node entry address's associated specificity vector. A purpose realization address with a specificity vector which contains specificity numbers that require different processes for different specificity numbers of the specificity vector has process application vectors. Other purpose realization addresses without a specificity vector or with a specificity vector which contains specificity numbers which have the same process for all the specificity numbers in the specificity vector have a process number. The process application vector contains a process number at a position which corresponds to a specificity number position of its associated specificity vector, and this process number selects a process which realizes the owner clause part of the purpose associated with the purpose address containing this specificity number. This process achieves the states associated with the owner clause in the purpose realization. A purpose realization address without a specificity vector has a process number which corresponds to a process which achieves the owner clause in the purpose realization of such a purpose address. The process number corresponds to the process's entry number in the process purpose function partition of the owner's purpose node table. A purpose node table is depicted in FIG. 21*b*. Thus, the process number selects a process from the table entries of processes achieving the owner clause. However, processes are optional owned purposes for an owner clause. For example, the process to achieve an owner clause may be unknown.

The remaining type of entry associated with a purpose is the Experience and Knowledge Memory 150 purpose realization link entry, and the format for this Memory 150 link entry is depicted in FIG. 21*d*. A purpose realization entry, as depicted in FIG. 21*c*, has a Memory 150 entry address component. The Memory 150 link entry indicates how its associated purpose realization entry is related to other purpose realization entries in the purpose realization associated with a purpose address. One component of a Memory 150 link entry is the Purpose Realization Entry Address. This component of a link entry contains the address of the purpose realization entry which has the address of this Memory 150 link entry. Thus a purpose realization entry and its associated link entry have address components which point to each other. Another component of a link entry is the Link Type. A link type component of a link entry has a value which indicates the relation of its link entry to the tree of link entries which contain knowledge and experience to combine their associated purpose realization entries to store possible purpose realizations. The link type values are triplets of integers. The first integer corresponds to the number of preceding link entry addresses that this link entry is combined with, the second integer corresponds to the number of concurrent link entry address sets that this link entry is combined with, and the third integer corresponds to the number of succeeding link entry addresses that this link entry is combined with. For example: the pair (0, 0 or greater, 1 or greater) occurs when the link entry's associated owner clause is the first clause in the purpose with 0 or greater concurrent other concurrent clauses in the purpose; the pair (1 or greater, 0 or greater, 0) occurs when the link entry's associated owner clause is the last clause in the purpose with 0 or greater concurrent other last clauses realizing the purpose; the pair (1 or greater, 0 or greater, 1 or greater) occurs when the link entry's associated owner clause is between the first and the last clause in the purpose with 0 or greater concurrent clauses in the purpose. A realization of a purpose of a link entry has one succeeding and/or preceding link entry and one link entry for each concurrent address set. Each concurrent address set corresponds to a set of purpose chains which starts at the link entry containing the concurrent address set. In a realization of a purpose, only one concurrent address in a concurrent address set is utilized, but more than one address set can be utilized. A realization of a purpose corresponds to selecting the clauses which comprise the purpose in the current context.

Another component of the Memory 150 purpose link is the Level Number and Order Type. The level number is the number of purpose link entries, i.e. clauses, between the owner clause of the entry link and the start of the purpose realization. The order type has a non-null value of either SET or VARIABLE. SET means that the owner clause in a realization of a purpose is fixed in its order with respect to the owner clause's preceding, concurring and/or succeeding clauses. VARIABLE means the order is not fixed. The order type is SET for a specific purpose, and the order type can be VARIABLE for a purpose with zero specificity numbers and/or with zero experience numbers, i.e., a non-specific purpose. One example of a purpose with a VARIABLE order type is a purpose with a classification function. Such a purpose can be used to classify a portion of text for example. The kinds of classifications include: certain clausal abstract nouns such as "homework problem", descriptions of human experience, instructions, etc.

Three related sub-components of the purpose link are: Preceding Link Entry Addresses, Concurrent Link Entry Addresses, and Succeeding Link Entry Addresses. The Preceding, Concurrent and Succeeding Link Entry Address components contain the locations of link entries in Memory 150 which are respectively preceding, concurrent, and succeeding with the owner clause's link entry. Preceding link entry addresses are possible for all link types except the first link entry of a purpose realization. Concurrent link entry addresses are possible for all link types. Succeeding link entry addresses are possible for all types except for the last link entry. Succeeding and concurrent purpose memory addresses can optionally have access conditions. Preceding addresses do not have access conditions because the preceding link entry contains any access conditions. A preceding address contains the position in the preceding link entry (if any) of the succeeding address which points to the entry containing such a preceding address. The succeeding address can contain any optional access conditions. Succeeding and concurrent addresses only contain the succeeding and concurrent link entry address, and they do not contain the location of a specific access condition and its associated address.

An access condition must be satisfied for a succeeding or concurrent link entry's clause to be realized for the purpose. The access conditions in the current link entry do not normally contain states and values which are set prior to the current link entry unless the state could change. Such changeable states are marked. Such state values are handled this way to ensure that a purpose realization which is being selected in the reverse order, and hence is using preceding link entry addresses, is not blocked by a state value in an access condition that is set in a preceding link entry's owner clause. The marked states are ignored for reverse order purpose path selections. Also, concurrent paths are not considered for reverse order purpose path selections because concurrent paths can not be selected in reverse order. The concurrent paths can not be selected in reverse order because concurrent paths are related at their beginning to the path they branch from. For a specific purpose address realization, which is processed in the forward order, a concurrent path has a known relation to the other paths comprising the specific purpose realization. When an unknown purpose is being selected in reverse order, the relation of a concurrent path to an unknown purpose realization is unknown because many concurrent paths are potentially possible, but only those concurrent paths which begin at paths which are selected later in the reverse order are actually possible. Thus, concurrent paths considered in reverse order may not be possible because their beginning point may not be reached. The reverse order purpose path selection process is used to relate stored experience and knowledge to a purpose being described in reverse order. The source of the description describes concurrent paths. The reverse order purpose path selection process can also be used to find a starting point of a purpose realization leading to a known existing situation. Once a reverse path has been selected, the path can be tested for viability by selecting the path in the forward direction with concurrent paths considered. These two reverse order purpose path selection process usages are general. Other usages are utilized for specific applications.

The access conditions for succeeding and concurrent clauses are utilized to create selection trees, parallel realizations of clauses within a purpose, and dynamic purposes. Dynamic purposes are implemented when the clauses succeeding and concurrent with the owner clause are access condition selected processes. An example of a dynamic purpose in English is "driving a car". The dynamic purpose which would realize "driving a car" contains many processes that are conditionally and dynamically selected such as: "starting an engine", "pulling out of a parking space", "steering", "stopping", "accelerating", etc. Another example of a dynamic process is for part of the implementation of the Communication Manager 160 which is implemented for an application as a set of processes utilizing internal processes and storage structures to accomplish the goals of the application.

Another component of a link entry is the Relative Frequency of Sequentially Related Link Entries. This optional component contains the relative frequency of one succeeding link entry address utilization relative to all of the alternate succeeding link entry address utilizations. The final component of the link entry is the Concurrent Address Set Entries Synchronization Type. A concurrent link entry address points to a clause of a purpose realization that is realized at some time which is before, at, after, within a range of time, or is unknown relative to the time which the clause of the owner clause of the link entry is realized. This relative time or synchronization has three types. The synchronization type is null for no known synchronization between the owner clause and the concurrent clause. The synchronization type is a number when the concurrent clause is realized at a time that is before, at, or after the start of the owner clause. The synchronization number is computed as the difference between the start of the owner clause and the start of the concurrent clause. The synchronization number is negative if the concurrent clause is started before the owner clause, the synchronization number is zero if the concurrent clause is started at the same time of the owner clause, and the synchronization number is positive if the clause is started after the owner clause. The synchronization type is a range when the concurrent clause is started within a range of starting times relative to the owner clause. The first number is the lower limit and contains the earliest relative starting time of the concurrent clause. The second number is the upper limit and contains the latest relative starting time of the concurrent clause. Each concurrent address can have a synchronization value. Those concurrent entries without a synchronization value, have a null value.

Purpose Processing

Purpose processing typically includes the processing of multiple clause communication applications. This multiple clause processing is used for applications such as: accessing experience and knowledge related to incoming natural language conversations, outputting natural language sentences corresponding to experience and knowledge related to an application, problem solving, explanation, learning, etc. In the following, the words or abbreviations in capital letters are the names of the Purpose Identifier 140 processes. The purpose processing of the includes: selecting a possible relation between a given natural language clause and the purposes in the context of a conversation (REL-SELECT), e.g., selecting that a clause is the motivation for performing another clause; selecting a possible set of natural language clauses that comprise the description of the realization of the relation between two given natural language clauses (PATH-FIND), e.g., selecting the set of clauses which describe the solving of a problem; selecting the purpose processing required for the application for the current context (PURPOSE-MANAGER), e.g., selecting plausibility and expectedness of an interpretation; processes to realize DYNAMIC, and CLASSIFYing Purposes; and a process to evaluate a purpose descriptor associated with a clausal abstract noun (EVAL-PUR-DESC).

The Purpose Identifier 140 processes are depicted in FIGS. **21*e*–21*v*. Purpose Identifier 140 processes are designated with a program call which includes an invocation opcode. When Purpose Identifier 140 is invoked, 14000 is the first step, and is true if the Invocation Opcode is REL-SELECT. If 14000 is true, 14002 is next. 14002 is described below in more detail. However 14002 sets processing to continue at 140100. If 14000 is false, 14004 is next and is true if the Invocation Opcode is PATH-FIND. If 14004 is true, processing continues at 140300. If 14004 is false, 14006 is next and is true if the Invocation Opcode is PURPOSE-MANAGER. If 14006 is true, processing continues at 140600. If 14006 is false, 14010 is next and is true if the Invocation Opcode is DYNAMIC. If 14010 is true, processing continues at 140880. If 14010 is false, 14014 is next and is true if the Invocation Opcode is CLASSIFY. If 14014 is true, processing continues at 140900. If 14014 is false, 14018 is next and is true if the Invocation Opcode is EVAL-PUR-DESC. If 14018 is true, processing continues at 140950. If 14020 is false, 14022 is next and sets processing to continue at 140-Return, a return address of a 140** process.

Selection of a Purpose Relation

If 14000 is true, 14002 sets up parameters for the REL-SELECT process. 14002 sets Cur-Clause to the invocation word sense number which implies a clause; Purpose-Rel is set to the purpose relation functions implied by a clause conjunctive function word of Cur-Clause or implied by certain usages which limit purpose relation functions such as nonfinite verb clauses or limited to certain purpose relation functions among the above implied purpose relation functions or set to one or more purpose relation functions by an application, or Purpose-Rel is set to NULL if there is not a conjunctive function word nor a limiting usage; Rel-Clause is set to the possible clauses in the purpose relations of Cur-Clause, or is set to NULL if the clauses in the purpose relations are not implied by the conversation; INIT is set to false which implies Cur-Clause is not the first clause of the conversation; and processing is set to continue at 140100. The REL-SELECT process determines a possible purpose relation between a given clause, Cur-Clause, and the possible purposes in the context of a conversation. The possible purposes are either stored in Purpose-Rel or are stored in Context-Purpose-Set, the set of established purposes or initially possible purposes. Purpose-Rel and Rel-Clause are used for defined or partially defined purpose relations. In certain cases, the purpose relation can be defined or partially defined. A defined purpose relation has one purpose relation function in Purpose-Rel and has a single clause in Rel-Clause from the conversation implied by a natural language statement such as: "Next, select the PRINT option." In this example, the clause is in the list with the same relation as the other clauses in the list of the conversation. A partially defined relation has a non-null Rel-Clause. For example, a partially defined purpose relation occurs when a main clause has one or more subordinate clauses with a subordinating conjunction that has one or more possible clauses that could have a purpose relation with Cur-Clause, and Cur-Clause is a subordinate clause in this example. A purpose relation is undefined when both Rel-Clause is NULL valued. For example, an undefined purpose relation occurs when there is no conjunction or conjunctive adverbial joining a sentence to a conversation. An undefined purpose relation first utilizes the established or possible purpose relations in Context-Purpose-Set.

After 14002, 140100 is next, and is true if Cur-Clause is joined by an unprocessed conjunction. If 140100 is true, 140101 sets Cur-Conj-Set to the unprocessed conjunction; 140-Return is set to 14002; and 140101 calls CONJ[Cur-Nat-Lang, Cur-Conj-Set, 140-Return]. After the conjunction is processed at CONJ as described above, processing continues at 14002 which sets Cur-Clause for REL-SELECT as described above. If 140100 is false, 140102 is next and is true if Cur-Clause is the first clause of the conversation. If 140102 is true, 140104 sets Context-Purpose-Set to a pointer to the purposes of a generalized Cur-Clause. The purposes of Cur-Clause are in its associated purpose node, as depicted in FIG. 21*b*. A generalized Cur-Clause is formed by zeroing the type, specificity and experience numbers of the word sense number implying Cur-Clause. The implying word sense number is the word sense number of a clausal abstract noun or verb, or the implying word sense number is the owner word sense number of a state abstract noun or state representation adjective. A generalized Cur-Clause is used in selecting the purposes because this allows all the possible purposes of an initial clause to be considered for purpose relations. 140104 also sets State-Check to false; INIT is set to true; and 140104 sets processing to continue at 140148. These later actions of 140104 set up an initial clause to be processed as is described below.

If 140102 is false, 140106 is next, and is true if Cur-Clause is a restatement. Cur-Clause is a restatement if its associated word sense number has previously been stored in Context Memory 120. If 140106 is true, 140107 is next, and is true if Cur-Clause has the same truth value within a range of plus or minus Interpretation-Range[Cur-Nat-Lang] as the truth value of the previously stated word sense number. Interpretation-Range[Cur-Nat-Lang] is a constant which is used to compensate for possible slightly different interpreted truth values between different modals. In other words, a communication source may think that two different ways of modal expression are equivalent, but this process assigns slightly different truth values for these two different ways. If 140107 is true, 140108 is next, and sets Discourse-Func to REITERATION-PUR. If 140106 is false, 140109 sets Discourse-Func to CONTRARY-PUR. 140110 is next, and is true if Cur-Clause states an established purpose of the conversation. If 140110 is true, 140112 sets Discourse-Func to SUMMARY-PUR. After 140108, 140109, or 140112, 140114 is next. 140114 stores Discourse-Func at Cur-Clause's SDS position with a pointer to the repeated statement or purpose; and 140114 returns to the caller. If 140110 is false, 140116 is next, and is true if Cur-Clause is a purpose description. Certain verb word sense numbers, abstract nouns, and morphological words indicate that a clause is the description of a purpose. Such verb word sense numbers set a purpose description result state. Such abstract nouns and morphological words contain a purpose description result state value. For example, "A failed relay caused the East Coast to lose power.", and "The goal is to obtain funding." have clauses which are purpose descriptions. In the first example, the "East Coast to lose power" is the owner of a purpose with a cause function and "failed relay" is a clause in this purpose. "to obtain funding" is the owner clause of a purpose with a goal function without further specification. If 140116 is true, 140118 sets Purpose-Rel to contain the purpose functions contained in Purpose-Relation[Cur-Clause, Purpose-Function]. Purpose-Relation[Cur-Clause, Purpose-Function] contains purpose functions that are associated with the expression of a purpose description with the purpose function implied by Cur-Clause.

If 140116 is false, or after 140118, 140120 is next, and is true if Cur-Clause has a defined purpose. If 140120 is true, 140122 sets Purpose-Set to the only purpose function in Purpose-Rel; Pre-Node is set to the only clause in Clause-Rel; Cur-Pur is set to the only purpose function in Purpose-Set; Rel-Type is set to DEFINED; and 140122 sets processing to continue at 140166 which is described below. If 140120 is false, 140124 is next, and is true if Rel-Clause is not NULL which implies that Rel-Clause contains one or more clauses possibly in a purpose relation with Cur-Clause. If 140124 is true, the purpose relation of Cur-Clause is partially defined, and 140126 is next. 140126 sets Pre-Node to the first clause in Rel-Clause; Purpose-Set is set to the purpose functions in Purpose-Rel; Cur-Pur is set to the first purpose function in Purpose-Set; Rel-Type is set to PARTIALLY-DEFINED; and processing is set to continue at 140166 which is described below. 140166 starts a process which searches for purpose relations between possible clauses.

If 140124 is false, processing continues at 140130. 140130 starts a process which searches for purpose relations between established purposes or possible purposes in Context-Purpose-Set. 140130 is true if Purpose-Rel is NULL. If 140130 is true, 140132 sets C-Rel-Check to false, Purpose-Set is set to contain the purpose functions of a generalized Cur-Clause, and Rel-Type is set to UNDEFINED. C-Rel-Check determines the method of purpose relation searching, and its function is described below. If 140130 is false, 140131 sets Purpose-Set to contain the purpose functions in Purpose-Rel; Rel-Type is set to UNDEFINED; and 140131 sets C-Rel-Check to false. After 140131 or 140132, 140134 sets Cur-Pur to the next untried purpose function in Purpose-Set. After 140134, 140136 is next, and is true if Cur-Pur matches an untried purpose function in Context-Purpose-Set. If 140136 is true, 140138 searches for all purpose address path type matches between stored purposes in Purpose-Set with a Cur-Pur function and stored purpose addresses in Context-Purpose-Set with a Cur-Pur function. After 140138, 140140 is next, and is true if one or matches were found at 140138. If 140140 is true, 140142 associates a Pre-Node with each match where a Pre-Node is defined as the nearest clause from the conversation with its purpose address match found at 140138.

After 140142, 140144 orders the found matches of Cur-Clause according to their presence in the purpose node of a word sense number associated with an entry in the preferred ordering of Cur-Clause's ALL-M, S-M, IAD-M, IO-M, D0-M, and AS-M sentence role matches. The preferred ordering of these terms is set for Cur-App, the current application. These terms are the types of sentence role matches determined at 70974. The goal of 140144 is to order purpose matches according to their relation to similar clauses of Cur-Clause which have stored purpose relations. For example, if Cur-Clause has an ALL-M match entry, Cur-Clause is the same or very similar to stored experience or knowledge of a previously stored clause. After 140144, 140146 stores a purpose entry in Context-Purpose-Set. A purpose entry contains: Cur-Pur, the found purpose address matches and their associated Pre-Node, Cur-Clause, and Rel-Type. After 140104 or 140146, 140148 stores the Context-Purpose-Set entry location at the SDS position of Cur-Clause's verb if Cur-Clause is not implied by a word, or at the SDS position of the word implying Cur-Clause. After 140148, 140150 is next, and is true if INIT is true. If INIT is true, processing of the first clause of a conversation continues at 140230. 140230 begins the processing of Cur-Clause for timing considerations as will be described below. If 140150 is false, 140154 is next, and is true if C-Rel-Check is true. If 140154 is false, purposes of Context-Purpose-Set are being searched for containing Cur-Clause in their purpose paths. This first type of search is started at 140130 as described above. If 140154 is true, purposes between stated clauses and Cur-Clause are being searched for. This second type of purpose is described below. If 140154 is true, processing continues at 140170 which is described in the second type of search below. If 140154 is false, processing continues at 140176 which begins processing of Cur-Clause for other detectable purpose relations including the first type of search, and which is described below.

If no Cur-Pur matches an untried purpose function in Context-Purpose-Set at 140134, 140136 is false. If no purpose address path type matches were found at 140138, 140140 is false. If 140436, 140140, or 140154 is false, 140176 is next. 140176 is true if there is an untried purpose function in Purpose-Set. If 140176 is true, 140134 sets Cur-Pur as described above. If 140176 is false, Cur-Clause has been processed for a stored purpose relation which matches an established or possible purpose in Context-Purpose-Set. In this case, a process is started to search for purpose relations between possible clauses. For undefined purposes, this process searches for unestablished purposes between clauses in the conversation and Cur-Clause. This process includes 140166 which is the entry point for defined or partially defined purposes.

If 140176 is false, 140162 is next. 140162 sets Pre-Node to the nearest, untried clause selected by Rel-Clause-Policy [Cur-App, Cur-Conversation, Rel-Type, Rel-Clause], and sets all functions in Purpose-Set to untried. Then Pre-Node's purposes will be searched for matching purposes of Cur-Clause. Rel-Clause-Policy is dependent upon the selection policy assigned for Cur-App and the stated clauses in Cur-Conversation. A general purpose Rel-Clause-Policy is to first select the clauses in Rel-Clause if any. Secondly, clauses which are position related to Cur-Clause are selected. Position related clauses include: the preceding clauses within a specified range, and clauses with a related function to Cur-Clause. An example of a related function would be among: the first sentence of a paragraph, the first sentences of other preceding paragraphs, and the clauses in a paragraph at the beginning of a conversation. The relation is that the first sentence of a paragraph is often a topic sentence, and the first paragraph often lists the main topics of a conversation. The third component of a general purpose Rel-Clause-Policy is selecting preceding clauses which contain some of the same sentence role constituents as Cur-Clause. For example, preceding clauses with the same subject, same verb, same direct or indirect objects and/or with the same adverbial subclass value are candidate clauses for a general selection policy. After 140162, 140164 sets Cur-Pur to the next untried function in Purpose-Set. After 140164, 140122, or 140126, 140166 is next. 140166 sets C-Rel-Check to true. 140166 also searches for all purpose address path type matches between a stored purpose in a generalized Cur-Clause with a Cur-Pur function and stored purposes in a generalized Pre-Node with a Cur-Pur function. After 140166, 140168 is next, and is true if one or more matches are found at 140166. If 140168 is true, 140144 is next as described above. If 140168 is false, or if 140154 is true, 140170 is next, and is true if there is an untried purpose function in Purpose-Set. If 140170 is true, 140164 is next as above. If 140170 is false, 140172 is next, and is true if there is an untried clause in Rel-Clause-Policy[Cur-App, Cur-Conversation, Rel-Type, Rel-Clause]. If 140172 is true, 140162 is next as above. If 140172 is false, processing continues at 140180.

140180 begins a process for selecting purpose relations of Cur-Clause which are detectable through the use of classification purposes. Although classification purposes are utilized in the preferred embodiment, other well known classification methods such as: decision trees, expert systems, and standard conditional statements of a programming language could be utilized as an alternate implementation. Classification purpose realizations are described in detail below this paragraph. The advantage of using classification purposes is that classification purposes expand the the capability to detect purpose relations beyond stored purpose relations. Another advantage of classification purposes is that they allow purpose relations to be deduced from situations rather than storing a classifiable purpose relation which saves storage space. The use of purpose relations from a generalized clause also allows stored purpose relations from stored experience and knowledge to be considered as possible purpose relations, and therefore broadens the detection of stored purpose relations in new situations. However, classification purposes are more efficient than stored purposes for purposes which can be characterized by a set of state values, a set of subclass values and/or a set of clause implying word sense numbers which are widely applicable to knowledge and/or experience. Classification purposes are not a replacement for stored purposes because certain purposes can not be detected through classification purposes. For example, cause purpose relations can not always be distinguished from a coincidental occurrence of a new experience. Classification purposes evaluate conditions comprised of state, subclass, and/or clause implying word sense number values which are related to a given clause and context. If the conditions are satisfied, the given clause receives a classification. For example, consider a motivation purpose. A motivation purpose can be of three basic types. One type of motivation purpose relation is that circumstances in the conversation motivates a human group doer to perform the given clause to be classified. A second type of motivation purpose relation is that an affected human group receiver of the given clause could motivate the receiver to react. A third type of motivation purpose relation is that the given clause implies a motivation for the human group doer of the given clause. An example of the general conditions which motivate a human group doer to perform a clause include: directive to perform the clause, benefits to the doer, and benefits to an affected receiver. These types of conditions are checked by looking up various state, subclass, and result state values and relations among such values which confirm or deny the truth of these conditions. The conditions are organized in general as terms of ANDed conditions, and there can be multiple terms which are ORed, i.e., a sum of condition products. If all the conditions are true for a term, the given clause is assigned the associated purpose relation. A classification purpose can also contain clause templates for purposes which are beneficially characterized with templates. The templates are treated as conditions which are true if a clause matches the template. For example a proportion purpose can be characterized by templates. An example of a proportion purpose relation is: "The more he won, the more he smiled." The conditions and templates are customized to a particular application.

Figure 21H:
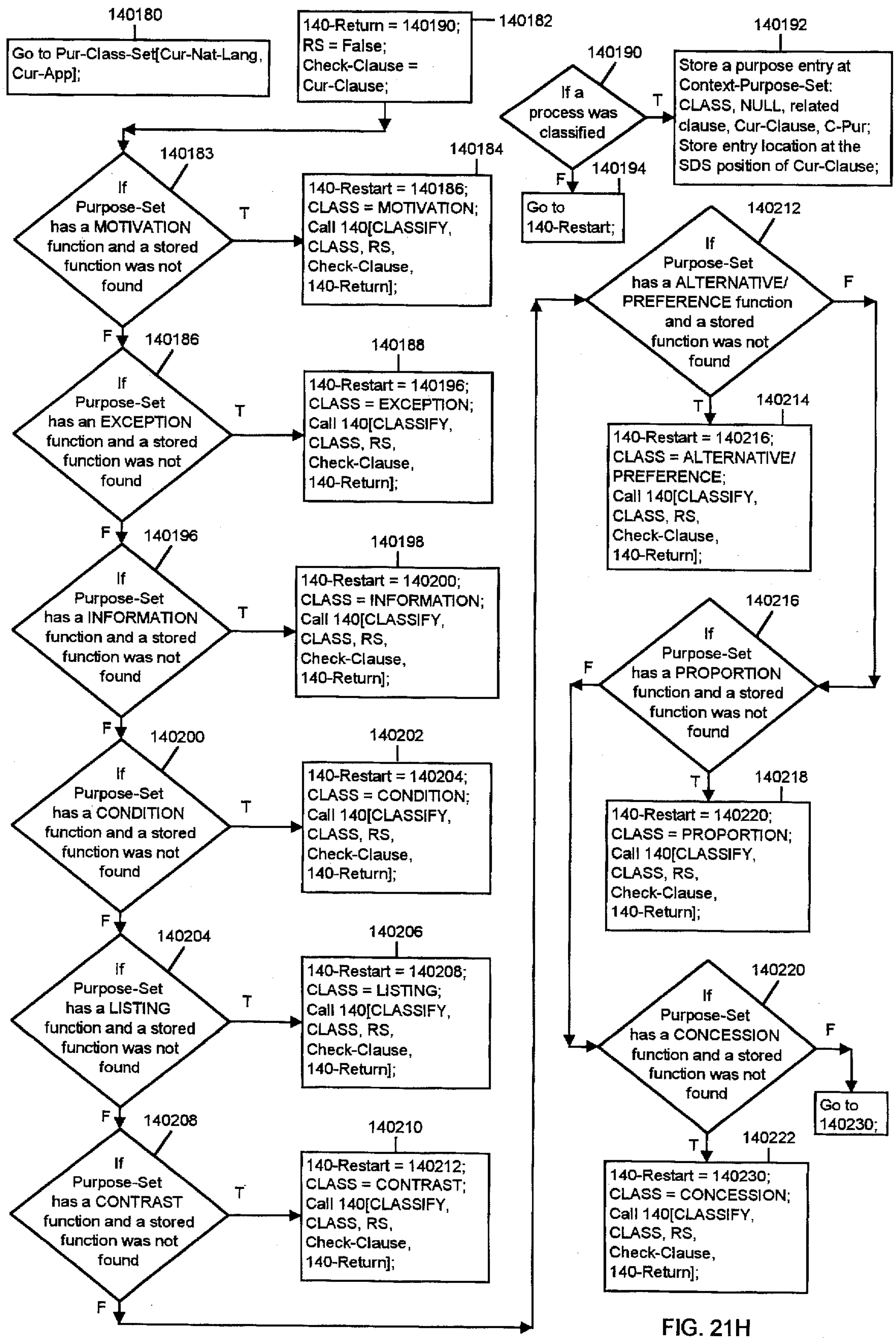
Figure 21I:
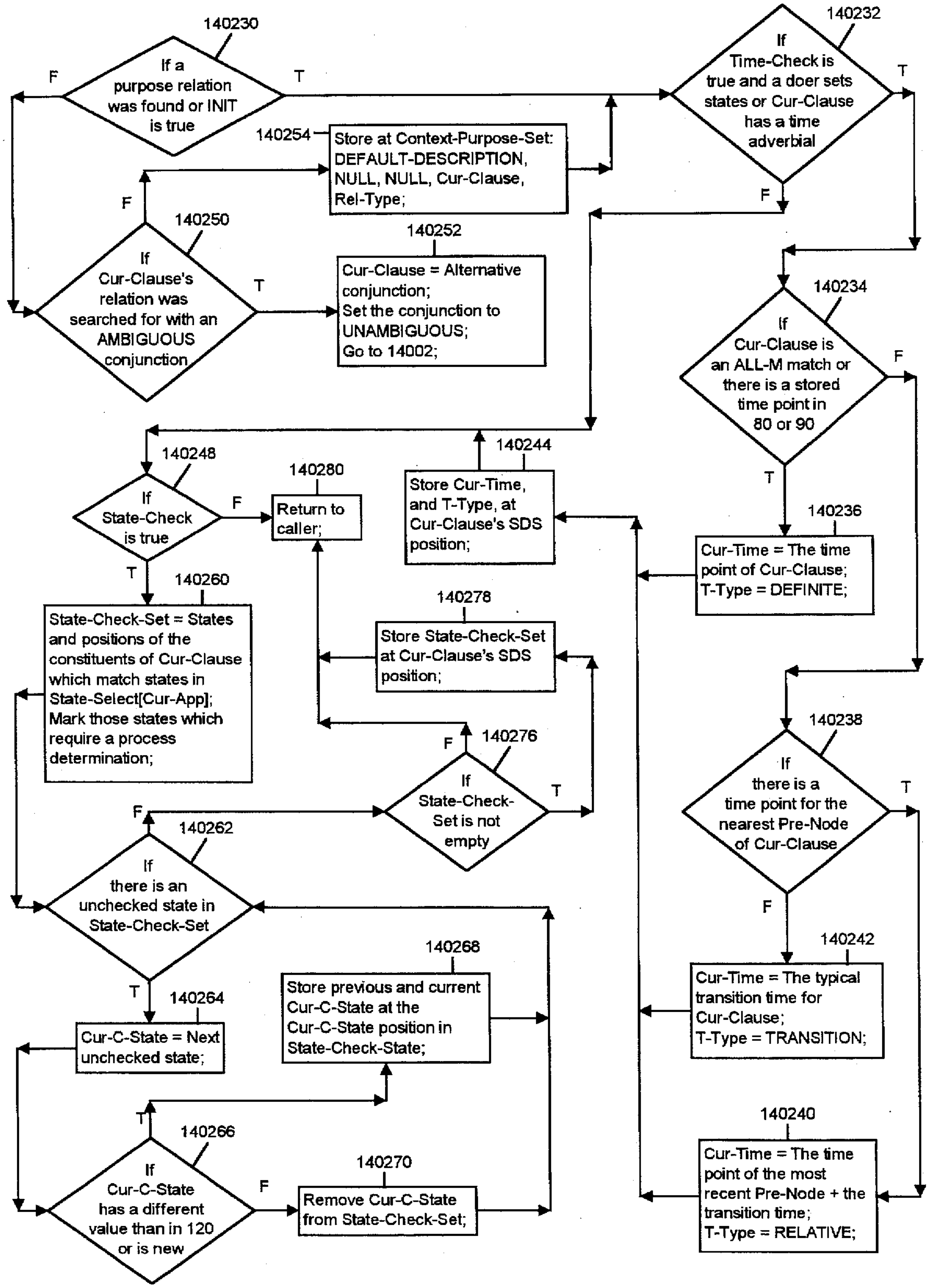
Figure 21J:
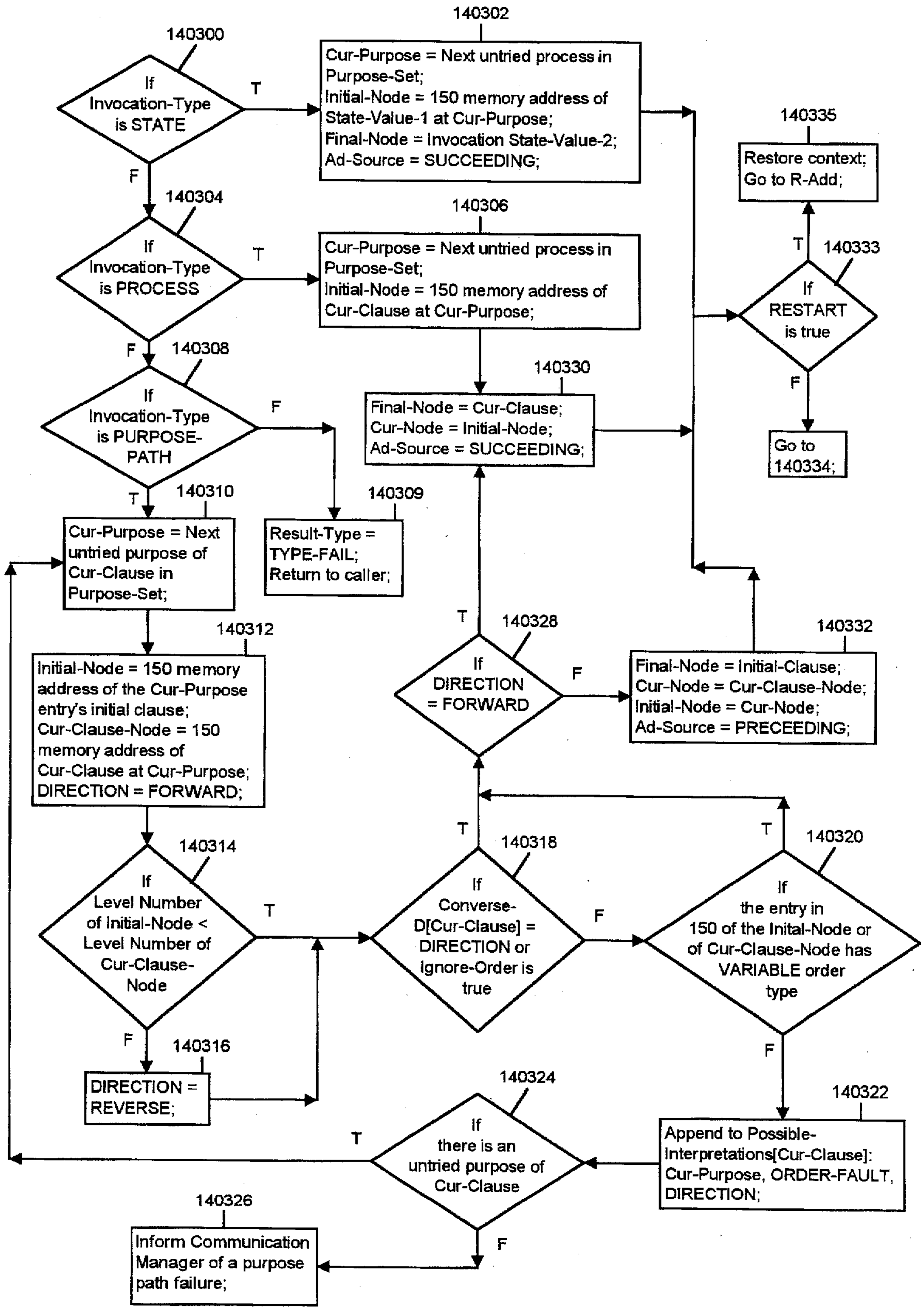
Figure 21K:
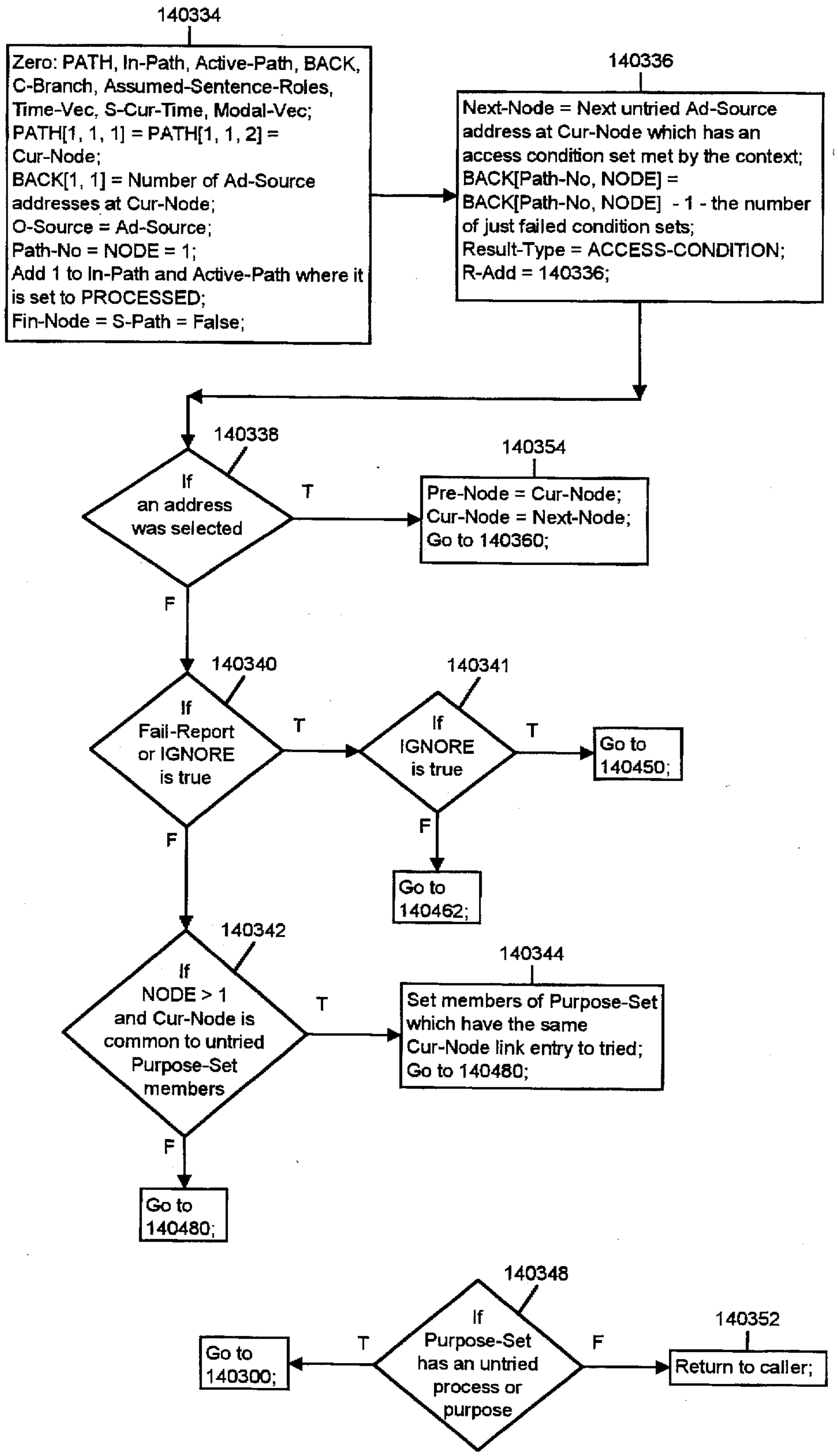
Figure 21L:
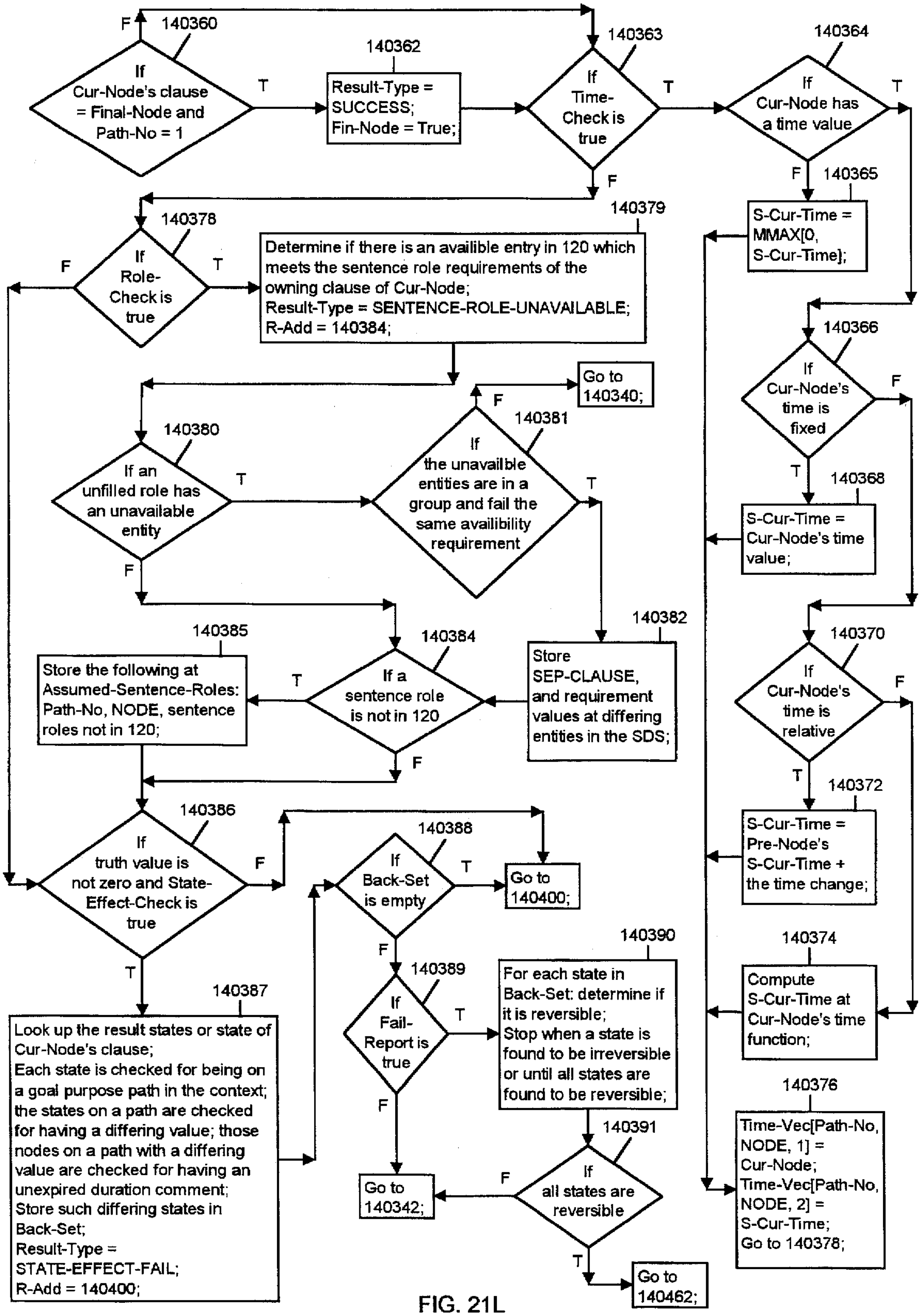
Figure 21M:
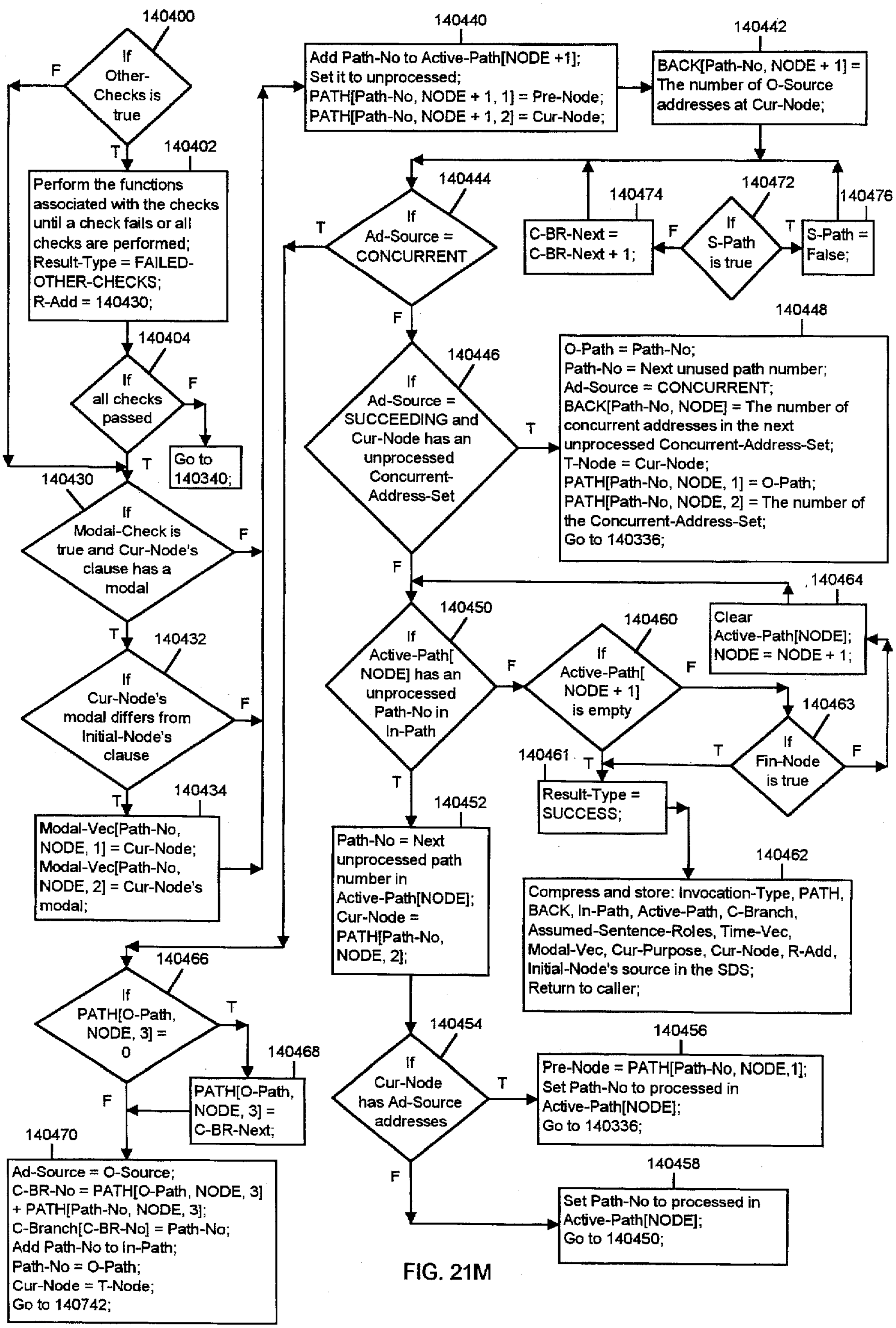
Figure 21N:
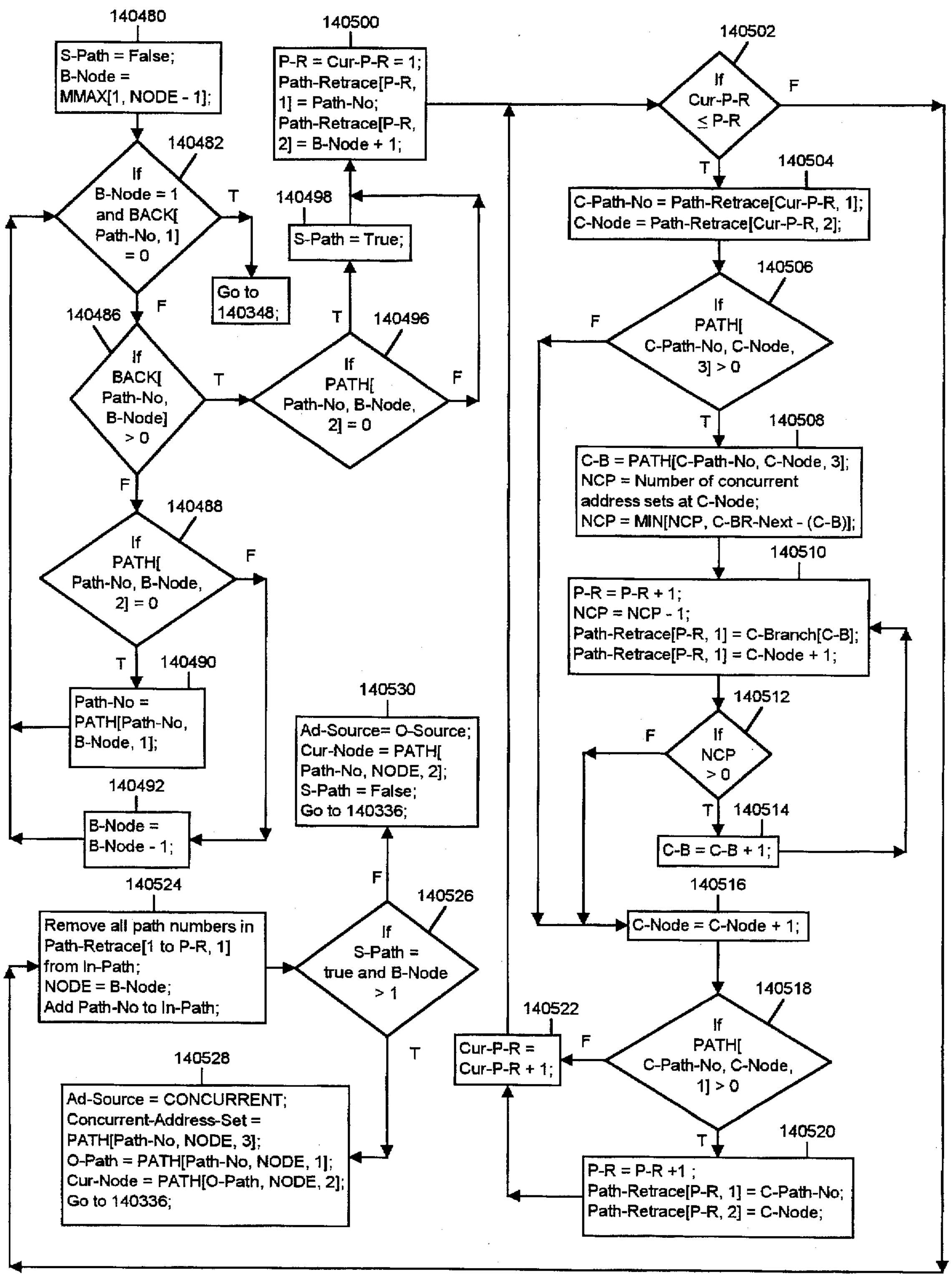
Figure 210:
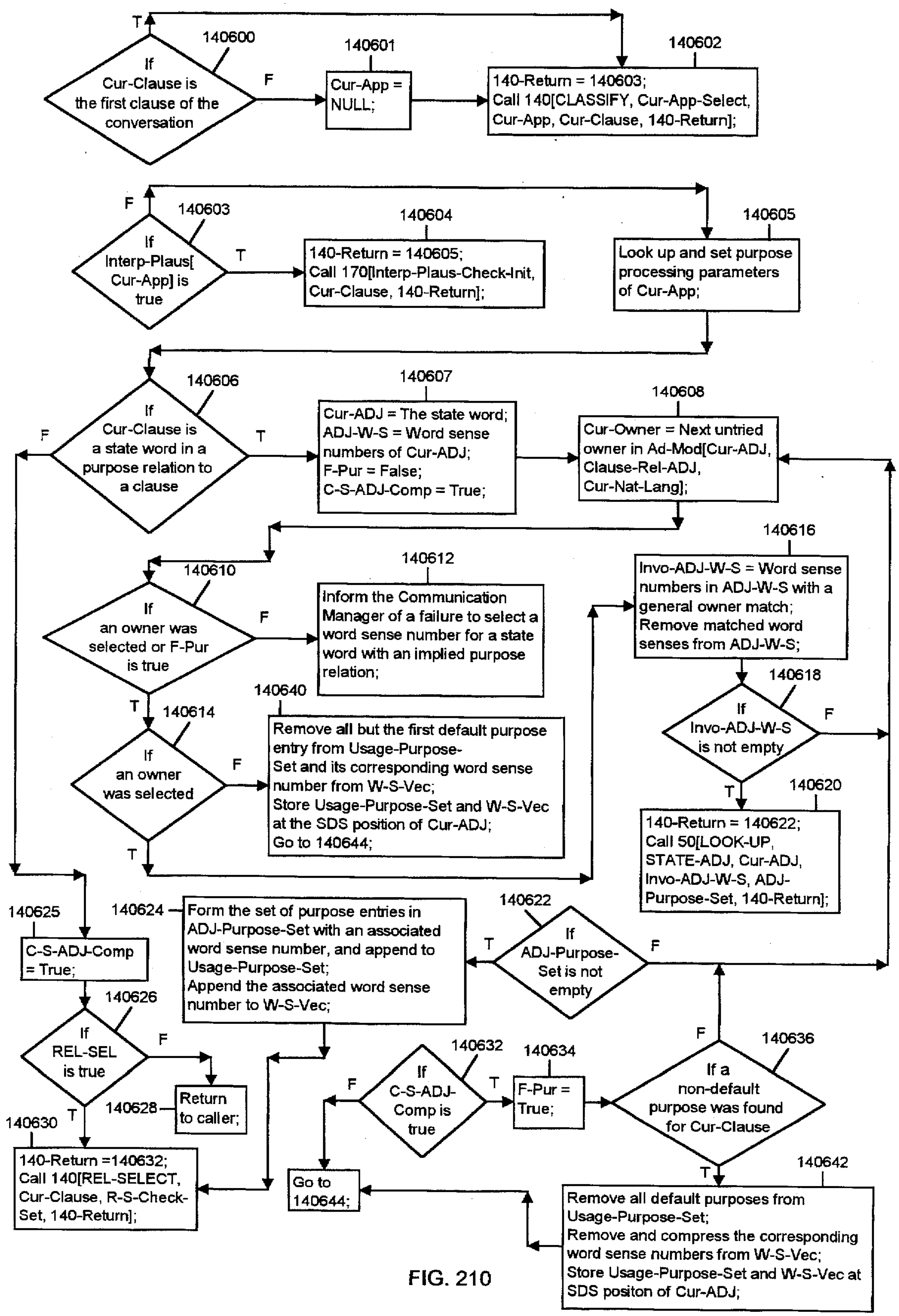
Figure 21P:
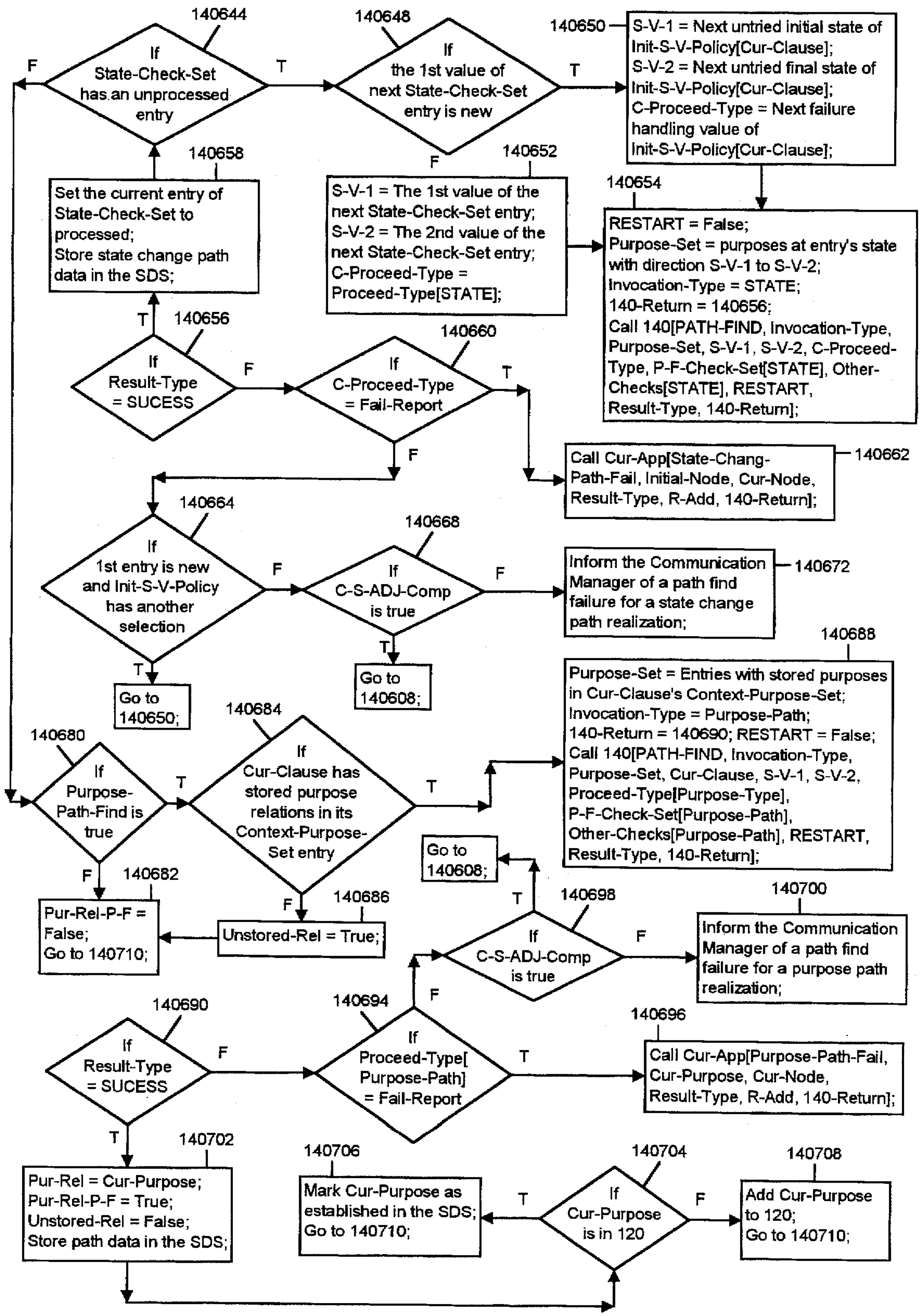
Figure 21Q:
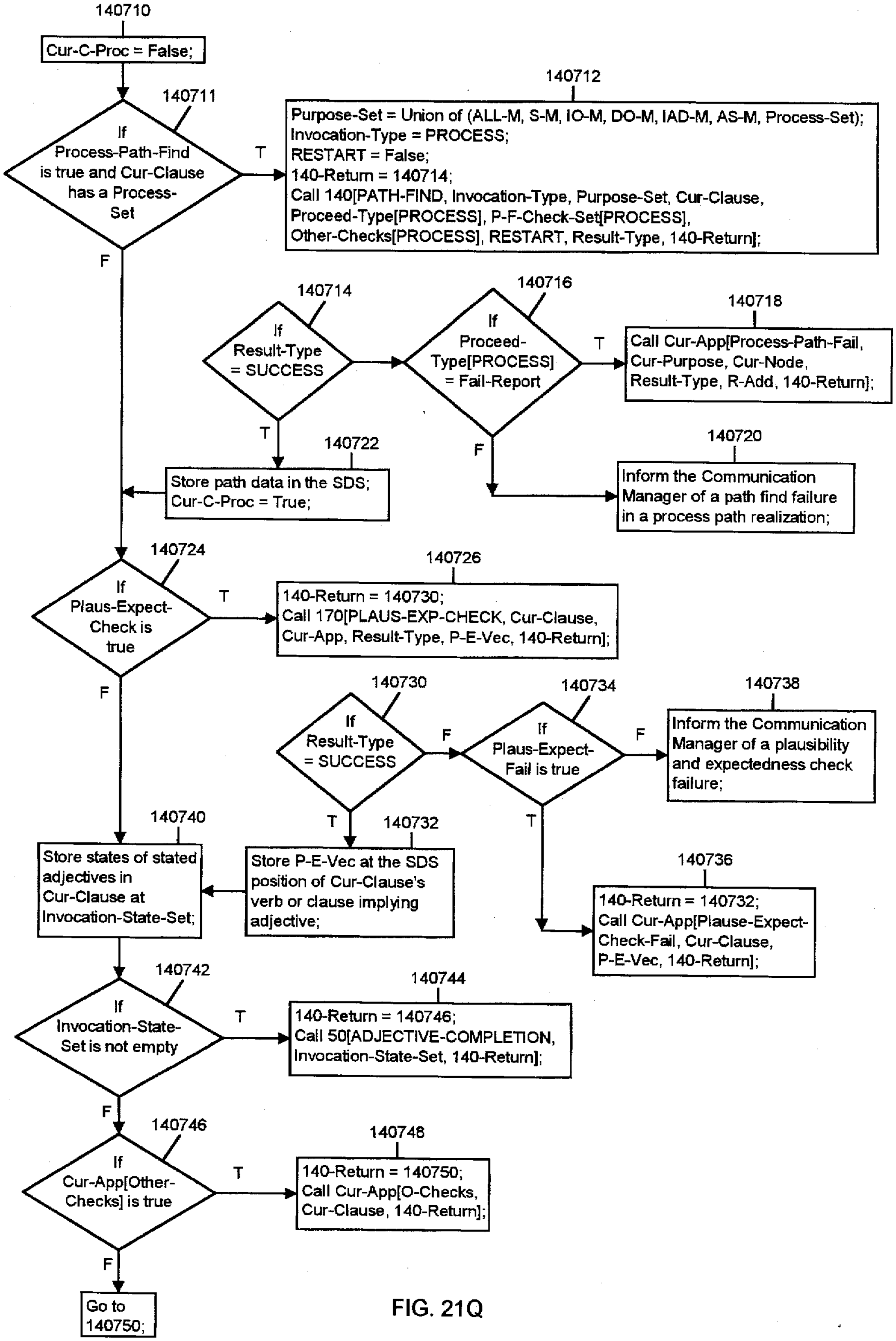
Figure 21R:
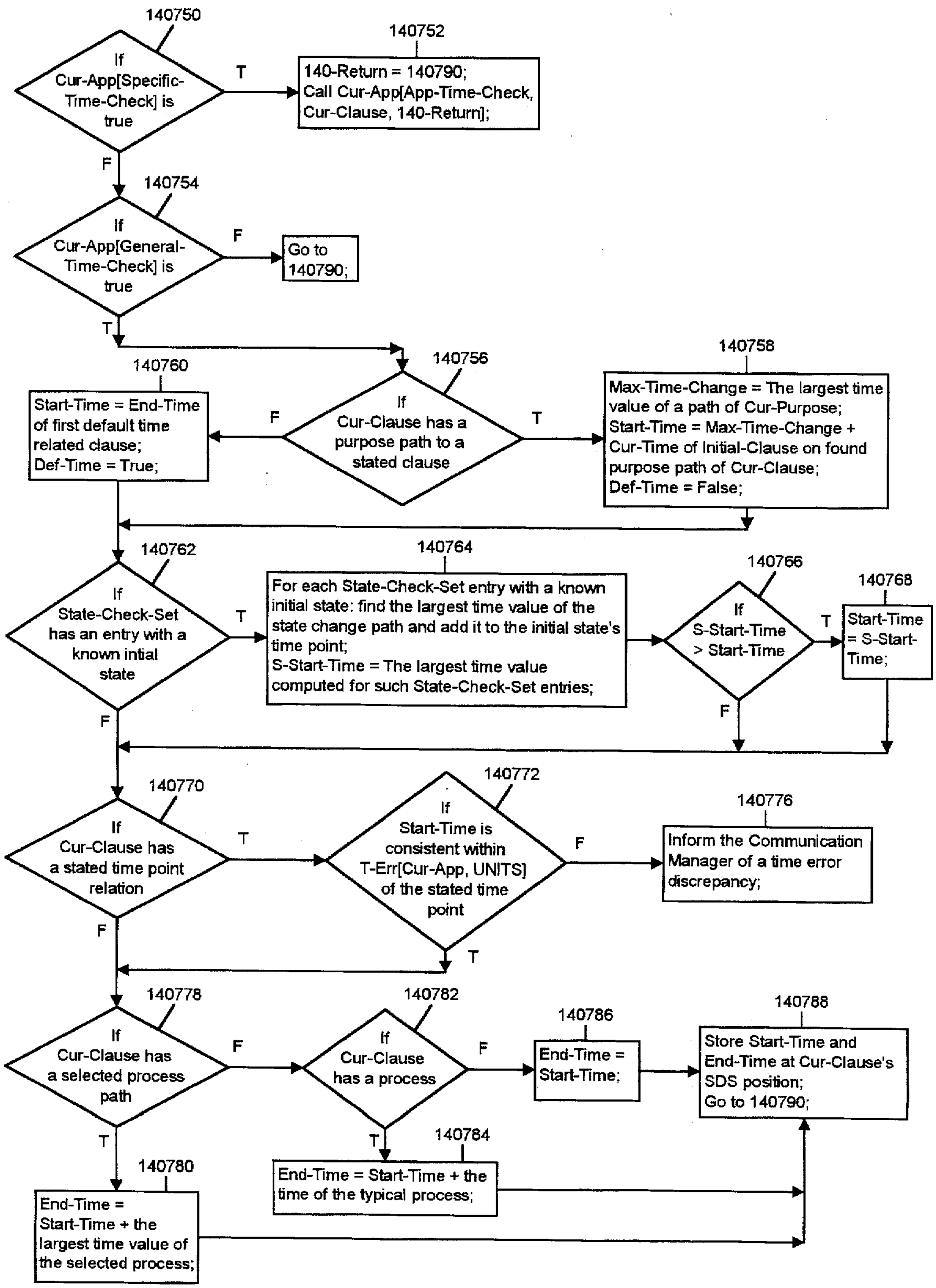
Figure 21S:
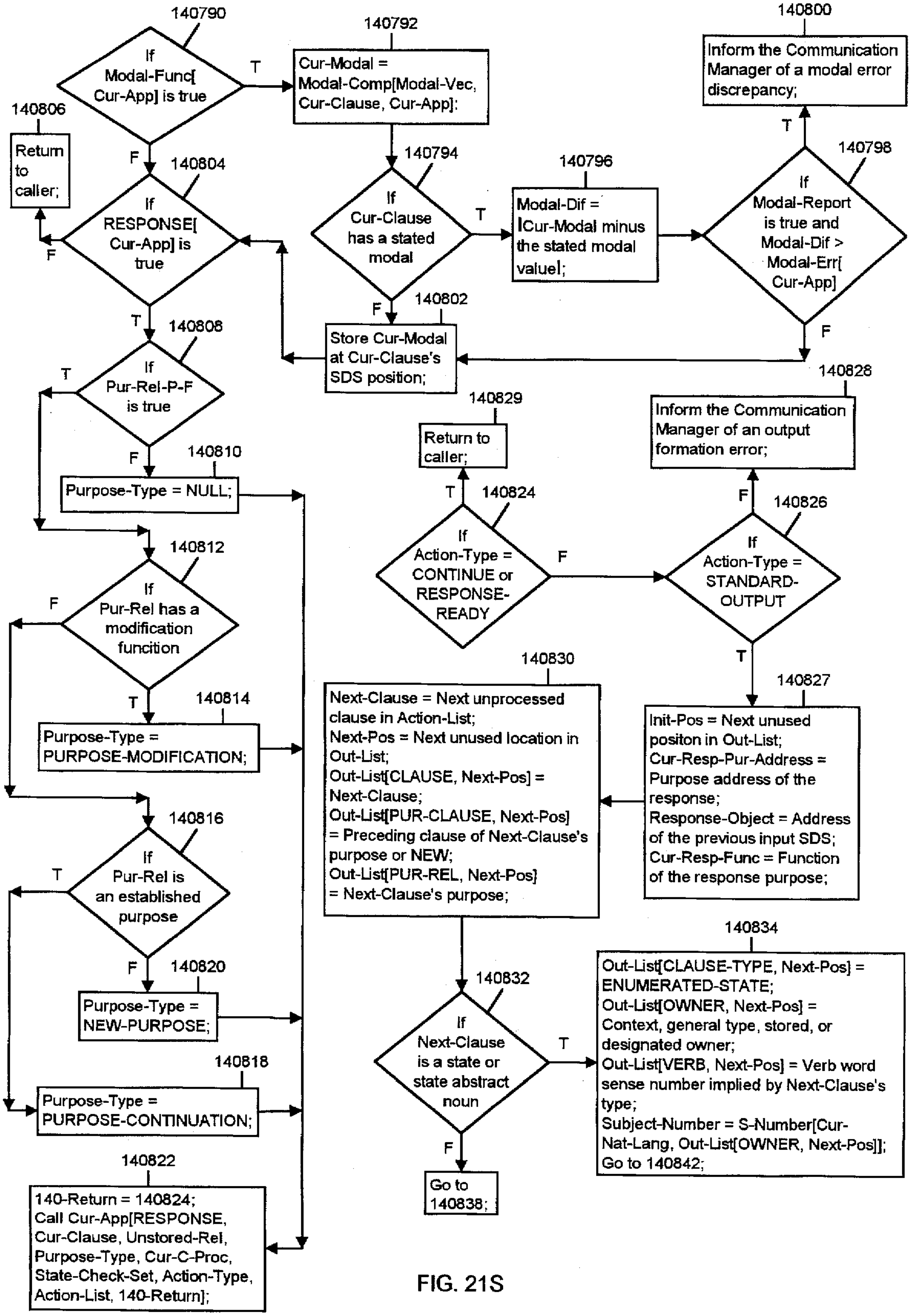
Figure 21T:
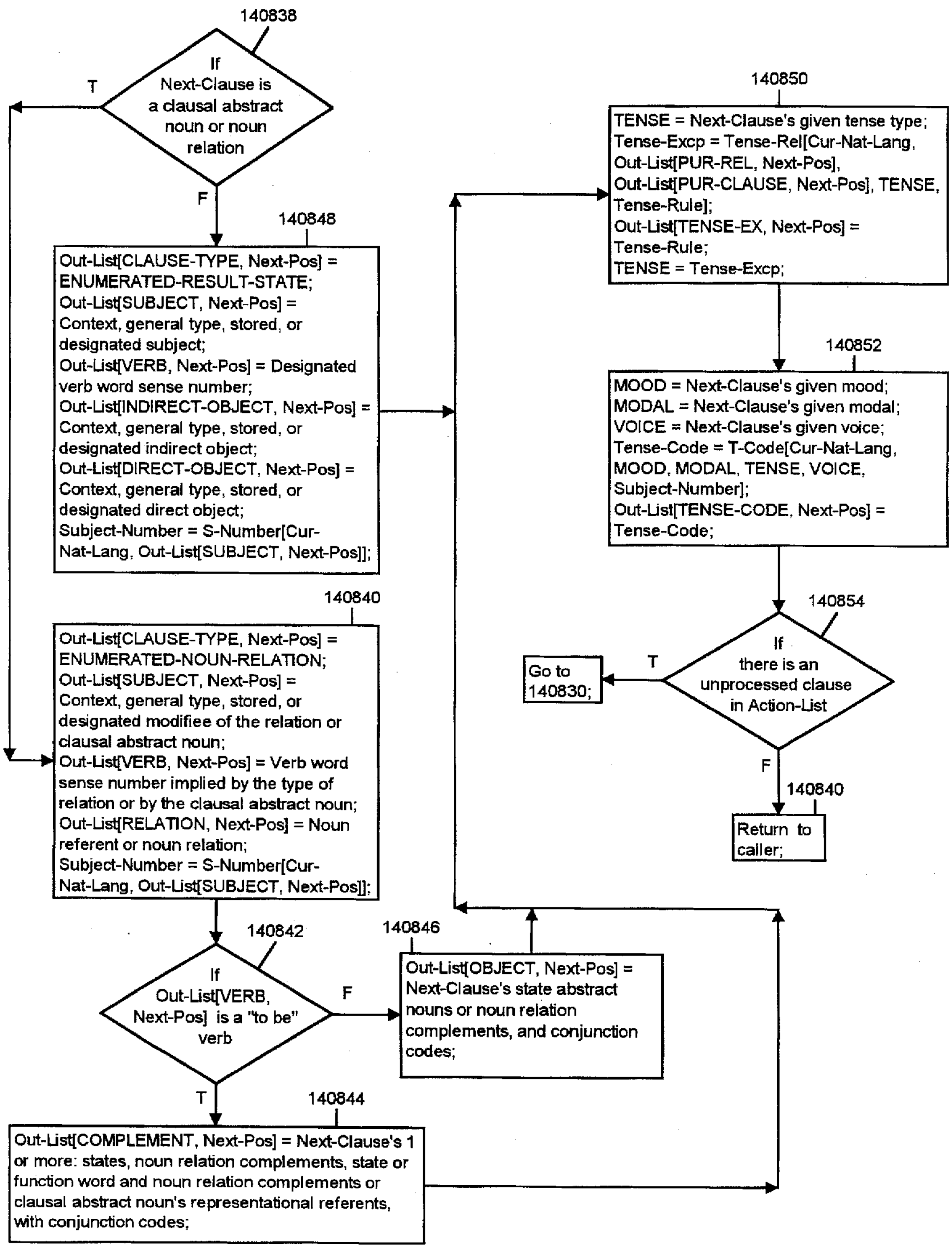
Figure 21V:
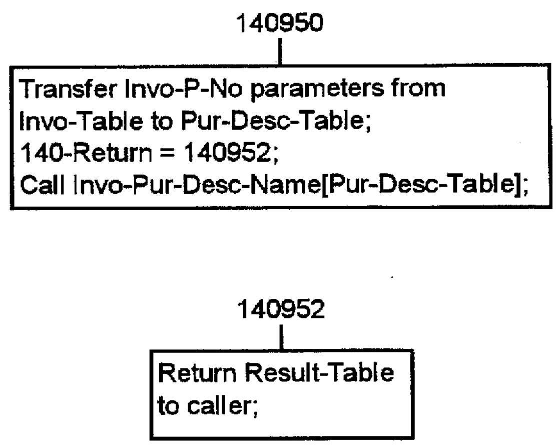
Figure 22A:
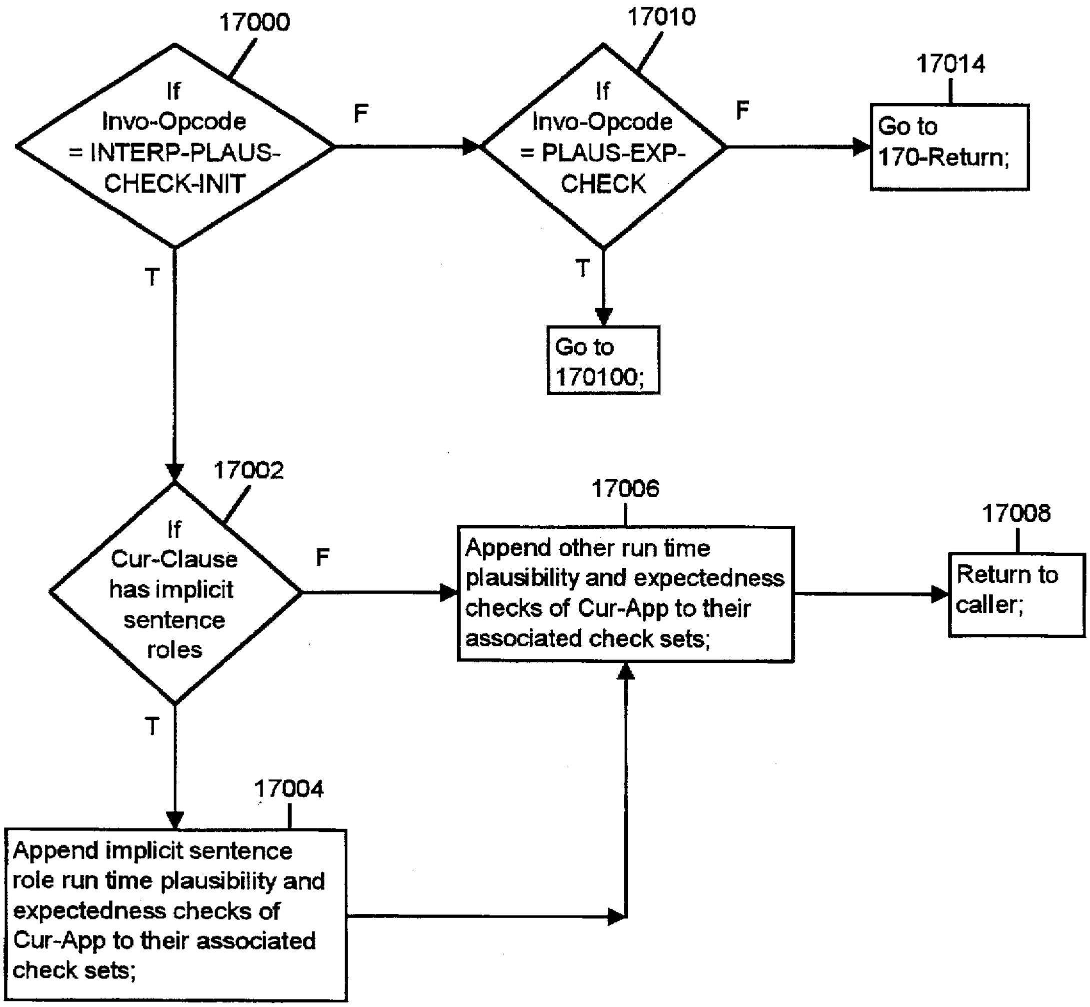
FIGS. 22*a*–22*d* is a flow chart for the plausibility and expectedness checking methods.
Figure 22B:
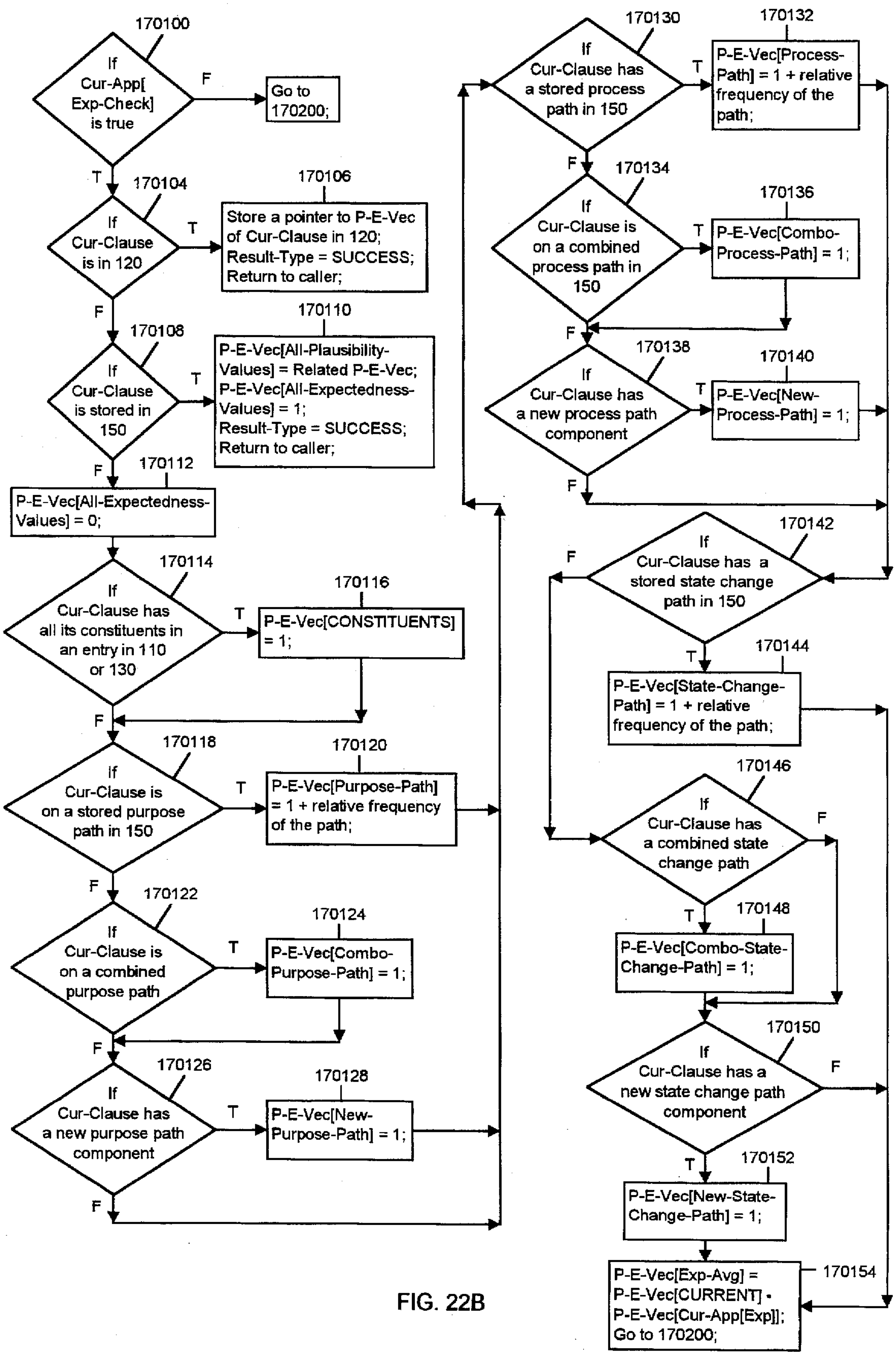
Figure 22C:
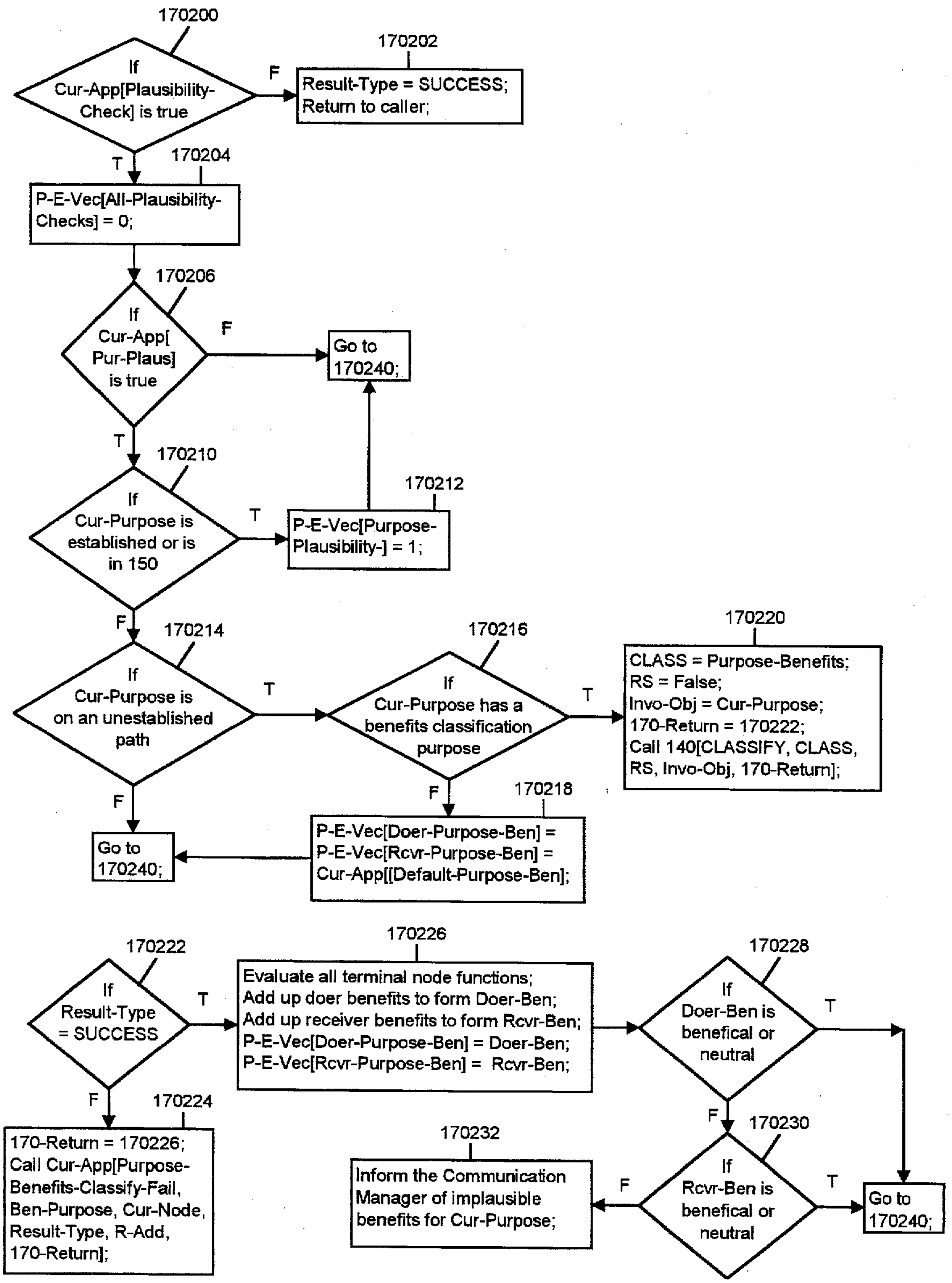
Figure 22D:
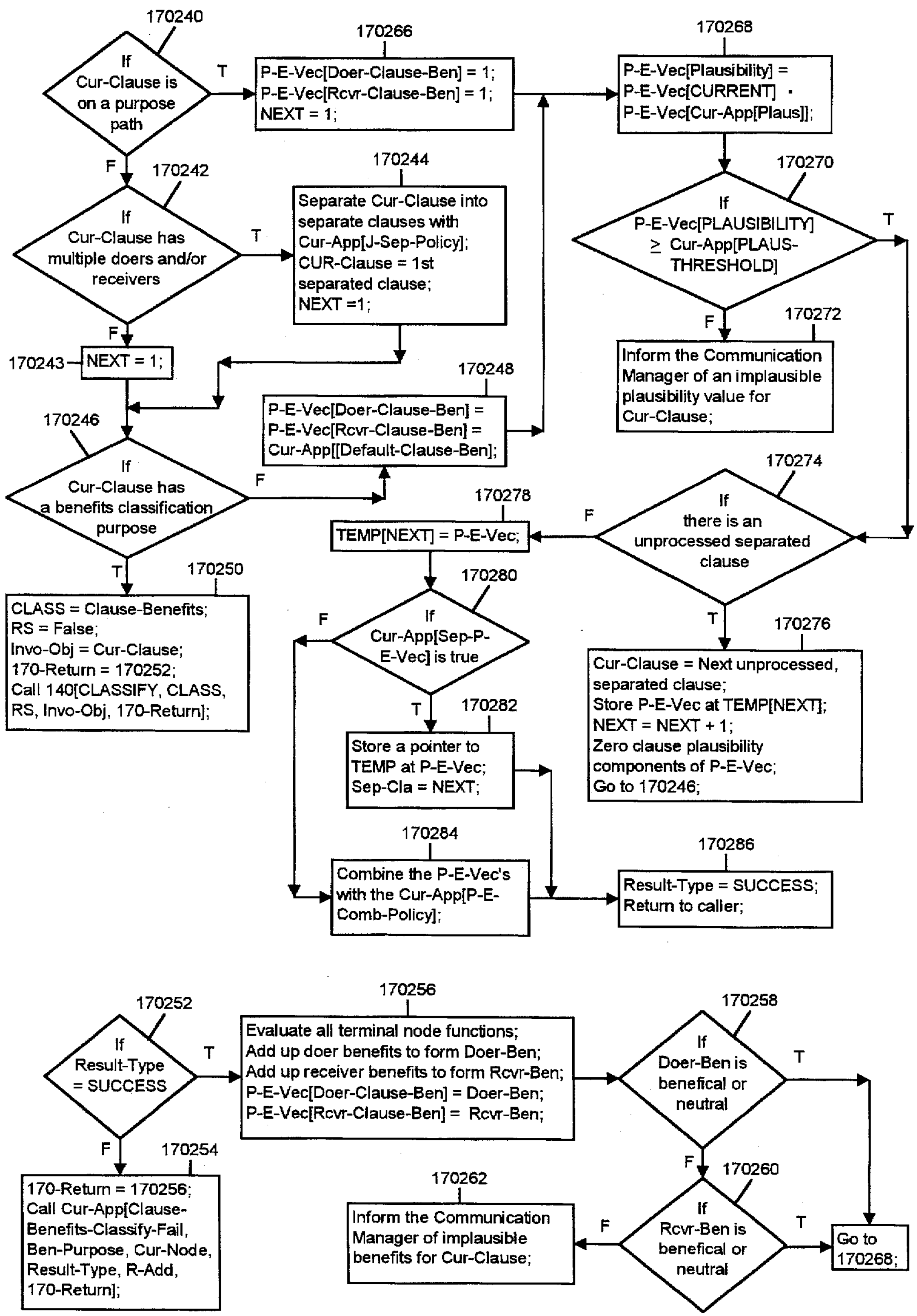

140180 sets processing to continue at Pur-Class-Set[Cur-Nat-Lang, Cur-App] which is the location of a process to select purposes with classification purposes of the current application for the current natural language. The actual types of classified purposes and their implementation varies for the natural language and the current application. For a general purpose application, Pur-Class-Set[Cur-Nat-Lang, Cur-App] sets processing to continue at a general purpose set of classification purposes which are implemented starting at 140182. 140182 sets 140-Return to 140190, sets RS to false, and sets Check-Clause to Cur-Clause. RS is the RESTART parameter of a classification purpose, and RS is set to false because this is the first invocation of the classification purpose. After 140182, 140183 is next, and is true if Purpose-Set has a MOTIVATION purpose function and a stored MOTIVATION function was not found for Cur-Clause. If 140183 is true, 140184 sets 140-Restart to 140186; CLASS is set to MOTIVATION; and 140184 calls 140[CLASSIFY, CLASS, Check-Clause, RS, 140-Return]. CLASSIFY is a process of 140 which looks up and processes the CLASS classification purpose for Check-Clause, and returns a result to 140-Return. CLASSIFY is described below. In this case, 140190 is next after processing at CLASSIFY. 140190 is true if a Cur-Clause was classified as having the given purpose relation. If 140190 is true, 140192 stores the following at Context-Purpose-Set: CLASS, NULL, a pointer to the related clause, Cur-Clause, C-PUR. CLASS is the purpose relation type returned from the classification purpose. Rel-Type is set to C-PUR for the last Context-Purpose-Set parameter. C-PUR means that the purpose has been selected by a classification purpose. 140192 also stores the Context-Purpose-Set location at the SDS position of Cur-Clause's verb if Cur-Clause is not implied by a word, or at the SDS position of the word implying Cur-Clause. After 140192, or if 140190 is false, 140194 sets processing to continue at 140-Restart. As depicted in FIG. 21h, this process for purpose classification is repeated for the following purpose functions: EXCEPTION, INFORMATION, CONDITION, LISTING, CONTRAST, ALTERNATIVE/PREFERENCE, PROPORTION, and CONCESSION. After these general purpose classification processes have been processed, processing continues at 140230.

140230 is next, and is true if a purpose relation was found or if INIT is true. If 140230 is false, 140250 is next, and is true if the conjunction used to generate Cur-Clause's Purpose-Set is AMBIGUOUS. If 140250 is true, 140252 assigns Cur-Clause to be joined by the alternate conjunction; Cur-Clause's conjunction is set to UNAMBIGUOUS; and 140252 sets processing to continue at 14002 which was described above. In this case, Cur-Clause is reprocessed for a new conjunction. If 140250 is false, 140254 stores the following at Context-Purpose-Set: DEFAULT-DESCRIPTION, NULL, NULL, Cur-Clause, Rel-Type. If no purpose relation was found for Cur-Clause, the DEFAULT-DESCRIPTION purpose relation is assigned for Cur-Clause by 140254. The two stored NULL's correspond to the unfound purpose matches and unfound Pre-Node respectively. The DEFAULT-DESCRIPTION purpose could imply that Cur-Clause is describing a new situation that has not been stored in Memory 150 for example. Another possibility is that Cur-Clause has been misinterpreted, and there is an alternate semantic interpretation, or an alternate syntactic and semantic interpretation. These possibilities are considered at the PURPOSE-MANAGER.

After purpose relation processing has been completed, Cur-Clause is optionally processed for timing, for new state values, and for new space positions. After 140254, or if 140230 is true, 140232 is next, and is true if Time-Check is true, and a doer sets states including space positions in Cur-Clause or Cur-Clause contains a time adverbial subclass. Time-Check is a parameter set by PURPOSE-MANAGER according to Cur-App. Time-Check is set to true when the time position of clauses is to be calculated. Cur-Clause has a time position if states are set or if Cur-Clause has a stated time adverbial subclass or has one stored in Memory 80 or 100. If 140232 is true, 140234 is next, and is true if Cur-Clause is an ALL-M match and there is a stored time point in Memory 80 or Memory 100. 140234 is true for the case where Cur-Clause is part of a previously stored experience with a stored time point, i.e., a time position. If 140234 is true, 140236 sets Cur-Time to the time point of Cur-Clause, and sets T-Type to DEFINITE. If 140234 is false, 140238 is next, and is true if there is a time point for the most recently stated Pre-Node of Cur-Clause in Context-Purpose-Set. If 140238 is true, 140240 sets Cur-Time to such a Pre-Node plus the transition time of Cur-Clause. The transition time of Cur-Clause can be stored in an adverbial subclass in Memory 100. The transition time is the time it takes to accomplish the states associated with Cur-Clause. If Cur-Clause does not have a transition time, but there is a transition time associated with a generalized Cur-Clause, this typical transition time is used. Otherwise, the transition time is set to zero. 140240 also sets T-Type to RELATIVE. If 140238 is false, 140242 sets Cur-Time to the transition time of Cur-Clause, and sets T-Type to TRANSITION. After 140236, 140240, or 140242, 140244 stores Cur-Time and T-Type at the SDS position of Cur-Clause's verb or clause implying word.

After 140244, or if 140232 is false, 140248 is next, and is true if State-Check is true. State-Check is a parameter set by PURPOSE-MANAGER according to Cur-App. State-Check is set to true when certain states are to be monitored. If 140248 is true, 140260 sets State-Check-Set to states and positions in space and/or time of constituents of Cur-Clause which match states in State-Select[Cur-App]. State-Select

[Cur-App] contains states or classifying purposes which dynamically select states. The states and/or selected states of State-Select can be specified at any level of generality. A state or position of a constituent matches a state in State-Select if such a state is as general or more specific than the state in State-Select. The states or selected states in State-Check can have an associated process check symbol which implies that a found state should be set up for determination of the process for achieving the matched state. 140260 also associates this symbol with states in State-Check-Set which have the process check symbol in State-Check. After 140260, 140262 is next, and is true if there is an unchecked state in State-Check-Set. If 140262 is true, 140264 sets Cur-C-State to the next unchecked state in State-Check-Set. After 140264, 140266 is next, and is true if Cur-C-State has a different value in Cur-Clause than in Context Memory 120 which includes the case where Cur-C-State is not in 120. If 140266 is true, 140268 stores the current and previous state value of Cur-C-State at the Cur-C-State position of State-Check-Set. If the state was not previously in 120, NULL is stored at the previous state value. If 140266 is false, 140270 removes Cur-C-State from State-Check-Set. After 140268, or 140270, 140262 is next as described above. If 140262 is false, 140276 is next, and is true if State-Check-Set is not empty. If 140276 is true, 140278 stores State-Check-Set at the SDS position of Cur-Clause's verb or clause implying word. After 140278, or if 140276 is false, or if 140248 is false, 140280 returns processing to the caller. This completes REL-SELECT processing.

Purpose Realization Path Selection

After one or more purpose addresses have been selected as described above for the REL-SELECT process, some applications require a determination of a possible realization of a purpose linking the current clause to the conversation. For example, an application which is determining explanations for the occurrences within a situation requires such purpose paths. It is also possible that an application requires a feasible process in the context of a conversation to achieve a result state of a clause or a feasible process to achieve a state value change. Another example of a feasible path requirement is for a process to solve a problem. A feasible realization of a purpose or process is determined by finding a path from an initial purpose node to a final node in Experience and Knowledge Memory 150. The PURPOSE-MANAGER process, which is described below, determines when a purpose path is to be found. The initial purpose node of a process depends upon the status of the situation requiring a purpose path. The initial purpose node also depends upon which states are considered to be necessary for monitoring with respect to process path selection. For example, a process for a verb assumes a certain initial condition. If this assumed initial condition differs from the known initial condition, the states which differ, and which are considered to need monitoring for process path realizations, require a process path to reach the assumed initial condition from the known initial condition. Such states would be selected by State-Select[Cur-App] for processing in REL-SELECT as described above. The PATH-FIND process determines purpose paths in Memory 150 which comprise representations of clauses which typically can be expressed in natural language. The PATH-FIND process first determines the initial node and final node from given parameters. Then a purpose path is searched for along a feasible path relative to the contents of Context Memory 120. As a new node along a feasible path is selected, the node is checked for various feasibility requirements.

The PATH-FIND process can find purpose paths in the forward or reverse directions. Here direction refers to time where the forward direction means from earlier time coordinates to later time coordinates. The PATH-FIND process searches a purpose realization which can be a repeat of a previously experienced realization. In this case the realization is specified by its purpose address. The PATH-FIND process can also find a realization which is a combination of parts of previously experienced purposes. In this case, the realization combines sections of previously experienced realizations or generalizations of previously experienced realizations into a realization which is feasible for the given context. Such a realization is specified either by a relationship to a purpose address realization, e.g., "Jogging is like running except . . . ", or by enumerating the clauses in the purpose path. Such a realization synergizes a feasible path from previously uncombined realization clauses to conform to a given context. The PATH-FIND process is restartable. This means that if a path search is blocked by some situation, the search can be stopped, the situation can be analyzed and possibly altered, and the path search can be restarted. This restarting capability is important because it allows new situations to be processed for an application utilizing previously stored knowledge and experience. For example, this restarting capability makes it possible to implement the well known problem solving technique of converting an unknown problem to a problem which has a known solution. More generally, this restarting capability makes it possible to use knowledge and experience to adapt a previously experienced purpose into a new purpose which is related to a new situation. In summary, the PATH-FIND process is a component in expanding the capability to process situations beyond the stored experience and knowledge in 150.

The PATH-FIND process is a depth first search of a directed graph. A novel aspect of this depth first search is that it utilizes parallel independent searches. The searches are independent in the sense that the search criteria of one path is not dependent upon other search paths. However, the parallel paths are dependent in the sense that the specific search path initiates the parallel searches. Also, in the case where a depth first search fails, the back up process can affect other parallel depth first searches. Parallel depth first searches are utilized because knowledge and experience can occur with related parallel activities.

The PATH-FIND process is initiated when 14004 is true because the Invocation-Opcode is PATH-FIND. If 14004 is true, processing continues at 140300. 140300 is true if the current Invocation-Type is STATE which implies that a process path for a state value change is to be determined. The set of processes is selected by selecting processes which have a purpose function of changing the state value to the final state value. If 140300 is true, 140302 sets Cur-Purpose to the next untried process in the Invocation Purpose-Set; Initial-Node is set to the Memory 150 address associated with the Invocation State-Value-1 at Cur-Purpose; Final-Node is set to State-Value-2; and 140302 sets Ad-Source to SUCCEEDING which implies that the purpose realization direction is forward because succeeding link entry addresses are utilized from a link node in 150. If 140300 is false, 140304 is next, and is true if the current Invocation-Type is PROCESS which implies that a process path for a result state is to be determined. The process set was determined at Selector 70. If 140304 is true, 140306 sets Cur-Purpose to the next untried process in the Invocation Purpose-Set; Initial-Node is set to the Memory 150 address associated with the Invocation Cur-Clause at Cur-Purpose; If 140304 is false, 140308 is next, and is true if the current Invocation-Type is PURPOSE-PATH which implies that a purpose path between two clauses is to be determined. The possible purposes were determined at REL-SELECT. If 140308 is false, 140309 sets Result-Type to TYPE-FAIL which implies that an improper type parameter was sent with the invocation. 140309 returns processing to the caller of this process.

If 140308 is true, 140310 sets Cur-Purpose to the next untried purpose of Cur-Clause in the Invocation Purpose-Set. After 140310, 140312 sets Initial-Node to the Memory 150 address of the Cur-Purpose entry's initial clause, Pre-Node, the other clause in the entry; Cur-Clause-Node is set to the Memory 150 address associated with the Invocation Cur-Clause at Cur-Purpose; and 140312 sets DIRECTION to FORWARD. The FORWARD value of DIRECTION implies that the purpose realization is to be determined using succeeding link entry addresses in Memory 150 entries. The FORWARD direction is the normal observed occurrence of a purpose realization. However, in certain circumstances, considering the reverse occurrence of observations is required. For example, the situation may require working back from the present to the past. After 140312, 140314 is next, and is true if the Level Number of the Initial-Node Memory 150 entry is less than the Level Number of the Cur-Clause-Node Memory 150 entry. If 140314 is false, 140316 sets DIRECTION to REVERSE. After 140316, or if 140314 is true, 140318 is next, and is true if Converse-D [Cur-Clause] equals DIRECTION or Ignore-Order is true. Converse-D[Cur-Clause] is a variable set by conjunctions or verbs which imply the direction of discussion of a conversation. A conjunction, such as "before" set Converse-D for only one clause. A verb, such as "working back" sets Ignore-Order to true since the number of clauses in the changed order is not known. However, Ignore-Order is set to false by a direction setting conjunction. Ignore-Order can also be set to true for certain applications. If 140318 is false, the order of clauses is unexpected, and 140320 is next, and is true if the Level Number component of the 150 Memory entry of Initial Node or Cur-Clause-Node has a VARIABLE order type. If 140320 is false, a definite order has been stored for the purpose path, and 140322 appends to the Possible-Interpretations[Cur-Clause]: Cur-Purpose, ORDER-FAULT, DIRECTION. Possible-Interpretations contains purposes which may be considered as a possible interpretation in the case that no other purpose path was found acceptable. For example, an ORDER-FAULT could be associated with a new purpose realization. After 140322, 140324 is next, and is true if there is an untried purpose in Purpose-Set. If 140324 is false, the Communication Manager is informed of a failure to select a purpose path. If 140324 is false, 140310 selects the next purpose as described above.

If 140318 is true, or if 140320 is true, the DIRECTION of Cur-Clause relative to the conversation is acceptable, and 143028 is next, and is true if the DIRECTION equals FORWARD. If 140328 is true, or after 140306, 140330 sets Final-Node to Cur-Clause; Cur-Node is set to Initial-Node; and 140330 sets Ad-Source to SUCCEEDING. If 140328 is false, 140332 sets Final-Node to the Invocation Initial-Clause; Cur-Node is set to Cur-Clause-Node; and 140332 sets Ad-Source to PRECEDING. After 140332, 140330, or 140302, 140333 is next and is true if RESTART is true. RESTART is an invocation parameter which is set to true when PATH-FIND is to restart a previously started search. For example, RESTART is true when a failed path has been processed to repair a failing aspect of the search. If 140333 is true, 140335 restores the context of the PATH-FIND process, and sets processing to continue at R-Add. The context of the PATH-FIND process is stored in the SDS as described below at 140462. R-Add is the restart address stored before the PATH-FIND process completes processing. If 140333 is false, 140334 initializes the following variables structures to zero: PATH, In-Path, Active-Path, BACK, C-Branch, Assumed-Sentence-Roles, Time-Vec, S-Cur-Time, and Modal-Vec. These structures are described below. 140334 also sets PATH[1,1,1] and PATH[1,1,2] to Cur-Node; BACK[1,1] is set to the number of Ad-Source addresses at Cur-Node; O-Source is set to Ad-Source; Path-No is set to 1; 1, the current Path-No, is added to In-Path and Active-Path where it's set to PROCESSED; NODE is set to 1; and Fin-Node and S-Path are set to false. Path-No and NODE are array variables for PATH and BACK. Path-No is a label for a clause chain. NODE is the label for a clause in a clause chain. PATH contains the link entry addresses in the path being searched for. BACK contains the number of untried addresses for Path-No at NODE. Active-Path contains the Path-Nos' being processed at NODE along with the processed Path-No's processing status. In-Path contains all Path-Nos' in PATH. Fin-Node is a Boolean variable used for determining the completion of all concurrent paths. S-Path is described below. After 140334, 140336 sets Next-Node to the Ad-Source (SUCCEEDING, CONCURRENT or PRECEDING) link entry address at the Cur-Node Memory 150 entry which has associated access conditions which are met with the state values or other information stored in Context Memory 120. In the case where a value or information for the condition has not been stored in 120, the Cur-App[Access-Data-Miss-Pol] policy determines the method for evaluating the access condition with an unstored value or data. The policy depends upon the goals of the application. For example, if the purpose path realization is being determined as possible alternatives, missing data could be treated as a requirement of the alternative, and the condition is set to be met for the missing data. In other applications, the missing data could be treated as data to be determined prior to determining if the access condition is met for example. A clarifying question could be used to determine the missing data for example. An address entry without access conditions is met by any context. 140336 also updates BACK[Path-No, NODE] by subtracting the number of address entries which had an unmet access condition and the address entry which has met access conditions from the old value of BACK[Path-No, NODE]. Result-Type is set to ACCESS-CONDITION, and R-Add is set to 140336. Result-Type contains the cause of a failure of PATH-FIND selection. In this case, Result-Type indicates the failure to select the next node. Result-Type indicates the type restart add R-Add is the restart address.

After 140336, 140338 is next, and is true if a link entry address was selected at 140336. If 140338 is false, 140340 is next, and is true if Fail-Report is true, or if IGNORE is true. Fail-Report is an invocation parameter of PATH-FIND, and is true when an application is required to find unstored purpose paths which are considered for applying additional information to make a stored path feasible such as in problem solving. PATH-FIND searches for stored purpose paths, and this search includes combining parts of stored paths to form a purpose path. When a PATH-FIND search fails, the failure could be caused by a situation which could be adjusted so that the purpose path would be feasible. For example, in problem solving, a state value for an access condition is unknown, and this causes a problem solving purpose path to fail. In this case, the application may have other problem solving purposes which attempt to determine the unknown state value. Consider another example: if Cur-Clause is part of an previously stored experience, the context related to that experience may not already be in 120, and the application would look up the context utilizing the experience number associated with the previously stored experience, and store the context in 120. In general, Fail-Report is set to true when a PATH-FIND failure is to be processed for an application. IGNORE is also an invocation parameter of PATH-FIND, and is true when an application is utilized to find non-realization purposes such as classification purposes which are described below in detail. However, for classification purposes, failing to find the end of a path means that a more specific classification is not possible for the failing path or subpath. Subpaths occur when more than one classification is possible for example.

If 140340 is true, 140341 is next, and is true if IGNORE is true. If 140341 is true, processing continues at 140450 which starts the processing of any other active paths, and which is described below in detail. If 140341 is false, processing continues at 140462 which prepares the current state of the search for returning to the caller, and which is described below in detail. If IGNORE and Fail-Report are both false, 140340 is false, and 140342 is next. 140342 is true if Cur-Node is common to untried purpose addresses in Purpose-Set. The common purpose addresses are determined by obtaining the purpose realization entry address component of the Cur-Node link entry, which is depicted in FIG. 21*d*. The purpose node entry address component of the purpose realization entry pointed to by the Cur-Node component, depicted in FIG. 21*c*, contains the locations of the purpose addresses associated with the Cur-Node link entry. The purpose addresses are located in a purpose node entry, which is depicted in FIG. 21*b*. The Cur-Node link entry purpose addresses are matched with the purpose addresses in Purpose-Set to find the common purpose addresses. If 140342 is true, 140344 sets the purpose addresses in Purpose-Set which have the same Cur-Node link entry to tried. After 140344, or if 140342 is false, 140480 is next. 140480 starts a process which backs up path selection to the first previous link entry which has untried address entries for the current Path-No or a parent path of the current Path-No. This back up process is described in the Back Up subsection below. If the path selection can not be backed up with the Back Up process, 140348 is next, and is true if Purpose-Set has an untried process or purpose. If 140348 is true, processing continues at 140300 which was described above. If 140348 is false, 140352 returns processing control to the caller. The Result-Type, PATH and other optional check data are returned to the caller. If a link entry address was selected at 140336, 140338 is true, and 140354 is next. 140354 sets Pre-Node to be Cur-Node; Cur-Node is set to Next-Node; and 140354 sets processing to continue at 140360. 140360 is true if the owner clause of Cur-Node is the Final-Node, and if Path-No equals one. If 140360 is true, the main path has been successfully processed. However there may be concurrent paths to be processed. If 140360 is true, 140362 sets Result-Type to SUCCESS; and Fin-Node is set to true.

Optional Checks

After 140362, or if 140360 is false, Cur-Node is processed for optional checks starting at 140363. 140363 is true if Time-Check, which is set by Cur-App, is true. If 140363 is true, 140364 is next, and is true if Cur-Node has a time value. If 140364 is false, 140365 sets S-Cur-Time to the MMAX[0, S-Cur-Time] where MMAX[A, B] selects the numerically largest among A or B, or selects A if A=B. If 140364 is true, 140366 is next, and is true if Cur-Node's time value is fixed. If 140366 is true, 140378 sets S-Cur-Time to Cur-Node's time value. If 140366 is false, 140370 is next, and is true if Cur-Node's time value is relative. If 140370 is true, 140372 sets S-Cur-Time to the sum of Pre-Node's S-Cur-Time and the Cur-Node's time change. If 140370 is false, 140374 computes S-Cur-Time with Cur-Node's time function. After 140365, 140368, 140372 or 140374, 140376 sets Time-Vec[Path-No, NODE, 1] to Cur-Node and Time-Vec[Path-No, NODE, 2] to S-Cur-Time. After 140376, or if 140363 is false, 140378 is next.

140378 is true if Role-Check is true. Role-Check and other check variables are set by the PURPOSE-MANAGER according to Cur-App. Role-Check is true when the sentence roles comprising the owner clause of Cur-Node are to be checked for availability. If 140378 is true, 140379 first checks if the sentence role requirements including required adverbials of the clause associated with Cur-Node can be met by the constituents of Cur-Clause, or can be met by the owner of the state for which PATH-FIND is searching to find a process to change this state. The constituents and owner are available. If the constituents or owner does not meet the requirements, 140379 determines if there is an available entity in 120 which meets the sentence role requirements for each sentence role of the clause associated with Cur-Node. An unavailable entity for a sentence role requirement is determined by looking in 120 to determine if it has been established in the context that no entity which meets the sentence role requirement is available. For a verb word sense number or clausal abstract noun word sense number Cur-Clause, the sentence roles and required adverbial subclasses to be checked for availability are stored at the process descriptor of the Cur-Clause verb as depicted in FIG. 19f. For a state adjective word sense number or a state abstract noun, the owner of the word sense number is the sentence role which is checked for being the available entity. If there is a sentence role which does not have an available entity meeting its requirements, any unavailable entities are checked to see if these entities can meet such a sentence role. This last check is made to determine if it is possible to assume that an entity can be obtained to fill such a sentence role. If there is an unavailable entity that can fill an unmet sentence role, then it can not be assumed that there is an available entity. Finally, 140379 sets Result-Type to SENTENCE-ROLE-UNAVAILABLE, and sets R-Add to 140384. After 140379, 140380 is next, and is true if there is an unfilled sentence role that could be filled by an unavailable entity. If 140380 is true, 140381 is next, and is true if the unavailable entities are in group sentence roles and if the unavailable entities are unavailable because they do not have the same availability requirement value. For example, a group sentence role is "John and Mary", and they would not have the same availability requirement if they were at different positions at the time of the clause of Cur-Node. Thus, "John and Mary worked on the project from 9 to 5." would make 140381 true if "John was at work from 9 to 5" and "Mary was at home from 9 to 5". If 140381 is true, 140382 stores SEP-CLAUSE and the requirement and the values at the differing entities' SDS positions. SEP-CLAUSE implies that the clause is to be separated for the differing entities in subsequent processing. If 140381 is false, processing continues at 140340 to process a failure as described above. After 140382, or if 140380 is false, 140384 is next, and is true if a sentence role entity is not in Context Memory 120. If 140384 is true, 140385 appends the following at Assumed-Sentence-Roles: Path-No, NODE, and the sentence roles not in 120. After 140385, or if 140378 or 140384 is false, 140386 is next.

140386 is true if the truth value of Cur-Node's clause is not zero, and if State-Effect-Check is true. The truth value of Cur-Node's clause is zero when Cur-Node's clause is false. The purpose of the state effect check is to determine if the owner clause associated with Cur-Node causes a state change which must be corrected for a purpose goal in the context to be achieved. If 140386 is true, 140387 looks up the result states or the set state of Cur-Node's word sense number. The result states of a Cur-Node with an owner clause with an associated verb word sense number are contained in the verb word sense number's effect component of its process independent data entry as depicted in FIG. 19b. The set state of a Cur-Node owner clause with an associated adjective or state abstract noun word sense number is the state of the associated word sense number. These states are checked for being on a goal purpose path in the context. A state is on a goal path if the state is the same as the result state or state of an owner clause word sense number associated with a node on the goal purpose path. Those states which are on a goal path are checked for having a differing value from the goal path state value. The nodes on a goal path with a state value that differs from a Cur-Node state value are checked for having an unexpired duration comment associated with such a node. A duration comment states the length of time for which a result state(s) or a set state is required to stay constant for the goal purpose path. If the time of S-Cur-Time of Cur-Node is greater than the S-Cur-Time of the node with a duration comment plus the node's duration length of time, the duration comment is expired. Otherwise, the duration comment is unexpired. Those differing states with an associated unexpired duration comment are stored in Back-Set. 140387 also sets Result-Type to STATE-EFFECT-FAIL, and sets R-Add to 140400. After 140387, 140388 is next, and is true if Back-Set is empty. If 140388 is false, 140389 is next, and is true if Fail-Report is true. If 140389 is true, 140390 determines if each state is changeable back to the state value on its associated goal until a state is found to be irreversible or all states in Back-Set have been checked. A state is irreversible if the state does not have a pointer to a process which changes the state value in the state's Memory 110 or 130 purpose node entry. After 140390, 140391 is next, and is true if all states in Back-Set are reversible. If 140391 is true, processing continues at 140462 which reports the failure to the caller as will be described in detail below. If all states are reversible, the caller could possibly alter the reversible states to accomplish the goal of the application. If 140391 is false, or if 140389 is false, processing continues at 140342 which is described above. If Back-Set is empty, 140388 is true. If 140388 is true, or if 140386 is false, processing continues at 140400.

140400 is true if Other-Checks is true. Other-Checks is true if Cur-App requires application specific checks to be performed. One possible general purpose check is to keep track of link nodes in 150 with respect to the link nodes belonging to a single purpose address. If the link nodes belong to a single purpose address, the path found in PATH-FIND can be stored as the purpose address possibly with descriptors designating a portion of the path associated with the purpose address. If 140400 is true, 140402 performs the functions associated with the other check types until a check fails or until all checks have been successfully performed. 140387 also sets Result-Type to FAILED-OTHER-CHECKS, and sets R-Add to 140430. These other check types are specific to a specific application. After 140402, 140404 is next, and is true if all checks have been successfully performed. If 140404 is false, processing continues at 140340. If 140404 is true, or if 140400 is false, 140430 is next, and is true if Modal-Check is true, and if Cur-Node's clause has a modal value. If 140430 is true, 140432 is next, and is true if the modal in Cur-Node's clause differs from the modal in Initial-Node's clause. If 140432 is true, 140434 sets Modal-Vec[Path-No, NODE, 1] to Cur-Node, and sets Modal-Vec[Path-No, NODE, 1] to Cur-Node's modal value. Modal-Vec is processed for an application at the PURPOSE-MANAGER. After 140434, of if 140430 or 140432 is false, processing of Cur-Node on Path-No has been successfully completed. Processing of the next path of the PATH-FIND process continues at 140440.

Preparation of the Next Path for Processing

140440 begins the processing the next path in the PATH-FIND process. First, the information related to Cur-Node is stored so that its path can be processed after any remaining unprocessed paths have been processed. 140440 adds Path-No to Active-Path[NODE+1] and sets this entry to unprocessed. This sets Path-No to be processed for NODE+1. 140440 also sets PATH[Path-No, NODE+1, 1] to Pre-Node, and sets PATH[Path-No, NODE+1, 2] to Cur-Node. After 140440, 140442 sets BACK[Path-No, NODE+1] to the number of O-Source addresses at Cur-Node. The number of O-Source addresses is the number of preceding addresses or succeeding addresses if O-Source equals PRECEDING or SUCCEEDING respectively. If O-Source equals CONCURRENT, the number of address entries equals the number of addresses in the Concurrent-Address-Set which is described below. After 140442, 140444 is next, and is true if Ad-Source is CONCURRENT. If 140444 is false, Cur-Node has been successfully processed for the continuation of Path-No, and any CONCURRENT paths which start at Cur-Node have not been processed. If 140444 is false, 140446 is next, and is true if Ad-Source equals SUCCEEDING and if Cur-Node has an unprocessed Concurrent-Address-Set. As described above concurrent paths are processed only for forward paths. Concurrent-Address-Set contains the next set of concurrent addresses, and these addresses are the possible next node addresses of a concurrent path starting at Cur-Node. If 140446 is true, 140448 creates a new concurrent path. 140448 sets O-Path to Path-No; Path-No is set to the next unused path number; Ad-Source is set to CONCURRENT; BACK[Path-No, NODE] is set to the number of concurrent addresses in the Concurrent-Address-Set; T-Node is set to Cur-Node; PATH [Path-No, NODE, 1] is set to O-Path; PATH[Path-No, NODE, 3] is set to the number of the Concurrent-Address-Set, with the first Concurrent-Address-Set having a number of zero; and 140448 sets processing to continue at 140336 which is described above. O-Path and T-Node are temporary variables. BACK and PATH have been set to the values for a starting path.

If there are no unprocessed concurrent address sets, 140146 is false, and 140450 is next. 140450 is true if Active-Path[NODE] has an unprocessed Path-No which is also in In-Path. If 140450 is true, 140452 sets Path-No to the next unprocessed entry in Active-Path[NODE] which is also in In-Path, and sets Cur-Node to PATH[Path-No, NODE, 2]. After 140452, 140454 is next, and is true if Cur-Node has Ad-Source addresses. If 140454 is false, the Path-No path has been realized, and 140458 sets the Path-No position of Active-Path[NODE] to processed, and sets processing to continue at 140450. If 140454 is true, the Path-No path realization continues, and 140456 sets Pre-Node to PATH [Path-No, NODE, 1], and sets processing to continue at 140336.

If Ad-Source equals CONCURRENT at 140444, the start of a concurrent path has been successfully processed, and 140444 is true, and 140466 is next. 140466 is true if PATH[O-Path, NODE, 3] equals 0 which means that the Path-No path is the first concurrent path at O-Path and NODE. If 140466 is true, 140468 sets PATH[O-Path, NODE, 3] to C-BR-Next which is the next unused position of C-Branch. C-Branch is the vector of concurrent path numbers. After 140468, or if 140466 is false, 140470 sets up processing for the next path number. 140470 sets Ad-Source to O-Source, C-BR-No is set to the sum of PATH[O-Path, NODE, 3], the C-Branch position of the first concurrent path number at O-Path and NODE, and PATH[Path-No, NODE, 3], the number of the Concurrent-Address-Set; C-Branch[C-BR-No] is set to Path-No; Path-No is added to In-Path; Path-No is set to O-Path, Cur-Node is set to T-Node, and 140470 sets processing to continue at 140472. 140472 is true if S-Path is true. S-Path is true for the case when Back Up processing backs up to the start of a concurrent path. In this case, C-Branch[C-BR-No] contains a valid path number, and hence, a new entry has not been added to C-Branch. Back Up processing is described in the next subsection. If 140472 is false, a new entry has been added to C-Branch, and 140474 increments C-BR-Next by 1. If 140472 is true, 140476 sets S-Path to false. After 140474 or 140476, 140146 processes the next Concurrent-Address-Set as described above.

If there is no unprocessed Path-No in Active-Path[NODE] which is also in In-Path, 140450 is false which means that all the paths at the NODE level have been successfully processed, and 140460 is next. 140460 is true if Active-Path [NODE+1] is empty. Active-Path[NODE+1] is empty when PATH-FIND has been successfully completed for purposes with an unspecified end node such as for classification and implication purposes. An example of an implication purpose is the consequence path of a state change. If 140460 is true, 140461 sets Result-Type to SUCCESS. If 140460 is false, 140463 is next, and is true if Fin-Node is true. Fin-Node is true when PATH-FIND has been successfully completed for realization purposes with a specified end node. If 140463 is false, 140464 sets up the next level of nodes to be processed. 140464 clears Active-Path[NODE]; NODE is incremented by 1, and 140464 sets processing to continue at 140450 which is described above. After 140461, or if 140463 is true, 140461 sets Result-Type to SUCCESS. After 140161, 140462 compresses: PATH, BACK, In-Path, Active-Path, C-Branch, Assumed-Sentence-Roles, Time-Vec, and Modal-Vec. These data structures are compressed by keeping data from locations which are accessed by Path-No's which are in In-Path, by moving kept data to continuous locations, and by adjusting position sensitive values to their new locations. 140462 also stores the following data in the SDS position associated with a state when the Invocation-Type equals STATE or the SDS position of Cur-Clause: Invocation-Type, PATH, BACK, In-Path, Active-Path, C-Branch, Assumed-Sentence-Roles, Time-Vec, Modal-Vec, Cur-Purpose, Cur-Node, R-ADD and the clause which owns Initial-Node. If the Invocation-Type equals STATE, the SDS position is the owner for a state change implied for a constituent owner, or is the adjective or state abstract noun associated with the state. The SDS position of Cur-Clause is the verb of a verb word sense number or clausal abstract noun implied clause, or the SDS position of Cur-Clause is respectively the adjective or state abstract noun for an adjective word sense number or a state abstract noun implied clause, or the word implying Cur-Clause. 140462 also returns control to the calling process. This completes the description of PATH-FIND except for the Back Up subprocess.

Back Up Processing

Back Up Processing is initiated when a depth first search fails some aspect of the search criteria as detailed above. Back Up processing first backs up to a node from which the search can continue. Then paths which are eliminated by the back up are detected and removed. When a search criteria fails, including: access, sentence roles, state effect, and other application specific criteria, and when Fail-Report is false, processing is set to continue at 140480. 140480 sets S-Path to false, and sets B-Node to the MMAX[1, NODE−1]. MMAX selects the largest of 1 and NODE−1 which insures that B-Node is always greater than zero. After 140480, 140482 is next, and is true if B-Node equals 1 and BACK [Path-No, 1] equals zero. 140482 is true when the search is at Initial-Node and there are no untried Path-No addresses which implies the search has failed. If 140482 is true, processing continues at 140348 which selects the next purpose address as described above. If 140482 is false, 140486 is next, and is true if BACK[Path-No, B-Node] is greater than zero. If 140486 is false, B-Node has no untried addresses for Path-No, further backing up is required, and 140488 is next. 140488 is true if PATH[Path-No, B-Node, 2] equals zero which implies that the beginning of Path-No has been reached. If 140488 is true, 140490 selects Path-No's parent path number by setting Path-No to PATH[Path-No, B-Node, 1]. After 140490, or if 140488 is false, 140492 decrements B-Node by 1. After 140492, 140482 is next as described above. If 140486 is true, there are untried addresses for Path-No at B-Node, the back up is completed, and 140496 is next. 140496 is true if PATH[Path-No, B-Node, 2] equals zero which is the same condition as at 140488. If 140496 is true, 140498 sets S-Path to true. After 140490, or if 140496 is false, 140500 sets P-R to 1, Cur-P-R to 1, Path-Retrace[P-R, 1] is set to Path-No; and Path-Retrace[P-R, 2] is set to B-Node+1. Path-Retrace contains the path numbers and nodes which are removed or require different realizations.

After 140500, the process to remove the paths eliminated by the Back Up process begins at 140502. 140502 is true if Cur-P-R is less than or equal to P-R. If 140502 is true, there are paths to be eliminated, and 140504 sets C-Path-No to Path-Retrace[Cur-P-R, 1], and sets C-Node to Path-Retrace [Cur-P-R, 2]. After 140504, 140506 is true if PATH[C-Path-No, C-Node, 3] is greater than zero. If 140506 is true, C-Node has processed concurrent paths, and 140508 sets C-B to PATH[C-Path-No, C-Node, 3]; NCP is set to the number of concurrent address sets at C-Node; and NCP is set to the MIN[NCP, C-BR-Next-(C-B)]. C-B contains the C-Branch location of the first concurrent Path-No. NCP is set to the lessor of NCP and C-BR-Next-(C-B) because if a start of a concurrent path could not be found at C-Node, the number of concurrent addresses stored at C-Branch is C-BR-Next-(C-B). Otherwise, NCP is less than C-BR-Next-(C-B) and would thus be selected by the MIN function (which selects the smaller value of its terms or the first term if both terms are equal). After 140508, 140510 increments P-R by 1; NCP is decremented by 1; Path-Retrace[P-R, 1] is set to C-Branch[C-B]; and Path-Retrace[P-R, 2] is set to C-Node+1. 140510 adds a concurrent path number to Path-Retrace for later processing. After 140510, 140512 is next, and is true if NCP is greater than zero which implies that there are one or more concurrent paths to be added to Path-Retrace. If 140512 is true, 140514 increments C-B by 1, and 140510 is repeated. If 140512 is false, or if 140506 is false, 140516 increments C-Node by 1 which sets up the next node along C-Path-No to be processed. After 140516, 140518 is next, and is true if PATH[C-Path-No, C-Node, 1] is greater than zero. 140518 is true when there is another unprocessed node on C-Path-No. If 140518 is true, 140520 increments P-R by 1; Path-Retrace[P-R, 1] is set to C-Path-No, and Path-Retrace[P-R, 2] is set to C-Node. After 140520, or if 140518 is false, 140522 increments Cur-P-R by 1 which sets up the processing of the next Path-Retrace entry if any. After 140522, 140502 is next, and is true if there is another entry processed in Path-Retrace.

140502 is false if there is not another unprocessed entry in Path-Retrace. If 140502 is false, all paths which are to be eliminated have been found, and 140524 is next. 140524 removes all Path-No's in Path-Retrace[1 to P-R, 1] from In-Path. In-Path is a Boolean vector. A Path-No is in In-Path if In-Path[Path-No] equals 1, and is not in In-Path if In-Path [Path-No] equals 0. In removing all Path-No's from In-Path, the same Path-No may be removed more than once. This just sets an In-Path location to zero more than once which is judged to be more efficient than preventing multiple removals. Also the Path-No at 140500 is removed, but this Path-No is still active. Thus 140524 adds Path-No, the Path-No at 140500, to In-Path. This method of adding Path-No is judged to be more efficient than preventing the removal. 140524 also sets NODE to B-Node. After 140524, 140526 is next, and is true if S-Path is true, and if B-Node is greater than 1. If 140526 is true, the back up process has selected a concurrent path at B-Node as the first path to be continued, and 140528 sets up this path to be processed next. If 140526 is true, 140528 sets Ad-Source to CONCURRENT; the Concurrent-Address-Set is set to PATH[Path-No, NODE, 3]; O-Path is set to PATH[Path-No, NODE, 1]; and Cur-Node is set to PATH[O-Path, NODE, 2]; If 140526 is false, Path-No is continued next, and 140530 is next. 140530 sets Ad-Source to O-Source; Cur-Node is set to PATH[Path-No, NODE, 2]; and 140530 sets S-Path to false. After 140530 or 140528, processing continues at 140336 which is described above. This completes the description of the PATH-FIND process.

The PURPOSE-MANAGER

The PURPOSE-MANAGER performs the function of relating an interpretation of a clause to the context of a conversation in terms of previously stored experience and knowledge. The PURPOSE-MANAGER relates the clause interpretation to stored experience and knowledge by invoking the REL-SELECT and PATH-FIND processes. The PURPOSE-MANAGER process is described in detail below in this section. Utilizing an interpretation of a clause to access stored experience and knowledge makes it possible to accomplish other objectives. Accessing stored knowledge and experience allows the expectedness of the interpretation to be determined. The degree of expectedness is an optional component of plausibility. The expectedness also is a necessary but insufficient condition for learning. New information, including experience and knowledge, is unexpected. However, the value and plausibility of the new information must be determined before new information is learned. The plausibility and value of the information relative can be estimated internally through an application, or approved externally by a person for example. Learning at the purpose level is accomplished by storing the interpretation of the information in terms of purpose relations which include: the purpose relations of the new information to stored experience and knowledge, and other new knowledge or experience which is obtained and is related to the new information to be learned. The other new information can be obtained by comparing the new information with stored experience and knowledge to determine which old experience and knowledge is likely to he related to the new information. The other new information can also be obtained by generating questions to a reliable source of experience and knowledge. Questions are generated by requesting experience and knowledge which is stored with previously stored experience and knowledge which is similar to the new information to be learned.

The process to estimate the plausibility of an interpretation is generally made in terms of the expectedness of the clause, and the benefits gained to the doer and receiver: for performing the clause, for performing the purpose, or for performing the state change. The doer is the performer of an action or state change. The receiver is typically the owner of a result state or changed state. The plausibility of an interpretation is important because the reliable interpretation of ambiguous natural language is utilized to accomplish reliable applications of the processes described above. An interpretation determined to be implausible could cause a reinterpretation or a clarifying question for example.

Another objective made possible by relating a clause interpretation to previously stored experience and knowledge by determining stored purpose relations is the implementation of applications. Once the purpose relations of an interpreted incoming natural language clause to stored experience and knowledge has been determined, an application can determine what to do next. An application is typically at least partially realized as stored experience and knowledge in Memory 150, and this stored experience and knowledge is linked to external, application specific programs through dynamic purposes, which are described in detail below, and/or through well known programming interfacing techniques. The relative proportion of the Memory 150 implementation part of an application to the external, application specific programs can vary from minimal to near total. First, applications are described in general. Then an application is described below.

In general, an application determines the relation of the interpretation of the current clause and its purpose relations to the goals of the application. After this relation is determined, the application can select what action is required to achieve the desired goals of the application. The relations of the application goals to the current clause and its found purpose relations can be determined in a number of methods. The first method is for the application to utilize a classifying purpose to determine the relation of the clause and its purpose relations to the goals of the application. The second method is for the application to reinvoke the PURPOSE-MANAGER to determine purpose relations among the interpretation of the current clause, the current clause's purpose relation realizations, and the goal purpose relations of the application. A third method is to use the first method to limit the current clause's purpose relations and/or the possible goal purpose relations of the application, and then to use the second method with the limited current clause's purpose relations and the limited goal purpose relations of the application. A fourth method is for the application program to invoke its own process to relate the goals of the application to the clause interpretation and its stored purpose relations. An application can utilize one or more of the above general methods or other methods in its implementation. Once the goals of the application have been related to the interpretation of the current clause and its stored purpose relations, the type of relation and/or the related goal or goals of the application in the relation imply the next action to be taken by the application. The general type of relations include: no relation, partially satisfying a goal, satisfying a goal, initiating a goal, eliminating a goal, etc. In general any action possible is possible for applications in general.

An example application is the finding of a desired piece of information such as text in a data base of text or a process to accomplish a user task utilizing an operating system, text editor, spread sheet, etc. Finding information is an information extraction application, and an example realization follows. The application is initiated with a user informing an implementation of the processes described above with text or equivalent of a desire to locate information with a description of the information. For example, the application could be initiated with a question. The processes described above interprets the user input. If no application was currently active, or if the current application is not related to the current user description, a default application would classify the interpreted clauses to determine the type of application being initiated by the user. This is an example of using the first general method described above. However, any well known technique for classification can be utilized. In this example, the default application determines that a information extraction application is being initiated by the user. The processes described above then interpret the user's description clauses and invokes the PURPOSE-MANAGER to find relations among the interpreted clauses of the user description. This is an example of second general method described above. After a clause has been interpreted and its relations have been found, the application activates a classification process to determine if the clause is part of the desired information to be extracted or is a description of search parameters including match preciseness, range of matches, limitations, exclusions, and exceptions for example. The search parameters are further classified with respect to being related to the desired information or being related to the search process including the source data base, match requirements, etc. This is an example of using the third general method described above if the classification process utilizes classifying purposes.

At this stage of the example, the desired information has been interpreted and stored in Context Memory 120. The application now determines if the desired information is stored, unknown or impossible with its own process. This is an example of the fourth general method described above. If the application has the information base stored in its Experience and Knowledge Memory 150 realization in an exact form or in a generalized form of the information, the application determines if the desired information is stored, unknown or impossible by looking at which portion of the desired information is in 150. If the entire information base is in 150, relations not found in 150 are unknown. Impossible desired information is found by contradicting word sense number representations of the desired information during interpretation or by violating requirements to achieve relations during PURPOSE-MANAGER processing. If a generalized form of the information base is contained in 150, unknown information is detected as information which is stored and is specified as unknown, but information not found in 150 could be contained in the exact form in a different information base. Impossible desired information is found in the same method as for the case of the exact information base being stored in 150, but desired information may be found to be impossible by searching the exact form of the information base. If the desired information is found to be unknown or impossible, the application then interacts with the user to refine the desired information. The application can also interact with the user at this point to refine the search process parameters if the parameter combinations are impossible or unknown. After the desired information and search parameters have been refined, and if the entire exact form of the information base is not contained in 150, and if there is unknown desired information, the application generates key words to search certain information bases such as a large text information base. Key words are selected by an application specific classifying purpose or process. The selected key words are augmented with synonyms and morphological variants from Dictionary 20. Additional key words are generated for modifiers of key word nouns which imply the type number of the word sense number of key word nouns selected with the classifying purpose or process including: nouns, adjectives, and functional relations, i.e., clauses defining type. Such typing additional key words are combined with its related key word with the appropriate Boolean relation. Once key words are defined, the exact information base is searched for key word matches. Information with the key word matches is then interpreted by the processes described above. Another possible implementation of the information in 150 is to store the locations of the information stored in the exact information base. Another possible implementation is to pre-process the text data base to replace words with function word codes and word sense numbers. In all the 150 implementations, the information found or looked up in the exact form of the information base is compared with the desired information to determine if the information matches the desired information for the search parameters by the application. If a match is found, the application either reports the found information or continues the search depending upon the search parameters and the application. Note that the report could actually be the results of a desired action found and invoked by the application. The application reports all information as desired by the user to the user, and the application continues or terminates as desired by the user. This report is an example of a communication to the user.

The PURPOSE-MANAGER Process

The PURPOSE-MANAGER process determines the known relations between clauses of the conversation. These relations include: relations between stated clauses of the conversation, relations between stated clauses and implied clauses, and the relations between stated clauses and/or implied clauses and stored clauses organized into purposes in Memory 150. The relations between stated and implied clauses comprise a component of discourse processing. The relations among stated clauses, implied clauses, and purposes in 150 is the component of processing which completes the communication function of natural language utterances: namely, the communication of shared experience in the compacted form of typical natural language utterances. These relations makes it possible for the this process to achieve: "reading between the lines". The PURPOSE-MANAGER is parameterized so that only relations of interest to its application are considered. Thus, the PURPOSE-MANAGER can search for every possible known relation in its Memory 150, or can search for only a limited relation set including the null set. Another major function of the Program Manager is to search for the word sense number of state adjectives for certain natural language expressions. When a sentence composed of a clausal subject, a "to be" verb form, and a clausal subject complement is processed by the PURPOSE-MANAGER, the clausal subject has been interpreted for word sense number selection, but the subject complement has not been processed for word sense number selection because the subject complement's word sense number is determined by a purpose relation between the subject and subject complement. For example, "Watching a football game is fun." is a type of sentence requiring a word sense of the subject complement to be consistent with the purpose relation of the clausal subject and the subject complement which is a clause. One interpretation of the above example is: "Watching a football game causes fun for me." where this interpretation assumes that the speaker of the sentence is the subject of the clausal subject. In this interpretation, the verb "causes" implies the purpose relation between the clausal subject and the clausal object, "fun for me". The subject complement in such sentences is normally a state adjective or state abstract noun. Other types of possible clausal subjects imply their clauses, and hence can be interpreted for their word sense numbers as described above. For example, a morphological word@ adjective is a possible subject complement. In this situation, the morphological word@ clause normally has the clausal subject as a sentence role in its implied clause. For example, "Watching a football game is enjoyable." is equivalent to "I enjoy watching a football game." In addition to selecting word sense numbers of subject complements in certain cases, the PURPOSE-MANAGER also optionally performs timing, modal and application specific checks. Also, the PURPOSE-MANAGER can optionally create data structures which are converted to outgoing natural language by Text Generation Step 200 which is described below. The detailed description of the PURPOSE-MANAGER is next.

The PURPOSE-MANAGER is invoked when the current Invocation-Opcode is PURPOSE-MANAGER at 14006 which makes 14006 true. The PURPOSE-MANAGER is typically invoked from Step 18. If 14006 is true, processing continues at 140600. 140600 is true if Cur-Clause is the first clause of the conversation. Cur-Clause is an invocation parameter, and is typically the clause which has just been interpreted for word sense number selection as described above. If 140600 is true, 140601 sets Cur-App, the identifier for the current application, to NULL. If 140600 is false, or after 140601, 140602 sets up a call to a classifying purpose to determine if Cur-App has changed given Cur-Clause. 140602 sets 140-Return to 140603, and calls 140[CLASSIFY, Cur-App-Select, Cur-App, Cur-Clause, 140-Return]. Classification purposes and CLASSIFY are described in detail below. After Cur-App has been selected or left unchanged, 140603 is next, and is true if Interp-Plaus[Cur-App] is true. Interp-Plaus[Cur-App] is true when Cur-App requires that the plausibility of the interpretation of Cur-Clause is to be checked by Plausibility and Expectedness Checker 170, and Cur-App requires application specific checks during REL-SELECT and/or PATH-FIND. Checking the plausibility of the interpretation could include the checking of pronoun referents and ellipted entities for example. When 140603 is true, 140604 calls 170 to process Cur-Clause to determine which checks are required for plausibility checks such as the sentence roles which where not explicitly stated. For example, such plausibility checks include comparing state information to determine if the location of doers is consistent with the selected entities in such sentence roles. The actual plausibility checks can be performed with Other-Checks processes of Cur-App which are processed through calls at 140402 in PATH-SELECT for clauses in realization paths of purposes, state changes and processes. Other plausibility checks can be performed through specification of State-Select for processing at 140266 in REL-SELECT. The plausibility of the interpretation for Cur-Clause is also optionally checked from a call at 140726 which is described below. If 140603 is true, 140604 sets 140-Return to 140605, and calls 170[Interp-Plaus-Check-Init, Cur-Clause, 140-Return].

After the plausibility checks have been selected, or if 140603 is false, 140605 looks up the purpose processing parameters of Cur-App and instantiates them for processing at the PURPOSE-MANAGER. The parameters include initial state policy, proceed type, other checks, relation select checks, etc. These parameters are described below for variable names. 140606 is next, and is true if Cur-Clause is a state adjective or state abstract noun, a state word, in a purpose relation to a clause, and the state word does not have a selected word sense number. For example, "Wasting money is silly." is an example with a state adjective subject complement, "silly" in a purpose relation to a clausal subject, "Wasting money". In another example, "Watching television is fun." is an example with a state abstract noun subject complement, "fun", in a purpose relation to a clausal subject, "Watching television". Another example is "Fun is watching television." In this example, "Fun" is a state abstract noun which would fail word sense number selection processing as the subject of the verb, "watching". However, another syntax interpretation of this example is: that "watching television is a clause which is in a purpose relation to "Fun". A clausal relation to a state abstract noun or state adjective is detected by Step 18. Note there are certain constructions in English which appear to make 140606 true, but actually such constructions do not make 140606 true. For example: "Working hard is good for the soul." In this case, "is good for" is actually an idiom for "benefits". Such idioms are detected and replaced by Dictionary Look Up Step 18, or are detected in Parsing Step 16 and replaced in subsequent processing. An example of a clause modifying a state adjective is: "It was easy for him to finish school." If 140606 is true, the PURPOSE-MANAGER selects the word sense number of the state adjective or state abstract noun implying Cur-Clause. If 140606 is true, 140607 sets Cur-ADJ to the state adjective or state abstract noun implying Cur-Clause; ADJ-W-S is set to the word sense numbers of Cur-ADJ which are stored in Dictionary 20 with general owners ordered with respect to their presence in 120 as described above; F-Pur is set to false; and 140607 sets C-S-ADJ-Comp to true. F-Pur is true when a purpose relation between the clause and Cur-Clause has been found. C-S-ADJ-Comp is true when 140606 is true. After 140607, 140608 sets Cur-Owner to the next untried owner in Ad-Mod[Cur-ADJ, Clause-Rel-ADJ, Cur-Nat-Lang]. Ad-Mod contains the possible owners for a state adjective or state abstract noun in a sentence with a state word in a relation to a clause in the current natural language. In English the possible owners are the subject in the clausal subject, the subject in the modifying clause, the speaker, a general owner, etc.

After 140608, 140610 is next, and is true if an owner was selected by 140608 or if F-Pur is true. If 140610 is false, 140612 informs the Communication Manager of a failure to select a word sense number for a state adjective or state abstract noun which has an implied purpose relation to a clause. If 140610 is true, 140614 is next, and is true if an owner was selected by 140608. If 140614 is true, 140616 sets Invo-ADJ-W-S to the word sense numbers in ADJ-W-S with a general owner match with Cur-Owner. General owner matches are described above. 140616 also removes the word sense numbers just stored in Invo-ADJ-W-S from ADJ-W-S so that a word sense number is only processed once. After 140616, 140618 is next, and is true if Invo-ADJ-W-S is not empty. If 140618 is false, 140608 is next as above. If 140618 is true, 140620 sets up parameters for Selector 50 to process Cur-ADJ for any adverbial modifiers excluding non-adverbial prepositional phrases (non-adverbial prepositions modifying Cur-Adj have already been processed), and to process Cur-ADJ for nearest owner adjective word sense numbers as described above for 50. 140620 sets 140-Return to 140622, and calls 50[LOOK-UP, STATE-ADJ, Cur-ADJ, Invo-ADJ-W-S, ADJ-Purpose-Set, 140-Result]. LOOK-UP is the invocation opcode, and STATE-ADJ is the type of LOOK-UP. After processing at 50, 140622 is next, and is true if ADJ-Purpose-Set is not empty. ADJ-Purpose-Set is not empty when one or more word sense numbers in Invo-ADJ-W-S are compatible with the modifiers of Cur-ADJ. If 140622 is false, processing continues at 140608 as above. If 140622 is true, 140624 processes the adjective or state abstract noun word sense number entries in ADJ-Purpose-Set. First 140624 forms a set of all purposes associated with the entries in ADJ-Purpose-Set and appends this set of purpose addresses to Usage-Purpose-Set which is used by the REL-SELECT process to form Purpose-Set at 14002 as described above for purposes defined by usage. 140624 also associates the word sense number with each purpose address in Usage-Purpose-Set. The associated word sense numbers are appended to W-S-Vec. W-S-Vec is used later to associate the adjective or state abstract noun word sense number with a purpose relation between the adjective or state abstract noun and the related clause. Finally, 140624 sets processing to continue at 140630 which calls REL-SELECT.

If Cur-Clause is not a state adjective or state abstract noun in a purpose relation to a clause, 140606 is false, and 140625 sets C-S-ADJ-Comp to false, and 140626 is next. 140626 is true if REL-SEL is true. REL-SEL is a parameter of Cur-App and is true if the current application requires Cur-Clause to be processed by REL-SELECT. If 140626 is false, 140628 returns processing control to the caller. If 140626 is true, or after 140624, 140630 is next and calls REL-SELECT. 140630 sets 140-Return to 140632, and calls 140[REL-SELECT, Cur-Clause, R-S-Check-Set, 140-Return]. R-S-Check-Set contains the parameters which are selected from a call from 140604 and which determine which checks are performed during processing by REL-SELECT as described above. If no parameters were selected from the call, R-S-Select is NULL. After REL-SELECT completes processing, 140632 is next, and is true if C-S-ADJ-Comp is true. If 140632 is true, 140634 sets F-Pur to true. 140636 is next and is true if a non-default purpose relation was found between the adjective or state abstract noun and related clause. If 140636 is false, processing continues at 140608 because this process is designed to consider all feasible adjective or state abstract noun word sense numbers until a stored purpose relation is found, i.e., a non-default purpose relation is found. All feasible word sense numbers of such a state adjective or state abstract noun have been checked for all possible owners when 140614 is false after 140608. If 140614 is false, 140640 removes all but the first default purpose from Usage-Purpose-Set, and removes all but the corresponding word sense number from W-S-Vec. 140640 stores Usage-Purpose-Set and W-S-Vec at the SDS position of Cur-ADJ. If 140636 is true, non-default purpose relations have been found by REL-SELECT, and 140642 is next. 140642 removes all the default purposes from Usage-Purpose-Set, and removes all word sense numbers corresponding only to default purposes from W-S-Vec and compresses W-S-Vec. 140642 stores Usage-Purpose-Set and W-S-Vec at the SDS position of Cur-ADJ.

If 140632 is false, or after 140640 or 140642, 140644 is next, and is true if State-Check-Set has an unprocessed entry. State-Check-Set contains designated states which have changes implied by Cur-Clause and are deemed to require a determination of the state change process by Cur-App. State-Check-Set is formed during REL-SELECT processing as described above. If 140644 is true, 140648 is next, and is true if the first value of the next unprocessed entry in State-Check-Set is new. 140648 is true when the initial value of a state in a State-Check-Set entry is unknown from the context. If 140648 is true, 140650 sets S-V-1 to the next untried initial state selected with Init-S-V-Policy[Cur-Clause]; S-V-2 is set to the next untried final state selected with Init-S-V-Policy[Cur-Clause]; and C-Proceed-Type is set to the next untried error handling value selected with Init-S-V-Policy[Cur-Clause]. Init-S-V-Policy[Cur-Clause] is a set of rules for selecting the initial state value, the final state value, and the Proceed-Type parameters of the PATH-FIND process as described above. The unknown initial state can be selected according to the purposes of Cur-App. Example policies include: the nearest state value, the farthest state value, etc. The final state, which is implied by the interpretation of Cur-Clause, is allowed to be adjusted because the Cur-App may determine that the implied final state value is not proper due to misinterpretation or error for example. Also, the final state value may be adjusted to consider the ramifications. The PATH-FIND-Type, which is labeled C-Proceed-Type for the invocation parameter, determines what action is to be taken upon a failure to find a purpose path as described above. C-Proceed-Type has a value of Fail-Report or IGNORE. Cur-App can dynamically adjust the selection policies in Init-S-V-Policy. If 140648 is false, 140652 sets S-V-1 to the first state value of the next unprocessed State-Check-Set entry; S-V-2 to the second state value of the next unprocessed State-Check-Set entry; and C-Proceed-Type is set to Proceed-Type[STATE], a parameter of Cur-App for state transition processes. After 140650 or 140652, 140654 sets up a call to PATH-FIND. 140654 sets RESTART to false; Purpose-Set is set to the purposes at the word sense number entry of S-V-1 with a state change direction of S-V-1 to S-V-2; Invocation-Type is set STATE; 140-Return is set to 140656; and 140654 calls 140[PATH-FIND, Invocation-Type, Purpose-Set, S-V-1, S-V-2, C-Proceed-Type, P-F-Check-Set[STATE], Other-Checks[STATE], RESTART, Result-Type, 140-Return]. P-F-Check-Set[STATE] and Other-Checks[STATE] are parameters which designate which checks are to be performed during the PATH-FIND process selected from a call at 140604 as described above. Result-Type contains the status of the PATH-FIND process upon completion.

After processing by PATH-FIND for state change process path finding, 140656 is next, and is true if Result-Type is SUCCESS. Is 140656 is true, the processing was completed successfully, and 140658 sets the current entry in State-Check-Set as processed; the state change path data which is relevant to Cur-App is stored in the SDS; and 140658 sets processing to continue at 140644 for another entry as above. If 140658 is false, 140660 is next, and is true if C-Proceed-Type equals Fail-Report. If 140660 is true, 140662 calls Cur-App[State-Change-Path-Fail, Initial-Node, Cur-Node, Result-Type, R-Add, 140-Return]. Initial-Node, Cur-Node, and R-Add are variables of the PATH-FIND process. Cur-App then processes the failure to determine what action is appropriate for its application. If 140660 is false, 140664 is next, and is true if the first entry is new, and Init-S-V-Policy [Cur-Clause] has another selection. If 140664 is true, processing continues for the next selection at 140650 as above. If 140664 is false, 140668 is next, and is true if C-S-ADJ-Comp is true. If 140668 is true, processing continues at 140608 as above. If 140668 is false, 140672 informs the Communication Manager of path find failure for a state value change path realization.

If State-Check-Set is empty or has all its entries processed, 140644 is false, and 140680 is next. 140680 is true if Purpose-Path-Find is true. Purpose-Path-Find is a parameter of Cur-App, and is true if a purpose path relation between Cur-Clause and the conversation is deemed to be required for Cur-App. If 140680 is false, 140682 sets Pur-Rel-P-F to false, and sets processing to continue at 140710 which is described below. If 140680 is true, 140684 is next, and is true if Cur-Clause has stored purpose relations in its entries of Context-Purpose-Set. These non-default purpose relations, if any, were stored by REL-SELECT. If 140684 is false, 140686 sets Unstored-Rel to true, and 140682 is next as above. If 140684 is true, 140688 calls PATH-FIND to find a purpose relation between Cur-Clause and the context of the conversation. 140688 sets Purpose-Set to contain the stored purposes in Cur-Clause's Context-Purpose-Set entries; Invocation-Type is set to Purpose-Path; RESTART is set to false; 140-Return is set to 140690; and 140688 calls 140[PATH-FIND, Invocation-Type, Purpose-Set, Cur-Clause, Proceed-Type [Purpose-Path], P-F-Check-Set [Purpose-Path], Other-Checks[Purpose-Path], RESTART, Result-Type, 140-Return]. P-F-Check-Set [Purpose-Path] and Other-Checks [Purpose-Path] are parameters which designate which checks are to be performed during the PATH-FIND process as described above. After processing by PATH-FIND for purpose path finding in the context of the conversation, 140690 is next, and is true if Result-Type is SUCCESS. If 140690 is false, 140694 is next, and is true if Proceed-Type equals Fail-Report. If 140694 is true, 140696 calls Cur-App[Purpose-Path-Fail, Cur-Purpose, Cur-Node, Result-Type, R-Add, 140-Return]. Cur-Purpose, Cur-Node, and R-Add are parameters returned from PATH-FIND. Cur-App then processes the failure to determine what action is appropriate for its application. If 140694 is false, 140698 is next, and is true if C-S-ADJ-Comp is true. If 140698 is true, processing continues at 140608 as above. If 140668 is false, 140700 informs the Communication Manager of path find failure for a purpose path realization. If 140690 is true, the processing was completed successfully, and 140702 sets Pur-Rel to Cur-Purpose; Pur-Rel-P-F is set to true; the purpose path data which is relevant to Cur-App is stored in the SDS; and 140702 sets Unstored-Rel to false. After 140702, 140704 is next, and is true if Cur-Purpose has been previously stored in Context Memory 120. 140704 is true if Cur-Purpose is established. If 140704 is true, 140706 marks Cur-Purpose as ESTABLISHED at its SDS position, and 140706 sets processing to continue at 140710 which is described below. If 140704 is false, Cur-Purpose is a new purpose in the conversation, and 140708 is next. 140708 stores Cur-Purpose in 120, and 140708 sets processing to continue at 140710.

If Purpose-Path-Find is false, if there is no stored purpose relation, or after successfully completing PATH-FIND for a purpose path realization, 140710 is next. 140710 sets Cur-C-Proc to false. Cur-C-Proc is true if a process to achieve a result state is needed for Cur-App, and a process realization has been found. After 140710, 140711 is next, and is true if Process-Path-Find is true, and if Cur-Clause has a process set. Process-Path-Find is a parameter of Cur-App, and is true if Cur-App requires that a process path be found when possible. A path can be found when Cur-Clause is a result state with known process paths. If 140711 is true, 140712 calls PATH-FIND to find a process path realization for Cur-Clause for the context of the conversation. 140712 sets Purpose-Set to contain the union of the purposes in ALL-M, S-M, IO-M, DO-M, IAD-M or AS-M and Process-Set. These variables are defined at 70974, and they contain processes associated with various sentence matches of Cur-Clause to stored clauses in Memory 100. Process-Set contains all the possible processes for Cur-Clause. The purpose of performing the union of these sets of processes is to order the processes with respect to the matching of sentence roles to Cur-Clause to stored clauses. The order used in constructing the Purpose-Set is selected for a general purpose application. The order of processes in Purpose-Set could also be tailored to a specific application. 140712 also sets Invocation-Type to PROCESS; RESTART is set to false; 140-Return is set to 140714; and 140712 calls 140[PATH-FIND, Invocation-Type, Purpose-Set, Cur-Clause, Proceed-Type[PROCESS], P-F-Check-Set[PROCESS], Other-Checks[PROCESS], RESTART, Result-Type, 140-Return]. P-F-Check-Set[PROCESS] and Other-Checks[PROCESS] are parameters which designate which checks are to be performed during the PATH-FIND process as described above. After processing by PATH-FIND for process path finding, 140714 is next, and is true if Result-Type is SUCCESS. Is 140714 is true, the processing was completed successfully, and 140722 sets Cur-C-Proc to true; the process path data which is relevant to Cur-App is stored in the SDS; and 140722 sets processing to continue at 140724 which is described below. If 140714 is false, 140716 is next, and is true if Proceed-Type equals Fail-Report. If 140716 is true, 140718 calls Cur-App[Process-Path-Fail, Cur-Purpose, Cur-Node, Result-Type, R-Add, 140-Return]. Cur-App then processes the failure to determine what action is appropriate for its application. If 140716 is false, 140720 informs the Communication Manager of a PATH-FIND failure for a process path realization.

If a process path is not to be found, 140711 is false. If 140711 is false, or after PATH-FIND successfully finds a process path realization for Cur-Clause, 140724 is next, and is true if Plaus-Expect-Check is true. Plaus-Expect-Check is true when Cur-App requires that the interpretation and purpose relations of a clause be checked for plausibility and expectedness by Plausibility and Expectedness Checker 170 which is described below. If 140724 is true, 140726 sets 140-Return to 140730, and calls 170[PLAUS-EXP-CHECK, Cur-Clause, Cur-App, Result-Type, P-E-Vec, 140-Return]. Result-Type is the overall result value, and P-E-Vec is a vector of plausibility and expectedness values for each category of plausibility or expectedness. For example, categories include: plausibility of benefits to a doer and receiver, expectedness of result state, expectedness of state changes, expectedness of process, expectedness of doer, expectedness of receiver, etc. After the plausibility and expectedness have been checked at 170, 140730 is next, and is true if the Result-Type equals SUCCESS. If 140730 is false, 140734 is next, and is true if Plaus-Expect-Fail is true. Plaus-Expect-Fail is true when Cur-App processes plausibility and expectedness failures. If 140734 is true, 140736 sets 140-Return to 140732, and calls Cur-App[Plaus-Expect-Check-Fail, Cur-Clause, Cur-Purpose, P-E-Vec, 140-Return]. If 140734 is false, 140738 informs the Communication Manager of a plausibility and expectedness check failure. If 140730 is true, Cur-Clause has met its plausibility and expectedness checks for Cur-App, and 140732 stores P-E-Vec at the SDS position of Cur-Clause's verb when Cur-Clause is not implied by a clause implying word, or else at the SDS position of the clause implying word of Cur-Clause or related word as described above.

If 140724 is false, or after 140732, a check of the plausibility and expectedness of Cur-Clause has been skipped or successfully completed respectively, and 140740 is next. 140740 stores the states of stated adjectives of Cur-Clause in Invocation-State-Set in preparation for the final processing of the stated adjectives of Cur-Clause. After 140740, 140742 is next, and is true if Invocation-State-Set is not empty. If 140742 is true, 140744 sets 140-Return to

140746, and calls 50[ADJECTIVE-COMPLETION, Invocation-State-Set, 140-Return] to finish the processing of the adjectives whose states are in Invocation-State-Set as described at the Selector 50 section. After processing at 50 is completed, or if 140744 is false, 140746 is next, and is true if Cur-App[Other-Checks] is true. 140746 is true if Cur-App has specific checking of Cur-App for application dependent goals. If 140746 is true, 140748 sets 140-Return to 140750, and calls Cur-App[0-Checks, Cur-Clause, 140-Return]. If 140746 is false, processing continues at 149750.

After Cur-App processes Cur-Clause for its specific checks, or if 140746 is false, 140750 is next, and is true if Cur-App[Specific-Time-Check] is true. If 140750 is true, Cur-App has a non-standard check for timing related properties, and 140752 is next. 140752 sets 140-Return to 140790, and calls Cur-App[App-Time-Check, Cur-Clause, 140-Return]. If 140750 is false, 140754 is true if Cur-App [General-Time-Check] is true. If 140754 is false, processing continues at 140790. If 140754 is true, time bounds for Cur-Clause are computed to the extent possible, and 140756 is next. 140756 is true if Cur-Clause has a purpose path to a stated clause. If 140756 is true, 140758 sets Max-Time-Change to the largest time value at the end of a purpose path of Cur-Purpose starting at Initial-Clause and ending at Cur-Clause. This time value is S-Cur-Time as calculated at 140365, 140368, 140372, or 140374 above. The largest time is found at the last nodes of paths in Time-Vec for Cur-Clause. 140758 also sets Start-Time to Max-Time-Change+Cur-Time of the Initial-Clause on the found purpose path, and sets Def-Time to false which implies that Start-Time is not a default value. Cur-Time is calculated at 140236, 140240, or 140242. If 140758 is false, 140760 sets Start-Time to the End-Time of the first default time related clause, which is described for Timing Relation Selection Process of FIG. 10c for English, and sets Def-Time to true. After 140758 or 140760, 140762 is next, and is true if State-Check-Set has an entry with a known initial state. If 140762 is true, 140764 computes the latest time that an implied state change process would be completed for states in State-Check-Set with a known initial state using this method: for each such state, find the largest time value of the state change purpose path of a particular state and add this quantity to the initial state's time point. An initial result state's time point is the End-Time of the clause implying the result state, and for non-result state's, the time is the Start-Time of the clause which implies the state through the statement of an adjective or through requirement. The End-Time is defined below. After 140764 computes the latest time for a final state value of a state in State-Check-Set with a known initial value, 149764 sets S-Start-Time to the latest time value of all the time values computed for final states. After, 140764, 140766 is next, and is true if S-Start-Time is greater than Start-Time. If 140766 is true, 140768 sets Start-Time to S-Start-Time.

After 140768, or if 140766 or 140762 is false, 140770 is next, and is true if Cur-Clause has a stated time point relation. Cur-Clause has a stated time point relation if Cur-Clause contains a stated adverbial subclass, implied by a stated adverb modifier, which sets a time point value or value range, or sets a relation to a time point value or value range. For example, "at 10" has an associated adverbial subclass function which sets the time point to have a value of "10 AM" for a context in the morning, and "about 10" which implies a value range of "9:45 to 10:15 AM". The time relations include: before, during, or after a time point value or value range such as "before 10", "during the game", or "after about 10". If 140770 is true, 140772 is next, and is true if the Start-Time is consistent within T-Err[Cur-App, UNITS] of the stated time relation. T-Err[Cur-App, UNITS] is the acceptable error range associated with Cur-App for the UNITS of the stated time point value. Start-Time is consistent: if, for a "before" type relation, the Start-Time value plus the lower value of the T-Err[Cur-App, UNITS] range, (typically less than or equal to zero), is less than or equal to the upper value of the stated time range or the stated time value; if, for a concurrent, e.g., "during", type relation, the difference between the Start-Time value and the upper value of the stated time range or stated time value is within the T-Err[Cur-App, UNITS] range, or the difference between the Start-Time value and the lower value of the stated time range or stated time value is within the T-Err[Cur-App, UNITS] range; if, for a "after" type relation, the Start-Time value plus the upper value of the T-Err[Cur-App, UNITS] range, (typically greater than or equal to zero), is greater than or equal to the lower value of the stated time range or the stated time value. If Start-Time is consistent within a T-Err[Cur-App, UNITS] range as just described, 140772 is true. If 140772 is false, 140776 informs the Communication Manager of a time error discrepancy.

If 140772 is true, or if 140770 is false, 140778 is next, and begins the assignment of the End-Time value for Cur-Clause. 140778 is true if Cur-Clause has a selected process path realization. If 140778 is true, 140780 sets End-Time to Start-Time plus the largest time value of the selected process path realization. If 140778 is false, 140782 is next, and is true if Cur-Clause has a process. If 140782 is true, 140784 sets End-Time to Start-Time plus the completion time of the typical process which is stored in a adverbial duration type subclass of Cur-Clause in Memory 100. If 140782 is false, 140786 sets End-Time to equal Start-Time. After 140780, 140784, or 140786, 140788 stores Start-Time and End-Time at the SDS position of Cur-Clause's verb when Cur-Clause is not implied by a clause implying word, or else at the SDS position of the clause implying word of Cur-Clause as described above. After time processing has been completed by the general process described above, or after time processing has been completed by a specific process of Cur-App, or if time processing has been skipped, 140790 is next.

140790 is true if Modal-Func[Cur-App] is true. Modal-Func[Cur-App] is true when Cur-App requires that stored modals be processed to select a modal value for Cur-Clause. If 140790 is true, 140792 sets Cur-Modal to Modal-Comp [Modal-Vec, Cur-Clause, Cur-App]. Modal-Comp is an application specific process for selecting the modal of a clause. The modal selecting process depends upon the goals of the application and the type of access which was selected for Cur-Clause's implied state value change process path realization, purpose path realization, and/or process path realization. For example, if these realizations are all stored as realizations of purpose addresses, Cur-Modal is typically set to the stored modal value. In this case, Cur-Clause states previously stored experience and knowledge. Determination of whether a purpose path is a realization of a purpose address is performed by application specific Other-Checks at 140402 of PATH-FIND. If one or more of these realizations are combinations of previously stored experiences and knowledge, and hence, each such realization is not a realization of a purpose address, Cur-Modal is typically set to a combination of the modals stored in the Modal-Vec of each realization according to the goals of Cur-App. For example, a Cur-App application which is proposing a solution would not consider volitional modals such as "desire" in its combination of modals. Another possibility is that Cur-App just sets Cur-Modal to any stated modal in Cur-Clause for applications where the modal is set by the source and is unambiguous. If the modal is ambiguous, the modals in Modal-Vec could eliminate the ambiguity. For example, in "I can't possibly . . . ", "possibly" could have a modal value of "not possible", "not able", or "not willing". Then, if modals in Modal-Vec imply impossibility, the first modal is selected. If modals in Modal-Vec imply an unrealizable process, the second modal is selected. Otherwise, the third modal is selected. Modal-Comp can also set Modal-Report to true or false. If Modal-Report is false, any discrepancy between the current interpretation of a clause's modal and Cur-Modal is ignored. For example, Modal-Report is set to false when an ambiguous modal is corrected. After 140792 computes the value of Cur-Modal, 140794 is next, and is true if Cur-Clause has a stated modal. If 140794 is true, 140796 sets the Modal-Dif to the absolute value of Cur-Modal minus the stated modal value. After 140796, 140798 is next, and is true if Modal-Report is true and Modal-Dif is greater than Modal-Err[Cur-App]. Modal-Err[Cur-App] is the allowable difference between a stated modal and a computed modal for Cur-App. If 140798 is true, 140800 informs the Communication Manager of modal error discrepancy. If 140798 or 140794 is false, 140802 stores Cur-Modal at the SDS position of Cur-Clause's verb when Cur-Clause is not implied by a clause implying word, or else at the SDS position of the clause implying word of Cur-Clause.

After modal processing has been completed at 140802, or if modal processing is skipped at 140790, 140804 is next, and is true if RESPONSE[Cur-App] is true. RESPONSE [Cur-App] is true when Cur-App is required to determine if a response should be formed to reply to the source with respect to Cur-Clause. In general, a communication is set to a user of an implementation of this description. An important class of communications is responses to such a user. A response would normally not be formed until a sentence has been interpreted and processed for purpose identification. However, in general, a communication can be formed before a sentence has been processed. For example, a clause occurring before the completion of a sentence could generate a communication if an error condition or contradiction is detected for example. The example application described above detailed several types of responses including: generating responses to properly define the desired information and search parameters, reporting results, and performing desired actions. These type of responses are examples of a class of responses which is determined by the goals of the application. Another class of responses is determined by the known, perceived, or assumed status of the user relative to the information desired by the user. For example, consider an application which is to provide explanations to a user. The status of the user which is of interest to this class of application is what information is already known by the user. For example, the status of the user's known information is known when the user asks a question about some textual information. In this case, the application can call the PURPOSE-MANAGER to find a relation and a realization path between the textual information and the user's question. An example of obtaining the perceived status of a user's knowledge occurs when a user's question is related to stated information in a conversation, past or present. In this case, the application can call the PURPOSE-MANAGER to find a relation and a realization path between the stored history of the conversation in Context Memory 120 and the user's question. An example of obtaining the assumed status of a user's knowledge occurs when a user's question is classified with a classifying purpose to select the assumed status of the user's knowledge. In this case, the application can call the PURPOSE-MANAGER to find a relation and a realization path between the knowledge assumed to be known by the user and the user's question.

In the above general examples for response and for communications in general, the application can optionally select specific constituents from the context of the user for the sentence roles of the response or communication in general prior to the invocation of the PURPOSE-MANAGER. The constituents are selected prior to the invocation of the PURPOSE-MANAGER because then the selected relation and path realization is consistent with the selected constituents. The advantage of selecting constituents is that the explanation is in terms of the conversation. For example, the clauses of the explanation can contain general constituents such as subjects, objects, instruments, time, location, etc. The application determines the specific doers and receivers candidates of the explanation from the context of the situation by looking them up at the clause initiating the need for an explanation such as from a question. The other specific constituents would be looked up for their presence in 120. If such a constituent is in 120, it is a candidate for a specific instance of a stored constituent. Such specific constituent candidates are used to replace stored constituents if the specific constituents meet their sentence role requirements. A specific constituent is selected and tested by utilizing an Other-Checks process at 140402 which checks if a selected specific constituent meets the requirements of its sentence role. If a selected constituent is not sufficiently specified, or if a specific constituent with a sufficient specification does not meet a sentence role requirement, other constituents in the context are tested for meeting the sentence role requirement. If all specific constituents fail, a general constituent is used. Optionally, the application can insert clauses in the explanation communication which specify requirements for constituents which are not sufficiently specified to determine if they meet their sentence role requirements. Also, the application could insert a clause in the explanation communication which describes why one or more specific constituents can not be utilized.

Once the application determines a explanation purpose path for the explanation communication or any other type of purpose path communication, the application then selects the clauses which are to be output. The clauses to be selected are determined by the application through various methods including: selecting purposes which have a level of explanation corresponding to the known, perceived, or assumed level of the user; look up a text containing the explanation in a text data base; present a typical purpose explanation and embellish the explanation through interaction with the user, etc. In summary, the application determines the communication to a user when deemed appropriate by the application. The application determines the communication through use of processes of this description and/or specific processes of the application. The experience and knowledge in Memory 150 can serve as the verbatim source of the communication, and/or the experience and knowledge in 150 can be selectively combined, customized to the current context, and/or qualified to the purposes of the context to create new experience and knowledge to serve as the source of the communication.

If the application requires that an appropriate communication to a user be determined, RESPONSE[Cur-App] is true, and hence 140804 is true. If 140804 is false, 140806 returns processing control to the caller. One notable case of 140804 being false occurs when the application deems it necessary to select all possible purpose paths for all found purpose relations. This case could occur when the application needs to determine all possible purpose paths of Cur-Clause to the conversation. In this case the application removes all purpose relations which failed to have a path, and removes the purpose relation which had a path from Context-Purpose-Set. The application also adjusts application specific parameters as needed. Then the application starts the PURPOSE-MANAGER at 140688 which starts the process of selecting paths with the untried purpose relations in Context-Purpose-Set. After all purpose relations have been processed for path finding, the application could optionally restart the PURPOSE-MANAGER to process a communication as is described below.

If 140804 is true, the type of purpose path found for Cur-Clause is labeled next to assist the application in selecting its communication, and 140808 is next, and is true if Pur-Rel-P-F is true. If 140808 is true, a purpose path from Cur-Clause to the context was searched for. If 140808 is false, 140810 sets Purpose-Type to NULL. If 140808 is true, 140812 is next, and is true if Pur-Rel, the purpose which relates Cur-Clause to the conversation, has a purpose modification function. The purpose modification functions include: exception, information, condition, contrast, proportion, etc. Purposes with functions of modifying purposes are generally defined as a relation of a clause which specifies a component of the purpose it modifies. Thus a clause which is related to the conversation with a purpose having an exception function specifies when its modifiee clause is not applicable or when it is applicable. If 140812 is true, 140814 sets Purpose-Type to PURPOSE-MODIFICATION. If 140812 is false, 140816 is next, and is true if Pur-Rel is an established purpose in the conversation, i.e. Pur-Rel has at least three stated clauses, including Cur-Clause, contained in the purpose relation. If 140816 is true, 140818 sets Purpose-Type to PURPOSE-CONTINUATION. If 140816 is false, 140820 sets Purpose-Type to NEW-PURPOSE. After 140810, 140814, 140818, or 140820, 140822 calls Cur-App to select the communication appropriate to its application. 140822 sets 140-Return to 140824, and calls Cur-App[RESPONSE, Cur-Clause, Unstored-Rel, Purpose-Type, Cur-C-Proc, State-Check-Set, Action-Type, Action-List, 140-Return]. Action-Type and Action-List contain the type of communication from Cur-App's processing, and Action-List contains clause specifications when the PURPOSE-MANAGER is selected to compose the data structures of clauses which is used by the Text Generation Step 200 process which is described below.

After Cur-App performs its communication processing, 140824 is next, and is true if Action-Type equals CONTINUE, which implies there is no communication, or if Action-Type equals RESPONSE-READY, which implies the communication has already been prepared for output. If 140822 is true, 140829 returns processing control to the caller. The application could set the Action-Type to make 140824 false in order to delay a communication until all possible purpose paths have been found as described above. If 140822 is false, 140826 is next, and is true if Action-Type equals STANDARD-OUTPUT. If 140826 is false, 140828 informs the Communication Manager of an output formation error. If 140826 is true, 140827 stores information related to the storage of the output and the purpose of the of the communication. 140827 sets Init-Pos to the next unused position in Out-List; Cur-Resp-Pur-Address is set to the address of the communication purpose path; Response-Object is set to the address of the input SDS prompting the communication or NULL if the communication is not related to an input; and Cur-Resp-Func is set to the purpose function of Cur-Resp-Pur-Address. Cur-Resp-Pur-Address points to a specific purpose address in 150 with clause constituents specified as needed if the communication is a stored purpose, points to a PATH like data structure in 140 which contains a purpose composed of one or more stored purposes and/or newly created purpose paths with clause constituents specified as needed, points to one or more word sense numbers with relations among more than one word sense number, points to one or more clause implying word sense numbers and the purpose relations among more than one clause implying word sense number with clause constituents specified as needed. After 140827, 140830 begins the process of forming the Out-List data structure which is used by the Text Generation Step 200 process. In the case of Cur-App forming a communication, the clauses and their constituents are selected by Cur-App and placed in Action-List using a process as described above for example. Action-List contains a set of clause implying word sense numbers, the clauses' constituents, their preceding clause in their purpose relations, and their purpose relations. 140830 sets Next-Clause to the next unprocessed clause in Action-List; Next-Pos is set to the next unused location in Out-List; Out-List [CLAUSE, Next-Pos] is set to Next-Clause; Out-List[PUR-CLAUSE, Next-Pos] is set to the preceding clause in the purpose relation of Next-Clause, or is set to NEW if Next-Clause has no preceding clause in its purpose relation; and 140830 sets Out-List[PUR-REL, Next-Pos] to Next-Clause's purpose relation. After 140830, 140832 is next, and is true if Next-Clause is a state or state abstract noun. If 140832 is true, 140834 prepares the Out-List data structure for a state abstract noun or state adjective which implies a clause. 140834 sets Out-List[CLAUSE-TYPE, Next-Pos] to ENUMERATED-STATE; Out-List[OWNER, Next-Pos] is set to a given context location and a conjunction code, one or more general pronoun type codes and a conjunction code, a given Memory 80, 90, or 100 entry location, or a designated owner group and a conjunction code, all which are contained in Action-List; Out-List[VERB, Next-Pos] is set to the verb word sense number associated with the type of Next-Clause, i.e., state implies "to be" or state abstract noun implies "to have"; Subject-Number is set to S-Number[Cur-Nat-Lang, Out-List[OWNER, Next-Pos]]; and processing is set to continue at 140842. A conjunction code indicates the number of entities and the conjunctive relation between the entities. A conjunctive code is used to specify constituents such as an owner with one or more entities. A designated owner could be marked ellipted in which case only the state or state abstract noun is expressed as text. S-Number is a procedure which determines if the noun or group of nouns is singular or plural for a given natural language.

If 140832 is false, processing continues at 140838. 140838 is true if Next-Clause is a clausal abstract noun or a noun relation. A clausal abstract noun implies that the representational referent of the clausal abstract noun is to be expressed. For example, this is expressed as "The clue is the fingerprints." Noun relations include for example: C-, A-, S-, T-Relations and the definition of a clausal abstract noun. This definition is the expression of a clausal abstract noun's general referent modified by the clausal abstract noun's modifying subordinate clause. For example, an possessive A-Relation can be expressed as: "John owns the car." An S-Relation can be expressed as: "The book is in the library." A definition of a clausal abstract noun can be expressed as: "A clue is something to solve a crime." Noun relations also include the grammatical construction of an adjective modified by a prepositional phrase. This construction implies a state adjective or function word adjective participating in a noun relation or in some cases a purpose relation as described above in Adjective Prepositional Function Selection and Evaluation section. If 140838 is true, 140840 defines a clause for an abstract noun or noun relation. 140840 Out-List[CLAUSE-TYPE, Next-Pos] to ENUMERATED-NOUN-RELATION; Out-List[SUBJECT, Next-Pos] is set to a given context location and a conjunction code, one or more general pronoun type codes and a conjunction code, a given Memory 80, 90, or 100 entry location, a designated clausal abstract noun group and a conjunction code, a designated modifiee group of the noun relation and a conjunction code, all of which are contained in Action-List; Out-List[VERB, Next-Pos] is set to the verb word sense number implied by the clausal abstract noun or the noun relation; Out-List [RELATION, Next-Pos] is set to REFERENT for a clausal abstract noun or to the noun relation of Next-Clause; and Subject-Number is set to S-Number[Cur-Nat-Lang, Out-List[SUBJECT, Next-Pos]. If the subject is designated as ellipted, only the designated clausal abstract noun or other noun is expressed as text. After 140840 or 140834, 140842 is next, and is true if Out-List[VERB, Next-Pos] equals a "to be" verb. If 140842 is true, 140844 sets Out-List[COMPLEMENT, Next-Pos] to Next-Clause's one or more: states, noun relation complements, states or function words and noun relation complements, or clausal abstract noun's representational referents according to Next-Clause's value with appropriate conjunction codes as needed. If 140842 is false, 140844 sets Out-List[OBJECT, Next-Pos] to Next-Clause's one or more: state abstract nouns or complements of the noun relation according to Next-Clause's value with appropriate conjunction codes as needed.

If 140838 is false, 140848 prepares Out-List for a clause implied by a verb word sense number. 140848 sets Out-List [CLAUSE-TYPE, Next-Pos] to ENUMERATED-RESULT-STATE; Out-List[SUBJECT, Next-Pos] is set to a given context location and a conjunction code, one or more general pronoun type codes and a conjunction code, a given Memory 80, 90, 100 entry location, or a designated subject group and a conjunction code; Out-List[VERB, Next-Pos] is set to a designated verb word sense number; Out-List[INDIRECT-OBJECT, Next-Pos] is set to a given context location and a conjunction code, one or more general pronoun type codes and a conjunction code, a given Memory 80, 90, 100 entry location, or a designated indirect object group and a conjunction code; Out-List[DIRECT-OBJECT, Next-Pos] is set to a given context location and a conjunction code, one or more general pronoun type codes and a conjunction code, a given Memory 80, 90, 100 entry location, or a designated direct object group and a conjunction code; and 140848 sets Subject-Number to S-Number[Cur-Nat-Lang, Out-List [SUBJECT, Next-Pos]]. If the designated subject, direct object and indirect object are marked ellipted, only the verb is expressed as text.

After 140844, 140846, or 140848, 140850 sets TENSE to Next-Clause's given tense type; Tense-Excp is set to Tense-Rel[Cur-Nat-Lang, Out-List[PUR-REL, Next-Pos], Out-List[PUR-CLAUSE, Next-Pos], TENSE, Tense-Rule]; Out-List[TENSE-EX, Next-Pos] is set to Tense-Rule; and 140850 sets TENSE to Tense-Excp. Tense-Rel is a process which determines if the preceding clause in Next-Clause's purpose relation implies an altering of the given tense for a given natural language. For example, a clause which is a hypothetical condition, e.g. a condition which did not occur in the past, requires a tense shift in English. Tense-Rel returns Tense-Rule which indicates the type of exception. Tense-Rel also returns Tense-Excp. Tense-Excp has the invocation value of TENSE if no tense change is required, or Tense-Excp has the value of tense implied by the exception.

After 140850, 140852 sets MOOD to Next-Clause's mood type from Action-List; MODAL is set to Next-Clauses modal type from Action-List; VOICE is set to Next-Clauses VOICE type from Action-List; Tense-Code is set to T-Code [Cur-Nat-Lang, MOOD, MODAL, TENSE, VOICE, Subject-Number]; and 140852 sets Out-List[TENSE-CODE, Next-Pos] to Tense-Code. T-Code is a process which selects a tense code given the mood type, the modal type, the tense type, the voice type and the subject number for a given natural language. After 140852, 140854 is next, and is true if there is an unprocessed clause in Action-List. If 140854 is true, the next clause is processed at 140830. If 140854 is false, 140858 returns processing control to the caller. This completes the description of the PURPOSE-MANAGER.

Dynamic Purposes

Dynamic purposes are special cases of experience purposes. The main difference between a dynamic purpose and an experience purpose in terms of implementation is that the entry of a clause in a dynamic purpose realization, as depicted in FIG. 21*c*, may contain an address of an executable process of Cur-App or some other application in the Other Addresses component of the entry. The dynamic purpose construct allows processes of this description to combine natural language with processes implemented with software such as the Communication Manager or with hardware such as setting interrupt flags or other controlling messages. For example, a natural language statement can both describe and realize an action such as a user typing in a command to an application controlling a text editor. Thus, the statement: "Format this file like the last quarterly report." is interpreted as described above. The result of this interpretation includes a process, in the sense of realizing a word sense of a verb, which is a dynamic purpose which has associated text editor commands which format the designated file ("this file") in the designated manner ("like the last quarterly report"). An advantage of combining natural language with executable processes is that the executable process can be explained to a user step by step or in larger groups of process steps. Another advantage is that an application can realize an executable process from natural language statements describing the process in sufficient detail.

Dynamic purposes achieve the same flexibility as experience purposes with respect to realizing previously stored purposes, combining parts of more than one stored purpose to realize a previously unexperienced purpose, and adding new purpose realizations by calling application processes to find ways to add new clauses to a previously stored purpose to realize a purpose which allows the augmented stored purpose to proceed to its goal for a previously unexperienced situation. Dynamic purposes have some options as to when an associated executable process is started. Dynamic purposes are realized by the PATH-FIND process with the Invocation-Type parameter being set to PROCESS. One option is to start an executable process as soon as the clause with an executable process has been found to meet all checks of the Cur-App including access conditions, timing, sentence role requirements, modals and/or other checks. This option is realized by setting the succeeding link entry address of such a dynamic purpose clause to be the final node of the dynamic purpose which is being realized during processing of Other Checks. When the current link entry precedes the final node, the PATH-FIND process returns processing control to the caller. The caller of the dynamic purpose with an immediate execution process then initiates the executable process associated with the last link entry's clause that was processed at PATH-FIND, i.e., the current link entry preceding the final node. Then, the caller can optionally restart the PATH-FIND process to find the next executable process. Another option is to allow the PATH-FIND process to find all executable processes of a dynamic purpose. This option is accomplished by not setting the succeeding link entry address of the dynamic purpose to be the final node of the dynamic purpose which is being realized. Then when PATH-FIND is completed, the caller of the dynamic process looks up all the nodes at the end of a path. These nodes are stored in PATH. Then the executable process associated with each such node can be initiated by the caller of the dynamic process. A third option is to combine the first two options such that executable processes with time constraints can be initiated as soon as possible.

The dynamic purpose process, DYNAMIC, gathers parameters from a calling process, calls PATH-FIND to realize the designated dynamic purpose, and returns the status of the PATH-FIND process to the caller when PATH-FIND returns to DYNAMIC. If the current Invocation-Opcode is DYNAMIC at 14010, 14010 is true, processing continues at 140880. 140880 sets 140-Return to 140882. When DYNAMIC is called, the invocation contains the name of the dynamic purpose to be processed, and is called Dy-Pur-Name. Dy-Pur-Name is implemented as a type of application, an internal application. 140880 also calls Dy-Pur-Name[Dynamic-Purpose-Parameters, Pur-Set, W-S-No, Pro-Type, P-F-C-Set, Other-C, SDS-Tem, D-Parm, 140-Return] so that these parameters in the call are set. Pur-Set is the set of dynamic purposes which Dy-Pur-Name has selected for processing of the realization of the dynamic purpose. W-S-No is the word sense number which implies a clause that describes the dynamic purpose, or W-S-No is a word sense number which implies a purpose whose purpose realization describes the dynamic purpose. Pro-Type is the proceed type such as Fail-Report used by PATH-FIND as described above. P-F-C-Set contains Boolean variables which determine the PATH-FIND checks to be performed. Other-C contains pointers to PATH-FIND other checks to performed. SDS-Tem is a template corresponding to W-S-No, and is used to instantiate the SDS. D-Parm is set of word sense numbers which are set by Dy-Pur-Name. These word sense numbers are utilized for checks in PATH-FIND such as access checks. The D-Parm construction allows Dy-Pur-Name to parameterize the purpose path realization to a specific situation not specified in the context.

After Dy-Pur-Name returns to DYNAMIC, 140882 sets up parameters and invokes PATH-FIND. 140882 sets Invocation-Type to PROCESS; Purpose-Set is set to Pur-Set; Cur-Clause is set to W-S-No; RESTART is set to Invo-RS, a parameter from the invocation with Dy-Pur-Name; 140-Return is set to 140884; the current SDS is set to SDS-Tem; D-Spec-Vec, the variable name containing purpose path parameterizing word sense numbers specified with vector positions which are referred to by checks in PATH-FIND as described above, is set to D-Parm. Finally, 140882 calls 140[PATH-FIND, Invocation-Type, Purpose-Set, Cur-Clause, Pro-Type, P-F-C-Set, Other-C, RESTART, Result-Tope, 140-Return]. After PATH-FIND returns to DYNAMIC, 140884 is next. 140884 returns processing control to Dy-Pur-Name[Path-Report, Cur-Purpose, Cur-Node, Result-Type, R-Add]. Dy-Pur-Name than continues its processing eventually returning to its caller.

Classification Purposes

Classification purposes are also special cases of experience purposes. The main difference between a classification purpose and an experience purpose in terms of implementation is that the entry of a clause in a classification purpose realization, as depicted in FIG. 21*c*, may contain one or more clauses which describe the current classification in the Other Addresses component of the entry. Classification purposes perform checks upon a designated check object. If a check object meets all the checks associated with a link entry with a classification description clause(s), such clause (s) describe the current classification of the check object. Link entries of a classification purpose with classification description clauses occur at the end of paths. Classification purposes are very similar to dynamic purposes. The main difference is that classification purposes select classifications and dynamic purposes select executable processes. Classification purposes have the same flexibility as experience purposes with respect to realization, and classification purposes have the same options as dynamic purposes with respect to return time of the classification. Classification purposes also gain advantages from combining the classification process with natural language. The classification process can be explained by describing the checks and the classification descriptions used by a classifying purpose to select a classification. Classification processes can also be realized through describing the classification checks and associated classifications to an application designed to generate classification processes. Classification purposes are implemented in a manner which is similar to dynamic purposes.

In the description of processes described above, and described below, classification purposes are utilized. Although classification purposes are utilized in the preferred embodiment, other well known classification methods such as: decision trees, expert systems, and standard conditional statements of a programming language could be utilized as an alternate implementation.

The classification purpose process, CLASSIFY, gathers parameters from a calling process, calls PATH-FIND to realize the designated classification purpose, and returns the status of the PATH-FIND process to the caller when PATH-FIND returns to CLASSIFY. If the current Invocation-Opcode is CLASSIFY at 14014, 14014 is true, and processing continues at 140900. 140900 sets 140-Return to 140902. When CLASSIFY is called, the invocation contains the name of the classification purpose to be processed, and is called Class-Name. Class-Name is implemented as a type of application, an internal application. 140900 also calls Class-Name[Invo-Object, Classification-Purpose-Parameters, Pur-Set, W-S-No, Pro-Type, P-F-C-Set, Other-C, SDS-Tem, C-Parm, 140-Return] so that these parameters in the call are set. Invo-Object is the object to be classified. Pur-Set is the set of classification purposes which Class-Name has selected for processing of the realization of the classification purpose. W-S-No is the word sense number which implies a clause that describes the classification purpose, or W-S-No is a word sense number which implies a purpose whose purpose realization describes the dynamic purpose. Pro-Type, P-F-C-Set, Other-C, and SDS-Tem are used for classification purposes in the same manner as described above for dynamic purposes. C-Parm is a set of word sense numbers which are set by Class-Name. These word sense numbers are utilized for checks in PATH-FIND such as access checks. The C-Parm construction allows Class-Name to parameterize the purpose path realization to a specific situation not specified in the context.

After Class-Name returns the parameters to CLASSIFY, 140902 sets up parameters and invokes PATH-FIND. 140902 sets Invocation-Type to PROCESS; Purpose-Set is set to Pur-Set; Cur-Clause is set to W-S-No; RESTART is set to Invo-RS, a parameter from the invocation with Class-Name; 140-Return is set to 140904; the current SDS is set to SDS-Tem; C-Spec-Vec, the variable name containing purpose path parameterizing word sense numbers specified with vector positions which are referred to by checks in PATH-FIND as described above, is set to C-Parm; Check-Object is set to Invo-Classifiee, the object which is to be checked and is given in the invocation of CLASSIFY. Finally, 140902 calls 140[PATH-FIND, Invocation-Type, Purpose-Set, Cur-Clause, Pro-Type, P-F-C-Set, Other-C, RESTART, Result-Type, 140-Return]. After PATH-FIND returns to Dynamic, 140904 is next. 140904 returns to Class-Name[Path-Report, Cur-Purpose, Cur-Node, Result-Type, R-Add]. Class-Name than continues its processing eventually returning to its caller.

Evaluating Purpose Descriptors

Purpose descriptors are internal applications which contain one or more Purpose Identifier 140 process calls including REL-SELECT, PATH-FIND, PURPOSE-MANAGER, DYNAMIC, CLASSIFY, AND EVAL-PUR-DESC, other processes, and purpose descriptor specific processes. A purpose descriptor is evaluated to determine a complex purpose relation implied by a natural language utterance. In English, certain clausal abstract nouns imply complex purpose relations. As described above, the clausal abstract noun "clue" in the sense of "used to solve a homework problem" may require classification of "clue" and "homework problem" utilizing both descriptive checks of these clausal abstract noun and a purpose relation between them to determine their referents in the conversation. "clue" has an associated purpose descriptor name and parameters specific to it. The purpose descriptor is parameterized so that it can perform its purpose related function for words with similar complex purpose relations.

Evaluating purpose descriptors is normally accomplished by Step 18 calling the purpose descriptor process. A call for a purpose descriptor is started when the Invocation-Opcode is EVAL-PUR-DESC at 14018 which makes 14018 true. If 14018 is true, processing continues at 140950. However, in order to share parameter sets among different clausal abstract nouns, purpose descriptors are invoked with the number of parameters and the location of the parameters instead of passing all the parameters directly. Note, this same technique is utilized for interfacing external applications to processes of this description. A typical call for evaluating a purpose descriptor is of the form: call 140[EVAL-PUR-DESC, Invo-P-No, Invo-Table, Invo-Pur-Desc-Name]. Invo-P-No is the number of parameters, Invo-Table is the location of the parameters, and Invo-Pur-Desc-Name is the name of the purpose descriptor internal application process. 140950 transfers Invo-P-No parameters from Invo-Table to Pur-Desc-Table; 140-Return is set to 140952, and 140950 calls Invo-Pur-Desc-Name[Pur-Desc-Table]. After processing at Invo-Pur-Desc-Name is completed, 140952 is next. 140952 returns Result-Table to the caller. Result-Table is the set of variables and/or addresses returned to the caller. Note that Result-Table can be empty.

PLAUSIBILITY AND EXPECTEDNESS CHECKER 170

The main goal of plausibility checking is to ensure that an interpretation is correct. The syntax, function word, word sense number, and purpose processes have selected an interpretation which is consistent in the context of the conversation with respect to grammar, semantics, experience, and knowledge. Thus, the current interpretation is at least possibly correct, and is a necessary condition for a plausible interpretation. Another aspect of the plausibility of an interpretation is the benefits to the doers and receivers of a clause. Here doer includes the sense of a stated or implied performer of an action and the sense of a stated or implied doer of a state change, and receiver includes the sense of the owner of a stated or implied result state and a state value which has a stated or implied state setting verb. Thus, the benefits of constituents for any type of stated or implied clause are considered. The benefits of doers and receivers are considered for plausibility checking because these benefits are strongly related to motivation of a doer and the relation of the doer to the receiver. A correct interpretation very often has normal motivations and relations for its constituents. The normal motivation of a doer is defined as a doer benefiting from the doer's actions. A receiver's normal benefits are related to the receiver's relation to the doer. For example, a receiver generally benefits from a doer who is friendly with the receiver.

The benefits to the doer and/or receiver of a clause are estimated with a benefit classification purpose associated with the clause. This type of classification purpose can be as simple as having a single, constant, normalized, benefit value, or as complex as a purpose tree which is accessed according to the status of the context with multiple leaf nodes reachable such that the benefit value is calculated by evaluating benefit function values of each leaf node that was reached and adding the benefit values of such leaf nodes. A complex benefit classification purpose can include these general types of access conditions along its paths: relations between the doer and the receiver, the effort to accomplish a result state or state change, result state or owner state benefits, and/or the status of the context. In the case that a clause has multiple doers or receivers, such multiple constituents can be handled either jointly or separately depending upon the policy of the Cur-App regarding the estimation of plausibility in this situation. Thus far, the plausibility of a clause has been described. The plausibility of a purpose is also estimated by 170. The above remarks for the plausibility of a clause also apply to a purpose. Although a purpose is conceptually a combination of clauses, a purpose is normally describable as one or more clauses, and in this case also has the same general method of plausibility estimation of an interpretation. A clause or purpose is estimated to be plausible if at least the user or receiver gains benefits including no benefit, and if the overall plausibility estimate is greater than or equal to a Cur-App dependent plausibility threshold value. This plausibility estimation method, which is described below in more detail, is a general purpose plausibility estimation method. A more specific method can be generated for a specific application by someone skilled in the art through utilizing the same general estimation methods with customizations for the specific application.

The plausibility of the source of the conversation is another aspect of plausibility. This type of plausibility is application specific and will not be considered here. However, the same general purpose method of considering motivation applies to estimating the plausibility of a source.

Expectedness is measured for the knowledge and experience of the purposes and clauses of a conversation. The expectedness is measured by determining which aspects of a purpose or clause have been previously stored in the memory structures. Thus, previously stored aspects are expected, and unstored aspects are unexpected. Thus, the measuring of expectedness determines what components of the conversation are new, i.e., not known. Expected knowledge and experience is a possible component of plausibility because expected knowledge and experience are more plausible than unexpected experience and knowledge. Unexpected knowledge and experience are candidates for learning. What is learned is dependent upon the Cur-App, and the learning process is a separate process. For example, an application could have a learning component such that unexpected experience or knowledge is evaluated with respect to determining if the experience or knowledge is a candidate for learning. This determination could be made with a classifying purpose for example. If a candidate is selected, the application could decide to store the unexpected experience and knowledge in Memory 150 if the unexpected experience and knowledge meets plausibility requirements and possibly meets other classification purpose determinations. Such an application could also decide to verify the interpretation and the desirability of storing the unexpected experience and knowledge with a person by generating a response to this purpose. When an application consults with a person, the person could decide to add unknown information. The person could add information through selecting and filling out forms which represent the data structures which are to store the added information utilizing well known data entry techniques. Another method to add information is for the person to describe the information to be added. Then the described information is interpreted, and an application stores the information in the implied data structure(s). Selecting data structures for storage is accomplished utilizing techniques described above for interpretation. Storing data by a program is a well known programming technique.

Other word senses of expectedness include prediction, e.g., what is expected to occur. The processes of this description contain the facilities for prediction, and hence prediction can be implemented for an application. The PATH-FIND process can access predicted knowledge and experience that is expressed or is unknown. Knowledge and experience expressed with a modal having a future truth value, e.g. "will", is an example of an expressed prediction. As described above, knowledge and experience is processed with such modal values. An unknown prediction is a prediction which is to be made from the current status of the context. An unknown prediction can be made by an application through utilizing the PATH-FIND process to trace a history purpose from application selected states utilizing application selected state values for unknown state values at access conditions. Note that an access condition can fail for an unknown value. The application can select the unknown state values by specifying a proceed type of FAIL-REPORT which causes the application to be called upon access condition failure. Then the application can set the unknown value with application specific processes.

Plausibility and Expectedness Checker 170 Implementation

Plausibility and Expectedness Checker 170 is a process typically called by the PURPOSE-MANAGER of 140. The plausibility and expectedness checker 170 has two main processes. One process adds check functions to the REL-SELECT and PATH-FIND processes. These check functions are related to ensuring plausibility and/or expectedness during selecting relations and finding paths. The other main process is checking plausibility and expectedness as described above in the previous subsection. 170 is invoked with process calls as described above. The block diagrams of the processes of Plausibility and Expectedness Checker 170 is depicted in FIGS. 22*a*–22*d*.

When 170 is invoked, 17000 is the first step, and is true if the Invo-Opcode of the call is equal to INTERP-PLAUS-CHECK-INIT. If 17000 is true, 17002 is next, and is true if the Cur-Clause invocation parameter has implicit sentence roles. An implicit sentence role is not stated, but it is implied by a grammatical function word or construction such as: pronouns, ellipsis, and morphological word@. The implicit sentence roles have referents which could be unintended by the source of the conversation, and implicit sentence roles require certain check functions to ensure a correct interpretation. If 17002 is true, 17004 appends the implicit sentence role run time plausibility and expectedness checks to their associated check sets. The actual checks depend upon Cur-App, and hence can not be stated for a specific applications. However, general purpose implicit sentence role run time plausibility and expectedness check functions include: adding positions of implicit sentence roles to State-Select[Cur-App] to be set up for possible location checking during REL-SELECT execution, and adding checks of availability of implicit sentence roles, in the sense that the implicit sentence role is not occupied in some other activity, to the Other-Check sets for PATH-FIND processing. 17004 is an example of process which sets checks depending upon the context. If 17002 is false, or after 17004, 17006 appends the other run time plausibility and expectedness checks of Cur-App to their associated check sets. The other checks of specific applications are as varied as the applications, but general purpose other checks can be described. For example, other run time plausibility and expectedness checks include: state value constraints for states of Cur-Clause constituents, and monitoring if PATH-FIND is accessing a path with a purpose number which implies the path represents a previous experience. After 17006, 17008 returns processing control to the caller.

If 17000 is false, 17010 is next and is true if Invo-Opcode equals PLAUS-EXP-CHECK. If 17010 is false, 17014 sets processing to continue at 170-Return. If 17010 is true, processing continues at 170100. 170100 begins the estimate of the expectedness of the interpretation of Cur-Clause, which is an invocation parameter, and which is typically the clause which has just been interpreted as described above. 170100 is true if Cur-App[Exp-Check] is true. Cur-App [Exp-Check] is true when Cur-App requires the expectedness to be estimated. If 170100 is false, processing continues at 170200 which is described below. If 170100 is true, 170104 is next, and is true if Cur-Clause is in 120 which means the Cur-Clause has been restated. If 170104 is true, 170106 stores a pointer to the P-E-Vec of Cur-Clause in 120; Result-Type is set to SUCCESS; and 170106 returns processing control to the caller. P-E-Vec is a vector which contains all components of the plausibility and expectedness checks of its owner. If 170104 is false, 170108 is next, and is true if Cur-Clause is exactly stored in 150. If 170108 is true, Cur-Clause is a repeat of context that has been stored in Memory 150. If 170108 is true, 170110 sets P-E-Vec[All-Plausibility-Values] to the P-E-Vec of Cur-Clause in 150 if it exists, or to the P-E-Vec of Cur-Clause's Cur-Purpose in 150 if it exists, or to a default value associated with Cur-App; P-E-Vec[All-Expectedness-Values] is set to 1; Result-Type is set to SUCCESS; and 170110 returns processing control to the caller. All-Plausibility-Values are the components of Cur-App's P-E-Vec which contain plausibility related values, and All-Expectedness-Values are the components of Cur-App's P-E-Vec which contain expectedness related values.

If 170108 is false; 170112 initializes P-E-Vec[All-Expectedness-Values] to zero. After 170112. 170114 is next, and is true if Cur-Clause is a clause implied by an adjective or state abstract noun and has its specific owner contained in the word sense number of the adjective or state abstract noun word sense number data structure entry, as depicted in FIG. 20*b*, or if Cur-Clause has its constituents in a stored process descriptor entry of its verb word sense number in Memory 130, as depicted in FIG. 19*f*. 170114 is true if Cur-Clause has its constituents stored in Memory 110 or 130, and hence is an expected clause. If 170114 is true, 170116 sets P-E-Vec [CONSTITUENTS] to 1. After 170116, or if 170114 is false, 170118 is next, and is true if Cur-Clause is on a stored purpose path in 150 which implies the path has been experienced before. If 170118 is true, 170120 sets P-E-Vec [Purpose-Path] to 1 plus the relative frequency of the purpose path for its purpose function as stored in a purpose node entry in 110 or 130. A purpose node entry is depicted in FIG. 21*b*. If 170118 is false, 170122 is next, and is true if Cur-Clause is on a combined purpose path. A combined purpose path contains portions of two or more stored purposes in 150. If 170122 is true, 170124 sets P-E-Vec [Combo-Purpose-Path] to 1. After 170124, or if 170122 is false, 170126 is next, and is true if Cur-Clause has a new purpose path component. A new purpose path component is constructed by an application to adapt previous experience and knowledge to a previously unexperienced situation. If 170126 is true, 170128 sets P-E-Vec[New-Purpose-Path] to 1.

After 170128 or 170120, or if 170126 is false, 170130 is next, and is true if Cur-Clause has a stored process path in 150 which implies the path has been experienced before. If 170130 is true, 170132 sets P-E-Vec[Process-Path] to 1 plus the relative frequency of the process path. If 170130 is false, 170134 is next, and is true if Cur-Clause is on a combined process path. A combined process path contains portions of two or more stored process in 150. If 170134 is true, 170136 sets P-E-Vec[Combo-Process-Path] to 1. After 170136, or if 170134 is false, 170138 is next, and is true if Cur-Clause has a new process path component. A new process path component is constructed by an application to adapt previous experience and knowledge to a previously unexperienced situation. If 170138 is true, 170140 sets P-E-Vec[New-Process-Path] to 1. After 170140 or 170132, or if 170138 is false, 170142 is next, and is true if Cur-Clause is on a stored state change path in 150 which implies the path has been experienced before. If 170142 is true, 170144 sets P-E-Vec [State-Change-Path] to 1 plus the relative frequency of the state change path. If 170142 is false, 170146 is next, and is true if Cur-Clause is on a combined state change path. A combined state change path contains portions of two or more stored state changes in 150. If 170146 is true, 170148 sets P-E-Vec[Combo-State-Change-Path] to 1. After 170148, or if 170146 is false, 170150 is next, and is true if Cur-Clause has a new state change path component. A new state change path component is constructed by an application to adapt previous experience and knowledge to a previously unexperienced situation. If 170150 is true, 170152 sets P-E-Vec [New-State-Change-Path] to 1. After 170144 or 170152, or if 170150 is false, 170154 is next. 170154 sets P-E-Vec [Exp-Avg] to the dot product, i.e. the sum of the product of corresponding terms of two vectors, of P-E-Vec [CURRENT] and P-E-Vec[Cur-App[Exp]]. P-E-Vec [CURRENT] is the current value of P-E-Vec that has just been calculated. P-E-Vec[Cur-App[Exp]] is Cur-App's vector of weighted expectation vector components which is used to calculate an average expectation value which may be optionally used in the plausibility estimation which begins at 170200. 170154 also sets processing to continue at 170200.

After 170102 or 170154, 170200 begins the plausibility estimation process. 170200 is true if Cur-App[Plausibility-Check] is true. Cur-App[Plausibility-Check] is true when Cur-App requires that the plausibility of Cur-Clause be checked. If 170200 is false, 170202 sets Result-Type to SUCCESS; and 170202 returns processing control to the caller. If 170200 is true, 170204 sets P-E-Vec[All-Plausibility-Values] to zero which initializes all plausibility values of P-E-Vec to zero. After 170204, 170206 is next, and is true if Cur-App[Pur-Plaus] is true. Cur-App[Pur-Plaus] is true when Cur-App requires the plausibility of the purpose of Cur-Clause to be estimated. If 170206 is false, processing continues at 170240 which begins the plausibility estimation process for Cur-Clause, and which is described below. If 170206 is true, 170210 is next, and is true if Cur-Purpose is in an established purpose, or Cur-Purpose is in 150. Cur-Purpose is the purpose containing Cur-Clause. An established purpose is a non-default purpose, and has two clauses which precede Cur-Clause in its purpose path. If 170210 is true, the plausibility of the Cur-Clause's purpose has already been estimated, and 170212 sets P-E-Vec[Purpose-Plausibility] to 1. After 170212, processing continues at 170240. If 170210 is false, 170214 is next, and is true if Cur-Clause is on an unestablished purpose path. An unestablished purpose path has a non-default purpose, and has one clause which precedes Cur-Clause on its purpose path. If 170214 is false, Cur-Clause is not on a purpose path, and processing continues at 170240. If 170214 is true, 170216 is next, and is true if Cur-Purpose has a benefits classification purpose. If 170216 is false, 170218 sets both P-E-Vec[Doer-Purpose-Ben] and P-E-Vec[Rcvr-Purpose-Ben] to Cur-App [Default-Purpose-Ben], the default purpose benefit of Cur-App for a purpose without a benefits classification purpose. After 170218, processing continues at 170240.

If there is a benefits classification purpose, 170220 is next, and sets up a call to Cur-Purpose's benefits classification purpose. 170220 sets CLASS to Purpose-Benefits; RS is set to false; Invo-Obj is set to Cur-Purpose; 170-Return is set to 170222; and 170220 calls 140[CLASSIFY, CLASS, RS, Invo-Obj, 170-Return]. After the benefits classification purpose has been processed by 140, 170222 is next, and is true if Result-Type equals SUCCESS. If 170222 is false, 170224 calls Cur-App to process the classification purpose failure. 170224 sets 170-Return to 170226, and 170224 calls Cur-App[Purpose-Benefits-Classify-Fail, Ben-Purpose, Cur-Node, Result-Type, R-Add, 170-Return]. Ben-Purpose, Cur-Node, Result-Type, and R-Add are parameters returned from 140, and these parameters identify and locate the failure. If 170222 is true, 170226 evaluates all benefit functions at reached terminal nodes of the found classification purpose; the doer benefits at each reached terminal node are added to form Doer-Ben; the receiver benefits at each reached terminal node are added to form Rcvr-Ben; P-E-Vec[Doer-Purpose-Ben] is set to Doer-Ben; and 170226 sets P-E-Vec [Rcvr-Purpose-Ben] to Rcvr-Ben. After 170226, 170228 is next, and is true if Doer-Ben is beneficial or neutral, i.e. Doer-Ben is greater than or equal to zero. If 170228 is true, processing continues at 170240. If 170228 is false, 170230 is next, and is true if Rcvr-Ben is beneficial or neutral. If 170230 is true, processing continues at 170240. If 170230 is false, both doer and receiver benefits are detrimental, and this is generally an implausible situation. If 170230 is false, 170232 informs the Communication Manager of implausible benefits for Cur-Purpose.

If Cur-Purpose has been estimated to be possibly plausible with respect to benefits, or if this estimate is skipped or known, 170240 is next. 170240 is true if Cur-Clause is on a purpose path. If 170240 is true, 170266 sets both P-E-Vec [Doer-Clause-Ben] and P-E-Vec[Rcvr-Clause-Ben] to 1. Also, 170266 sets NEXT to 1 which is the value for a single P-E-Vec. NEXT is described below. If 170240 is false, Cur-Clause is to be classified with respect to its own benefits, and 170242 is next. 170242 is true if Cur-Clause has multiple doers and/or receivers. Multiple doers and/or receivers can be implied by conjunctions of doers and/or receivers, additional doers and/or receivers implied by processes or state change processes. If 170242 is true, 170244 separates Cur-Clause into separate clauses using Cur-App [J-Sep-Policy]; NEXT, an array variable for the array of multiple P-E-Vec's, is set to 1; 170244 sets Cur-Clause to the first separated clause if any clauses are separated. Cur-App [J-Sep-Policy] is the set of criteria forming a policy for separating clauses for plausibility for Cur-App. After 170244, or if 170242 is false, 170243 sets NEXT to 1, the case for no separated clauses. After 170243, 170246 is next, and is true if Cur-Clause has a benefits classification purpose. If 170246 is false, 170248 sets both P-E-Vec[Doer-Clause-Ben] and P-E-Vec[Rcvr-Clause-Ben] to Cur-App [Default-Clause-Ben], the default clause benefit of Cur-App for a clause without a benefits classification purpose.

If 170246 is true, there is a benefits classification purpose for Cur-Clause, and 170250 is next. 170250 sets up a call to Cur-Clause's benefits classification purpose. 170250 sets CLASS to Clause-Benefits; RS is set to false; Invo-Obj is set to Cur-Clause; 170-Return is set to 170252; and 170250 calls 140[CLASSIFY, CLASS, RS, Invo-Obj, 170-Return]. After the benefits classification purpose has been processed by 140, 170252 is next, and is true if Result-Type equals SUCCESS. If 170252 is false, 170254 calls Cur-App to process the classification purpose failure. 170254 sets 170-Return to 170256, and 170254 calls Cur-App[Clause-Benefits-Classify-Fail, Ben-Purpose, Cur-Node, Result-Type, R-Add, 170-Return]. Ben-Purpose, Cur-Node, Result-Type, and R-Add are parameters returned from 140, and these parameters identify and locate the failure. If 170252 is true, 170256 evaluates all benefit functions at reached terminal nodes of the found classification purpose; the doer benefits at each reached terminal node are added to form Doer-Ben;, the receiver benefits at each reached terminal node are added to form Rcvr-Ben; P-E-Vec[Doer-Clause-Ben] is set to Doer-Ben; and 170256 sets P-E-Vec[Rcvr-Clause-Ben] to Rcvr-Ben. After 170256, 170258 is next, and is true if Doer-Ben is beneficial or neutral, i.e. Doer-Ben is greater than or equal to zero. If 170258 is true, 170268 is next, and is described below. If 170258 is false, 170260 is next, and is true if Rcvr-Ben is beneficial or neutral. If 170260 is true, 170268 is next. If 170260 is false, both doer and receiver benefits are detrimental, and this is generally an implausible situation. If 170260 is false, 170264 informs the Communication Manager of implausible benefits for Cur-Clause.

After P-E-Vec[Doer-Clause-Ben] and P-E-Vec[Rcvr-Clause-Ben] have been: set to 1 at 170266, set to a default value at 170248, or set to a value calculated from Cur-Clause's benefits classification purpose, 170268 is next. 170268 calculates an overall plausibility estimated value by setting P-E-Vec[PLAUSIBILITY] to the dot product of P-E-Vec[CURRENT] and P-E-Vec[Cur-App[PLAUS]]. P-E-Vec[CURRENT] is the current value of P-E-Vec that has just been calculated. P-E-Vec[Cur-App[PLAUS]] is Cur-App's vector of weighted plausibility and optionally expectation vector components which is used to calculate an overall plausibility value. This method of calculating an overall plausibility value is useful for general purpose applications. Other applications may require a more specific calculation method which the application implements. After 170268, 170270 is next, and is true if P-E-Vec [PLAUSIBILITY] is greater than or equal to P-E-Vec[Cur-App[PLAUS-THRESHOLD]]. 170270 is true when P-E-Vec[PLAUSIBILITY] equals or exceeds the minimum acceptable plausibility value of Cur-App. If 170270 is false, 170272 informs the Communication Manager of implausible overall plausibility value for Cur-Clause.

If 170270 is true, Cur-Clause has meet the plausibility requirements of Cur-App, and 170274 is next. 170274 is true if there is an unprocessed separated clause that was formed at 170244. If 170274 is true, 170276 sets Cur-Clause to the next unprocessed, separated clause; P-E-Vec[CURRENT] is stored at TEMP[NEXT]; NEXT is incremented by 1; the clause plausibility components of P-E-Vec[CURRENT] are zeroed; and 170276 sets processing to compute the plausibility of the next Cur-Clause at 170246 which is described above. If 170274 is false, the original Cur-Clause has been successfully processed, and 170278 sets TEMP[NEXT] to P-E-Vec[CURRENT]. After 170278, 170280 is next, and is true if Cur-App[Sep-P-E-Vec] is true. Cur-App[Sep-P-E-Vec] is true when Cur-ACur-App requires the separate P-E-Vecs to remain separate. If 170280 is true, 170282 stores a pointer to TEMP at P-E-Vec[INVOCATION], the invocation P-E-Vec, and 170282 sets Sep-Cla to NEXT, the number of separated clauses. If 170280 is false, 170284 combines the P-E-Vec's in TEMP utilizing the Cur-App[P-E-Combo-Policy] into P-E-Vec[INVOCATION]. After 170284 or 170282, 170286 sets Result-Type to SUCCESS; and 170286 returns processing control to the caller. This completes the description of Plausibility and Expectedness Checker 170.

COMMUNICATION MANAGER 160

The Communication Manager has two primary functions in general. One primary function of the Communication Manager is to initialize and coordinate incoming natural language or non-textual natural language information from one or more external sources with outgoing natural language or non-textual natural language information from this process. The outgoing information of this process is either related to the goals of the application or is related to errors related to the application or errors detected by the processes described above. The application generates outgoing communications related to accomplishing the goals of the application and generates communications related to errors including inconsistencies, failures and omissions related to the application. The errors detected by the processes described above are related to interpretation of natural language or a related non-textual natural language form, and are related to the accessing of stored knowledge and experience. An outgoing communication is realized with one or more word sense numbers. The composition of a communication is described above in the PURPOSE-MANAGER description. The word sense numbers of a communication can be composed in a number of ways. For example, in the case of an error detected in the processes described above, the error is described with a natural language sentence. Such a sentence has related purpose relations in 150. One of these purpose relations can comprise a set of paths such that a selected path determined by PATH-FIND determines an outgoing communication. Another purpose relation could realize a dynamic purpose which determines what is to be done such as determining an outgoing communication. An application can utilize purpose relations and purpose paths to compose an outgoing communication.

The errors detected by the processes described above could actually be unknown information such as for example: unknown function word usage, unknown word sense numbers, unknown aspects of a word sense number, unknown purpose relations, and/or unknown purpose paths. An application could make a determination if the error is unknown information with a classifying purpose for example. Certain unknown information such as purpose relations and purpose paths would require interaction with a person in certain situations where there is not an application to determine unknown information. Other information such as function word usage and word sense number data could be obtained from a natural language dictionary in a machine readable form. Such other information could be obtained in the machine readable dictionary through interpreting the definitions of a word which has been determined by a process which is described above to be unknown in some way. Then if the word has one or more definitions such that the definitions are stored in a data base described above, but the definitions are unknown as possible word sense numbers or usages for such a word, the application could add the interpretation from processing described above of such unknown definitions to the data base entries of such a word. The application could also consult with a person to verify a selected unknown definition, or the application could consult with a person if there is no unknown definition. When an application consults with a person, the person could decide to add unknown information. The person could add information through selecting and filling out forms which represent the data structures which are to store the added information utilizing well known data entry techniques. Another method to add information is for the person to describe the information to be added. Then the described information is interpreted by processes described above, and an application stores the information in the implied data structure(s). Selecting data structures for storage is accomplished by utilizing techniques described above for interpretation. Storing data by a program is a well known programming technique.

The other primary function of the Communication Manager is to coordinate the processing of errors. Errors are generally processed after detection as follows: an optional request for information from the user to allow the correction of the error; an optional function which corrects the error; an optional repetition of one or both of the previous steps for an optional number of repetitions. These steps can be delayed after the error detection, after the error related request, or after the processing of the error correcting function. This delay allows certain detected errors which may be corrected by subsequent incoming information to be corrected without interacting with the external input source(s). For example, an application can allow a clause without a purpose relation to the conversation to remain unrelated for a suitable delay because such a clause may be related to subsequent clauses in the conversation. If such a clause has no purpose after a delay of two sentences for example, a question requesting the relation of the clause to the conversation can be generated and sent to the external source of the conversation.

Figure 23A:
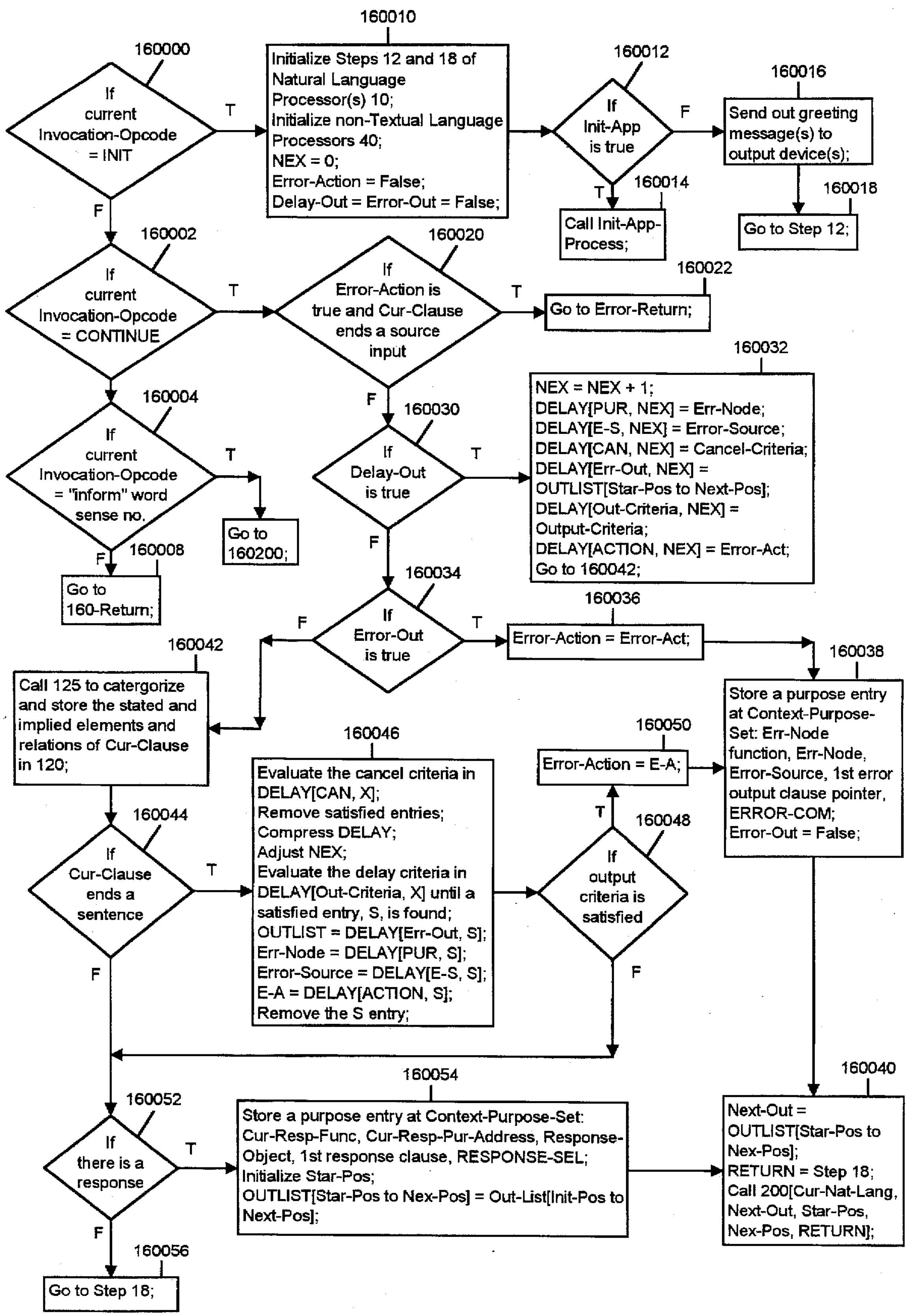
FIGS. 23*a* and 23*b* is a flow chart for the communication manager method.
Figure 23B:
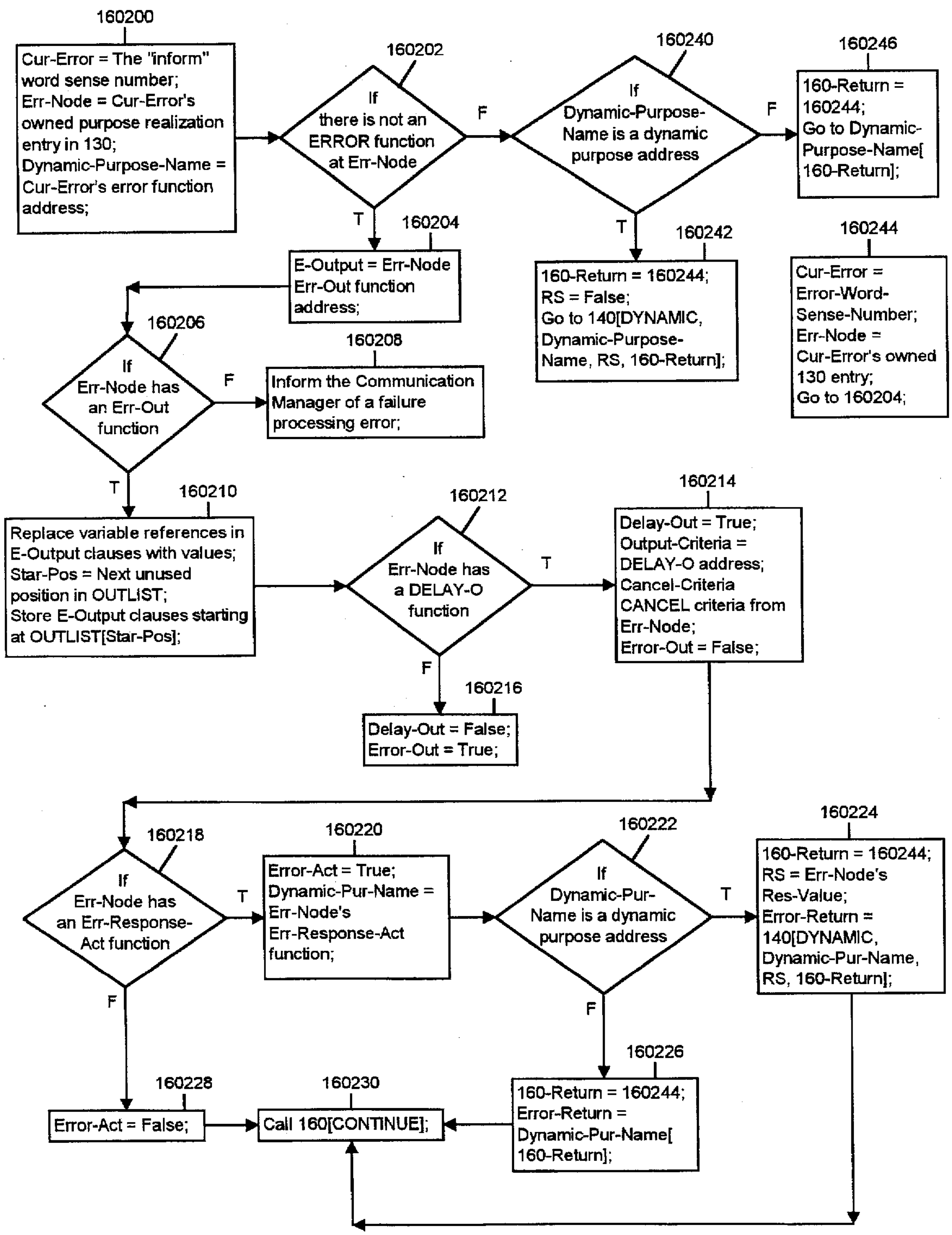
Figure 24A:
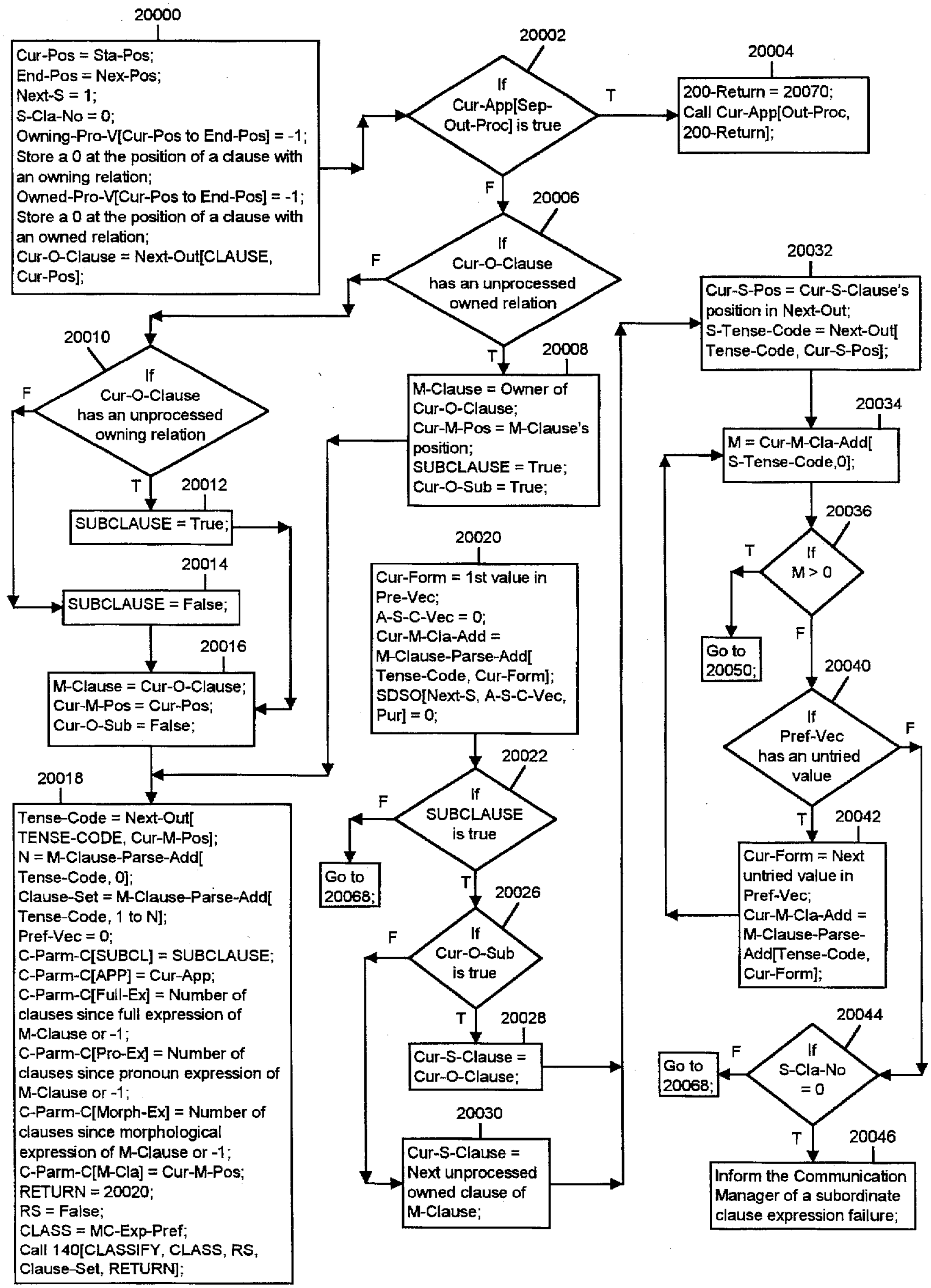
FIGS. 24*a*–24*z* is a flow chart for the text generation method.
Figure 24B:
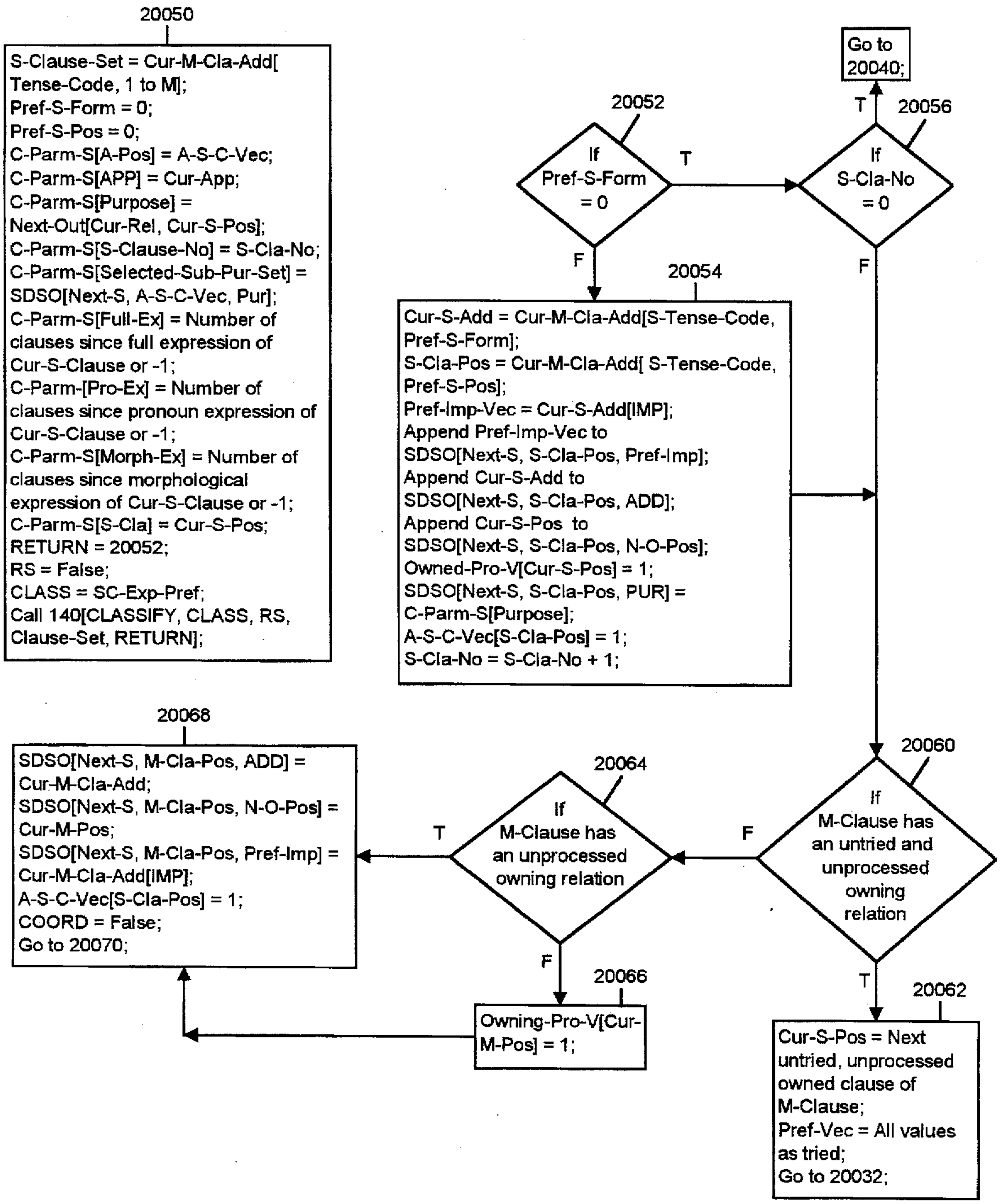
Figure 24C:
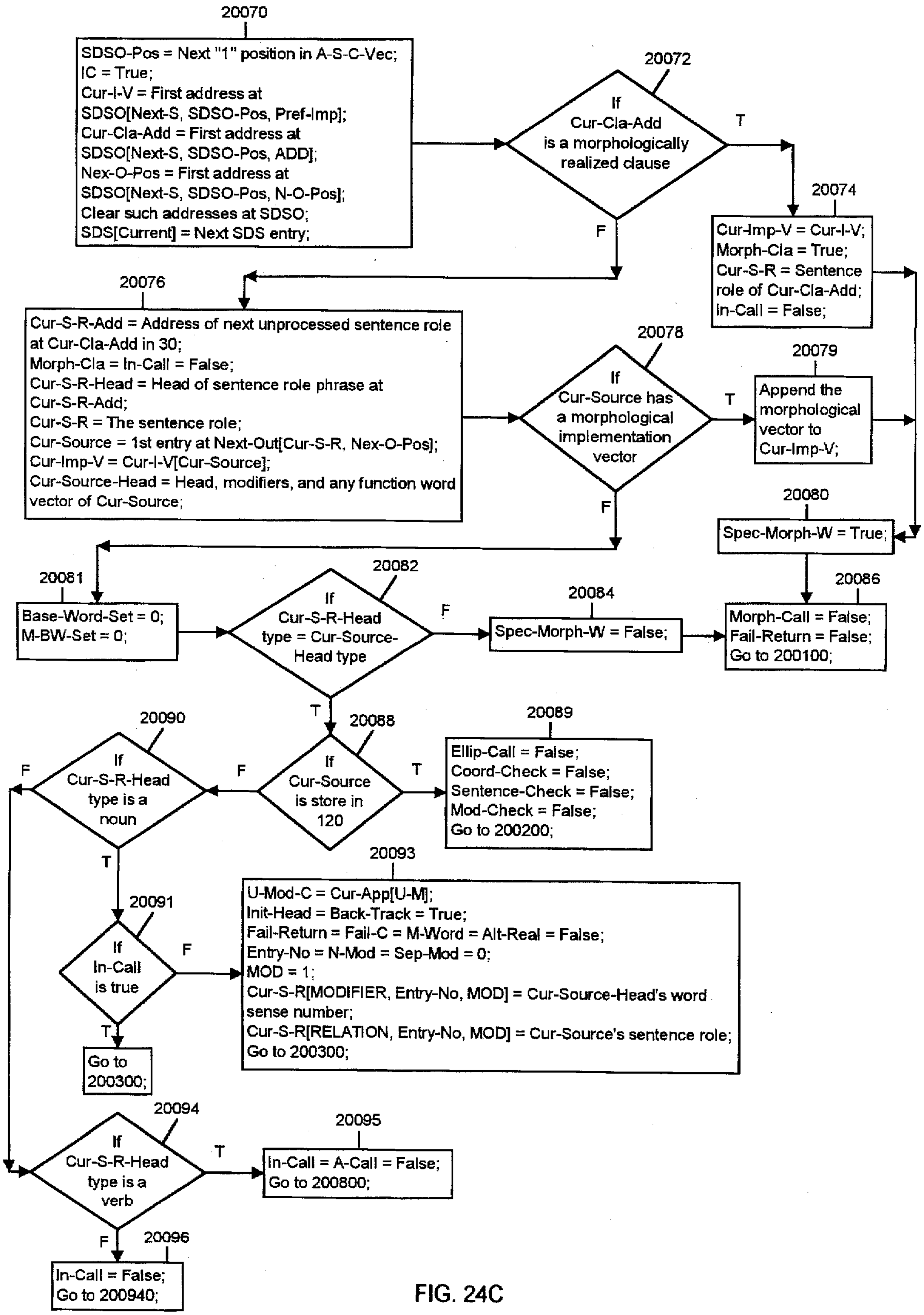
Figure 24D:
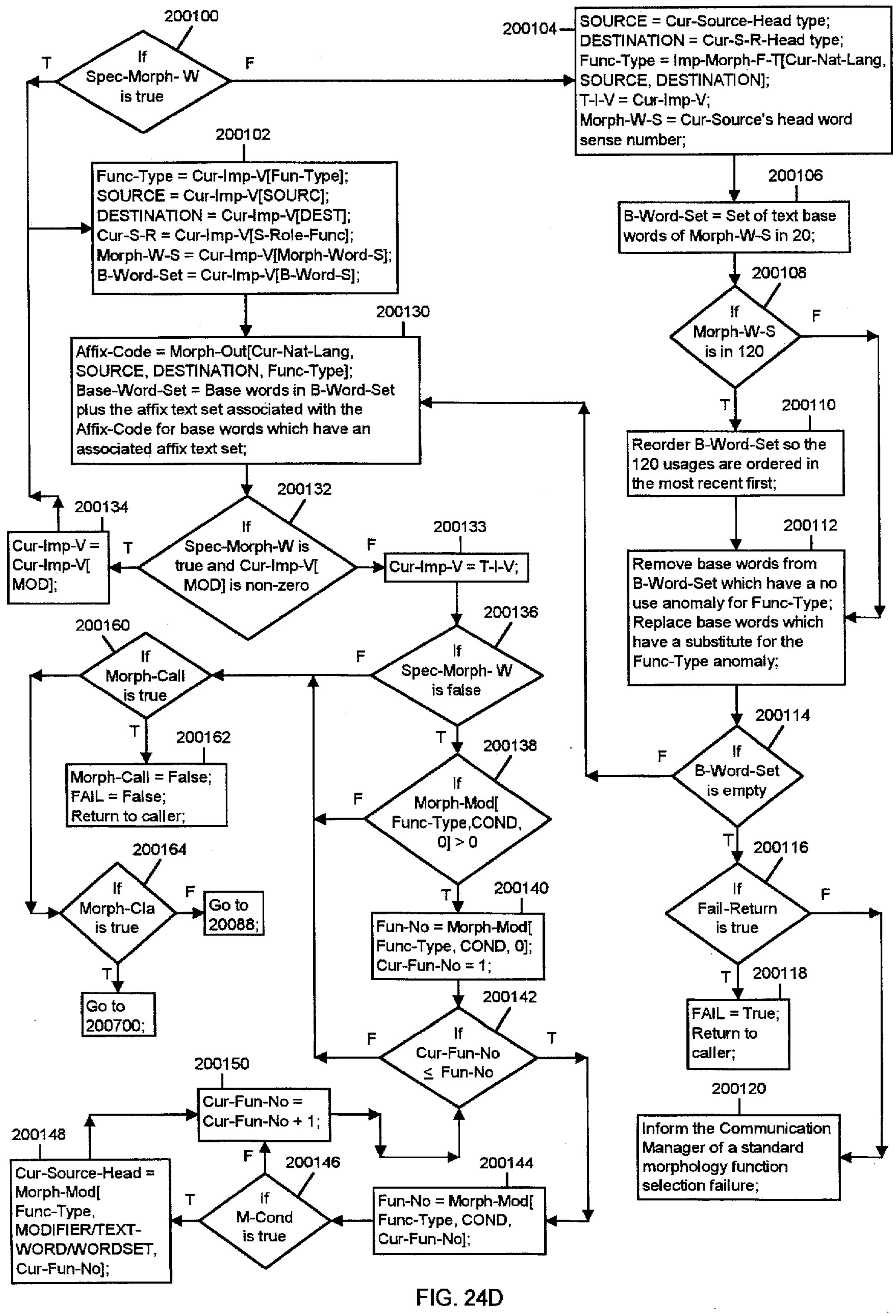
Figure 24E:
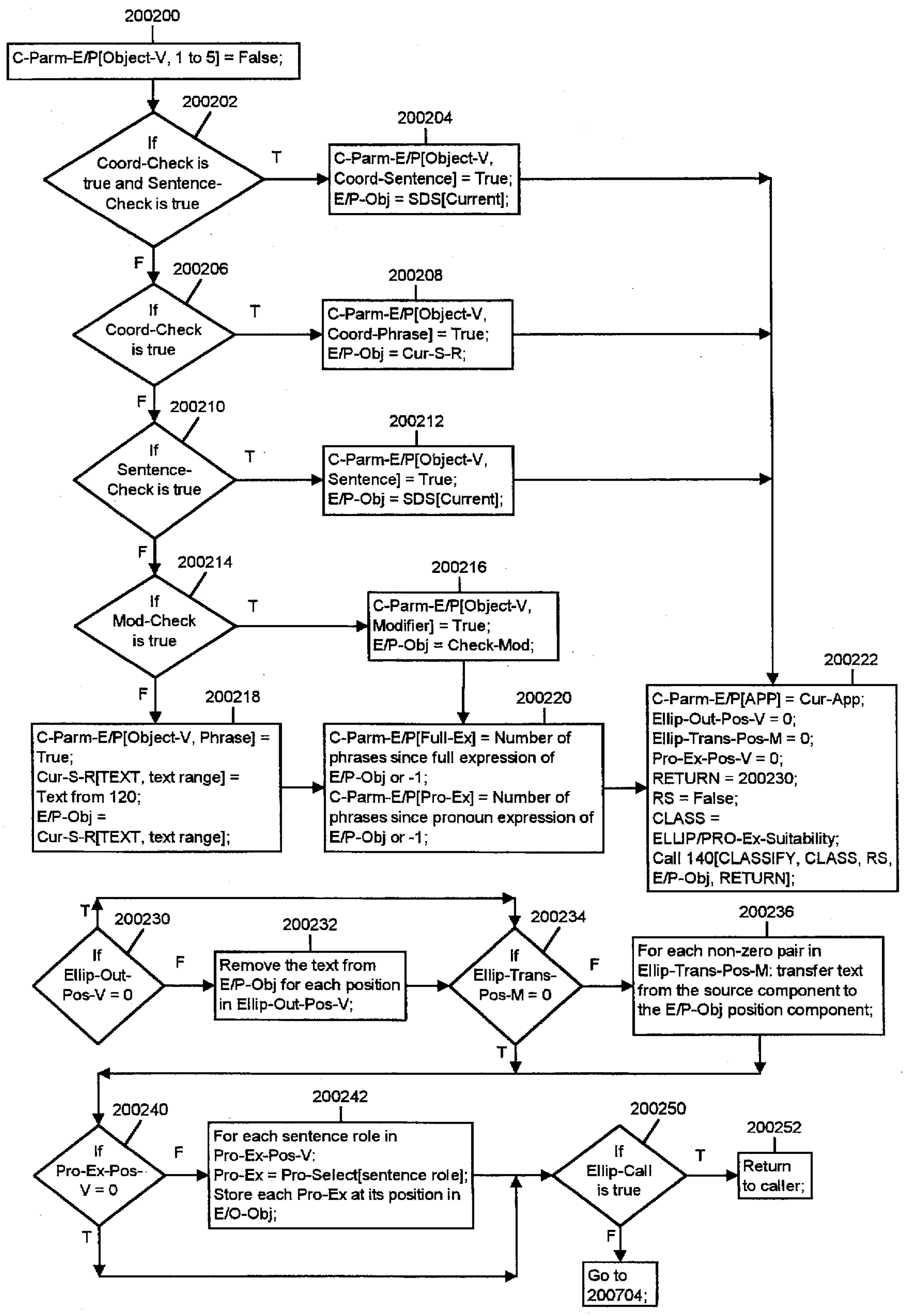
Figure 24F:
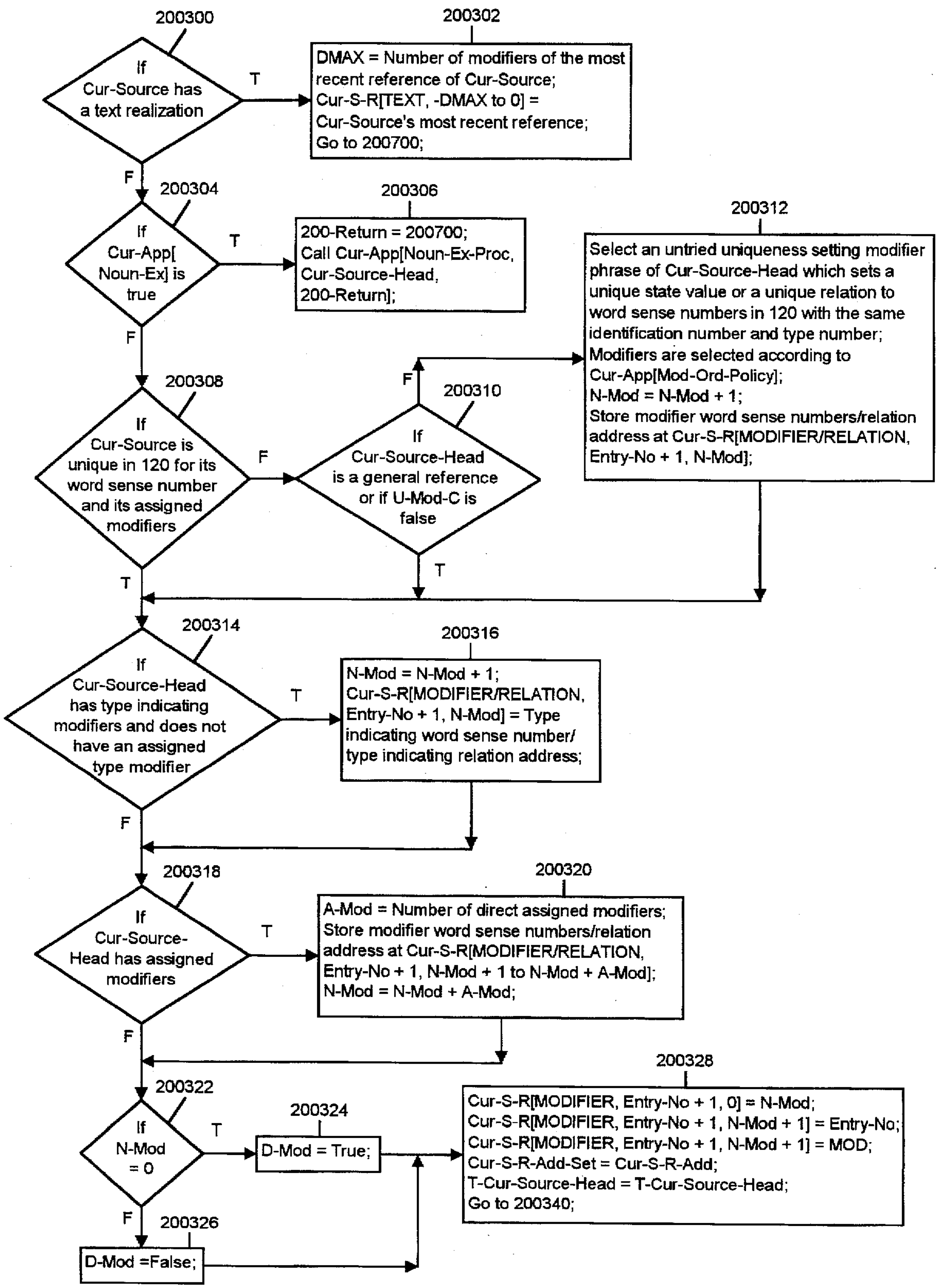
Figure 24G:
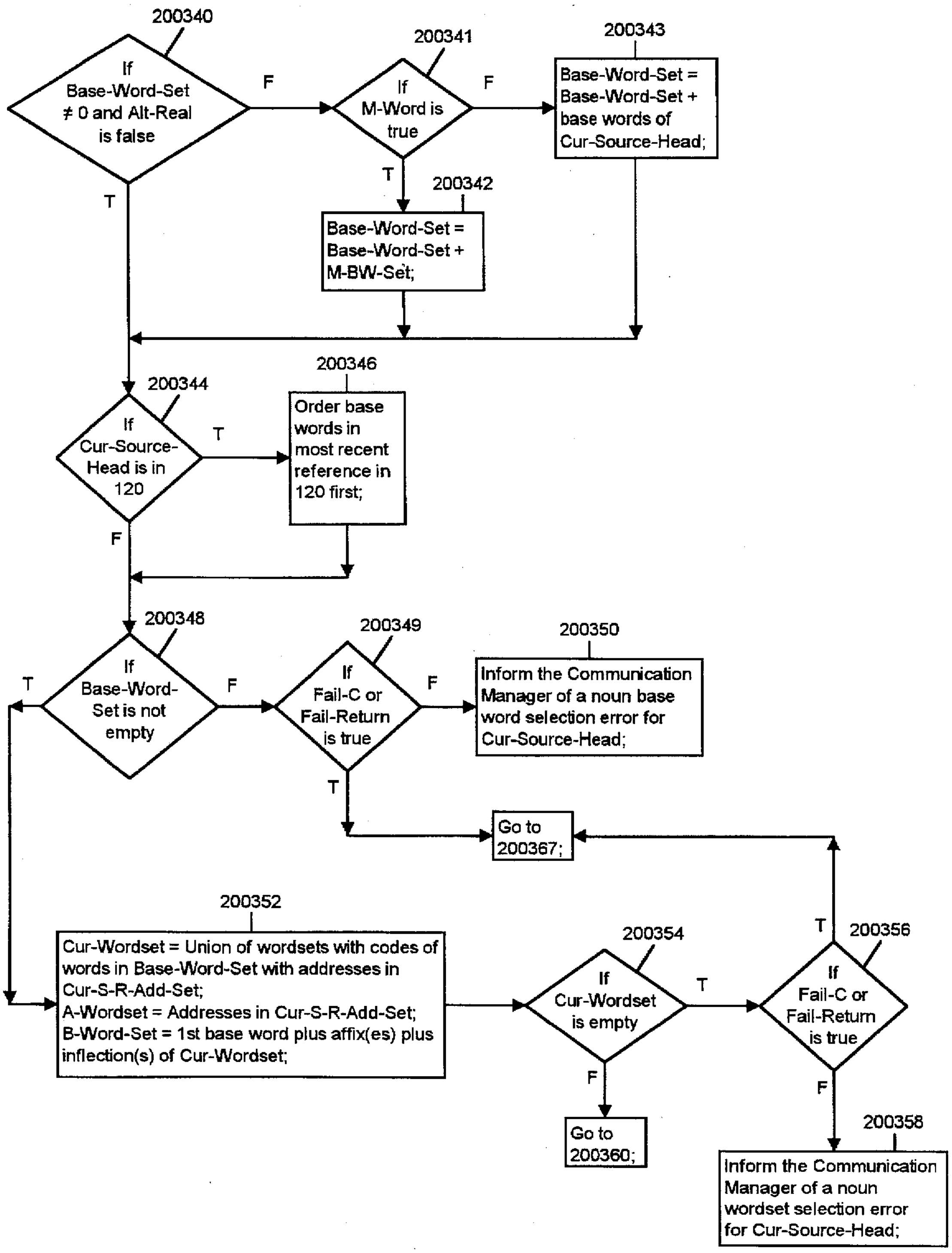
Figure 24H:
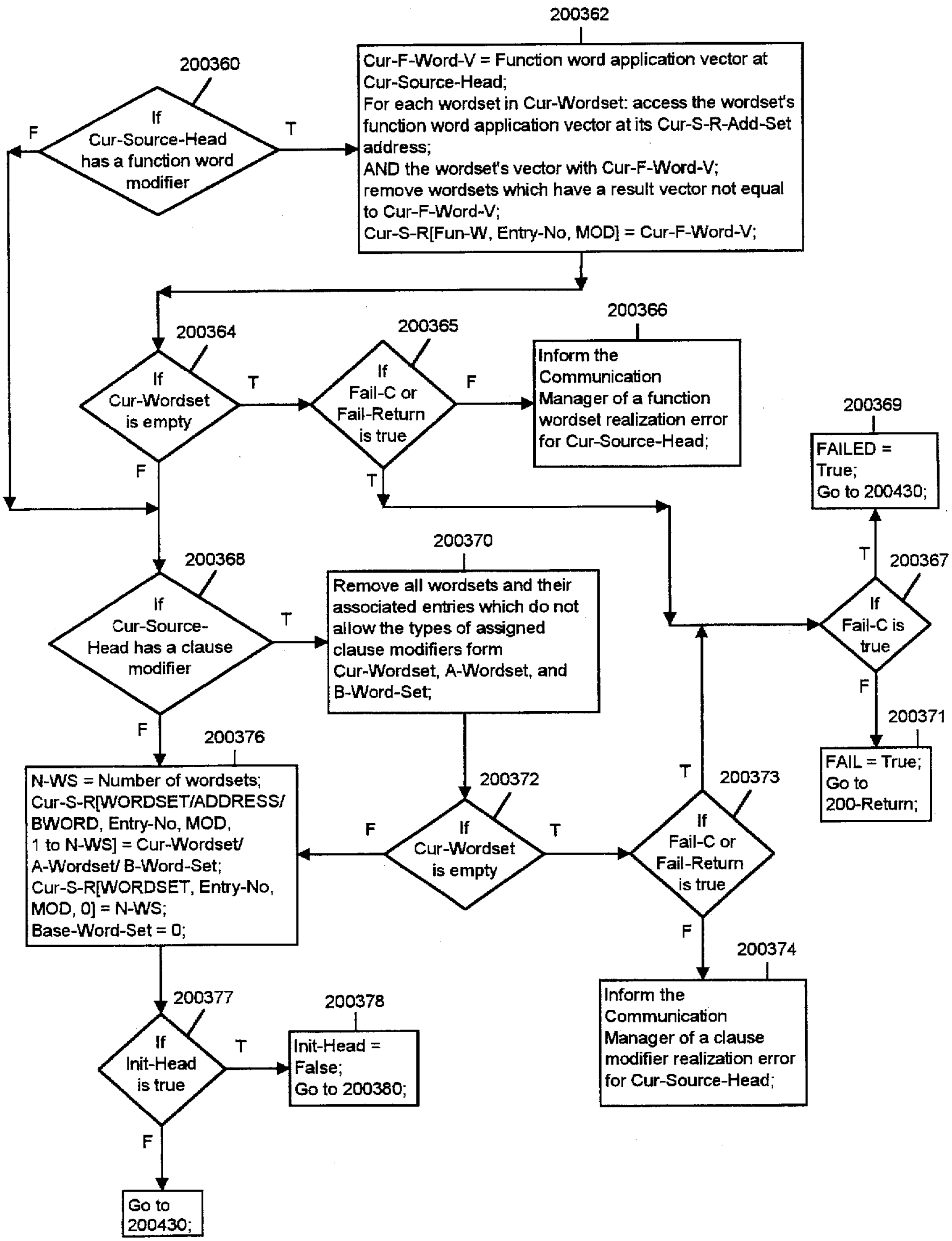
Figure 24I:
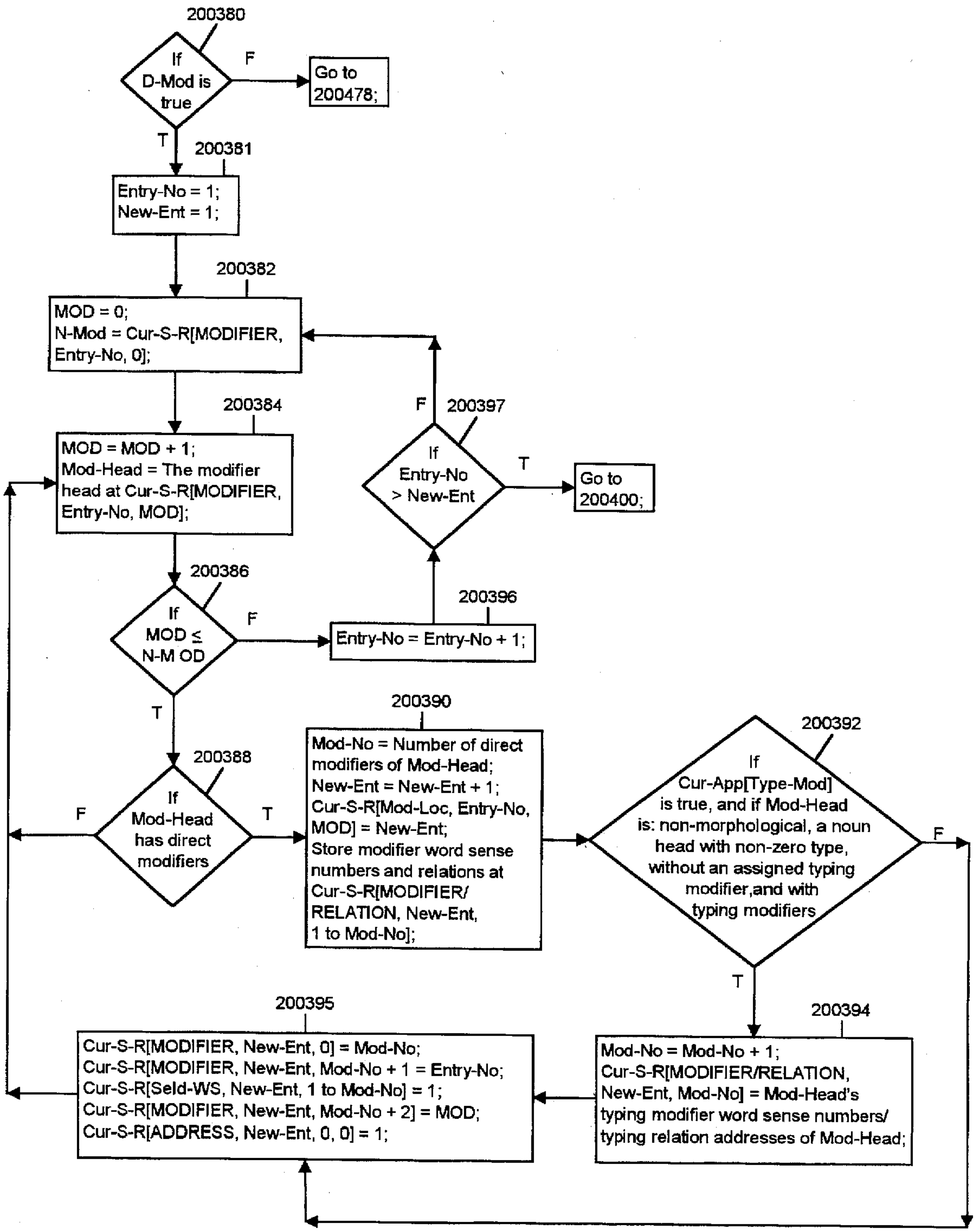
Figure 24J:
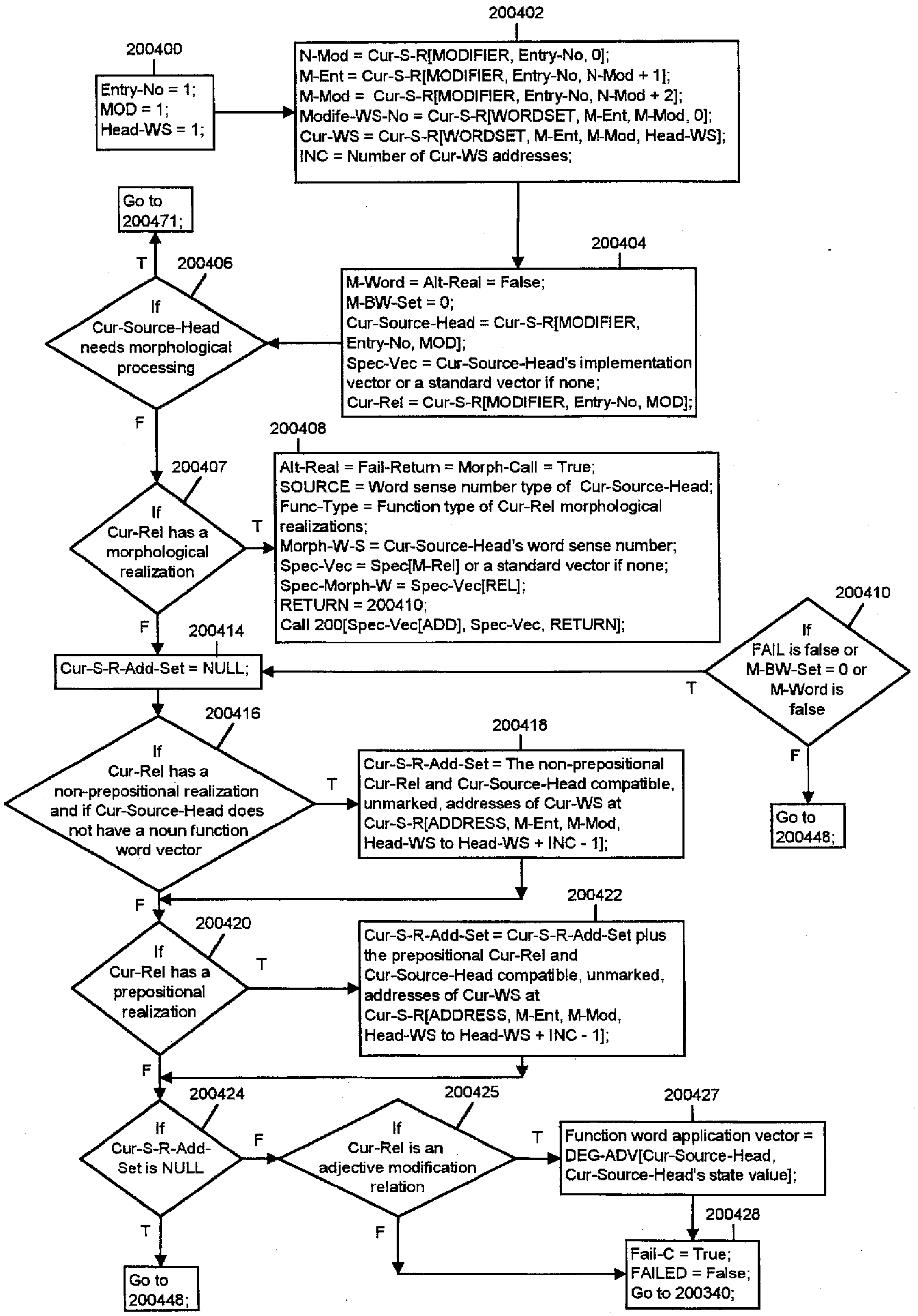
Figure 24K:
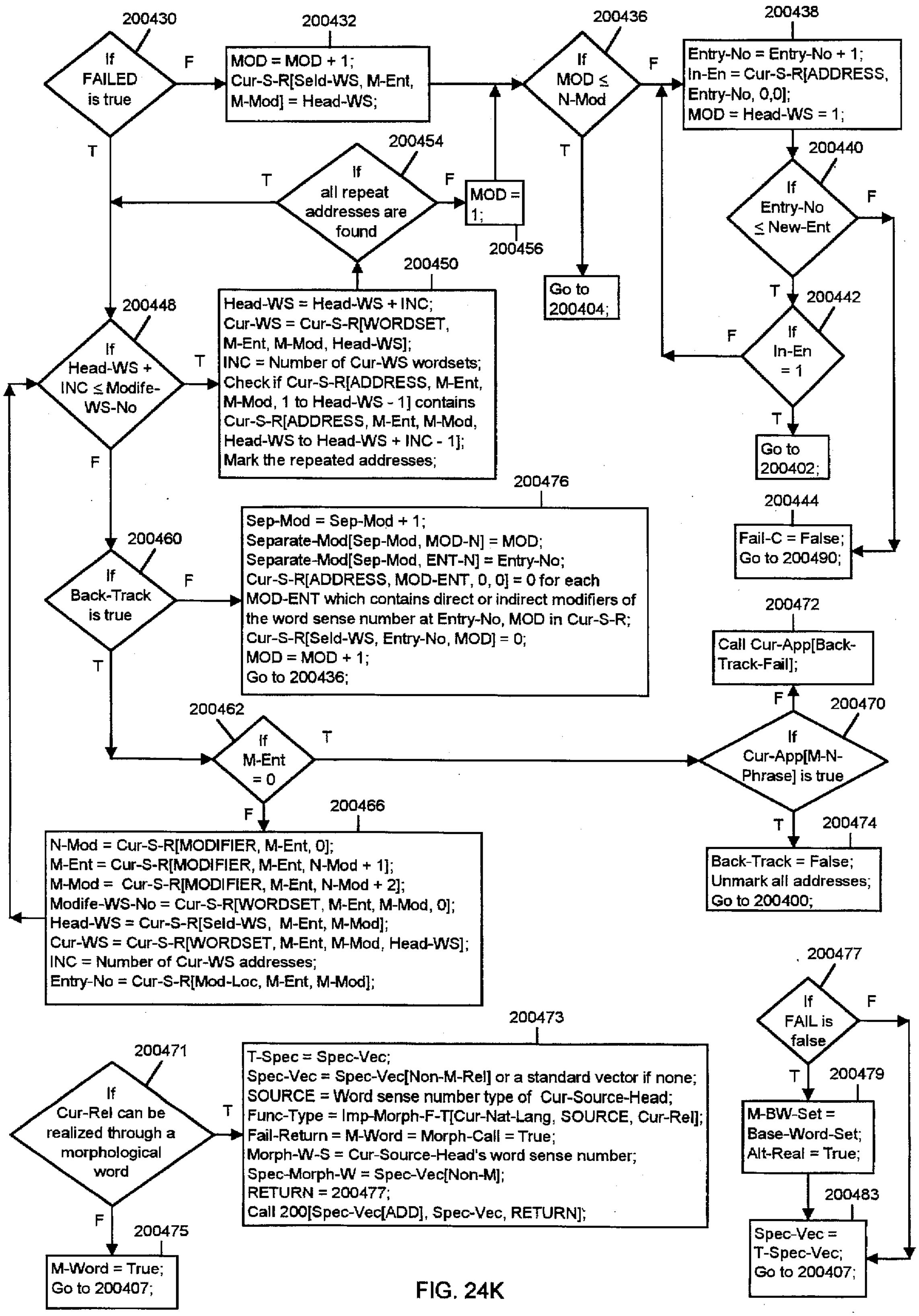
Figure 24L:
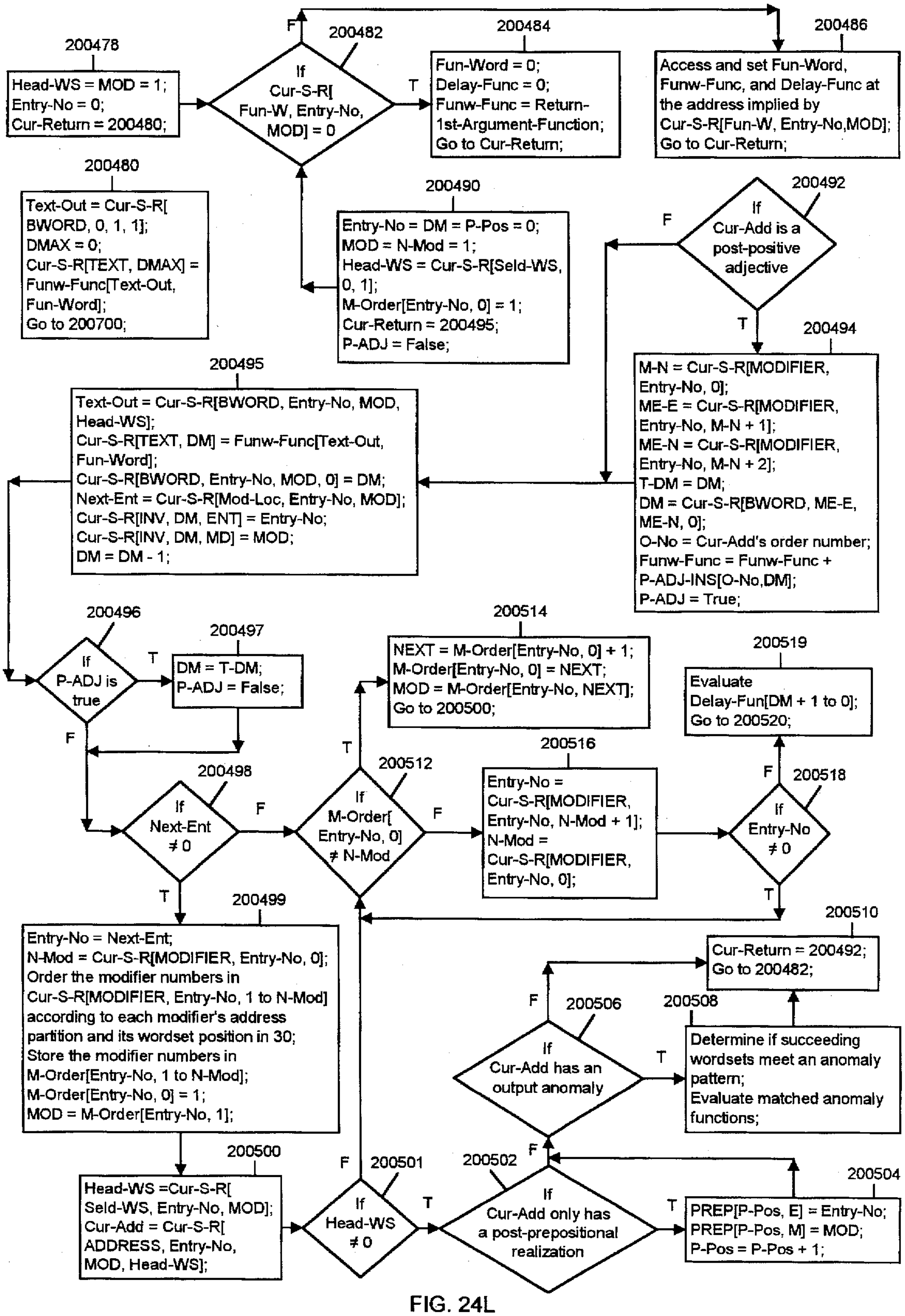
Figure 24M:
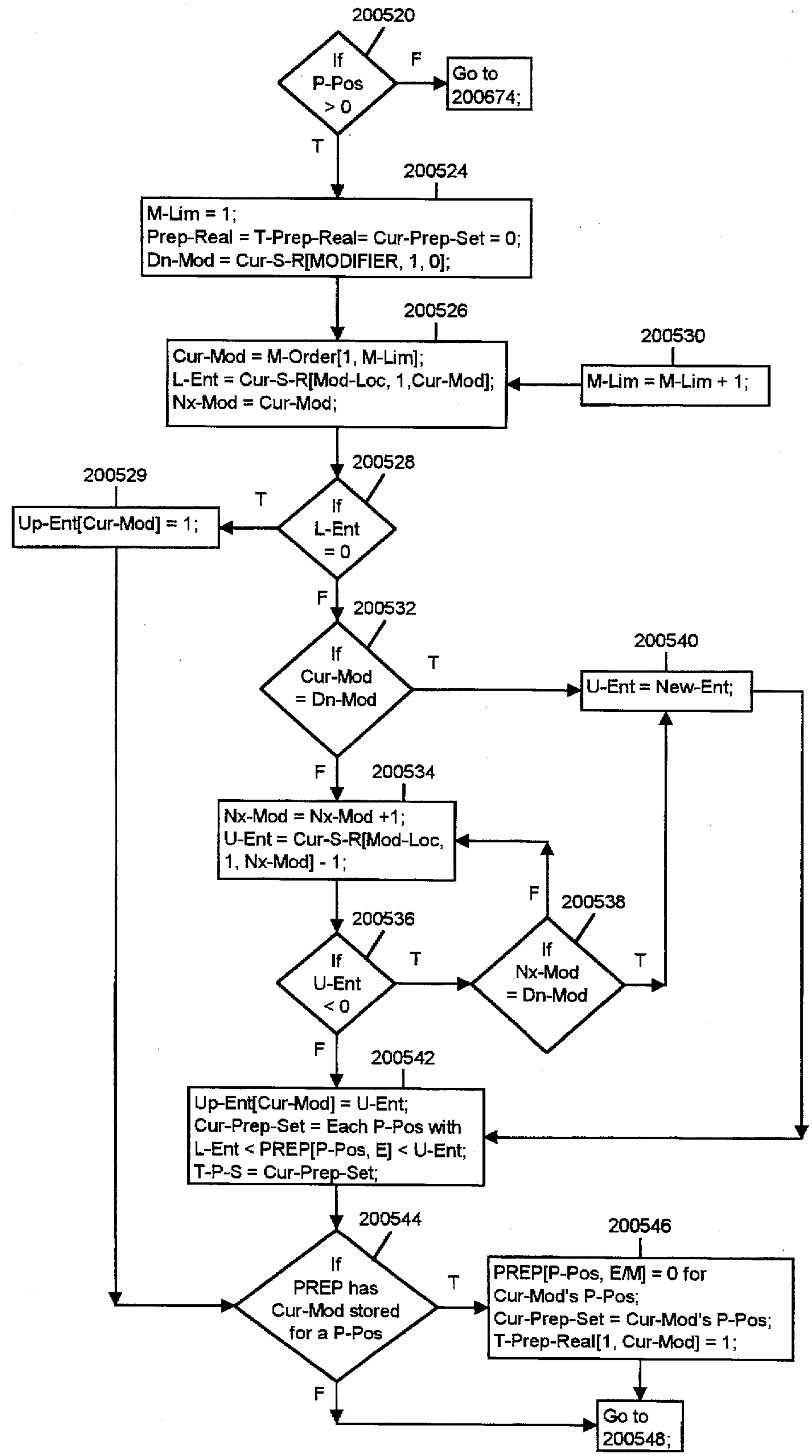
Figure 24N:
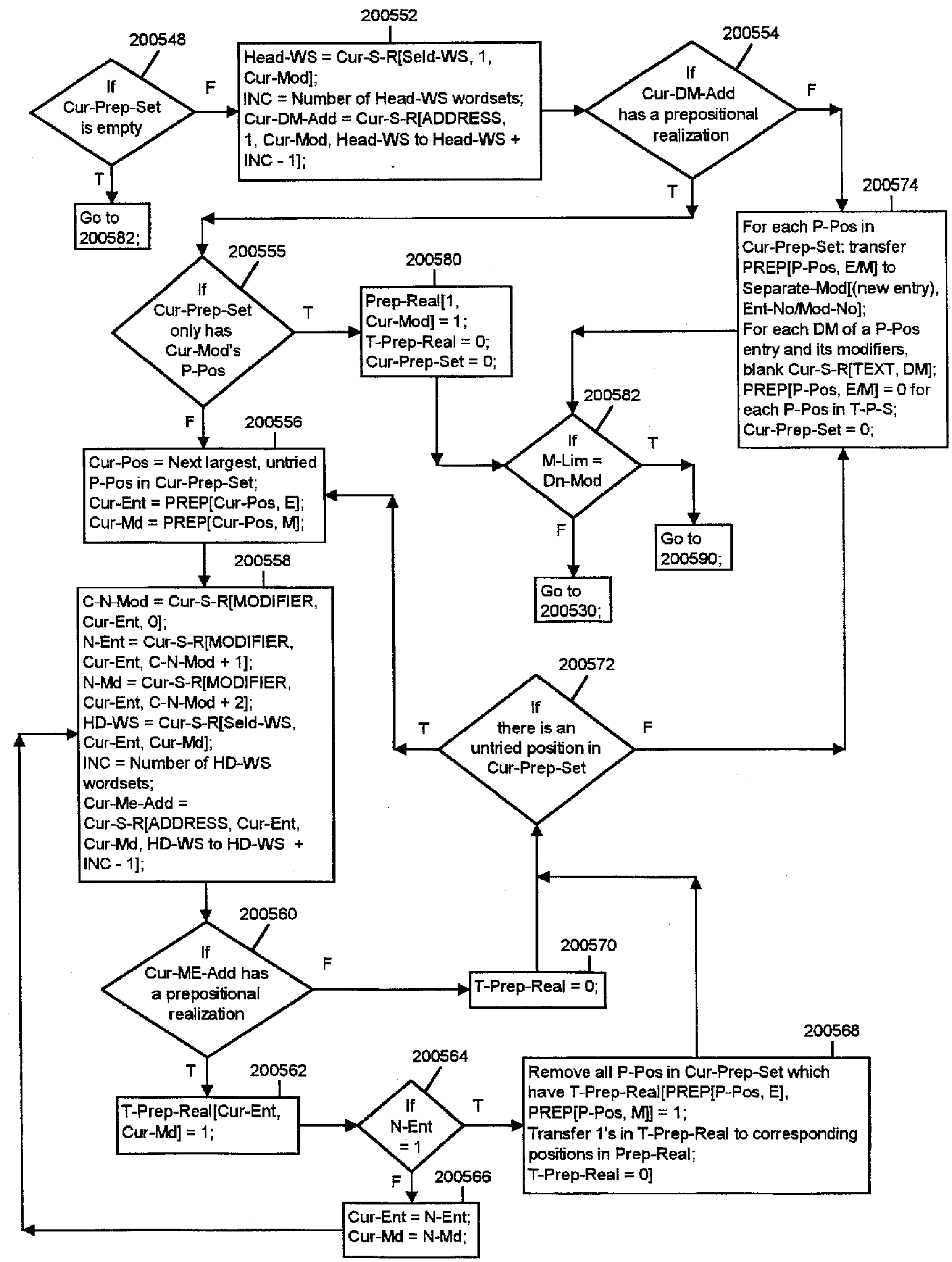
Figure 24O:
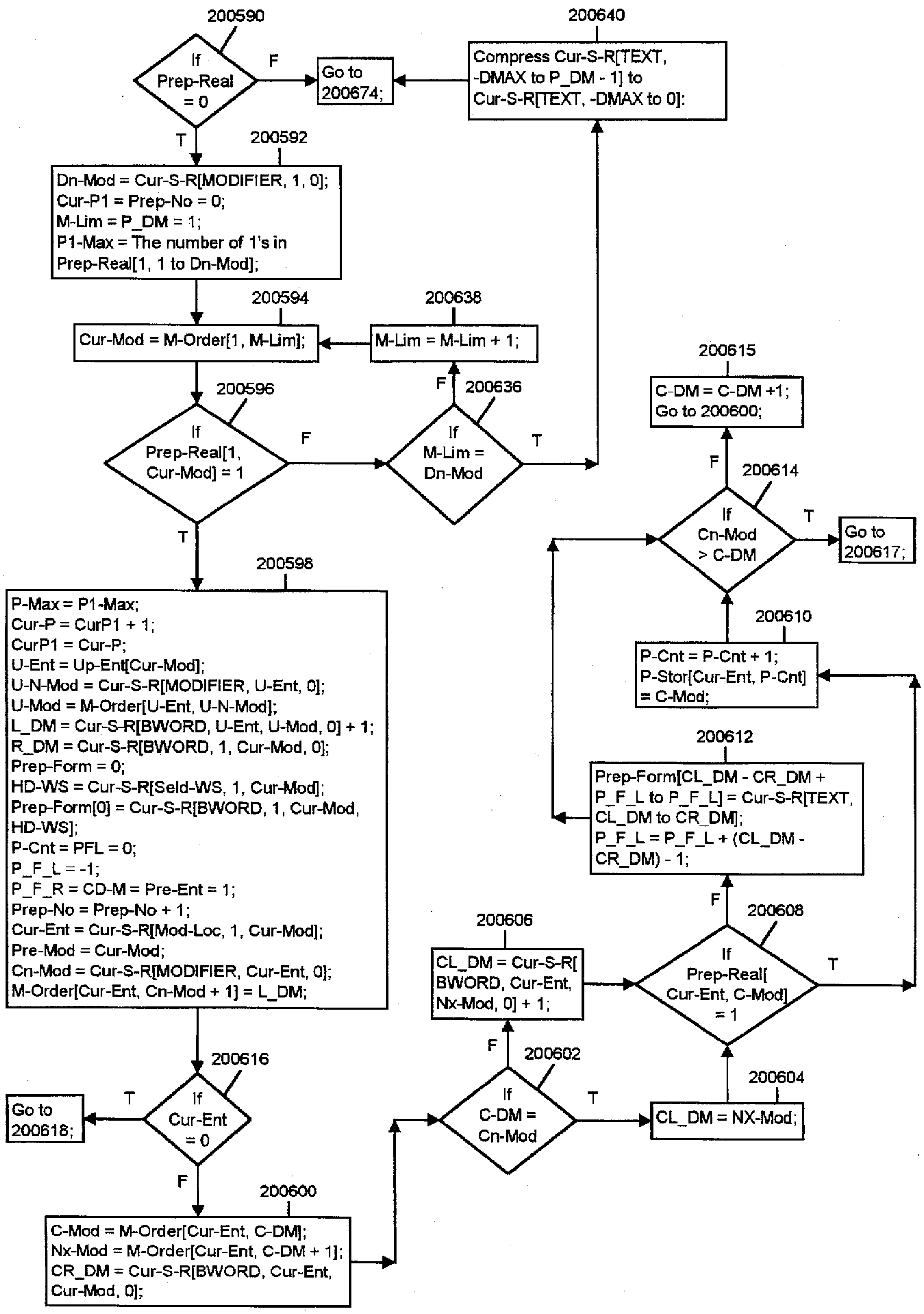
Figure 24P:
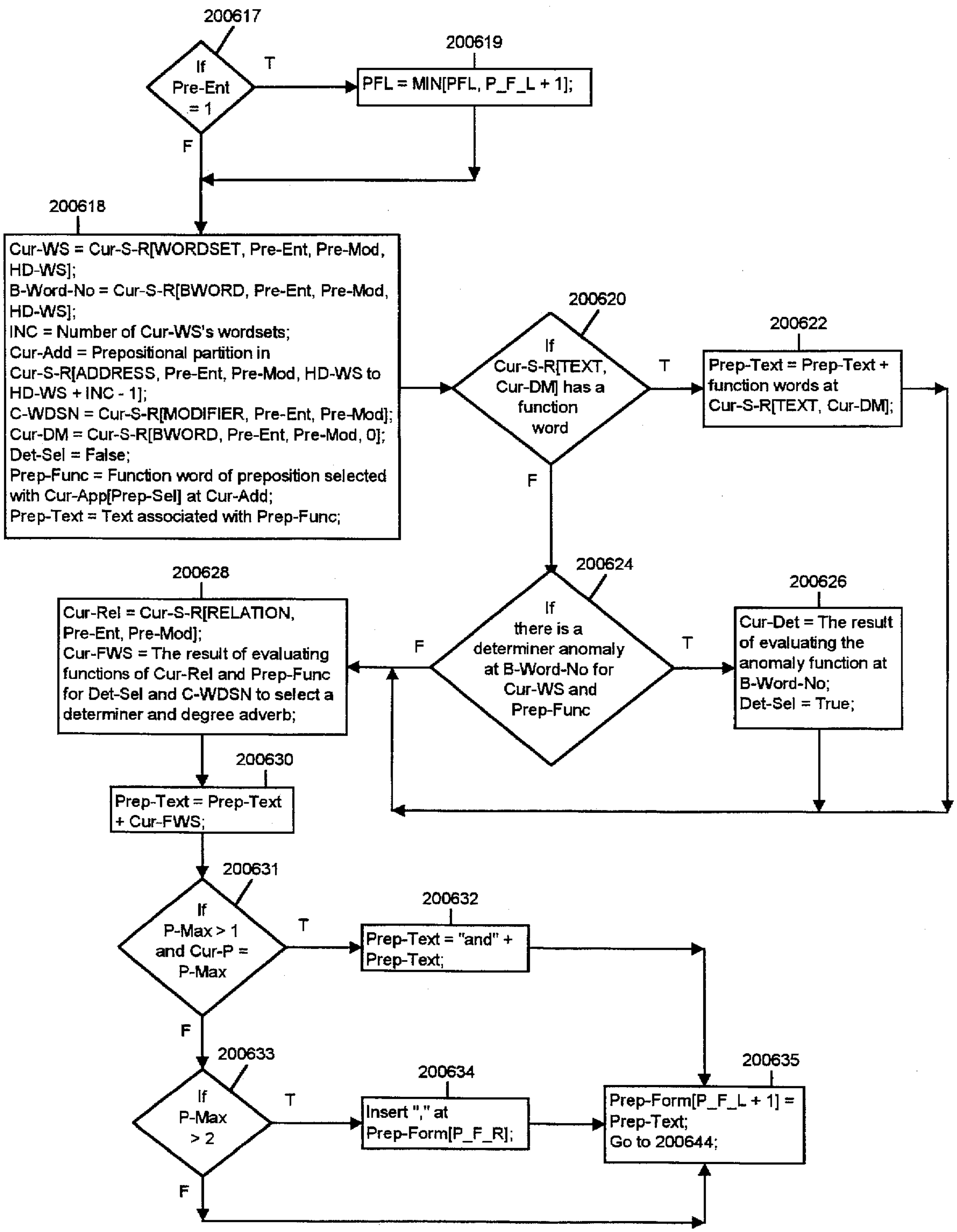
Figure 24Q:
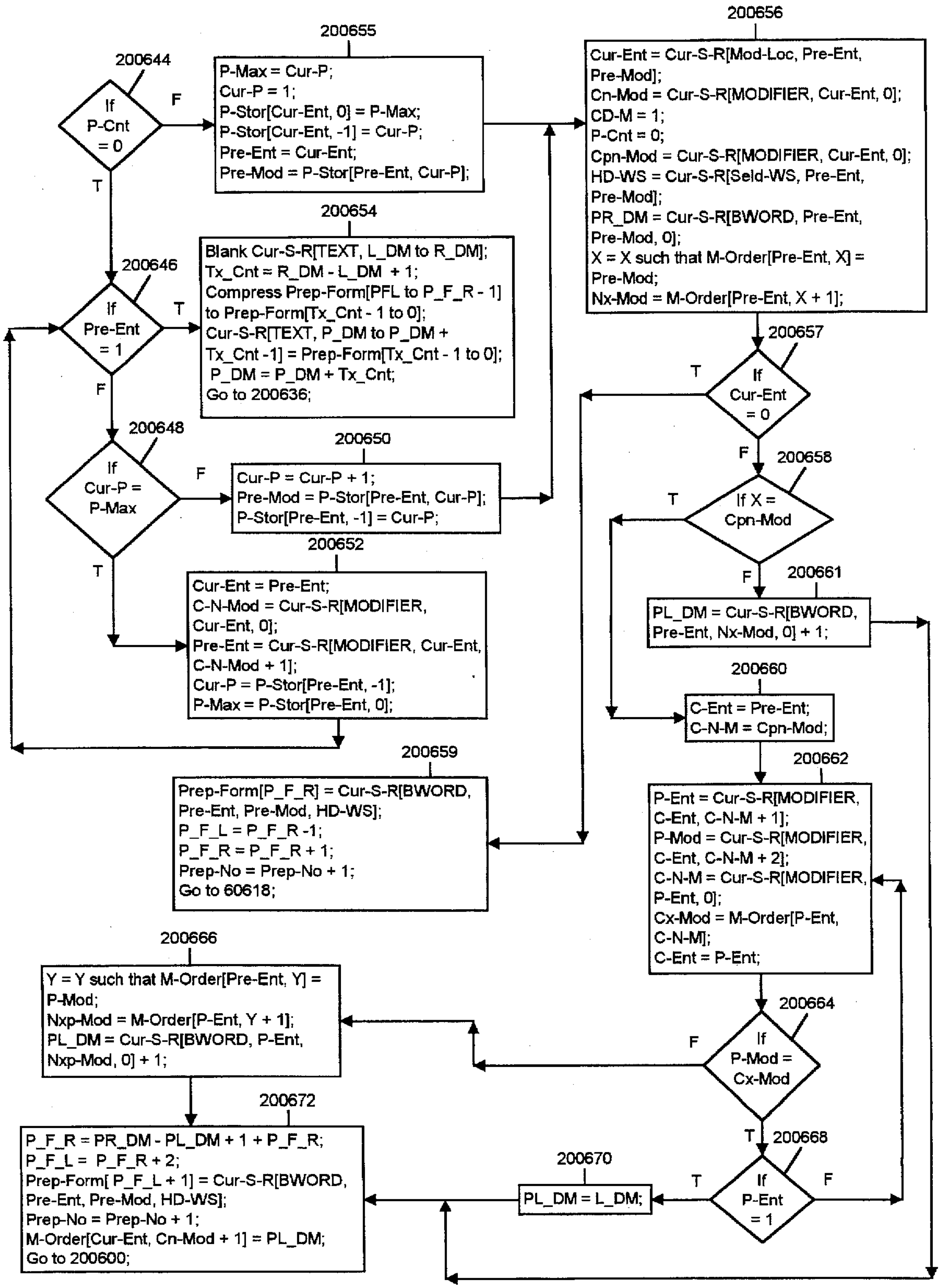
Figure 24R:
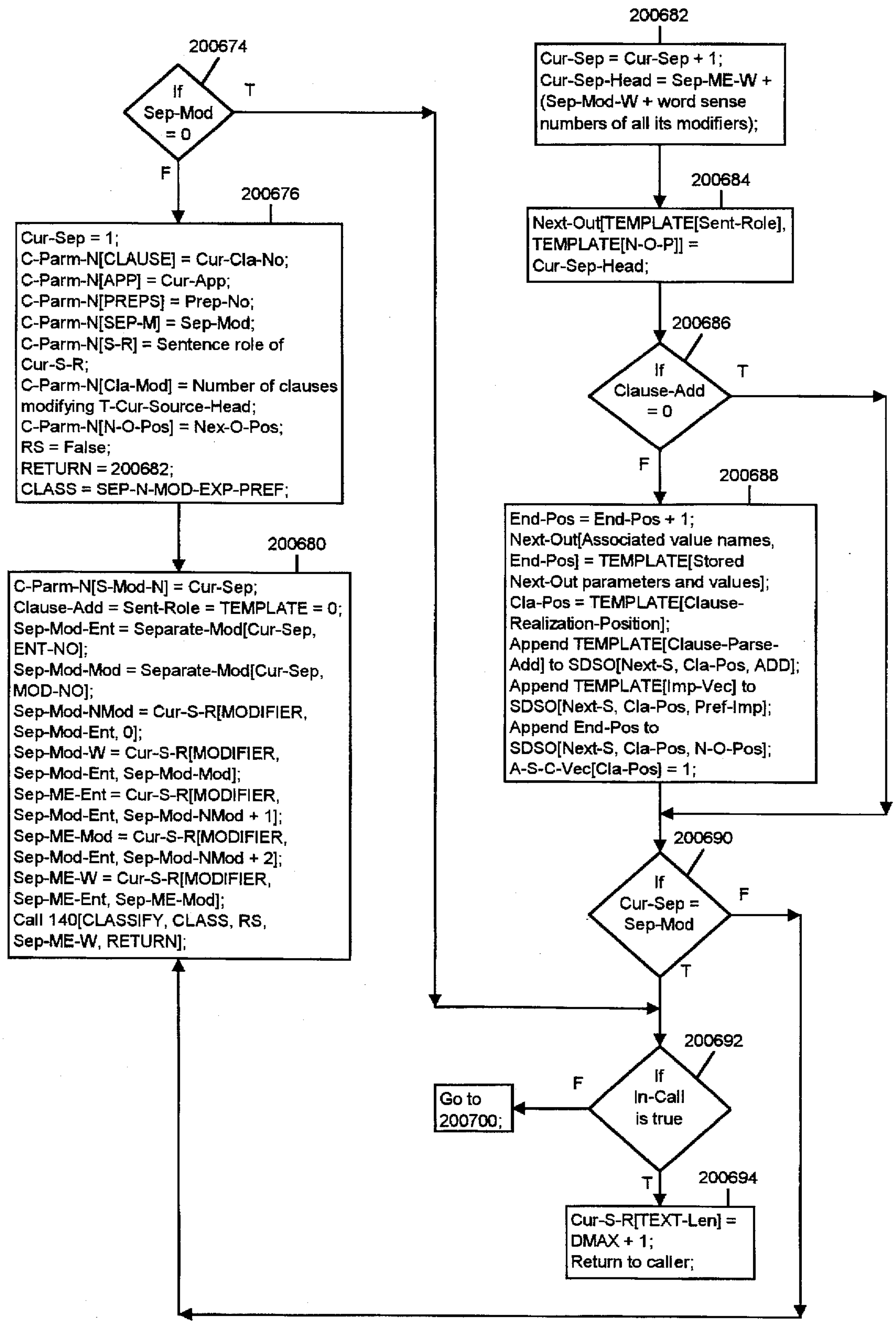
Figure 24S:
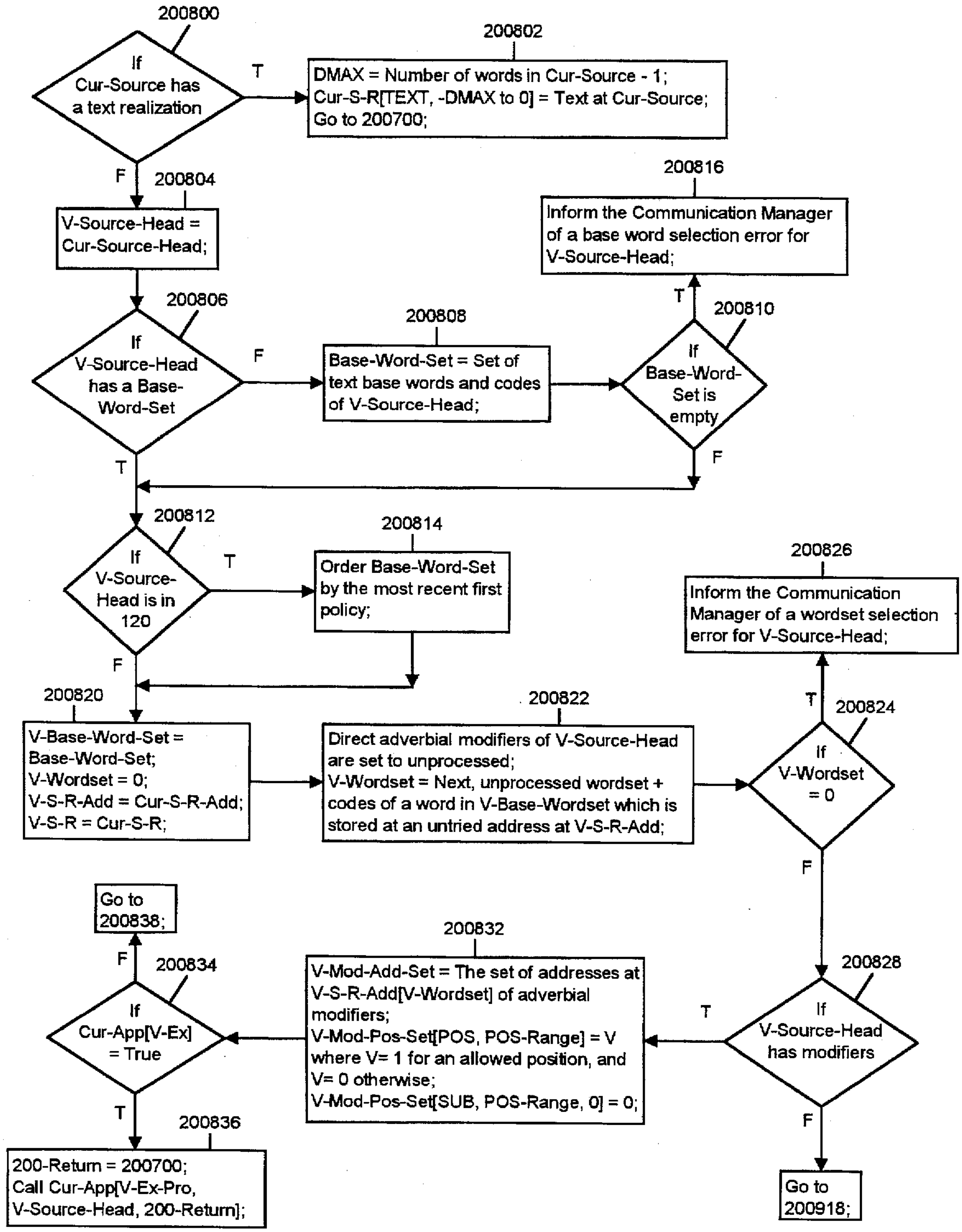
Figure 24T:
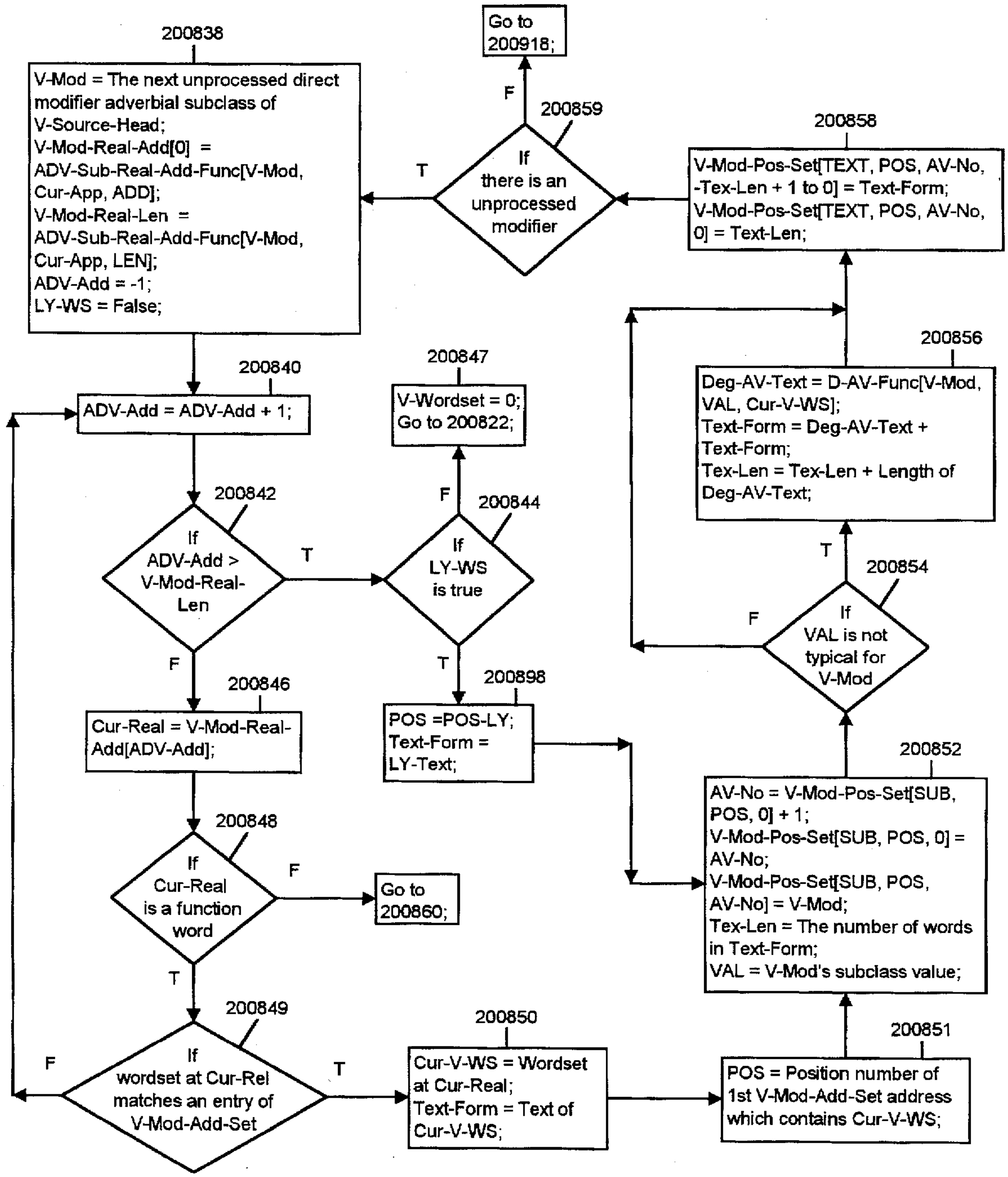
Figure 24U:
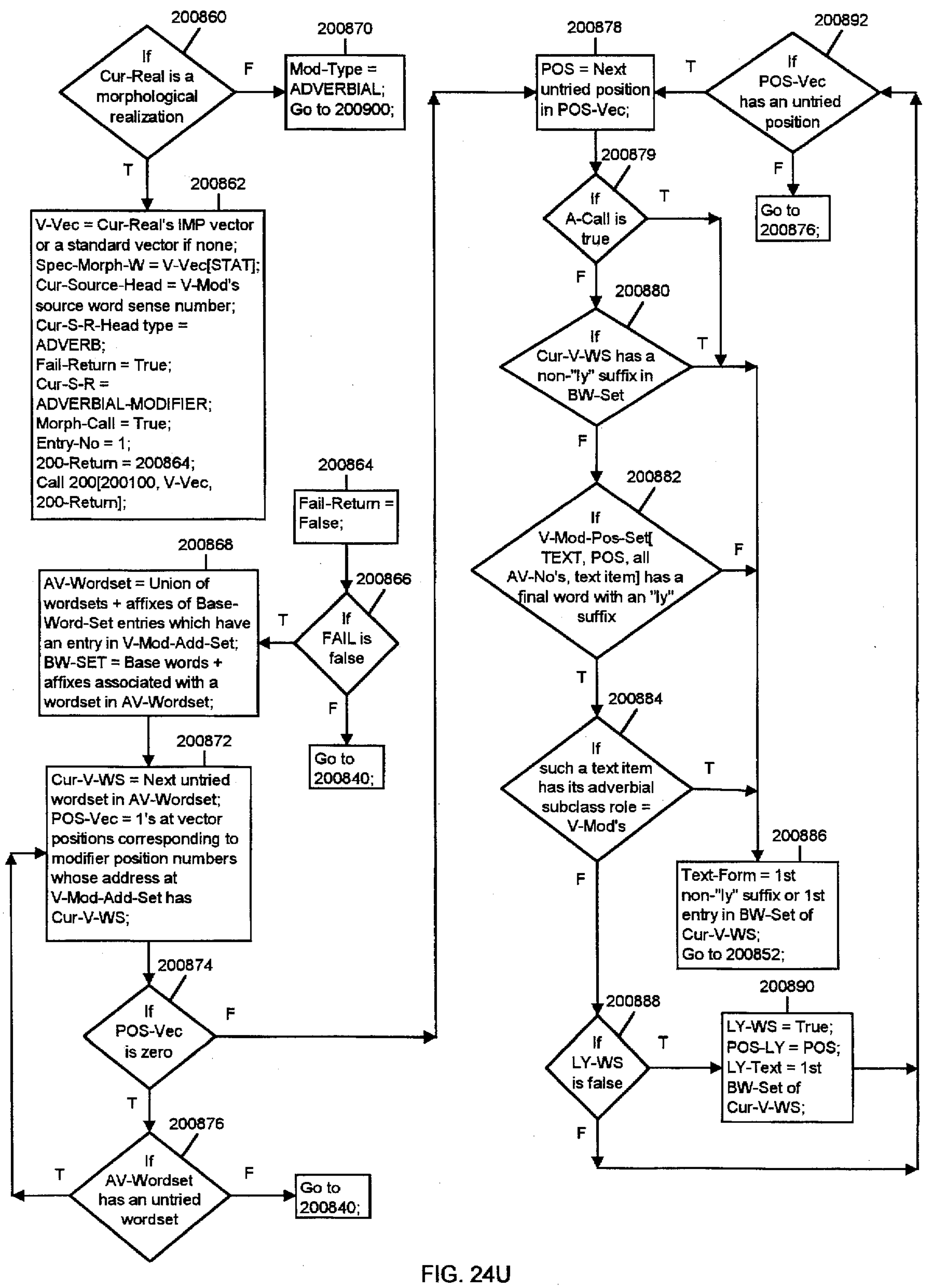
Figure 24V:
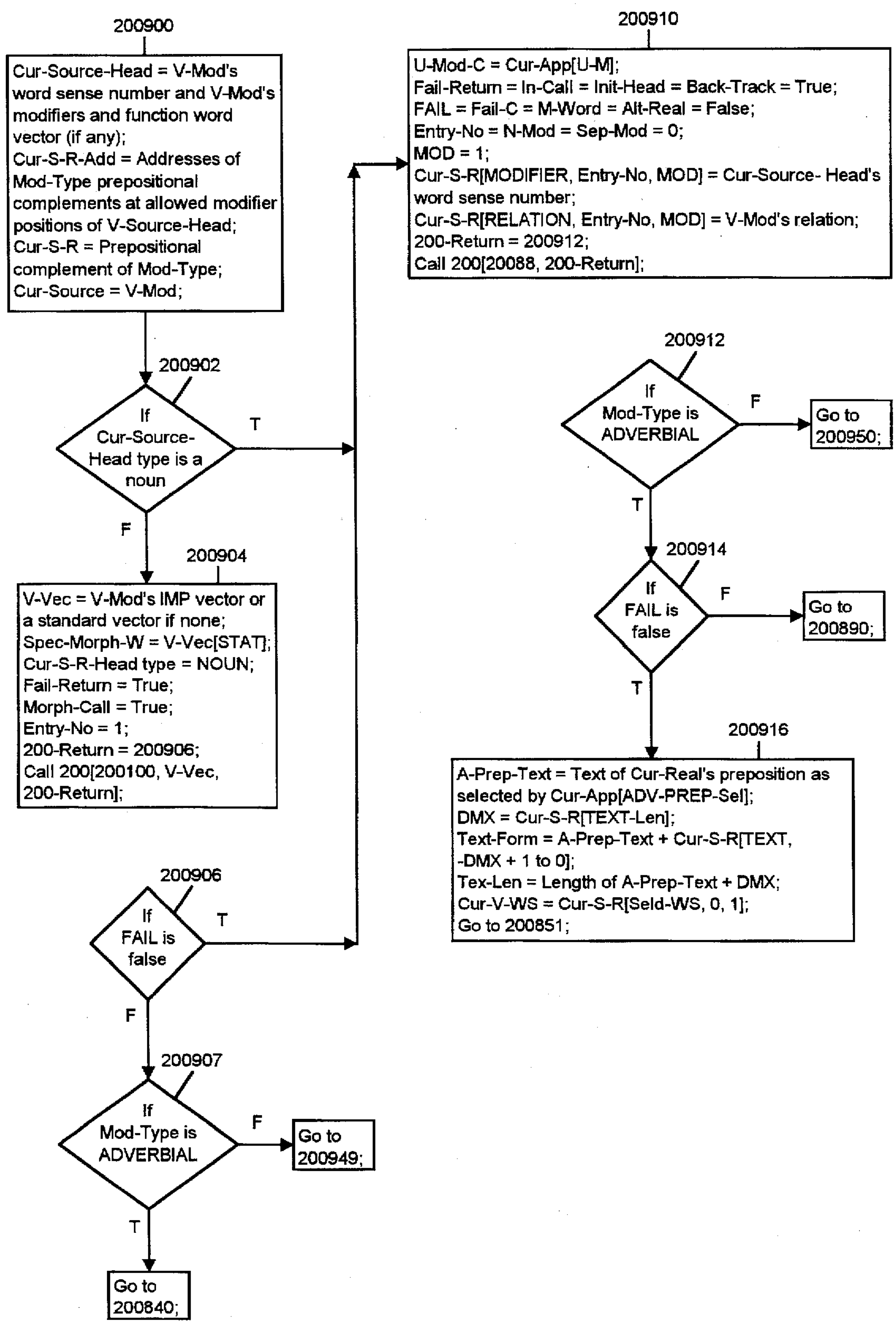
Figure 24W:
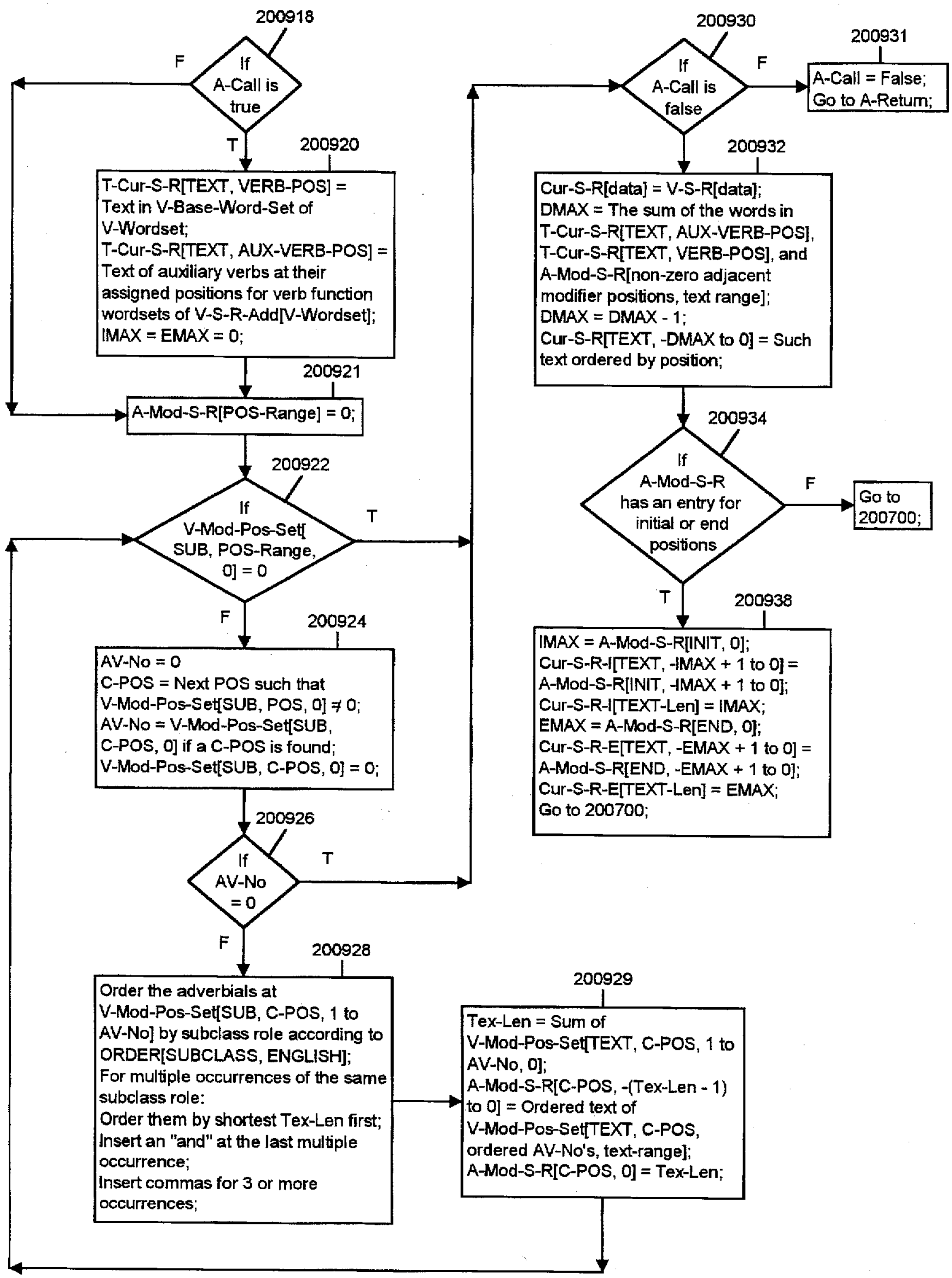
Figure 24X:
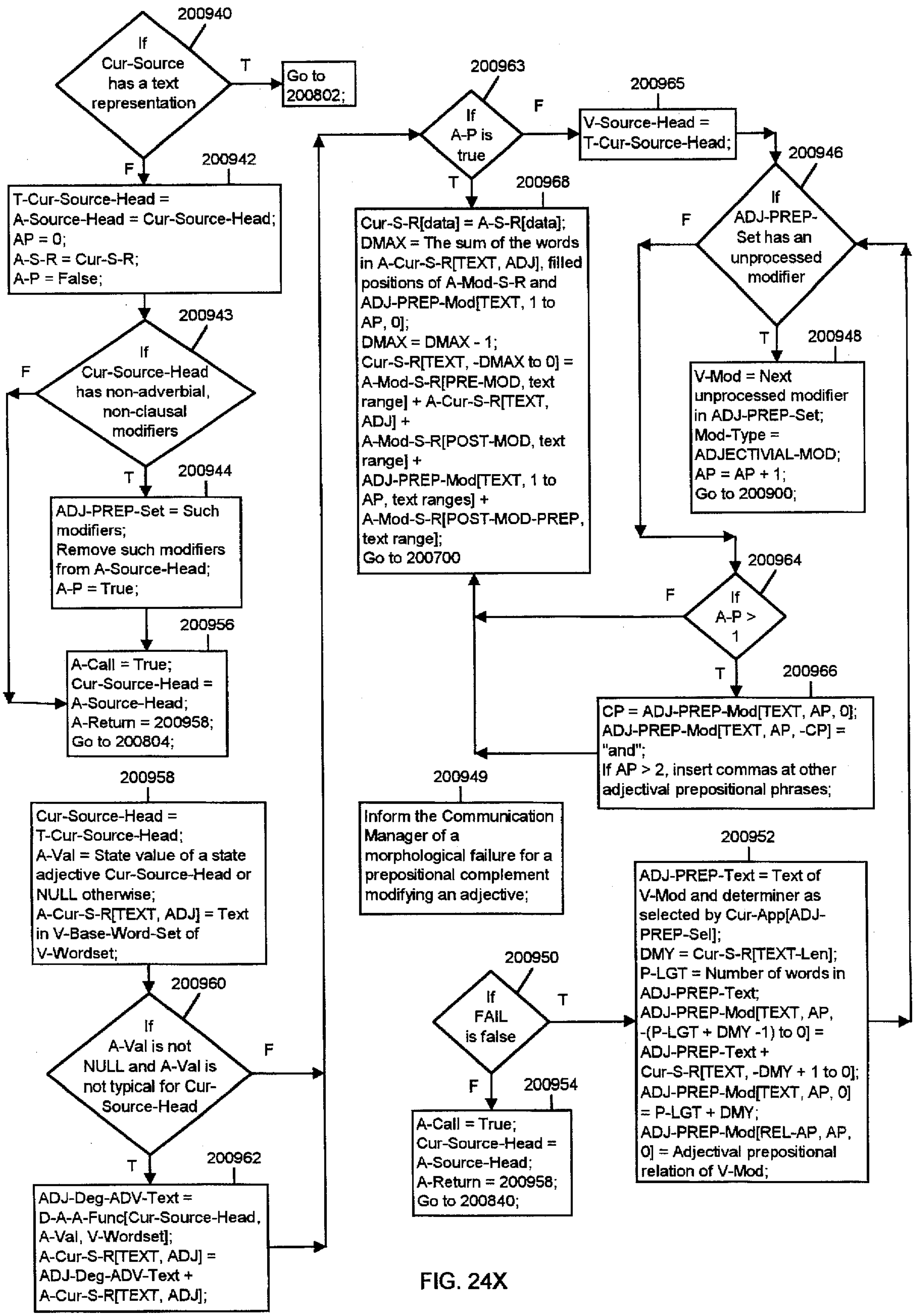
Figure 24Y:
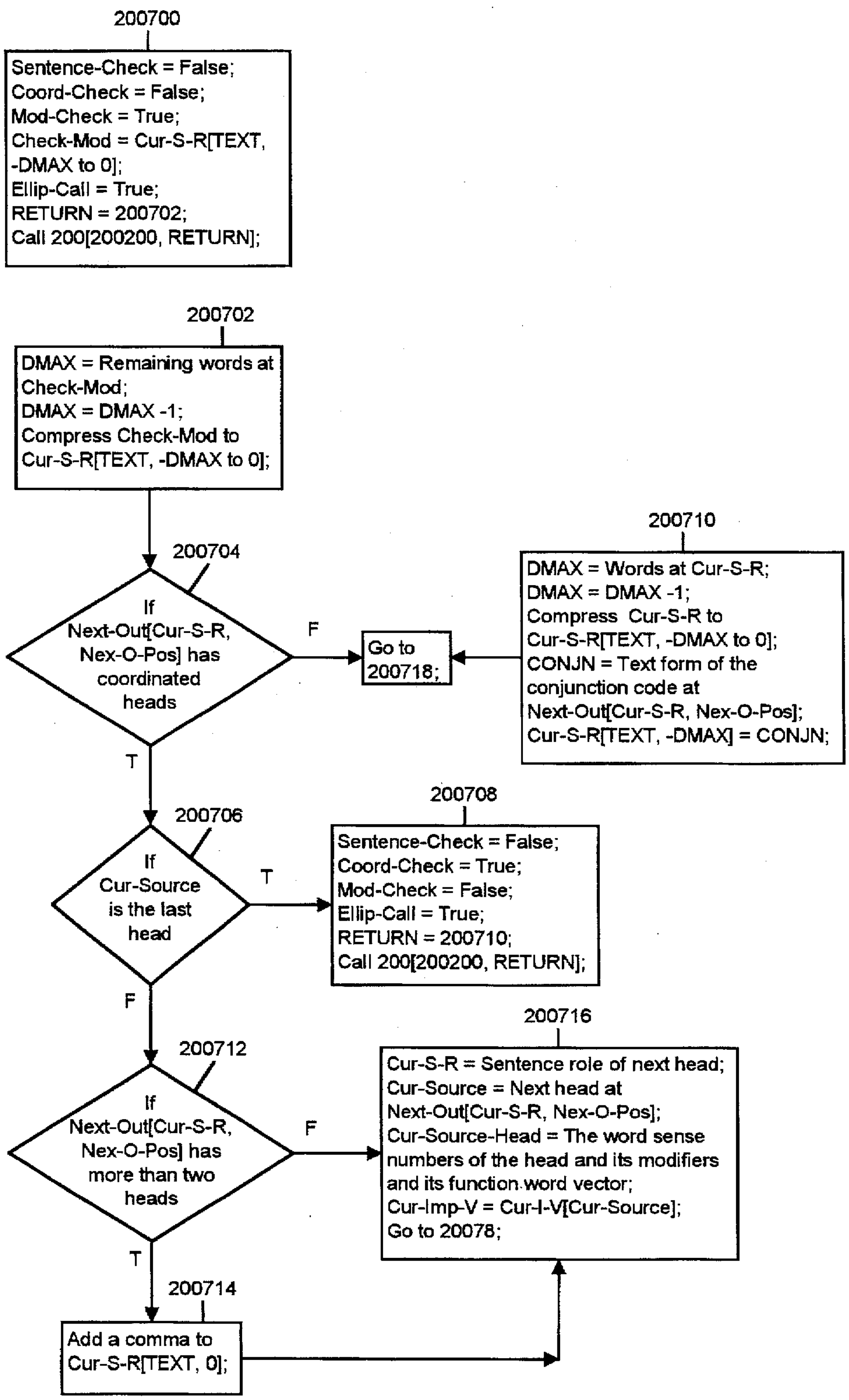
Figure 24Z:
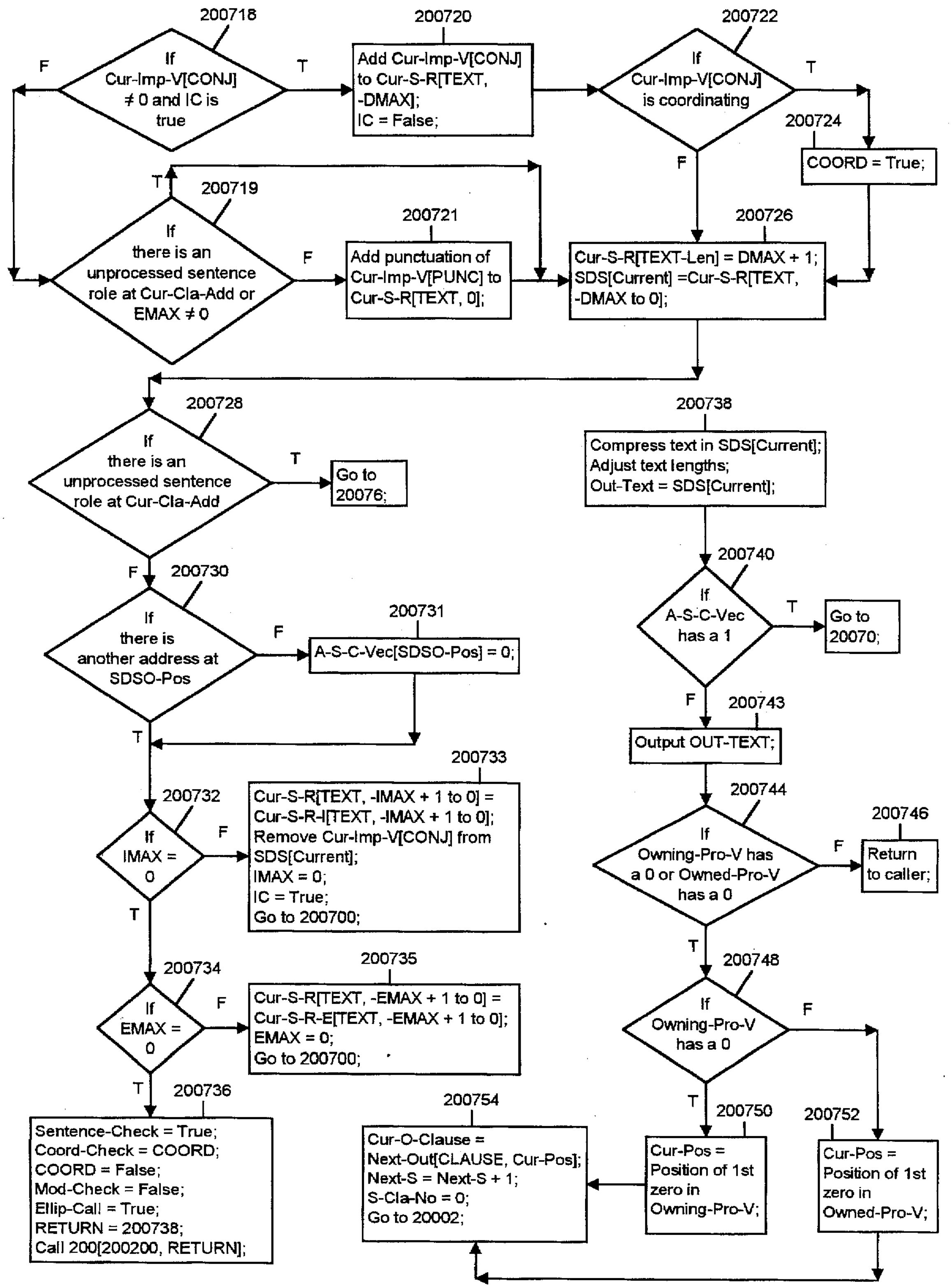

The implementation of Communication Manager 160 is depicted in FIGS. 23*a* and 23*b*. The Communication Manager can be invoked by process calls or with preprocessed clauses. In the above description, the Communication Manager was invoked with a sentence. For example, "140720 informs the Communication Manager of a PATH-FIND failure for a process path realization." is a sentence used to invoke the Communication Manager. The sentence has been processed into a main clause which describes the error or failure. Other clauses in the sentence, if any, are contained in a description purpose owned by the main clause. These other clauses are accessible at the main clause's purpose node in 130 for owned clauses. In this example, the main clause is processed into a word sense number which is equivalent in English to: "PATH-FIND can't find a process path." The actual invocation opcode is an "inform" word sense number which is equivalent in English to "Inform the Communication Manager that PATH-FIND can't find a process path." The use of natural language to interface with the Communication Manager for errors allows the errors to be describable in natural language. This description of errors is useful for interacting with an external source user. Also, the description aids development of an application in two ways. One way is in the description of an error occurrence and the processing of the error in natural language. Another way is that this natural language description of errors makes the error processing specifiable in natural language, and possibly makes the error processing realizable if the functions of the error processing have already been written. Also, it is possible that a process could be implemented for an application that writes computer software functions from a natural language description.

Initial and Continuing Processing Implementation of the Communication Manager

Processing of the Communication Manager begins at 160000 upon invocation. 160000 is true if the current Invocation-Opcode equals INIT. 160000 is true for system initialization of an implementation of this description. If 160000 is true, 160010 initializes Step 12 of Natural Language Processor(s) 10 for accepting incoming natural language through an electronic interface attached to Text In Port(s) 11; Step 18 of each Processor 10 is initialized for controlling natural language processing; 160010 initializes each Non-Textual Natural Language Processors 40 if any exists; Error-Action, Delay-Out, and Error-Out are set to false; and 160010 sets NEX, an array variable for the DELAY array, to 0. NEX, DELAY, Delay-Out, and Error-Out are described below. After 160010, 160012 is next, and is true if Init-App is true. Init-App is true if there is a specific initialization for the application. If 160012 is true 160014 calls the Init-App-Process. If 160012 is false, 160016 sends out greeting messages to the output devices attached to the implementation. After 160016, 160018 sets processing to continue at Step 12.

Error Processing Implementation of the Communication Manager

Figure 10C:
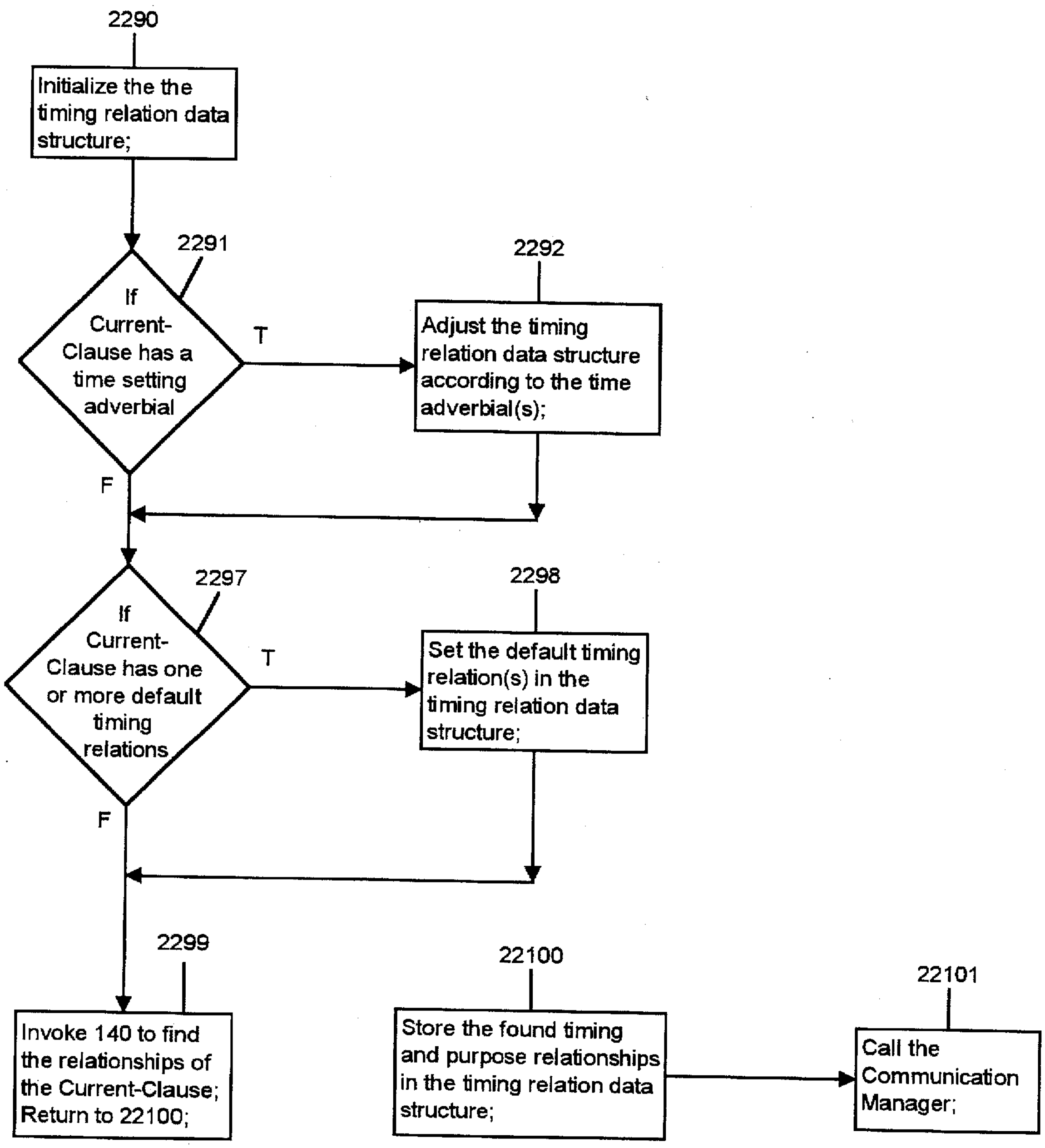
FIG. 10*c* is a flow chart for the timing relation selection method.

If 160000 is false, 160002 is next, and is true if the current Invocation-Opcode equals CONTINUE. 160002 is true after processing of Cur-Clause has been successfully completed, and is called from the Timing Relation Selection Process as depicted in FIG. 10*c* for English. 160002 is also true after certain error processing which requires an error output message, and which is described below. If 160002 is false, 160004 is next. 160004 is true if the current Invocation-Opcode equals an "inform" word sense number. The error processing component of the Communication Manager is invoked when the current Invocation-Opcode equals an "inform" word sense number at 160004. If 160004 is false, 160008 sets processing to continue at 160-Return which is an invocation parameter set by the calling process. If 160004 is true, processing continues at 160200. 160200 sets Cur-Error to the "inform" word sense number; Err-Node is set to Cur-Error's owned purpose realization entry in 130; and 160200 sets Dynamic-Purpose-Name to Cur-Error's owned ERROR purpose function address at the other addresses component of Err-Node. ERROR is a type of purpose function. Dynamic-Purpose-Name is the address of a dynamic purpose application, or is the address of an error function. After 160200, 160202 is next and is true if there is not an ERROR purpose function address at Err-Node. If 160202 is true, the error processing of the invocation error opcode does not have a dynamic purpose or a function which is to be processed upon invocation of the Communication Manager. If 160202 is true, 160204 sets E-Output to the Err-Out function purpose address at Err-Node. An Err-Out function purpose address at Err-Node points to a set of clauses for output that are related to the error associated with Err-Node. 160206 is next, and is true if Err-Node has an Err-Out function purpose address. If 160206 is false, there is an error at Err-Node because an Err-Node must have an error function or an error output. If 160206 is false, 160208 informs the Communication Manager of a failure processing error. If 160206 is true, 160210 replaces variables of the clauses of E-Output with values of the variables; Star-Pos is set to the next unused position in OUTLIST; the clauses of E-Output are stored starting at OUTLIST[Star-Pos]; Error-Action is set to false, and 160210 sets Error-Source to Cur-Error. OUTLIST is the data structure which is contains the clauses to be processed by Text Generation Step 200 for generating output text, and is described below. Error-Action is a control variable of this process.

After 160210, 160212 is next, and is true if Err-Node has a DELAY-O purpose function address. A DELAY-O purpose function address points to a set of criteria which are true before the clauses of E-Output are to be sent out to the input source(s) of an implementation of this description. If 160212 is true, 160214 sets Delay-Out to true; Output-Criteria is set to the DELAY-O output criteria purpose function address; Error-Out is set to false; and 160214 sets Cancel-Criteria to the CANCEL purpose function address of Err-Node if any. A CANCEL purpose function address points to a set of criteria which are true when it no longer necessary to output E-Output. If 160212 is false, 160216 sets Delay-Out to false, and sets Error-Out to true which implies that the E-Output is to be processed for text generation without delay. After 160214 or 160216, 160218 is next, and is true if Err-Node has an Err-Response-Act purpose function address. An Err-Response-Act purpose function address points to a error function for processing an input from a source regarding a previously sent error message to the source. In general, such an error function, implemented through dynamic purposes, determines if the source has sent information which allows an error to be processed. If the information is sufficient, the error is processed. Otherwise, the error process typically sends out a request for further information. If 160218 is true, 160220 sets Error-Act to true, and Dynamic-Pur-Name is set to Err-Node's Err-Response-Act purpose function address. Error-Act is true when the current error has an error response action function. After 160220, 160222 is next, and is true if Dynamic-Pur-Name is a dynamic purpose address in 150. If 160222 is true, 160224 sets 160-Return to 160244; RS is set to Err-Node's Res-Value which is stored at the other addresses component of Err-Node; and 160224 sets Error-Return to 140[DYNAMIC, Dynamic-Pur-Name, RS, 160-Return]. When the Communication Manager is invoked with a CONTINUE Invocation-Opcode, processing continues at Error-Return if 160020 is true as described below. If 160222 is false, Dynamic-Purpose-Name is an unconditionally processed error response action function. A dynamic purpose error response action function conditionally determines which function to process. If 160222 is false, 160226 sets 160-Return to 160244, and sets Error-Return to Dynamic-Pur-Name[160-Return]. If 160218 is false, 160228 sets Error-Act to false. After 160228, 160226, or 160224, 160230 calls 160[CONTINUE] which invokes the Communication Manager to continue processing as described below.

If there is an ERROR function at 160202, there is an error function which is to be immediately processed without further response from an input source, and 160202 is true. If 160202 is true, 160240 is next, and is true if Dynamic-Purpose-Name from 160200 is a dynamic purpose address. If 160240 is true, 160242 sets 160-Return to 160244; RS is set to false; and 160242 sets processing to continue at 140[DYNAMIC, Dynamic-Purpose-Name, RS, 160-Return]. If 160240 is false, 160246 sets 160-Return to 160244, and sets processing to continue at Dynamic-Purpose-Name[160-Return]. An error processing function can optionally return to 160244. An error processing function can optionally return to 160244 for a variety of reasons including: a requirement for further error processing using the Communication Manager, and a failure to process the error. Before processing is set to continue at 160244, the controlling process sets Error-Word-Sense-Number to the word sense number which is related to the next function to be processed, and is equivalent to an "inform" word sense number Invocation-Opcode invocation of the Communication Manager except that an immediate error function without further response is not allowed. This exception occurs because the controlling process could invoke the Communication Manager for an error function to be immediately processed. 160244 sets Cur-Error to Error-Word-Sense-Number; Cur-Err is set Cur-Error's owned purpose realization entry in 130, and 160244 sets processing to continue at 160204 as described above. This completes the description of the Communication Manager.

If 160002 is true, the Communication Manager is invoked with a CONTINUE opcode, and 160020 is next. 160002 is true if Error-Action is true, and if Cur-Clause ends a source input containing an expected error response from the source. An error response is expected from the source when an error output text message has been sent just prior to the current input from the source. Error-Action is true when error processing requires information from the source to continue error processing. 160020 requires the current input sentence to be complete before being true. If 160020 is true, 160022 sets processing to continue at Error-Return, which is the next function of the current error processing. Error-Return and Error-Action are set during processing described above. If 160020 is false, 160030 is next, and is true if Delay-Out is true. Delay-Out is true if an output related to error processing is delayed. For example, such an output is delayed to allow the error condition to be corrected by additional information from the conversation as described above. If 160030 is true, 160032 increments NEX by 1; DELAY [PUR, NEX] is set to Err-Node; DELAY[E-S, NEX] is set to Error-Source; DELAY[CAN, NEX] is set to Cancel-Criteria; DELAY[Err-Out, NEX] is set to OUTLIST[Star-Pos to Next-Pos]; DELAY[Out-Criteria, Next] is set to Output-Criteria; DELAY[ACTION, NEX] is set to Error-Act; and 160032 sets processing to continue at 160042. Err-Node, Error-Source, Cancel-Criteria, OUTLIST[Star-Pos to Next-Pos], Output-Criteria, and Error-Act are set with parameters associated with an error process, and this error process is described above for an invocation of the Communication Manager with an "inform" word sense number. 160032 stores parameters which are later used to output an error message and an optional related error processing function.

If 160030 is false, a delayed error output was not processed prior to this invocation of the Communication Manager, and 160034 is next, and is true if Error-Out is true. Error-Out is true when an error message is to be outputted immediately after this invocation of the Communication Manager such as after an invocation from the processing of an "inform" word sense number error message. If 160034 is true, 160036 sets Error-Action to Error-Act. Error-Act is set for error processing by the Communication Manager for an "inform" word sense number error message for example. Error-Act is true if there is an error response action function as described above. After 160036, 160038 stores a purpose entry at Context-Purpose-Set comprised of: the Err-Node function, Err-Node, Error-Source, a pointer to the first error output clause, ERROR-COM; 160038 also sets Error-Out to false. ERROR-COM implies that the purpose of the text is for error communication. After 160038, 160040 prepares the message for output through Text Generation Step 200 which is described below. 160040 sets Next-Out[Star-Pos to Nex-Pos] to OUTLIST[Star-Pos to Nex-Pos]; RETURN is set to Step 18; and 160040 calls 200[Cur-Nat-Lang, Next-Out, Star-Pos, Nex-Pos, RETURN]; Star-Pos and Nex-Pos are set by the Communication Manager, and they are index variables for the clauses to be processed for output.

If 160034 is false, or after 160032, 160042 is next. 160042 calls Context Memory Selector 125 to categorize and store stated and implied elements and relations including found purpose, state change, and process information of Cur-Clause in 120. Selector 125 is described below. At this point, the current interpretation of the Cur-Clause input is at least tentatively accepted as correct. After 160042, 160044 is next and is true if Cur-Clause ends a sentence. If 160044 is true, delayed outputs are allowed, and 160046 determines if there is a delayed output which meets its output criteria. 160046 first evaluates the cancel criteria of all active entries in DELAY[CAN, X], where X is the number of an active entry. 160046 eliminates all entries with a satisfied cancel criteria, compresses the DELAY data structure for removed entries, and adjusts NEX which is an array variable of DELAY. 160046 also evaluates output criteria in active entries of DELAY[Out-Criteria, X]. Such output criteria are evaluated until the output criteria of an entry are satisfied, or until all active entries are evaluated. If the output criteria of a DELAY entry S are satisfied: 160046 initializes Star-Pos to the first available entry in OUTLIST and sets OUTLIST [Star-Pos to Nex-Pos] to DELAY[Err-Out, S] where Nex-Pos is the last entry containing a clause from DELAY[Err-Out, S]; Err-Node is set to DELAY[PUR, S]; Error-Source is set to DELAY[E-S, S]; E-A is set to DELAY[ACTION, S]; and 160046 removes the S entry from DELAY. After 160046, 160048 is next, and is true if the output criteria of a DELAY entry was satisfied at 160046. If 160048 is true, 160050 sets Error-Action to E-A. After 160050, 160038 stores a purpose entry prior to text output generation as described above. If 160048 or 160044 is false, there is no delayed output, and 160052 is next. 160052 is true if there is a response selected by Cur-App. If 160052 is true, 160054 stores a purpose entry at Context-Purpose-Set. This purpose entry contains the following values: Cur-Resp-Func, Cur-Resp-Pur-Address, Response-Object, the first output response clause, and RESPONSE-SEL. Cur-Resp-Func, Cur-Resp-Pur-Address, and Response-Object are defined at 140827 above. RESPONSE-SEL implies that this is a response output purpose entry. 160054 also sets Star-Pos to the next unused position in OUTLIST, and 160054 sets OUTLIST[Star-Pos to Nex-Pos] to Out-List[Init-Pos to Next-Pos]. Out-List[Init-Pos to Next-Pos] was processed at Purpose Identifier 140. After 160054, 160040 is next as described above. If 160052 is false, processing at the Communication Manager is completed, and 160056 sets processing to continue at Step 18.

CONTEXT MEMORY 120 and SELECTOR 125

The Context Memory Selector 125 is invoked after a clause has been understood in terms of stored experience and knowledge. The main functions of Selector 125 are: to process data from the SDS, to store selected information from the SDS into Context Memory 120, and to order certain portions of 120. The data stored in 120 has been described above. This section summarizes the data stored in 120 and describes the processing of 125 that was stated and implied.

The state representation of nouns in the current clause are updated after the current clause has been understood in terms of stored experience and knowledge. The possibly updated noun word sense number and relations to other nouns, adjectives, and clauses in the context are stored in Context Memory 120. The state representation of a noun in 120 contains its word sense number, contains its stated text name(s), contains its type of reference, contains the pointer (s) to the SDS location of the clause(s) which contains the stated text name, contains its set or implied property and state values with an associated pointer for each value to the state representation in 120 setting or implying its associated value, contains its categorized lists which it belongs to, and contains the relations between itself and other nouns and clauses in the conversation. The property and state values of a noun are set by adjectives or verbs, and these values are implied by sentence role requirements. The categorized lists are typically used for pronoun selection. A particular categorized list contains elements which can be the referent for a certain group of pronouns. For example, "it" can refer to a thing, and its categorized list would contain things that have been stated in the conversation.

The reference type of a noun is a component of its state representation in 120. A noun's reference type can have a value of specific known, specific unknown, or general. As stated above, a specific known noun has a stored word sense number in 90. The state representation of a specific known noun is stored in 120 as its word sense number. A specific known noun can have the same identification number, type number, and specificity number with differing experience numbers. The different experience numbers of such a specific known noun correspond to different experiences associated with the noun. A new experience number is generated when a new experience occurs for a specific known noun. For example, a person's noun with different experience numbers allows the stored experiences of this person to be recalled. Thus, the person can be described as the person was 5 years ago and described as the person is today for example. A specific known noun has a separate state representation for each of its different experience numbers which have been referenced in the conversation including newly generated experience numbers. State representations of a specific known noun with different experience numbers are grouped together in 120. A specific unknown noun has a single state representation in 120. The state representation of a specific unknown noun in 120 has a stored word sense number from 90 which best matches the set or implied property and state values of a given specific unknown noun. The state representation of a noun in 120 has pointers to set or implied state and property values. Those state and property values of a specific unknown noun which differ from those of its matching word sense number are marked as DIFFERING. The state representation of a general reference noun has a data structure in 120 which is similar to a specific unknown noun. However, a general reference can have multiple inconsistent versions. Each such version is similar to the data structure of a specific unknown noun. Each version has its own state representation in 120. State representations of a general reference noun with different version numbers are grouped together in 120.

Selector 60 updates the word sense number and reference type of a noun as described above for steps 60622 to 60662.

In summary, 60 can perform a variety of updates for a noun including: changing a specific unknown reference to a general reference, changing components of a word sense number, creating a new experience number for a specific known reference, and creating a new version number for a general reference. After the current clause has been understood in terms of stored experience and knowledge, 125 stores changes to a reference in 120 from the information stored in the SDS including changes in the type of reference for a noun, changes in the definition of a specific unknown noun, addition of a new experience number state representation to the group of specific known reference's with word sense numbers which are the same except for differing experience numbers, and the addition of a version number to a general reference noun state representation. When a specific unknown noun has its word sense specificity number changed, the list of set or implied states which differ from the stored value at the word sense number in 90 will change in general. In this case 125 changes the specificity number and updates the set or implied property and state values with a DIFFERING mark. 125 also stores all new relations of a noun which are contained in the current clause's data structure in the SDS. These relations include A, C, S, T, F, doer, receiver, and owner relations. These relations are stored with the associated state representation of a noun. Also, the doer, receiver, and owner lists are updated for these sentence roles. These sentence role lists are described in the next paragraph.

The stored relations of a noun's state representation in 120 include A, C, S, T and F relations. These relations are described above. Also, the stored relations of a state representation in 120 have pointers to the clause in 120 which contains them. These relations of a noun's state representation in 120 also include pointers to noun sentence role participants in clauses in 120. The state representation of a noun in 120 contains a pointer to a doer entry, a receiver entry, and a owner entry. However, if a state representation of a noun does not have a particular type of entry, its corresponding pointer is NULL. A doer entry is in a doer list. A doer entry contains a pointer to the state representation in 120 of the noun associated with the entry, and a doer entry contains pointers to the state representation of clauses in 120 which contain the entry's associated noun as a doer. A receiver entry is also in a receiver list. A receiver entry contains a pointer to its associated noun in 120, and contains pointers to the clauses in 120 containing the associated noun as a receiver. An owner entry is also in a owner list. An owner entry contains a pointer to its associated noun in 120, and contains pointers to the clauses in 120 which contain the associated noun as an owner. The doer, receiver, and owner lists are used in pronoun referent selection and purpose identification methods. The A, C, S, T, F, doer, receiver, and owner relations of a noun are stored with the associated noun's state representation in 120. The associated noun is the noun which is in the relation or is in the sentence role relation.

Note that no distinction is made between concrete and abstract nouns with respect to the processes of 125. A clausal abstract noun has a state representation in 120 which is very similar to the state representation of a concrete noun. A clausal abstract noun is stored as two related nouns each with its own state representation in 120. A clausal abstract noun has its own state representation which is the same as a concrete noun. A clausal abstract noun also has a representational referent relation pointer to its representational referent state representation in 120. The state representation in 120 of a representational referent has a pointer to its clausal abstract noun. In the case where the representational referent is one or more clauses, the first clause of the representational referent has a state representation which contains a pointer to its clausal abstract noun. The clausal abstract noun is processed by 125 as a noun, and its representational referent is processed by 125 according to its state representation type. A state abstract noun differs from a concrete noun as described above. However, the state representation of a state abstract noun in 120 is the same as the state representation of a concrete noun. The owner of a state abstract noun is a noun. The owner word sense number determines the referent type. A state abstract noun is processed by 125 as a noun.

There are state representations in 120 for state adjectives and adverbial subclasses. The state representation of a state adjective contains its adjective word sense number, contains the pointer to its owner's state representation in 120, contains pointers to the categorized lists which it belongs to, and contains all C-Relations of the state adjective. The state representation of an adverbial subclass in 120 contains the adverbial subclass and value, contains a pointer to its adverbial subclass data structure, contains the pointer to its modifiee's state representation in 120, contains pointers to the categorized lists which it belongs to; and contains all C-Relations of the adverbial subclass. C-Relations are comparison relations, and are described above. C-Relations that are stored with an adverbial subclass state representation or with a state adjective state representation have pointers to the clause which stated them.

The state representation of stated and implied clauses is also stored in 120. Stated or implied clauses have an associated verb word sense number or state adjective word sense number. Clauses which only imply relations between nouns (e.g., "John is a Boy Scout.") do not have a word sense number associated with them. However, such clauses are assigned a pseudo word sense number by 125 after the current clause has been understood in terms of stored experience and knowledge. The value of such a pseudo word sense number implies the relation between nouns which is contained in the clause. A verb implied relation between nouns typically occurs between a subject and subject complement (e.g., "John is a Boy Scout.") or between a subject and a prepositional phrase (e.g., "John is at home.") in English. The specific relation of such a clause with a pseudo word sense number is stored at the nouns in the specific relations.

The state representation of a clause contains the word sense number of the clause, contains a pointer to its SDS location(s), contains pointers to the state representation in 120 of the stated modifiers of the clause's verb, contains the clause's tense code, contains pointers to the categorized lists which it belongs to, contains the clause's time relation data structure which includes relations to other clauses in the conversation, contains a pointer to its process path data structure (if any), and contains a pointer to each location of the clause in a purpose path data structure of the conversation (if any). A clause's state representation has a pointer to more than one purpose path data structure if the clause is contained in more than one purpose path. The purpose and process path data structures are stored in 120.

Other lists are maintained by Selector 125 to aid in selecting a pronoun referent. Each list has a category number associated with it. Each category number has an associated set of states, properties, word sense number components, and other criteria, possibly application specific, corresponding to the category. The members of a list are selected by Selector 125 from the SDS after the current clause has been understood in terms of stored experience and knowledge. If a potential member is a new reference to the conversation, the potential member is processed to determine which category, or for some applications, which categories the potential member belongs to. Both stated and implied members can be selected for a list. A noun, adverbial subclass, state adjective word sense number, or clause from an SDS entry can be placed in a list in 120. Such an entity is placed in a list if its states, properties, word sense number components, and other criteria match the set of criteria associated with such a list's category number. The members in noun lists, in adverbial subclass lists, in state adjective word sense number lists, and in clause lists have pointers to their state representation in 120.

The processing of Selector 125 is now described. Selector 125 is invoked after the current clause has been understood in terms of stored experience and knowledge. Selector 125 stores a new state representation for new references to nouns, state adjectives, adverbial subclasses, and the current clause when these entities are new references. Nouns and clauses are determined to be new references at 60 and 140 respectively as is described above. A newly referenced state adjective word sense number requires a new state representation in 120 for the state adjective. A newly referenced combination of an adverbial subclass and its modifiee word sense number is a new reference for the adverbial subclass. However, certain new noun references are really just updates of existing state representations. The need for the updating of a noun reference is determined by checking if a specific unknown noun has its specificity number changed. In this case the previous state representation of such a specific unknown noun is updated by changing its specificity number and possibly changing the DIFFERING marker for certain set or implied property and state values as described above. Another possible update is determined by checking if a specific unknown noun has its reference type changed to a general reference type. In this case, the reference type of the stored state representation of such a specific unknown noun is changed to a general reference type, and this state representation is assigned a version number of zero. The new reference with inconsistent state values is processed as other new references. Except for these updating procedures of nouns, state representations for newly referenced entities are formed with the components described above for each type of entity's state representation including data structures which are specific to the type of entity.

The new reference detection process for a noun and a clause is not perfect in that it may mislabel a reference as a new reference. One possible mislabeling occurs when the current clause has a reformulatory or replacive purpose relation. This type of purpose relation is used to correctly restate a clause. If the current clause has a reformulatory or replacive purpose relation, the state representation in 120 of the clause which the current clause replaces, the replacee, has a pointer to the replacee's location in the current clause's reformulatory or replacive purpose path added to the replacee's purpose path component in 120. The purpose paths of the replace are marked with a REPLACED-BY-RESTATEMENT symbol. Also, a REPLACED-BY-RESTATEMENT symbol is added to the truth value component of the replacee's timing relation data structure in its state representation in 120. This changes to the replacee's 120 data effectively removes the replacee from the conversation. Note, other words can be modified by adverbials with a reformulatory or replacive semantic role. The function of an adverbial with a reformulatory or replacive semantic role sets the replacee word or phrase to have a replacee relation to the word modified by such an adverbial. This function also transfers the sentence role of the replacee to the word modified by the replacement of the replacee. Such functions are evaluated prior to the processing of the clause containing them by Selector 125, and hence have no purpose relation implications.

Another possible mislabeling occurs when the detection process assigns a new reference label to an old reference of a noun or clause. Thus, after a new state representation has been formed for a noun or clause, these new state representations which have not been updated are compared with previously stored state representations of the same type. If a new state representation of a noun matches the word sense number and type of reference of a previously stored noun state representation in 120, that noun is not a new reference. If a new noun reference has the same referent type, the same word sense number, but the reference has newly set or implied property or state values, and/or new relations to nouns or clauses in the context when compared to a previously stored noun's state representation, the new noun reference is a reference to the previously stored noun state representation. The newly set or implied property or state values and/or newly stated relations to nouns or other clauses in the context state new information about the old state representation relative to the context, but the new information is consistent with the word sense number in the old state representation. If an assumed new noun reference meets the above comparison criteria, the SDS location of the current clause, the newly set or implied property or state values, and the newly stated relations to nouns or other clauses in the context are added to the previously stored noun state representation which is used to meet the above comparison criteria, and such a new noun reference's state representation is eliminated. The comparison criteria for a new clause's state representation is: the same word sense number, the same tense code, the same time relation data structure except for relations to other clauses, and the same process path (if any). If an assumed newly referenced clause meets these criteria with a previously stored clause state representation in 120, the following information is added to that previously stored clause state representation: a pointer to the current clause's SDS location, newly stated modifiers of the clause's verb, and new pointers to purpose path data structures (if any).

After the new references have been processed, each noun, state adjective, adverbial subclass and the current clause which are not newly referenced have their state representation updated in 120. Nouns which are not newly referenced has a stated text name added to its text name component of its state representation in 120 if the text name is new, and has a pointer to the SDS location of the current clause added to its text name component of its state representation in 120. Nouns which are not newly referenced, but have new property or state values of such a noun implied or set in the current clause, have these new property or state values with an associated pointer to the state representation in 120 stating or implying the new value added to such a noun's set or implied property or state values component of such a noun's state representation in 120. Nouns which are not newly referenced, but have newly stated modifiers which are in relations with such a noun, have these relations and a pointer to the current clause's state representation added to such a noun's relations component of such a noun's state representation in 120. State adjectives in the current clause which are not newly referenced, but have a previously unstated C-relation in the current clause, have these C-relations and a pointer to the current clause's state representation added to such a state adjective's C-relations component of its state representation in 120. Also, adverbial subclasses in the current clause which are not newly referenced, but have a previously unstated C-relation in the current clause, have these C-relations and a pointer to the current clause's state representation added to such an adverbial subclass's C-relations component of its state representation in 120.

A clause which is not newly referenced is also updated. Such a clause has a pointer to the SDS location of the current clause added to such a clause's SDS pointer component of its state representation in 120. Also, such a clause which has newly stated modifiers of its clause verb, have these modifiers added to such a clause's stated modifiers of the clause verb component of such a clause's state representation in 120. If such a clause belongs to a newly established purpose path, a pointer to the location of the clause in newly established purpose path data structure of the conversation is added to the purpose path component of such a clause's state representation in 120. Finally, a pointer to the text location of the current clause is added to the SDS position of the current clause.

New state representations are also processed for membership in categorized lists. Each new state representation is processed to determine which category, or in some cases categories, the new state representation belongs to by checking if the new state representation matches the category criteria. If a new state representation matches the category criteria of a list, that new state representation is placed in that list. Also, the element's state representation is stored in each list which the element belongs to. All of the categorized lists described in this paragraph are possible pronoun referents. The order of the elements in these lists are selected by 125 with a most recently referenced first order policy. This policy allows the most likely referent of a pronoun to be considered first. Each state representation in 120 contained in the current clause has its associated categorized list reordered according to a most recently referenced first order policy.

After the categorized lists are processed for ordering, any application specific Context Memory 120 processes are invoked. For example, a specific application can have its own categorized lists. The 125 process utilizes generalized processing of the categorized lists. A categorized list is defined by its categorizing criteria, the general membership selection process which determines if an entity matches a list's categorizing criteria, and its general most recently referenced first order policy. Thus, an application can add a new categorized list by specifying categorizing criteria and utilizing the general membership selection process and general order policy. Another application specific process example is a process to archive the contents of Context Memory 120. Another application specific process example is to segment the categorized lists such that only the N most recently list members are stored in readily accessible memory and the remaining list members are stored in a less readily accessible memory. After all application specific processes have been completed, 125 returns processing control to the calling process.

The processing of Selector 125 is now summarized. 125 stores clause constituents in 120, store clauses and relations to other clauses, updates noun references, creates data structures for new references, processes replaced or reformulated clauses, checks for mislabeled new references and corrects them, updates old references, adds new references to category lists, and invokes application specific processes related to context memory processing. This completes the description of Context Memory 120 and Selector 125.

TEXT GENERATION STEP 200

Text Generation Step 200 processes a set of clauses in the format described for Purpose Identifier 140 into text sentences. The format of clauses was described for steps 140827 to 140858. Text Generation Step 200 performs the following processes for the formatted set of clauses selected for output: select formatted clauses and their form for combination into sentences; process state representations into morphological text words; select elliptical realizations for phrases and clauses; generate unlimited complexity noun phrases; generate verb phrases; and generate adjective phrases. Unlimited complexity for noun phrases has a specific sense. Although noun phrases are theoretically unlimited in complexity with respect to grammar in English, their actual complexity is limited by the complexity of the noun being described in a text realization. Note that verb phrases and adjective phrases are more limited in complexity compared to noun phrases because of English grammar. However, 200 can generate any level of complexity which is possible in English for adjective and verb phrases. 200 is designed for English. However, other natural languages utilize the same processes of 200, but such processes are specialized to the grammar of a particular natural language as 200 is specialized for English grammar.

200 utilizes classifying purposes for a variety of processes including: sentence formation and ellipsis processing. The advantage of utilizing classifying purposes is that these purposes allow the classification to be described and updated with natural language. However, other classification methods can be utilized.

Sentence Formation Processing

The Sentence Formation Process of 200 utilizes the Next-Out data structure of clauses, a calling parameter, to select the form and combination of clauses which comprise a generated sentence. A particular clause can have an owning relation to another clause. This other clause has an owned relation to the owning clause. The owning clause is at a higher level than the owned clause. For example, an owning clause can be a main clause, and the owned clause can be a subordinate clause. Note that a subordinate clause can have an owning relation to another subordinate clause for example. In this discussion, a clause can have any realization including main, subordinate, pronoun, or morphological word@, i.e., a morphological word which implies a clause. The clause selection policy is to process the next clause with an owning relation. A sentence form must be found for an owning clause and its first owned clause, or a failure occurs because a possible sentence was not found and because there is no other way of expressing the first owned clause. Every possible way of expressing an owned clause including as a coordinated or separate main clause in some cases is tried before a failure is detected. After a sentence containing the first owned clause or a separate sentence is formed, additional owned clauses of the owning clause are processed for inclusion in its sentence. If an additional owned clause can not be included in this sentence, such a clause will be processed for inclusion in an additional sentence. The sentence formation process starts at 20000.

20000 sets up parameters for the sentence formation process. 20000 sets Cur-Pos to Sta-Pos, and End-Pos is set to Nex-Pos. Cur-Pos and End-Pos are the current position and the last position of Next-Out. Sta-Pos and Nex-Pos are calling parameters. 20000 sets Next-S to 1 and S-Cla-No to 0. These variables are described below. 20000 sets Owning-Pro-V[Cur-Pos to End-Pos] to −1; each position of Owning-Pro-V which corresponds to a clause with an owning relation is set to 0; Owned-Pro-V[Cur-Pos to End-Pos] is set to −1;

each position of Owned-Pro-V which corresponds to a clause with an owned relation is set to 0. Owning-Pro-V and Owned-Pro-V contain 0's at positions which have unprocessed clauses. Finally 20000 sets Cur-O-Clause to Next-Out [CLAUSE, Cur-Pos]. After 20000, 20002 is next and is true if Cur-App[Sep-Out-Proc] is true. 20002 is true if Cur-App has its own process for sentence formation. If 20002 is true, 20004 sets 200-Return to 20020, and calls Cur-App[Out-Proc, 200-Return]. If 20002 is false, 20006 is next, and is true if Cur-O-Clause has an unprocessed owned relation. If 20006 is true, 20008 sets M-Clause to the clause owning Cur-O-Clause; Cur-M-Pos is set to M-Clause's Next-Out position; SUBCLAUSE is set to true; and Cur-O-Sub is set to true. If 20006 is false, 20010 is next, and is true if Cur-O-Clause has an unprocessed owning relation. If 20010 is true, 20012 sets SUBCLAUSE to true. If 20010 is false, 20014 sets SUBCLAUSE to false. After 20012 or 20014, 20016 sets M-Clause to Cur-O-Clause; Cur-M-Pos is set to Cur-Pos; and Cus-O-Sub is set to false.

After 20008 or 20016, 20018 sets parameters for selecting the form of M-Clause with a classifying purpose. This classifying purpose determines the M-Clause realization taking into account its previous text expressions, and its unexpressed owning relations in Next-Out. All realizations of M-Clause are possible. 20018 sets Tense-Code to Next-Out[TENSE-CODE, Cur-M-Pos]; N is set to M-Clause-Parse-Add[Tense-Code, 0], a data structure of clause realization addresses in 30 which is organized by tense code. Clause-Set is set to M-Clause-Parse-Add[Tense-Code, 1 to N]; Pref-Vec is set to 0; C-Parm-C[SUBCL] is set to SUBCLAUSE; C-Parm-C[APP] is set to Cur-App; C-Parm-C[Full-Ex] is set to the number of clauses since a main clause or subordinate clause expression of M-Clause or −1 if M-Clause has not been expressed before in this conversation; C-Parm-C[Pro-Ex] is set to the number of clauses since a pronoun expression of M-Clause or −1; C-Parm-C [Morph-Ex] is set to the number of clauses since a morphological expression of M-Clause or −1; C-Parm-C[M-Cla] is set to Cur-M-Pos; RETURN is set to 20020; RS is set to false; CLASS is set to MC-Exp-Pref; and 20018 calls 140[CLASSIFY, CLASS, RS, Clause-Set, RETURN]. The parameters set in 20018 are used in the classification process. After the realization form of M-Clause is selected, Pref-Vec contains ones at positions of M-Clause-Parse-Add for the selected form(s), and 20020 is next. 20020 sets Cur-Form to the first selected position in Pref-Vec; Cur-M-Cla-Add is set to M-Clause-Parse-Add[Tense-Code, Cur-Form]; A-S-C-Vec is set to zero and SDSO[Next-S, A-S-C-Vec, Pur] is set to zero for all positions of A-S-C-Vec. A-S-C-Vec contains positions where subordinate clauses can be realized in a main clause. SDSO[Next-S, A-S-C-Vec, Pur] contains the purpose relations of subordinate clauses which have been selected for Next-S, the current sentence being formed.

After 20020, 20022 is next and is true if SUBCLAUSE is true. If 20022 is false, only a main clause is to be realized, and processing continues at 20068 which completes sentence form processing, and which is described below. If 20022 is true, 20026 is next, and is true if Cus-O-Sub is true. If 20026 is true, 20028 sets Cur-S-Clause to Cur-O-Clause. If 20026 is false, 20030 sets Cur-S-Clause to the next unprocessed owned clause of M-Clause. After 20028 or 20030, 20032 sets Cur-S-Pos to Cur-S-Clause's position in Next-Out, and S-Tense-Code is set to Next-Out[T-Code, Cur-S-Pos]. After 20032, 20034 sets M to Cur-M-Cla-Add [S-Tense-Code, 0]. After 20034, 20036 is next, and is true if M is greater than 0. If 20036 is true, processing continues at 20050 which is described below. If 20036 is false, 20040 is next, and is true if Pref-Vec has an untried value. If 20040 is true, 20042 sets Cur-Form to the next untried position in Pref-Vec; Cur-M-Cla-Add is set to M-Clause-Parse-Add [Tense-Code, Cur-Form]. After 20042, 20034 is repeated as described above. If 20040 is false, 20044 is next, and is true if S-Cla-No equals 0. If 20044 is true, M-Clause has an unrealizable owning relation with Cur-S-Clause, and 20046 informs the Communication Manager of a subordinate clause expression failure. If 20044 is false, all possible subordinate clauses of M-Clause have their expression form selected for M-Clause's form, and processing continues at 20068 as described above.

If there are possible realization forms for Cur-S-Clause, 20036 is true, and processing continues at 20050. 20050 sets up parameters for a classifying purpose to select Cur-S-Clause's realization form and position. This classifying purpose determines the Cur-S-Clause realization taking into account its previous text expressions, the number of subordinate clauses, and their purpose relations in the Next-S sentence. 20050 sets S-Clause-Set to Cur-M-Cla-Add[S-Tense-Code, 1 to M]; Pref-S-Form and Pref-S-Pos are set to 0; C-Parm-S[A-Pos] is set to A-S-C-Vec; C-Parm-S[APP] is set to Cur-App; C-Parm-S [Purpose] is set to Next-Out [Pur-Rel, Cur-S-Pos]; C-Parm-S[S-Clause-No] is set to S-Cla-No; C-Parm-S[Selected-Sub-Pur-Set] is set to SDSO [Next-S, A-S-C-Vec, Pur]; C-Parm-S [Full-Ex] is set to the number of clauses since a main clause or subordinate clause expression of Cur-S-Clause has been made or −1; C-Parm-S[Pro-Ex] is set to the number of clauses since a pronoun expression of Cur-S-Clause or −1; C-Parm-S[Morph-Ex] is set to the number of clauses since a morphological expression of Cur-S-Clause or −1; C-Parm-S[SUBCL] is set to Cur-S-Pos; RETURN is set to 20052; RS is set to false; CLASS is set to SC-Exp-Pref; and 20050 calls 140 [CLASSIFY, CLASS, RS, S-Clause-Set, RETURN]. After the realization form of Cur-S-Clause is selected, Pref-S-Form contains the selected form if any, Pref-S-Pos contains the selected position, and 20052 is next. 20052 is true if Pref-S-Form is 0 which occurs if no realization form is selected. If 20052 is false, 20054 sets Cur-S-Add to Cur-M-Cla-Add[S-Tense-Code, Pref-S-Form]; S-Cla-Pos is set to Cur-M-Cla-Add[S-Tense-Code, Pref-S-Pos]; Pref-Imp-V is set to Cur-S-Add[IMP]; Pref-Imp-V is appended to SDSO [Next-S, S-Cla-Pos, Pref-Imp]; Cur-S-Add is appended to SDSO[Next-S, S-Cla-Pos, ADD]; Cur-S-Pos is appended to SDSO[Next-S, S-Cla-Pos, N-O-Pos]; Wwned-Pro-V[Cur-S-Pos] is set to 1; SDSO[Next-S, S-Cla-Pos, PUR] is set to C-Parm-S[Purpose]; A-S-C-Vec[S-Cla-Pos] is set to 1; and S-Cla-No is incremented by 1. Cur-S-Add[IMP] is a segmented vector of implementation information related to each sentence role in its clause. Implementation information includes, punctuation, conjunctions, and morphological information for example. The various quantities are appended to the SDSO data structure because a clause position can have more than one clause stored there. Note that a "subordinate clause" form as selected by the classification purpose could actually select a coordinated main clause or a separate main clause.

If a realization form was not selected for Cur-S-Clause, 20052 is false, and 20056 is next. 20056 is true if S-Cla-No is 0. If 20056 is true, processing continues at 20040 as described above. If 20056 is false, 20060 is next, and is true if M-Clause has an owning relation which is unprocessed, and which is untried during this sentence form processing invocation. If 20060 is true, 20062 sets Cur-S-Pos to the next untried, unprocessed owned clause of M-Clause, Pref-Vec is set to have all its values as tried, and 20062 sets processing to continue at 20032 which is described above. If 20060 is false, 20064 is next, and is true if M-Clause has an unprocessed owning relation. If 20064 is false, 20066 sets Owning-Pro-V[Cur-M-Pos] to 1. After 20066, or if 20064 is false, 20068 sets SDSO[Next-S, M-Clause, ADD] to Cur-M-Cla-Add; SDSO[Next-S, M-Clause, N-O-Pos] is set to Cur-M-Pos; SDSO[Next-S, M-Clause, Pref-Imp] is set to Cur-M-Cla-Add[IMP]; A-S-C-Vec[M-Clause] is set to 1; COORD, which is true if the current clause is coordinated, is set by default to false; and processing is set to continue at 20070. This completes the description of the sentence formation process of Step 200.

Sentence Role Preprocessing

Sentence role preprocessing sets parameters, selects processing which is necessary for a sentence role, and begins at 20070. 20070 sets SDSO-Pos to the next "1" position in A-S-C-Vec; IC is set to true which implies that the first position of the clause requires a check for containing a clausal conjunction which will be processed below; Cur-I-V is set to the first address at SDSO[Next-S, SDSO-Pos, Pref-Imp]; Cur-Cla-Add is set to the first address at SDSO [Next-S, SDSO-Pos, ADD]; Nex-O-Pos is set to the first address at SDSO[Next-S, SDSO-Pos, N-O-Pos]; these first addresses are removed from SDSO[Next-S, SDSO-Pos, (Pref-Imp, ADD, and N-O-Pos)]; and SDS[Current], the location of the current sentence being generated for output, is set to the next entry. After 20070, 20072 is next, and is true if Cur-Cla-Add is a morphologically realized clause, i.e., a morphological word@. If 20072 is true, Cur-Imp-V is set to Cur-I-V; Morph-Cla, a parameter of morphological processing, is set to true; and Cur-S-R is set to the sentence role of Cur-Cla-Add. After 20074, 20080 sets Spec-Morph-Word to true which indicates that the morphological function is specified. After 20080, 20086 sets Morph-Call to false which implies that this is not a process call; Fail-Return is set to false which indicates that there is no alternative to morphological processing; In-Call is set to false which indicates that the sentence role is not being processed under a process call; and 20086 sets processing to continue 200100 which performs morphological processing and is described below.

If 20072 is false, 20076 sets up parameters for processing a sentence role at the clause associated with Cur-Cla-Add. 20076 sets Cur-S-R-Add to the address of the next unprocessed sentence role at Cur-Cla-Add in 30; Morph-Cla is set to false; In-Call is set to false; Cur-S-R-Head is set to address of the grammar information associated with the head of the sentence role phrase at Cur-S-R-Add; Cur-S-R is set to the sentence role; Cur-Source is set to the first entry at Next-Out[Cur-S-R, Nex-O-Pos] because there may be more than one entry at Next-Out when there are multiple heads for a sentence role; Cur-Imp-V is set to Cur-I-V[Cur-Source]; Cur-Source-Head is set to the head, its modifiers, and any function word application vector which contains ones at the function word application associated with the head. The function word application vector is used to ensure that a phrase syntactically allows the function word applications. The function word applications are converted into wordsets and text for output. After 20076, 20078 is next, and is true if Cur-Source has a morphological implementation vector. 20078 is true when the sentence role has a specified morphological realization. If 20078 is true, 20079 appends the morphological implementation vector to Cur-Imp-V. After 20079, 20080 is next as described above. If 20078 is false, 20081 sets Base-Word-Set and M-BW-Set to zero. Base-Word-Set and M-BW-Set are described below. 20082 is next, and is true if the Cur-S-R-Head type, i.e., the part of speech, equals the Cur-Source-Head type. If 20082 is false, Cur-S-R-Head requires standard, i.e., unspecified, morphological processing, and 20084 sets Spec-Morph-Word to be false. After 20084, 20086 is next as described above.

If 20082 is true, 20088 is next, and is true if Cur-Source is in 120. If 20088 is true, 20089 sets up parameters for ellipsis processing which starts at 200200. 20089 and ellipsis processing is described below. If 20088 is false, 20090 is next, and is true if the Cur-S-R-Head type is a noun. If 20090 is true, 20091 is next, and is true if In-Call is true. If 20091 is true, the parameters for noun processing have been set by the calling process, and noun processing starts at 200300. If 20092 is false, 20093 sets up parameters for noun processing and sets processing to continue at 200300. 20093 and noun processing is described in the Noun Generation section. If 20090 is false, 20094 is next, and is true if the Cur-S-R-Head type is a verb. If 20094 true, 20095 sets In-Call and A-Call to false; and sets verb processing to start at 200800. The verb processing section is described below. If 20094 is false, Cur-S-R-Head is an adjective, and 20096 sets In-Call to false; and sets adjective processing to start at 200940. The adjective processing section is described below. This completes the description of the Sentence Role Preprocessing section.

Morphological Processing

Morphological Processing for output is performed for specified morphological realizations and standard realizations. Specified realizations utilize specified affixes to realize the morphological word. Standard realizations utilize the sentence role, the source part of speech, and the destination part of speech to select affixes. Specialized realizations are utilized to convey a particular morphological meaning. Standard realizations only have a single morphological meaning or a single set of realization affixes. A morphological meaning is equivalent to the phrase or phrases which are replaced by the morphological realization. For example, "quietly" has a morphological meaning of "with a quiet process". Standard realization noun modifiers can be in between specified and standard in that a noun modifier can have a modifying relation which implies a morphological realization. However, a specified realization has its modifiers specified. Morphological processing for output begins at 200100.

200100 is true if Spec-Morph-W is true. If 200100 is true, 200101 sets T-I-V to be Cur-Imp-V. After 200101, 200102 sets Func-Type, the morphological realization function, to Cur-Imp-V[Fun-Type]; SOURCE, the source part of speech, is set to Cur-Imp-V[SOURC]; DESTINATION is set to Cur-Imp-V[DEST]; Cur-S-R is set to Cur-Imp-V[S-Role-Func]; Morph-W-S is set to Cur-Imp-V[Morph-Word-S]; and B-Word-Set is set to Cur-Imp-V[B-Word-S]. If 200100 is false, 200104 sets SOURCE to the Cur-Source-Head type; DESTINATION is set to Cur-S-R-Head type; Func-Type is set to Imp-Morph-F-T[Cur-Nat-Lang, SOURCE, DESTINATION]; T-I-V is set to Cur-Imp-V and Morph-W-S is set to the word sense number of Cur-Source-Head. Imp-Morph-F-T is a data structure of function types associated with a source and destination for a natural language. After 200104, 200106 sets B-Word-Set to the set of text base words of Morph-W-S in 20. After 200106, 200108 is next, and is true if Morph-W-S is in 120. If 200108 is true, 200110 reorders the B-Word-Set members so that the 120 usages are ordered in the most recent first order. After 200110, or if 200108 is false, 200112 is next. 200112 removes base words from B-Word-Set which have a no usage anomaly for Func-Type. Base words which have a substitute anomaly for Func-Type are replaced so that the proper form of the base word can be utilized. After 200112, 200114 is next, and is true if B-Word-Set is empty. If 200114 is true, 200116 is next, and is true if Fail-Return is true. If 200116 is true, 200118 sets FAIL to true, and returns processing control to the caller. If 200116 is false, 200120 informs the Communication Manager of a standard morphological function selection failure.

After 200102, or if 200114 is false, 200130 sets Affix-Code to Morph-Out[Cur-Nat-Lang, SOURCE, DESTINATION, Func-Type], and 200130 sets Base-Word-Set to the base words in B-Word-Set plus the affix text set associated with Affix-Code for base words which have the associated affix text set. After 200130, 200132 is next, and is true if Spec-Morph-W is true, and Cur-Imp-V[MOD] is non-zero. If 200132 is true, the morphological word has a morphological modifier, and 200134 sets Cur-Imp-V to Cur-Imp-V[MOD]. After 200134, 200102 is repeated for the morphological modifier. If 200132 is false, 200133 sets Cur-Imp-V to be T-I-V. After 200133, 200136 is next, and is true if Spec-Morph-W is false. If 200136 is true, 200138 is next, and is true if Morph-Mod[Func-Type, COND, 0] is greater than 0. If 200138 is true, the standard realization morphological word can possibly have implied modifiers, and 200140 is next. 200140 sets Fun-No to Morph-Mod [Func-Type, COND, 0], the possible number of modifiers, and Cur-Fun-No is set to 1. After 200140, 200142 is next, and is true if Cur-Fun-No is less than or equal to Fun-No. If 200142 is true, 200144 sets M-Cond to be Morph-Mod [Func-Type, COND, Cur-Fun-No]. After 200144, 200146 is next, and is true if M-Cond evaluates to true. If 200146 is true, 200148 sets Cur-Source-Head to contain text words and wordsets of the modifier(s) from the values at or the result from Morph-Mod[Func-Type, MODIFIER/TEXT-WORD/WORDSET, Cur-Fun-No]. For example, a morphologically formed adverb may require a degree adverb such as "very". 200148 stores data which is similar to the data stored at 200130. After 200148, or if 200146 is false, 200150 increments Cur-Fun-No by 1. After 200150, 200142 is next as described above.

If 200142 is false, if 200138 is false, or if 200136 is false, 200160 is next, and is true if Morph-Call is true. If 200160 is true, 200162 sets Morph-Call to false, FAIL is set to false, and 200162 sets processing to continue at the caller. If 200160 is false, 200164 is next, and is true if Morph-Cla is true. If 200164 is true, a clause has been processed, and processing continues at 200700 which completes text generation, selects the next entity to be processed, and is described below. If 200164 is false, a sentence role has been processed, and processing continues at 20088 which is described above. This completes morphological output processing.

Ellipsis and Pronoun Processing

Ellipsis and pronoun output processing utilizes a classifying purpose to determine when to apply ellipsis to generated text for previously stated text entities. This classifying purpose also determines when to utilize a pronoun in place of a previously stated output, or to utilize a pronoun in clause realizations which require a cataphoric pronoun. Ellipsis of sentence role constituents, sentence roles, and sentences is under the control of the calling process. The classifying process considers the distance to the last reference of the entity and the uniqueness of the entity being classified for ellipsis or pronoun replacement for an entity being processed. The classifying purpose also considers ellipsis available in 30 for clauses and sentences. The decision to utilize ellipsis or pronoun replacement is also dependent upon the current application. The usage of ellipsis and pronouns must be balanced between verbosity and ambiguity for the purposes of an application. Each type of ellipsis is graded as to its combined static and dynamic ambiguity level. Static ambiguity is assigned to a class of ellipsis and pronoun replacement. Dynamic ambiguity is determined from the context. An application sets a level of tolerable ambiguity. If the ellipsis or pronoun replacement is less than the application's ambiguity level, the ellipsis or pronoun replacement is performed. Ellipsis processing is invoked from sentence role preprocessing and is invoked after the text has been generated. Sentence role preprocessing invocation is described now. Both invocation sources set similar parameters. Only sentence role preprocessing invocation is described in this section. Ellipsis after text has been generated is described below.

If Cur-Source is stored in 120 at 20088, 20089 sets up parameters for ellipsis processing. 20089 sets Ellip-Call, Coord-Check, Sentence-Check, and Mod-Check to false; and processing is set to continue at 200200. The -Check variables select the type of entity to be considered for processing. Ellip-Call determines the return location after processing. 200200 sets C-Parm-E/P[Object-V, 1 to 5] to false. This classifying parameter has a single true position which determines the type of ellipsis and pronoun processing to be performed. This true position is set in the following processing starting at 200202. 200202 is true if Coord-Check is true and Sentence-Check is true. If 200202 is true, 200204 sets C-Parm-E/P[Object-V, Coord-Sentence] to true, and sets E/P-Obj to the text in SDS[Current]. If 200202 is false, 200206 is next, and is true if Coord-Check is true. If 200206 is true, 200208 sets C-Parm-E/P[Object-V, Coord-Phrase] to true, and sets E/P-Obj to the text in Cur-S-R. If 200206 is false, 200210 is next, and is true if Sentence-Check is true. If 200210 is true, 200212 sets C-Parm-E/P [Object-V, Sentence] to true, and sets E/P-Obj to the text in SDS[Current]. If 200210 is false, 200214 is next, and is true if Mod-Check is true. If 200214 is true, 200216 sets C-Parm-E/P[Object-V, Modifier] to true, and sets E/P-Obj to Mod-Check, a calling parameter. If 200214 is false, 200218 sets C-Parm-E/P[Object-V, Phrase] to true; Cur-S-R[TEXT, text range] is set to the text range of text at the 120 location in Cur-Source; and sets E/P-Obj to Cur-S-R[TEXT, text range]. After 200216 or 200218, 200220 sets classifying parameters for sentence role reoccurrence distances. These parameters are used to determine which elements in a phrase can be selected for ellipsis or pronoun replacement. These parameters are not used for other types of ellipsis since they have been considered for clauses at sentence formation, and these parameters do not apply to coordinated phrase ellipsis. 200220 sets C-Parm-E/P[Full-Ex] to the number of phrases since the full expression of E/P-Obj or −1 if E/P-Obj has not been referenced before. C-Parm-E/P[Pro-Ex] is set to the number of phrases since a pronoun expression of E/P-Obj or −1 if E/P-Obj has not been expressed as a pronoun before.

After 200204, 200208, 200212, or 200220, the parameters for the ellipsis and pronoun classifying purpose have been set for entities, and 200222 is next. 200222 sets common parameters for the ellipsis and pronoun classifying purpose. 200222 sets C-Parm-E/P[APP] to Cur-App; Ellip-Out-Pos-V, which will contain the positions of all entities to be removed, if any, after ellipsis classification, is set to 0; Ellip-Trans-Pos-M, a matrix of positions to transfer text to and associated sources of the text to be transferred, is set to 0; Pro-Ex-Pos-V, a vector of positions to be replaced by pronouns, is set to 0; RETURN is set to 200230, RS is set to false; CLASS is set to ELLIP/PRO-Ex-Suitability; and 200222 calls 140[CLASSIFY, CLASS, RS, E/P-Obj, RETURN]. After ellipsis and pronoun replacement has been selected by the classifying purpose, 200230 is next, and is true if Ellip-Out-Pos-V equals 0. If 200230 is false, some text has been selected for ellipsis, and 200232 removes the text from E/P-Obj that has a position in Ellip-Out-Pos-V. After 200232, or if 200230 is false, 200234 is next, and is true if Ellip-Trans-Pos-M equals 0. If 200234 is false, 200236 transfers text from the source component to the associated position component in E/P-Obj for each non-zero source and position pair. After 200236, or if 200234 is false, 200240 is next, and is true if Pro-Ex-Pos-V equals 0. If 200240 is false, 200242 performs the following process for each non-zero position in Pro-Ex-Pos-V: Pro-Ex is set to the pronoun text selected by Pro-Select[sentence role of the current position]; and stores Pro-Ex at the sentence role position of E/P-Obj of the current non-zero position of Pro-Ex-Pos-V. After 200242, or if 200240 is false, 200250 is next, and is true if Ellip-Call is true. 200250 is true if this process was called. If 200250 is true, 200252 returns processing control to the caller. If 200250 is false, processing continues at 200704 which performs final processing upon Cur-S-R. 200704 is described below. This completes description of ellipsis and pronoun output processing.

Noun Phrase Text Generation Processing

Noun Phrase Text Generation Processing is complicated by the modifiers of a noun phrase head in several ways. The modifiers of a noun phrase can theoretically have any number of levels of their own modifiers. A modifier level is composed of the modifiee and its direct modifiers. However, in written or verbal communication, English noun phrases usually do not exceed three levels of modifiers. An example of three levels of modifiers in a noun phrase in English is the subject of this sentence. "levels" modifies "example"; "three" "modifiers", and "phrase" modify "level"; and "noun" and "English" modify "phrase". Another complication related to modifiers is that certain modifiers can only be expressed as prepositional phrases, e.g., "the back of the house", not the "house's back". Others can only be expressed as premodifiers, e.g., "Tom's car", not the "car of Tom". A further complication is that these modification types are dependent upon the actual wordsets, e.g. "Tom's back", not "the back of Tom"; "the back of the car", not the car's back; but "the rear end of the car", and "the car's rear end". The three level example has a modifier which can only be expressed as a prepositional phrase, namely "phrase" modifying "level". Thus, this rephrasing of the example is not acceptable English: "an English noun phrase three level modifier example". When a modifier at level N requires a prepositional phrase realization, all modifier levels less than N have to be expressed as prepositional phrases. A further complication arises if a modifier at a level less than N can not be expressed as a prepositional phrase. In this case, the noun phrase has to be expressed in separate phrases because a prepositional phrase only rarely can precede a noun phrase head. For example, if "back" is modified by "Tom" in a possessive relationship, and if "Tom" is modified by "Chicago" in a position relation, this noun phrase must be expressed as separate noun phrases because the possessive relation must be expressed as a premodifier, and because the position relation must not be expressed as a premodifier. Thus, this example noun phrase can properly be expressed as: "Tom's back, the Tom from Chicago, . . . ", not "the Chicago Tom's back", not "Tom's of Chicago back", and not "Tom's back of Chicago". In this example, the position relation to "Tom" could be required because there are two "Toms" in the conversation, and the position relation is a unique relation for the "Tom" in the example. Generating a unique reference is an option for noun phrase output generation. Finally, another possible cause for generating separate noun phrases is that two or more modifiers can not co-occur in the same noun phrase.

The Noun Phrase Text Generation Process has several subprocesses: A typing modifier of the head and/or a uniqueness setting modifier are selected as needed for the noun phrase head or modifier. A typing modifier sets a type number component of its modifiee's word sense number. In another subprocess, a data structure comprised of modifiees and their direct modifiers is formed. A set of base words with inflections and affixes as needed and wordsets with associated inflection and affix codes are selected for the head and for each modifier such that each modifiee and modifier has at least one wordset and associated base word which are grammatically correct with respect to text output. Also, the wordsets with inflection and/or affix codes as needed and base words with inflection and/or affix codes as needed of the head are compatible with the sentence role of the head in its clause. As illustrated an above example, utilizing wordsets allows the generation of noun phrases with the proper syntax. Other parsers do not take into account the co-occurrence restrictions of words realized with wordsets. The wordsets utilized for output generation are stored in syntax parse trees 30 and are also utilized for input parsing. Wordsets, and their utilization for both input parsing and text output generation are some of the features which differentiate the parser of this description from other parsers.

After the data structure, and the compatible wordsets with needed inflection and/or affix codes and their associated base words with needed affix codes have been selected for a given noun phrase if possible, compatible combinations of premodifiers and prepositional phrases are selected if possible. If compatible wordsets can not be selected, their associated modifiers and their data structure are stored for later separate phrase generation. Incompatible wordsets occur when the wordsets of two of more modifiers can not co-occur in the same noun phrase as described above. If compatible premodifiers and prepositional phrases can not be selected, their associated modifiers and their data structure are stored for later separate phrase generation. Incompatible premodifiers and prepositional phrases occur when one modifier requires a prepositional phrase realization and a modifiee at lower level requires a premodifier realization as described above. The text associated with compatible premodifiers and prepositional phrases including all function words are placed together in proper order, and this completes generation of a noun phrase without separate noun phrases. The form of all separated noun phrases is selected by a classifying purpose for subsequent noun phrase generation.

Noun phrase output processing is started from sentence role preprocessing, and this path is described in this section. Noun phrase output processing is also called for adverbial and adjectival prepositional object noun phrase generation. These calls are described below. If Cur-S-R-Head type is a noun at 20090 and In-Call is false at 20091, 20093 sets up parameters for noun phrase output generation. 20093 sets U-Mod-C to Cur-App[U-M]; Init-Head, and Back-Track are set to true; and Fail-Return, Fail-C, M-Word and Alt-Real are set to false. These parameters are described below. 20093 sets Entry-No, the matrix entry number dimension variable, to 0; MOD, the direct modifier number in an entry number of the matrix, is set to 1. N-Mod, the number of direct modifiers for an entry number in the matrix, is set to 0; the matrix, Cur-S-R[MODIFIER, Entry-No, MOD] is set to Cur-Source-Head's word sense number; Cur-S-R

[RELATION, Entry-No, MOD] is set to the Cur-Source's sentence role; Sep-Mod, a variable related to separated noun phrases, is set to 0; and 20093 sets processing to continue at 200300.

Noun Phrase Head Processing

The subprocess at 200300 selects uniqueness and type setting modifiers, and stores the direct modifiers of the noun phrase in the Cur-S-R matrix. 200300 is true if Cur-Source has a text realization from 120 or morphological processing. If 200300 is true, 200302 sets DMAX to the number of modifiers of the most recent reference of Cur-Source; Cur-S-R[TEXT, −DMAX to 0] is set to the most recent reference of Cur-Source; and 200302 sets processing to continue at 200700 which performs final sentence role processing and is described below. If 200300 is false, 200304 is next, and is true if Cur-App[Noun-EX] is true. If 200304 is true, 200306 sets 200-RETURN to 200700, calls Cur-App[Noun-Ex-Proc, Cur-Source-Head, 200-Return] which generates a noun phrase with a Cur-App process. If 200304 is false, 200308 is next, and is true if Cur-Source is unique in 120 for its word sense number and its assigned modifiers. If 200308 is false, 200310 is next, and is true if Cur-Source-Head is a general reference or if U-Mod-C, a Cur-App parameter which is true if the generation of unique references is selected, is false. If 200310 is false, 200312 selects an untried uniqueness setting modifier which sets a unique state or property value or sets a unique relation relative to the word sense numbers in 120 with the same identification number and type number as Cur-Source-Head's word sense number. Such modifiers are also selected with the Cur-App [Mod-Ord-Pol] if their are more than one such uniqueness setting modifier. 200312 increments N-Mod by 1, and sets Cur-S-R[MODIFIER/RELATION, Entry-No+1, N-Mod] to the uniqueness setting modifier's word sense number/ modification relation address.

After 200312, or if 200308 or 200310 is true, 200314 is next, and is true if the word sense number of Cur-Source-Head has type indicating modifiers, and if Cur-Source-Head does not have a specified type indicating modifier. If 200314 is true, 200316 increments N-Mod by 1, and sets Cur-S-R [MODIFIER/RELATION, Entry-No+1, N-Mod] to a type setting modifier's word sense number/type setting modification relation address. The type setting modifier's word sense number and type setting modification relation address are selected with the Cur-App[Type-Head-Sel] policy. After 200316, or if 200314 is false, 200318 is next, and is true if Cur-Source-Head has assigned modifiers. If 200318 is true, 200320 sets A-Mod to the number of assigned direct modifiers, sets Cur-S-R[MODIFIER/RELATION, Entry-No+1, N-Mod+1 to N-Mod+A-Mod]to the assigned direct modifiers' word sense numbers/modification relation addresses, and sets N-Mod to the sum of N-Mod and A-Mod. After 200320, or if 200318 is false, 200322 is next, and is true if N-Mod equals 0. If 200322 is true, 200324 sets D-Mod to false. If 200322 is false, 200326 sets D-Mod to true. After 200324 or 200326, 200328 stores information related to Entry-No+1. 200328 sets Cur-S-R[Modifier, Entry-No+1, 0] to N-Mod; Cur-S-R[Modifier, Entry-No+1, N-Mod+1] is set to Entry-No; Cur-S-R[Modifier, Entry-No+1, N-Mod+2] is set to MOD; Cur-S-R-Add-Set is set to Cur-S-R-Add; Base-Word-Set, an array which stores base words, is set to zero. T-Cur-Source-Head is set to Cur-Source-Head; and 200328 sets processing to continue at 200340.

Wordset, Syntax Parse Address, and Base Word Set Selection

200340 starts a process for selecting compatible wordsets with affix and inflection codes as needed and associated base words with text affix sets and text inflection sets as needed for a word designated as Cur-Source-Head. Affix sets are selected through morphological processing. Inflection sets are assigned by the application which creates the data which is used to form the Next-Out data structure. The text affix set corresponds to the affix set, and the text inflection set corresponds to the inflection set. 200340 is true if Base-Word-Set does not equal 0, and if Alt-Real is false. If Base-Word-Set is not equal to 0, it contains morphological realizations of Cur-Source-Head that realize its modification relation, or Cur-Source-Head is a noun phrase head with a morphological form for its sentence role. Alt-Real is false if Cur-Source-Head is a modifier and only has a non-morphological form, or if Cur-Source-Head is a noun phrase head. 200340 is true for a noun head with a morphological component. If 200340 is false, Cur-Source-Head has morphological realizations of its modification relation and/or a morphological form if Alt-Real is true, or Cur-Source-Head has a non-morphological form if Alt-Real is false. If 200340 is false, 200341 is next, and is true if M-Word is true. M-Word is true if a noun modifier is required to be a morphological word. If 200341 is true, 200342 adds M-BW-Set to Base-Word-Set. M-BW-Set contains base words and affixes which realize Cur-Source-Head for morphological word modification realizations. M-BW-Set and M-Word are described and set below. If 200341 is false, 200343 adds the base words of Cur-Source-Head to Base-Word-Set since Cur-Source-Head is not required to be a morphological word. After 200342 or 200343, or if 200340 is true, 200344 is next, and is true if Cur-Source-Head is 120. If 200344 is true, 200346 orders the base words of Base-Word-Set in the most recent referenced in 120 first order. After 200346, or if 200344 is false, 200348 is next, and is true if Base-Word-Set is not empty. If 200348 is false, 200349 is next, and is true if Fail-C or Fail-Return is true. Fail-C is true when this process is called within noun phrase output processing. Fail-Return is true for external calling of noun phrase output processing. If 200349 is true, processing continues at 200367 which determines where control is to be continued at, and is described below. If 200349 is false, 200350 informs the Communication Manager of noun base word selection error for Cur-Source-Head.

If 200348 is true, Cur-Source-Head has base words, and 200352 is next. 200352 sets Cur-Wordset to the union of wordsets with associated affix codes and/or inflection codes of base words in Base-Word-Set such that these wordsets are stored at addresses in Cur-S-R-Add-Set which contains addresses in Syntax Parse Trees 30; A-Wordset is set to the corresponding wordset's address in Cur-S-R-Add-Set; and B-Word-Set is set to the text of the first base word and associated text affix set and text inflection set of the corresponding wordset if any. In the case where a wordset is contained at multiple addresses in Cur-S-R-Addset, an entry is made at Cur-Wordset, A-Wordset, and B-Word-Set for each multiple address. Multiple addresses occur when a wordset can occur in more than one realization. The possible realizations include: non-morphological premodifier, morphological premodifier, non-morphological postmodifier, morphological postmodifier, and prepositional postmodifier. After 200352, 200354 is next, and is true if Cur-Wordset is empty. If 200354 is true, 200356 is next, and is true if Fail-C or Fail-Return is true. If 200356 is true, processing continues at 200367. If 200356 is false, 200358 informs the Communication Manager of noun base word selection error for Cur-Source-Head.

If Cur-Wordset is not empty, 200354 is false, and 200360 is next, and is true if Cur-Source-Head has a function word modifier. Cur-Source-Head can have a function word application vector assigned by Cur-App for nouns, or Cur-Source-Head can have a function word application vector selected at 200427 for adjective modifiers as is described below. A function word application vector at Cur-Source-Head contains a one at each function which is to be represented with a function word modifier of Cur-Source-Head. If 200360 is true, 200362 sets Cur-F-Word-V to Cur-Source's function word application vector. 200362 performs the following process for each wordset in Cur-Wordset: Access the function word application vector at the wordset's associated address in A-Wordset; AND the looked up vector and Cur-F-Word-V; If the AND result vector does not equal Cur-F-Word-V, remove wordset's associated entry in Cur-Wordset, A-Wordset, and B-Word-Set. The looked up vector at the wordset's associated address contains a one at each allowed function. If the AND result vector equals Cur-F-Word-V, the looked up vector allows all the functions of Cur-F-Word-V. Finally, 200362 sets Cur-S-R[Fun-W, Entry-No, MOD] to Cur-F-Word-V. After 200362, 200364 is next, and is true if Cur-Wordset is empty. If 200364 is true, 200365 is next, and is true if Fail-C or Fail-Return is true. If 200365 is false, 200366 informs the Communication Manager of a function word realization error for Cur-Source-Head. If 200349, 200356, 200365, or 200373, which is described below, is true, 200367 is next, and is true if Fail-C is true. If Fail-C is true, a local sub-process of this noun output process will attempt another option as is described below. If 200367 is true, 200369 sets FAILED to true, and returns processing control to 200430 which is described below. If Fail-C is false, the calling process can attempt another option. If 200367 is false, 200371 sets FAIL to true, and returns processing control to 200-RETURN.

If Cur-Wordset is not empty at 200364, or if 200360 is false, 200368 is next, and is true if Cur-Source-Head has a clause modifier. If 200368 is true, 200370 removes all wordsets and their associated entries which do not allow the types of assigned clause modifiers from Cur-Wordset, A-Wordset, and B-Word-Set. A wordset's associated address in 30 is checked to determine if the clause modifiers are allowed. After 200370, 200372 is next, and is true if Cur-Wordset is empty. If 200372 is true, 200373 is next, and is true if Fail-C or Fail-Return is true. If 200373 is true, 200367 is next as described above. If 200373 is false, 200374 informs the Communication Manager of a clause modification realization error for Cur-Source-Head. If 200368 or 200372 is false, 200376 sets N-WS to the number of wordsets in Cur-Wordset; Cur-S-R[WORDSET/ADDRESS/BWORD, Entry-No, Mod, 1 to N-WS] is set to the contents of Cur-Wordset/A-Wordset/Base-Word-Set respectively; Base-Word-Set is set to 0; and 200376 sets Cur-S-R[WORDSET, Entry-No, Mod, 0] to N-WS. After 200376, 200377 is next, and is true if Init-Head is true. 200377 is true when Cur-Source-Head is the head of a sentence role. If 200377 is true, 200378 sets Init-Head to false, and sets processing to continue at 200380 which stores modifiers of the sentence role head and which is described below. If 200377 is false, processing continues at 200430 which is also described below.

Modifier Data Structure Formation

200380 starts a process which stores all unprocessed modifiers of a noun sentence role head in the Cur-S-R data structure. 200380 is true if D-MOD is true. If 200380 is false, the head has no modifiers, and processing continues at 200478 which is described below. If 200380 is true, 200381 sets Entry-No and New-Ent both to 1. The data structure at Entry-No equals 1 contains the direct modifiers of a sentence role head, and has already been partially processed for storage in Cur-S-R. New-Ent contains the value of the last entry number in Cur-S-R, which is currently 1. After 200382, 200384 sets MOD to 0, and sets N-Mod to Cur-S-R[MODIFIER, Entry-No, 0]. After 200384, 200386 increments MOD by 1, and sets Mod-Head to the modifier head at Cur-S-R[MODIFIER, Entry-No, MOD]. After 200384, 200386 is next, and is true if MOD is less than or equal to N-Mod. If 200386 is true, a modifier head has been stored at Mod-Head, and 200388 is next, and is true if Mod-Head has direct modifiers at Cur-Source. If 200388 is false, 200384 is next as above.

If 200388 is true, 200390 sets Mod-No to the number of direct modifiers of Mod-Head; New-Ent is incremented by 1; Cur-S-R[Mod-Loc, Entry-No, MOD], the entry number which contains direct modifiers of the modifier at Entry-No and MOD, is set to New-Ent; and Cur-S-R[MODIFIER/RELATION, New-Ent, 1 to Mod-No] is set to the word sense numbers/relation addresses respectively of the direct modifiers of Mod-Head. After 200390, 200392 is next, and is true if Cur-App[Type-Mod] is true, and if Mod-Head is: non-morphological, a noun with non-zero type, a noun without an assigned typing modifier, and a noun with typing modifiers. If 200392 is true, 200394 increments Mod-No by 1, and sets Cur-S-R[MODIFIER/RELATION, New-Ent, Mod-No] to a typing word sense number/typing relation address of Mod-Head. The typing word sense number and typing relation address of Mod-Head is selected with the Cur-App[Type-Mod-Sel] policy. After 200394, or if 200392 is false, 200395 sets Cur-S-R[MODIFIER, New-Ent, 0] to Mod-No; Cur-S-R[MODIFIER, New-Ent, Mod-No+1] is set to Entry-No, the entry number containing the modifiee of the modifiers in New-Ent; Cur-S-R[MODIFIER, New-Ent, Mod-No+2] is set to MOD, the position in Entry-No of the modifiee of the modifiers in New-Ent; Cur-S-R[Seld-WS, New-Ent, 1 to N-Mod] is set 1, the position of the default wordset as described at 200444 below. Cur-S-R[ADDRESS, New-Ent, 0, 0] is set to 1 which indicates that this row is not in a separated noun phrase. After 200395, 200384 is next as above. If all direct modifiers in the Entry-No portion of Cur-S-R have been processed, 200386 is false, and 200396 increments Entry-No by 1. After 200396, 200397 is next, and is true if Entry-No is greater than New-Ent. If 200397 is false, there are unprocessed modifiers in Entry-No, and 200382 is next as above. If 200397 is true, processing continues at 200400.

Modifier Syntax Parse Address Selection Set for Realization

200400 starts a process which selects syntax parse address sets for the possible types of modifier realizations. Modifier realizations include: non-morphological modifiers as premodifiers or prepositional objects, morphological modifiers as premodifiers or prepositional objects, non-morphological modifiers with a modifying relation realized morphologically as premodifiers, and morphological modifiers with a modifying relation realized morphologically. A modifying relation is the relation between the modifier and the modifiee. These syntax parse address sets are used to select possible wordsets, syntax parse addresses and base words of modifiers utilizing the process at 200340 which was described above. 200400 sets Entry-No and MOD to 1, and sets Head-WS, the current wordset number under process, to 1. After 200400, 200402 sets N-Mod to Cur-S-R[Modifier, Entry-No, 0]; M-Ent, the entry number of the modifiee, is set to Cur-S-R[Modifier, Entry-No, N-Mod 1]; M-Mod, the modifiee number of the modifiee, is set to Cur-S-R[Modifier, Entry-No, N-Mod+2]; Modife-WS-No, the number of wordsets for the modifiee under processing, is set to Cur-S-R

[WORDSET, M-Ent, M-Mod, 0]; Cur-WS, the current wordset of the modifiee under processing, is set to Cur-S-R[WORDSET, M-Ent, M-Mod, Head-WS]; INC is set to the number of addresses at Cur-S-R[ADDRESS, M-Ent, M-Mod, Head-WS to Head-WS+INC−1] which consecutively have Cur-WS at Cur-S-R[WORDSET, M-Ent, M-Mod, Head-WS to Head-WS+INC−1]; After 200402, 200404 sets Cur-Source-Head's word sense number to Cur-S-R[MODIFIER, Entry-No, MOD]; Spec-Vec is set to Cur-Source-Head's morphological implementation vector at Next-Out if there is one, or to a standard Spec-Vec; and Cur-Rel is set to Cur-S-R[RELATION, Entry-No, MOD]. Cur-Source-Head is the modifier under process. Cur-Rel is a relation address with additional information at the relation. 200404 also sets Alt-Real and M-Word to false, and sets M-BW-Set to 0. Alt-Real is false when Cur-Source-Head is a non-morphological word, and when Cur-Rel does not have morphological realizations of Cur-Source-Head which implies that the Cur-Rel relation is not indicated with affixes added to Cur-Source-Head. M-Word is false when the Cur-Source-Head is a non-morphological word which implies that Cur-Source-Head has the proper part of speech for its modification role. M-BW-Set can contain morphological realizations of Cur-Source-Head for morphological word realizations of Cur-Rel as is described below.

After 200404, 200406 is next, and is true if Cur-Source-Head requires morphological processing. 200406 is true if Cur-Rel requires a part of speech which differs from the part of speech of Cur-Source-Head. Cur-Rel relations specify a noun or adjective modifier word sense number for English. If 200406 is true, Cur-Source-Head is required to be a morphological word to realize Cur-Rel. If 200406 is true, processing continues at 200471. 200471 is true if Cur-Rel can be realized through a morphological word. The realizations of a noun relation are stored at Noun-Rel-Real[Cur-Nat-Lang, Cur-Rel]. Each type of realization has a table of realizations. For morphological realizations of a relation, the table contains the morphological function type and an associated relation type code. For realizations through a morphological word, the table contains a relation type code and possibly a pointer to a prepositional realization. For prepositional realizations, the table contains a set of function word prepositions and an associated relation type code. The relation type code is used to match subsets of the addresses in Cur-S-R-Add-Set. Matched addresses allow the relation type. If 200471 is true, 200473 sets up parameters to select the morphological affixes which allow Cur-Source-Head to be utilized in realizations of Cur-Rel through a morphological word. Since Cur-Source-Head already requires affixes, 200471 is true for the case where Cur-Rel can be indicated by the affixes which change Cur-Source-Head's part of speech and imply Cur-Rel. For example, "vindicate" with a modification function A-Relation to "person" as in" a person vindicates . . . " is expressed as a "vindictive person" which morphologically converts "vindicate" to an adjective which is required for this realization of the modification function A-Relation of the example. Another possible realization of a Cur-Rel through a morphological word occurs when Cur-Source-Head is realized as a noun and Cur-Rel is realized with a preposition as in: "from his vindication". 200473 sets T-Spec to Spec-Vec; Spec-Vec is set to Spec-Vec[Non-M-Rel], the specified morphological realization of Cur-Source-Head from Next-Out, or to a standard vector if no morphological realization is specified; SOURCE is set to the word sense number type of Cur-Source-Head; Func-Type is set to Imp-Morph-F-T[Cur-Nat-Lang, SOURCE, Cur-Rel]; Fail-Return is set to true; Morph-W-S is set to Cur-Source-Head's word sense number; Morph-Call and M-Word are set to true; Spec-Morph-W is set to Spec-Vec [Non-M]; RETURN is set to 200477; and 200473 calls 200[Spec-Vec[ADD], Spec-Vec, RETURN]. Spec-Vec [ADD] has a value of 200106 if Spec-Vec is standard, or has a value of 200100 otherwise. Spec-Vec is a calling parameter which is set to Cur-Imp-V at 200100. The Func-Type selected at 200473 can select morphological realizations with more than one destination part of speech type. For example, Cur-Rel could have noun and adjective morphological word realizations. After morphological processing, 200477 is next, and is true if FAIL is false. If 200477 is true, morphological processing has been successful, and 200479 sets M-BW-Set to Base-Word-Set so that morphological base words and affixes of Cur-Source-Head are considered for morphological word realizations of Cur-Rel. 200479 also sets Alt-Real to true. After 200479, or if 200477 is false, 200483 sets Spec-Vec to T-Spec, and 200483 sets processing to continue at 200407. If 200471 is false, 200475 sets M-Word to true, and also sets processing to continue at 200407.

After 200483, or if 200406 or 200471 is false, 200407 is next, and is true if Cur-Rel has a morphological realization. For example "happy" with modification C-Relation to "person" relative to another person can have the C-Relation morphologically realized as a "happier person" If 200407 is true, 200408 sets up parameters to select the morphological affixes which allow Cur-Source-Head to be utilized in morphological realizations of Cur-Rel. 200408 sets Alt-Real to true; SOURCE is set to the word sense number type of Cur-Source-Head; Func-Type is set to the function type of Cur-Rel morphological realizations for SOURCE; Fail-Return is set to true; Morph-W-S is set to Cur-Source-Head's word sense number; Morph-Call is set to true; Spec-Vec is set to Spec-Vec[M-Rel] or to a standard vector if there is no specific one; Spec-Morph-W is set to Spec-Vec[REL]; RETURN is set to 200410; and 200408 calls 200[Spec-Vec[ADD], Spec-Vec, RETURN]. Spec-Vec [ADD] has a value of 200106 if Spec-Vec is standard, or has a value of 200100 otherwise. The Func-Type selected at 200407 can select morphological realizations with more than one destination part of speech type. For example, Cur-Rel could have noun and adjective morphological realizations. After morphological processing, 200410 is next, and is true if FAIL is false, or if M-BW-Set is not equal to zero, or if M-Word is false. If FAIL is false, morphological processing has been successful, and there are possible base words for realizations. 200410 is also true if M-BW-Set is not equal to zero also because there are possible base words for realizations. 200410 is also true if M-Word is false because further processing will determine if there are Cur-Source-Head base words which will realize Cur-Rel relations. If 200410 is false, there are no possible base words, and processing continues at 200448 which begins a process to select another wordset for Cur-Source-Head, and which is described below.

If 200410 is true or if 200407 is false, 200414 sets Cur-S-R-Add-Set to NULL. After 200414, 200416 is next, and is true if Cur-Rel has a non-prepositional realization and if Cur-Source-Head does not have a function word application vector. If 200416 is true, Cur-Source-Head is a possible premodifier of its modifiee, and 200418 sets Cur-S-R-Add-Set to the non-prepositional, Cur-Rel compatible, unmarked addresses of Cur-WS at Cur-S-R[ADDRESS, M-Ent, M-Mod, Head-WS to Head-WS+INC−1]. Addresses of Cur-WS which are marked have been proven to be incompatible with a modifier of the modifiee at Cur-S-R[ADDRESS, M-Ent, M-Mod, 1 to Modife-WS-No]. Addresses are marked at 200452 which is described below. Addresses of Cur-WS which are compatible with Cur-Rel belong to an address partition of Cur-S-R[ADDRESS, M-Ent, M-Mod, Head-WS to Head-WS+ INC−1] which allows the non-prepositional relation type codes of Cur-Rel. In general, the non-prepositional relation type codes of Cur-Rel can include both morphological and non-morphological realizations of Cur-Source-Head, and they can include both morphological and morphological word realizations of Cur-Rel. However, partitions compatible with Cur-Rel are also selected to be compatible with the affix and inflection codes of Cur-Source-Head. If FAIL is true, no partitions compatible with morphological realizations of Cur-Rel can be selected. If FAIL is false, partitions compatible with morphological realizations of Cur-Rel are selected. If M-BW-Set equals zero, no partitions compatible with morphological word realizations of Cur-Rel are selected. If M-BW-Set is not equal to zero, M-Word is true, and morphological word realizations of Cur-Rel are selected. If M-Word is false, non-morphological word realizations of Cur-Rel are selected. A partition is compatible with a relation type code if the partition contains the relation type code in related grammar information of the partition, or the partition contains a generalization of the relation type code. For example, a generalization of a relation type code would be all morphological word, non-prepositional relation type codes. 200418 stores syntax addresses which can generate correct natural language, English is this description, for Cur-Source-Head and the Cur-Rel relation.

After 200418, or if 200416 is false, 200420 is next, and is true if Cur-Rel has a prepositional realization. If 200420 is true, 200422 sets Cur-S-R-Add to the prepositional, Cur-Source-Head compatible, Cur-Rel compatible, unmarked addresses of Cur-WS at Cur-S-R[ADDRESS, M-Ent, M-Mod, Head-WS to Head-WS+INC−1]. In general, the prepositional relation type codes of Cur-Rel can include both morphological and non-morphological realizations of Cur-Source-Head, and they include only prepositional realizations of Cur-Rel. After 200418 and 200422, Cur-S-R-Add-Set contains addresses of possible continuations of syntax parse tree paths for Cur-Source-Head. Since the process of selecting wordsets, syntax addresses, and base words is repeated for all modifiers of the noun phrase being generated for output, output generation involves following syntax parse tree paths in a process which is similar to parsing incoming natural language as described above. After 200422, or if 200420 is false, 200424 is next, and is true if Cur-S-R-Add-Set is NULL. If 200424 is true, no Cur-Rel compatible syntax address continuations for Cur-Source-Head have been stored at Cur-S-R-Add-Set, and another wordset for the modifiee of Cur-Source-Head is attempted at 200448 which is described below.

If Cur-S-R-Add-Set is not NULL at 200424, 200425 is next, and is true if Cur-Rel as an adjective modification relation. If 200425 is true, 200427 sets the function application vector of Cur-Source-Head to DEG-ADV[Cur-Source-Head, Cur-Source-Head's state value]. DEG-ADV looks up the degree adverb table of Cur-Source-Head if it is a state adjective, and sets the function application value to have a one at a degree adverb function which implies the state value of Cur-Source-Head if Cur-Source-Head's state value is not typical. If Cur-Source-Head is not a state adjective, or if its state value is typical, DEG-ADV returns a NULL function application vector. After 200427, or if 200425 is false, 200428 sets parameters for the wordset, address, and base word selection process starting at 200340 for Cur-Source-Head. 200428 sets Fail-C to true; FAILED is set to false; and 200428 sets processing to continue at 200340 which is described above. After processing at the 200340 process is complete, 200430 is next, and is true if FAILED is true. If 200430 is false, the process at 200340 has been successful, and 200432 increments MOD by 1 so that the next modifier of the current modifiee can be processed if any, and Cur-S-R[Seld-WS, M-Ent, M-Mod] is set to Head-WS, the selected wordset of the current modifiee. After 200432, 200436 is next, and is true if MOD is less than or equal to N-Mod. If 200436 is true, MOD selects the next unprocessed modifier of the current modifiee, and 200404 is next as described above. If 200436 is false, all modifiers of the current modifiee have been processed, and 200438 is next. 200438 increments Entry-No by 1; In-En is set to Cur-S-R[ADDRESS, Entry-No, 0, 0]; and 200438 sets MOD and Head-WS to 1. After 200438, 200440 is next, and is true if Entry-No is less than or equal to New-Ent. If 200440 is true, 200442 is next, and is true if In-En equals 1. If 200442 is true, Entry-No is active, and 200402 begins processing of the Entry-No row as described above. If 200442 is false, Entry-No is inactive because a wordset could not be selected, and 200476 processed the entry for separate modifier processing which is described below. If 200442 is true, 200438 is next as described above. If 200440 is false, the wordset, address and base word selection process of modifiers is complete, and 200444 sets Fail-C to false, and sets processing to continue at 200490. Note that the selected wordset for each modifier in New-Ent, the last row with modifiers in the current noun phrase, has not been selected with the process above. However, all wordsets, base words and relations of modifiers in New-Ent have been selected to be compatible with its modifiee. This process selects wordsets of a modifiee to be compatible with the realizations of its direct modifiers. The modifiers in New-Ent, and other modifiers with out modifiers, have there wordsets selected by default at 200395 to be the wordset at the modifier's Cur-S-R[WORDSET, such a modifier's entry number, such a modifier's modifier number, 1]. Since such modifiers' wordsets are not dependent on their modifiers, any wordset of such a modifier set at 200376 is feasible. The first modifier set at 200376 is either the most common, or is the most recently referenced one if the corresponding base word is in 120. Hence, the first wordset has the best associated base word.

Failed Wordset Selection Processing

If 200424 or 200430 is true, or if 200410 is false, a wordset, address or base word was not selected for Cur-Source-Head, and 200448 is next. 200448 is true if Head-WS plus INC is less than or equal to Modife-WS-No. 200448 is true if there is an unprocessed wordset for the current modifiee. If 200448 is true, 200450 sets Head-WS to the sum of Head-WS and INC, the next unprocessed wordset number location; Cur-WS is set to Cur-S-R[WORDSET, M-Ent, M-Mod, Head-WS]; INC is set to the number of addresses at Cur-S-R[ADDRESS, M-Ent, M-Mod, Head-WS to Head-WS+INC−1] which consecutively have Cur-WS at Cur-S-R[WORDSET, M-Ent, M-Mod, Head-WS to Head-WS+INC−1]; Cur-S-R[ADDRESS, M-Ent, M-Mod, 1 to Head-WS−1] is checked for containing an address in Cur-S-R[ADDRESS, M-Ent, M-Mod, Head-WS to Head-WS+INC−1]; and addresses of the later which are repeated in the former are marked for exclusion at 200418 and 200422. The repeated addresses are marked for exclusion because they failed previously. After 200450, 200454 is next, and is true if all the addresses in Cur-S-R[ADDRESS, M-Ent, M-Mod, Head-WS to Head-WS+INC−1] are repeated addresses. If 200454 is true, 200448 is next as described above. If 200454 is false, 200456 sets MOD to 1, and sets processing to continue at 200436 as described above.

If 200448 is false, all wordsets have failed for the current modifiee, and 200460 is next. 200460 is true if Back-Track is true. Back-Track is initially set to true at the start of the noun phrase expression process. If 200460 is true, 200462 is next, and is true if M-Ent equals 0. If 200462 is false, the head of the noun phrase to be expressed has not been reached during back tracking, and 200466 back tracks to the current modifiee's modifiee. 200466 sets N-Mod to Cur-S-R[Modifier, M-Ent, 0]; M-Ent is set to Cur-S-R[Modifier, M-Ent, N-Mod+1]; M-Mod is set to Cur-S-R[Modifier, M-Ent, N-Mod+2]; Modife-WS-No is set Cur-S-R [WORDSET, M-Ent, M-Mod, 0]; Head-WS is set to Cur-S-R[Seld-WS, M-Ent, M-Mod]; Cur-WS is set to Cur-S-R [WORDSET, M-Ent, M-Mod, Head-WS]; INC is set to the number of addresses at Cur-S-R[ADDRESS, M-Ent, M-Mod, Head-WS to Head-WS+INC–1] which consecutively have Cur-WS at Cur-S-R[WORDSET, M-Ent, M-Mod, Head-WS to Head-WS+INC–1]; and Entry-No is set to Cur-S-R[Mod-Loc, M-Ent, M-Mod]. After 200466, 200456 is next as described above. If 200462 is true, back tracking has reached the noun phrase head with all wordset numbers being tried, and processing continues at 200470. In this case, all the modifiers can not be expressed in a single noun phrase. 200470 is true if Cur-App[M-N-Phrase] is true. If 200470 is true, 200472 calls Cur-App[Back-Track-Fail] which processes the back tracking failure with Cur-App processes.

If 200470 is false, 200474 sets up processing to separate modifiers which can not be expressed in a single noun phrase. 200474 sets Back-Track to false which causes modifiers requiring back tracking to be separated out for separate noun phrase processing. 200474 also unmarks all addresses, and sets processing to continue at 200400 which starts the processing of the noun phrase from the beginning as described above. However, since Back-Track is set to false, when a modifier requires back tracking at 200460, 200460 is false, and 200468 sets processing to continue at 200476 which stores modifiers which will form separate noun phrases as described above. 200476 increments Sep-Mod by 1; Separate-Mod[Sep-Mod, MOD-N] is set to MOD; Separate-Mod[Sep-Mod, ENT-N] is set to Entry-No; (MOD-N and ENT-N are constants); Cur-S-R[ADDRESS, MOD-ENT, 0, 0] is set to 0 for each MOD-ENT such that its entry number contains a direct or indirect modifier of Cur-S-R[MODIFIER, Entry-No, MOD]; Cur-S-R[Seld-WS, Entry-No, MOD]is set to 0; MOD is incremented by 1; and 200476 sets processing to continue at 200436 as described above. A direct modifier is one modifier level below its modifiee. An indirect modifier is one or more modifier levels below a direct modifier.

Noun Phrase Premodifier Text Generation

The Noun Phrase Text Generation process first generates a noun phrase with all non-separate modifiers assumed to be premodifiers. Then, modifiers which must be realized as prepositional phrases are generated as postmodifiers, and their premodifier realizations are removed. This approach is taken because the modifiers requiring prepositional realization are not known until the certain modifiers that require prepositional realization are looked up. Then, such modifiers and their modifiees at higher levels except for the head are required to be realized as prepositional phrases as described above. First, the simple case of a noun phrase head without state representation modifiers is described. Then the general case is described.

If D-Mod is false at 200380, the current noun phrase head does not have state representation modifiers, and processing continues at 200478. 200478 sets Head-WS and MOD to 1; Entry-No is set to 0; Cur-Return is set to 200480; and processing is set to continue at 200482. 200478 sets the noun phrase head to be processed for function word realization starting at 200482. 200482 is true if Cur-S-R[Fun-W, Entry-No, MOD] is zero. If 200482 is true, 200484 sets Fun-Word and Delay-Func to 0; Funw-Func is set to Return-1st-Argument-Function; and processing is set to continue at Cur-Return. Funw-Func is a function which places the function words in the noun phrase. The Return-1st-Argument-Function does not place any function words. The first argument of Funw-Func is the text form of the noun phrase without function word modifiers. If 200482 is false, 200486 looks up Fun-Word, the function word set of modifiers; Funw-Func; and Delay-Func at an address which is associated with the value of function word application vector at Cur-S-R[Fun-W, Entry-No, MOD], and 200486 sets processing to continue at Cur-Return. Delay-Func places function words from Fun-Word which have a phrase size dependent position. For example, a comparative quantity function places a function word in between the noun phrase head and the comparative modifiers as in: "more computers with 200MB hard disks . . . than . . . ". In this example, "than" is placed by a Delay-Func. For the case when Cur-Return is 200480, 200480 sets Text-Out to Cur-S-R[BWORD, 0, 1, 1]; DMAX is set to 0, the number of modifiers of the head; Cur-S-R[TEXT, DMAX] is set to Funw-Func[Text-Out, Fun-Word]; and 200480 sets processing to continue at 200700 which completes sentence role processing, selects the next process, and is described below.

After modifier wordset, syntax address, and base word selection has been completed, 200490 is next. 200490 sets up parameters for storing the text of the noun phrase in premodifier form. 200490 sets Entry-No to 0; MOD is set to 1; N-Mod is set to 1; Head-WS is set Cur-S-R[Seld-WS, 0, 1]; M-Order[Entry-No, 0] is set to 1; DM is set to 0; P-ADJ is set to false; P-Pos is set to 0; Cur-Return is set to 200495; and 200490 sets processing to continue at 200482. Entry-No, MOD, N-Mod and Head-WS are set for the head of the noun phrase which is being processed. M-Order contains the order of modifiers in an entry number row and is set below. M-Order[Entry-No, 0] contains the last position in M-Order of Entry-No which has been processed for the premodifier text form generation. DM is an array variable for Cur-S-R [TEXT, DM]. DM is set to 0 for the noun phrase head; DM is positive for postmodifiers; and DM is negative for premodifiers. P-ADJ is true when the current word being processed is a postpositive adjective, and this case is described below. P-Pos is the number of modifiers which must be realized with a post-prepositional phrase realization. After function word processing starting at 200482 is completed as described above, 200495 is next.

200495 sets Text-Out to Cur-S-R[BWORD, Entry-No, MOD, Head-WS]; Cur-S-R[TEXT, DM] is set to Funw-Func[Text-Out, Fun-Word]; Delay-Fun[DM] is set to Delay-Func; Cur-S-R[BWORD, Entry-No, MOD, 0] is set to DM; Cur-S-R[INV, DM, ENT] is set to Entry-No; Cur-S-R[INV, DM, MD] is set to MOD; Next-Ent is set to Cur-S-R[Mod-Loc, Entry-No, MOD]; and DM is incremented by –1. The Cur-S-R[INV, DM, ENT/MD] is used to find the Entry-No and MOD associated with a DM position. ENT and MD are constants. This inversion capability can be used to indicate the modifiers and modifiees in a noun phrase. After 200495, 200496 is next, and is true if P-ADJ is true. P-ADJ is true when the modifier being processed at 400495 is a postpositive adjective. This case is described below at 200494. If 200496 is true, 200497 sets P-ADJ to false, and DM is set to T-DM. T-DM is set at 200494 which is described below. After 200497, or if 200496 is false, 200498 is next, and is true if Next-Ent is not equal to zero. If 200498 is false, the noun phrase constituent just processed does not have a modifier. If 200498 is true, the noun phrase constituent's direct modifiers are set up for processing by 200499. 200499 sets Entry-No to Next-Ent; and N-Mod is set to Cur-S-R [MODIFIER, Entry-No, 0]. Then 200499 orders the modifiers in Cur-S-R[MODIFIER, Entry-No, 1 to N-Mod] according to each modifier's address partition and the modifier's wordset position in its partition. The address partitions in 30 of noun phrases are ordered according to the preferred output order. Within a partition, the wordsets are also ordered according to the preferred output order. Each modifier's MOD position is placed in M-Order[Entry-No, 1 to N-Mod] according to the preferred output order stored in 30 by 200499. Also, 200499 sets M-Order[Entry-No, 0] to 1, and MOD is set to M-Order[Entry-No, 1]. There is one exception to this ordering process for postpositive adjective realizations, i.e. a postmodifying adjective realization. Postpositive adjective modifiers are not placed in M-Order. Postpositive modifiers are processed separately because they only have a postmodifying realization which complicates the processing of other modifiers. Postpositive modifiers are combined with their modifiee(s) for text representation as is described below. After 200499, 200500 sets Head-WS to Cur-S-R[Seld-WS, Entry-No, MOD]; and Cur-Add is set to Cur-S-R[ADDRESS, Entry-No, MOD, Head-WS].

After, 200500, 200501 is next, and is true if Head-WS is not equal to zero. If 200501 is true, 200502 is next, and is true if Cur-Add only has a post-prepositional phrase realization. Here, a distinction is made between prepositional phrases which can be realized as a premodifiers and those which are realized as postmodifiers. This distinction is stored at the grammar information in 30 which is associated with the address in Cur-Add. For example, "by no means complete" is an example of a premodifying prepositional phrase. If 200502 is true, 200504 stores the modifier for processing as a postmodifying prepositional phrase. 200504 sets PREP[P-Pos, E] to Entry-No, sets PREP[P-Pos, M] to MOD, and increments P-Pos by 1. After 200504, or if 200502 is false, 200506 is next, and is true if Cur-Add has an output anomaly. An output anomaly is looked up at the grammar information associated with Cur-Add. Examples of an output anomaly include: a premodifying prepositional phrase, adjectives which set a color value, "blue", and the determiner selection for certain proper nouns. A premodifying prepositional phrase has its preposition selected by an associated anomaly process. A color adjective normally requires an "and" conjunction between two or more consecutive color adjectives as in "a red and white shirt". This anomaly can be overrided with a Next-Out stored parameter. Certain proper nouns require special determinant selection as in "Lake Michigan" which requires the zero determiner. If 200506 is true, 200508 determines if the noun phrase satisfies a anomaly pattern associated with the anomaly. If the pattern is satisfied, 200508 evaluates the anomaly function associated with the anomaly.

After 200508, or if 200506 is false, 200510 sets Cur-Return to 200492, and sets processing to continue at 200482 which is described above. After function word processing is completed, 200492 is next, and is true if Cur-Add has a postpositive adjective realization, i.e. a postmodifying realization. For example, "somebody tall" has "tall" in a postpositive realization. If 200492 is true, 200494 determines the modifiee of the postpositive adjective, and sets the modifiee's position in Cur-S-R[Text, DM] to the current value of DM. Funw-Func is appended with a function that inserts the postpositive adjective in a postmodifying position in the proper order considering all postpositive adjective modifiers of the modifiee. The postpositive adjective is also appended to the text portion of the modifiee's Cur-S-R[BWORD] position because this simplifies function word processing of modifiers which are realized as postmodifying prepositional phrases. This realization is described below. Postpositive adjectives are appended to the modifiee position to simplify processing of noun phrase text generation. Note that the DM in Cur-S-R[Text, DM] actually contains an address of the location where the actual text is located because storing text in an array is complicated by the differing lengths of text. Thus, if an array is to store text, its storage element must be greater than or equal to the largest text element which is very wasteful of memory space. 200494 sets M-N to Cur-S-R [MODIFIER, Entry-No, 0]; ME-E, the modifiee's entry number, is set to Cur-S-R[MODIFIER, Entry-No, M-N+I]; ME-M, the modifiee's modifier number, is set to Cur-S-R [MODIFIER, Entry-No, M-N+2]; T-DM is set to DM; DM is set to Cur-S-R[BWORD, ME-E, ME-N, 0]; O-No is set to the order number of the postpositive adjective in 30; P-ADJ-INS[O-No, DM], a function which inserts the text of the postpositive adjective at its modifiee's position with the proper order with respect to other postpositive adjectives at the ordered position which is determined as a function of O-No during evaluation, is appended to Funw-Func; and 200494 sets P-ADJ to true. 200494 sets up the postpositive adjective to be stored after the noun head. The positive adjective is inserted in the proper ordered position by P-ADJ-INS[O-No, DM] at the text of the postpositive adjective's modifiee by 200495 which is next. If 200492 is false, or after 200494, 200495 is next as described above.

If 200501 is false, Head-WS equals 0 which implies that the modifier under processing is a separated modifier, and this modifier is not processed here. If 200498 is false, Next-Ent, the entry number of direct modifiers of the noun phrase constituent processed at the 200482 process has no direct modifiers. If 200498 or 200501 is false 200512 is next, and is true if M-Order[Entry-No, 0] is not equal to N-Mod. If 200512 is true, there is an unprocessed modifier in the Entry-No row, and 200514 is next. 200514 sets up the next modifier to be processed. 200514 sets NEXT to M-Order [Entry-No, 0]+1; M-Order[Entry-No, 0] is set to NEXT; MOD is set to M-Order[Entry-No, NEXT]; and 200514 sets processing to continue at 200500 as described above. If 200512 is false, all modifiers in the Entry-No row have been processed and 200516 is next. 200516 sets up a new Entry-No to be the entry number row which contains modifiees of the noun phrase constituents in Entry-No which has just been processed. This entry number row contains modifiers which are the next modifier level up, i.e., the a modifier which is closer to the head, and which are the next level of modifiers to be output. 200526 sets Entry-No to Cur-S-R [MODIFIER, Entry-No, N-Mod+1], and sets N-Mod to Cur-S-R[MODIFIER, Entry-No, 0]. After 200516, 200518 is next, and is true if Entry-No is not equal to 0. If 200518 is true, there is another potentially unprocessed modifier in Entry-No, and 200512 is next as described above. If 200518 is false, premodifier output form processing is complete, and 200519 evaluates functions in Delay-Fun[DM+1 to 0], and sets processing to continue at 200520.

Noun Phrase Postmodifying Prepositional Phrase Selection

Postmodifying prepositional phrases and their direct modifiees at a modifier level up to, but not including the head, are required to be expressed as prepositional phrases as described above. If a direct modifier at a modifier level above a modifier requiring a prepositional phrase realization can not be expressed as a prepositional phrase, the modifier requiring a prepositional phrase realization and all of its modifiers are processed for a separate noun phrase realization as described above. Noun Phrase Postmodifying Prepositional Phrase Processing includes: selecting all modifiers of a direct modifier of the noun phrase head requiring postmodifying prepositional phrase realization; those selected modifiers which can be realized as a prepositional phrase are stored at Prep-Real for later text output processing; those selected modifiers which can not be realized as a prepositional phrase are stored at Separate-Mod for later separate noun phrase processing; these steps are repeated for each direct modifier of the noun phrase head. This processing begins at 200520.

200520 is true if P-Pos is greater than zero. If 200520 is false, processing continues at 200674 which begins separate noun phrase processing, and which is described below. If 200520 is true, 200524 sets M-Lim, the current direct noun phrase head modifier to 1; Dn-Mod, the number of direct noun phrase head modifiers, is set to Cur-S-R[MODIFIER, 1, 0]; Cur-Prep-Set, Prep-Real, and T-Prep-Real, matrixes of modifiers which are to be realized as postmodifying prepositional phrases, are set to 0. After 200524, 200526 sets Cur-Mod to M-Order[l, M-Lim]; L-Ent, the entry number row containing the direct modifiers of Cur-Mod, is set to Cur-S-R[Mod-Loc, 1, Cur-Mod]; and Nx-Mod is set to Cur-Mod. After 200526, a process is begun to determine the entry number of the next direct modifier of the noun head. This entry number is just after the largest entry number of a direct or indirect modifier of Cur-Mod. After 200526, 200528 is next, and is true if L-Ent equals 0. If 200528 is true, Cur-Mod has no modifiers, and Cur-Mod is processed for requiring a prepositional realization. If 200528 is true, 200529 sets Up-Ent[Cur-Mod] to 1. If 200528 is false, 200532 is next, and is true if Cur-Mod equals Dn-Mod. If 200532 is false, the largest entry number of Cur-Mod is one before the first entry number of the next direct modifier of the noun phrase head which is Nx-Mod+1, and 200534 is next. 200534 increments Nx-Mod by 1; U-Ent, the largest entry number containing a direct or indirect modifier of Cur-Mod, is set to Cur-S-R[Mod-Loc, 1, Nx-Mod]−1; After 200534, 200536 is next, and is true if U-Ent is less than zero. If 200534 is true, Nx-Mod has no modifiers, and U-Ent is not correct. If 200536 is true, 200538 is next, and is true if Nx-Mod equals Dn-Mod. If 200538 is false, 200534 is next as described above. If 200538 or 200532 is true, largest entry number containing a direct or indirect modifier of Cur-Mod is the last entry containing modifiers of the noun phrase being processed, this entry is New-Ent, and 200540 sets U-Ent to New-Ent. After 200540, or if 200536 is false, 200542 sets Cur-Prep-Set to contain each P-Pos in PREP which is also a modifier of Cur-Mod. 200542 sets Up-Ent [Cur-Mod] to U-Ent; Cur-Prep-Set is set to contain each P-Pos such that L-Ent is greater than or equal to PREP[P-Pos, E], and such that PREP[P-Pos, E] is less than or equal to U-Ent; and 200542 sets T-P-S to Cur-Prep-Set.

After 200542, or 200529, 200544 is next, and is true if there is a P-Pos such that PREP[P-Pos, E] equals 1 and PREP[P-Pos, M] equals Cur-Mod. If 200544 is true, Cur-Mod also requires a prepositional realization, and 200546 sets PREP[P-Pos, E/M] to 0 for Cur-Mod's P-Pos; Cur-Prep-Set is set to contain Cur-Mod's P-Pos; and T-Prep-Real[1, Cur-Mod] is set to 1. After 200546 or if 200544 is false, 200548 is next, and is true if Cur-Prep-Set is empty. If 200548 is false, processing continues at 200582. 200582 is true if M-Lim equals Dn-Mod. If 200582 is false, there are additional direct modifiers of the noun phrase head, and processing continues at 200530. 200530 increments M-Lim by 1. After 200530, 200526 is next as described above. If 200448 is true, there is at least one modifier requiring a prepositional realization, and 200552 is next. 200552 sets variables which allow Cur-Mod to be checked for a prepositional realization. If Cur-Mod or one of its direct or indirect modifiers requires a prepositional realization, Cur-Mod must be realizable as prepositional phrase. 200552 sets Head-WS to Cur-S-R[Seld-WS, 1, Cur-Mod]; INC is set to the number of addresses with the same wordset at Head-WS in Cur-S-R[WORDSET, 1, Cur-Mod, Head-WS to Head-WS+INC−1]; and 200552 sets Cur-DM-Add to Cur-S-R[ADDRESS, 1, Cur-Mod, Head-WS to Head-WS+INC−1]. After 200552, 200554 is next, and is true if Cur-DM-Add has a prepositional realization. If 200554 is true, 200555 is next, and is true if Cur-Prep-Set only contains Cur-Mod's P-Pos. If 200555 is true, only Cur-Mod and none of its modifiers is realized as a prepositional phrase. If 200555 is true, 200580 sets Prep-Real[1, Cur-Mod] to 1; T-Prep-Real is set to 0; and Cur-Prep-Set is set to 0. Prep-Real contains modifiers which are required to be and can be realized as prepositional phrases. After 200580, 200582 is next as described above.

If 200555 is false, Cur-Mod and some of its direct and/or indirect modifiers require a prepositional realization. If 200555 is true, 200556 sets Cur-Pos to the next, largest, untried P-Pos in Cur-Prep-Set. The largest P-Pos is associated with a modifier at the lowest modifier level of Cur-Mod, i.e., the modifier with the most intervening modifiers between itself and Cur-Mod. This P-Pos selection allows all direct modifiers which are between the Cur-Pos modifier and Cur-Mod to be processed into prepositional realizations if possible. 200556 also sets Cur-Ent to PREP[Cur-Pos, E], and sets Cur-Md to PREP[Cur-Pos, M]. After 200556, 200558 sets C-N-Mod to Cur-S-R[MODIFIER, Cur-Ent, 0]; N-Ent, the entry number containing the direct modifiee of Cur-Md, is set to Cur-S-R[MODIFIER, Cur-Ent, C-N-Mod+1]; the modifier number containing the direct modifiee of Cur-Md, is set to Cur-S-R[MODIFIER, Cur-Ent, C-N-Mod+2]; HD-WS is Cur-S-R[Seld-WS, Cur-Ent, Cur-Md]; INC is set to the number of addresses with the same wordset at HD-WS in Cur-S-R[WORDSET, 1, Cur-Mod, HD-WS to HD-WS+INC−1]; and Cur-ME-Add is set to Cur-S-R [ADDRESS, Cur-Ent, Cur-Md, HD-WS to HD-WS+INC−1]. After 200558, 200560 is next, and is true if Cur-ME-Add has a prepositional realization for Cur-Md. If 200560 is true, 200562 sets T-Prep-Real[Cur-Ent, Cur-Md] to 1. After 200562, 200564 is next, and is true if N-Ent equals 1. If 200564 is false, there is at least one modifier between Cur-Md and Cur-Mod, and 200566 sets the direct modifiee of Cur-Md to be processed. 200566 sets Cur-Ent to N-Ent, and sets Cur-Md to N-Md. After 200566, 200558 is next as described above. If 200564 is true, the direct modifier of Cur-Mod is Cur-Md, both of which are realizable as prepositional phrases, and 200568 is next. 200568 is reached if all modifiers from Cur-Mod down to and including the modifier associated with Cur-Pos are realizable as prepositional phrases. 200568 removes all P-Pos's in Cur-Prep-Set which have T-Prep-Set[PREP[P-Pos, E], PREP[P-Pos, M]] equal to 1. Such P-Pos's include Cur-Pos, but such P-Pos's may also include other P-Pos's which correspond to modifiers which are from Cur-Mod down to and including the direct modifiee of the modifier associated with Cur-Pos. These other modifiers are removed because they already have been proven to be realizable, and hence these other modifiers do not require reprocessing. 200568 also transfers all 1's in T-Prep-Real to the corresponding positions in Prep-Real, and 200568 resets T-Prep-Real to 0. After this action, Prep-Real contains the modifiers which are realized as prepositional phrases so that the modifier associated with Cur-Pos can be realized as a prepositional phrase.

If Cur-ME-Add does not have a prepositional realization at 200560, 200560 is false, and 200570 sets T-Prep-Real to 0 which leaves Cur-Pos in Cur-Prep-Set because it can not be removed at 200568. Leaving Cur-Pos in Cur-Prep-Set will eventually cause its modifier to be realized in a separate noun phrase. After 200570 or 200568, 200572 is next, and is true if there is an untried P-Pos in Cur-Prep-Set. If 200572 is true, 200526 processes the next P-Pos as described above. If 200572 is false, the modifiers of Cur-Mod with a P-Pos in PREP have been processed. If Cur-DM-Add does not have a prepositional realization at 200554, 200554 is false, and Cur-Mod and all the modifiers of Cur-Mod with a P-Pos in PREP can not be realized with prepositional phrase. If 200554 or 200572 is false, 200574 is next. At this point, each P-Pos in Cur-Prep-Set can not be realized as a prepositional phrase. For each P-Pos in Cur-Prep-Set, 200574 transfers PREP[P-Pos, E/M] to Separate-Mod[(a new Sep-Mod for each such P-Pos), Ent-No/Mod-No]. This sets each modifier which is required to be realized as a prepositional phrase, but which can not be realized in a single noun phrase, to be processed for realization in a separate noun phrase. For each DM of a modifier associated with a P-Pos in Cur-Prep-Set, and for each DM associated with a direct or indirect modifier of the modifier associated with such a P-Pos, 200574 blanks the text at Cur-S-R[TEXT, DM] for all such DM. 200574 also sets PREP[P-Pos, E/M] to 0 for each P-Pos in T-P-S. Finally, Cur-Prep-Set is set to 0. After 200574, 500582 is next, and is true if M-Lim equals Dn-Mod. If 200582 is false, processing continues at 200530 as described above. If 200582 is true, Noun Phrase Postmodifying Prepositional Phrase Processing is completed, and processing continues at 200590 which begins the process for postmodifying preposition text generation.

Postmodifying Preposition Text Generation

The Postmodifying Preposition Text Generation process handles each direct modifier of the noun phrase head as follows: a direct modifier of the noun phrase head with a postmodifying preposition realization is moved to the 0 position of a temporary text store, Prep-Form; modifiers of this direct modifier which are realized as postmodifying prepositions with the postmodifiers' premodifiers and postmodifiers are moved in order to the positive positions of Prep-Form; premodifiers of this direct modifier are moved in order to the negative positions of Prep-Form; Prep-Form is compressed and is placed in proper order after the noun phrase head in Cur-S-R[TEXT, text range]; all the modifiers of this direct modifier including the direct modifier are removed from Cur-S-R[Text, text range]; and these steps are repeated for each direct modifier of the noun phrase head. The Postmodifying Preposition Text Generation process is complicated by the need to sort the postmodifying prepositional modifiers and premodifiers of each modifiee which has postmodifying prepositions. Another complication is that the proper order of each such modifiee must be maintained. Also, when a modifiee has more than one direct postmodifying prepositional phrase, comma punctuation and "and" conjunctions are added. The Postmodifying Preposition Text Generation process begins at 200590.

200590 is true if Prep-Real is not all zeroes. If 200590 is true, there are postmodifying prepositions, and 200592 sets Dn-Mod, the number of direct modifiers of the noun phrase head to Cur-S-R[MODIFIER, 1, 0]; CurP1, the number of direct modifiers of the noun phrase head realized as postmodifying prepositional phrases, is set to 0; P_DM, the next empty postmodifying DM in Cur-S-R[TEXT, DM], is set to 1; M-Lim, the order number of the current direct modifier being processed, is set to 1; P1-Max, the number of direct modifiers of the noun head which are to be realized as postmodifying prepositions, is set to the number of 1's in Prep-Real[1, 1 to Dn-Mod]; and Prep-No, the number of postmodifying prepositions realized, is set to 0. After 200592, 200594 sets Cur-Mod to M-Order[1, M-Lim]. After 200594, 200596 is next, and is true if Prep-Real[1, Cur-Mod] equals 1. If 200596 is false, Cur-Mod is not realized as a prepositional phrase, and 200636 is next. 200636 is true if M-Lim equals Dn-Mod. If 200636 is false, there are other direct modifiers of the noun phrase head, and 200638 increments M-Lim by 1. After 200638, 200594 is next as described above. If 200596 is true, 200598 sets up Cur-Mod to be processed for a prepositional realization. 200598 sets P-Max to P1-Max. P-Max is used to store the number of prepositional phrases at the same modifier level. When P-Max is greater than 1, comma punctuation and "and" conjunction placement is performed. 200598 sets Cur-P, the current prepositional phrase ordinal number at the current modifier level, is set to CurP1+1; CurP1 is set to Cur-P; U-Ent, the largest entry number containing modifiers of Cur-Mod, is set to Up-Ent[Cur-Mod]; U-N-Mod, the number of modifiers in U-Ent, is set to Cur-S-R[MODIFIER, U-Ent, 0]; U-Mod, the modifier number of the last, i.e., the left most, modifier in U-Ent, is set to M-Order[U-Ent, U-N-Mod]; L_DM, the leftmost array position number of Cur-Mod and its premodifiers in Cur-S-R[TEXT, text range], is set to Cur-S-R[BWORD, U-Ent, U-Mod, 0]+1; R DM, the rightmost array position of the Cur-Mod sub-noun phrase and the position of Cur-Mod, is set to Cur-S-R [BWORD, 1, Cur-Mod, 0]; Prep-Form, the temporary text pointer storage vector, is cleared to 0; HD-WS, the selected word sense number of Cur-Mod, is set to Cur-S-R[Seld-WS, 1, Cur-Mod]; Prep-Form[0], the location of Cur-Mod's text pointer, is set to Cur-S-R[BWORD, 1, Cur-Mod, HD-WS]; P-Cnt, the number of prepositions to be realized at a given modifier level, is set to 0; Prep-No is incremented by 1; P_F_L, the next empty position at the left for Prep-Form, is set to −1; PFL, the leftmost filled position in Prep-Form, is set to 0; P_F_R, the next empty position at the right for Prep-Form, is set to 1; C-DM, the order number of the current modifier, is set to 1; Cur-Ent, the entry number of the direct modifiers of Cur-Mod, is set to Cur-S-R[Mod-Loc, 1, Cur-Mod]; Pre-Ent, the previous entry number, is set to 1; Pre-Mod is set to Cur-Mod; Cn-Mod, the number of direct modifiers of Cur-Mod, is set to Cur-S-R[MODIFIER, Cur-Ent, 0]; and 200598 sets M-Order[Cur-Ent, Cn-Mod+1] to L_DM.

After 200598, 200616 is next, and is true if Cur-Ent equals 0; If 200616 is false, Cur-Mod has direct modifiers, and 200600 is next. 200600 sets C-Mod, the current modifier number, to M-Order[Cur-Ent, C-DM]; Nx-Mod is set to M-Order[Cur-Ent, C-DM+1]; and CR_DM, the rightmost position of C-MOD in Cur-S-R[TEXT, text range] is set to Cur-S-R[BWORD, Cur-Ent, C-MOD, 0]. After 200600, 200602 is next, and is true if C-DM equals Cn-Mod. If 200602 is true, C-Mod is the leftmost modifier of its modifiee, and the C-Mod sub-noun phrase's leftmost position is L_DM. If 200602 is true, 200604 sets CL_DM, the current leftmost position of modifiers of Pre-Mod, to Nx-Mod which equals L_DM. If 200602 is false, 200604 sets CL_DM to Cur-S-R[BWORD, Cur-Ent, Nx-Mod, 0]+1, which is one position to the right of the next modifier in Cur-Ent. After 200604 or 200606, 200608 is next, and is true if Prep-Real[Cur-Ent, C-Mod] equals 1. 200608 is true if C-Mod is to be realized as a prepositional phrase. If 200608 is false, 200612 transfers text from Cur-S-R[TEXT, text range] to the left of Pre-Mod's positions in Prep-Form. 200612 sets Prep-Form[CL_DM–CR_DM+P_F_L to P_F_L] to Cur-S-R[TEXT, CL_DM to CR_DM], and sets P_F_L to P_F_L+(CL_DM–CR_DM)–1, the next empty position on the left in Prep-Form. If 200608 is true, 200610 stores C-Mod for realization as a prepositional phrase. 200610 increments P-Cnt by 1, P-Stor[Cur-Ent, P-Cnt] is set to C-Mod. After 200610 or 200612, 200614 is next, and is true if Cn-Mod is greater than C-DM. If 200614 is true, 200617 is next, and is true if Pre-Ent equals 1. If 200617 is true, the direct modifiers of Cur-Mod have been processed, and P_F_L+1 contains the leftmost position in Prep-Form since all direct modifiers of Cur-Mod which are realized as premodifiers have been placed in Prep-Form. All other modifiers of Cur-Mod will be processed as postmodifiers. If 200617 is true, 200619 sets PFL to the MIN[PFL, P_F_L+1]. 200619 sets PFL for the case when the modifiee is a direct modifiee of the noun phrase head. The MIN function ensures that PFL has the minimum value at 200619. The minimum value at 200619 is leftmost filled position in Prep-Form. If 200614 is false, there is another unprocessed modifier in Cur-Ent, and 200615 is next. 200615 increments C-DM by 1, and sets processing to continue at 200600 as described above to process the next modifier.

Postmodifying Preposition Generation

If the current modifier has been processed for all of its direct modifiers, 200618 is next. 200618 is next if 200614 or 200616 is true, or after 200659 which is described below. 200618 begins a process of Postmodifying Preposition Generation. This process selects the preposition and other related function words for the current modifier. 200618 sets Cur-WS to Cur-S-R[WORDSET, Pre-Ent, Pre-Mod, HD-WS]; B-Word-No is set Cur-S-R[BWORD, Pre-Ent, Pre-Mod, HD-WS]; INC is set to the number of Cur-WS in Cur-S-R [WORDSET, Pre-Ent, Cur-Ent, HD-WS to HD-WS+INC–1]; Cur-Add is set to the address with a prepositional partition in Cur-S-R[ADDRESS, Pre-Ent, Pre-Mod, HD-WS to HD-WS+INC–1]; Det-Sel is set to false; C-WDSN, the word sense number of the current modifier, is set to Cur-S-R[MODIFIER, Pre-Ent, Pre-Mod]; Prep-Func is set to the function word of the preposition selected at Cur-Add by Cur-App[Prep-Sel] which chooses a preposition among the set of prepositions associated with Cur-Add using some criteria associated with Cur-App; Prep-Text is set to the text associated with Prep-Func; and Cur-DM is set Cur-S-R[BWORD, Pre-Ent, Pre-Mod, 0].

After 200618, 200620 is next, and is true if Cur-S-R [TEXT, Cur-DM] has one or more function words stored there. If 200620 is true, 200622 adds the function words at Cur-S-R[TEXT, Cur-Dm] to Prep-Text. If 200620 is false, 200624 is next, and is true if there is a determiner anomaly at B-Word-No for Cur-WS, C-WDSN and Prep-Func. If 200624 is true, Cur-Der is set to the result of evaluating the anomaly function at B-Word-No, and Det-Sel is set to true. After 200622, or 200626, or if 200624 is false, 200628 sets Cur-Rel to Cur-S-R[RELATION, Pre-Ent, Pre-Mod], and sets Cur-FWS to the result of evaluating functions of Cur-Rel, Prep-Func for the value of Det-Sel and C-WDSN. These functions select the determiner based upon its previous selection as determined by Det-Sel. If the determiner is not selected at 200626, i.e., Det-Sel is false, a determiner for Prep-Func and C-WDSN is selected 200628. If Cur-Rel has a relation value, and this value is not standard, 200628 evaluates a function associated with Cur-Rel to select a degree adverb to modify the preposition. After 200628, 200630 places the function words in Cur-FWS into Prep-Text. After 200630, 200631 is next, and is true if P-Max is greater than 1, and if Cur-P equals P-Max. 200631 is true when there are more than one prepositional modifiers at the same modifier level, and the current modifier is the last preposition at this modifier level. If 200631 is true, 200632 inserts "and" at the beginning of Prep-Text. If 200631 is false, 200633 is next, and is true if P-Max is greater than 2. If 200633 is true, 200634 inserts a comma at the end of Prep-Form[P_F_R]. After 200632 or 200634, or if 200633 is false, 200635 places Prep-Text at the beginning of the text at Prep-Form[P_F_L+1] which is the leftmost position containing text of the modifier being processed. 200635 completes the postmodifying prepositional phrase generation for a modifier in a noun phrase. After 200635, 200644 is next.

Next Modifier Selection for Postmodifying Preposition Processing

Next Modifier Selection for Postmodifying Preposition Processing begins at 200644. 200644 is true if P-Cnt equals 0. If P-Cnt does not equal zero, 200644 is true, and Cur-Ent has P-Cnt modifiers which are to be realized as a prepositional phrase, and 200655 sets up the first prepositional modifier to be processed. The first prepositional modifier is the next modifier in the proper order to be processed for text generation. If 200644 is false, 200655 sets P-Max to Cur-P; Cur-P is set to 1; P-Stor[Cur-Ent, 0] is set to P-Max; P-Stor[Cur-Ent, –1] is set to Cur-P; Pre-Ent is set to Cur-Ent; and Pre-Mod is set to P-Stor[Pre-Ent, Cur-P]. After 200655, 200656 sets the direct modifiers of Pre-Mod to be processed eventually at 200600 as described above. 200656 also sets up parameters for Pre-Mod to be stored in Prep-Form. 200656 sets Cur-Ent to Cur-S-R[Mod-Loc, Pre-Ent, Pre-Mod]; Cn-Mod is set to Cur-S-R[Modifier, Cur-Ent, 0]; CD-M is set to 1; P-Cnt is set to 0; Cpn-Mod, the number of modifiers in Pre-Ent, is set to Cur-S-R[MODIFIER, Pre-Ent, 0]; HD-WS is set to Cur-S-R[Seld-WS, Pre-Ent, Pre-Mod]; PR_DM, the rightmost DM of Pre-Mod, is set to Cur-S-R[BWORD, Pre-Ent, Pre-Mod, 0]; X is set to a value such that M-Order[Pre-Ent, X] equals Pre-Mod; and Nx-Mod is set to M-Order[Pre-Ent, X+1], the next position in M-Order after Pre-Mod assuming that Pre-Mod is not the last modifier by order in Pre-Ent.

After 200656, the next process is to set up Prep-Form to store the direct modifiers, if any, of Pre-Mod, and to store Pre-Mod in Prep-Form. 200657 is next, and is true if Cur-Ent equals 0. 200657 is true if Pre-Mod has no modifiers. If 200657 is true, 200659 sets Prep-Form[P_F_R] to Cur-S-R[BWORD, Pre-Ent, Pre-Mod, HD-WS]; P_F_L is set to P_F_R minus 1; P_F_R is incremented by 1; Prep-No is incremented by 1; and 200659 sets processing to continue at 200618 as described above. 200659 sets a modifier which is realized as a postmodifying prepositional phrase and which has no modifiers to be stored at the next available position on the right in Prep-Form.

If 200657 is false, 200658 is next, and is true if X equals Cpn-Mod. If 200658 is false, Pre-Mod is not last modifier in order in Pre-Ent, and 200661 sets PL_DM to Cur-S-R [BWORD, Pre-Ent, Nx-Mod, 0]+1, which is the position after the modifier in Pre-Ent which is to the left of Pre-Mod and its modifiers. If 200658 is true, Pre-Mod is the leftmost modifier at its modifier level, and its preceding modifier is determined with a process starting at 200660. 200660 sets C-Ent to Pre-Ent, and sets C-N-M to Cpn-Mod. After

200660, 200662 determines the entry number and modifier number of the direct modifiee of the current modifier under process. 200662 is iterated until a modifiee which is not the leftmost modifier in its modifier level is found, or until a direct modifier of the head of the noun phrase is reached. The leftmost modifier in its level is to the right of Pre-Mod, and it cannot be used to determine the leftmost modifier position of Pre-Mod. If a direct modifier of the head is reached, the position of the leftmost modifier of Pre-Mod is L_DM, the leftmost position of the direct sub-noun phrase being processed. 200662 sets P-Ent to Cur-S-R[MODIFIER, C-Ent, C-N-M+1], the entry number containing modifiees of modifiers in C-Ent; P-Mod is set to Cur-S-R[MODIFIER, C-Ent, C-N-M+2], the modifier number of the modifiee of the modifier under process in C-Ent; C-N-M is set to Cur-S-R[Modifier, P-Ent, 0], the number of modifiers in P-Ent; Cx-Mod is set to M-Order[Pre-Ent, C-N-M], the modifier of the last ordered modifier in Pre-Ent; and 200662 sets C-Ent to P-Ent. After 200662, 200664 is next, and is true if P-Mod equals Cx-Mod. If 200664 is true, P-Mod is the last modifier in P-Ent, and the modifiee of P-Mod must be checked to determine the leftmost modifier position of Pre-Mod. If 200664 is true, 200668 is next, and is true if P-Ent equals 1. If 200668 is true, the leftmost modifier position of Pre-Mod is L_DM, and 200670 sets PL_DM to L_DM. If 200668 is false, 200662 checks the next modifiee at 200662 as described above. If 200664 is false, P-Mod is not the last ordered modifier in P-Ent, and its following modifier position plus one is the leftmost modifier position of Pre-Mod. If 200664 is false, 200666 sets Y to a value such that M-Order[Pre-Ent, Y] equals P-Mod; Nxp-Mod is set to M-Order[P-Ent, Y+1]; and PL_DM is set to Cur-S-R [BWORD, P-Ent, Nxp-Mod, 0]+1; After 200661, 200666, or 200670, 200672 adjusts P_F_L and P_F_R, and stores Pre-Mod in Prep-Form. P_F_R is adjusted so that there is enough empty space in Prep-Form to store all of Pre-Mod's premodifiers if necessary. Note that PR-DM and PL_DM are negative numbers with PL_DM less than PR_DM. 200672 sets P_F_R to PR_DM-PL_DM+1+P_F_R; P_F_L is set to P_F_R−2, which is one space to the left of the location where Pre-Mod is to be stored; Prep-Form [P_F_L+1] is set to Cur-S-R[BWORD, Pre-Ent, Pre-Mod, HD-WS]; Prep-No is incremented by 1; and M-Order[Cur-Ent, Cn-Mod+1] is set to PL DM in order to set up M-Order for setting Nx-Mod at 200600. After 200672, 200600 is next, and processes the modifiers of Pre-Mod in Cur-Ent as described above.

If P-Cnt equals 0 at 200644, 200644 is true. If P-Cnt equals 0, Cur-Ent has no modifiers which are to be realized as a prepositional phrase, and 200646 is next. 200646 is true if Pre-Ent equals 1. If 200646 is false, there possibly are unprocessed modifiers in Pre-Ent. If 200646 is false, 200648 is next, and is true if Cur-P equals P-Max. If 200648 is false, there is another modifier in Pre-Ent which is to be realized as a prepositional phrase, and 200650 is next. 200650 increments Cur-P by 1; Pre-Mod is set to P-Stor[Pre-Ent, Cur-P]; and P-Stor[Pre-Ent, −1] is set to Cur-P. 200650 sets up the next modifier in Pre-Ent to be realized as a prepositional phrase, and 200656 is next as described above. If 200648 is true, all modifiers in Pre-Ent have been processed for prepositional realization, and 200652 is next. 200652 sets up the next unprocessed direct modifiee of modifiers of Pre-Ent to be processed. This next unprocessed modifiee is the next one in proper order to be processed. 200652 sets Cur-Ent to Pre-Ent; C-N-Mod is set to Cur-S-R[MODIFIER, Cur-Ent, 0], the number of modifiers in Cur-Ent; Pre-Ent is set to Cur-S-R[MODIFIER, Cur-Ent, Cn-Mod+1], the entry number of Cur-Ent's modifiee; Cur-P is set to P-Stor[Pre-Ent, −1], the P-Stor matrix column number of the last processed modifier for the Pre-Ent row; and P-Max is set to P-Stor[Pre-Ent, 0], the number of modifiers to be processed for prepositional phrase realization for Pre-Ent. After 200652, 200646 is next as described above.

If 200646 is true, direct equals one, and Cur-Ent contains direct modifiers of Cur-Mod. Also in this case, all Cur-Ent modifiers have been processed which means that all direct and indirect modifiers of Cur-Mod have been processed for postmodifying prepositional phrase text generation. If 200646 is true, 200654 stores the generated text for the prepositional realization of Cur-Mod and its modifiers. 200654 blanks Cur-S-R[TEXT, L_DM to R_DM] which contained the premodifier text realization of Cur-Mod and its modifiers; Tx_Cnt is set to R_DM−L_DM+1, a positive number and the number of memory location pointers comprising Cur-Mod and its modifiers' text realization; Prep-Form[PFL to P_F_R−1] is compressed to Prep-Form[Tx-Cnt−1 to 0]; Cur-S-R[TEXT, P_DM to (P_DM+Tx_Cnt−1)] is set to Prep-Form[Tx_Cnt−1 to 0]; and P_DM, the next available postmodifying position in Cur-S-R[TEXT, text range], is set to the sum of P_DM and Tx_Cnt. Note that P_DM is a positive number. After 200654, 200636 is next, and is true if M-Lim equals Dn-Mod. If 200636 is false, the next direct modifier of the noun phrase head is processed starting at 200638 as described above. If 200636 is true, all such direct modifiers have been processed, and 200640 compresses Cur-S-R[TEXT, −DMAX to P_DM−1] to Cur-S-R[TEXT, −DMAX to 0]. After 200640, or if 200590 is false because there are no postmodifying prepositions to be processed, processing continues at 200674 which begins separate noun phrase processing.

Separate Noun Phrase Processing

Separate Noun Phrase Processing processes modifiers which could not be realized for modifying their modifiee at 200476, or modifiers which could not be realized as postmodifying prepositional phrases at 200574. An example of a noun phrase requiring separate modifiers is described above. Such modifiers can likely be realized as separate noun phrases because other realization decisions which prevented such modifiers from being realized in a single noun phrase can be replaced with realization decisions which allow such modifiers to be realized. Separate Noun Phrase Processing utilizes a classifying purpose which decides the realization of each separate noun phrase. One class of separate noun phrase realization is a realization in the current sentence. Such realizations include: an appositive noun phrase to the original noun phrase which contained the separate modifier, and a relative clause modifying the original noun phrase. The other class of separate noun phrase realization is a realization in a different sentence. Separate Noun Phrase Processing begins at 200674.

200674 is true if Sep-Mod equals 0. If 200674 is true, there are no separate modifiers, and 200692 sets processing to continue at 200700 which completes the processing of a sentence role, selects the next process to be performed, and is described below. If 200674 is false, 200676 sets up parameters for separate noun phrase classification purposes. 200676 sets Cur-Sep, the current entry in the Separate-Mod, to 1; C-Parm-N[CLAUSE] is set to Cur-Cla-Add; C-Parm-N[APP] is set to Cur-App; C-Parm-N[PREPS] is set to Prep-No, the number of realized prepositions in the current noun phrase; C-Parm-N[SEP-M] is set to Sep-Mod, the number of separated modifiers; C-Parm-N[S-R] is set to the sentence role of Cur-S-R; C-Parm-N[Cla-Mod] is set to the number of clause modifiers of T-Cur-Source-Head; C-Parm- N[N-O-Pos] is set to Nex-O-Pos, the current position in Next-Out; RS is set to false; RETURN is set to 200682; and CLASS is set to SEP-N-MOD-EXP-PREF.

After 200676, 200680 sets up parameters which are specific the current separated modifier being processed. 200680 sets C-Parm-N[S-Mod-N] to Cur-Sep; Clause-Add, a return parameter from the classifying purpose which indicates if a clause realization is used, is set to 0; Sent-Role, a return parameter from the classifying purpose which indicates if the sentence role to contain the separated modifier, is set to 0; TEMPLATE, a return parameter from the classifying purpose which contains the parameters and values to set up the realization of the separate modifier, is set to 0; Sep-Mod-Ent, the entry number of the separated modifier, is set to Separate-Mod[Cur-Sep, ENT-NO]; Sep-Mod-Mod, the modifier number of the separated modifier, is set to Separate-Mod[Cur-Sep, MOD-NO]; Sep-Mod-NMod, the number of modifiers in Sep-Mod-Ent, is set to Cur-S-R [MODIFIER, Sep-Mod-Ent, 0]; Sep-Mod-W, the word sense number of the current separated modifier, is set to Cur-S-R[MODIFIER, Sep-Mod-Ent, Sep-Mod-Mod]; Sep-ME-Ent, the entry number of the separated modifier's modifiee, is set to Cur-S-R[MODIFIER, Sep-Mod-Ent, Sep-Mod-NMod+1]; Sep-ME-Mod, the modifier number of the separated modifier's modifiee, is set to Cur-S-R [MODIFIER, Sep-Mod-Ent, Sep-Mod-NMod+2]; Sep-ME-W, the word sense number of the separated modifier's modifiee, is set to Cur-S-R[MODIFIER, Sep-Mod-Ent, Sep-Mod-Mod]; and 200680 calls 140[CLASSIFY, CLASS, RS, Sep-ME-W, RETURN], the classifying purpose for separate modifier expression preference.

After the classifying purpose has completed the determination of the preferred expression for the current separated modifier, 200682 increments Cur-Sep by 1; Cur-Sep-Head is set to Sep-ME-W plus (Sep-Mod-W plus the word sense numbers of all the direct and indirect modifiers of Sep-Mod-W). After 200682, 200684 sets Next-Out[TEMPLATE[Sent-Role], TEMPLATE[N-O-P]] to Cur-Sep-Head. TEMPLATE [Sent-Role] is the sentence role of Cur-Sep-Head. TEMPLATE[N-O-P] is the position in Next-Out for storing Cur-Sep-Head. If Cur-Sep-Head is to be stored in the current sentence, TEMPLATE[N-O-P] is Nex-O-Pos. Otherwise TEMPLATE[N-O-P] is End-Pos+1. After 200684, 200686 is next, and is true if Clause-Add equals 0. If 200686 is true, the separate modifier noun phrase realization is realized in the current sentence as a noun phrase. If 200686 is false, the separate modifier noun phrase is realized as a clause modifier in the current sentence, or is implemented in a separate sentence, and 200688 is next. 200688 increments End-Pos, the last filled position in Next-Out, by 1; Next-Out [Associated value names, End-Pos] is set to the stored Next-Out value names and their associated parameters and values in TEMPLATE; Cla-Pos is set to TEMPLATE [Clause-Realization-Position]; append TEMPLATE[Clause-Parse-Add] to SDSO[Next-S, Cla-Pos, ADD]; append TEMPLATE[Imp-Vec] to SDSO[Next-S, Cla-Pos, Pref-Imp]; append End-Pos to SDSO[Next-S, Cla-Pos, N-O-Pos]; and A-S-C-Vec[Cla-Pos] is set to 1. Cla-Pos can either be the position of a clause modifier, or it can be a separate sentence which has effectively been added the sentence formed at the Sentence Formation Process described above. After 200686 or 200688, 200690 is next, and is true if Cur-Sep equals Sep-Mod. If 200690 is false, 200680 is next for the next separated modifier as described above. If 200690 is true, 200692 is next, and is true if In-Call is true. If 200692 is true, 200694 sets Cur-S-R[TEXT-Len] to DMAX+1, and returns processing control to the caller. If 200692 is false, processing continues at 200700 as described above. This completes noun phrase text generation processing.

Non-Clausal Adverbial and Verb Phrase Text Generation Processing

Possible Adverbial Realizations Selection

Non-Clausal Adverbial and Verb Phrase Text Generation Processing selects the realization and position for adverbials which are to be realized as function words, morphological words, or prepositional phrases. Clausal adverbials are realized as separate clauses or as morphological words starting at 20072. This process realizes non-clausal adverbial modifiers of verbs or of adjectives. This process also looks up and generates the non-adverbial components of a verb phrase. In this section adverbials will refer to non-clausal adverbials. Adverbial modifiers of verbs in general have multiple positions in the clause where these adverbials can be placed including: INITIAL, which is at the start of the clause; MEDIAL, which includes the position before the verb phrase, positions within the verb phrase, and the position just before the main verb; END, which includes positions after the main verb and the last modifier position of the clause. Adverbial modifiers of adjectives are premodifiers or postmodifiers. One complication of adverbial text generation is that adverbials of a different subclass role which end in "ly" are stylistically objectionable when positioned consecutively, e.g. "consecutively quickly". The adverbial text generation processing attempts to place multiple adverbials with "ly" suffixes in different positions. However, if different positions are not possible, such multiple adverbials are placed consecutively. Non-Clausal Adverbial and Verb Phrase Text Generation Processing is initiated for verb phrases if the Cur-S-R head type is a verb at 20094 which makes 20094 true. If 20094 is true, 20095 sets In-Call and A-Call to false, and sets processing to continue at 200800. This processing is also initiated from Adjective Text Generation Processing at 200948 which is described below. 200800 begins Non-Clausal Adverbial and Verb Phrase Text Generation, and is true if Cur-Source has a text realization. If 200800 is true, 200802 sets DMAX to the number of words in Cur-Source minus one; Cur-S-R[TEXT, −DMAX to 0] is set to the text at Cur-Source; and processing is set to continue at 200700 which is described below. If 200800 is false, 200804 sets V-Source-Head to Cur-Source-Head. After 200804, 200806 is next, and is true if V-Source-Head has a Base-Word-Set. If 200806 is false, 200808 sets Base-Word-Set to text base words and associated affixes (if any) of V-Source-Head from 20 and tense codes. After 200808, 200810 is next, and is true if Base-Word-Set is empty. If 200810 is true, 200816 informs the Communication Manager of a base word selection error for V-Source-Head. If 200810 is false, or if 200806 is true, 200812 is next, and is true if V-Source-Head is in 120. If 200812 is true, 200814 orders Base-Word-Set with the most recently referenced first order policy. After 200814, or if 200812 is false, 200820 sets V-Base-Word-Set to Base-Word-Set; V-Wordset is set to 0; V-S-R-Add is set to Cur-S-R-Add; and V-S-R is set to Cur-S-R. These variables are set to V- variables to distinguish them because the non-V-variables are altered if there are prepositional adverbials.

After 200820, 200822 selects a wordset for V-Source-Head which is used to determine compatibility with the modifiers of V-Source-Head. 200822 sets all direct, adverbial modifiers of V-Source-Head to unprocessed, and sets V-Wordset to the next untried wordset plus associated affix code (if any) and/or tense code of a word in V-Base-Word-Set which is stored at an untried address in V-S-R-Add.

Tried addresses in V-S-R-Add have failed text generation in previous processing of V-Source-Head. After 200822, 200824 is next, and is true if V-Wordset equals 0. If 200824 is true, 200826 informs the Communication Manager of a wordset selection error for V-Source-Head. If 200824 is false, 200828 is next, and is true if V-Source-Head has no modifiers. If 200828 is true, processing continues at 200918 which is described below. If 200828 is false, 200832 sets V-Mod-Add-Set to the set of addresses at V-S-R-Add[V-Wordset] for adverbial modifiers at the various modifier positions allowed for V-Wordset; V-Mod-Pos-Set[POS, POS-Range] is set to 1 at allowed modifier positions for V-S-R-Add in POS-Range, the set of possible modifier positions for V-Source-Head; modifier positions which are not allowed are set to 0; and V-Mod-Pos-Set[SUB, POS-Range, 0] the number of modifiers at each position, is set to 0. A modifier position is not allowed if its position does not exist. For example, a verb phrase can have a medial adverbial modifier position after each auxiliary verb. Thus, the allowed medial positions are dependent upon the number of auxiliary verbs. The number of auxiliary verbs has been determined previously with the selection of a tense code. After 200832, 200834 is next, and is true if Cur-App[V-Ex] is true, 200834 is true when Cur-App has its own expression process for adjective or verb phrase text generation. If 200834 is true, 200836 sets 200-RETURN to 200700; and calls Cur-App[V-Ex-Pro, V-Source-Head, 200-RETURN].

If 200834 is false, 200838 selects the possible adverbial text realizations for the next unprocessed adverbial modifier. 200838 sets V-Mod to the next, unprocessed, adverbial subclass of a direct adverbial modifier of V-Source-Head; V-Mod-Real-Add[0], the address of the first realization of V-Mod, is set to ADV-Sub-Real-Add-Func[V-Mod, Cur-App, ADD] which is the result of a function which composes and orders the adverbial realizations of V-Mod according to parameters set for Cur-App, stores the realizations in a temporary memory, and returns the first address of a realization in this memory; V-Mod-Real-Len, the number of realization addresses for V-Mod, is set to ADV-Sub-Real-Add-Func[V-Mod, Cur-App, LEN] which is a return parameter of the previously described function; ADV-Add, an array variable of V-Mod-Real-Add, is set to −1; LY-WS, which is true when multiple adverbials ending in "ly" can occur at the some modifier position, is set to false. Adverbial subclasses can be realized as function words, morphological words, and/or adverbial prepositions. If V-Mod's adverbial subclass does not have a state representation word as the source, V-Mod's adverbial subclass has its function word realizations looked up by ADV-Sub-Real-Add-Func in a table containing function word realizations organized and accessible with adverbial subclass semantic roles. If V-Mod's adverbial subclass does have a state representation word as the source, V-Mod's adverbial subclass has its function word realizations, morphological realizations, and/or prepositional realizations looked up by ADV-Sub-Real-Add-Func in a table. This table is also organized by adverbial subclass semantic role. However, function word realization entries in the table have source word requirements for state representation word sources which must be met by V-Mod's source state representation word. Function word entries contain function word wordsets. Morphological entries contain specifications. Prepositional entries contain relation type codes. An order policy of Cur-App is utilized to order the function word, morphological and/or prepositional realizations of V-Mod. After 200838, 200840 increments ADV-Add by 1. After 200840, 200842 is next, and is true if ADV-Add is greater than V-Mod-Real-Len. If 200842 is true, 200844 is next, and is true if LY-WS is true. If 200844 is true, processing continues at 200898 which sets a stylistically challenged combination of adverbials with "ly" endings at the same modifier position, and which is described below. In this case, style is sacrificed over realization. If 200844 is false, 200847 sets V-Wordset to 0, and 200822 selects another wordset if possible as described above. IF 200842 is false, 200846 sets Cur-Real is set to V-Mod-Real-Add[ADV-Add].

Function Word Realization Processing of an Adverbial

After 200846, 200848 is next, and is true if Cur-Real points to a function wordset. If 200848 is true, the Function Word Realization Processing of an Adverbial process begins at 200849. This process determines if the function wordset is allowed, and if so, generates the text and degree adverbial modifiers of V-Mod. 200849 is true if the wordset at Cur-Real matches an entry at V-Mod-Add-Set which is true if there is at least one modifier position of V-Source-Head which syntactically allows the wordset. If 200849 is false, 200840 increments ADV-Add for the next realization as described above. If 200849 is true, 200850 sets Cur-V-WS to the wordset at Cur-Real; and sets Text-Form to the text representation of Cur-V-WS in Dictionary 20. After 200850, 200851 sets POS to the modifier position number of the first V-Mod-Add-Set address which contains Cur-V-WS. After 200851, 200852 stores the Cur-Real realization. 200852 sets AV-No to V-Mod-Pos-Set[SUB, POS, 0]+1; V-Mod-Pos-Set [SUB, POS, 0] is set to AV-No. V-Mod-Pos-Set[SUB, POS, AV-No] is set to V-Mod; Tex-Len is set to the number of words in Text-Form; and VAL is set to V-Mod's adverbial subclass value. After 200852, 200854 is next, and is true if VAL is not a typical value for V-Mod. If 200854 is true, V-Mod requires a degree adverb to set the text realization of V-Mod to have the proper adverbial subclass value, and 200856 is next. 200856 sets Deg-AV-Text to the text form returned from D-AV-Func[V-Mod, VAL, Cur-V-WS] a function which looks up the text of the degree adverb which is compatible with Cur-V-WS to set the adverbial subclass value, VAL. 200856 also combines Deg-AV-Text with Text-Form, and increases Tex-Len by the number of words in Deg-AV-Text. After 200856, or if 200854 is false, 200858 sets V-Mod-Pos-Set[TEXT, POS, AV-No, -Tex-Len+1 to 0] to contain the words of Text-Form and sets V-Mod-Pos-Set [TEXT, POS, AV-No, 0] to Tex-Len. After 200858, 200859 is next, and is true if there is an unprocessed direct modifier of V-Source-Head. If 200859 is true, 200838 starts the processing of the next modifier as described above. If 200859 is false, processing continues at 200918. This completes the description of Function Word Realization of an Adverbial.

Morphological Word Realization Processing of an Adverbial

Morphological Word Realization Processing of an Adverbial determines the possible morphological realizations, determines if such a realization can syntactically be a modifier of V-Source-Head at a modifier position, and attempts to avoid multiple consecutive morphological realizations ending in "ly" at the same modifier position of V-Source-Head. This processing begins when Cur-Real is not an address of function wordset at 200848, and processing continues at 200860. 200860 is true if Cur-Real contains an address to a morphological implementation vector which is either a specified implementation vector or is a standard implementation vector. If 200860 is true, 200862 sets parameters to initiate Morphological Processing which is described above. 200862 sets V-Vec to the implementation vector at Cur-Real or standard vector if there is no implementation vector; Spec-Morph-W is set to V-Vec[STAT];

Cur-Source-Head is set to V-Mod's source word sense number; Cur-S-R-Head type is set to ADVERB; Fail-Return is set to true; Cur-S-R is set to ADVERB-MODIFIER; Morph-Call is set to true; Entry-No is set to 1; 200-RETURN is set to 200864; and 200862 calls 200[200100, V-Vec, 200-RETURN]. After Morphological Processing is completed, 200864 is next, and sets Fail-Return to false. After 200864, 200866 is next, and is true if FAIL is false. If 200866 is false, the morphological processing has been unsuccessful, and processing continues at 200840 as described above. If 200866 is true, 200868 sets AV-Wordset to the union of wordsets plus affix codes associated with text words plus text affix sets in Base-Word-Set which are also contained in an address of V-Mod-Add-Set; and BW-Set is set to the base words plus text affixes associated with each wordset in AV-Wordset. After 200868, 200872 sets Cur-V-WS to the next, untried wordset in AV-Wordset, and 200872 forms POS-Vec which is a vector which has 1's set at positions which correspond to modifier positions in POS-Range whose addresses in V-Mod-Add-Set contain Cur-V-WS, and 0's at other positions. After 200872, 200874 is next, and is true if POS-Vec equals 0. If 200874 is true, there are no allowed positions for Cur-V-WS, and 200876 is next. 200876 is true if AV-Wordset has an untried wordset. If 200876 is true, 200872 is next as described above. If 200876 is false, processing continues at 200840 as described above.

If 200874 is false, 200878 sets POS to the next untried position in the current POS-Vec. After 200878, 200879 is true if A-Call is true. A-Call is true when Non-Clausal Adverbial and Verb Phrase Text Generation Processing is initiated from Adjective Phrase Text Generation Processing, which is described below. If 200879 is false, then an attempt to avoid consecutive text generation of adverbials at the same position is started. If 200879 is true, this attempt is not possible since an adjective only has a premodifying modifier position for morphologically realized adverbs in English. If 200879 is false, 200880 is next, and is true if Cur-V-WS has an entry in BW-Set without a "ly" ending suffix. If 200880 is false, 200882 is next, and is true if V-Mod-Pos-Set[TEXT, POS, all active AV-No's for this value of POS, corresponding text items] has a final word in a text item with an ending "ly" suffix. All active AV-No's are between 1 and V-Mod-Pos-Set[Sub, POS, 0]. If V-Mod-Pos-Set[Sub, POS, 0] is less than 1, there are no active AV-No's. If 200882 is true, 200884 is next, and is true if such a text item which makes 200882 true has its adverbial subclass semantic role equal to V-Mod's adverbial subclass semantic role. If 200884 is true, the consecutive adverbials ending in an "ly" suffix have the same adverbial subclass role, and such consecutive adverbials are stylistically allowed. Also, such adverbials are combined with an "and" conjunction as is described below. If 200879, 200880, or 200884 is true, or if 200882 is false, the realization of V-Mod can be placed at the POS modifier position, and 200886 is next. 200886 sets Text-Form to the first base word without an ending "ly" suffix in BW-Set associated with Cur-V-WS if possible, or to the first base word plus text affix set in BW-Set associated with Cur-V-WS otherwise. 200886 also sets processing to continue at 200852 which is described above.

If 200884 is false, the realization of V-Mod is not stylistically accepted except if there is not another realization choice, and 200888 is next. 200888 is true if LY-WS is false. If 200888 is true, this is the first POS where an "ly" ending suffix realization has failed, and 200890 stores information to utilize this realization in the case where no other realization is possible. 200890 sets LY-WS to true; POS-LY is set to POS, and LY-Text is set to the first entry in BW-Set associated with Cur-V-WS. If all other realizations of V-Mod fail, and LY-WS is true at 200844, 200898 is next as described above. 200898 sets POS to POS-LY; Text-Form is set to LY-Text; and 200898 sets processing to continue at 200852 which is described above. If 200888 is false, or after 200890, 200892 is next, and is true if POS-Vec has an untried position. If 200892 is true, 200878 is next as described above. If 200892 is false, processing continues at 200876 which is described above. This completes the description of Morphological Word Realization of an Adverbial Processing.

Prepositional Phrase Realization Processing of an Adverbial

Prepositional Phrase Realization Processing of an Adverbial determines a prepositional realization of V-Mod if possible. This processing first determines if V-Mod's adverbial subclass source requires morphological processing to convert the source into a noun; next, Noun Phrase Text Generation processing is utilized to generate the text realization of a adverbial subclass noun phrase; finally, the function words, except for any required degree adverb modification of the preposition, are generated. This processing is initiated when 200860 is false because Cur-Real does not contain an address to a morphological implementation vector. If 200860 is false, 200870 sets Mod-Type to ADVERBIAL, and sets processing to continue at 200900. Mod-Type is used to differentiate between Prepositional Phrase Realization of an Adverbial Processing of a modifier modifying an adjective and a modifier modifying a verb. The former case is initiated from Adjective Phrase Text Generation processing. Both types of modifiers utilize the same process to select the prepositional object noun phrase, but each type of modifier has its own preposition text generation process.

200900 sets up parameters for Noun Phrase Text Generation and/or Morphological Processing. 200900 sets Cur-Source-Head to V-Mod's adverbial subclass source's word sense number, V-Mod's modifiers and function word vectors (if any); Cur-S-R-Add is set to the addresses of Mod-Type prepositional complements at allowed modifier positions of V-Source-Head; Cur-S-R is set to a prepositional complement of Mod-Type; and Cur-Source is set to V-Mod. After 200900, 200902 is next, and is true if the Cur-Source-Head type is a noun. If 200902 is false, 200904 sets up Cur-Source-Head for Morphological Processing. 200904 sets V-Vec to the implementation vector associated with Cur-Source-Head, or to a standard vector if there is none; Spec-Morph-W is set to V-Vec[STAT]; Cur-S-R-Head type is set to NOUN; Fail-Return is set to true; Morph-Call is set to true; Entry-No is set to 1; 200-RETURN is set to 200906; and 200904 calls 200[200100, V-Vec, 200-RETURN]. After Morphological Processing is completed, 200906 is next, and is true if FAIL is false. If 200906 is false, Morphological Processing has failed, and 200907 is next. 200907 is true if Mod-Type equals ADVERBIAL. If 200907 is true, processing continues at 200840 which is described above. If 200907 is false, processing continues at 200949 which handles the Morphological Processing failure for Adjective Phrase Text Generation Processing and is described below. If 200902 or 200906 is true, 200910 sets up parameters for Noun Phrase Text Generation Processing. 200910 sets U-C-Mod to Cur-App[U-M]; Fail-Return is set to true; FAIL is set to false; In-Call is set to true; Fail-C is set to false; Init-Head is set to true; Back-Track is set to true; M-Word is set to false; Alt-Real is set to false; Entry-No, N-Mod, and Sep-Mod are set to 0; MOD is set to 1; Cur-S-R[MODIFIER, Entry-No, MOD] is set to Cur-Source-Head's word sense number; Cur-S-R[RELATION, Entry-No, MOD] is set to V-Mod's relation; 200-RETURN is set to 200912; and 200920 calls 200[20088, 200-RETURN].

After Noun Phrase Text Generation Processing is completed, 200912 is next, and is true if Mod-Type is ADVERBIAL. If 200912 is false, processing continues at 200950 which continues Adjective Phrase Text Generation Processing which is described below. If 200912 is true, 200914 is next, and is true if FAIL is false. If 200912 is false, Noun Phrase Text Generation Processing has failed, and processing continues at 200840 which is described above. If 200914 is true, 200916 selects the preposition and other function words for V-Mod's realization. 200916 sets A-Prep-Text to the preposition for Cur-Real's realization as selected by Cur-App[ADV-PREP-Sel] in a method similar to the one at 200618, and to the determiner of Cur-Source-Head's realization in a method similar to the one at 200628 except no degree adverbs are selected. 200916 also sets DMX to Cur-S-R[TEXT-Len] which was determined at Noun Phrase Text Generation Processing; Text-Form is set to A-Prep-Text plus Cur-S-R[TEXT, –DMX+1 to 0]; Tex-Len is set the length of A-Prep-Text plus DMX; Cur-V-WS is set to Cur-S-R[Seld-WS, 0, 1]; and 200916 sets processing to continue at 200851 which is described above. This completes the description of Prepositional Phrase Realization of an Adverbial Processing.

Final Verb Phrase Text Generation Processing

Final Verb Phrase Text Generation Processing generates the verb phrase text for the V-S-R sentence role. This includes generating the verb, the auxiliary verbs as needed, the adverbials which are adjacent to the verb phrase as needed, and generating the adverbials at the beginning and end of the clause containing the V-S-R sentence role as needed. If V-Source-Head has no modifiers at 200828, or if all modifiers have been processed at 200859, 200918 begins Final Verb Phrase Text Generation Processing. 200918 is true if A-Call is false which implies that V-Source-Head is associated with a verb phrase. If 200918 is true, 200920 sets T-Cur-S-R[TEXT, VERB-POS] to the text in V-Base-Word-Set that is associated with V-Wordset; T-Cur-S-R[TEXT, AUX-VERB-POS] is set to the text of auxiliary verbs at their assigned position which is associated with the function wordsets of the address associated with V-Wordset in V-S-R-Add; IMAX, the number of words at the initial adverbial position of a clause, is set to 0; and EMAX, the number of words at the ending adverbial position of a clause, is set to 0. After 200920, or if 200918 is false, 200921 sets A-Mod-S-R[POS-Range] to 0 at each position in POS-Range. After 200921, 200922 is next, and is true if V-Mod-Pos-Set[SUB, POS-Range, 0] is 0 for each position which is possible in POS-RANGE. 200922 is true if there are no adverbial modifiers. If 200922 is false, 200924 sets the next position with adverbials to be processed. 200924 sets AV-No to 0; C-POS is set to the next POS such that V-Mod-Pos-Set [SUB, POS, 0] is not equal to zero; AV-No is set to V-Mod-Pos-Set[SUB, C-POS, 0] if a C-POS is set during this invocation of 200924; and V-Mod-Pos-Set[SUB, C-POS, 0] is set to 0 if a C-POS is set.

After 200924, 200926 is next, and is true if AV-No equals 0. 200926 is true if a C-POS was not set. If 200926 is false, 200928 begins the text generation of the adverbials at C-POS. 200928 orders the adverbials at V-Mod-Pos-Set [SUB, C-POS, 1 to AV-No] by each adverbial's subclass role according to ORDER[SUBCLASS, ENGLISH]. For multiple occurrences of the same subclass role, the adverbial text realization with the shorter Tex-Len is placed before longer text realization lengths. For each multiple occurrence adverbial subclass role, 200928 inserts an "and" at the beginning of the last multiple occurrence adverbial with the same adverbial subclass role. For each multiple occurrence adverbial subclass role, 200928 also inserts commas at the end of the first N–1 adverbials when N, the number of multiple occurrence adverbials with the same adverbial subclass role for the current adverbial subclass role, is greater than 2. After 200928, 200929 sets Tex-Len to the sum of text lengths in V-Mod-Pos-Set[TEXT, C-POS, 1 to AV-No, 0]; A-MOD-S-R[C-POS, -(Tex-Len–1) to 0] is set to the ordered adverbial text realizations of V-Mod-Pos-Set [TEXT, C-POS, ordered Av-No's, text range]; and A-Mod-S-R[C-POS, 0] is set to Tex-Len. After 200929, 200922 is next, and is true if there are unprocessed adverbials as described above.

If 200922 or 200926 is true, all adverbials have been processed for text generation, and 200930 is next. 200930 is true if A-Call is false. If 200930 is false, 200931 returns processing control to the Adjective Phrase Text Generation Process. 200931 sets A-Call to false, and sets processing to continue at A-RETURN. If 200930 is true, 200932 stores the generated text of the processed verb phrase in Cur-S-R. 200932 sets the Cur-S-R data structure to the address of the V-S-R data structure which sets Cur-S-R to the original sentence role; DMAX is set to the sum of words in T-Cur-S-R[TEXT, VERB-POS], T-Cur-S-R[TEXT, AUX-VERB-POS], and A-MOD-S-R[non-zero adjacent modifier positions, text range]; DMAX is decremented by 1; and Cur-S-R[TEXT, –DMAX to 0] is set to the text ordered by position in T-Cur-S-R [TEXT, AUX-VERB-POS], T-Cur-S-R [TEXT, VERB-POS], and A-MOD-S-R[non-zero adjacent modifier positions, text range]. The non-zero adjacent modifier positions are the positions which are adjacent to the verb phrase or in the verb phrase, which had text stored in A-Mod-S-R at 200929, and which are not in the initial or ending positions. After 200932, 200934 is next, and is true if A-Mod-S-R has a modifier position entry for the initial or ending positions. If 200934 is false, processing continues at 200700 which completes the processing of the current sentence role, and which is described below. If 200934 is true, 200938 processes the initial and/or ending position adverbials. 200938 sets IMAX to A-Mod-S-R[INIT, 0], the number of words realizing adverbials at the initial clause position; Cur-S-R-I[TEXT, –IMAX+1 to 0] is set to A-Mod-S-R[INIT, –IMAX+1 to 0] if IMAX is non-zero; Cur-S-R-I[TEXT-Len] is set to IMAX; EMAX is set to A-Mod-S-R [END, 0], the number of words realizing adverbials at the ending clause position; Cur-S-R-E[TEXT, –EMAX+1 to 0] is set to A-Mod-S-R[END, –EMAX+1 to 0] if EMAX is non-zero; Cur-S-R-E[TEXT-Len] is set to EMAX; and 200938 sets processing to continue at 200700 which completes the processing of the current sentence role, and which is described below. This completes the description of Non-Clausal Adverbial and Verb Phrase Text Generation Processing.

Adjective Phrase Text Generation Processing

Adjective Phrase Text Generation Processing generates text for adjective sentence roles. Adjective sentence roles can be modified by adverbials and non-adverbial prepositional phrases. Adverbial modifiers are processed by Non-Clausal Adverbial and Verb Phrase Text Generation Processing as described above. Non-adverbial prepositional phrase complements are processed by Non-Clausal Adverbial and Verb Phrase Text Generation Processing, with the generation of prepositions and other function words performed by Adjective Phrase Text Generation Processing. Finally, Adjective Phrase Text Generation Processing generates the text for the adjective and its modifiers. Adjective phrase processing is initiated if the Cur-S-R head type is not a verb at 20094 which makes 20094 false. If 20094 is false, 20096 sets In-Call to false, and sets processing to continue at 200940.

200940 is true if Cur-Source has a text realization. If 200940 is true, processing continues at 200800 as described above. If 200940 is false, 200942 sets A-Source-Head to Cur-Source-Head; T-Cur-Source-Head is set to Cur-Source-Head; AP, the number of processed non-adverbial prepositional phrase modifiers of A-Source-Head, is set to 0; the contents of Cur-S-R is transferred to A-S-R; and A-P, which is true if there are non-adverbial prepositional phrase modifiers of A-Source-Head, is set to false by default. After 200942, 200943 is next, and is true if Cur-Source-Head has non-adverbial, non-clausal modifiers. 200943 is true if Cur-Source-Head has non-adverbial, prepositional modifiers. If 200943 is true, 200944 sets ADJ-PREP-Set to the non-adverbial, prepositional modifiers of Cur-Source-Head; the modifiers in ADJ-PREP-Set are removed form A-Source-Head; and A-P is set to true. After 200944, or if 200943 is false, 200956 sets up parameters for processing the adverbial modifiers of Cur-Source-Head. 200956 sets A-Call to true; Cur-Source-Head is set to A-Source-Head; A-RETURN is set to 200958; and 200956 sets processing to continue at 200804 which performs Non-Clausal Adverbial and Verb Phrase Text Generation Processing as described above. After this process is completed successfully, 200958 is next. 200958 sets Cur-Source-Head to T-Cur-Source-Head; A-Val is set to the state value of a state adjective Cur-Source-Head or NULL if the head is not an adjective; and A-Cur-S-R [TEXT, ADJ] is set to the text in V-Base-Word-Set associated with V-Wordset. After 200958, 200960 is next, and is true if A-Val is not NULL, and if A-Val is not typical for Cur-Source-Head. If 200960 is true, 200962 determines the degree adverb which sets A-Val for Cur-Source-Head. 200962 sets ADJ-Deg-ADV-Text to D-A-A-Func[Cur-Source-Head, A-Val, V-Wordset], a function which looks up the text of the degree adverb which is compatible with V-Wordset to set the state value of Cur-Source-Head to A-Val. 200962 also sets A-Cur-S-R[TEXT, ADJ] to contain ADJ-Deg-ADV-Text which is inserted at the beginning of A-Cur-S-R[TEXT, ADJ].

After 200962, or if 200960 is false, 200963 is next, and is true if A-P is true. 200963 is true if there are non-adverbial prepositional modifiers of Cur-Source-Head. If 200963 is true, 200965 sets V-Source-Head to T-Cur-Source-Head. After 200965, 200946 is next, and is true if ADJ-PREP-Set has an unprocessed modifier. If 200946 is true, 200948 sets up parameters for the prepositional complement realization component of Non-Clausal Adverbial and Verb Phrase Text Generation Processing to generate the text of the prepositional complement of the next non-adverbial prepositional modifiers of Cur-Source-Head. 200948 sets V-Mod to the next unprocessed modifier in ADJ-PREP-Set; Mod-Type is set to ADJECTIVAL-MOD; AP is incremented by 1; and 200948 sets processing to continue at 200900.

If there is a Morphological Processing error as described at 200906, 200949 is next as described above. 200949 informs the Communication Manager of a morphological processing error for a prepositional complement modifying an adjective. If there is not a Morphological Processing error, 200950 is next after the prepositional complement realization processing started at 200900 is completed. 200950 is true if FAIL is false. If 200950 is false, 200954 sets up parameters for a new wordset to be selected for the adjective phrase head under process. 200954 sets A-Call to true, Cur-Source-Head is set to A-Source-Head; A-RETURN is set to 200958; and 200954 sets processing to continue at 200840 which is described above. If 200950 is true, 200952 stores the text of the current non-adverbial prepositional modifier. 200952 sets ADJ-PREP-Text to the preposition for V-Mod's realization as selected by Cur-App [ADJ-PREP-Sel] in a method similar to the one at 200618, and to the determiner of Cur-Source-Head's realization in a method similar to the one at 200628 except no degree adverbs are selected. 200952 sets DMY to Cur-S-R[TEXT-Len]; P-LGT is set to the number of words in ADJ-PREP-Text; ADJ-PREP-Mod[TEXT, AP, –(P-LGT+DMY–1) to 0] is set to ADJ-PREP-Text combined with Cur-S-R[TEXT, (–DMY+1) to 0]; ADJ-PREP-Mod[TEXT, AP, 0] is set to P-LGT+DMY; ADJ-PREP-Mod[REL-AP, AP, 0] is set to the adjectival prepositional relation of V-Mod. After 200952, 200946 is next as described above.

If all modifiers in ADJ-PREP-Set have been processed, 200946 is false, and processing continues at 200964. 200964 is true if AP is greater than 1. If 200964 is true, the non-adverbial prepositional modifiers are processed for conjunctions and commas at 200966. 200966 sets CP to ADJ-PREP-Mod[TEXT, AP, 0], which is the negative of the next empty text position for text for the AP preposition in ADJ-PREP-Mod; ADJ-PREP-Mod[TEXT, AP, –CP] is set to contain "AND"; and, if AP is greater than 2, 200966 inserts commas at the end of the first (AP–1) prepositional phrases in ADJ-PREP-Mod[TEXT, 1 to (AP–1), 0]. After 200966, or if 200963 or 200964 is false, 200968 combines A-Source-Head and its modifiers into Cur-S-R. 200968 sets the Cur-S-R data structure to contain the contents of the A-S-R data structure; DMAX is set to the sum of the words in A-Cur-S-R[TEXT, ADJ], in the filled positions of A-Mod-S-R adverbials, and in ADJ-PREP-Mod[TEXT, 1 to AP, 0]; DMAX is decremented by 1; Cur-S-R[TEXT, –DMAX to 0] is set to contain in order: A-Mod-S-R[PRE-MOD, text range], the premodifying adverbials of A-Source-Head; A-Cur-S-R[TEXT, ADJ]; A-Mod-S-R[POST-MOD, text range], the postmodifying adverbials of A-Source-Head; ADJ-PREP-Mod[TEXT, 1 to AP, text ranges] the postmodifying non-adverbial prepositional phrase modifiers of A-Source-Head; and A-Mod-S-R[POST-MOD-PREP, text range], the postmodifying prepositional adverbials of A-Source-Head; and 200968 sets processing to continue at 200700 which completes the processing of the current sentence role, and which is described below. This completes the description of Adjective Phrase Text Generation Processing.

Final Sentence Role Text Generation Processing

Final Sentence Role Text Generation Processing completes the processing of a sentence role and selects the next text entity to be processed. This process does ellipsis processing upon a sentence role, processes multiple constituent sentence role heads, adds punctuation, stores the text of the sentence role in the SDS, and selects the next sentence role, the next sentence, or returns processing to the caller of the Text Generation Processing. Final Sentence Role Text Generation Processing starts at 200700, and is initiated at the end of: morphological processing, ellipsis processing, noun phrase processing, verb phrase processing, or adjective phrase processing.

200700 sets up parameters for elliptical processing of the modifiers of the current sentence role. This ellipsis processing looks for such possible ellipsis as replacing modifiers with pronouns. 200700 sets Sentence-Check and Coord-Check to false; Mod-Check and Ellip-Call are set to true; Check-Mod is set to Cur-S-R[TEXT, –DMAX to 0]; RETURN is set to 200702; and 200700 calls 200[200200, RETURN]. After this ellipsis processing, 200702 sets DMAX to the remaining words in Check-Mod; increments DMAX by −1; and compresses and stores Check-Mod at Cur-S-R[TEXT, −DMAX to 0]. After 200702, 200704 is next, and is true if Next-Out[Cur-S-R, Nex-O-Pos] has coordinated heads. If 200704 is true, 200706 is next and is true if Cur-Source is the last head in the sentence role. If 200706 is true, 200708 sets up parameters for elliptical processing of the constituents of the current sentence role for such possible ellipsis as factoring out common modifiers in a multiple constituent sentence role. 200708 sets Sentence-Check and Mod-Check to false; Coord-Check and Ellip-Call are set to true; RETURN is set to 200710; and 200708 calls 200[200200, RETURN]. After this ellipsis processing, 200710 sets DMAX to the remaining words in the sentence role; increments DMAX by −1; and compresses and stores generated text of the sentence role at Cur-S-R[TEXT, −DMAX to 0]; CONJN is set to the text form of the conjunction code at Next-Out[Cur-S-R, Nex-O-Pos]; and CONJN is added at the beginning of the text at Cur-S-RTEXT, −DMAX]. If Cur-Source is not the last head, 200706 is false, and 200712 is next. 200712 is true if Next-Out[Cur-S-R, Nex-O-Pos] has more than two heads. If 200712 is true, 200714 adds a comma at the end of Cur-S-R[TEXT, 0]. After 200714, or if 200712 is false, 200716 sets the next unprocessed constituent phrase head to be processed. 200716 sets Cur-S-R to the sentence role of the next constituent phrase head; Cur-Source is set to the next head at Next-Out[Cur-S-R, Nex-O-Pos]; Cur-Source-Head is set to the word sense numbers of the head and its modifiers, and the head's function word vector if any; Cur-Imp-V is set to Cur-I-V[Cur-Source]; In-Call is set to false; Morph-Cla is set to false; and 200716 sets processing of the next sentence role head to start at 20078 as described above.

If the current sentence role does not have multiple constituent heads, 200704 is false, or after processing of the last head at 200710, 200718 begins the process of adding punctuation and storing the text of the current sentence role. 200718 is true if Cur-Imp-V[CONJ] is not equal to 0, and if IC is true. If 200718 is true, the current sentence role requires a clausal conjunction, and this conjunction, if any, has not been added to the first sentence role because IC is true. IC is set to true at 20070 as described above. For example, the subject at the beginning of a coordinated clause requires a coordinating conjunction. If 200718 is true, 200720 adds Cur-Imp-V[CONJ] to the beginning location of the sentence role pointer at Cur-S-R[TEXT, −DMAX], and 200720 sets IC to false. After 200720, 200722 is next, and is true if Cur-Imp-V[CONJ] is a coordinating conjunction. If 200720 is true, 200724 sets COORD to true, which sets up the clauses in the current sentence for being checked for coordinated clause ellipsis. After 200724, or if 200722 is false, 200726 sets Cur-S-R[TEXT-Len] to DMAX+1; and SDS[CURRENT] is set to contain Cur-S-R[TEXT, −DMAX to 0]. If 200718 is false, 200719 determines if the current sentence role is the final sentence role and requires the addition of punctuation. 200719 is true if there is an unprocessed sentence role at Cur-Cla-Add or if EMAX is not equal to 0. If 200719 is false, there is not an unprocessed sentence role, and there are no unprocessed ending adverbials. If 200719 is false, 200721 adds the punctuation in Cur-Imp-V[PUNC] to the end of the current clause at Cur-S-R[TEXT, 0]. After 200721, or if 200719 is true, 200726 is next as described above.

After 200726, 200728 is next, and is true if there is an unprocessed sentence role at Cur-Cla-Add. If 200728 is true, processing of the next sentence role begins at 20076 which is described above. If 200728 is false, 200730 is next, and is true if there is another address at SDSO-Pos. 200730 is true if there are more than one clause at the same position in the current sentence. If 200730 is false, 200731 sets A-S-C-Vec[SDSO-Pos] to 0 which sets the current clause position in the sentence as processed. After 200731, or if 200730 is false, 200732 is next, and is true if IMAX equals 0. If 200732 is false, there are one or more initial position adverbials as described above, and 200733 sets up these adverbials to be processed. 200733 sets Cur-S-R[TEXT, (−IMAX+1) to 0] to contain Cur-S-R-I[(−IMAX+1) to 0] where Cur-S-R is the sentence role data structure for initial position adverbials; IMAX is set to 0; Cur-Imp-V[CONJ] is removed from SDS[CURRENT], if any, because the initial adverbials must contain Cur-Imp-V[CONJ]; IC is set true so that Cur-Imp-V[CONJ] can be added to the initial adverbials; and 200733 calls 200700 to process the initial position adverbials. If 200732 is true, 200734 is next, and is true if EMAX equals 0. If 200734 is false, there are one or more ending position adverbials as described above, and 200735 sets up these adverbials to be processed. 200735 sets Cur-S-R[TEXT, (−EMAX+1) to 0] to contain Cur-S-R-E[(−EMAX+1) to 0] where Cur-S-R is the sentence role data structure for end position adverbials; EMAX is set to 0; and 200735 calls 200700 to process the ending position adverbials.

If there are no unprocessed ending position adverbials, 200734 is true, and 200736 sets up parameters for the current clause to be processed for clause ellipsis possibly including coordinated clause ellipsis. 200736 sets Sentence-Check and Ellip-Call to true; Coord-Check is set to COORD; COORD and Mod-Check are set to false; and RETURN is set to 200738; and 200736 calls 200[200200, RETURN]. After this ellipsis processing, 200738 compresses the text stored in SDS[CURRENT] and adjusts text lengths of sentence roles for any ellipsis changes, and 200738 sets OUT-TEXT to the text in SDS[CURRENT]. After 200738, 200740 is next, and is true if A-S-C-Vec has at least one position with a one. If 200740 is true, there is another clause to be processed, and the next clause is processed at 20070 as described above. If 200740 is false, the current sentence has been processed, and 200743 outputs OUT-TEXT as is appropriate for the implementation of the apparatus which is running this process and/or apparatus implementation. After 200473, 200744 is next, and is true if Owning-Pro-V has a 0, or if Owned-Pro-V has a 0. If 200744 is true, there are more clauses to be processed for text generation. If 200746 is true, 200748 is next, and is true if Owning-Pro-V has a 0. If 200748 is true, 200750 sets Cur-Pos to the position with the first 0 in Owning-Pro-V. If 200748 is false, 200752 sets Cur-Pos to the position with the first 0 in Owned-Pro-V. After 200750 or 200752, 200754 sets up parameters for selecting the next sentence for text generation. 200574 sets Cur-O-Clause to Next-Out [CLAUSE, Cur-Pos]; Next-S is incremented by 1; S-Cla-No is set to 0; and 200754 sets processing of the next sentence for text generation to begin at 20002 as described above. If there are no more clauses to be processed at 200744, 200744 is false, and 200746 returns processing control to the caller.

In considering this invention, it should be remembered that the present disclosure is illustrative only and that the scope of the invention should be determined by the following claims.

I claim:

1. A method of processing natural language, which comprises steps providing electronically encoded data which is representative of said natural language, providing a dictionary data base wherein said dictionary data base contains a plurality of entries which are comprised of one or more of syntax usage data, associated word sense numbers having associated state representation data and/or function codes, lexically processing said electronically encoded data to access said dictionary data base, providing a grammar specification, utilizing said syntax usage data which are from entries of said dictionary data base and which are associated with words of said natural language with reference to said grammar specification to produce output data representative of a grammatical parse of said natural language, said output data including selected syntax usage.

2. A method of processing as defined in claim 1, which comprises steps of accessing said one or more word sense numbers in said dictionary data base and that are associated with said selected syntax usage data from said grammar specification for said natural language word with one or more word sense numbers.

3. A method of processing as defined in claim 1, which comprises steps of accessing said one or more function codes in said dictionary data base and that are associated with said selected syntax usage data from said grammar specification for said natural language words with one or more function codes.

4. A method of processing as defined in claim 1, which comprises steps lexically processing said electronically encoded data to access said dictionary data base such that an indication of any natural language word with one or more prefixes and/or one or more suffixes is provided, providing morphological realizations which are associated with said one or more prefixes and/or one or more suffixes, morphologically processing said natural language word with one or more prefixes and/or one or more suffixes and said morphological realizations into one or more alternative partitions comprising one or more word sense numbers and/or one or more function codes.

5. A method of processing as defined in claim 1, which comprises steps utilizing said syntax usage data which are from said dictionary data base entry and which are associated with said natural language word with reference to said grammar specification to produce output data representative of a grammatical parse of said natural language, said output data including an indication of any ellipsis, elliptically processing said natural language clause or phrase to select a replacement of one or more ellipted words.

6. A method of processing as defined in claim 1, which comprises function word processing steps of said one or more natural language words with one or more function codes.

7. A method of processing as defined in claim 1, which comprises word sense number selection processing steps of said one or more natural language words with one or more word sense numbers.

8. A method of processing as defined in claim 1, which comprises steps of processing the context of said natural language such that data related to said natural language, including word sense numbers, is updated and stored.

9. A method of processing as defined in claim 1, which comprises steps providing purpose relations such that said purpose relation is a concept that labels one clause or more than one related clause, purpose relation identification processing of one or more clause implying word sense numbers from said natural language such that each of said one or more clause implying word sense numbers has one or more purpose relations identified for each.

10. A method of processing as defined in claim 1, which comprises steps providing an experience and knowledge data base wherein said experience and knowledge data base is comprised of directed graphs comprised of nodes with associated clause implying word sense numbers organized into paths of said nodes such that said nodes have access conditions which determine the zero or more next said nodes on the zero or more said paths that are accessible, purpose path identification processing to find zero or more said paths between said nodes with reference to said experience and knowledge data base such that said access conditions of said nodes on said found paths are met.

11. A method of processing as defined in claim 1, which comprises steps providing an experience and knowledge data base wherein said experience and knowledge data base is comprised of directed graphs comprised of nodes with associated clause implying word sense numbers organized into paths of said nodes, providing optional check requirements, purpose path identification processing to find zero or more said paths between said nodes with reference to said experience and knowledge data base such that said clause implying word sense numbers of said nodes on said found paths meet optional check requirements.

12. A method of processing as defined in claim 1, which comprises steps providing an experience and knowledge data base wherein said experience and knowledge data base is comprised of directed graphs comprised of nodes with associated clause implying word sense numbers organized into paths of said nodes such that said nodes have access conditions which determine the zero or more next said nodes on the zero or more said paths that are accessible, said nodes having optional related data, purpose path identification processing to find zero or more said paths between said nodes with reference to said experience and knowledge data base such that said access conditions of said nodes on said found paths are met.

13. A method of processing as defined in claim 1, which comprises steps providing an experience and knowledge data base wherein said experience and knowledge data base is comprised of directed graphs comprised of nodes with associated clause implying word sense numbers organized into paths of said nodes such that said nodes have access conditions which determine the zero or more next said nodes on the zero or more said paths that are accessible, wherein said access conditions classify an object, purpose path identification processing to find zero or more said paths between said nodes with reference to said experience and knowledge data base such that said access conditions of said nodes on said found paths are met.

14. A method of processing as defined in claim 1, which comprises steps providing an experience and knowledge data base wherein said experience and knowledge data base is comprised of directed graphs comprised of nodes with associated clause implying word sense numbers organized into paths of said nodes such that said nodes have access conditions which determine the zero or more next said nodes on the zero or more said paths that are accessible, said nodes having optional related data, wherein said optional related data designates a process, purpose path identification processing to find zero or more said paths between said nodes with reference to said experience and knowledge data base such that said access conditions of said nodes on said found paths are met.

15. A method of processing as defined in claim 1, which comprises communication processing steps such that a communication is generated such that said communication contains one or more word sense numbers and/or one or more function codes.

16. A method of processing as defined in claim 1, which comprises natural language generation processing steps such that outgoing natural language is generated from one or more word sense numbers and/or one or more function codes.

17. A method of processing as defined in claim 1, which comprises processing steps that determine a word sense number to be modified in a data base with one or more word sense numbers.

18. A method of processing as defined in claim 1, which comprises processing steps that modify a data base with one or more word sense numbers.

19. A method of processing as defined in claim 1, which comprises processing steps that modify a data base which is accessed with one or more word sense numbers.

20. A method of processing as defined in claim 1, which comprises processing steps that initiate processes specified or implied from processing of natural language.

21. A method of processing as defined in claim 1, which comprises processing steps that determine the expectedness of natural language.

22. A method of processing as defined in claim 1, which comprises processing steps that determine the plausibility of natural language.

23. A method of processing as defined in claim 1, which comprises steps lexically processing said electronically encoded data to access said dictionary data base such that an indication of any natural language word with one or more grammar anomalies is provided, providing grammar anomaly realizations which are associated with said one or more grammar anomalies, processing said natural language word with one or more grammar anomalies and said grammar anomaly realizations into one or more alternative partitions comprising one or more word sense numbers and/or one or more function codes.

24. A method of processing as defined in claim 1, which comprises processing steps that obtain data related to word sense numbers that is determined from forms or processing of natural language.

25. A method of processing as defined in claim 1, which comprises processing steps that translate natural language from one natural language to one or more other natural languages.

26. A method of processing as defined in claim 1, which comprises steps providing an experience and knowledge data base wherein said experience and knowledge data base is comprised of directed graphs comprised of nodes with associated clause implying word sense numbers organized into paths of said nodes such that said nodes have access conditions which determine the zero or more next said nodes on the zero or more paths that are accessible, providing said nodes which are not accessible on any existing path connecting said nodes and/or providing said nodes which are not on an existing path connecting said nodes, processing that determines additional access conditions for said nodes on said existing paths which are not accessible such that one or more said existing paths become accessible and/or determines access conditions for said nodes which are not on an existing path such that one or more additional paths become accessible.

27. A method of processing as defined in claim 1, which comprises steps utilizing said syntax usage data which are from said dictionary data base entry and which are associated with said natural language word with reference to said grammar specification to produce output data representative of a grammatical parse of said natural language, said output data including an indication of morphological words with no prefixes and no suffixes, providing morphological realizations which are associated with morphological words with no prefixes and no suffixes, morphologically processing said natural language word with no prefixes and no suffixes and said morphological realizations into one or more alternative partitions comprising one or more word sense numbers and/or one or more function codes.

28. A method of processing as defined in claim 1, which comprises processing steps that obtain data related to function codes that is determined from forms or processing of natural language.

29. A method of processing as defined in claim 1, which comprises processing steps that search for information determined from processing of natural language.

30. A method of processing a natural language clause, which, comprises steps providing a data associated with clause implying word sense numbers base of purpose relation data such that said purpose relation is a concept that labels one clause implying word sense number or more than one related clause implying word sense number, providing natural language clauses with associated said clause implying word sense numbers, purpose relation identification processing of said clause implying word sense numbers from said natural language and said purpose relation data associated with said clause implying word sense numbers such that each of said one or more clause implying word sense numbers has zero or more purpose relations which are associated with more than one said clause identified for each.

31. A method of processing experience and knowledge, which comprises steps providing said experience and knowledge data base which is comprised of directed graphs comprised of nodes with associated clause implying word sense numbers organized into paths of said nodes such that said nodes have access conditions which determine the zero or more next said nodes on the zero or more said paths that are accessible, purpose relation path identification processing to find zero or more said paths between said nodes with reference to said experience and knowledge data base such that said access conditions of said nodes on said found paths are met.

32. A method of processing experience and knowledge, which comprises steps providing said experience and knowledge data base which is comprised of directed graphs comprised of nodes with associated clause implying word sense numbers organized into paths of said nodes, providing optional check requirements, purpose relation path identification processing to find zero or more said paths between said nodes with reference to said experience and knowledge data base such that said clause implying word sense numbers of said nodes on said found paths meet optional check requirements.

33. A method of natural language generation processing, which comprises steps providing one or more word sense numbers, providing a dictionary data base wherein said dictionary data base contains a plurality of entries which are comprised of syntax usage data, associated word sense numbers having state representation data and/or function codes, accessing said natural language word which is associated with said dictionary data base with said word sense number, providing a grammar specification, utilizing said syntax usage data and said natural language words which are from said dictionary data base entries and which are associated with said one or more word sense numbers with reference to said grammar specification to generate outgoing natural language.

34. A method of processing natural language, which comprises steps providing electronically encoded data which is representative of said natural language, providing a dictionary data base wherein said dictionary data base contains a plurality of entries which are comprised of one or more of syntax usage data, associated word sense numbers and/or function codes, lexically processing said electronically encoded data to access said dictionary data base such that an indication of any natural language word with one or more prefixes and/or one or more suffixes is provided, providing a grammar specification, utilizing said syntax data which are from said dictionary data base entry and which are associated with said natural language word with reference to said grammar specification to produce output data representative of a grammatical parse of said natural language, said output data including selected syntax usage, and indication of any ellipsis and morphological words with no prefixes and no suffixes, accessing said one or more word sense numbers that are in said dictionary data base and that are associated with said selected syntax usage data from said grammar specification for said natural language word with one or more word sense numbers, accessing said one or more function codes that are in said dictionary data base and that are associated with said selected syntax usage data from said grammar specification for said natural language word with one or more function codes, providing morphological realizations which are associated with one or more prefixes and/or one or more suffixes, morphologically processing said natural language word with one or more prefixes and/or one or more suffixes and said morphological realizations into one or more alternative partitions comprising one or more word sense numbers and/or one or more function codes, providing morphological realizations which are associated with morphological words with no prefixes and no suffixes, morphologically processing said natural language word with no prefixes and no suffixes and said morphological realizations into one or more alternative partitions comprising one or more word sense numbers and/or one or more function codes, elliptically processing said natural language clause or phrase with ellipsis to select a replacement of one or more ellipted words, function word processing of said one or more natural language words with one or more function codes, word sense number selection processing of said one or more natural language words with one or more word sense numbers, processing the context of said natural language such that data related to said natural language, including word sense numbers, is updated and stored, providing purpose relations such that said purpose relation is a concept that labels one clause or more than one related clause, purpose relation identification processing of one or more clause implying word sense numbers from said natural language such that each of said one or more clause implying word sense numbers has one or more purpose relations identified for each, providing an experience and knowledge data base wherein said experience and knowledge data base is comprised of directed graphs comprised of nodes with associated clause implying word sense numbers organized into paths of said nodes such that said nodes have access conditions which determine the zero or more next said nodes on the zero or more said paths that are accessible, purpose path identification processing to find zero or more said paths between said nodes with reference to said experience and knowledge data base such that said access conditions of said nodes on said found paths are met, communication processing such that a communication is generated such that said communication contains one or more word sense numbers and/or one or more function codes, natural language generation processing such that outgoing natural language is generated from one or more word sense numbers, and/or one or more function codes.

35. A method of processing as defined in claim 34, which comprises steps providing optional check requirements, purpose path identification processing to find zero or more said paths between said nodes with reference to said experience and knowledge data base such that said clause implying word sense numbers of said nodes on said found paths meet optional check requirements.

36. A method of processing natural language, which comprises steps providing electronically encoded data which is representative of said natural language, providing an experience and knowledge data base wherein said experience and knowledge data base is comprised of directed graphs comprised of nodes with associated natural language clauses or equivalent derivations which represent said natural language clauses' conceptually related natural language clauses wherein said nodes are organized into paths of said nodes such that said nodes have access conditions which determine the zero or more next said nodes on the zero or more said paths that are accessible, processing said electronically encoded data to identify said natural language clauses, processing said identified natural language clauses such that said node in said experience and knowledge base which is associated with said conceptually related natural language clause or equivalent derivation which represents said identified natural language clause is selected, purpose path identification processing for said selected nodes of said identified natural language clauses to find zero or more said paths between said nodes with reference to said experience and knowledge data base such that said access conditions of said nodes on said found paths are met.

37. A method of processing natural language, which comprises steps providing electronically encoded data which is representative of said natural language, providing a dictionary data base wherein said dictionary data base contains a plurality of entries which are comprised of one or more of syntax usage data, associated word sense numbers and/or function codes, lexically processing said electronically encoded data to access said dictionary data base, providing a grammar specification, utilizing said syntax usage data which are from said dictionary data base entry and which are associated with said natural language word with reference to said grammar specification to produce output data representative of a grammatical parse of said natural language, providing an experience and knowledge data base wherein said experience and knowledge data base is comprised of directed graphs comprised of nodes with associated clause implying word sense numbers organized into paths of said nodes, providing optional check requirements, purpose path identification processing to find zero or more said paths between said nodes with reference to said experience and knowledge data base such that said clause implying word sense numbers of said nodes on said found paths meet optional check requirements.

38. A method of processing natural language, which comprises steps providing electronically encoded data which is representative of said natural language, providing a dictionary data base wherein said dictionary data base contains a plurality of entries which are comprised of one or more of syntax usage data, associated word sense numbers and/or function codes, processing word sense numbers and function codes, providing an experience and knowledge data base wherein said experience and knowledge data base is comprised of directed graphs comprised of nodes with associated clause implying word sense numbers organized into paths of said nodes, providing optional check requirements, purpose path identification processing to find zero or more said paths between said nodes with reference to said experience and knowledge data base such that said clause implying word sense numbers of said nodes on said found paths meet optional check requirements.

39. A method of processing natural language, which comprises steps providing a data base of purpose relation data such that said purpose relation is a concept that labels one clause implying word sense number or more than one related clause implying word sense number, providing natural language with associated said clause implying word sense numbers, purpose relation identification processing of said one or more clause implying word sense numbers from said natural language such that each of said one or more clause implying word sense numbers has one or more purpose relations identified for each, providing an experience and knowledge data base wherein said experience and knowledge data base is comprised of directed graphs comprised of nodes with associated clause implying word sense numbers organized into paths of said nodes, providing optional check requirements, purpose path identification processing to find zero or more said paths between said nodes with reference to said experience and knowledge data base such that said clause implying word sense numbers of said nodes on said found paths meet optional check requirements.

* * * * *

UNITED STATES PATENT AND TRADEMARK OFFICE

CERTIFICATE OF CORRECTION

PATENT NO. : 5,715,468
DATED : February 3, 1998
INVENTOR(S) : Robert L. Budzinski It is certified that error appears in the above-identified patent and that said Letters Patent is hereby corrected as shown below:

Drawings,
Sheet 53, change "602" to -- 6023 --.

Column 160,
Line 23, delete "After 60974, or if", and insert -- If --. (60974 not on related Figs. 17D to 17JJ.
Line 32, change "70125" to -- 60125 --.

Column 190,
Line 14, change "60867" to -- 60868 --.

Column 192,
Line 21, change "0332" to -- 60332 --.

Column 202,
Line 14, change "60679" to -- 60677 --.

Column 313,
Line 47, change "170264" to -- 170262 --.

Column 330,
Line 14, change "20092" to -- 20091 --.

UNITED STATES PATENT AND TRADEMARK OFFICE
CERTIFICATE OF CORRECTION

PATENT NO. : 5,715,468
DATED : February 3, 1998
INVENTOR(S) : Robert L. Budzinski It is certified that error appears in the above-identified patent and that said Letters Patent is hereby corrected as shown below:

Column 370, claim 30,
Line 42, should read as follows:
30. A method of processing a natural language clause, which comprises steps providing a data base of purpose relation data associated with clause implying word sense numbers [base of purpose relation data] such that said purpose relation is a concept that labels one clause implying word sense number or more than one related said clause implying word sense number,
providing natural language clauses with associated said clause implying word sense numbers,
purpose relation identification processing ofo said clause
implying word sense numbers form said natural language and said purpose relation data associated with said clause implying word sense numbers such that each of said one or more clause implying word sense numbers has zero or more purpose relations which are associated with more than one said clause identified for each.

Signed and Sealed this

Fifteenth Day of January, 2002

*Attest:*

JAMES E. ROGAN
*Director of the United States Patent and Trademark Office*

*Attesting Officer*